US010992187B2

(12) United States Patent
Leabman

(10) Patent No.: US 10,992,187 B2

(45) Date of Patent: Apr. 27, 2021

(54) SYSTEM AND METHODS OF USING ELECTROMAGNETIC WAVES TO WIRELESSLY DELIVER POWER TO ELECTRONIC DEVICES

(71) Applicant: Energous Corporation, San Jose, CA (US)

(72) Inventor: Michael A. Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 248 days.

(21) Appl. No.: 15/961,825

(22) Filed: Apr. 24, 2018

(65) Prior Publication Data

US 2018/0241255 A1 Aug. 23, 2018

Related U.S. Application Data

(63) Continuation-in-part of application No. 15/900,727, filed on Feb. 20, 2018, and a continuation-in-part of (Continued)

(51) Int. Cl.

*H02J 50/40* (2016.01)
*H02J 50/23* (2016.01)

(Continued)

(52) U.S. Cl.

CPC .............. *H02J 50/40* (2016.02); *H02J 50/23* (2016.02); *H02J 50/80* (2016.02); *H04B 1/04* (2013.01);

(Continued)

(58) Field of Classification Search

None

See application file for complete search history.

(56) References Cited

U.S. PATENT DOCUMENTS 787,412 A 4/1905 Tesla
2,811,624 A 10/1957 Haagensen (Continued)

FOREIGN PATENT DOCUMENTS

CN 201278367 Y 7/2009
CN 102292896 A 12/2011

(Continued)

OTHER PUBLICATIONS

Energous Corp. ISRWO, PCT/US2014/037170, Sep. 15, 2014, 11 pgs.

(Continued)

*Primary Examiner* — Jared Fureman
*Assistant Examiner* — Joel Barnett
(74) *Attorney, Agent, or Firm* — Morgan, Lewis & Bockius LLP

(57) ABSTRACT

Wireless charging systems, and methods of use thereof, are disclosed herein. As an example, a method includes: (i) receiving, by a communications radio of a wireless power transmitter, a communication signal from a communications radio of a wireless power receiver, the communication signal including data used to determine a location of the wireless power receiver, and (ii) determining a location of the wireless power receiver based, at least in part, on the data included in the communication signal. The method further includes, in response to determining that the location of the wireless power receiver is within a wireless power transmission range defined by the transmitter, transmitting radio frequency (RF) power transmission waves towards the wireless power receiver, the RF power transmission waves converging to form controlled constructive interference patterns and destructive interference patterns in proximity to the location of the wireless power receiver.

36 Claims, 167 Drawing Sheets

Related U.S. Application Data application No. 15/884,303, filed on Jan. 30, 2018, now Pat. No. 10,554,052, and a continuation-in-part of application No. 15/872,888, filed on Jan. 16, 2018, now Pat. No. 10,396,588, and a continuation-in-part of application No. 15/839,774, filed on Dec. 12, 2017, now Pat. No. 10,298,024, and a continuation-in-part of application No. 15/806,266, filed on Nov. 7, 2017, now Pat. No. 10,305,315, and a continuation-in-part of application No. 15/729,574, filed on Oct. 10, 2017, now Pat. No. 10,498,144, and a continuation-in-part of application No. 15/725,236, filed on Oct. 4, 2017, which is a continuation-in-part of application No. 15/181,242, filed on Jun. 13, 2016, now Pat. No. 10,134,260, and a continuation-in-part of application No. 15/010,127, filed on Jan. 29, 2016, now Pat. No. 9,847,669, which is a continuation of application No. 14/747,946, filed on Jun. 23, 2015, now Pat. No. 9,843,201, which is a continuation of application No. 14/748,116, filed on Jun. 23, 2015, now Pat. No. 9,899,844, which is a continuation of application No. 14/748,101, filed on Jun. 23, 2015, now Pat. No. 9,882,394, which is a continuation-in-part of application No. 14/732,140, filed on Jun. 5, 2015, now abandoned, which is a continuation-in-part of application No. 14/683,437, filed on Apr. 10, 2015, now Pat. No. 10,056,782, and a continuation-in-part of application No. 14/587,025, filed on Dec. 31, 2014, now Pat. No. 9,991,741, which is a continuation-in-part of application No. 14/587,027, filed on Dec. 31, 2014, now Pat. No. 10,291,066, which is a continuation-in-part of application No. 14/587,294, filed on Dec. 31, 2014, now abandoned, and a continuation-in-part of application No. 14/587,308, filed on Dec. 31, 2014, now abandoned, and a continuation-in-part of application No. 14/586,539, filed on Dec. 30, 2014, now Pat. No. 10,038,337, which is a continuation of application No. 14/585,341, filed on Dec. 30, 2014, now Pat. No. 9,812,890, which is a continuation-in-part of application No. 14/585,362, filed on Dec. 30, 2014, now abandoned, which is a continuation-in-part of application No. 14/585,388, filed on Dec. 30, 2014, now Pat. No. 10,050,462, which is a continuation-in-part of application No. 14/585,797, filed on Dec. 30, 2014, now Pat. No. 9,893,555, and a continuation-in-part of application No. 14/586,603, filed on Dec. 30, 2014, now abandoned, and a continuation-in-part of application No. 14/585,324, filed on Dec. 30, 2014, now Pat. No. 10,124,754, and a continuation-in-part of application No. 14/586,370, filed on Dec. 30, 2014, now abandoned, which is a continuation-in-part of application No. 14/585,574, filed on Dec. 30, 2014, now Pat. No. 10,063,064, which is a continuation-in-part of application No. 14/585,506, filed on Dec. 30, 2014, now Pat. No. 9,966,765, which is a continuation of application No. 14/586,448, filed on Dec. 30, 2014, now Pat. No. 9,368,020, which is a continuation-in-part of application No. 14/586,197, filed on Dec. 30, 2014, now Pat. No. 10,090,699, which is a continuation-in-part of application No. 14/585,291, filed on Dec. 30, 2014, now Pat. No. 9,954,374, which is a continuation-in-part of application No. 14/585,727, filed on Dec. 30, 2014, now Pat. No. 10,199,849, which is a continuation-in-part of application No. 14/586,137, filed on Dec. 30, 2014, now Pat. No. 9,876,380, which is a continuation-in-part of application No. 14/585,432, filed on Dec. 30, 2014, now Pat. No. 10,211,674, which is a continuation-in-part of application No. 14/586,160, filed on Dec. 30, 2014, now Pat. No. 9,847,677, and a continuation-in-part of application No. 14/585,844, filed on Dec. 30, 2014, now Pat. No. 9,899,861, which is a continuation of application No. 14/586,314, filed on Dec. 30, 2014, now Pat. No. 9,450,449, which is a continuation-in-part of application No. 14/586,266, filed on Dec. 30, 2014, now abandoned, and a continuation-in-part of application No. 14/586,400, filed on Dec. 30, 2014, now abandoned, and a continuation-in-part of application No. 14/585,370, filed on Dec. 30, 2014, now Pat. No. 9,876,379, and a continuation-in-part of application No. 14/586,243, filed on Dec. 30, 2014, now abandoned, which is a continuation of application No. 14/585,271, filed on Dec. 30, 2014, now Pat. No. 9,867,062, which is a continuation-in-part of application No. 14/585,633, filed on Dec. 30, 2014, now Pat. No. 10,090,886, which is a continuation of application No. 14/585,986, filed on Dec. 30, 2014, now Pat. No. 9,887,584, which is a continuation of application No. 14/585,923, filed on Dec. 30, 2014, now Pat. No. 9,939,864, which is a continuation-in-part of application No. 14/585,660, filed on Dec. 30, 2014, now Pat. No. 10,075,008, which is a continuation-in-part of application No. 14/585,585, filed on Dec. 30, 2014, now abandoned, and a continuation-in-part of application No. 14/585,484, filed on Dec. 30, 2014, now Pat. No. 10,263,432, and a continuation-in-part of application No. 14/585,387, filed on Dec. 30, 2014, now Pat. No. 10,224,982, and a continuation-in-part of application No. 14/584,800, filed on Dec. 19, 2014, now Pat. No. 9,859,757, which is a continuation of application No. 14/584,743, filed on Dec. 29, 2014, now Pat. No. 9,871,398, which is a continuation of application No. 14/584,869, filed on Dec. 29, 2014, now Pat. No. 9,438,045, which is a continuation of application No. 14/584,375, filed on Dec. 29, 2014, now Pat. No. 9,787,103, which is a continuation of application No. 14/584,869, filed on Dec. 29, 2014, now Pat. No. 9,438,045, which is a continuation-in-part of application No. 14/584,752, filed on Dec. 29, 2014, now abandoned, which is a continuation-in-part of application No. 14/465,553, filed on Aug. 21, 2014, now Pat. No. 9,891,669, which is a continuation-in-part of application No. 14/465,487, filed on Aug. 21, 2014, now Pat. No. 10,439,448, which is a continuation-in-part of application No. 14/465,508, filed on Aug. 21, 2014, now Pat. No. 10,008,889, which is a continuation-in-part of application No. 14/465,545, filed on Aug. 21, 2014, now Pat. No. 9,876,648, which is a continuation-in-part of application No. 14/337,002, filed on Jul. 21, 2014, now Pat. No. 9,838,083, which is a continuation-in-part of application No. 14/330,926, filed on Jul. 14, 2014, now abandoned, which is a continuation-in-part of application No. 14/330,931, filed on Jul. 14, 2014, now abandoned, which is a continuation-in-part of application No. 14/330,936, filed on Jul. 14, 2014, now Pat. No. 9,941,747, which is a continuation of application No. 14/330,936, filed on Jul. 14, 2014, now Pat. No. 9,941,747, and a continuation-in-part of application No. 14/330,931, filed on Jul. 14, 2014, now abandoned, and a continuation-in-part of application No. 14/330,936, filed on Jul. 14, 2014, now Pat. No. 9,941,747, which is a continuation-in-part of application No. 14/286,289, filed on May 23, 2014, now Pat. No. 9,899,873, which is a continuation-in-part of application No. 14/286,129, filed on May 23, 2014, now Pat. No. 10,063,106, which is a continuation-in-part of application No. 14/272,247, filed on May 7, 2014, now abandoned, and a continuation-in-part of application No. 14/272,280, filed on May 7, 2014, now abandoned, and a continuation-in-part of application No. 14/272,287, filed on May 7, 2014, now Pat. No. 9,806,564, and a continuation-in-part of application No. 14/272,207, filed on May 7, 2014, now abandoned, which is a continuation-in-part of application No. 14/272,207, filed on May 7, 2014, now abandoned, which is a continuation-in-part of application No. 14/104,503, filed on Dec. 12, 2013, now Pat. No. 9,252,628, which is a continuation-in-part of application No. 14/103,528, filed on Dec. 11, 2013, now abandoned, which is a continuation-in-part of application No. 14/095,358, filed on Dec. 3, 2013, now abandoned, which is a continuation-in-part of application No. 14/069,983, filed on Nov. 1, 2013, now Pat. No. 9,882,427, and a continuation-in-part of application No. 14/069,934, filed on Nov. 1, 2013, now Pat. No. 10,224,758, which is a continuation-in-part of application No. 14/051,054, filed on Oct. 10, 2013, now Pat. No. 9,824,815, which is a continuation-in-part of application No. 14/051,170, filed on Oct. 10, 2013, now abandoned, which is a continuation-in-part of application No. 14/051,128, filed on Oct. 10, 2013, now abandoned, which is a continuation-in-part of application No. 14/051,054, filed on Oct. 10, 2013, now Pat. No. 9,824,815, which is a continuation-in-part of application No. 14/027,446, filed on Sep. 16, 2013, now abandoned, which is a continuation-in-part of application No. 14/027,468, filed on Sep. 16, 2013, now abandoned, which is a continuation-in-part of application No. 14/026,747, filed on Sep. 13, 2013, now abandoned, which is a continuation-in-part of application No. 14/026,852, filed on Sep. 13, 2013, now abandoned, which is a continuation-in-part of application No. 13/960,522, filed on Aug. 6, 2013, now abandoned, which is a continuation-in-part of application No. 13/960,488, filed on Aug. 6, 2013, now Pat. No. 9,843,213, which is a continuation-in-part of application No. 13/950,492, filed on Jul. 25, 2013, now Pat. No. 9,831,718, which is a continuation-in-part of application No. 13/950,536, filed on Jul. 25, 2013, now abandoned, which is a continuation-in-part of application No. 13/950,492, filed on Jul. 25, 2013, now Pat. No. 9,831,718, which is a continuation-in-part of application No. 13/950,492, filed on Jul. 25, 2013, now Pat. No. 9,831,718, which is a continuation-in-part of application No. 13/946,128, filed on Jul. 19, 2013, now abandoned, which is a continuation of application No. 13/939,655, filed on Jul. 11, 2013, now Pat. No. 9,130,397, which is a continuation-in-part of application No. 13/939,655, filed on Jul. 11, 2013, now Pat. No. 9,130,397, which is a continuation-in-part of application No. 13/939,706, filed on Jul. 11, 2013, now Pat. No. 9,143,000, which is a continuation-in-part of application No. 13/939,506, filed on Jul. 11, 2013, now abandoned, which is a continuation-in-part of application No. 13/932,166, filed on Jul. 1, 2013, now abandoned, which is a continuation-in-part of application No. 13/926,055, filed on Jun. 25, 2013, now Pat. No. 10,128,695, which is a continuation of application No. 13/926,020, filed on Jun. 25, 2013, now Pat. No. 9,124,125, which is a continuation-in-part of application No. 13/926,055, filed on Jun. 25, 2013, now Pat. No. 10,128,695, which is a continuation-in-part of application No. 13/916,233, filed on Jun. 12, 2013, now abandoned, which is a continuation-in-part of application No. 13/908,839, filed on Jun. 3, 2013, now abandoned, and a continuation-in-part of application No. 13/891,399, filed on May 10, 2013, now Pat. No. 9,912,199, and a continuation-in-part of application No. 13/891,445, filed on May 10, 2013, now Pat. No. 10,103,582, and a continuation-in-part of application No. 13/891,430, filed on May 10, 2013, now abandoned.

(60) Provisional application No. 61/978,031, filed on Apr. 10, 2014, provisional application No. 61/720,798, filed on Oct. 31, 2012, provisional application No. 61/677,706, filed on Jul. 31, 2012, provisional application No. 61/668,799, filed on Jul. 6, 2012.

(51) Int. Cl.

| | |
|---|---|
| ***H04B 5/00*** | (2006.01) |
| ***H04B 1/04*** | (2006.01) |
| ***H04B 3/54*** | (2006.01) |
| ***H02J 50/80*** | (2016.01) |

(52) U.S. Cl.
CPC ............ *H04B 3/54* (2013.01); *H04B 5/0037* (2013.01); *H04B 5/0075* (2013.01)

(56) References Cited

U.S. PATENT DOCUMENTS

| | | | |
|---|---|---|---|
| 2,863,148 | A | 12/1958 | Gammon et al. |
| 3,167,775 | A | 1/1965 | Guertler |
| 3,434,678 | A | 3/1969 | Brown et al. |
| 3,696,384 | A | 10/1972 | Lester |
| 3,754,269 | A | 8/1973 | Clavin |
| 4,101,895 | A | 7/1978 | Jones, Jr. |
| 4,360,741 | A | 11/1982 | Fitzsimmons et al. |
| 4,944,036 | A | 7/1990 | Hyatt |
| 4,995,010 | A | 2/1991 | Knight |
| 5,142,292 | A | 8/1992 | Chang |
| 5,200,759 | A | 4/1993 | McGinnis |
| 5,211,471 | A | 5/1993 | Rohrs |
| 5,276,455 | A | 1/1994 | Fitzsimmons et al. |
| 5,548,292 | A | 8/1996 | Hirshfield et al. |
| 5,556,749 | A | 9/1996 | Mitsuhashi et al. |
| 5,568,088 | A | 10/1996 | Dent et al. |
| 5,631,572 | A | 5/1997 | Sheen et al. |
| 5,646,633 | A | 7/1997 | Dahlberg |
| 5,697,063 | A | 12/1997 | Kishigami et al. |
| 5,712,642 | A | 1/1998 | Hulderman |
| 5,936,527 | A | 8/1999 | Isaacman et al. |
| 5,982,139 | A | 11/1999 | Parise |
| 6,046,708 | A | 4/2000 | MacDonald, Jr. et al. |
| 6,061,025 | A | 5/2000 | Jackson et al. |
| 6,127,799 | A | 10/2000 | Krishnan |
| 6,127,942 | A | 10/2000 | Welle |
| 6,163,296 | A | 12/2000 | Lier et al. |
| 6,176,433 | B1 | 1/2001 | Uesaka et al. |
| 6,271,799 | B1 | 8/2001 | Rief |
| 6,289,237 | B1 | 9/2001 | Mickle et al. |
| 6,329,908 | B1 | 12/2001 | Frecska |
| 6,400,586 | B2 | 6/2002 | Raddi et al. |

(56) References Cited

U.S. PATENT DOCUMENTS 6,421,235 B2 7/2002 Ditzik
6,437,685 B2 8/2002 Hanaki
6,456,253 B1 9/2002 Rummeli et al.
6,476,795 B1 11/2002 Derocher et al.
6,501,414 B2 12/2002 Amdt et al.
6,583,723 B2 6/2003 Watanabe et al.
6,597,897 B2 7/2003 Tang
6,615,074 B2 9/2003 Mickle et al.
6,650,376 B1 11/2003 Obitsu
6,664,920 B1 12/2003 Mott et al.
6,680,700 B2 1/2004 Hilgers
6,798,716 B1 9/2004 Charych
6,803,744 B1 10/2004 Sabo
6,853,197 B1 2/2005 McFarland
6,856,291 B2 2/2005 Mickle et al.
6,911,945 B2 6/2005 Korva
6,960,968 B2 11/2005 Odendaal et al.
6,967,462 B1 11/2005 Landis
6,988,026 B2 1/2006 Breed et al.
7,003,350 B2 2/2006 Denker et al.
7,012,572 B1 3/2006 Schaffner et al.
7,027,311 B2 4/2006 Vanderelli et al.
7,068,234 B2 6/2006 Sievenpiper
7,068,991 B2 6/2006 Parise
7,079,079 B2 7/2006 Jo et al.
7,183,748 B1 2/2007 Unno et al.
7,191,013 B1 3/2007 Miranda et al.
7,193,644 B2 3/2007 Carter
7,196,663 B2 3/2007 Bolzer et al.
7,205,749 B2 4/2007 Hagen et al.
7,215,296 B2 5/2007 Abramov et al.
7,222,356 B1 5/2007 Yonezawa et al.
7,274,334 B2 9/2007 o'Riordan et al.
7,274,336 B2 9/2007 Carson
7,351,975 B2 4/2008 Brady et al.
7,359,730 B2 4/2008 Dennis et al.
7,372,408 B2 5/2008 Gaucher
7,392,068 B2 6/2008 Dayan
7,403,803 B2 7/2008 Mickle et al.
7,443,057 B2 10/2008 Nunally
7,451,839 B2 11/2008 Perlman
7,463,201 B2 12/2008 Chiang et al.
7,471,247 B2 12/2008 Saily
7,535,195 B1 5/2009 Horovitz et al.
7,614,556 B2 11/2009 Overhultz et al.
7,639,994 B2 12/2009 Greene et al.
7,643,312 B2 1/2010 Vanderelli et al.
7,652,577 B1 1/2010 Madhow et al.
7,679,576 B2 3/2010 Riedel et al.
7,702,771 B2 4/2010 Ewing et al.
7,786,419 B2 8/2010 Hyde et al.
7,812,771 B2 10/2010 Greene et al.
7,830,312 B2 11/2010 Choudhury et al.
7,844,306 B2 11/2010 Shearer et al.
7,868,482 B2 1/2011 Greene et al.
7,898,105 B2 3/2011 Greene et al.
7,904,117 B2 3/2011 Doan et al.
7,911,386 B1 3/2011 Ito et al.
7,925,308 B2 4/2011 Greene et al.
7,948,208 B2 5/2011 Partovi et al.
8,049,676 B2 11/2011 Yoon et al.
8,055,003 B2 11/2011 Mittleman et al.
8,070,595 B2 12/2011 Alderucci et al.
8,072,380 B2 12/2011 Crouch
8,092,301 B2 1/2012 Alderucci et al.
8,099,140 B2 1/2012 Arai
8,115,448 B2 2/2012 John
8,159,090 B2 4/2012 Greene et al.
8,159,364 B2 4/2012 Zeine
8,180,286 B2 5/2012 Yamasuge
8,184,454 B2 5/2012 Mao
8,228,194 B2 7/2012 Mickle
8,234,509 B2 7/2012 Gioscia et al.
8,264,101 B2 9/2012 Hyde et al.
8,264,291 B2 9/2012 Morita
8,276,325 B2 10/2012 Clifton et al.
8,278,784 B2 10/2012 Cook et al.
8,284,101 B2 10/2012 Fusco
8,310,201 B1 11/2012 Wright
8,338,991 B2 12/2012 Von Novak et al.
8,362,745 B2 1/2013 Tinaphong
8,380,255 B2 2/2013 Shearer et al.
8,384,600 B2 2/2013 Huang et al.
8,410,953 B2 4/2013 Zeine
8,411,963 B2 4/2013 Luff
8,432,062 B2 4/2013 Greene et al.
8,432,071 B2 4/2013 Huang et al.
8,446,248 B2 5/2013 Zeine
8,447,234 B2 5/2013 Cook et al.
8,451,189 B1 5/2013 Fluhler
8,452,235 B2 5/2013 Kirby et al.
8,457,656 B2 6/2013 Perkins et al.
8,461,817 B2 6/2013 Martin et al.
8,467,733 B2 6/2013 Leabman
8,497,601 B2 7/2013 Hall et al.
8,497,658 B2 7/2013 Von Novak et al.
8,552,597 B2 8/2013 Song et al.
8,558,661 B2 10/2013 Zeine
8,560,026 B2 10/2013 Chanterac
8,564,485 B2 10/2013 Milosavljevic et al.
8,604,746 B2 12/2013 Lee
8,614,643 B2 12/2013 Leabman
8,621,245 B2 12/2013 Shearer et al.
8,626,249 B2 1/2014 Kuusilinna et al.
8,629,576 B2 1/2014 Levine
8,653,966 B2 2/2014 Rao et al.
8,674,551 B2 3/2014 Low et al.
8,686,685 B2 4/2014 Moshfeghi
8,686,905 B2 4/2014 Shtrom
8,712,355 B2 4/2014 Black et al.
8,712,485 B2 4/2014 Tam
8,718,773 B2 5/2014 Wills et al.
8,729,737 B2 5/2014 Schatz et al.
8,736,228 B1 5/2014 Freed et al.
8,760,113 B2 6/2014 Keating
8,770,482 B2 7/2014 Ackermann et al.
8,772,960 B2 7/2014 Yoshida
8,823,319 B2 9/2014 Von Novak, III et al.
8,832,646 B1 9/2014 Wendling
8,854,176 B2 10/2014 Zeine
8,860,364 B2 10/2014 Low et al.
8,897,770 B1 11/2014 Frolov et al.
8,903,456 B2 12/2014 Chu et al.
8,917,057 B2 12/2014 Hui
8,923,189 B2 12/2014 Leabman
8,928,544 B2 1/2015 Massie et al.
8,937,408 B2 1/2015 Ganem et al.
8,946,940 B2 2/2015 Kim et al.
8,963,486 B2 2/2015 Kirby et al.
8,970,070 B2 3/2015 Sada et al.
8,989,053 B1 3/2015 Skaaksrud et al.
9,000,616 B2 4/2015 Greene et al.
9,001,622 B2 4/2015 Perry
9,006,934 B2 4/2015 Kozakai et al.
9,021,277 B2 4/2015 Shearer et al.
9,030,161 B2 5/2015 Lu et al.
9,059,598 B2 6/2015 Kang et al.
9,059,599 B2 6/2015 Won et al.
9,077,188 B2 7/2015 Moshfeghi
9,083,595 B2 7/2015 Rakib et al.
9,088,216 B2 7/2015 Garrity et al.
9,124,125 B2 9/2015 Leabman et al.
9,130,397 B2 9/2015 Leabman et al.
9,130,602 B2 9/2015 Cook
9,142,998 B2 9/2015 Yu et al.
9,143,000 B2 9/2015 Leabman et al.
9,143,010 B2 9/2015 Urano
9,153,074 B2 10/2015 Zhou et al.
9,178,389 B2 11/2015 Hwang
9,225,196 B2 12/2015 Huang et al.
9,240,469 B2 1/2016 Sun et al.
9,242,411 B2 1/2016 Kritchman et al.
9,244,500 B2 1/2016 Cain et al.
9,252,628 B2 2/2016 Leabman et al.

(56) References Cited

U.S. PATENT DOCUMENTS 9,270,344 B2 2/2016 Rosenberg
9,276,329 B2 3/2016 Jones et al.
9,282,582 B1 3/2016 Dunsbergen et al.
9,294,840 B1 3/2016 Anderson et al.
9,297,896 B1 3/2016 Andrews
9,318,898 B2 4/2016 John
9,368,020 B1 6/2016 Bell et al.
9,401,977 B1 7/2016 Gaw
9,409,490 B2 8/2016 Kawashima
9,419,335 B2 8/2016 Pintos
9,438,045 B1 9/2016 Leabman
9,438,046 B1 9/2016 Leabman
9,444,283 B2 9/2016 Son et al.
9,450,449 B1 9/2016 Leabman et al.
9,461,502 B2 10/2016 Lee et al.
9,520,725 B2 12/2016 Masaoka et al.
9,520,748 B2 12/2016 Hyde et al.
9,522,270 B2 12/2016 Perryman et al.
9,532,748 B2 1/2017 Denison et al.
9,537,354 B2 1/2017 Bell et al.
9,537,357 B2 1/2017 Leabman
9,537,358 B2 1/2017 Leabman
9,538,382 B2 1/2017 Bell et al.
9,544,640 B2 1/2017 Lau
9,559,553 B2 1/2017 Bae
9,564,773 B2 2/2017 Pogorelik et al.
9,571,974 B2 2/2017 Choi et al.
9,590,317 B2 3/2017 Zimmerman et al.
9,590,444 B2 3/2017 Walley
9,620,996 B2 4/2017 Zeine
9,647,328 B2 5/2017 Dobric
9,706,137 B2 7/2017 Scanlon et al.
9,711,999 B2 7/2017 Hietala et al.
9,723,635 B2 8/2017 Nambord et al.
9,793,758 B2 10/2017 Leabman
9,793,764 B2 10/2017 Perry
9,800,172 B1 10/2017 Leabman
9,806,564 B2 10/2017 Leabman
9,819,230 B2 11/2017 Petras et al.
9,825,674 B1 11/2017 Leabman
9,843,229 B2 12/2017 Leabman
9,847,669 B2 12/2017 Leabman
9,847,677 B1 12/2017 Leabman
9,853,361 B2 12/2017 Chen et al.
9,853,692 B1 12/2017 Bell et al.
9,859,758 B1 1/2018 Leabman
9,866,279 B2 1/2018 Bell et al.
9,867,032 B2 1/2018 Verma et al.
9,871,301 B2 1/2018 Contopanagos
9,876,380 B1 1/2018 Leabman et al.
9,876,394 B1 1/2018 Leabman
9,876,536 B1 1/2018 Bell et al.
9,882,394 B1 1/2018 Bell et al.
9,887,584 B1 2/2018 Bell et al.
9,893,555 B1 2/2018 Leabman et al.
9,893,564 B2 2/2018 de Rochemont
9,899,744 B1 2/2018 Contopanagos et al.
9,899,844 B1 2/2018 Bell et al.
9,899,861 B1 2/2018 Leabman et al.
9,916,485 B1 3/2018 Lilly et al.
9,917,477 B1 3/2018 Bell et al.
9,923,386 B1 3/2018 Leabman et al.
9,939,864 B1 4/2018 Bell et al.
9,965,009 B1 5/2018 Bell et al.
9,966,765 B1 5/2018 Leabman
9,966,784 B2 5/2018 Leabman
9,967,743 B1 5/2018 Bell et al.
9,973,008 B1 5/2018 Leabman
10,003,211 B1 6/2018 Leabman et al.
10,014,728 B1 7/2018 Leabman
10,027,159 B2 7/2018 Hosseini
10,038,337 B1 7/2018 Leabman et al.
10,050,462 B1 8/2018 Leabman et al.
10,056,782 B1 8/2018 Leabman
10,063,064 B1 8/2018 Bell et al.
10,068,703 B1 9/2018 Contopanagos
10,075,008 B1 9/2018 Bell et al.
10,090,699 B1 10/2018 Leabman
10,090,886 B1 10/2018 Bell et al.
10,103,552 B1 10/2018 Leabman et al.
10,110,046 B1 * 10/2018 Esquibel ................. H02J 7/025
10,122,219 B1 11/2018 Hosseini et al.
10,124,754 B1 11/2018 Leabman
10,128,686 B1 11/2018 Leabman et al.
10,134,260 B1 11/2018 Bell et al.
10,135,112 B1 11/2018 Hosseini
10,135,294 B1 11/2018 Leabman
10,141,771 B1 11/2018 Hosseini et al.
10,148,097 B1 12/2018 Leabman et al.
10,153,645 B1 12/2018 Bell et al.
10,153,653 B1 12/2018 Bell et al.
10,153,660 B1 12/2018 Leabman et al.
10,158,257 B2 12/2018 Leabman
10,158,259 B1 12/2018 Leabman
10,164,478 B2 12/2018 Leabman
10,170,917 B1 1/2019 Bell et al.
10,181,756 B2 1/2019 Bae et al.
10,186,892 B2 1/2019 Hosseini et al.
10,193,396 B1 1/2019 Bell et al.
10,199,835 B2 2/2019 Bell
10,199,849 B1 2/2019 Bell
10,205,239 B1 2/2019 Contopanagos et al.
10,211,674 B1 2/2019 Leabman et al.
10,223,717 B1 3/2019 Bell
10,224,758 B2 3/2019 Leabman et al.
10,224,982 B1 3/2019 Leabman
10,230,266 B1 3/2019 Leabman et al.
10,243,414 B1 3/2019 Leabman et al.
10,256,657 B2 4/2019 Hosseini et al.
10,256,677 B2 4/2019 Hosseini et al.
10,263,432 B1 4/2019 Leabman et al.
10,263,476 B2 4/2019 Leabman
10,270,261 B2 4/2019 Bell et al.
10,277,054 B2 4/2019 Hosseini
10,291,055 B1 5/2019 Bell et al.
10,291,066 B1 5/2019 Leabman
10,291,294 B2 5/2019 Leabman
10,298,024 B2 5/2019 Leabman
10,298,133 B2 5/2019 Leabman
10,305,315 B2 5/2019 Leabman et al.
10,312,715 B2 6/2019 Leabman
10,333,332 B1 6/2019 Hosseini
10,396,588 B2 8/2019 Leabman
10,491,029 B2 11/2019 Hosseini
10,511,097 B2 12/2019 Kornaros et al.
10,516,301 B2 12/2019 Leabman
10,523,058 B2 12/2019 Leabman
10,554,052 B2 2/2020 Bell et al.
10,594,165 B2 3/2020 Hosseini
10,615,647 B2 4/2020 Johnston et al.
2001/0027876 A1 10/2001 Tsukamoto et al.
2002/0001307 A1 1/2002 Nguyen et al.
2002/0024471 A1 2/2002 Ishitobi
2002/0028655 A1 3/2002 Rosener et al.
2002/0034958 A1 3/2002 Oberschmidt et al.
2002/0054330 A1 5/2002 Jinbo et al.
2002/0065052 A1 5/2002 Pande et al.
2002/0072784 A1 6/2002 Sheppard et al.
2002/0095980 A1 7/2002 Breed et al.
2002/0103447 A1 8/2002 Terry
2002/0123776 A1 9/2002 Von Arx
2002/0133592 A1 9/2002 Matsuda
2002/0171594 A1 11/2002 Fang
2002/0172223 A1 11/2002 Stilp
2003/0005759 A1 1/2003 Breed et al.
2003/0038750 A1 2/2003 Chen
2003/0058187 A1 3/2003 Billiet et al.
2003/0076274 A1 4/2003 Phelan et al.
2003/0179152 A1 9/2003 Watada et al.
2003/0179573 A1 9/2003 Chun
2003/0192053 A1 10/2003 Sheppard et al.
2004/0019624 A1 1/2004 Sukegawa
2004/0020100 A1 2/2004 O'Brian et al.
2004/0036657 A1 2/2004 Forster et al.

(56) References Cited

U.S. PATENT DOCUMENTS

2004/0066251 A1 4/2004 Eleftheriades et al.
2004/0107641 A1 6/2004 Walton et al.
2004/0113543 A1 6/2004 Daniels
2004/0119675 A1 6/2004 Washio et al.
2004/0130425 A1 7/2004 Dayan et al.
2004/0130442 A1 7/2004 Breed
2004/0142733 A1 7/2004 Parise
2004/0145342 A1 7/2004 Lyon
2004/0155832 A1 8/2004 Yuanzhu
2004/0196190 A1 10/2004 Mendolia et al.
2004/0203979 A1 10/2004 Attar et al.
2004/0207559 A1 10/2004 Milosavljevic
2004/0218759 A1 11/2004 Yacobi
2004/0241402 A1 12/2004 Kawate
2004/0259604 A1 12/2004 Mickle et al.
2004/0263124 A1 12/2004 Wieck et al.
2005/0007276 A1 1/2005 Barrick et al.
2005/0030118 A1 2/2005 Wang
2005/0046584 A1 3/2005 Breed
2005/0055316 A1 3/2005 Williams
2005/0077872 A1 4/2005 Single
2005/0093766 A1 5/2005 Turner
2005/0116683 A1 6/2005 Cheng
2005/0117660 A1 6/2005 Vialle et al.
2005/0134517 A1 6/2005 Gottl
2005/0171411 A1 8/2005 KenKnight
2005/0198673 A1 9/2005 Kit et al.
2005/0227619 A1 10/2005 Lee et al.
2005/0232469 A1 10/2005 Schofield
2005/0237249 A1 10/2005 Nage
2005/0237258 A1 10/2005 Abramov et al.
2005/0282591 A1 12/2005 Shaff
2006/0013335 A1 1/2006 Leabman
2006/0019712 A1 1/2006 Choi
2006/0030279 A1 2/2006 Leabman et al.
2006/0033674 A1 2/2006 Essig, Jr. et al.
2006/0071308 A1 4/2006 Tang et al.
2006/0092079 A1 5/2006 de Rochemont
2006/0094425 A1 5/2006 Mickle et al.
2006/0113955 A1 6/2006 Nunally
2006/0119532 A1 6/2006 Yun et al.
2006/0136004 A1 6/2006 Cowan et al.
2006/0160517 A1 7/2006 Yoon
2006/0183473 A1 8/2006 Ukon
2006/0190063 A1 8/2006 Kanzius
2006/0192913 A1 8/2006 Shutou et al.
2006/0199620 A1 9/2006 Greene et al.
2006/0238365 A1 10/2006 Vecchione et al.
2006/0266564 A1 11/2006 Perlman et al.
2006/0266917 A1 11/2006 Baldis et al.
2006/0278706 A1 12/2006 Hatakayama et al.
2006/0284593 A1 12/2006 Nagy et al.
2006/0287094 A1 12/2006 Mahaffey et al.
2007/0007821 A1 1/2007 Rossetti
2007/0019693 A1 1/2007 Graham
2007/0021140 A1 1/2007 Keyes
2007/0060185 A1 3/2007 Simon et al.
2007/0070490 A1 3/2007 Tsunoda et al.
2007/0090997 A1 4/2007 Brown et al.
2007/0093269 A1 4/2007 Leabman et al.
2007/0097653 A1 5/2007 Gilliland et al.
2007/0103110 A1 5/2007 Sagoo
2007/0106894 A1 5/2007 Zhang
2007/0109121 A1 5/2007 Cohen
2007/0139000 A1 6/2007 Kozuma
2007/0149162 A1 6/2007 Greene et al.
2007/0164868 A1 7/2007 Deavours et al.
2007/0173196 A1 7/2007 Gallic
2007/0173214 A1 7/2007 Mickle et al.
2007/0178857 A1 8/2007 Greene et al.
2007/0178945 A1 8/2007 Cook et al.
2007/0182367 A1 8/2007 Partovi
2007/0191074 A1* 8/2007 Harrist .................... H02J 7/025
455/572
2007/0191075 A1 8/2007 Greene et al.
2007/0197281 A1 8/2007 Stronach
2007/0210960 A1 9/2007 Rofougaran et al.
2007/0222681 A1 9/2007 Greene et al.
2007/0228833 A1 10/2007 Stevens et al.
2007/0229261 A1 10/2007 Zimmerman et al.
2007/0240297 A1 10/2007 Yang et al.
2007/0257634 A1 11/2007 Leschin et al.
2007/0273486 A1 11/2007 Shiotsu
2007/0291165 A1 12/2007 Wang
2007/0296639 A1 12/2007 Hook et al.
2007/0298846 A1 12/2007 Greene et al.
2008/0014897 A1 1/2008 Cook et al.
2008/0024376 A1 1/2008 Norris et al.
2008/0048917 A1 2/2008 Achour et al.
2008/0062062 A1 3/2008 Borau et al.
2008/0062255 A1 3/2008 Gal
2008/0067874 A1 3/2008 Tseng
2008/0074324 A1 3/2008 Puzella et al.
2008/0089277 A1 4/2008 Aledander et al.
2008/0110263 A1 5/2008 Klessel et al.
2008/0113816 A1 5/2008 Mahaffey et al.
2008/0122297 A1 5/2008 Arai
2008/0123383 A1 5/2008 Shionoiri
2008/0129536 A1 6/2008 Randall et al.
2008/0140278 A1 6/2008 Breed
2008/0169910 A1 7/2008 Greene et al.
2008/0197802 A1 8/2008 Onishi
2008/0204342 A1 8/2008 Kharadly
2008/0204350 A1 8/2008 Tam et al.
2008/0210762 A1 9/2008 Osada et al.
2008/0211458 A1 9/2008 Lawther et al.
2008/0233890 A1 9/2008 Baker
2008/0248758 A1 10/2008 Schedelbeck et al.
2008/0248846 A1 10/2008 Stronach et al.
2008/0258993 A1 10/2008 Gummalla et al.
2008/0266191 A1 10/2008 Hilgers
2008/0278378 A1 11/2008 Chang et al.
2008/0309452 A1 12/2008 Zeine
2009/0002493 A1 1/2009 Kates
2009/0010316 A1 1/2009 Rofougaran et al.
2009/0019183 A1 1/2009 Wu et al.
2009/0036065 A1 2/2009 Siu
2009/0039828 A1 2/2009 Jakubowski
2009/0047998 A1 2/2009 Alberth, Jr.
2009/0058354 A1 3/2009 Harrison
2009/0058361 A1 3/2009 John
2009/0058731 A1 3/2009 Geary et al.
2009/0060012 A1 3/2009 Gresset et al.
2009/0067198 A1 3/2009 Graham et al.
2009/0067208 A1 3/2009 Martin et al.
2009/0073066 A1 3/2009 Jordon et al.
2009/0096412 A1 4/2009 Huang
2009/0096413 A1 4/2009 Partovi
2009/0102292 A1 4/2009 Cook et al.
2009/0102296 A1 4/2009 Greene et al.
2009/0108679 A1 4/2009 Porwal
2009/0122847 A1 5/2009 Nysen et al.
2009/0128262 A1 5/2009 Lee et al.
2009/0157911 A1 6/2009 Aihara
2009/0174604 A1 7/2009 Keskitalo
2009/0180653 A1 7/2009 Sjursen et al.
2009/0200985 A1 8/2009 Zane et al.
2009/0206791 A1 8/2009 Jung
2009/0207090 A1 8/2009 Pettus et al.
2009/0207092 A1 8/2009 Nysen et al.
2009/0218884 A1 9/2009 Soar
2009/0218891 A1 9/2009 McCollough
2009/0219903 A1 9/2009 Alamouti et al.
2009/0243397 A1 10/2009 Cook et al.
2009/0256752 A1 10/2009 Akkermans et al.
2009/0264069 A1 10/2009 Yamasuge
2009/0271048 A1 10/2009 Wakamatsu
2009/0280866 A1 11/2009 Lo et al.
2009/0281678 A1 11/2009 Wakamatsu
2009/0284082 A1 11/2009 Mohammadian
2009/0284083 A1 11/2009 Karalis et al.
2009/0284220 A1 11/2009 Toncich et al.
2009/0284227 A1 11/2009 Mohammadian et al.
2009/0284325 A1 11/2009 Rossiter et al.

(56) References Cited

U.S. PATENT DOCUMENTS

2009/0286475 A1 11/2009 Toncich et al.
2009/0286476 A1 11/2009 Toncich et al.
2009/0291634 A1 11/2009 Saarisalo
2009/0299175 A1 12/2009 Bernstein et al.
2009/0308936 A1 12/2009 Nitzan et al.
2009/0312046 A1 12/2009 Clevenger et al.
2009/0315412 A1 12/2009 Yamamoto et al.
2009/0322281 A1 12/2009 Kamijo et al.
2010/0001683 A1 1/2010 Huang et al.
2010/0007307 A1 1/2010 Baarman et al.
2010/0007569 A1 1/2010 Sim et al.
2010/0019686 A1 1/2010 Gutierrez, Jr.
2010/0019908 A1 1/2010 Cho et al.
2010/0026605 A1 2/2010 Yang et al.
2010/0027379 A1 2/2010 Saulnier et al.
2010/0029383 A1 2/2010 Dai
2010/0033021 A1 2/2010 Bennett
2010/0033390 A1 2/2010 Alamouti et al.
2010/0034238 A1 2/2010 Bennett
2010/0041453 A1 2/2010 Grimm, Jr.
2010/0044123 A1 2/2010 Perlman et al.
2010/0054200 A1 3/2010 Tsai
2010/0060534 A1 3/2010 Oodachi
2010/0066631 A1 3/2010 Puzella et al.
2010/0075607 A1 3/2010 Hosoya
2010/0079005 A1 4/2010 Hyde et al.
2010/0079011 A1 4/2010 Hyde et al.
2010/0082193 A1 4/2010 Chiappetta
2010/0087227 A1 4/2010 Francos et al.
2010/0090524 A1 4/2010 Obayashi
2010/0090656 A1 4/2010 Shearer et al.
2010/0109443 A1 5/2010 Cook et al.
2010/0117596 A1 5/2010 Cook et al.
2010/0117926 A1 5/2010 DeJean, II
2010/0119234 A1 5/2010 Suematsu et al.
2010/0123618 A1 5/2010 Martin et al.
2010/0123624 A1 5/2010 Minear et al.
2010/0124040 A1 5/2010 Diebel et al.
2010/0127660 A1 5/2010 Cook et al.
2010/0142418 A1 6/2010 Nishioka et al.
2010/0142509 A1 6/2010 Zhu et al.
2010/0148723 A1 6/2010 Cook et al.
2010/0151808 A1 6/2010 Toncich et al.
2010/0156721 A1 6/2010 Alamouti et al.
2010/0156741 A1 6/2010 Vazquez et al.
2010/0164296 A1 7/2010 Kurs et al.
2010/0164433 A1 7/2010 Janefalker et al.
2010/0167664 A1 7/2010 Szinl
2010/0171461 A1 7/2010 Baarman et al.
2010/0171676 A1 7/2010 Tani et al.
2010/0174629 A1 7/2010 Taylor et al.
2010/0176934 A1 7/2010 Chou et al.
2010/0181961 A1 7/2010 Novak et al.
2010/0181964 A1 7/2010 Huggins et al.
2010/0194206 A1 8/2010 Burdo et al.
2010/0201189 A1 8/2010 Kirby et al.
2010/0201201 A1 8/2010 Mobarhan et al.
2010/0201314 A1 8/2010 Toncich et al.
2010/0207572 A1 8/2010 Kirby et al.
2010/0210233 A1 8/2010 Cook et al.
2010/0213895 A1 8/2010 Keating et al.
2010/0214177 A1 8/2010 Parsche
2010/0222010 A1 9/2010 Ozaki et al.
2010/0225270 A1 9/2010 Jacobs et al.
2010/0227570 A1 9/2010 Hendin
2010/0231470 A1 9/2010 Lee et al.
2010/0237709 A1 9/2010 Hall et al.
2010/0244576 A1 9/2010 Hillan et al.
2010/0253281 A1 10/2010 Li
2010/0256831 A1 10/2010 Abramo et al.
2010/0259110 A1 10/2010 Kurs et al.
2010/0259447 A1 10/2010 Crouch
2010/0264747 A1 10/2010 Hall et al.
2010/0277003 A1 11/2010 Von Novak et al.
2010/0277121 A1 11/2010 Hall et al.
2010/0279606 A1 11/2010 Hillan et al.
2010/0289341 A1 11/2010 Ozaki et al.
2010/0295372 A1 11/2010 Hyde et al.
2010/0308767 A1 12/2010 Rofougaran et al.
2010/0309079 A1 12/2010 Rofougaran et al.
2010/0309088 A1 12/2010 Hyvonen et al.
2010/0315045 A1 12/2010 Zeine
2010/0316163 A1 12/2010 Forenza et al.
2010/0327766 A1 12/2010 Recker et al.
2010/0328044 A1 12/2010 Waffenschmidt et al.
2010/0332401 A1 12/2010 Prahlad et al.
2011/0013198 A1 1/2011 Shirley
2011/0018360 A1 1/2011 Baarman et al.
2011/0028114 A1 2/2011 Kerselaers
2011/0031928 A1 2/2011 Soar
2011/0032149 A1 2/2011 Leabman
2011/0032866 A1 2/2011 Leabman
2011/0034190 A1 2/2011 Leabman
2011/0034191 A1 2/2011 Leabman
2011/0043047 A1 2/2011 Karalis et al.
2011/0043163 A1 2/2011 Baarman et al.
2011/0043327 A1 2/2011 Baarman et al.
2011/0050166 A1 3/2011 Cook et al.
2011/0055037 A1 3/2011 Hayashigawa et al.
2011/0056215 A1 3/2011 Ham
2011/0057607 A1 3/2011 Carobolante
2011/0057853 A1 3/2011 Kim et al.
2011/0062788 A1 3/2011 Chen et al.
2011/0074342 A1 3/2011 MacLaughlin
2011/0074349 A1 3/2011 Ghovanloo
2011/0074620 A1 3/2011 Wintermantel
2011/0078092 A1 3/2011 Kim et al.
2011/0090126 A1 4/2011 Szini et al.
2011/0109167 A1 5/2011 Park et al.
2011/0114401 A1 5/2011 Kanno et al.
2011/0115303 A1 5/2011 Baarman et al.
2011/0115432 A1 5/2011 El-Maleh
2011/0115605 A1 5/2011 Dimig et al.
2011/0121660 A1 5/2011 Azancot et al.
2011/0122018 A1 5/2011 Tarng et al.
2011/0122026 A1 5/2011 DeLaquil et al.
2011/0127845 A1 6/2011 Walley et al.
2011/0127952 A1 6/2011 Walley et al.
2011/0133655 A1 6/2011 Recker et al.
2011/0133691 A1 6/2011 Hautanen
2011/0148578 A1 6/2011 Aloi et al.
2011/0148595 A1 6/2011 Miller et al.
2011/0151789 A1 6/2011 Viglione et al.
2011/0154429 A1 6/2011 Stantchev
2011/0156493 A1 6/2011 Bennett
2011/0156494 A1 6/2011 Mashinsky
2011/0156640 A1 6/2011 Moshfeghi
2011/0163128 A1 7/2011 Taguchi et al.
2011/0175455 A1 7/2011 Hashiguchi
2011/0175461 A1 7/2011 Tinaphong
2011/0181120 A1 7/2011 Liu et al.
2011/0182245 A1 7/2011 Malkamaki et al.
2011/0184842 A1 7/2011 Melen
2011/0188207 A1 8/2011 Won et al.
2011/0193688 A1 8/2011 Forsell
2011/0194543 A1 8/2011 Zhao et al.
2011/0195722 A1 8/2011 Walter et al.
2011/0199046 A1 8/2011 Tsai et al.
2011/0215086 A1 9/2011 Yeh
2011/0217923 A1 9/2011 Ma
2011/0220634 A1 9/2011 Yeh
2011/0221389 A1 9/2011 Won et al.
2011/0222272 A1 9/2011 Yeh
2011/0227725 A1 9/2011 Muirhead
2011/0243040 A1 10/2011 Khan et al.
2011/0243050 A1 10/2011 Yanover
2011/0244913 A1 10/2011 Kim et al.
2011/0248573 A1 10/2011 Kanno et al.
2011/0248575 A1 10/2011 Kim et al.
2011/0249678 A1 10/2011 Bonicatto
2011/0254377 A1 10/2011 Widmer et al.
2011/0254503 A1 10/2011 Widmer et al.
2011/0259953 A1 10/2011 Baarman et al.
2011/0273977 A1 11/2011 Shapira et al.

(56) References Cited

U.S. PATENT DOCUMENTS

2011/0278941 A1 11/2011 Krishna et al.
2011/0279226 A1 11/2011 Chen et al.
2011/0281535 A1 11/2011 Low et al.
2011/0282415 A1 11/2011 Eckhoff et al.
2011/0285213 A1 11/2011 Kowalewski
2011/0286374 A1 11/2011 Shin et al.
2011/0291489 A1 12/2011 Tsai et al.
2011/0302078 A1 12/2011 Failing
2011/0304216 A1 12/2011 Baarman
2011/0304437 A1 12/2011 Beeler
2011/0304521 A1 12/2011 Ando et al.
2012/0007441 A1 1/2012 John
2012/0013196 A1 1/2012 Kim et al.
2012/0013198 A1 1/2012 Uramoto et al.
2012/0013296 A1 1/2012 Heydari et al.
2012/0019419 A1 1/2012 Prat et al.
2012/0043887 A1 2/2012 Mesibov
2012/0051109 A1 3/2012 Kim et al.
2012/0051294 A1 3/2012 Guillouard
2012/0056486 A1 3/2012 Endo et al.
2012/0056741 A1 3/2012 Zhu et al.
2012/0068906 A1 3/2012 Asher et al.
2012/0074891 A1 3/2012 Anderson et al.
2012/0075072 A1 3/2012 Pappu
2012/0080944 A1 4/2012 Recker et al.
2012/0080957 A1 4/2012 Cooper et al.
2012/0086284 A1 4/2012 Capanella et al.
2012/0086615 A1 4/2012 Norair
2012/0095617 A1 4/2012 Martin et al.
2012/0098350 A1 4/2012 Campanella et al.
2012/0098485 A1 4/2012 Kang et al.
2012/0099675 A1 4/2012 Kitamura et al.
2012/0103562 A1 5/2012 Clayton
2012/0104849 A1 5/2012 Jackson
2012/0105252 A1 5/2012 Wang
2012/0112532 A1 5/2012 Kesler et al.
2012/0119914 A1 5/2012 Uchida
2012/0126743 A1 5/2012 Rivers, Jr.
2012/0132647 A1 5/2012 Beverly et al.
2012/0133214 A1 5/2012 Yun et al.
2012/0142291 A1 6/2012 Rath et al.
2012/0146426 A1 6/2012 Sabo
2012/0146576 A1 6/2012 Partovi
2012/0146577 A1 6/2012 Tanabe
2012/0147802 A1 6/2012 Ukita et al.
2012/0149307 A1 6/2012 Terada et al.
2012/0150670 A1 6/2012 Taylor et al.
2012/0153894 A1 6/2012 Widmer et al.
2012/0157019 A1 6/2012 Li
2012/0161531 A1 6/2012 Kim et al.
2012/0161544 A1 6/2012 Kashiwagi et al.
2012/0169276 A1 7/2012 Wang
2012/0169278 A1 7/2012 Choi
2012/0173418 A1 7/2012 Beardsmore et al.
2012/0179004 A1 7/2012 Roesicke et al.
2012/0181973 A1 7/2012 Lyden
2012/0182427 A1 7/2012 Marshall
2012/0188142 A1 7/2012 Shashi et al.
2012/0187851 A1 8/2012 Huggins et al.
2012/0193999 A1 8/2012 Zeine
2012/0200399 A1 8/2012 Chae
2012/0201153 A1 8/2012 Bharadia et al.
2012/0201173 A1 8/2012 Jian et al.
2012/0206299 A1 8/2012 Valdes-Garcia
2012/0211214 A1 8/2012 Phan
2012/0212071 A1 8/2012 Myabayashi et al.
2012/0212072 A1 8/2012 Miyabayashi et al.
2012/0214462 A1 8/2012 Chu et al.
2012/0214536 A1 8/2012 Kim et al.
2012/0228392 A1 9/2012 Cameron et al.
2012/0228956 A1 9/2012 Kamata
2012/0231856 A1 9/2012 Lee et al.
2012/0235636 A1 9/2012 Partovi
2012/0242283 A1 9/2012 Kim et al.
2012/0248886 A1 10/2012 Kesler et al.
2012/0248888 A1 10/2012 Kesler et al.
2012/0248891 A1 10/2012 Drennen
2012/0249051 A1 10/2012 Son et al.
2012/0262002 A1 10/2012 Widmer et al.
2012/0265272 A1 10/2012 Judkins
2012/0267900 A1 10/2012 Huffman et al.
2012/0268238 A1 10/2012 Park et al.
2012/0274154 A1 11/2012 DeLuca
2012/0280650 A1 11/2012 Kim et al.
2012/0286582 A1 11/2012 Kim et al.
2012/0292993 A1 11/2012 Mettler et al.
2012/0293021 A1 11/2012 Teggatz et al.
2012/0293119 A1 11/2012 Park et al.
2012/0299389 A1 11/2012 Lee et al.
2012/0299540 A1 11/2012 Perry
2012/0299541 A1 11/2012 Perry
2012/0299542 A1 11/2012 Perry
2012/0300588 A1 11/2012 Perry
2012/0300592 A1 11/2012 Perry
2012/0300593 A1 11/2012 Perry
2012/0306284 A1 12/2012 Lee et al.
2012/0306433 A1 12/2012 Kim et al.
2012/0306705 A1 12/2012 Sakurai et al.
2012/0306707 A1 12/2012 Yang et al.
2012/0306720 A1 12/2012 Tanmi et al.
2012/0307873 A1 12/2012 Kim et al.
2012/0309295 A1 12/2012 Maguire
2012/0309308 A1 12/2012 Kim et al.
2012/0309332 A1 12/2012 Liao
2012/0313446 A1 12/2012 Park et al.
2012/0313449 A1 12/2012 Kurs
2012/0313835 A1 12/2012 Gebretnsae
2012/0326660 A1 12/2012 Lu et al.
2013/0002550 A1 1/2013 Zalewski
2013/0018439 A1 1/2013 Chow et al.
2013/0024059 A1 1/2013 Miller et al.
2013/0026981 A1 1/2013 Van Der Lee
2013/0026982 A1 1/2013 Rothenbaum
2013/0032589 A1 2/2013 Chung
2013/0033571 A1 2/2013 Steen
2013/0038124 A1 2/2013 Newdoll et al.
2013/0038402 A1 2/2013 Karalis et al.
2013/0043738 A1 2/2013 Park et al.
2013/0044035 A1 2/2013 Zhuang
2013/0049471 A1 2/2013 Oleynik
2013/0049475 A1 2/2013 Kim et al.
2013/0049484 A1 2/2013 Weissentern et al.
2013/0057078 A1 3/2013 Lee
2013/0057205 A1 3/2013 Lee et al.
2013/0057210 A1 3/2013 Negaard et al.
2013/0057364 A1 3/2013 Kesler et al.
2013/0058379 A1 3/2013 Kim et al.
2013/0062959 A1 3/2013 Lee et al.
2013/0063082 A1 3/2013 Lee et al.
2013/0063143 A1 3/2013 Adalsteinsson et al.
2013/0063266 A1 3/2013 Yunker et al.
2013/0069444 A1 3/2013 Waffenschmidt et al.
2013/0076308 A1 3/2013 Niskala et al.
2013/0077650 A1 3/2013 Traxler et al.
2013/0078918 A1 3/2013 Crowley et al.
2013/0082651 A1 4/2013 Park et al.
2013/0082653 A1 4/2013 Lee et al.
2013/0083774 A1 4/2013 Son et al.
2013/0088082 A1 4/2013 Kang et al.
2013/0088090 A1 4/2013 Wu
2013/0088192 A1 4/2013 Eaton
2013/0088331 A1 4/2013 Cho
2013/0093388 A1 4/2013 Partovi
2013/0099389 A1 4/2013 Hong et al.
2013/0099586 A1 4/2013 Kato
2013/0106197 A1 5/2013 Bae et al.
2013/0107023 A1 5/2013 Tanaka et al.
2013/0119777 A1 5/2013 Rees
2013/0119778 A1 5/2013 Jung
2013/0119929 A1 5/2013 Partovi
2013/0120052 A1 5/2013 Siska
2013/0120205 A1 5/2013 Thomson et al.
2013/0120206 A1 5/2013 Biancotto et al.
2013/0120217 A1 5/2013 Ueda et al.

(56) References Cited

U.S. PATENT DOCUMENTS

2013/0130621 A1 5/2013 Kim et al.
2013/0132010 A1 5/2013 Winger et al.
2013/0134923 A1 5/2013 Smith
2013/0137455 A1 5/2013 Xia
2013/0141037 A1 6/2013 Jenwatanavet et al.
2013/0148341 A1 6/2013 Williams
2013/0149975 A1 6/2013 Yu et al.
2013/0154387 A1 6/2013 Lee et al.
2013/0155748 A1 6/2013 Sundstrom
2013/0157729 A1 6/2013 Tabe
2013/0162335 A1 6/2013 Kim et al.
2013/0169061 A1 7/2013 Microshnichenko et al.
2013/0169219 A1 7/2013 Gray
2013/0169348 A1 7/2013 Shi
2013/0171939 A1 7/2013 Tian et al.
2013/0175877 A1 7/2013 Abe et al.
2013/0178253 A1 7/2013 Karaoguz
2013/0181881 A1 7/2013 Christie et al.
2013/0187475 A1 7/2013 Vendik
2013/0190031 A1 7/2013 Persson et al.
2013/0193769 A1 8/2013 Mehta et al.
2013/0197320 A1 8/2013 Albert et al.
2013/0200064 A1 8/2013 Alexander
2013/0207477 A1 8/2013 Nam et al.
2013/0207604 A1 8/2013 Zeine
2013/0207879 A1 8/2013 Rada et al.
2013/0210357 A1 8/2013 Qin et al.
2013/0221757 A1 8/2013 Cho et al.
2013/0222201 A1 8/2013 Ma et al.
2013/0234530 A1 9/2013 Miyauchi
2013/0234536 A1 9/2013 Chemishkian et al.
2013/0234658 A1 9/2013 Endo et al.
2013/0241306 A1 9/2013 Aber et al.
2013/0241468 A1 9/2013 Moshfeghi
2013/0241474 A1 9/2013 Moshfeghi
2013/0249478 A1 9/2013 Hirano
2013/0249479 A1 9/2013 Partovi
2013/0250102 A1 9/2013 Scanlon et al.
2013/0254578 A1 9/2013 Huang et al.
2013/0264997 A1 10/2013 Lee et al.
2013/0268782 A1 10/2013 Tam et al.
2013/0270923 A1 10/2013 Cook et al.
2013/0278076 A1 10/2013 Proud
2013/0278209 A1 10/2013 Von Novak
2013/0285464 A1 10/2013 Miwa
2013/0285477 A1 10/2013 Lo et al.
2013/0285606 A1 10/2013 Ben-Shalom et al.
2013/0288600 A1 10/2013 Kuusilinna et al.
2013/0288617 A1 10/2013 Kim et al.
2013/0293423 A1 11/2013 Moshfeghi
2013/0300356 A1* 11/2013 Yang ...................... H02J 7/025 320/108
2013/0307751 A1 11/2013 Yu-Juin et al.
2013/0310020 A1 11/2013 Kazuhiro
2013/0311798 A1 11/2013 Sultenfuss
2013/0328417 A1 12/2013 Takeuchi
2013/0334883 A1 12/2013 Kim et al.
2013/0339108 A1 12/2013 Ryder et al.
2013/0343208 A1 12/2013 Sexton et al.
2013/0343251 A1 12/2013 Zhang
2013/0343585 A1 12/2013 Bennett et al.
2014/0001846 A1 1/2014 Mosebrook
2014/0001875 A1 1/2014 Nahidipour
2014/0001876 A1 1/2014 Fujiwara et al.
2014/0006017 A1 1/2014 Sen
2014/0008992 A1 1/2014 Leabman
2014/0008993 A1 1/2014 Leabman
2014/0009108 A1 1/2014 Leabman
2014/0009110 A1 1/2014 Lee
2014/0011531 A1 1/2014 Burstrom et al.
2014/0015336 A1 1/2014 Weber et al.
2014/0015344 A1 1/2014 Mohamadi
2014/0021907 A1 1/2014 Yu et al.
2014/0021908 A1 1/2014 McCool
2014/0035524 A1 2/2014 Zeine
2014/0035526 A1 2/2014 Tripathi et al.
2014/0035786 A1 2/2014 Ley
2014/0043248 A1 2/2014 Yeh
2014/0049422 A1 2/2014 Von Novak et al.
2014/0054971 A1 2/2014 Kissin
2014/0055098 A1 2/2014 Lee et al.
2014/0057618 A1 2/2014 Zirwas et al.
2014/0062395 A1 3/2014 Kwon et al.
2014/0082435 A1 3/2014 Kitgawa
2014/0086125 A1 3/2014 Polo et al.
2014/0086592 A1 3/2014 Nakahara et al.
2014/0091756 A1 4/2014 Ofstein et al.
2014/0091968 A1 4/2014 Harel et al.
2014/0091974 A1 4/2014 Desclos et al.
2014/0103869 A1 4/2014 Radovic
2014/0104157 A1 4/2014 Burns
2014/0111147 A1 4/2014 Soar
2014/0113689 A1 4/2014 Lee
2014/0117946 A1 5/2014 Muller et al.
2014/0118140 A1 5/2014 Amis
2014/0128107 A1 5/2014 An
2014/0132210 A1 5/2014 Partovi
2014/0133279 A1 5/2014 Khuri-Yakub
2014/0139034 A1 5/2014 Sankar et al.
2014/0139039 A1 5/2014 Cook et al.
2014/0139180 A1 5/2014 Kim et al.
2014/0141838 A1 5/2014 Cai et al.
2014/0142876 A1 5/2014 John et al.
2014/0143933 A1 5/2014 Low et al.
2014/0145879 A1 5/2014 Pan
2014/0145884 A1 5/2014 Dang et al.
2014/0152117 A1 6/2014 Sanker
2014/0159651 A1 6/2014 Von Novak et al.
2014/0159652 A1 6/2014 Hall et al.
2014/0159662 A1 6/2014 Furui
2014/0159667 A1 6/2014 Kim et al.
2014/0169385 A1 6/2014 Hadani et al.
2014/0175893 A1 6/2014 Sengupta et al.
2014/0176054 A1 6/2014 Porat et al.
2014/0176061 A1 6/2014 Cheatham, III et al.
2014/0176082 A1 6/2014 Visser
2014/0177399 A1 6/2014 Teng et al.
2014/0183964 A1 7/2014 Walley
2014/0184148 A1 7/2014 Van Der Lee et al.
2014/0184155 A1 7/2014 Cha
2014/0184163 A1 7/2014 Das et al.
2014/0184170 A1 7/2014 Jeong
2014/0191568 A1 7/2014 Partovi
2014/0191818 A1 7/2014 Waffenschmidt et al.
2014/0194092 A1 7/2014 Wanstedt et al.
2014/0194095 A1 7/2014 Wanstedt et al.
2014/0197691 A1 7/2014 Wang
2014/0203629 A1 7/2014 Hoffman et al.
2014/0206384 A1 7/2014 Kim et al.
2014/0210281 A1 7/2014 Ito et al.
2014/0217955 A1 8/2014 Lin
2014/0217967 A1 8/2014 Zeine et al.
2014/0225805 A1 8/2014 Pan et al.
2014/0232320 A1 8/2014 Ento July et al.
2014/0232610 A1 8/2014 Shigemoto et al.
2014/0239733 A1 8/2014 Mach et al.
2014/0241231 A1 8/2014 Zeine
2014/0245036 A1 8/2014 Oishi
2014/0246416 A1 9/2014 White
2014/0247152 A1 9/2014 Proud
2014/0252813 A1 9/2014 Lee et al.
2014/0252866 A1 9/2014 Walsh et al.
2014/0265725 A1 9/2014 Angle et al.
2014/0265727 A1 9/2014 Berte
2014/0265943 A1 9/2014 Angle et al.
2014/0266025 A1 9/2014 Jakubowski
2014/0266946 A1 9/2014 Bily et al.
2014/0273819 A1 9/2014 Nadakuduti et al.
2014/0273892 A1 9/2014 Nourbakhsh
2014/0281655 A1 9/2014 Angle et al.
2014/0292090 A1 10/2014 Cordeiro et al.
2014/0292451 A1 10/2014 Zimmerman
2014/0300452 A1 10/2014 Rofe et al.
2014/0312706 A1 10/2014 Fiorello et al.

(56) References Cited

U.S. PATENT DOCUMENTS

2014/0325218 A1 10/2014 Shimizu et al.
2014/0327320 A1 11/2014 Muhs et al.
2014/0327390 A1 11/2014 Park et al.
2014/0333142 A1 11/2014 Desrosiers
2014/0346860 A1 11/2014 Aubry et al.
2014/0354063 A1 12/2014 Leabman et al.
2014/0354221 A1 12/2014 Leabman et al.
2014/0355718 A1 12/2014 Guan et al.
2014/0357309 A1 12/2014 Leabman et al.
2014/0368048 A1 12/2014 Leabman
2014/0368161 A1 12/2014 Leabman et al.
2014/0368405 A1 12/2014 Ek et al.
2014/0375139 A1 12/2014 Tsukamoto
2014/0375253 A1 12/2014 Leabman et al.
2014/0375255 A1 12/2014 Leabman et al.
2014/0375258 A1 12/2014 Arkhipenkov
2014/0375261 A1 12/2014 Manova-Elssibony et al.
2014/0376646 A1 12/2014 Leabman et al.
2015/0001949 A1 1/2015 Leabman et al.
2015/0002086 A1* 1/2015 Matos ...................... H02J 7/00 320/108
2015/0003207 A1 1/2015 Lee et al.
2015/0008980 A1 1/2015 Kim et al.
2015/0011160 A1 1/2015 Uurgovan et al.
2015/0015180 A1 1/2015 Miller et al.
2015/0015182 A1 1/2015 Brandtman et al.
2015/0015192 A1 1/2015 Leabamn
2015/0015194 A1 1/2015 Leabman et al.
2015/0015195 A1 1/2015 Leabman et al.
2015/0021990 A1 1/2015 Myer et al.
2015/0022008 A1 1/2015 Leabman et al.
2015/0022009 A1 1/2015 Leabman et al.
2015/0022010 A1 1/2015 Leabman et al.
2015/0022194 A1 1/2015 Almalki et al.
2015/0023204 A1 1/2015 Wil et al.
2015/0028688 A1 1/2015 Masaoka
2015/0028694 A1 1/2015 Leabman et al.
2015/0028697 A1 1/2015 Leabman et al.
2015/0028875 A1 1/2015 Irie et al.
2015/0029397 A1 1/2015 Leabman et al.
2015/0035378 A1 2/2015 Calhoun et al.
2015/0035715 A1 2/2015 Kim et al.
2015/0039482 A1 2/2015 Fuinaga
2015/0041459 A1 2/2015 Leabman et al.
2015/0042264 A1 2/2015 Leabman et al.
2015/0042265 A1 2/2015 Leabman et al.
2015/0044977 A1 2/2015 Ramasamy et al.
2015/0046526 A1 2/2015 Bush et al.
2015/0061404 A1 3/2015 Lamenza et al.
2015/0076917 A1 3/2015 Leabman et al.
2015/0076927 A1 3/2015 Leabman et al.
2015/0077036 A1 3/2015 Leabman et al.
2015/0077037 A1 3/2015 Leabman et al.
2015/0091520 A1 4/2015 Blum et al.
2015/0091706 A1 4/2015 Chemishkian et al.
2015/0097442 A1 4/2015 Muurinen
2015/0097663 A1 4/2015 Sloo et al.
2015/0102681 A1 4/2015 Leabman et al.
2015/0102764 A1 4/2015 Leabman et al.
2015/0102769 A1 4/2015 Leabman et al.
2015/0102942 A1 4/2015 Houser et al.
2015/0102973 A1 4/2015 Hand et al.
2015/0108848 A1 4/2015 Joehren
2015/0109181 A1 4/2015 Hyde et al.
2015/0115877 A1 4/2015 Aria et al.
2015/0115878 A1 4/2015 Park
2015/0116153 A1 4/2015 Chen et al.
2015/0123483 A1 5/2015 Leabman et al.
2015/0123496 A1 5/2015 Leabman et al.
2015/0128733 A1 5/2015 Taylor et al.
2015/0130285 A1 5/2015 Leabman et al.
2015/0130293 A1 5/2015 Hajimiri et al.
2015/0137612 A1 5/2015 Yamakawa et al.
2015/0148664 A1 5/2015 Stolka et al.
2015/0155737 A1 6/2015 Mayo
2015/0155738 A1 6/2015 Leabman et al.
2015/0162662 A1 6/2015 Chen et al.
2015/0162751 A1 6/2015 Leabman et al.
2015/0162779 A1 6/2015 Lee et al.
2015/0171512 A1 6/2015 Chen et al.
2015/0171513 A1 6/2015 Chen et al.
2015/0171656 A1 6/2015 Leabman et al.
2015/0171658 A1 6/2015 Manova-Elssibony et al.
2015/0171931 A1 6/2015 Won et al.
2015/0177326 A1 6/2015 Chakraborty et al.
2015/0180133 A1 6/2015 Hunt
2015/0180249 A1 6/2015 Jeon et al.
2015/0181117 A1 6/2015 Park et al.
2015/0187491 A1 7/2015 Yanagawa
2015/0188352 A1 7/2015 Peek et al.
2015/0199665 A1 7/2015 Chu
2015/0201385 A1 7/2015 Mercer et al.
2015/0207333 A1 7/2015 Baarman et al.
2015/0207542 A1 7/2015 Zeine
2015/0222126 A1 8/2015 Leabman et al.
2015/0233987 A1 8/2015 Von Novak, III et al.
2015/0234144 A1 8/2015 Cameron et al.
2015/0236520 A1 8/2015 Baarman
2015/0244070 A1 8/2015 Cheng et al.
2015/0244080 A1 8/2015 Gregoire
2015/0244187 A1 8/2015 Horie
2015/0244201 A1 8/2015 Chu
2015/0244341 A1 8/2015 Ritter et al.
2015/0249484 A1 9/2015 Mach et al.
2015/0255989 A1 9/2015 Walley et al.
2015/0256097 A1 9/2015 Gudan et al.
2015/0260835 A1 9/2015 Widmer et al.
2015/0262465 A1 9/2015 Pritchett
2015/0263534 A1 9/2015 Lee et al.
2015/0263548 A1 9/2015 Cooper
2015/0270618 A1 9/2015 Zhu et al.
2015/0270622 A1 9/2015 Takasaki et al.
2015/0270741 A1 9/2015 Leabman et al.
2015/0278558 A1 10/2015 Priev et al.
2015/0280429 A1 10/2015 Makita et al.
2015/0280484 A1 10/2015 Radziemski et al.
2015/0288074 A1 10/2015 Harper et al.
2015/0288438 A1 10/2015 Maltsev et al.
2015/0311585 A1 10/2015 Church et al.
2015/0312721 A1 10/2015 Singh
2015/0318729 A1 11/2015 Leabman
2015/0326024 A1 11/2015 Bell et al.
2015/0326025 A1 11/2015 Bell et al.
2015/0326051 A1 11/2015 Bell et al.
2015/0326063 A1 11/2015 Leabman et al.
2015/0326068 A1 11/2015 Bell et al.
2015/0326069 A1 11/2015 Petras et al.
2015/0326070 A1 11/2015 Petras et al.
2015/0326071 A1 11/2015 Contopanagos
2015/0326072 A1 11/2015 Petras et al.
2015/0326142 A1 11/2015 Petras et al.
2015/0326143 A1 11/2015 Petras et al.
2015/0327085 A1 11/2015 Hadani
2015/0333528 A1 11/2015 Leabman
2015/0333529 A1 11/2015 Leabman
2015/0333573 A1 11/2015 Leabman
2015/0333800 A1 11/2015 Perry et al.
2015/0339497 A1 11/2015 Kurian
2015/0340759 A1 11/2015 Bridgelall et al.
2015/0340903 A1 11/2015 Bell et al.
2015/0340909 A1 11/2015 Bell et al.
2015/0340910 A1 11/2015 Petras et al.
2015/0340911 A1 11/2015 Bell et al.
2015/0341087 A1 11/2015 Moore et al.
2015/0349574 A1 12/2015 Leabman
2015/0358222 A1 12/2015 Berger et al.
2015/0365137 A1 12/2015 Miller et al.
2015/0365138 A1 12/2015 Miller et al.
2016/0005068 A1 1/2016 Im et al.
2016/0012695 A1 1/2016 Bell et al.
2016/0013560 A1 1/2016 Daniels
2016/0013656 A1 1/2016 Bell et al.
2016/0013677 A1 1/2016 Bell et al.
2016/0013678 A1 1/2016 Bell et al.

(56) References Cited

U.S. PATENT DOCUMENTS

| | | | |
|---|---|---|---|
| 2016/0013855 | A1 | 1/2016 | Campos |
| 2016/0020636 | A1 | 1/2016 | Khlat |
| 2016/0020647 | A1 | 1/2016 | Leabman et al. |
| 2016/0020649 | A1 | 1/2016 | Bell et al. |
| 2016/0020830 | A1 | 1/2016 | Bell et al. |
| 2016/0028403 | A1 | 1/2016 | McCaughan et al. |
| 2016/0042206 | A1 | 2/2016 | Pesavento et al. |
| 2016/0043571 | A1 | 2/2016 | Kesler et al. |
| 2016/0054395 | A1 | 2/2016 | Bell et al. |
| 2016/0054396 | A1 | 2/2016 | Bell et al. |
| 2016/0054440 | A1 | 2/2016 | Younis |
| 2016/0056635 | A1 | 2/2016 | Bell |
| 2016/0056640 | A1 | 2/2016 | Mao |
| 2016/0056669 | A1 | 2/2016 | Bell |
| 2016/0056966 | A1 | 2/2016 | Bell |
| 2016/0065005 | A1 | 3/2016 | Won et al. |
| 2016/0079799 | A1 | 3/2016 | Khlat |
| 2016/0087483 | A1 | 3/2016 | Hietala et al. |
| 2016/0087486 | A1 | 3/2016 | Pogorelik et al. |
| 2016/0094091 | A1 | 3/2016 | Shin et al. |
| 2016/0094092 | A1 | 3/2016 | Davlantes et al. |
| 2016/0099601 | A1 | 4/2016 | Leabman et al. |
| 2016/0099602 | A1 | 4/2016 | Leabman et al. |
| 2016/0099609 | A1 | 4/2016 | Leabman et al. |
| 2016/0099610 | A1 | 4/2016 | Leabman et al. |
| 2016/0099611 | A1 | 4/2016 | Leabman et al. |
| 2016/0099612 | A1 | 4/2016 | Leabman et al. |
| 2016/0099613 | A1 | 4/2016 | Leabman et al. |
| 2016/0099614 | A1 | 4/2016 | Leabman et al. |
| 2016/0099755 | A1 | 4/2016 | Leabman et al. |
| 2016/0099756 | A1 | 4/2016 | Leabman et al. |
| 2016/0099757 | A1 | 4/2016 | Leabman et al. |
| 2016/0099758 | A1 | 4/2016 | Leabman et al. |
| 2016/0100124 | A1 | 4/2016 | Leabman et al. |
| 2016/0100312 | A1 | 4/2016 | Bell et al. |
| 2016/0112787 | A1 | 4/2016 | Rich |
| 2016/0126749 | A1 | 5/2016 | Shichino et al. |
| 2016/0126752 | A1 | 5/2016 | Vuori et al. |
| 2016/0126776 | A1 | 5/2016 | Kim et al. |
| 2016/0141908 | A1 | 5/2016 | Jakl et al. |
| 2016/0164563 | A1 | 6/2016 | Khawand et al. |
| 2016/0181849 | A1 | 6/2016 | Govindaraj |
| 2016/0181854 | A1 | 6/2016 | Leabman |
| 2016/0181867 | A1 | 6/2016 | Daniel et al. |
| 2016/0181873 | A1 | 6/2016 | Mitcheson et al. |
| 2016/0191121 | A1 | 6/2016 | Bell |
| 2016/0197522 | A1 | 7/2016 | Zeine et al. |
| 2016/0202343 | A1 | 7/2016 | Okutsu |
| 2016/0204622 | A1 | 7/2016 | Leabman |
| 2016/0204642 | A1 | 7/2016 | Oh |
| 2016/0218545 | A1 * | 7/2016 | Schroeder .............. H02J 50/90 |
| 2016/0233582 | A1 | 8/2016 | Piskun |
| 2016/0238365 | A1 | 8/2016 | Wixey et al. |
| 2016/0240908 | A1 | 8/2016 | Strong |
| 2016/0248276 | A1 | 8/2016 | Hong et al. |
| 2016/0294225 | A1 | 10/2016 | Blum et al. |
| 2016/0299210 | A1 | 10/2016 | Zeine |
| 2016/0301240 | A1 | 10/2016 | Zeine |
| 2016/0322868 | A1 | 11/2016 | Akuzawa et al. |
| 2016/0323000 | A1 | 11/2016 | Liu et al. |
| 2016/0336804 | A1 | 11/2016 | Son et al. |
| 2016/0339258 | A1 | 11/2016 | Perryman et al. |
| 2016/0344098 | A1 | 11/2016 | Ming |
| 2016/0359367 | A1 | 12/2016 | Rothschild |
| 2016/0380464 | A1 | 12/2016 | Chin et al. |
| 2016/0380466 | A1 | 12/2016 | Yang et al. |
| 2017/0005481 | A1 | 1/2017 | Von Novak, III |
| 2017/0005516 | A9 | 1/2017 | Leabman et al. |
| 2017/0005524 | A1 | 1/2017 | Akuzawa et al. |
| 2017/0005530 | A1 | 1/2017 | Zeine et al. |
| 2017/0012448 | A1 | 1/2017 | Miller et al. |
| 2017/0025887 | A1 | 1/2017 | Hyun et al. |
| 2017/0025903 | A1 | 1/2017 | Song et al. |
| 2017/0026087 | A1 | 1/2017 | Tanabe |
| 2017/0040700 | A1 | 2/2017 | Leung |

| | | | |
|---|---|---|---|
| 2017/0043675 | A1 | 2/2017 | Jones et al. |
| 2017/0047784 | A1 | 2/2017 | Jung et al. |
| 2017/0187225 | A1 | 2/2017 | Hosseini |
| 2017/0063168 | A1 | 3/2017 | Uchida |
| 2017/0077733 | A1 | 3/2017 | Jeong et al. |
| 2017/0077735 | A1 | 3/2017 | Leabman |
| 2017/0077736 | A1 | 3/2017 | Leabman |
| 2017/0077764 | A1 | 3/2017 | Bell et al. |
| 2017/0077765 | A1 | 3/2017 | Bell et al. |
| 2017/0077979 | A1 | 3/2017 | Papa et al. |
| 2017/0077995 | A1 | 3/2017 | Leabman |
| 2017/0085112 | A1 | 3/2017 | Leabman et al. |
| 2017/0085120 | A1 | 3/2017 | Leabman et al. |
| 2017/0085127 | A1 | 3/2017 | Leabman |
| 2017/0085437 | A1 | 3/2017 | Condeixa et al. |
| 2017/0092115 | A1 | 3/2017 | Sloo et al. |
| 2017/0104263 | A1 | 4/2017 | Hosseini |
| 2017/0110886 | A1 | 4/2017 | Reynolds et al. |
| 2017/0110888 | A1 | 4/2017 | Leabman |
| 2017/0110889 | A1 | 4/2017 | Bell |
| 2017/0110914 | A1 | 4/2017 | Bell |
| 2017/0127196 | A1 | 5/2017 | Blum et al. |
| 2017/0134686 | A9 | 5/2017 | Leabman |
| 2017/0141582 | A1 | 5/2017 | Adolf et al. |
| 2017/0141583 | A1 | 5/2017 | Adolf et al. |
| 2017/0163076 | A1 | 6/2017 | Park et al. |
| 2017/0168595 | A1 | 6/2017 | Sakaguchi et al. |
| 2017/0179763 | A9 | 6/2017 | Leabman |
| 2017/0179771 | A1 | 6/2017 | Leabman |
| 2017/0187198 | A1 | 6/2017 | Leabman |
| 2017/0187222 | A1 | 6/2017 | Hosseini |
| 2017/0187223 | A1 | 6/2017 | Hosseini |
| 2017/0187228 | A1 | 6/2017 | Hosseini |
| 2017/0187248 | A1 | 6/2017 | Leabman |
| 2017/0187422 | A1 | 6/2017 | Hosseini |
| 2017/0214422 | A1 | 7/2017 | Na et al. |
| 2017/0338695 | A1 | 11/2017 | Port |
| 2018/0040929 | A1 | 2/2018 | Chappelle |
| 2018/0048178 | A1 | 2/2018 | Leabman |
| 2018/0090992 | A1 | 3/2018 | Shrivastava et al. |
| 2018/0123400 | A1 | 5/2018 | Leabman |
| 2018/0131238 | A1 | 5/2018 | Leabman |
| 2018/0159338 | A1 | 6/2018 | Leabman et al. |
| 2018/0159355 | A1 | 6/2018 | Leabman |
| 2018/0166924 | A1 | 6/2018 | Hosseini |
| 2018/0166925 | A1 | 6/2018 | Hosseini |
| 2018/0198199 | A1 | 7/2018 | Hosseini |
| 2018/0212474 | A1 | 7/2018 | Hosseini |
| 2018/0226840 | A1 | 8/2018 | Leabman |
| 2018/0248409 | A1 | 8/2018 | Johnston |
| 2018/0262014 | A1 | 9/2018 | Bell |
| 2018/0262040 | A1 | 9/2018 | Contopanagos |
| 2018/0262060 | A1 | 9/2018 | Johnston |
| 2018/0269570 | A1 | 9/2018 | Hosseini |
| 2018/0287431 | A1 | 10/2018 | Liu et al. |
| 2018/0309314 | A1 | 10/2018 | White et al. |
| 2018/0331429 | A1 | 11/2018 | Kornaros |
| 2018/0331581 | A1 | 11/2018 | Hosseini |
| 2018/0337534 | A1 | 11/2018 | Bell et al. |
| 2018/0375340 | A1 | 12/2018 | Bell et al. |
| 2018/0375368 | A1 | 12/2018 | Leabman |
| 2018/0376235 | A1 | 12/2018 | Leabman |
| 2019/0052979 | A1 | 2/2019 | Chen et al. |
| 2019/0074133 | A1 | 3/2019 | Contopanagos |
| 2019/0074728 | A1 | 3/2019 | Leabman |
| 2019/0131827 | A1 | 5/2019 | Johnston |
| 2019/0173323 | A1 | 6/2019 | Hosseini |
| 2019/0245389 | A1 | 8/2019 | Johnston et al. |
| 2019/0288567 | A1 | 9/2019 | Leabman et al. |
| 2019/0296586 | A1 | 9/2019 | Moshfeghi |
| 2019/0372384 | A1 | 12/2019 | Hosseini et al. |
| 2019/0393729 | A1 | 12/2019 | Contopanagos et al. |
| 2019/0393928 | A1 | 12/2019 | Leabman |
| 2020/0006988 | A1 | 1/2020 | Leabman |
| 2020/0021128 | A1 | 1/2020 | Bell et al. |
| 2020/0044488 | A1 | 2/2020 | Johnston et al. |
| 2020/0112204 | A1 | 4/2020 | Hosseini et al. |

(56) References Cited

U.S. PATENT DOCUMENTS

| | | | |
|---|---|---|---|
| 2020/0119592 | A1 | 4/2020 | Hosseini |
| 2020/0153117 | A1 | 5/2020 | Papio-Toda et al. |

FOREIGN PATENT DOCUMENTS

| | | | |
|---|---|---|---|
| CN | 102860037 | A | 1/2013 |
| CN | 103348563 | A | 10/2013 |
| CN | 203826555 | U | 9/2014 |
| CN | 104090265 | A | 10/2014 |
| CN | 104347915 | A | 2/2015 |
| CN | 105765821 | A | 7/2016 |
| CN | 106329116 | A | 1/2017 |
| CN | 103380561 | B | 9/2017 |
| DE | 200216655 | U1 | 2/2002 |
| DE | 10-2003216953 | A1 | 2/2015 |
| EP | 1028482 | A2 | 8/2000 |
| EP | 1081506 | A1 | 3/2001 |
| EP | 2397973 | A1 | 6/2010 |
| EP | 2346136 | A1 | 7/2011 |
| EP | 2545635 | A2 | 1/2013 |
| EP | 2747195 | A1 | 6/2014 |
| EP | 3067983 | A1 | 9/2016 |
| EP | 3118970 | A1 | 1/2017 |
| EP | 3145052 | A1 | 3/2017 |
| GB | 2404497 | A | 2/2005 |
| GB | 2556620 | A | 6/2018 |
| JP | 2000323916 | A | 11/2000 |
| JP | 2002319816 | A | 10/2002 |
| JP | 2006157586 | A | 6/2006 |
| JP | 2007043432 | A | 2/2007 |
| JP | 2008167017 | A | 7/2008 |
| JP | 2012095226 | A | 5/2012 |
| JP | 2012157167 | A | 8/2012 |
| JP | 2013162624 | A | 8/2013 |
| JP | 2015128349 | A | 7/2015 |
| JP | 2015128370 | A | 7/2015 |
| KR | 20060061776 | A | 6/2006 |
| KR | 20070044302 | A | 4/2007 |
| KR | 100755144 | B1 | 9/2007 |
| KR | 20110132059 | A | 12/2011 |
| KR | 20110135540 | A1 | 12/2011 |
| KR | 20120009843 | A | 2/2012 |
| KR | 20120108759 | A | 10/2012 |
| KR | 20130026977 | A | 3/2013 |
| KR | 20140023409 | A | 2/2014 |
| KR | 20140023410 | A | 3/2014 |
| KR | 20140085200 | A | 7/2014 |
| KR | 20150077678 | A | 7/2015 |
| WO | WO 1995/08125 | A1 | 3/1995 |
| WO | WO 1998/31070 | A1 | 7/1998 |
| WO | WO 9952173 | | 10/1999 |
| WO | WO 200111716 | A1 | 2/2001 |
| WO | WO 2003091943 | A1 | 11/2003 |
| WO | WO 2004077550 | A1 | 9/2004 |
| WO | WO 2006122783 | | 11/2006 |
| WO | WO 2007070571 | A2 | 6/2007 |
| WO | WO 2008024993 | A2 | 2/2008 |
| WO | WO 2008156571 | A2 | 12/2008 |
| WO | WO 2010022181 | A1 | 2/2010 |
| WO | WO 2010039246 | A1 | 4/2010 |
| WO | WO 2010138994 | A1 | 12/2010 |
| WO | WO 2011112022 | A2 | 9/2011 |
| WO | WO 2012177283 | A1 | 12/2012 |
| WO | WO 2013031988 | A1 | 3/2013 |
| WO | WO 2013035190 | A1 | 3/2013 |
| WO | WO 2013038074 | A2 | 3/2013 |
| WO | WO 2013042399 | A1 | 3/2013 |
| WO | WO 2013052950 | A1 | 4/2013 |
| WO | WO 2013105920 | A2 | 7/2013 |
| WO | WO 2014075103 | A1 | 5/2014 |
| WO | WO 2014132258 | A1 | 9/2014 |
| WO | WO 2014134996 | A1 | 9/2014 |
| WO | WO 2014182788 | A2 | 11/2014 |
| WO | WO 2014182788 | A3 | 11/2014 |
| WO | WO 2014197472 | A1 | 12/2014 |
| WO | WO 2014209587 | A1 | 12/2014 |
| WO | WO 2015038773 | A1 | 3/2015 |
| WO | WO 2015097809 | A1 | 7/2015 |
| WO | WO 2015161323 | A1 | 10/2015 |
| WO | WO 2016024869 | A1 | 2/2016 |
| WO | WO 2016048512 | A1 | 3/2016 |
| WO | WO 2016187357 | A1 | 11/2016 |
| WO | WO2015177859 | A1 | 4/2017 |

OTHER PUBLICATIONS

Energous Corp., IPRP, PCT/US2014/037170, Nov. 10, 2015, 8 pgs.
Energous Corp., ISRWO, PCT/US2014/041534, Oct. 13, 2014, 10 pgs.
Energous Corp., IPRP, PCT/US2014/041534, Dec. 29, 2015, 7 pgs.
Energous Corp., ISRWO, PCT/US2014/046956, Nov. 12, 2014, 10 pgs.
Energous Corp., IPRP, PCT/US2014/046956, Jan. 19, 2016, 7 pgs.
Energous Corp., ISRWO, PCT/US2014/037072, Sep. 12, 2014, 8 pgs.
Energous Corp., IPRP, PCT/US2014/037072, Nov. 10, 2015, 6 pgs.
Energous Corp., ISRWO, PCT/US2014/068568, Mar. 20, 2015, 10 pgs.
Energous Corp., IPRP, PCT/US2014/068568, Jun. 14, 2016, 8 pgs.
Energous Corp., ISRWO, PCT/US2014/055195, Dec. 22, 2014, 11 pgs.
Energous Corp., IPRP, PCT/US2014/055195, Mar. 22, 2016, 9 pgs.
Energous Corp., ISRWO, PCT/US2015/067291, Mar. 4, 2016, 10 pgs.
Energous Corp., IPRP, PCT/US2015/067291, Jul. 4, 2017, 4 pgs.
Energous Corp., ISRWO, PCT/US2015/067242, Mar. 16, 2016, 9 pgs.
Energous Corp., IPRP, PCT/US2015/067242, Jun. 27, 2017, 7 pgs.
Energous Corp., ISRWO, PCT/US2015/067243, Mar. 10, 2016, 11 pgs.
Energous Corp., IPRP, PCT/US2015/067243, Jun. 27, 2017, 7 pgs.
Energous Corp., ISRWO, PCT/US2014/037109, Apr. 8, 2016, 12 pgs.
Energous Corp., IPRP, PCT/US2014/037109, Apr. 12, 2016, 9 pgs.
Energous Corp., ISRWO, PCT/US2015/067275, Mar. 3, 2016, 8 pgs.
Energous Corp., IPRP, PCT/US2015/067275, Jul. 4, 2017, 7 pgs.
Energous Corp., ISRWO, PCT/US2015/067245, Mar. 17, 2016, 8 pgs.
Energous Corp., IPRP, PCT/US2015/067245, Jun. 27, 2017, 7 pgs.
Energous Corp., ISRWO, PCT/US2014/041546, Oct. 16, 2014, 12 pgs.
Energous Corp., IPRP, PCT/US2014/041546, Dec. 29, 2015, 9 pgs.
Energous Corp., ISRWO, PCT/US2015/67250, Mar. 30, 2016, 11 pgs.
Energous Corp., IPRP, PCT/US2015/67250, Mar. 30, 2016, 10 pgs.
Energous Corp., ISRWO, PCT/US2015/067325, Mar. 10, 2016, 9 pgs.
Energous Corp., IPRP, PCT/US2015/067325, Jul. 4, 2017, 8 pgs.
Energous Corp., ISRWO, PCT/US2014/040697, Oct. 1, 2014, 12 pgs.
Energous Corp., IPRP, PCT/US2014/040697, Dec. 8, 2015, 9 pgs.
Energous Corp., ISRWO, PCT/US2014/040705, Sep. 23, 2014, 8 pgs.
Energous Corp., IPRP, PCT/US2014/040705, Dec. 8, 2015, 6 pgs.
Energous Corp., ISRWO, PCT/US2015/067249, Mar. 29, 2016, 8 pgs.
Energous Corp., IPRP, PCT/US2015/067249, Jun. 27, 2017, 7 pgs.
Energous Corp., ISRWO, PCT/US2015/067246, May 11, 2016, 18 pgs.
Energous Corp., IPRP, PCT/US2015/067246, Jun. 27, 2017, 9 pgs.
Energous Corp., ISRWO, PCT/US2014/059317, Feb. 24, 2015, 13 pgs.
Energous Corp., IPRP, PCT/US2014/059317, Apr. 12, 2016, 10 pgs.
Energous Corp., ISRWO, PCT/US2014/049669, Nov. 13, 2014, 10 pgs.
Energous Corp., IPRP, PCT/US2014/049669, Feb. 9, 2016, 8 pgs.

(56) References Cited

OTHER PUBLICATIONS

Energous Corp., ISRWO, PCT/US2014/041323, Oct. 1, 2014, 10 pgs.
Energous Corp., IPRP, PCT/US2014/041323, Dec. 22, 2015, 8 pgs.
Energous Corp., ISRWO, PCT/US2014/048002, Nov. 13, 2014, 11 pgs.
Energous Corp., IPRP, PCT/US2014/048002, Feb. 12, 2015 8 pgs.
Energous Corp., ISRWO, PCT/US2014/062682, Feb. 12, 2015, 10 pgs.
Energous Corp., IPRP, PCT/US2014/062682, May 3, 2016, 8 pgs.
Energous Corp., ISRWO, PCT/US2014/049666, Nov. 10, 2014, 7 pgs.
Energous Corp., IPRP, PCT/US2014/049666, Feb. 9, 2016, 5 pgs.
Energous Corp., ISRWO, PCT/US2014/046961, Nov. 24, 2014, 16 pgs.
Energous Corp., IPRP, PCT/US2014/046961, Jan. 19, 2016, 8 pgs.
Energous Corp., ISRWO, PCT/US2015/067279, Mar. 11, 2015, 13 pgs.
Energous Corp., IPRP, PCT/US2015/067279, Jul. 4, 2017, 7 pgs.
Energous Corp., ISRWO, PCT/US2014/041342, Jan. 27, 2015, 10 pgs.
Energous Corp., IPRP, PCT/US2014/041342, Dec. 15, 2015, 8 pgs.
Energous Corp., ISRWO, PCT/US2014/046941, Nov. 6, 2014, 11 pgs.
Energous Corp., IPRP, PCT/US2014/046941, Jan. 19, 2016, 9 pgs.
Energous Corp., ISRWO, PCT/US2014/062661, Jan. 27, 2015, 12 pgs.
Energous Corp., IPRP, PCT/US2014/062661, May 3, 2016, 10 pgs.
Energous Corp., ISRWO, PCT/US2014/059871, Jan. 23, 2015, 12 pgs.
Energous Corp., IPRP, PCT/US2014/059871, Apr. 12, 2016, 9 pgs.
Energous Corp., ISRWO, PCT/US2014/045102, Oct. 28, 2014, 14 pgs.
Energous Corp., IPRP, PCT/US2014/045102, Jan. 12, 2016, 11 pgs.
Energous Corp., ISRWO, PCT/US2014/059340, Jan. 15, 2015, 13 pgs.
Energous Corp., IPRP, PCT/US2014/059340, Apr. 12, 2016, 11 pgs.
Energous Corp., ISRWO, PCT/US2015/067282, Jul. 5, 2016, 7 pgs.
Energous Corp., IPRP, PCT/US2015/067282, Jul. 4, 2017, 6 pgs.
Energous Corp., ISRWO, PCT/US2014/041558, Oct. 10, 2014, 8 pgs.
Energous Corp., IPRP, PCT/US2014/041558, Dec. 29, 2015, 6 pgs.
Energous Corp., ISRWO, PCT/US2014/045119, Oct. 13, 2014, 11 pgs.
Energous Corp., IPRP, PCT/US2014/045119, Jan. 12, 2016, 9 pgs.
Energous Corp., ISRWO PCT/US2014/045237, Oct. 13, 2014, 16 pgs.
Energous Corp., IPRP , PCT/US2014/045237, Jan. 12, 2016, 12 pgs.
Energous Corp., ISRWO , PCT/US2014/054897, Feb. 17, 2015, 10 pgs.
Energous Corp., IPRP , PCT/US2014/054897, Mar. 15, 2016, 8 pgs.
Energous Corp., ISRWO , PCT/US2015/067334, Mar. 3, 2016, 6 pgs.
Energous Corp., IPRP , PCT/US2015/067334, Jul. 4, 2017, 5 pgs.
Energous Corp., ISRWO , PCT/US2014/047963, Nov. 7, 2014, 13 pgs.
Energous Corp., IPRP , PCT/US2014/047963, Jan. 26, 2016, 10 pgs.
Energous Corp., ISRWO , PCT/US2014/054891, Dec. 18, 2014, 12 pgs.
Energous Corp., IPRP , PCT/US2014/054891, Mar. 15, 2016, 10 pgs.
Energous Corp., ISRWO , PCT/US2014/054953, Dec. 4, 2014, 7 pgs.
Energous Corp., IPRP , PCT/US2014/054953, Mar. 22, 2016, 5 pgs.
Energous Corp., ISRWO , PCT/US2015/067294, Mar. 29, 2016, 7 pgs.
Energous Corp., IPRP , PCT/US2015/067294, Jul. 4, 2017, 6 pgs.
Energous Corp., ISRWO , PCT/US2014/062672 Jan. 26, 2015, 11 pgs.
Energous Corp., IPRP , PCT/US2014/062672 May 10, 2016, 8 pgs.
Energous Corp., ISRWO , PCT/US2016/069313 Nov. 13, 2017, 10 pgs.
Energous Corp., IPRP , PCT/US2016/069313 Jul. 3, 2018, 7 pgs.
Energous Corp., ISRWO , PCT/US2014/044810 Oct. 21, 2014, 12 pgs.
Energous Corp., IPRP , PCT/US2014/044810, Jan. 5, 2016, 10 pgs.
Energous Corp., ISRWO , PCT/US2015/067271, Mar. 11, 2016, 6 pgs.
Energous Corp., IPRP , PCT/US2015/067271, Jul. 4, 2017, 5 pgs.
Energous Corp., ISRWO , PCT/US2014/040648, Oct. 10, 2014, 11 pgs.
Energous Corp., IPRP , PCT/US2014/040648, Dec. 8, 2015, 8 pgs.
Energous Corp., ISRWO , PCT/US2014/049673, Nov. 18, 2014, 10 pgs.
Energous Corp., IPRP , PCT/US2014/049673, Feb. 9, 2016, 6 pgs.
Energous Corp., ISRWO , PCT/US2014/068282, Mar. 19, 2015, 13 pgs.
Energous Corp., IPRP, PCT/US2014/068282, Jun. 7, 2016, 10 pgs.
Energous Corp., ISRWO, PCT/US2014/068586, Mar. 20, 2015, 11 pgs.
Energous Corp., IPRP, PCT/US2014/068586, Jun. 14, 2016, 8 pgs.
Energous Corp., ISRWO, PCT/US2016/068504, Mar. 30, 2017, 8 pgs.
Energous Corp., IPRP, PCT/US2016/068504, Jun. 26, 2018, 5 pgs.
Energous Corp., ISRWO, PCT/US2016/068495, Mar. 30, 2017, 9 pgs.
Energous Corp., IPRP, PCT/US2016/068495, Jun. 26, 2018, 7 pgs.
Energous Corp., ISRWO, PCT/US2015/067287, Feb. 2, 2016, 8 pgs.
Energous Corp., IPRP, PCT/US2015/067287, Jul. 4, 2017, 6 pgs.
Energous Corp., ISRWO, PCT/US2016/068551, Mar. 17, 2017, 8 pgs.
Energous Corp., IPRP, PCT/US2016/068551, Jun. 26, 2018, 6 pgs.
Energous Corp., ISRWO, PCT/US2016/068498, May 17, 2017, 8 pgs.
Energous Corp., IPRP, PCT/US2016/068498, Jun. 26, 2018, 6 pgs.
Energous Corp., ISRWO, PCT/US2016/068993, Mar. 13, 2017, 12 pgs.
Energous Corp., IPRP, PCT/US2016/068993, Jul. 3, 2018, 10 pgs.
Energous Corp., ISRWO, PCT/US2016/068565, Mar. 8, 2017, 11 pgs.
Energous Corp., IPRP, PCT/US2016/068565, Jun. 26, 2018, 9 pgs.
Energous Corp., ISRWO, PCT/US2016/068987, May 8, 2017, 10 pgs.
Energous Corp., IPRP, PCT/US2016/068987, Jul. 3, 2018, 7 pgs.
Energous Corp., ISRWO, PCT/US2016/069316 , Mar. 16, 2017, 15 pgs.
Energous Corp., IPRP, PCT/US2016/069316 , Jul. 3, 2018, 12 pgs.
Energous Corp., ISRWO, PCT/US2018/012806 , Mar. 23, 2018, 9 pgs.
Energous Corp., ISRWO, PCT/US2017/046800, Sep. 11, 2017, 13 pgs.
Energous Corp., IPRP, PCT/US2017/046800, Feb. 12, 2019, 10 pgs.
Energous Corp., ISRWO, PCT/US2017/065886, Apr. 6, 2018, 13 pgs.
Energous Corp., ISRWO, PCT/US2018/031768, Jul. 3, 2018, 9 pgs.
Energous Corp., ISRWO, PCT/US2018/0351082, Dec. 12, 2018, 9 pgs.
Order Granting Reexamination Request Control No. 90013793 Aug. 31, 2016, 23 pgs.
*Ossia Inc.* vs *Energous Corp.*, PGR2016-00023-Institution Decision, Nov. 29, 2016, 29 pgs.
*Ossia Inc.* vs *Energous Corp.*, PGR2016-00024-Institution Decision, Nov. 29, 2016, 50 pgs.
*Ossia Inc.* vs *Energous Corp.*, PGR2016-00024-Judgement-Adverse, Jan. 20, 2017, 3 pgs.
ReExam Ordered Control No. 90013793 Feb. 2, 2017, 8 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.

(56) References Cited

OTHER PUBLICATIONS

*Ossia Inc.* vs *Energous Corp.,* Petition for Post-Grant Review of U.S. Pat. No. 9,124,125, May 31, 2016, 92 pgs.
*Ossia Inc.* vs *Energous Corp.,* Patent Owner Preliminary Response, Sep. 8, 2016, 95 pgs.
*Ossia Inc.* vs *Energous Corp.,* Petition for Post Grant Review of U.S. Pat. No. 9,124,125, May 31, 2016, 86 pgs.
*Ossia Inc.* vs *Energous Corp.,* Declaration of Stephen B. Heppe in Support of Petition for Post-Grant Review of U.S. Pat. No. 9,124,125, PGR2016-00023, May 31, 2016, 144 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.8, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
European Search Report. EP15876036, dated May 3, 2018, 8 pgs.
Supplemental European Search Report. EP15874273.4, dated May 11, 2018, 7 pgs.
Supplemental European Search Report. EP15876033.0, dated Jun. 13, 2018, 10 pgs.
Supplemental European Search Report. EP15876043.9, dated Aug. 8, 2018, 9 pgs.
Extended European Search Report. EP18204043.6, dated Feb. 14, 2019, 5 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334, Oct. 3, 2013.
Zhai, "A Practical wireless charging system based on ultra-wideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.
Li et al. High-Efficiency Switching-Mode Charger System Design Considerations with Dynamic Power Path Management, Mar./Apr. 2012 Issue, 8 pgs.
Energous Corp., IPRP, PCT/US2017/065886, Jun. 18, 2019, 10 pgs.
Energous Corp., IPRP, PCT/US2018/012806 , Jul. 9, 2019, 6 pgs.
Energous Corp., ISRWO, PCT/US2018/025465, Jun. 22, 2018, 9 pgs.
Energous Corp., IPRP, PCT/US2018/025465, Oct. 1, 2019, 8 pgs.
Energous Corp., ISRWO, PCT/US2018/064289, Apr. 25, 2019, 12 pgs.
Energous Corp., IPRP, PCT/US2018/031768, Nov. 12, 2019, 8 pgs.
Energous Corp., ISRWO, PCT/US2018/031786, Aug. 8, 2018, 9 pgs.
Energous Corp., ISRWO, PCT/US2018/039334, Sep. 11, 2018, 9 pgs.
Energous Corp., IPRP, PCT/US2018/039334, Dec. 24, 2019, 8 pgs.
Energous Corp., IPRP, PCT/US2018/051082, Mar. 17, 2020, 9 pgs.
Energous Corp., ISRWO, PCT/US2018/058178, Mar. 13, 2019, 10 pgs.
Energous Corp., IPRP, PCT/US2018/058178, May 5, 2020, 7 pgs.
Energous Corp., ISRWO, PCT/US2019/015820, May 14, 2019, 9 pgs.
Energous Corp., ISRWO, PCT/US2019/021817, Apr. 6, 2019, 11 pgs.
Energous Corp., ISRWO, PCT/US2019/039014, Oct. 4, 2019, 15 pgs.
European Search Report. EP16882597-4, dated Aug. 7, 2019, 9 pgs.
Energous Corp. Supplementary European Search Report, EP 16880153.8, dated Jul. 2, 2019, 9 pgs.
Energous Corp., Supplementary European Search Report. EP17840412.5, dated Jul. 15, 2019, 8 pgs.
Energous Corp., Supplementary European Search Report. EP16880139-7, dated Jul. 12, 2019, 5 pgs.
Energous Corp., Supplementary European Search Report. EP16880158-7, dated Jul. 15, 2019, 5 pgs.
Energous Corp., Supplementary European Search Report. EP16882696-4, dated Jul. 3, 2019, 10 pgs.
Energous Corp., Extended European Search Report. EP17882087-4, dated Sep. 17, 2019, 10 pgs.
Energous Corp., European Search Report. EP19214719-7, dated Jan. 17, 2020, 9 pgs.

* cited by examiner

Figure 55B
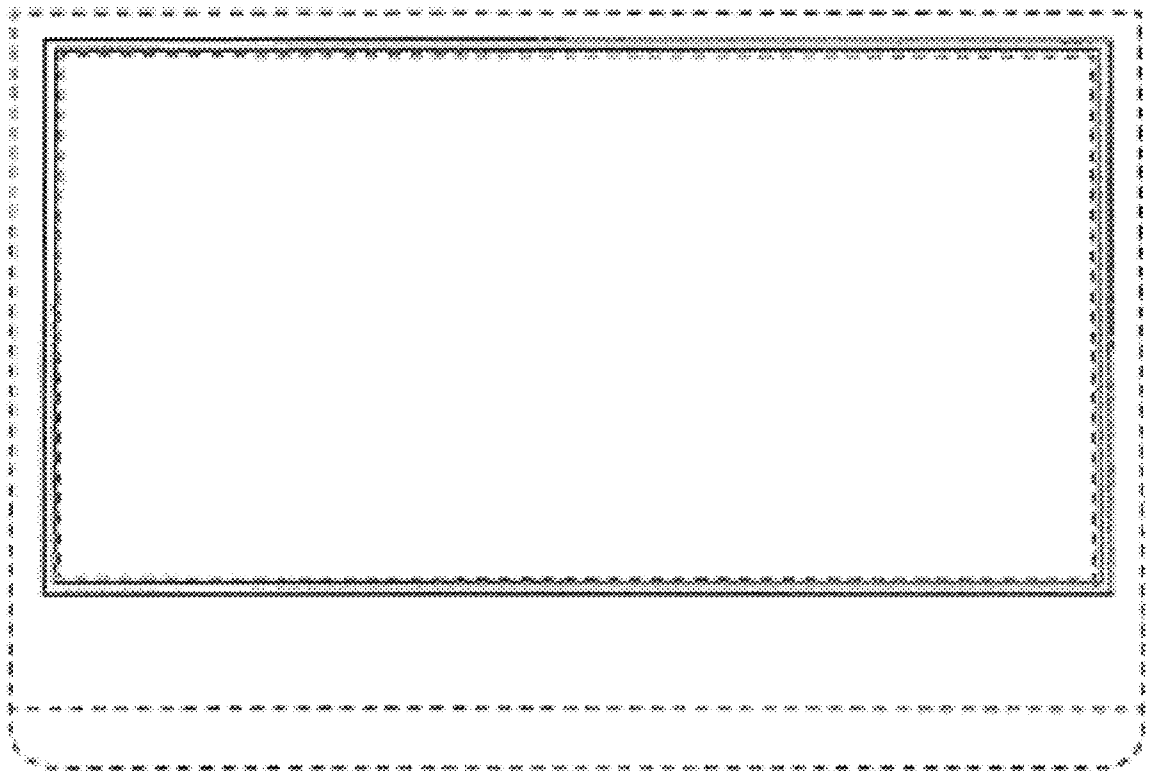
Figure 55C

Figure 56B
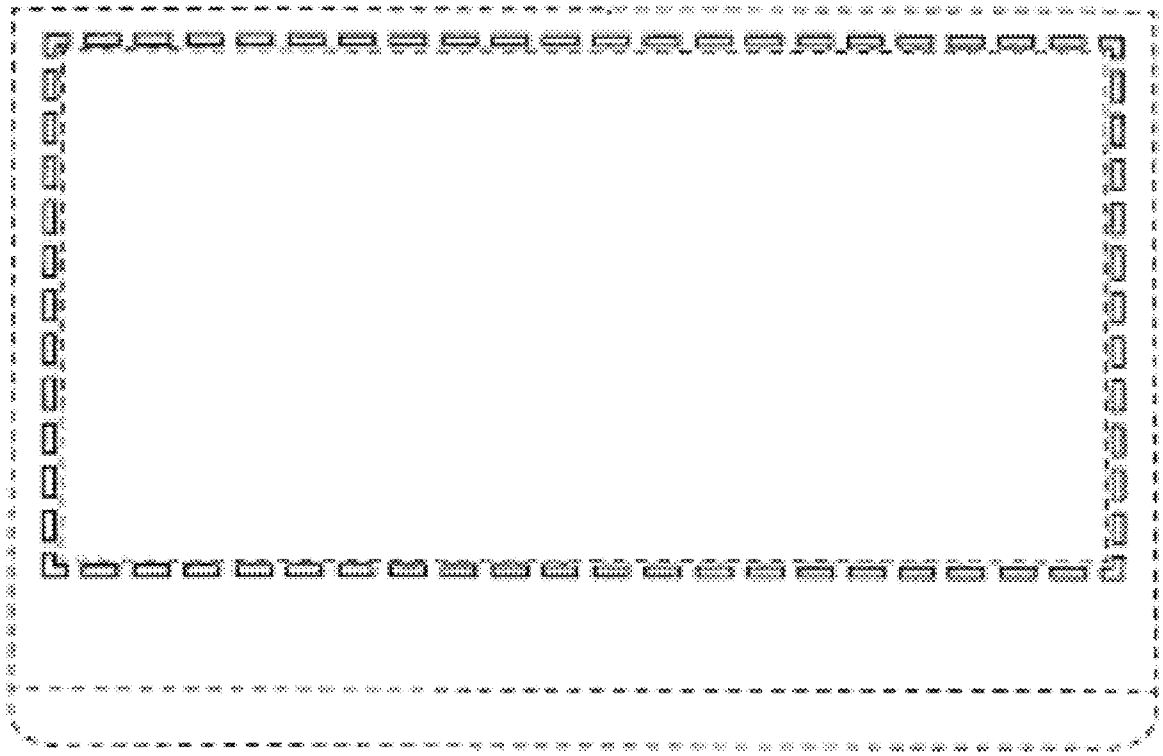
Figure 56C

SYSTEM AND METHODS OF USING ELECTROMAGNETIC WAVES TO WIRELESSLY DELIVER POWER TO ELECTRONIC DEVICES

RELATED APPLICATIONS

This application is a continuation-in-part of U.S. patent application Ser. No. 15/725,236, filed Oct. 4, 2017, which is a continuation-in-part of the following applications: U.S. patent application Ser. No. 13/926,055, filed Jun. 25, 2013; U.S. patent application Ser. No. 14/585,484, filed Dec. 30, 2014, which is a continuation-in-part of U.S. patent application Ser. No. 13/926,055, filed Jun. 25, 2013; U.S. patent application Ser. No. 14/585,506, filed Dec. 30, 2014, which is a continuation-in-part of U.S. patent application Ser. No. 13/926,055, filed Jun. 25, 2013; U.S. patent application Ser. No. 14/585,387, filed Dec. 30, 2014, which is a continuation-in-part of U.S. patent application Ser. No. 13/939,506, filed on Jul. 11, 2013; U.S. patent application Ser. No. 14/585,370, filed Dec. 30, 2014, which is a continuation-in-part of U.S. patent application Ser. No. 13/939,655, filed on Jul. 11, 2013; U.S. patent application Ser. No. 14/732,140, filed Jun. 5, 2015, which is a continuation of U.S. patent application Ser. No. 13/939,655, filed Jul. 11, 2014; U.S. patent application Ser. No. 14/585,324, filed Dec. 30, 2014, which is a continuation-in-part of U.S. patent application Ser. No. 13/946,128, filed on Jul. 19, 2013; U.S. patent application Ser. No. 14/585,362, filed Dec. 30, 2014, which is a continuation-in-part of U.S. patent application Ser. No. 13/950,536, filed on Jul. 25, 2013; U.S. patent application Ser. No. 14/586,137, filed Dec. 30, 2014, which is a continuation-in-part of U.S. patent application Ser. No. 14/026,747, filed on Sep. 13, 2013; U.S. patent application Ser. No. 14/586,266, filed Dec. 30, 2014, which is a continuation-in-part of U.S. patent application Ser. No. 14/026,852, filed on Sep. 13, 2013; U.S. patent application Ser. No. 14/586,539, filed Dec. 30, 2014, which is a continuation-in-part of U.S. patent application Ser. No. 14/027,446, filed on Sep. 16, 2013; U.S. patent application Ser. No. 14/586,603, filed Dec. 30, 2014, which is a continuation-in-part of U.S. patent application Ser. No. 14/027,468, filed on Sep. 16, 2013; U.S. patent application Ser. No. 14/051,054, filed Oct. 10, 2013; U.S. patent application Ser. No. 14/586,160, filed Dec. 30, 2014, which is a continuation-in-part of U.S. patent application Ser. No. 14/051,054, filed Oct. 10, 2013; U.S. patent application Ser. No. 14/585,797, filed Dec. 30, 2014, which claims priority to U.S. Patent Provisional Application No. 61/978,031, filed on Apr. 10, 2014, and is a continuation-in-part of U.S. patent application Ser. No. 14/051,128, filed on Oct. 10, 2013; U.S. patent application Ser. No. 14/585,844, filed Dec. 30, 2014, which claims priority to U.S. Patent Provisional Application No. 61/978,031, filed on Apr. 10, 2014, and is a continuation-in-part of U.S. patent application Ser. No. 14/051,170, filed on Oct. 10, 2013; U.S. patent application Ser. No. 14/069,983, filed Nov. 1, 2013; U.S. patent application Ser. No. 14/586,197, filed Dec. 30, 2014, which is a continuation-in-part of U.S. patent application Ser. No. 14/069,983, filed Nov. 1, 2013; U.S. patent application Ser. No. 14/586,243, filed Dec. 30, 2014, which is a continuation-in-part of U.S. patent application Ser. No. 14/095,358, filed Dec. 3, 2013; U.S. patent application Ser. No. 14/586,370, filed Dec. 30, 2014, which claims priority to U.S. Patent Provisional Application No. 61/978,031, filed on Apr. 10, 2014, and is a continuation-in-part of U.S. patent application Ser. No. 14/103,528, filed on Dec. 11, 2013; U.S. patent application Ser. No. 14/586,400, filed Dec. 30, 2014, which claims priority to U.S. Patent Provisional Application No. 61/978,031, filed on Apr. 10, 2014, and is a continuation-in-part of U.S. patent application Ser. No. 14/104,503, filed on Dec. 12, 2013; U.S. patent application Ser. No. 15/010,127, filed Jan. 29, 2016, which is a continuation of U.S. patent application Ser. No. 14/104,503, filed on Dec. 12, 2013; U.S. patent application Ser. No. 15/181,242, filed Jun. 13, 2016, which is a continuation of U.S. patent application Ser. No. 14/586,448, filed Dec. 30, 2014, which is a continuation-in-part of U.S. patent application Ser. No. 14/330,926, filed on Jul. 14, 2014; U.S. patent application Ser. No. 14/585,585, filed Dec. 30, 2014, which claims priority to U.S. Patent Provisional Application No. 61/978,031, filed on Apr. 10, 2014, and is a continuation-in-part of U.S. patent application Ser. No. 13/950,492, filed on Jul. 25, 2013; U.S. patent application Ser. No. 14/584,752, filed Dec. 29, 2014, which claims priority to U.S. Patent Provisional Application No. 61/978,031, filed on Apr. 10, 2014, and is a continuation-in-part of U.S. patent application Ser. No. 13/950,492, filed on Jul. 25, 2013; U.S. patent application Ser. No. 14/584,800, filed Dec. 29, 2014, which claims priority to U.S. Patent Provisional Application No. 61/978,031, filed on Apr. 10, 2014, and is a continuation-in-part of U.S. patent application Ser. No. 13/950,492, filed on Jul. 25, 2013; U.S. patent application Ser. No. 14/587,294, filed Dec. 31, 2014, which claims priority to U.S. Patent Provisional Application No. 61/978,031, filed on Apr. 10, 2014; U.S. patent application Ser. No. 14/587,308, filed Dec. 31, 2014, which claims priority to U.S. Patent Provisional Application No. 61/978,031, filed on Apr. 10, 2014; and U.S. patent application Ser. No. 14/069,934, filed Nov. 1, 2013. Each of these applications is hereby incorporated by reference in its entirety.

This application is also a continuation-in-part of the following applications: U.S. patent application Ser. No. 15/872,888, filed Jan. 16, 2018, which is a continuation of U.S. patent application Ser. No. 14/584,743, filed Dec. 29, 2014, which is a continuation-in-part of U.S. patent application Ser. No. 13/932,166, filed on Jul. 1, 2013; U.S. patent application Ser. No. 14/585,432, filed Dec. 30, 2014, which is a continuation-in-part of U.S. patent application Ser. No. 13/916,233, filed Jun. 12, 2013; U.S. patent application Ser. No. 15/729,574, filed Oct. 10, 2017, which is a continuation of U.S. patent application Ser. No. 14/584,375, filed Dec. 29, 2014, which is a continuation-in-part of U.S. patent application Ser. No. 13/960,522, filed Aug. 6, 2013; U.S. patent application Ser. No. 14/585,291, filed Dec. 30, 2014, which is a continuation-in-part of U.S. patent application Ser. No. 14/286,129, filed May 23, 2014; U.S. patent application Ser. No. 14/683,437, filed Apr. 10, 2015, which is a continuation of U.S. patent application Ser. No. 14/584,869, filed Dec. 29, 2014, which is a continuation-in-part of U.S. patent application Ser. No. 14/272,207, filed May 7, 2014, which claims priority to U.S. Patent Provisional Application No. 61/978,031, filed on Apr. 10, 2014; U.S. patent application Ser. No. 14/587,027, filed Dec. 31, 2014, which is a continuation of U.S. patent application Ser. No. 14/584,869, filed Dec. 29, 2014, and is a continuation-in-part of U.S. patent application Ser. No. 14/272,207, filed May 7, 2014, U.S. patent application Ser. No. 14/272,287, filed May 7, 2014, U.S. patent application Ser. No. 14/272,280, filed May 7, 2014, and U.S. patent application Ser. No. 14/272,247, filed May 7, 2014; U.S. patent application Ser. No. 15/806,266, filed Nov. 7, 2017, which is a continuation of U.S. patent application Ser. No. 14/585,341, filed Dec. 30, 2014, which is a continuation-in-part of U.S. patent application Ser. No. 13/939,706, filed Jul. 11, 2013; U.S. patent application Ser. No. 14/585, 574, filed Dec. 30, 2014, which is a continuation-in-part of U.S. patent application Ser. No. 14/286,289, filed May 23, 2014; U.S. patent application Ser. No. 14/585,660, filed Dec. 30, 2014, which is a continuation-in-part of U.S. patent application Ser. No. 14/330,936, filed Jul. 14, 2014; U.S. patent application Ser. No. 14/465,487, filed Aug. 21, 2014; U.S. patent application Ser. No. 14/585,727, filed Dec. 30, 2014, which is a continuation-in-part of U.S. patent application Ser. No. 14/465,508, filed Aug. 21, 2014; U.S. patent application Ser. No. 14/585,388, filed Dec. 30, 2014, which is a continuation-in-part of U.S. patent application Ser. No. 13/960,488, filed Aug. 6, 2013; U.S. patent application Ser. No. 14/585,633, filed Dec. 30, 2014, which is a continuation-in-part of U.S. patent application Ser. No. 14/330,931, filed Jul. 14, 2014; U.S. patent application Ser. No. 14/587,025, filed Dec. 31, 2014, which is a continuation-in-part of U.S. patent application Ser. No. 14/330,931, filed Jul. 14, 2014 and U.S. patent application Ser. No. 14/330,036, filed Jul. 14, 2014; and U.S. patent application Ser. No. 14/803,672, filed Jul. 20, 2015, which is a continuation of U.S. patent application Ser. No. 13/926,020, filed Jun. 25, 2013, which claims priority to U.S. Patent Provisional Application No. 61/720,798, filed on Oct. 31, 2012, U.S. Patent Provisional Application No. 61/677,706, filed on Jul. 31, 2012, and U.S. Patent Provisional Application No. 61/668,799, filed on Jul. 6, 2012. Each of these applications is hereby incorporated by reference in its entirety.

This application is also a continuation-in-part of U.S. patent application Ser. No. 15/839,774, filed Dec. 12, 2017, which is a continuation of U.S. patent application Ser. No. 14/747,946, filed on Jun. 23, 2015, which is a continuation of U.S. patent application Ser. No. 14/586,314, filed on Dec. 30, 2014, which is a continuation-in-part of U.S. patent application Ser. No. 13/908,839, filed on Jun. 3, 2013, and U.S. patent application Ser. No. 14/586,314, filed Dec. 30, 2014, which is a continuation-in-part of:

- U.S. patent application Ser. No. 13/891,399, filed May 10, 2013, which claims priority to U.S. Patent Application Ser. No. 61/720,798, filed Oct. 31, 2012, U.S. Patent Application Ser. No. 61/677,706, filed Jul. 31, 2012, and U.S. Patent Application Ser. No. 61/668,799, filed Jul. 6, 2012;
- U.S. patent application Ser. No. 13/891,430, filed May 10, 2013, which claims priority to U.S. Patent Application Ser. No. 61/720,798, filed Oct. 31, 2012, U.S. Patent Application Ser. No. 61/677,706, filed Jul. 31, 2012, and U.S. Patent Application Ser. No. 61/668,799, filed Jul. 6, 2012; and
- U.S. patent application Ser. No. 13/891,445, filed May 10, 2013, which claims priority to U.S. Patent Application Ser. No. 61/720,798, filed Oct. 31, 2012, U.S. Patent Application Ser. No. 61/677,706, filed Jul. 31, 2012, U.S. Patent Application Ser. No. 61/668,799, filed Jul. 6, 2012, each of these applications is hereby incorporated by reference in its entirety.

This application is also a continuation-in-part of U.S. patent application Ser. No. 15/884,303, filed Jan. 30, 2018, which is a continuation of:

- U.S. patent application Ser. No. 14/748,101, filed on Jun. 23, 2015, which is a continuation of U.S. patent application Ser. No. 14/585,271, filed on Dec. 30, 2014, which is a continuation-in-part of U.S. Non-Provisional patent application Ser. No. 14/337,002, filed Jul. 21, 2014; and
- U.S. patent application Ser. No. 14/587,025, filed on Dec. 31, 2014, which is a continuation-in-part of U.S. patent application Ser. No. 14/330,931, filed on Jul. 14, 2014; and is also a continuation of U.S. patent application Ser. No. 14/330,036, filed on Jul. 14, 2014, each of these applications is hereby incorporated by reference in its entirety.

This application is also a continuation-in-part of U.S. patent application Ser. No. 15/900,727, filed Feb. 20, 2018, which is a continuation of:

- U.S. patent application Ser. No. 14/748,116, filed on Jun. 23, 2015, which is a continuation of U.S. patent application Ser. No. 14/585,986, filed on Dec. 30, 2014, which is a continuation-in-part of U.S. patent application Ser. No. 14/465,553, filed Aug. 21, 2014; and
- U.S. patent application Ser. No. 14/585,923, file Dec. 30, 2014, which is a continuation-in-part of U.S. patent application Ser. No. 14/465,545, filed Aug. 21, 2014, each of these applications is hereby incorporated by reference in its entirety.

TECHNICAL FIELD

The disclosed embodiments relate generally to wireless power transmission systems and, in particular, to wireless power transmitters, wireless power receivers, and other devices that are used in wireless power transmission systems to wirelessly deliver power to an electronic device.

BACKGROUND

Portable electronic devices, such as laptop computers, mobile phones, tablets, and other electronic devices, require frequent charging of a power-storing component (e.g., a battery) to operate. Many electronic devices require charging one or more times per day. Often, charging an electronic device requires manually connecting an electronic device to an outlet or other power source using a wired charging cable. In some cases, the power-storing component is removed from an electronic device and inserted into charging equipment. Accordingly, charging is time consuming, burdensome, and inefficient because users must carry around multiple charging cables and/or other charging devices, and frequently must locate appropriate power sources to charge their electronic devices. Additionally, conventional charging techniques potentially deprive a user of the ability to use the device while it is charging, and/or require the user to remain next to a wall outlet or other power source to which their electronic device or other charging equipment is connected.

Some other conventional charging systems utilize inductive coils to generate a magnetic field that is used to charge a device. However, such inductive coupling has a limited short range, such as a few inches or less. Users typically must place the device at a specific position on a charging pad and are unable to move the device to different positions on the pad, without interrupting or terminating the charging of the device. This results in a frustrating experience for many users as they may be unable to locate the device at the exact right position on the pad to start charging their device.

SUMMARY

There is a need for systems and methods for wirelessly delivering power to electronic devices that address the drawbacks of conventional systems discussed above. In some embodiments, a method of wirelessly transmitting power is provided. The method includes: (i) receiving, by a communications radio of a wireless power transmitter, a communication signal from a communications radio of a wireless power receiver, the communication signal including data used to determine a location of the wireless power receiver, and (ii) determining, by a processor of the wireless power transmitter, a location of the wireless power receiver based, at least in part, on the data included in the communication signal. The method further includes, in response to determining that the location of the wireless power receiver is within a wireless power transmission range defined by the transmitter, transmitting, by antennas of the wireless power transmitter, radio frequency (RF) power transmission waves towards the wireless power receiver, the RF power transmission waves converging to form controlled constructive interference patterns and destructive interference patterns in proximity to the location of the wireless power receiver, and the destructive interference patterns form a null space that surrounds the controlled constructive interference patterns and the controlled constructive interference patterns are received by an antenna of the wireless power receiver.

In accordance with some implementations, a wireless power transmitter includes one or more processors/cores, memory, and one or more programs; the one or more programs are stored in the memory and configured to be executed by the one or more processors/cores and the one or more programs include instructions for performing the operations of the method described above (and/or any of the other methods described in more detail below). In accordance with some implementations, a computer-readable storage medium has stored therein instructions which when executed by one or more processors/cores of a wireless power transmitter, cause the wireless power transmitter to perform the operations of the method described above (and/or any of the other methods described in more detail below).

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 55A-55E illustrate various views of a laptop display with a transmitter antenna having a continuous closed shape on a frontal face of the laptop display, in accordance with some embodiments.

FIGS. 56A-56E illustrate various views of a laptop display with a plurality of transmitter antennas positioned in a segmented closed shape on a frontal face of the laptop display, in accordance with some embodiments.

Figure 1:
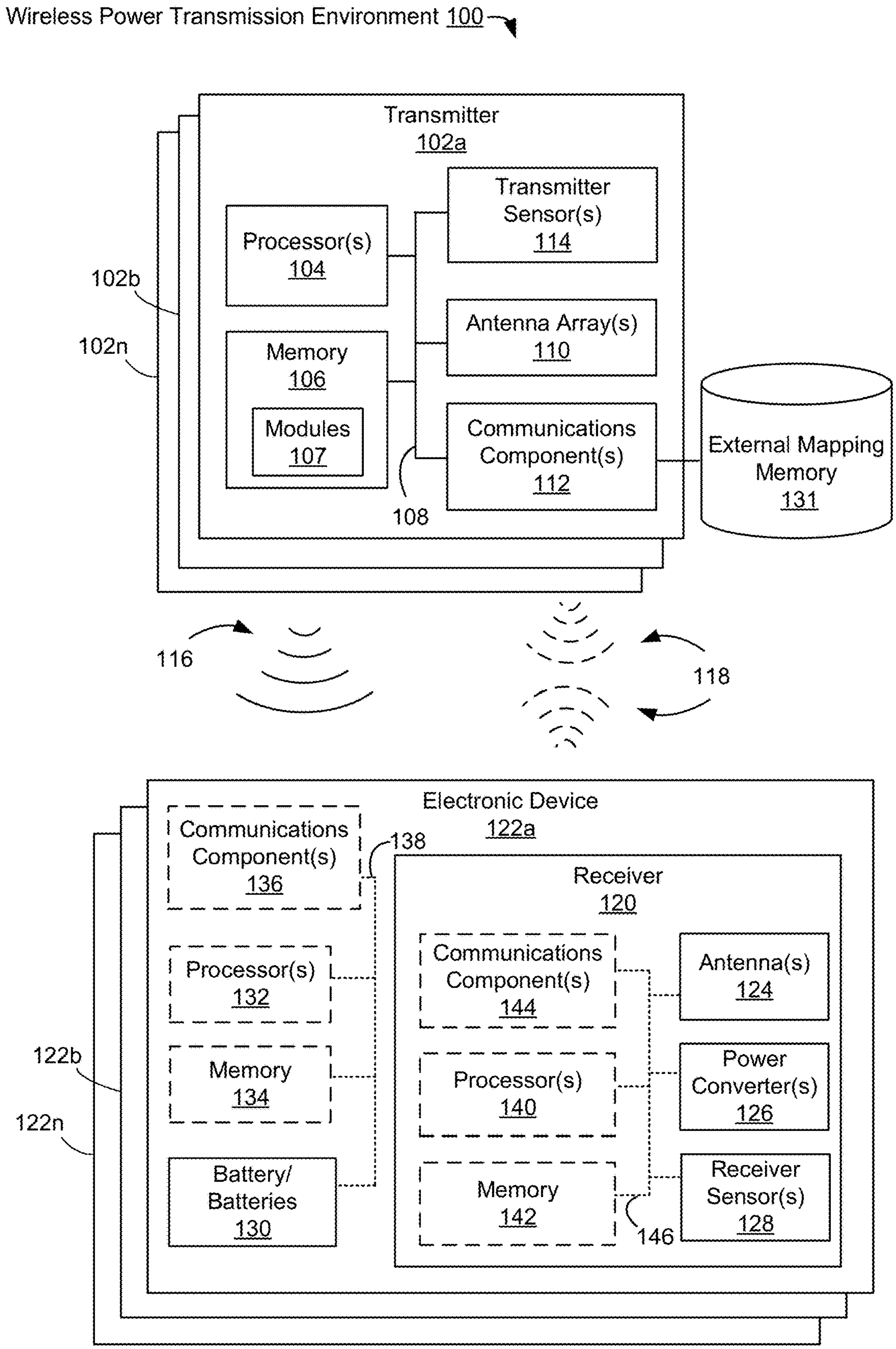
FIG. 1 is a block diagram showing components of a wireless power transmission system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

FIG. 1 is a block diagram of components of wireless power transmission environment 100, in accordance with some embodiments. Wireless power transmission environment 100 includes, for example, transmitters 102 (e.g., transmitters 102*a*, 102*b* . . . 102*n*) and one or more receivers 120 (e.g., receivers 120*a*, 120*b* . . . 120*n*). In some embodiments, each respective wireless power transmission environment 100 includes a number of receivers 120, each of which is associated with a respective electronic device 122.

An example transmitter 102 (e.g., transmitter 102*a*) includes, for example, one or more processor(s) 104, a memory 106, one or more antenna arrays 110, one or more communications components 112 (also referred to herein as a communications radio), and/or one or more transmitter sensors 114. In some embodiments, these components are interconnected by way of a communications bus 108. References to these components of transmitters 102 cover embodiments in which one or more of these components (and combinations thereof) are included.

In some embodiments, the memory 106 stores one or more programs (e.g., sets of instructions) and/or data structures, collectively referred to as "modules 107" herein. In some embodiments, the memory 106, or the non-transitory computer readable storage medium of the memory 106 stores the following programs, modules, and data structures, or a subset or superset thereof:

- information received from receiver 120 (e.g., generated by receiver sensor 128 and then transmitted to the transmitter 102*a*);
- information received from transmitter sensor 114;
- an adaptive pocket-forming module that adjusts one or more power waves transmitted by one or more transmitters 102; and/or
- a beacon transmitting module that transmits a communication signal 118 for detecting a receiver 120 (e.g., within a transmission field of the transmitter 102).

The above-identified modules (e.g., data structures and/or programs including sets of instructions) need not be implemented as separate software programs, procedures, or modules, and thus various subsets of these modules may be combined or otherwise re-arranged in various embodiments. In some embodiments, the memory 106 stores a subset of the modules identified above. In some embodiments, an external mapping memory 132 that is communicatively connected to communications component 112 stores one or more modules identified above. Furthermore, the memory 106 and/or external mapping memory 132 may store additional modules not described above. In some embodiments, the modules stored in the memory 106, or a non-transitory computer readable storage medium of memory 106, provide instructions for implementing respective operations in the methods described below. In some embodiments, some or all of these modules may be implemented with specialized hardware circuits that subsume part or all of the module functionality. One or more of the above-identified elements may be executed by one or more of processor(s) 104. In some embodiments, one or more of the modules described with regard to the memory 106 is implemented on the memory 104 of a server (not shown) that is communicatively coupled to one or more transmitters 102 and/or by a memory of electronic device 122 and/or receiver 120.

In some embodiments, a single processor 104 (e.g., processor 104 of transmitter 102*a*) executes software modules for controlling multiple transmitters 102 (e.g., transmitters 102*b* . . . 102*n*). In some embodiments, a single transmitter 102 (e.g., transmitter 102*a*) includes multiple processors 104, such as one or more transmitter processors (configured to, e.g., control transmission of signals 116 by antenna array 110), one or more communications component processors (configured to, e.g., control communications transmitted by communications component 112 and/or receive communications by way of communications component 112) and/or one or more sensor processors (configured to, e.g., control operation of transmitter sensor 114 and/or receive output from transmitter sensor 114).

Wireless power receiver 120 (also referred to as a receiver 120, e.g., a receiver of electronic device 122) receives power transmission signals 116 and/or communications 118 transmitted by transmitters 102. In some embodiments, receiver 120 includes one or more antennas 124 (e.g., an antenna array including multiple antenna elements), power converter 126, receiver sensor 128, and/or other components or circuitry (e.g., processor(s) 140, memory 142, and/or communication component(s) 144). In some embodiments, these components are interconnected by way of a communications bus 146. References to these components of receiver 120 cover embodiments in which one or more of these components (and combinations thereof) are included.

Receiver 120 converts energy from received signals 116 (also referred to herein as RF power transmission signals, or simply, RF signals, RF waves, power waves, or power transmission signals) into electrical energy to power and/or charge electronic device 122. For example, receiver 120 uses power converter 126 to convert captured energy from power waves 116 to alternating current (AC) electricity or direct current (DC) electricity usable to power and/or charge electronic device 122. Non-limiting examples of power converter 126 include rectifiers, rectifying circuits, voltage conditioners, among suitable circuitry and devices.

In some embodiments, receiver 120 is a standalone device that is detachably coupled to one or more electronic devices 122. For example, electronic device 122 has processor(s) 132 for controlling one or more functions of electronic device 122, and receiver 120 has processor(s) 140 for controlling one or more functions of receiver 120.

In some embodiments, receiver 120 is a component of electronic device 122. For example, processor(s) 132 controls functions of electronic device 122 and receiver 120. In addition, in some embodiments, receiver 120 includes processor(s) 140, which communicate(s) with processor(s) 132 of the electronic device 122.

In some embodiments, electronic device 122 includes processor(s) 132, memory 134, communication component(s) 136, and/or battery/batteries 130. In some embodiments, these components are interconnected by way of a communications bus 138. In some embodiments, communications between electronic device 122 and receiver 120 occur via communications component(s) 136 and/or 144. In some embodiments, communications between electronic device 122 and receiver 120 occur via a wired connection between communications bus 138 and communications bus 146. In some embodiments, electronic device 122 and receiver 120 share a single communications bus.

In some embodiments, receiver 120 receives one or more power waves 116 directly from transmitter 102 (e.g., via one or more antennas 124). In some embodiments, receiver 120 harvests power waves from one or more pockets of energy created by one or more power waves 116 transmitted by transmitter 102. In some embodiments, the transmitter 102 is a near-field transmitter that transmits the one or more power waves 116 within a near-field distance (e.g., less than approximately six inches away from the transmitter 102). In some embodiments, the transmitter 102 is a far-field transmitter that transmits the one or more power waves 116 within a far-field distance (e.g., more than approximately six inches to approximately fifteen feet or more away from the transmitter 102).

In some embodiments, after the power waves 116 are received and/or energy is harvested from a pocket of energy, circuitry (e.g., integrated circuits, amplifiers, rectifiers, and/or voltage conditioner) of the receiver 120 converts the energy of the power waves (e.g., radio frequency electromagnetic radiation) to usable power (i.e., electricity), which powers electronic device 122 and/or is stored to battery 130 of electronic device 122. In some embodiments, a rectifying circuit of the receiver 120 translates the electrical energy from AC to DC for use by electronic device 122. In some embodiments, a voltage conditioning circuit increases or decreases the voltage of the electrical energy as required by the electronic device 122. In some embodiments, an electrical relay conveys electrical energy from the receiver 120 to the electronic device 122.

In some embodiments, electronic device 122 obtains power from multiple transmitters 102 and/or using multiple receivers 120. In some embodiments, the wireless power transmission environment 100 includes a plurality of electronic devices 122, each having at least one respective receiver 120 that is used to harvest power waves from the transmitters 102 into usable power for charging the electronic devices 122.

In some embodiments, the one or more transmitters 102 adjust one or more characteristics (e.g., waveform characteristics, such as phase, gain, direction, amplitude, polarization, and/or frequency) of power waves 116. For example, a transmitter 102 selects a subset of one or more antenna elements of antenna array 110 to initiate transmission of power waves 116, cease transmission of power waves 116, and/or adjust one or more characteristics used to transmit power waves 116. In some embodiments, the one or more transmitters 102 adjust power waves 116 such that trajectories of power waves 116 converge at a predetermined location within a transmission field (e.g., a location or region in space), resulting in controlled constructive or destructive interference patterns. The transmitter 102 may adjust sets of characteristics for transmitting the power waves 116 to account for changes at the wireless power receiver that may negatively impact transmission of the power waves 116.

In some embodiments, respective antenna arrays 110 of the one or more transmitters 102 may include antennas having one or more polarizations. For example, a respective antenna array 110 may include vertical or horizontal polarization, right hand or left hand circular polarization, elliptical polarization, or other polarizations, as well as any number of polarization combinations. In some embodiments, antenna array 110 is capable of dynamically varying the antenna polarization (or any other characteristic) to optimize wireless power transmission.

In some embodiments, respective antenna arrays 110 of the one or more transmitters 102 may include a set of one or more antennas configured to transmit the power waves 116 into respective transmission fields of the one or more transmitters 102. Integrated circuits (not shown) of the respective transmitter 102, such as a controller circuit (e.g., a radio frequency integrated circuit (RFIC)) and/or waveform generator, may control the behavior of the antennas. For example, based on the information received from the receiver by way of the communication signal 118, a controller circuit (e.g., processor 104 of the transmitter 102, FIG. 1) may determine a set of one or more waveform characteristics (e.g., amplitude, frequency, trajectory, direction, phase, polarization, among other characteristics) used for transmitting the power waves 116 that would effectively provide power to the receiver 120 and electronic device 122. The controller circuit may also identify a subset of antennas from the antenna arrays 110 that would be effective in transmitting the power waves 116. In some embodiments, a waveform generator circuit (not shown in FIG. 1) of the respective transmitter 102 coupled to the processor 104 may convert energy and generate the power waves 116 having the waveform characteristics identified by the processor 104/controller circuit, and then provide the power waves to the antenna arrays 110 for transmission.

In some embodiments, constructive interference of power waves occurs when two or more power waves 116 (e.g., RF power transmission signals) are in phase with each other and converge into a combined wave such that an amplitude of the combined wave is greater than amplitude of a single one of the power waves. For example, the positive and negative peaks of sinusoidal waveforms arriving at a location from multiple antennas "add together" to create larger positive and negative peaks. In some embodiments, a pocket of energy is formed at a location in a transmission field where constructive interference of power waves occurs.

In some embodiments, destructive interference of power waves occurs when two or more power waves are out of phase and converge into a combined wave such that the amplitude of the combined wave is less than the amplitude of a single one of the power waves. For example, the power waves "cancel each other out," thereby diminishing the amount of energy concentrated at a location in the transmission field. In some embodiments, destructive interference is used to generate a negligible amount of energy or "null" at a location within the transmission field where the power waves converge.

In some embodiments, the one or more transmitters 102 transmit power waves 116 that create two or more discrete transmission fields (e.g., overlapping and/or non-overlapping discrete transmission fields). In some embodiments, a first transmission field (i.e., an area of physical space into which a first set of power waves is transmitted) is managed by a first processor 104 of a first transmitter (e.g., transmitter 102*a*) and a second transmission field (i.e., another area of physical space into which a second set of power waves is transmitted) is managed by a second processor 104 of a second transmitter (e.g., transmitter 102*b*). In some embodiments, the two or more discrete transmission fields (e.g., overlapping and/or non-overlapping) are managed by the transmitter processors 104 as a single transmission field. Moreover, in some embodiments, a single processor 104 manages the first and second transmission fields.

In some embodiments, communications component 112 transmits communication signals 118 by way of a wired and/or wireless communication connection to receiver 120. In some embodiments, communications component 112 generates communication signals 118 used for triangulation of receiver 120. In some embodiments, communication signals 118 are used to convey information between transmitter 102 and receiver 120 for adjusting one or more characteristics used to transmit the power waves 116. In some embodiments, communication signals 118 include information related to status, efficiency, user data, power consumption, billing, geo-location, and other types of information.

In some embodiments, communications component 112 transmits communication signals 118 to receiver 120 by way of the electronic device 122*a*. For example, communications component 112 may convey information to communications component 136 of the electronic device 122*a*, which the electronic device 122*a* may in turn convey to the receiver 120 (e.g., via bus 138).

In some embodiments, communications component 112 includes a communications component antenna for communicating with receiver 120 and/or other transmitters 102 (e.g., transmitters 102*b* through 102*n*). In some embodiments, these communication signals 118 are sent using a first channel (e.g., a first frequency band) that is independent and distinct from a second channel (e.g., a second frequency band distinct from the first frequency band) used for transmission of the power waves 116.

In some embodiments, the receiver 120 includes a receiver-side communications component 144 (also referred to herein as a communications radio) configured to communicate various types of data with one or more of the transmitters 102, through a respective communication signal 118 generated by the receiver-side communications component (in some embodiments, a respective communication signal 118 is referred to as an advertising signal). The data may include location indicators for the receiver 120 and/or electronic device 122, a power status of the device 122, status information for the receiver 120, status information for the electronic device 122, status information about the power waves 116, and/or status information for pockets of energy. In other words, the receiver 120 may provide data to the transmitter 102, by way of the communication signal 118, regarding the current operation of the system 100, including: information identifying a present location of the receiver 120 or the device 122, an amount of energy (i.e., usable power) received by the receiver 120, and an amount of usable power received and/or used by the electronic device 122, among other possible data points containing other types of information.

In some embodiments, the data contained within communication signals 118 is used by electronic device 122, receiver 120, and/or transmitters 102 for determining adjustments of the one or more characteristics used by the antenna array 110 to transmit the power waves 116. Using a communication signal 118, the transmitter 102 communicates data that is used, e.g., to identify receivers 120 within a transmission field, identify electronic devices 122, determine safe and effective waveform characteristics for power waves, and/or hone the placement of pockets of energy. In some embodiments, receiver 120 uses a communication signal 118 to communicate data for, e.g., alerting transmitters 102 that the receiver 120 has entered or is about to enter a transmission field, provide information about electronic device 122, provide user information that corresponds to electronic device 122, indicate the effectiveness of received power waves 116, and/or provide updated characteristics or transmission parameters that the one or more transmitters 102 use to adjust transmission of the power waves 116.

In some embodiments, transmitter sensor 114 and/or receiver sensor 128 detect and/or identify conditions of electronic device 122, receiver 120, transmitter 102, and/or a transmission field. In some embodiments, data generated by transmitter sensor 114 and/or receiver sensor 128 is used by transmitter 102 to determine appropriate adjustments to the one or more characteristics used to transmit the power waves 106. Data from transmitter sensor 114 and/or receiver sensor 128 received by transmitter 102 includes, e.g., raw sensor data and/or sensor data processed by a processor 104, such as a sensor processor. Processed sensor data includes, e.g., determinations based upon sensor data output. In some embodiments, sensor data received from sensors that are external to the receiver 120 and the transmitters 102 is also used (such as thermal imaging data, information from optical sensors, and others).

In some embodiments, receiver sensor 128 is a gyroscope that provides raw data such as orientation data (e.g., tri-axial orientation data), and processing this raw data may include determining a location of receiver 120 and/or or a location of receiver antenna 124 using the orientation data.

In some embodiments, receiver sensor 128 includes one or more infrared sensors (e.g., that output thermal imaging information), and processing this infrared sensor data includes identifying a person (e.g., indicating presence of the person and/or indicating an identification of the person) or other sensitive object based upon the thermal imaging information.

In some embodiments, receiver sensor 128 includes a gyroscope and/or an accelerometer that indicates an orientation of receiver 120 and/or electronic device 122. As one example, transmitters 102 receive orientation information from receiver sensor 128 and the transmitters 102 (or a component thereof, such as the processor 104) use the received orientation information to determine whether electronic device 122 is flat on a table, in motion, and/or in use (e.g., next to a user's head).

In some embodiments, receiver sensor 128 is a sensor of electronic device 122 (e.g., an electronic device 122 that is remote from receiver 120). In some embodiments, receiver 120 and/or electronic device 122 includes a communication system for transmitting signals (e.g., sensor signals output by receiver sensor 128) to transmitter 102.

Non-limiting examples of transmitter sensor 114 and/or receiver sensor 128 include, e.g., infrared, pyroelectric, ultrasonic, laser, optical, Doppler, gyro, accelerometer, microwave, millimeter, RF standing-wave sensors, resonant LC sensors, capacitive sensors, and/or inductive sensors. In some embodiments, technologies for transmitter sensor 114 and/or receiver sensor 128 include binary sensors that acquire stereoscopic sensor data, such as the location of a human or other sensitive object.

In some embodiments, transmitter sensor 114 and/or receiver sensor 128 is configured for human recognition (e.g., capable of distinguishing between a person and other objects, such as furniture). Examples of sensor data output by human recognition-enabled sensors include: body temperature data, infrared range-finder data, motion data, activity recognition data, silhouette detection and recognition data, gesture data, heart rate data, portable devices data, and wearable device data (e.g., biometric readings and output, accelerometer data).

In some embodiments, transmitters 102 adjust one or more characteristics used to transmit the power waves 116 to ensure compliance with electromagnetic field (EMF) exposure protection standards for human subjects. Maximum exposure limits are defined by US and European standards in terms of power density limits and electric field limits (as well as magnetic field limits). These include, for example, limits established by the Federal Communications Commission (FCC) for maximum permissible exposure (MPE), and limits established by European regulators for radiation exposure. Limits established by the FCC for MPE are codified at 47 C.F.R. § 1.1310. For electromagnetic field (EMF) frequencies in the microwave range, power density can be used to express an intensity of exposure. Power density is defined as power per unit area. For example, power density can be commonly expressed in terms of watts per square meter ($W/m^2$), milliwatts per square centimeter ($mW/cm^2$), or microwatts per square centimeter ($\mu W/cm^2$). In some embodiments, output from transmitter sensor 114 and/or receiver sensor 128 is used by transmitter 102 to detect whether a person or other sensitive object enters a power transmission region (e.g., a location within a predetermined distance of a transmitter 102, power waves generated by transmitter 102, and/or a pocket of energy). In some embodiments, in response to detecting that a person or other sensitive object has entered the power transmission region, the transmitter 102 adjusts one or more power waves 116 (e.g., by ceasing power wave transmission, reducing power wave transmission, and/or adjusting the one or more characteristics of the power waves). In some embodiments, in response to detecting that a person or other sensitive object has entered the power transmission region, the transmitter 102 activates an alarm (e.g., by transmitting a signal to a loudspeaker that is a component of transmitter 102 or to an alarm device that is remote from transmitter 102). In some embodiments, in response to detecting that a person or other sensitive object has entered a power transmission region, the transmitter 102 transmits a digital message to a system log or administrative computing device. These techniques for ensuring compliance with EMF exposure standards.

In some embodiments, antenna array 110 includes multiple antenna elements (e.g., configurable "tiles") collectively forming an antenna array. Antenna array 110 generates power transmission signals, e.g., RF power waves, ultrasonic power waves, infrared power waves, and/or magnetic resonance power waves. In some embodiments, the antennas of an antenna array 110 (e.g., of a single transmitter, such as transmitter 102*a*, and/or of multiple transmitters, such as transmitters 102*a*, 102*b*, . . . , 102*n*) transmit two or more power waves that intersect at a defined location (e.g., a location corresponding to a detected location of a receiver 120), thereby forming a pocket of energy (e.g., a concentration of energy) at the defined location.

In some embodiments, transmitter 102 assigns a first task to a first subset of antenna elements of antenna array 110, a second task to a second subset of antenna elements of antenna array 110, and so on, such that the constituent antennas of antenna array 110 perform different tasks (e.g., determining locations of previously undetected receivers 120 and/or transmitting power waves 116 to one or more receivers 120). As one example, in an antenna array 110 with ten antennas, nine antennas transmit power waves 116 that form a pocket of energy and the tenth antenna operates in conjunction with communications component 112 to identify new receivers in the transmission field. In another example, an antenna array 110 having ten antenna elements is split into two groups of five antenna elements, each of which transmits power waves 116 to two different receivers 120 in the transmission field.

Figure 4A:
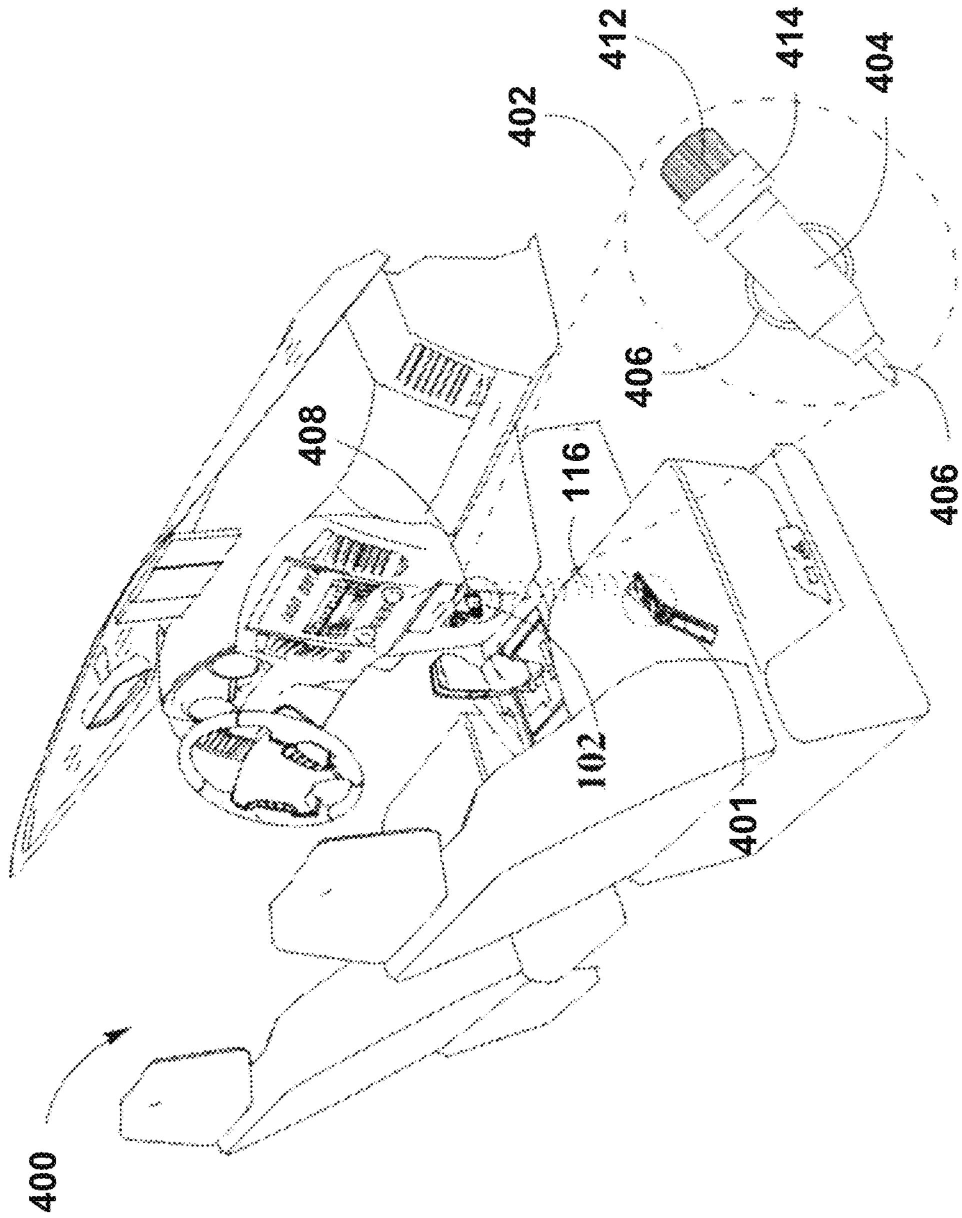
FIG. 4A illustrates a wireless power transmission system used for charging or powering one or more electronic devices inside a vehicle, in accordance with some embodiments.
Figure 4B:
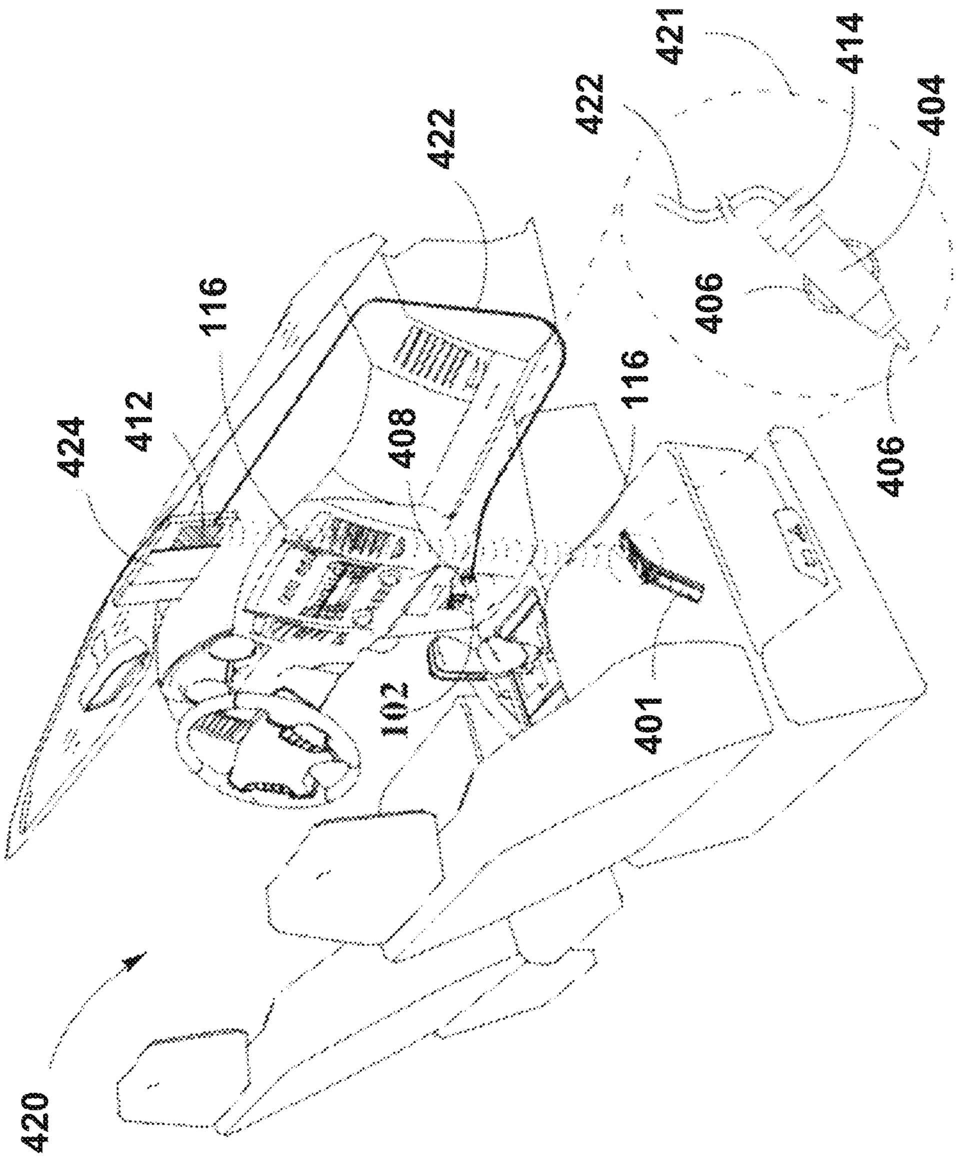
FIG. 4B illustrates a wireless power transmission system used for charging or powering one or more electronic devices inside a vehicle, in accordance with some embodiments.
Figure 4C:
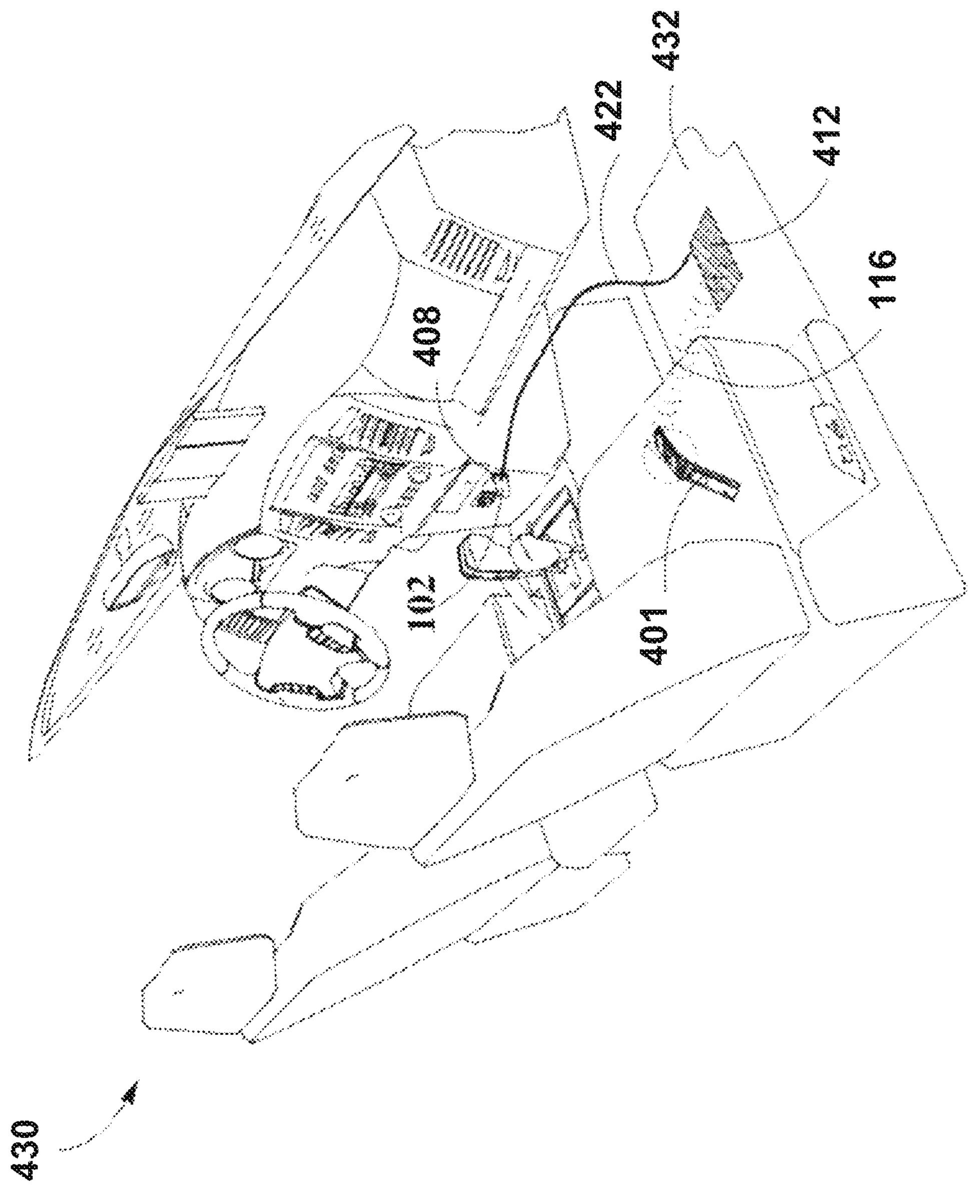
FIG. 4C illustrates a wireless power transmission system used for charging or powering one or more electronic devices inside a vehicle, in accordance with some embodiments.
Figure 6A:
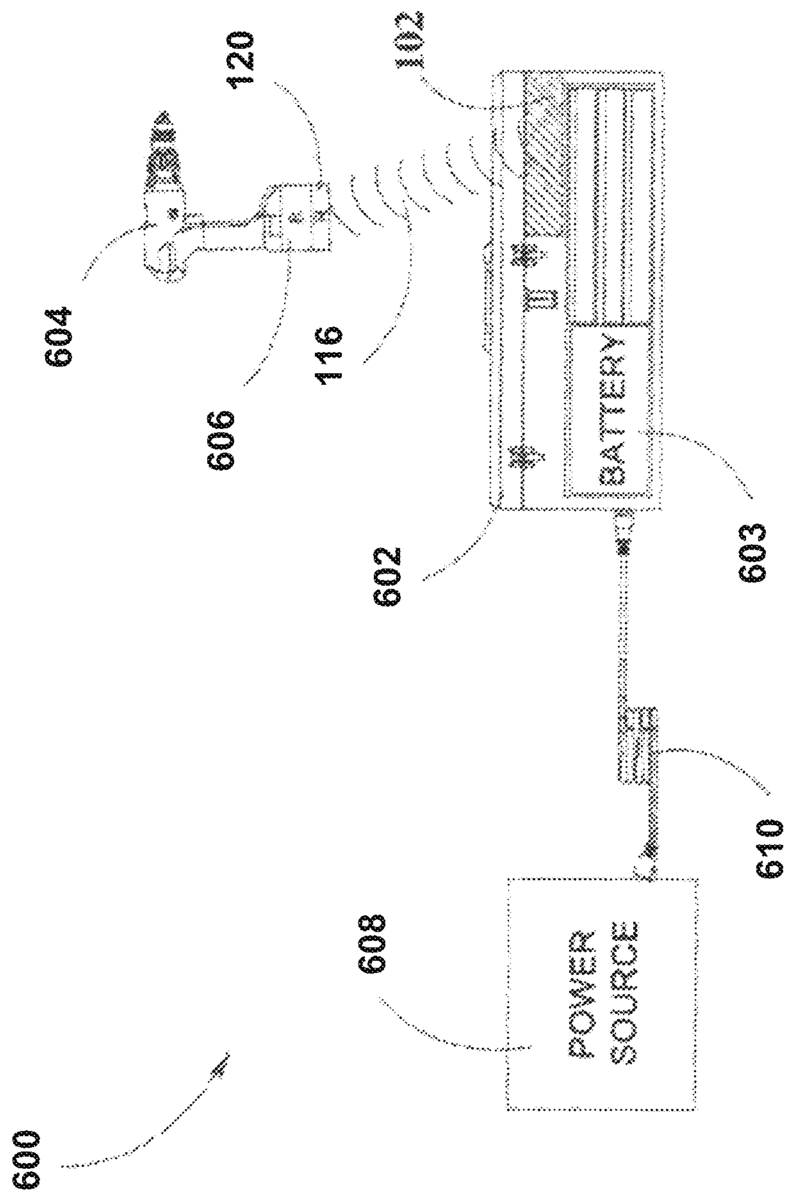
FIGS. 6A-6C illustrate wireless power transmission systems, including a toolbox with an embedded transmitter, used for providing power to cordless power tools, in accordance with some embodiments.
Figure 6B:
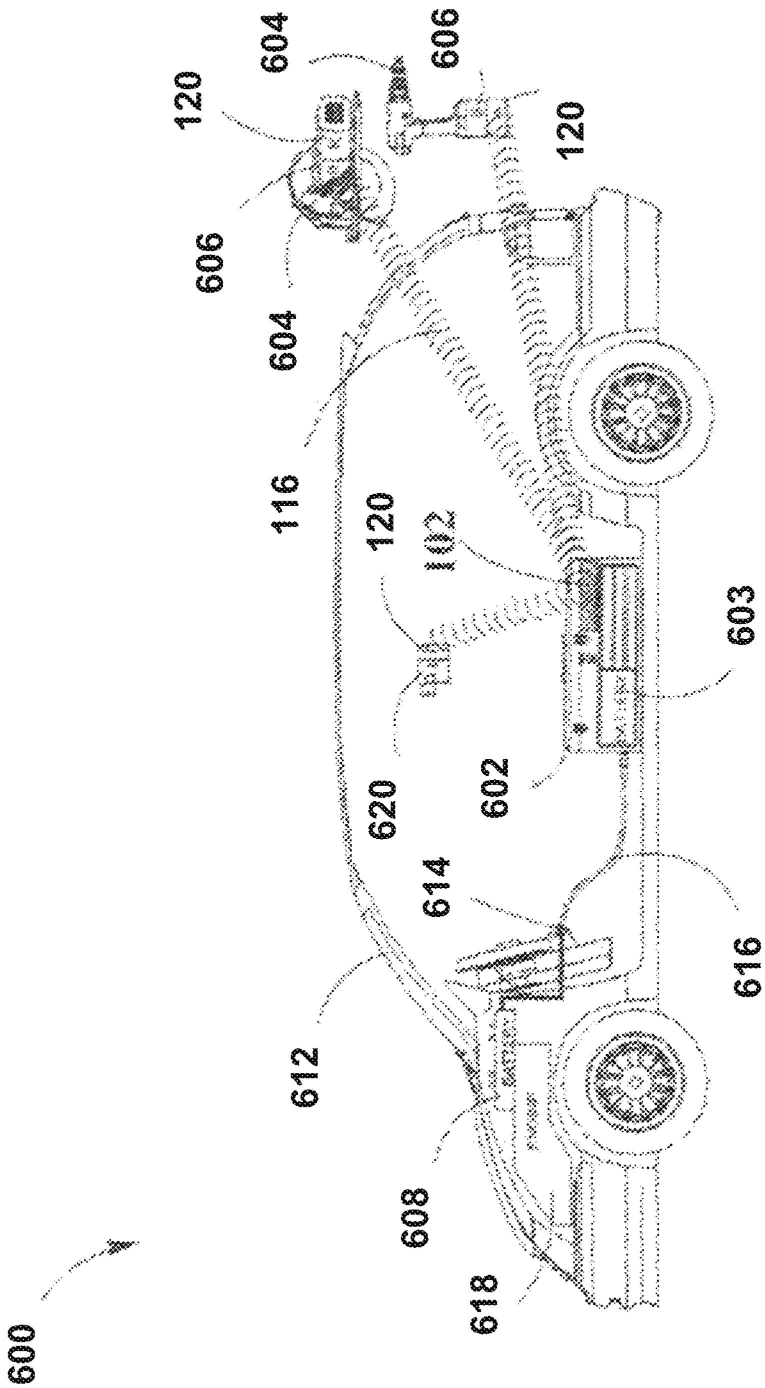

Various embodiments of the transmitter 102 are illustrated and described herein. For example, an embodiment of the transmitter 102 is connected to a power source inside a vehicle (e.g., as shown in FIGS. 4A-4C and described below), another embodiment of the transmitter 102 is embedded in a toolbox (e.g., as shown in FIGS. 6A-6B and described below), and another embodiment of the transmitter 102 is placed on a police vehicle (e.g., as shown in FIGS. 11B-11D and described below).

Figure 6C:
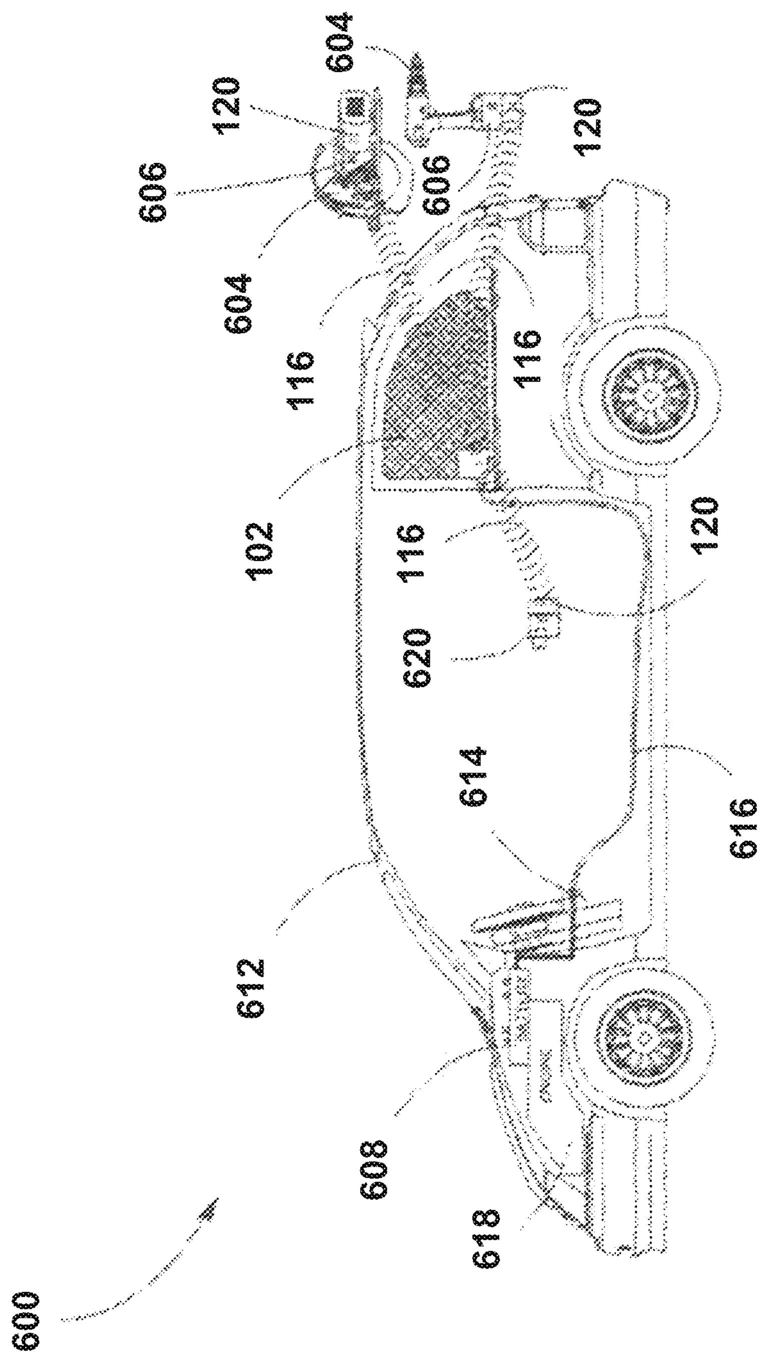
Figure 10A:
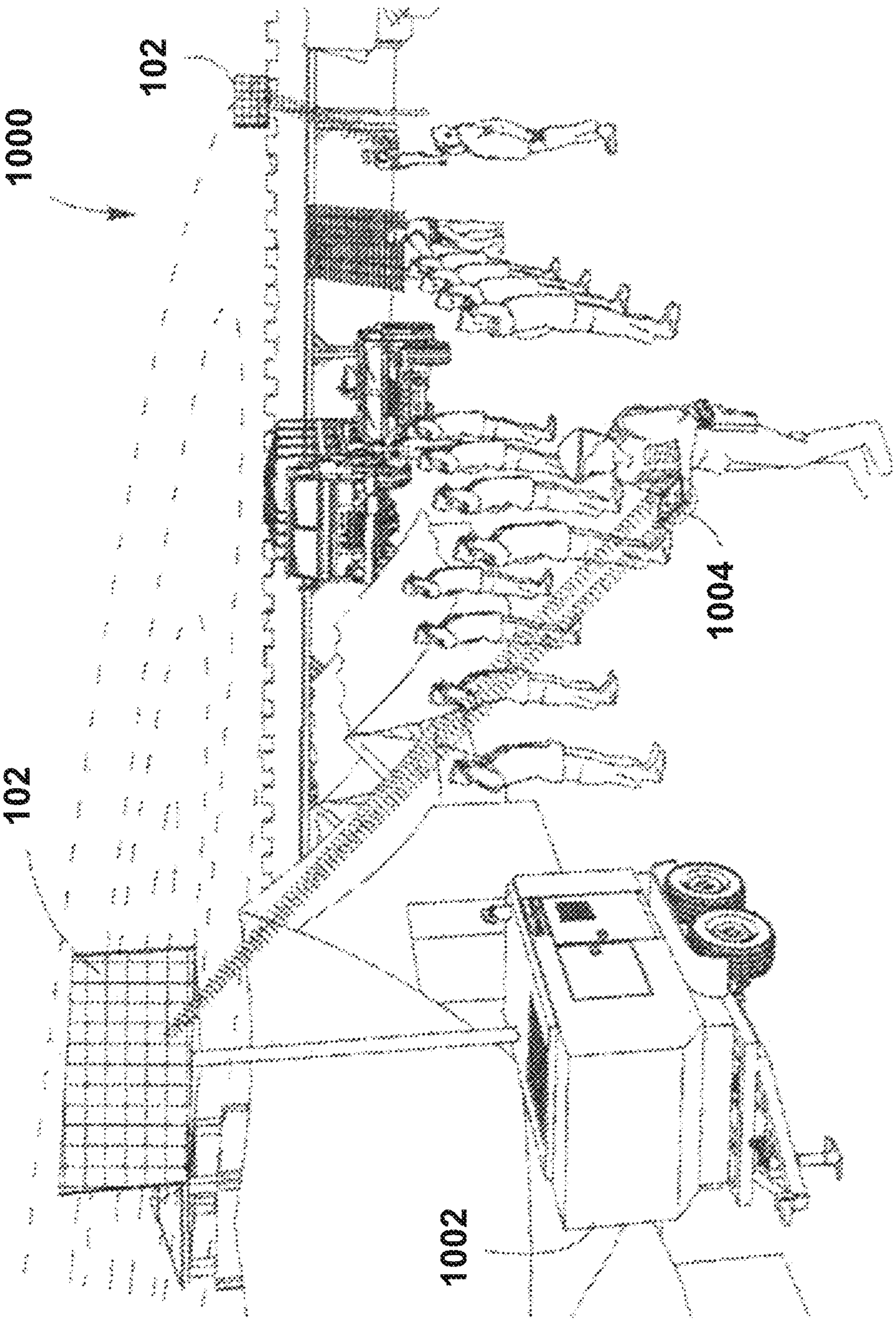
FIGS. 10A-10C illustrate wireless power transmission systems used in military applications, in accordance with some embodiments.
Figure 10B:
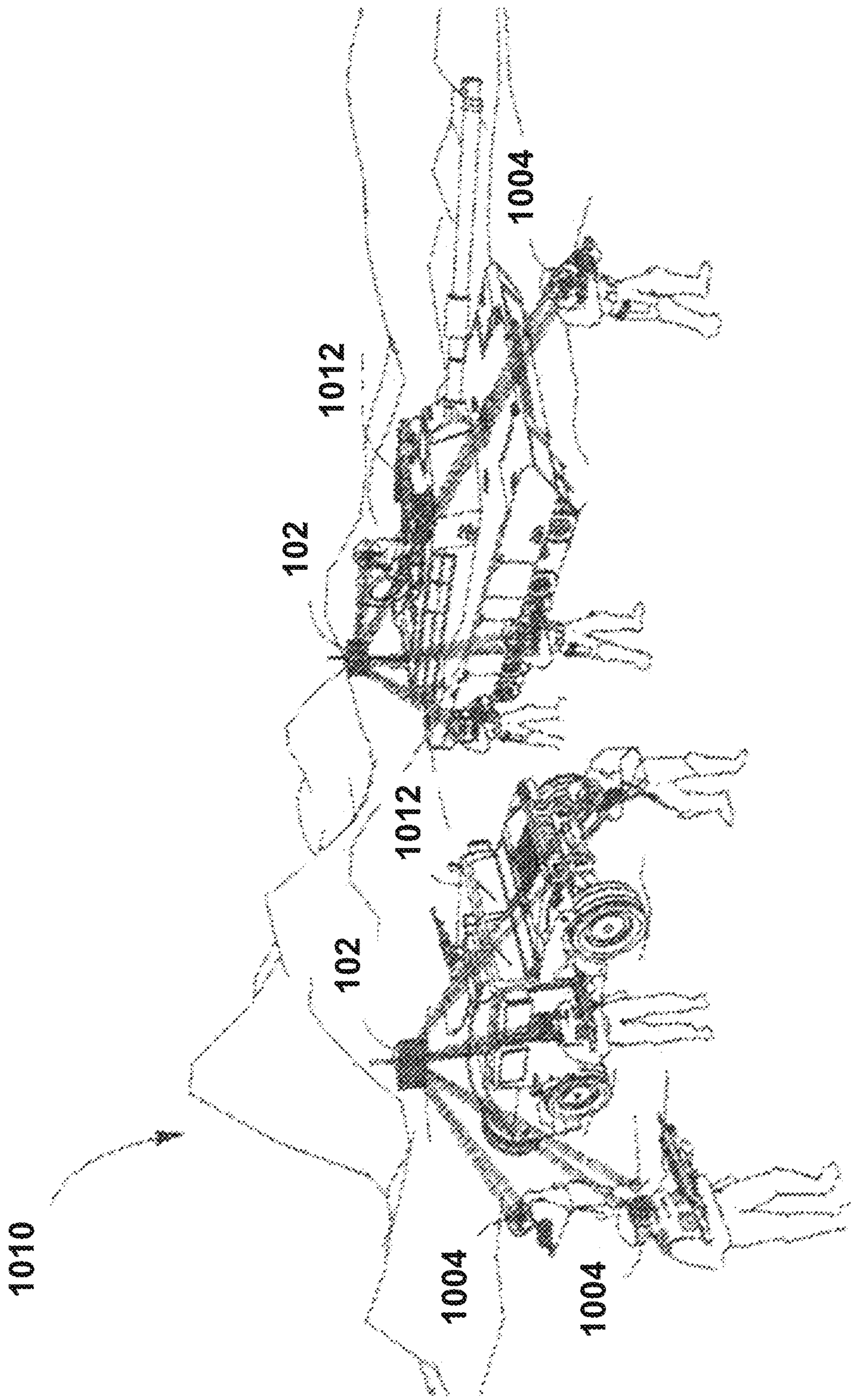
Figure 18B:
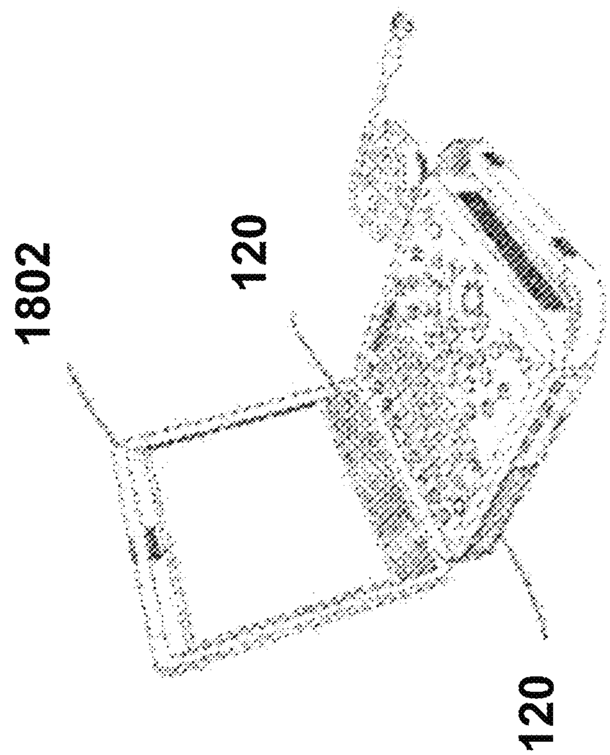
FIGS. 18A-18B are illustrations of medical devices with wireless power receivers coupled thereto, in accordance with some embodiments.
Figure 18A:
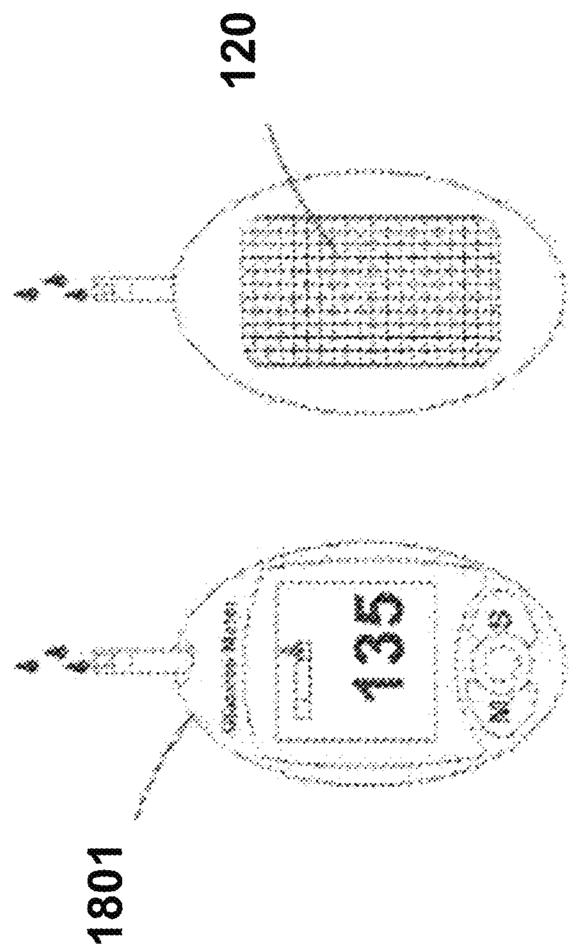
Figure 18C:
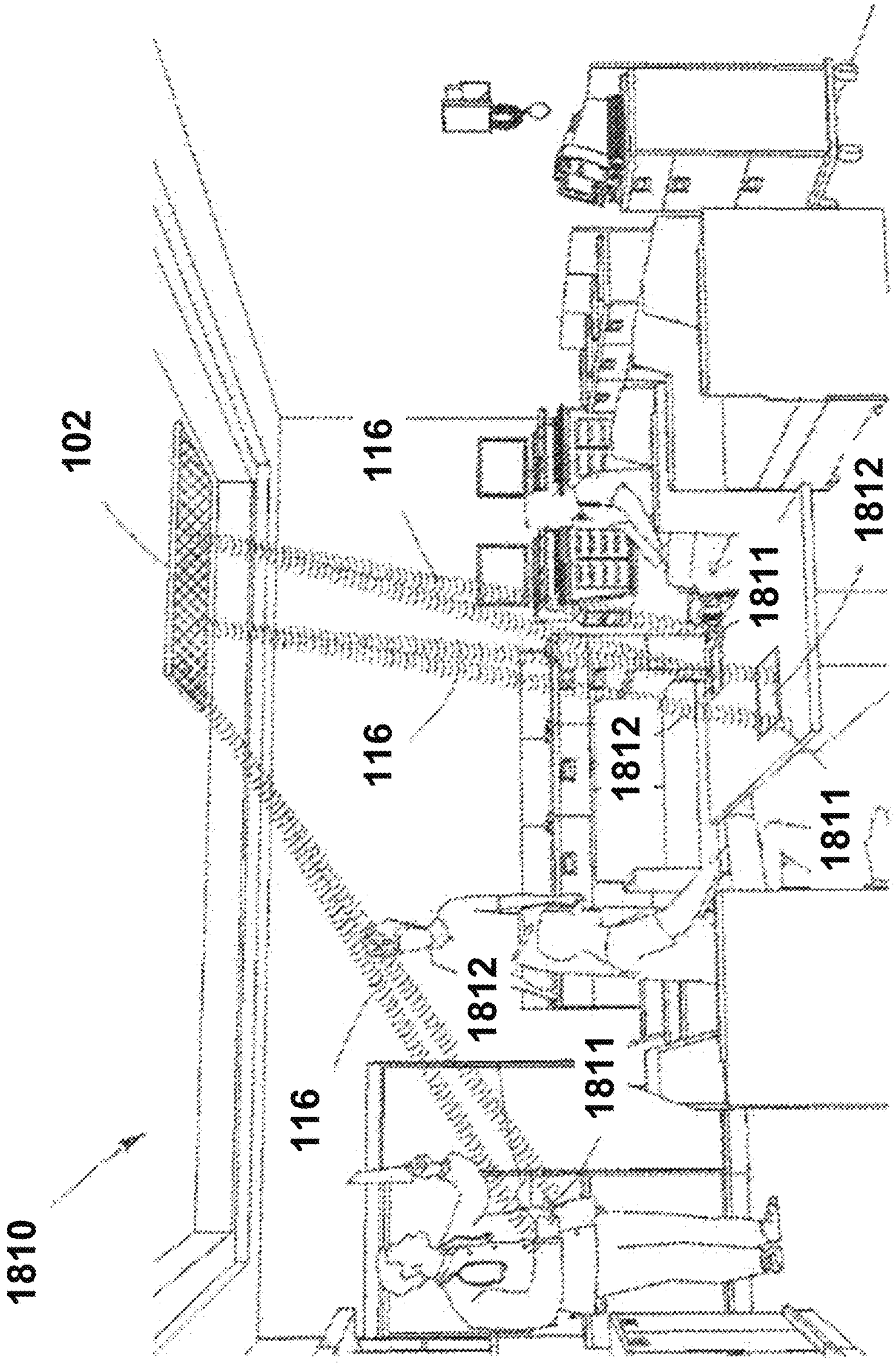
FIGS. 18C-18E are illustrations of wireless power transmission systems for wirelessly delivering power to medical devices, in accordance with some embodiments.

Various embodiments of the receiver 120 are also illustrated and described herein. For example, an embodiment of the receiver 120 is connected to a wireless power tool (e.g., as shown in FIGS. 6A-6C and described below), another embodiment of the receiver 120 is embedded in a military uniform (e.g., as shown in FIGS. 10A-10B and described below), and yet another embodiment of the receiver 120 is embedded in medical devices (e.g., as shown in FIGS. 18A-18C and described below).

Figure 2:
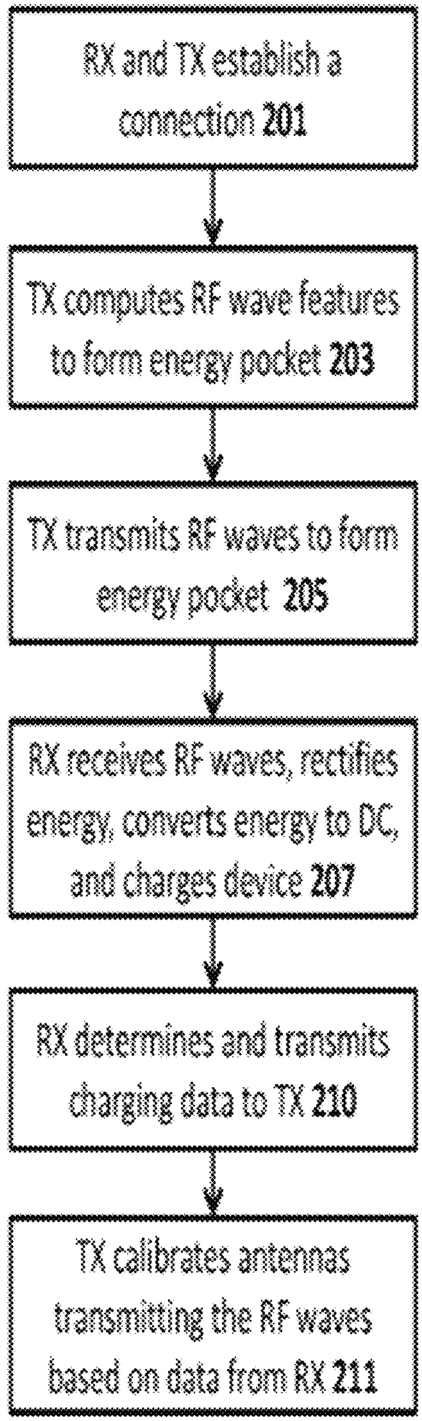
FIG. 2 illustrates steps of wireless power transmission, in accordance with some embodiments.

FIG. 2 provides an example flowchart of a process for wireless power transmission, in accordance with some embodiments.

In a first step 201, a transmitter 102 (TX) establishes a connection or otherwise associates with a receiver 120 (RX). That is, in some embodiments, transmitters and receivers may communicate with one another over a wireless communication protocol capable of transmitting information between two processors of electrical devices (e.g., BLUETOOTH, BLUETOOTH Low Energy (BLE), WI-FI, NFC, ZIGBEE). For example, in embodiments implementing BLUETOOTH or BLUETOOTH variants, the transmitter may scan for receivers broadcasting advertisement signals or a receiver may transmit an advertisement signal to the transmitter. The advertisement signal may announce the receiver's presence to the transmitter, and may trigger an association between the transmitter and the receiver. As described herein, in some embodiments, the advertisement signal may communicate information that may be used by various devices (e.g., transmitters, client devices, server computers, other receivers) to execute and manage pocket-forming procedures. Information contained within the advertisement signal may include a device identifier (e.g., MAC address, IP address, UUID), the voltage of electrical energy received, client device power consumption, and other types of data related to power transmission. The transmitter may use the advertisement signal transmitted to identify the receiver and, in some cases, locate the receiver in a two-dimensional space or in a three-dimensional space. Once the transmitter identifies the receiver, the transmitter may establish the connection associated in the transmitter with the receiver, allowing the transmitter and receiver to communicate control signals over a second channel. The advertising signal is an example of the communication signal 118 (FIG. 1).

In a next step 203, the transmitter may use the advertisement signal to determine waveform characteristics (discussed above) for transmitting the power transmission signals, to then establish the pockets of energy. The transmitter may use information contained in the receiver's advertisement signal, or in subsequent control/feedback signals received from the receiver, to determine how to produce and transmit the power transmission signals so that the receiver may receive the power transmission signals. In some cases, the transmitter may transmit power transmission signals in a way that establishes a pocket of energy, from which the receiver may harvest electrical energy. In some embodiments, the transmitter may include a processor 104 executing software modules capable of automatically identifying the power transmission signal features needed to establish a pocket of energy based on information received from the receiver, such as the voltage of the electrical energy harvested by the receiver from the power transmission signals. It should be appreciated that in some embodiments, the functions of the processor and/or the software modules may be implemented in an Application Specific Integrated Circuit (ASIC).

Additionally or alternatively, in some embodiments, the advertisement signal or a subsequent signal transmitted by the receiver over a second communications channel may indicate one or more waveform characteristics (also referred to herein as power transmission signals features), which the transmitter may then use to produce and transmit power transmission signals to establish a pocket of energy. For example, in some cases the transmitter may automatically identify the phase and gain necessary for transmitting the power transmission signals based on the location of the device and the type of device or receiver; and, in some cases, the receiver may inform the transmitter of the phase and gain for effectively transmitting the power transmission signals.

In a next step 205, after the transmitter determines the appropriate waveform characteristics to use when transmitting the power transmission signals, the transmitter may begin transmitting power transmission signals, over a separate channel from the signals (e.g., power waves 116 are distinct from the communication signals 118, FIG. 1). Power transmission signals may be transmitted to establish a pocket of energy. The transmitter's antenna elements may transmit the power transmission signals such that the power transmission signals converge in a two-dimensional or three-dimensional space around the receiver. The resulting field around the receiver forms a pocket of energy from which the receiver may harvest electrical energy. One antenna element may be used to transmit power transmission signals to establish two-dimensional energy transmissions; and in some cases, a second or additional antenna element may be used to transmit power transmission signals in order to establish a three-dimensional pocket of energy. In some cases, a plurality of antenna elements may be used to transmit power transmission signals in order to establish the pocket of energy. Moreover, in some cases, the plurality of antennas may include all of the antennas in the transmitter; and, in some cases, the plurality of antennas may include a number of the antennas in the transmitter, but fewer than all of the antennas of the transmitter. Various techniques for transmitting power transmission signals are discussed in further detail above with reference to FIG. 1.

As previously mentioned, the transmitter 102 may produce and transmit power transmission signals, according to a determined set of power transmission signal features. In some embodiments, the power transmission signals are produced and transmitted using an external power source and a local oscillator chip comprising a piezoelectric material. The transmitter may include a controller circuit (e.g., an RFIC) that controls production and transmission of the power transmission signals based on information related to power transmission and pocket-forming received from the receiver. This control data may be communicated over a different channel from the power transmission signals, using wireless communications protocols, such as BLE, NFC, or ZIGBEE®. The RFIC of the transmitter may automatically adjust the phase and/or relative magnitudes of the power transmission signals as needed. Pocket-forming is accomplished by the transmitter transmitting the power transmission signals in a manner that forms constructive interference patterns.

In a next step 207, the receiver may harvest or otherwise receive electrical energy from the power transmission signals of a single beam or a pocket of energy. The receiver may include a rectifier and AC/DC converter (e.g., power converters 126, FIG. 1), which may convert the electrical energy from AC current to DC current, and the rectifier of the receiver may then rectify the electrical energy, resulting in useable electrical energy for a client device associated with the receiver, such as a laptop computer, smartphone, battery, toy, or other electrical device. The receiver may utilize the pocket of energy produced by the transmitter during pocket-forming to charge or otherwise power the electronic device. Receiving the power transmission signals is discussed in further detail above with reference to FIG. 1.

In next step 210, the receiver may generate data containing information indicating the effectiveness of the single beam or energy pockets providing the receiver power transmission signals. The receiver may then transmit control/feedback signals containing the data to the transmitter. The control/feedback signal is an example of the communication signals 118. The control signals may be transmitted intermittently, depending on whether the transmitter and receiver are communicating synchronously (i.e., the transmitter is expecting to receive control data from the receiver). Additionally, the transmitter may continuously transmit the power transmission signals to the receiver, irrespective of whether the transmitter and receiver are communicating control signals. The data may contain information related to transmitting power transmission signals and/or establishing effective pockets of energy. Some of the information in the control data may inform the transmitter how to effectively produce and transmit, and in some cases adjust, the features of the power transmission signals. The control signals may be transmitted and received over a second channel, independent from the power transmission signals, using a wireless protocol capable of transmitting control data related to power transmission signals and/or pocket-forming, such as BLE, NFC, WI-FI, or the like.

As mentioned, the data may contain information indicating the effectiveness of the power transmission signals of the single beam or establishing the pocket of energy. The data may be generated by a processor of the receiver monitoring various aspects of the receiver and/or the client device associated with the receiver. The data may be based on various types of information, such as the voltage of electrical energy received from the power transmission signals, the quality of the power transmission signals reception, the quality of the battery charge or quality of the power reception, and location or motion of the receiver, among other types of information useful for adjusting the power transmission signals and/or pocket-forming.

In some embodiments, a receiver may determine the amount of power being received from power transmission signals transmitted from the transmitter and may then indicate that the transmitter should "split" or segment the power transmission signals into less-powerful power transmission signals. The less-powerful power transmission signals may be bounced off objects or walls nearby the device, thereby reducing the amount of power being transmitted directly from the transmitter to the receiver.

In a next step 211, the transmitter may calibrate the antennas transmitting the power transmission signals, so that the antennas transmit power transmission signals having a more effective set of features (e.g., direction, phase, gain, amplitude). In some embodiments, a processor of the transmitter may automatically determine more effective features for producing and transmitting the power transmission signals based on the signal(s) received from the receiver. The transmitter may then automatically reconfigure the antennas to transmit recalibrated power transmission signals according to the newly determined more-effective features. For example, the processor of the transmitter may adjust gain and/or phase of the power transmission signals, among other features of power transmission feature, to adjust for a change in location of the receiver, after a user moved the receiver outside of the three-dimensional space where the pocket of energy is established.

Figure 3:
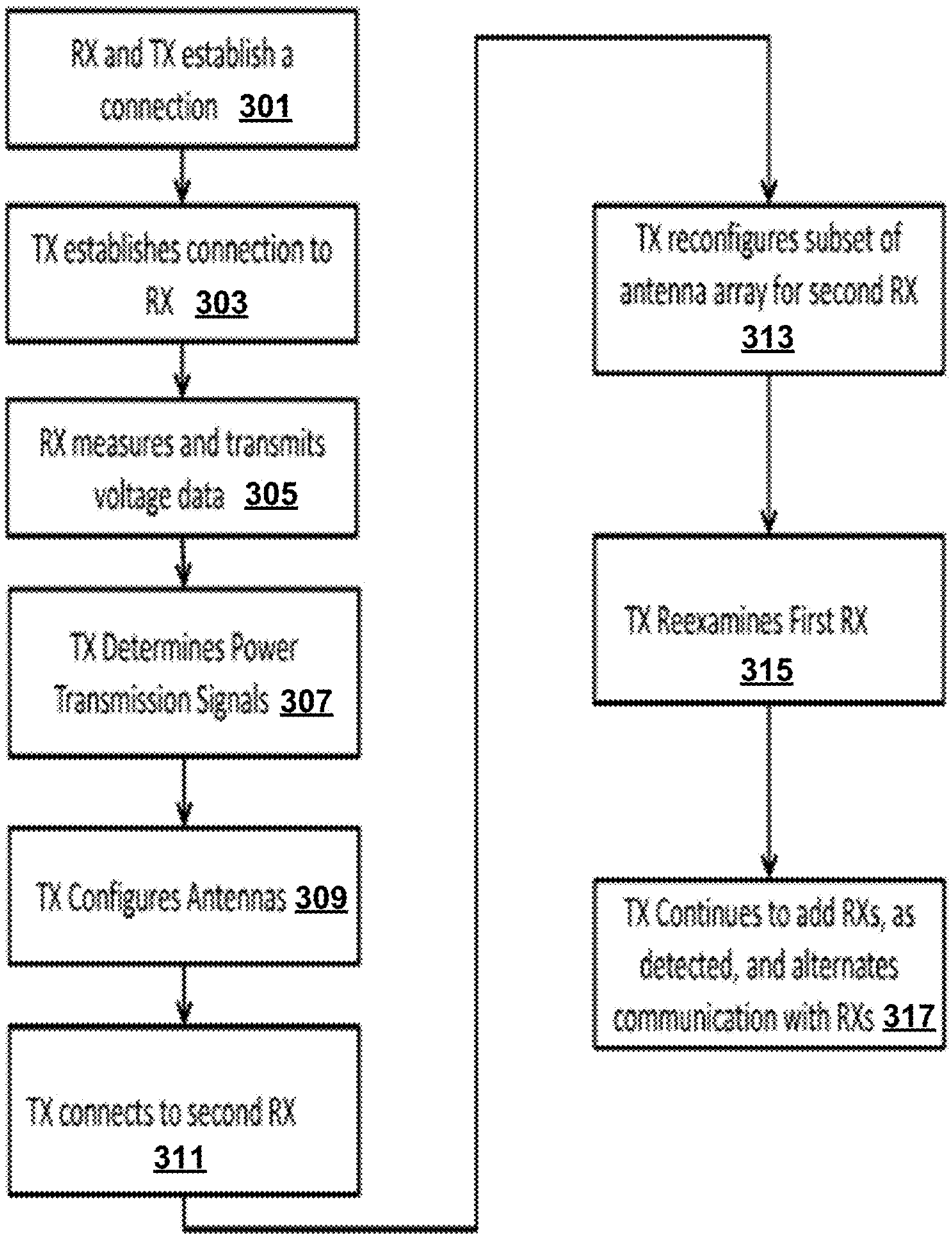
FIG. 3 illustrates steps of powering a plurality of receiver devices, in accordance with some embodiments.

FIG. 3 provides an example flowchart of a process for wirelessly powering a plurality of receivers, in accordance with some embodiments. For the sake of brevity, features already described above with reference to FIGS. 1 and 2 are not repeated here.

In a first step 301, a transmitter 102 (TX) establishes a connection or otherwise associates with a receiver 120 (RX), as discussed above. The transmitter may scan for receivers broadcasting advertisement signals or a receiver may transmit an advertisement signal to the transmitter. The advertisement signal may announce the receiver's presence to the transmitter, and may trigger an association between the transmitter and the receiver.

Next, in step 303, when the transmitter detects the advertisement signal, the transmitter may automatically form a communication connection with that receiver, which may allow the transmitter and receiver to communicate control signals and power transmission signals. The transmitter may then command that receiver to begin transmitting real-time sample data or other data. The transmitter may also begin transmitting power transmission signals from antennas of the transmitter's antenna array.

In a next step 305, the receiver may then measure the voltage, among other metrics related to effectiveness of the power transmission signals, based on the electrical energy received by the receiver's antennas. The receiver may generate data containing the measured information, and then transmit control signals (e.g., communication signals 118, FIG. 1) containing the data to the transmitter. For example, the receiver may sample the voltage measurements of received electrical energy, for example, at a rate of 100 times per second. The receiver may transmit the voltage sample measurement back to the transmitter, 100 times a second, in the form of control signals.

In a next step 307, the transmitter may execute one or more software modules monitoring the metrics, such as voltage measurements, received from the receiver. Algorithms may vary production and transmission of power transmission signals by the transmitter's antennas, to maximize the effectiveness of the pockets of energy around the receiver. For example, the transmitter may adjust the phase at which the transmitter's antennas transmit the power transmission signals, until that power received by the receiver indicates establishment of a pocket of energy around the receiver. When an optimal configuration for the antennas is identified, memory 106 of the transmitter may store the configurations to keep the transmitter broadcasting at that highest level.

In a next step 309, algorithms of the transmitter may determine when it is necessary to adjust the power transmission signals and may also vary the configuration of the transmit antennas, in response to determining such adjustments are necessary. For example, the transmitter may determine the power received at a receiver is less than maximal, based on the data received from the receiver. The transmitter may then automatically adjust the phase of the power transmission signals, but may also simultaneously continue to receive and monitor the voltage being reported back from receiver.

In a next step 311, after a determined period of time for communicating with a particular receiver, the transmitter may scan and/or automatically detect advertisements from other receivers that may be in range of the transmitter. The transmitter may establish a connection to the second receiver responsive to, e.g., BLUETOOTH advertisements, from a second receiver.

In a next step 313, after establishing a second communication connection with the second receiver, the transmitter may proceed to adjust one or more antennas in the transmitter's antenna array. In some embodiments, the transmitter may identify a subset of antennas to service the second receiver, thereby parsing the array into subsets of arrays that are associated with a respective receiver. In some embodiments, the entire antenna array may service a first receiver for a given period of time, and then the entire array may service the second receiver for that period of time.

Manual or automated processes performed by the transmitter may select a subset of arrays to service the second receiver. In this example, the transmitter's array may be split in half, forming two subsets. As a result, half of the antennas may be configured to transmit power transmission signals to the first receiver, and half of the antennas may be configured for the second receiver. In the current step 313, the transmitter may apply similar techniques discussed above to configure or optimize the subset of antennas for the second receiver. While selecting a subset of an array for transmitting power transmission signals, the transmitter and second receiver may be transmitting and receiving data. As a result, by the time that the transmitter alternates back to communicating with the first receiver and/or scan for new receivers, the transmitter has already received a sufficient amount of sample data to adjust the phases of the waves transmitted by the second subset of the transmitter's antenna array to transmit power transmission waves to the second receiver effectively.

In a next step 315, after adjusting the second subset to transmit power transmission signals to the second receiver, the transmitter may alternate back to communicating data with the first receiver, or scanning for additional receivers. The transmitter may reconfigure the antennas of the first subset, and then alternate between the first and second receivers at a predetermined interval.

In a next step 317, the transmitter may continue to alternate between receivers and scanning for new receivers, at a predetermined interval. As each new receiver is detected, the transmitter may establish a connection and begin transmitting power transmission signals, accordingly.

In one example embodiment, the receiver may be electrically connected to a device like a smart phone. The transmitter's processor would scan for any BLUETOOTH devices. The receiver may begin advertising that it's a BLUETOOTH device through the BLUETOOTH chip (e.g., broadcasting advertising signals). The advertising signal may include unique identifiers so that the transmitter, when it scanned that advertisement, could distinguish that advertisement and ultimately that receiver from all the other BLUETOOTH devices nearby within range. When the transmitter detects that advertisement and notices it is a receiver, then the transmitter may immediately form a communication connection with that receiver and command that receiver to begin sending real time sample data.

The receiver would then measure the voltage at its receiving antennas, and send that voltage sample measurement back to the transmitter (e.g., 100 times a second). The transmitter may start to vary the configuration of the transmit antennas by adjusting the phase. As the transmitter adjusts the phase, the transmitter monitors the voltage being sent back from the receiver. In some implementations, the higher the voltage, the more energy may be in the pocket. The antenna phases may be altered until the voltage is at the highest level and there is a maximum pocket of energy around the receiver. The transmitter may keep the antennas at the particular phase so the voltage is at the highest level.

The transmitter may vary each individual antenna, one at a time. For example, if there are 32 antennas in the transmitter, and each antenna has 8 phases, the transmitter may begin with the first antenna and would step the first antenna through all 8 phases. The receiver may then send back the power level for each of the 8 phases of the first antenna. The transmitter may then store the highest phase for the first antenna. The transmitter may repeat this process for the second antenna, and step it through 8 phases. The receiver may again send back the power levels from each phase, and the transmitter may store the highest level. Next the transmitter may repeat the process for the third antenna and continue to repeat the process until all 32 antennas have stepped through the 8 phases. At the end of the process, the transmitter may transmit the maximum voltage in the most efficient manner to the receiver.

In another example embodiment, the transmitter may detect a second receiver's advertisement and form a communication connection with the second receiver. When the transmitter forms the communication with the second receiver, the transmitter may aim the original 32 antennas towards the second receiver and repeat the phase process for each of the 32 antennas aimed at the second receiver. Once the process is completed, the second receiver may receive as much power as possible from the transmitter. The transmitter may communicate with the second receiver for a period of time (e.g., a second), and then alternate back to the first receiver for a period of time (e.g., a second), and the transmitter may continue to alternate back and forth between the first receiver and the second receiver at the time period intervals.

In yet another implementation, the transmitter may detect a second receiver's advertisement and form a communication connection with the second receiver. First, the transmitter may communicate with the first receiver and re-assign half of the example 32 the antennas aimed at the first receiver, dedicating only 16 towards the first receiver. The transmitter may then assign the second half of the antennas to the second receiver, dedicating 16 antennas to the second receiver. The transmitter may adjust the phases for the second half of the antennas. Once the 16 antennas have gone through each of the 8 phases, the second receiver may be receiving the maximum voltage in the most efficient manner.

FIGS. 4A-4D illustrate in-vehicle wireless power transmission systems, in accordance with some embodiments.

Referring to FIG. 4A, a wireless power transmitter system 400 can be implemented in order to charge or power one or more electronic devices 401 (e.g., an embodiment of the electronic device 122, FIG. 1) inside a vehicle. According to some aspects of this embodiment, transmitter 102 can be configured within a cylindrical shape, exhibiting a longitude between about 2 and 3 inches, and a diameter ranging from about 0.5 inch to about 1 inch. As illustrated in close-up view 402, transmitter 102 can include a suitable connector 404 with pins 406 that can be inserted into car lighter socket 408 for powering transmitter 102. Transmitter 102 can function as a standalone, self-contained device that can integrate circuitry module 414 and antenna array 412 (e.g., an embodiment of the antenna array 110, FIG. 1), along with connector 404 and pins 406.

Car lighter socket 408 can supply 12 or 24 DC volts for powering transmitter 102, which may be sufficient power for most portable electronic devices 401 such as smartphones, DVD players, portable gaming systems, tablets, laptops computers, and the like. In some embodiments, circuitry module 414 of transmitter 102 can include a DC-to-DC converter or a DC-to-AC converter, depending on the electrical charging requirements of electronic device 401. Yet in other embodiments, circuitry module 414 can include a switchable power converter that can be configured according to the charging requirements of electronic device 401.

Operation of transmitter 102 in FIG. 4A can be driven by a power source, in this case, car lighter socket 308. Transmitter 102 can use communication component 112 (not shown in FIG. 4A) in circuitry module 414 to locate a receiver 120 (not shown in FIG. 4A) embedded in electronic device 401. Processor(s) 104 (not shown in FIG. 4A) which may be included in circuitry module 414 of the transmitter 102 may determine the optimum path for the generation of pocket-forming, according to the location of electronic device 401 within the vehicle. As depicted in FIG. 4A, electronic device 401 can be located in the passenger seat, right beside the driver seat. Processors 104 may communicate with a radio frequency integrated circuit in circuitry module 414 so as to control the generation and transmission of RF waves 116 through antenna array 412 which may include two or more antenna elements. Transmission of RF waves 116 can be aimed at electronic device 401 in the passenger seat for the generation of pocket-forming suitable for charging or powering electronic device 401.

The wireless power transmission system 400 can also be used for powering or charging an electronic device 401 located in the backseats of the vehicle, or any other locations inside vehicle. In this case, transmitter 102 can use any suitable reflecting surface of the vehicle, preferably metallic, in order to transmit RF waves 116 and redirect the formation of pockets of energy towards electronic device 401, with minimal or no power loss. For example, transmitter 102 can use the vehicle ceiling to bounce off transmitted RF waves 116 towards electronic device 401 for the generation of pockets of energy capable of providing suitable charging or powering to electronic device 401.

In some embodiments, the wireless power transmission 400 powers or charges two or more electronic devices 401 inside vehicle, where transmitter 102 can be capable of producing multiple pocket forming. In such case, transmitter 102 can generate multiple RF waves 116 directly aimed at or reflected towards electronic devices 401 through the use of suitable reflecting surfaces of the vehicle, thereby powering or charging one or more electronic devices 401 at the same time.

FIG. 4B illustrates a wireless power transmission system 420 where transmitter 102 includes a cable 422 for positioning antenna array 412 in different areas inside a vehicle. As seen in close-up view 421, transmitter 102, through the use of connector 404 and pins 406, can be connected to car lighter socket 408 to receive power necessary for operation. According to some aspects of this embodiment, circuitry module 414 of transmitter 102 can be operatively coupled with car lighter socket 408, while antenna array 412 can be operatively connected with circuitry module 414 through cable 422, thereby allowing antenna array 412 to be separately positioned across vehicle, as required by the application or according to the relative position of one or more electronic devices 401. For example, as shown in FIG. 4B, cable 422 can be run from circuitry module 414 to antenna array 412 which can be slipped in one of the vehicle's sun visor 424. In this way, antenna array 412 can emit RF waves 116 from a high-up position down to one or more electronic devices 401 for the generation of pockets of energy that may provide suitable charging or powering. This configuration may be particularly beneficial for charging or powering electronic devices 401 in the vehicle's backseats.

Antenna array 412 in FIG. 4B can exhibit a flat rectangular shape, with dimensions between about 4×2 inches to about 8×4 inches, depending on the number and configuration of antenna elements 412. Cable 422 can include a suitable conductor covered by an insulating material, it may be flexible and may exhibit a suitable length as required by the application. Preferably, cable 422 can be positioned between circuitry module 414 of transmitter 102 and antenna array 412 in such a way as to not obstruct the visibility of the windshield, as illustrated in FIG. 4B.

Referring now to FIG. 4C, a wireless power transmission system 430 includes a transmitter 102 with its circuitry module 414 connected to car lighter socket 408, while its antenna array 412 can be positioned on the vehicle's floor 432. Similarly as in FIG. 4B, antenna array 412 may exhibit a flat rectangular shape with dimensions between about 4×2 inches to about 8×4 inches, depending on the number and configuration of antenna elements. According to some aspects of this embodiment, antenna array 412 can be covered by the vehicle floor mats (not shown in FIG. 4C), where this antenna array 412 can emit RF waves 116 from the bottom of the vehicle floor 432 upwards to one or more electronic devices 401 that may be positioned in the passenger seat, as illustrated in FIG. 4C, or in any another suitable location within the vehicle.

Similarly as in FIG. 4B, cable 422 can operatively connect circuitry module 414 (not shown in FIG. 4C) to antenna array 412 for the transmission of RF waves 116 that may produce pockets of energy suitable for charging or powering one or more electronic devices 401 inside the vehicle. In this particular embodiment, antenna array 412 may include a suitable combination of flexible and conducting materials that may allow transmission of RF waves 116, while avoiding fractures or breakdown when a passenger steps on antenna array 412 placed underneath the vehicle's floor 432 mats.

Although these example embodiments of wireless power transmission may describe transmitter 102 as a standalone device that may be connected to a car lighter socket 408, including the different configurations and positions for its antenna array 412, other transmitter 102 configurations and features may be contemplated as well. For example, antenna array 412 of transmitter 102 may be positioned in any suitable areas inside the vehicle such as passenger seats and backseats, storage compartments, and center console among others. In other embodiments, transmitter 102 may be configured as a built-in device that may be factory-integrated in suitable areas or parts of the vehicle such as sun-visors, sunroofs, sound speakers, dashboards, and the like.

Figure 4D:
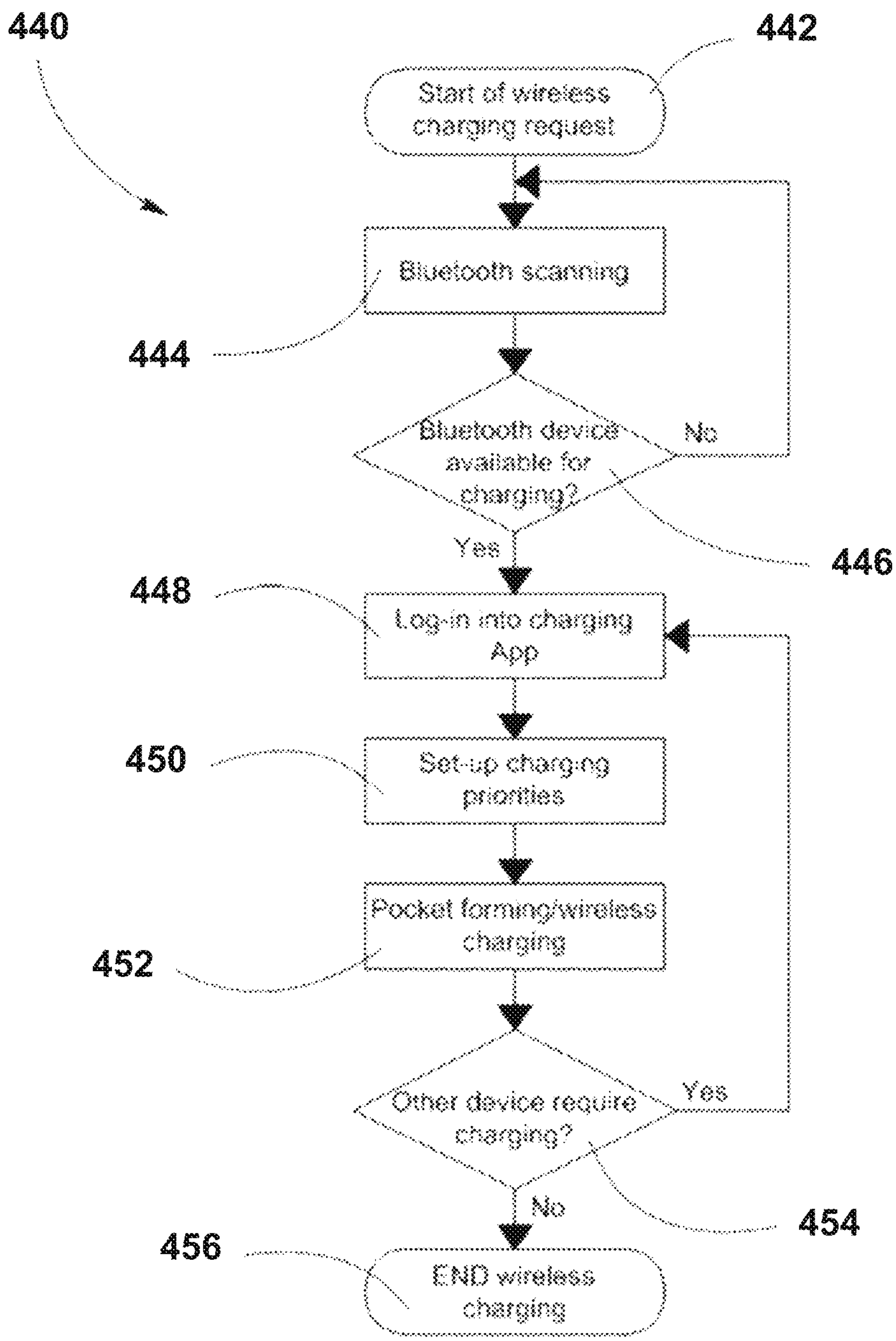
FIG. 4D is a flow diagram of wirelessly charging or powering one or more electronic devices inside a vehicle, in accordance with some embodiments.

FIG. 4D shows a simplified flowchart of a wireless power transmission process 440 that may be implemented for charging one or more electronic devices 401 inside a vehicle. This process may be applicable in the embodiments of the wireless power transmission systems 400, 420, and 430.

The wireless power transmission process 440 may begin with a wireless charging request, at block 442. Subsequently, transmitter 102 may perform a BLUETOOTH scanning for identifying any suitable electronic device 401 that may require wireless charging or powering, at block 444. Specifically, this BLUETOOTH scanning may be carried out by a communication component integrated in circuitry module 414 of transmitter 102.

Using BLUETOOTH scanning, transmitter 102 may determine if there are one or more electronic devices 401 available for charging or powering, at block 446. Basically, any suitable electronic device 401 operatively coupled with a receiver 120 and capable of BLUETOOTH communication may be considered "available" for wireless charging or powering. If there are no available electronic devices 401 for wireless charging or powering, then BLUETOOTH scanning can be repeated until there is at least one electronic device 401 available. If one or more electronic devices 401 are available, then wireless power transmission process 440 may continue at block 448, where one or more electronic devices 401 may log into a charging application developed in any suitable operating systems such as iOS, ANDROID, and WINDOWS, among others. This charging application may establish a suitable communication channel between transmitter 102 and electronic device 401, where configuration of transmitter 102 can be accessed and reprogrammed according to the charging or powering requirements of electronic devices 401.

One or more electronic devices 401 may access the charging application in order to modify the configuration of transmitter 102. Specifically, one or more electronic devices 401 can communicate with transmitter 102 via BLUETOOTH and log into the charging application to set up charging or powering priorities as necessary, at block 450. For example, in a long family trip, charging or powering priorities can be established to first charge or power-up electronic devices 401 for kids' entertainment such as portable gaming consoles and tablets, followed by the charging or powering of parents' electronic devices 401 such as smartphones and laptops. Other transmitter 102 parameters such as power intensity and pocket-forming focus/timing can also be modified through the use of this charging application. However, authorization access to transmitter 102 configuration may be restricted to certain users who may be required to provide corresponding user-credentials and passwords.

After charging priorities in transmitter 102 are set, transmission of RF waves 116 towards the designated electronic devices 401 can begin, at block 452, where these RF waves 116 may generate pockets of energy at receivers 120 for powering or charging one or more electronic devices 401 sequentially or simultaneously. In other embodiments, different charging or powering thresholds may be established for maintaining suitable operation. For example, minimum and maximum charging thresholds may be established at about 20% and 95% of total charge respectively, where charging or powering of electronic devices 401 may be stopped when reaching 95% of total charge, and may resume when total charge of electronic devices 401 falls below 20%.

BLUETOOTH scanning may continue throughout the process in order to identify additional electronic devices 401 that may require wireless charging or powering, at block 454. If new or additional electronic devices 401 are identified, then transmitter 102 may be accessed through the charging application to set charging or powering priorities for these additional electronic devices 401. If no further electronic devices 401 are recognized by BLUETOOTH scanning, then wireless power transmission process 440 may end, at block 456.

FIGS. 4A-4D illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 4A-4D.

Presented below are example methods of wirelessly delivering power to receivers in a vehicle.

In some embodiments, an example method includes defining, by a transmitter, a pocket of energy positioned within a vehicle, and the vehicle includes the transmitter and a power source powering the transmitter. The method further includes charging, by the transmitter, an electronic device positioned within the vehicle, and the electronic device includes a receiver that interfaces with the pocket of energy in the vehicle.

In some embodiments, the power source includes at least one of a vehicle lighter socket and a direct connection to a power wire within the vehicle.

In some embodiments, the electronic device is a first electronic device and the transmitter charges a second electronic device positioned within the vehicle based on the second device interfacing with the pocket of energy in the vehicle.

In some embodiments, another example method includes scanning, using a wireless communication component of a transmitter, for available receivers within a vehicle that are authorized to receive wirelessly delivered power from the transmitter and detecting, by the transmitter, a first receiver and a second receiver of the available receivers within the vehicle based on the scanning. The method further includes, while continuing to scan for available receivers within the vehicle: (i) receiving, by a connector of the transmitter, where the connector is coupled to a power source of the vehicle, electrical current from the power source that is used by the transmitter to generate a plurality of power waves, (ii) receiving, by the wireless communication component of the transmitter, a charging request from the second receiver within the vehicle, (iii) adjusting, by a controller of the transmitter, respective gains and phases of at least a second set of the plurality of power waves, and (iv) transmitting the second set of the plurality of power waves such that the second set of the plurality of power waves converge to form a second constructive interference pattern, distinct from the first constructive interference pattern, in proximity to a location of the second receiver within the vehicle.

In some embodiments, the charging request (i) corresponds to a request for wirelessly delivered power from the transmitter, and (ii) is sent by the second receiver when a charge level of the second receiver is less than a minimum level of charge.

FIGS. 5A-5D illustrate additional embodiments of wireless power transmission systems associated with vehicles, in accordance with some embodiments.

Figure 5A:
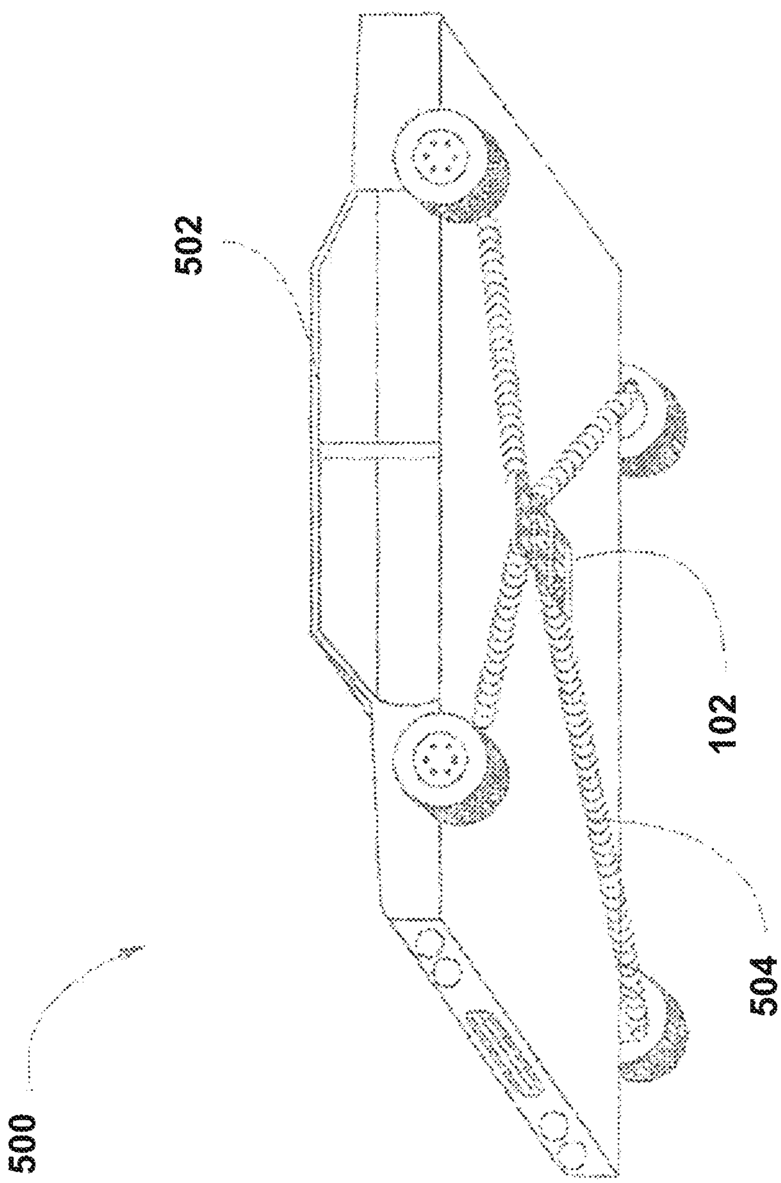
FIG. 5A illustrates a wireless power transmission system used for providing power to sensors on a bottom portion of a vehicle, in accordance with some embodiments.

FIG. 5A illustrates a wireless power transmission system 500 where a transmitter 102 may provide wireless power, through pocket-forming, to sensors in the bottom part of a car 502. Transmitter 102 can be placed in the bottom of car 502, and may power, for example, tire pressure gauges, brake sensors and the like. The foregoing gauges and sensors may include embedded or otherwise operatively coupled receivers (not shown) (e.g., an embodiment of the receiver 120, FIG. 1) for converting pockets of energy into usable energy. Even though the paths of RF waves 504 appear to be in straight lines, transmitter 102 can bounce RF waves 504 off of suitable reflecting areas of car 502 to improve power delivery efficiency. One of the main advantages of the foregoing disclosed configuration of the wireless power transmission system 500 may be the cost-effective solution of eliminating the wires required for powering the aforementioned sensors in the bottom of car 502.

Figure 5B:
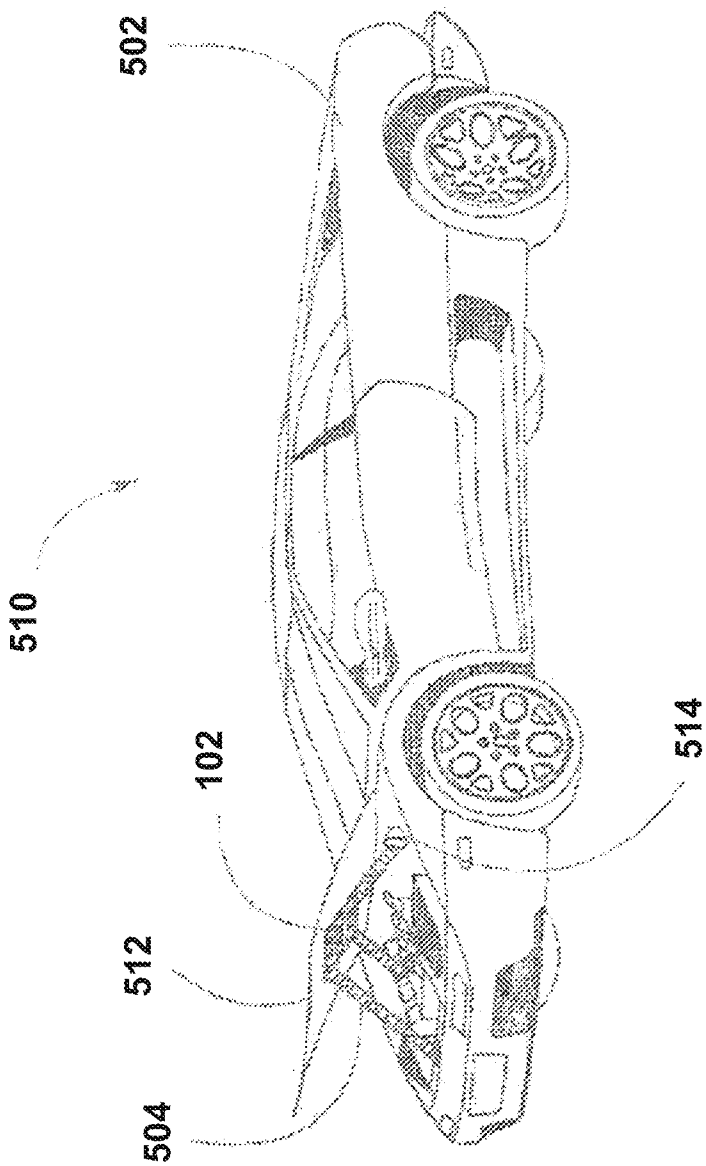
FIG. 5B illustrates a wireless power transmission system used for providing power to sensors located in an engine compartment of a vehicle, in accordance with some embodiments.

FIG. 5B illustrates a wireless power transmission system 510 where a transmitter 102 may provide wireless power, through pocket-forming, to sensors in the engine compartment of a car 502. Transmitter 102 can be placed in the bottom internal surface of a hood 512 (or other suitable locations) of car 502 in order to power engine sensors such as throttle position sensors, engine coolant temperature sensors, barometric sensors and the like. The transmitter 102 can use reflecting areas from the engine compartment of car 502 to bounce off RF waves 504 (e.g., power waves 116, FIG. 1) to improve power delivery efficiency. In some embodiments, transmitter 102 can be used to power the sensors present in typical alarm systems, for example, door sensors, pressure sensors (for the interior of car 502), shock sensors and the like. In other embodiments, transmitter 102 can function as an alternate or main power supply for alarm speakers 514.

Figure 5C:
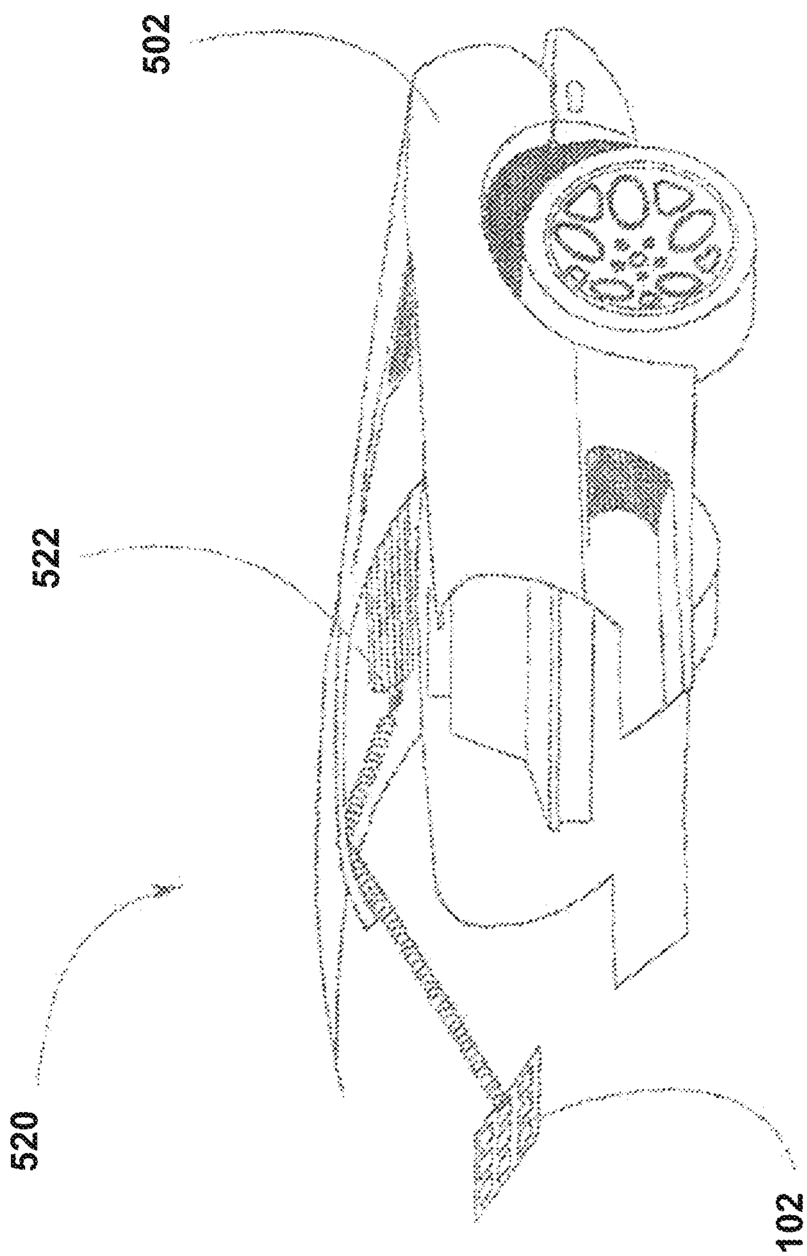
FIG. 5C illustrates a wireless power transmission system used for providing power to sensors located in a passenger compartment of a vehicle, in accordance with some embodiments.

FIG. 5C illustrates a wireless power transmission system 520 where a transmitter 102 may provide wireless power, through pocket-forming, to sensors, gauges or small miscellaneous devices in the interior of a car 502. In some embodiments, transmitter 102 can be placed in the instrument panel (not shown) of car 502. In this particular embodiment, transmitter 102 is shown to be powering a rear window defroster 522 of car 504, and thus diminishing the need for wires. In some embodiments, transmitter 102 can provide power to the actuators in the car windows, and even to the interior lighting system.

Figure 5D:
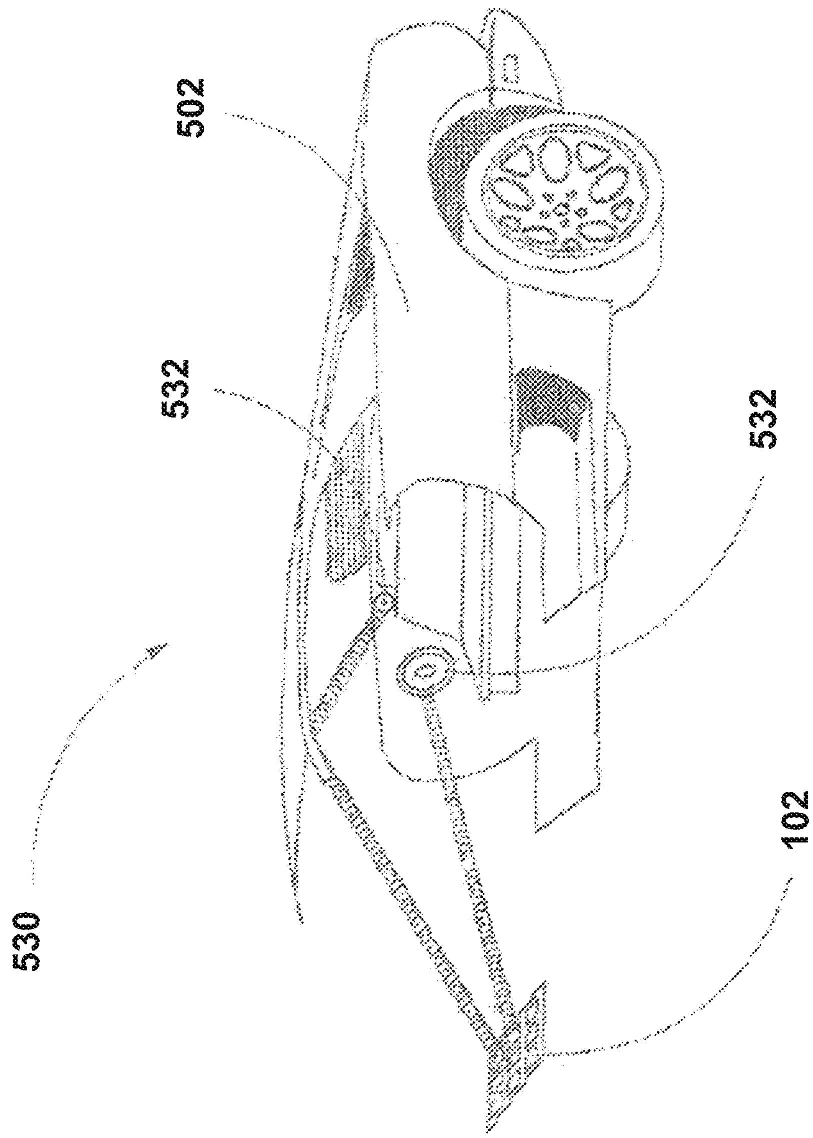
FIG. 5D illustrates a wireless power transmission system used for providing power to devices located in a passenger compartment of a vehicle, in accordance with some embodiments.

FIG. 5D illustrates a wireless power transmission system 530 where a transmitter 102 may provide wireless power, through pocket-forming, to devices in the interior of car 502.

In this embodiment, transmitter 102 can provide wireless power to speakers 532 while eliminating the use of wires.

FIGS. 5A-5D illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 5A-5D.

Presented below are example systems and methods of wirelessly delivering power to receivers on or within a vehicle.

In some embodiments, an example method includes defining, by a transmitter, a pocket of energy within a vehicle via a plurality of wireless power transmission waves emitted by the transmitter, the vehicle including the transmitter, a receiver, and a vehicle sensor coupled to the receiver. The method further includes interfacing, by the receiver, with the pocket of energy within the vehicle, and providing, by the receiver, power to the vehicle sensor based on the interfacing.

In some embodiments, the vehicle includes a bottom portion, and the transmitter is located in the bottom portion. The sensor is at least one of a tire pressure sensor and a brake sensor.

Alternatively or in addition, in some embodiments, the vehicle includes an engine compartment and the transmitter is located in the engine compartment. In such embodiments, the sensor is an engine sensor.

In some embodiments, an example system includes a vehicle, one or more sensors coupled to the vehicle, and a transmitter coupled to the vehicle (e.g., an exterior of the vehicle). The vehicle is configured to power the transmitter and the transmitter is configured to define a pocket of energy within the vehicle via a plurality of wireless power transmission waves emitted by the transmitter. The system further includes a receiver coupled to the vehicle. The sensor is coupled to the receiver and the receiver is configured to power the sensor by interfacing with the pocket of energy.

FIGS. 6A-6D provide examples of wireless power transmission for wirelessly delivering power to cordless power tools, in accordance with some embodiments.

Referring to FIG. 6A, a wireless power transmission system 600 may include a transmitter 102 embedded in a toolbox 602 to wirelessly charge or power one or more cordless power tools 604, according to an embodiment. Toolbox 602 may be capable of storing and transporting a plurality of cordless power tools 604 and other related tools or components. Transmitter 102 may be embedded in a region or area of toolbox 602 suitable for transmitting RF waves 116 towards receiver 120 which may be attached or operatively coupled to the battery 606 of cordless power tool 604. For example, transmitter 102 may be positioned at the top right corner of toolbox 602 housing to direct RF waves 116 towards receiver 120 for the generation of pockets of energy capable of wirelessly charging the battery 606 of cordless power tool 604. The cordless power tool 604 may be an example of the electronic device 122.

Toolbox 602 may also include a battery 603 which may be operatively coupled with transmitter 102 through a cable (not shown) for allowing the generation and transmission of RF waves 116 as required by the application. Simply put, battery 603 may function as a power source for transmitter 102. In some embodiments, toolbox 602 may be connected to an external power source 608 to charge battery 603 through a suitable cable 610, while simultaneously powering transmitter 102 for the generation and transmission of RF waves 116 directed towards receiver 120, which can be embedded or attached to cordless power tool 604. External power source 608 source may include a 120/220 AC volt outlet, in which case toolbox 602 may include a suitable AC/DC converter (not shown) for converting AC voltage and supplying DC voltage to battery 603 for charging.

In another embodiment, when battery 603 is charged to a suitable level, toolbox 602 may be disconnected from external power source 608, and subsequently carried and positioned in a desired working area where cordless power tool 604 may be used. In this case, transmitter 102 may receive power for the generation and transmission of RF waves 116 solely and directly from battery 603. Charged battery 603 in toolbox 602 may provide enough charge to transmitter 102 for the generation of pockets of energy within a power range of about 1 watt to about 5 watts, and within a working distance of about 5 ft. to about 20 ft. These power levels of pocket of energy may be suitable for charging the battery 606 of cordless power tool 604 while in use, or at least extending the life of battery 606 during operation. In general, the power and range of the generated RF waves 116 may vary according to the number of antenna elements, distribution, and size of transmitter 102. A cordless power tool 604 not in use or in standby can also be charged by a transmitter 102 embedded in toolbox 602.

FIG. 6B shows another configuration of the wireless power transmission system 600. In this configuration, the portable toolbox 602 may be located on or within a vehicle 612, according to an embodiment. Vehicle 612 may be a private car or a service van commonly used by technicians having to perform field work or related activities. Similarly as in FIG. 6A, toolbox 602 may be connected to external power source 608 for charging battery 603 and powering transmitter 102. External power source 608, in this case, may be the battery of vehicle 612. Toolbox 602 may be operatively coupled to external power source 608 through a suitable connection that includes a car lighter socket 614 and cable 616. In order to avoid draining the battery of vehicle 612, engine 618 may be on or running when charging battery 603 or powering transmitter 102 in toolbox 602. In some embodiments, transmitter 102 may generate and direct RF waves 116 towards the receivers 120 embedded or attached to one or more cordless power tools 604 for the wireless charging of batteries 112. Transmitter 102 in toolbox 602 may wirelessly charge or power two or more cordless power tools 604 simultaneously or sequentially according to the power or application requirements. Transmitter 102 in toolbox 602 may also charge a spare battery 620 having a suitable receiver 120 attached.

In some embodiments, when battery 603 in toolbox 602 is charged to a suitable level, toolbox 602 can be disconnected from the car lighter socket 614 and placed at a location outside vehicle 612. Transmitter 102 in toolbox 602 may subsequently generate RF waves 116 which may wirelessly charge or at least extend the life of batteries 606 during the operation of cordless power tools 604, in this case, transmitter 102 may be energized directly from the charged battery 603 in toolbox 602. In some embodiments, a surface area of the antenna array 110 (FIG. 1) of the transmitter 102 embedded in toolbox 602 may range from approximately two $in^2$ to about 12 $in^2$ depending on the dimensions of toolbox 602.

FIG. 6C illustrates an additional configuration of wireless power transmission system 600. In this configuration, transmitter 102 may be configured in the doors or windows of vehicle 612, according to an embodiment. Specifically, the antenna array of transmitter 102 may be configured to fit one window of vehicle 612. In such a case, the antenna array may include between about 300 and about 600 antenna elements distributed within a surface area that may vary between about 90 $in^2$ and about 160 $in^2$. This increased number of antenna elements and footprint of transmitter 102 may allow for a higher level of power distribution and reach of the emitted RF waves 116 as compared to the embodiment shown in FIG. 6B. For example, transmitter 102 within the specified dimensions and number of antenna elements may emit RF waves 116 capable of generating a pocket of energy between about 1 Watt and 10 Watts of power, and within a distance of about 30 ft and about 50 ft.

In FIG. 6C, transmitter 102 may be constantly and directly connected to an external power source 608 such as vehicle 612 battery via car lighter socket 614 and cable 616. Engine 618 may be on or running when transmitter 102 is in operation in order to prevent draining of the vehicle's 612 battery. Transmitter 102 may generate and direct RF waves 116 towards the receivers 120 embedded or attached to one or more cordless power tools 604 for the charging of batteries 606. Transmitter 102 may wirelessly charge or power two or more cordless power tools 604 simultaneously or sequentially according to the power or application requirements. Transmitter 102 may also wirelessly charge a spare battery 620 having a suitable receiver 120 attached.

Figure 6D:
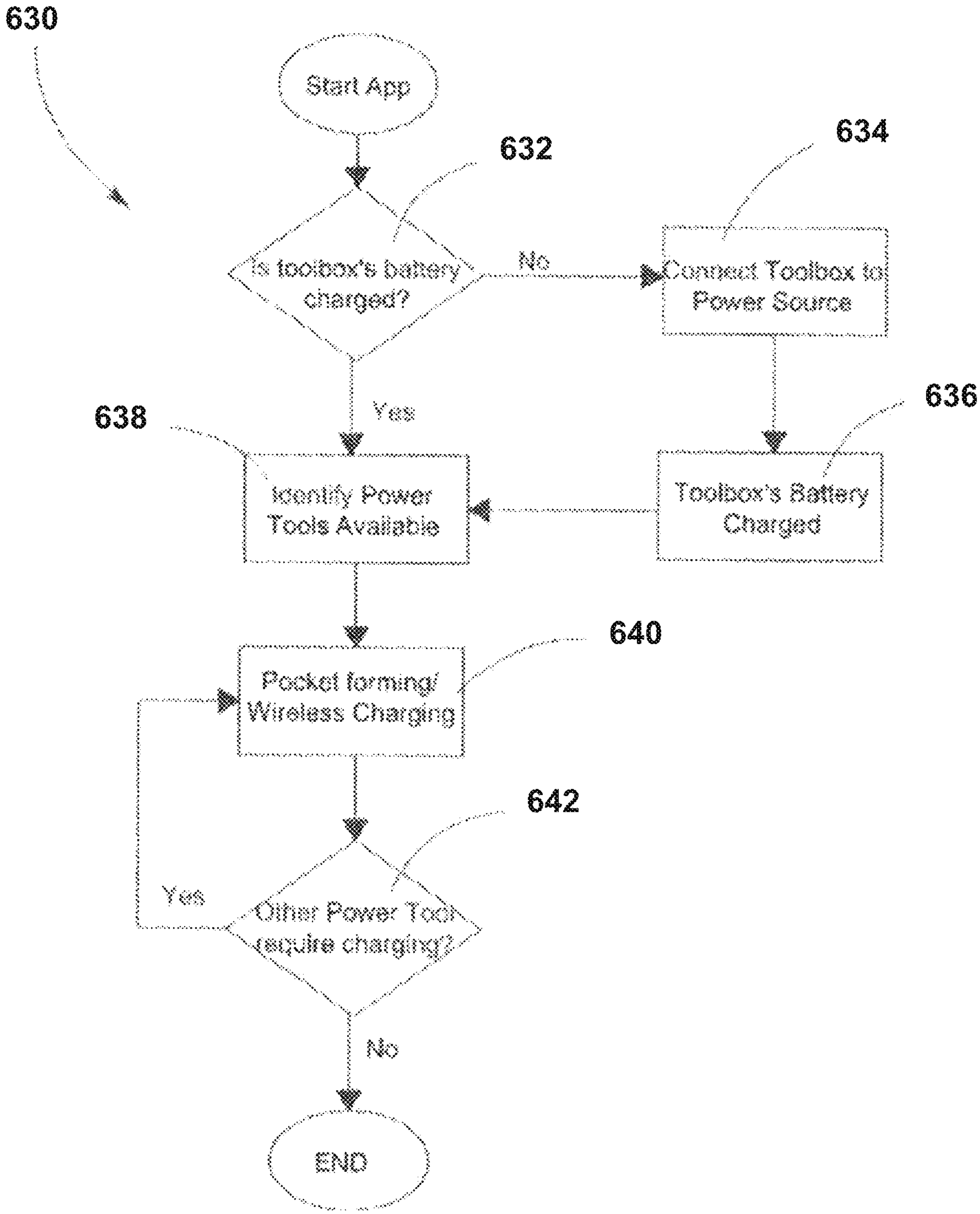
FIG. 6D is a flow diagram of wirelessly charging or powering one or more cordless power tools, in accordance with some embodiments.

FIG. 6D shows a flowchart of a wireless power transmission process 630 that may be implemented for charging one or more cordless power tools 604 using toolbox 602 as a portable device. This process may be applicable to the embodiments of wireless power transmission systems 600 shown in FIGS. 6A-6C.

Wireless power transmission process 630 may begin by checking the charge levels of battery 603 embedded in toolbox 602, at block 632. This charge check may be performed by a control module included in toolbox 602 (not shown in FIGS. 6A-6B) or by micro-controller (e.g., processor 104, FIG. 1) in transmitter 102, which may be operatively connected to battery 603. Different charging levels for battery 603 may be established for maintaining suitable operation. For example, minimum and maximum charging thresholds may be established at about 25% and 99% of total charge respectively. At block 634, if battery 603 charge is below the minimum threshold or 25%, then toolbox 602 can be connected to external power source 608 using cable 610, where external power source 608 may include vehicle 612 battery or a standard 120/220 AC volts outlet as explained in FIGS. 6A-6B. When battery 603 charge is at 99% or at least above 25%, toolbox 602 can be disconnected from external power source 608, at block 436.

If battery 603 is charged to a suitable level, specifically between about 25% and about 99%, then wireless power transmission process 630 may continue at block 638, where communications component 112 in transmitter 102 may identify one or more cordless power tools 604 that may require wireless charging. Charging or powering priorities and other parameters such as power intensity and pocket-forming focus/timing may be established using a control module included in toolbox 602 or micro-controller in transmitter 102. For example, based on charging or powering priorities, transmitter 102 may be configured to first provide wireless charging to cordless power tools 604 in use, followed by cordless power tools 604 in standby, and lastly to spare batteries 620.

After cordless power tools 604 are identified and charging priorities/parameters in transmitter 102 are set, transmission of RF waves 116 towards the designated cordless power tools 604 or spare batteries 620 can begin, at block 640, where these RF waves 116 may generate pockets of energy at receivers 120 for powering or charging one or more cordless power tools 604 and spare batteries 620 sequentially or simultaneously.

Using communications component 112, transmitter 102 in toolbox 602 may continuously check if there are other cordless power tools 604 or spare batteries 620 that may require wireless charging or powering, at block 642. If new or additional cordless power tools 604 or spare batteries 620 are identified, then transmitter 102 in toolbox 602 may wirelessly charge the identified cordless power tools 604 and spare batteries 620 according to the established charging priorities and parameters. If no further cordless power tools 604 are recognized by communications component 112 in transmitter 102, then wireless power transmission process 630 may end.

FIGS. 6A-6D illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 6A-6D.

Presented below are example methods of wirelessly delivering power to cordless power tools.

In some embodiments, an example method includes establishing, by a transmitter, a connection with a power source; generating, by the transmitter, a plurality of power transmission waves to form a pocket of energy; receiving, by the transmitter, a transmission of a power requirement of a cordless power tool and a receiver location; and transmitting, by the transmitter, the power transmission waves through at least two antennas coupled to the transmitter in response to the received transmission.

In some embodiments, the transmitter establishes communication with the receiver when the cordless power to the cordless power tool is within a predetermined distance (e.g., a distance of 10 feet or less) from the transmitter.

In some embodiments, another example method includes establishing, by a transmitter that is coupled to at least two antennas for transmitting power transmission waves to a plurality of cordless power tools, a connection with a power source that is used to charge a battery of the transmitter and determining, by the transmitter, whether the battery has a charge level that is above a threshold charge level. The method further includes, in accordance with determining that the battery has the charge level that is above the threshold charge level, identifying, by a communication component of the transmitter that is distinct from the at least two antennas of the transmitter, a cordless power tool of the plurality of cordless power tools that requires wireless charging. The method further includes receiving, by the communication component of the transmitter, information that identifies a power requirement of the cordless power tool and a location of a receiver that is coupled to the cordless power tool and transmitting, by the transmitter, a plurality of power transmission waves through the at least two antennas in response to the received information, and the plurality of power transmission waves are transmitted so that the plurality of power transmission waves converges to form a pocket of energy in proximity to the location of the receiver.

Figure 7A:
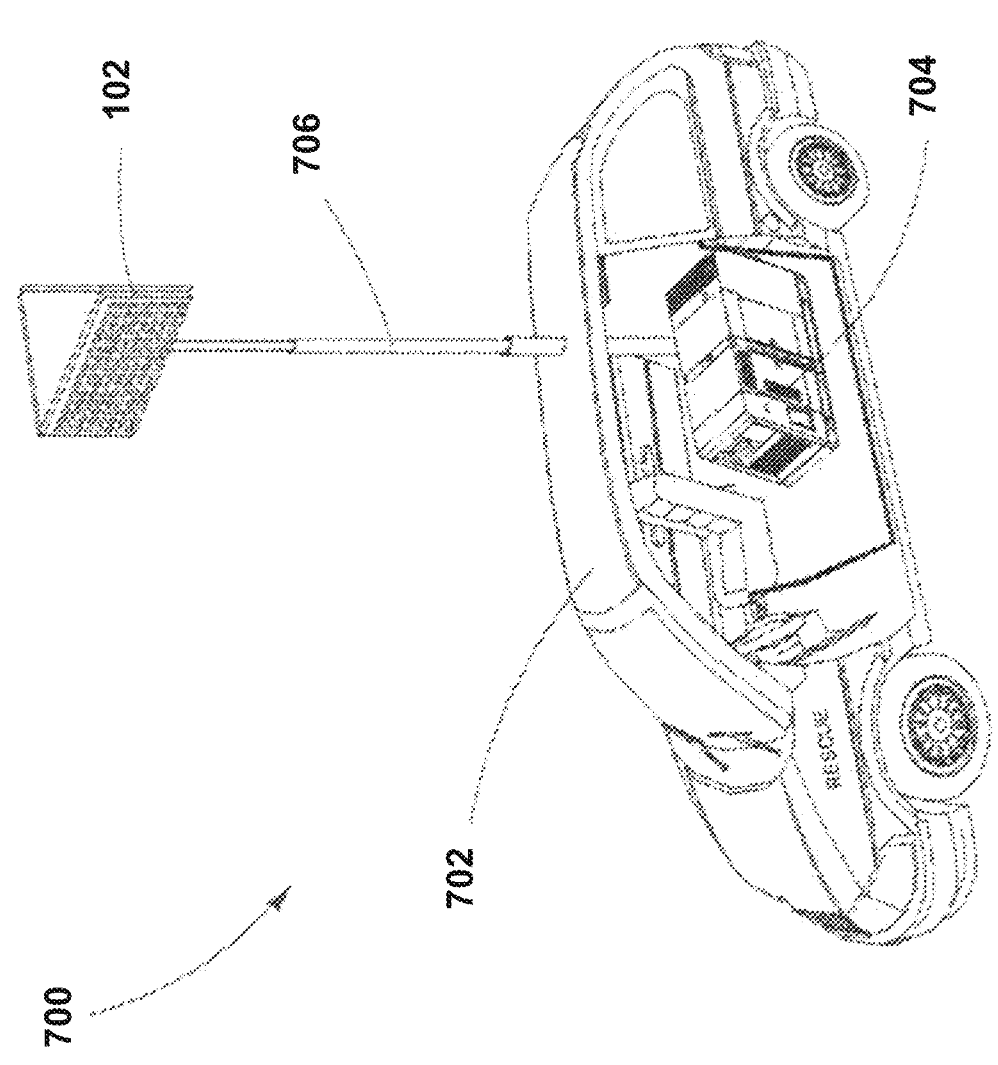
FIG. 7A illustrates a wireless power transmission system having a transmitter attached to a mast of a rescue vehicle, in accordance with some embodiments.
Figure 7B:
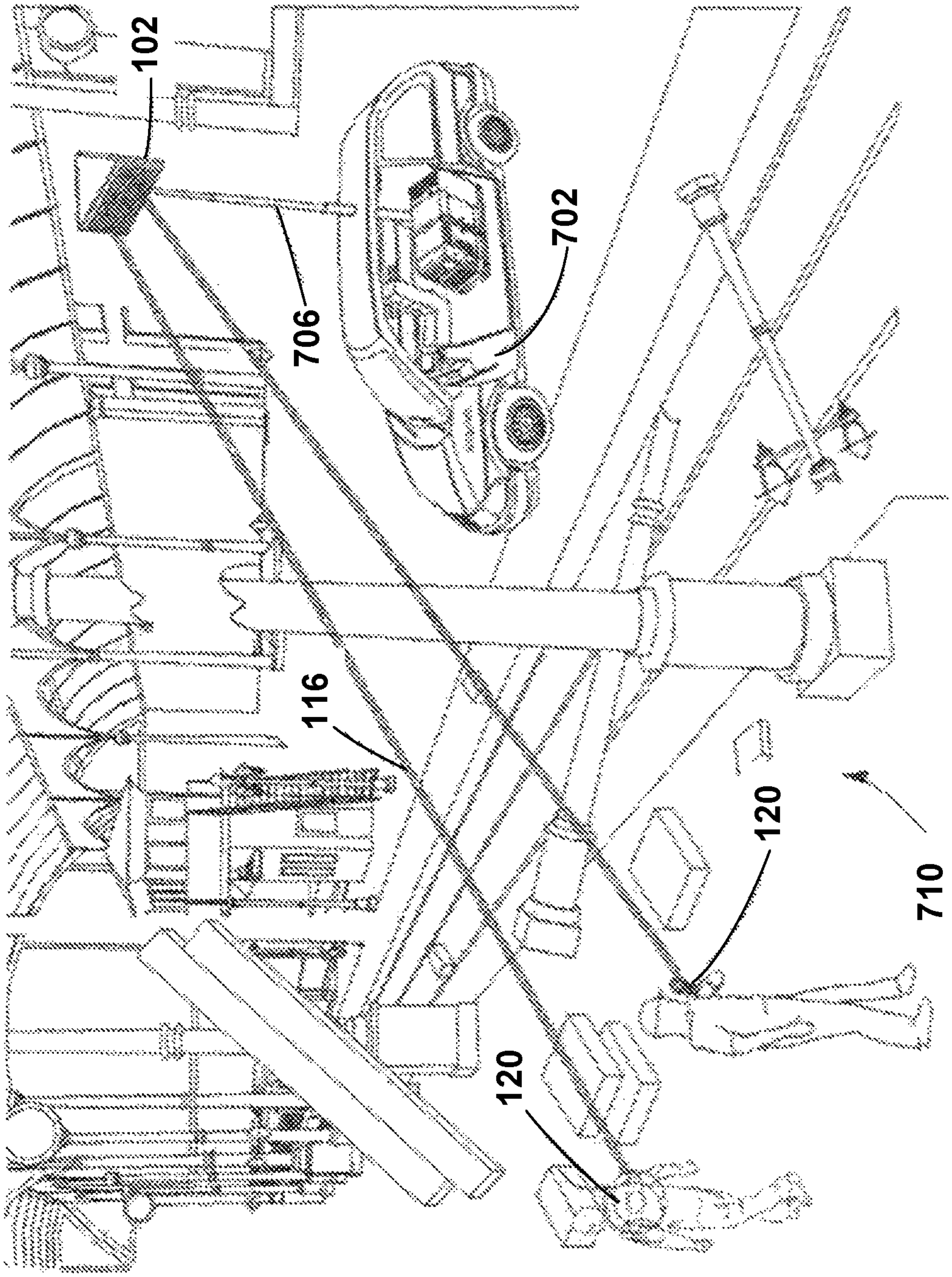
FIG. 7B illustrates a rescue vehicle with a transmitter operating in a disaster zone, in accordance with some embodiments.

FIGS. 7A-7B illustrate wireless power transmission systems used in rescue situations, in accordance with some embodiments.

FIG. 7A shows a configuration of wireless power transmission system 700 where a transmitter 102 may be located on or within a vehicle 702, according to some embodiments. Vehicle 702 may be a rescue car, fire truck, ambulance and the like. Transmitter 102 may use a diesel generator 704 as power source 210. However, other power sources may be employed too. Transmitter 102 may generate and direct RF waves 116 towards receivers 120 embedded or attached to rescue devices such as lamps, GPS, radios, cellphones, lights, among others. In addition, transmitter 102 in vehicle 702 may wirelessly extend the life of batteries in the previously mentioned devices during the operation.

Transmitter 102 may be located in a telescopic mast 706, which may be lifted up for increased range of wireless powering. Furthermore, other transmitter 102 configurations may be used in dependency of the region and requirements, such requirements may include low profile transmitters for a higher stability of vehicle 702 during gales or winds with high speed.

FIG. 7B illustrates a disaster zone 710, where a rescue vehicle 702 provides power and charge to a variety of rescue devices of a rescue team. Vehicle 702 may include a transmitter 102 located at the top of a telescopic mast 706. RF waves 116 may be transmitted through obstacles and may be reflected on objects for reaching receivers 120.

Receivers 120 may allow tracking of vehicle 702, such a feature may allow the capacity to operate beyond the range of transmitter 102 through the charge on the batteries. When batteries have low charge, receivers 120 may guide its user to vehicle 702 in order to obtain charge.

Vehicle 702 may operate and reach sharper areas than vehicles with a wired power source, such capability is enabled through the wireless power transmission, which allows a higher mobility than cabled power sources.

FIGS. 7A-7B illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 7A-7B.

Presented below are example methods of wirelessly delivering power to rescue devices.

In some embodiments, an example method includes generating power RF signals from a RF circuit connected to the transmitter controlling the generated RF signals with a controller to provide a power RF signal and short RF communication signals; transmitting the power RF and short RF communication signals, through antenna elements connected to the transmitter, capturing power RF signals in a receiver with an antenna connected to the rescue electronic device to convert the pockets of energy into a DC voltage for charging or powering the rescue electronic device; and communicating power requirements of the rescue electronic device and the receiver location information between the pocket-forming transmitter and receiver with the short RF signals.

In some embodiments, the power source is a mobile diesel generator, a mobile gasoline generator or a vehicle generator or battery.

In some embodiments, the transmitter includes a housing suitable for field use, at least two antenna elements, at least one RF integrated circuit, at least one digital signal processor (DSP), and a communication component for generating the power RF and short RF signals.

In some embodiments, a telescopic mast connected to the transmitter is used to elevate the transmitter above the clutter at a rescue site.

In some embodiments, the method further includes extending the transmission distance of the pocket-forming transmitter by mounting the pocket-forming transmitter a predetermined height with the telescopic mast connected to a top surface of a vehicle including a fire truck, ambulance, rescue truck or other rescue vehicle.

In some embodiments, another example method includes, at a wireless power transmitter that includes a receiver antenna element, a radio frequency (RF) circuit, and a plurality of transmitter antenna elements, and the wireless power transmitter is connected to a power source and a telescoping mast of a mobile vehicle, the telescoping mast extending in a vertical direction above the mobile vehicle, receiving, via the receiver antenna element, a communication signal from a receiver device positioned at a location within a transmission range of the wireless power transmitter and controlling, via the RF circuit, operation of the plurality of transmitter antenna elements to generate wireless power transmission RF signals having predetermined phases and amplitudes using power from the power source. The method further includes transmitting and steering, via the RF circuit, the wireless power transmission RF signals via the plurality of transmitter antenna elements so that the wireless power transmission RF signals constructively interfere at the location.

Figure 8A:
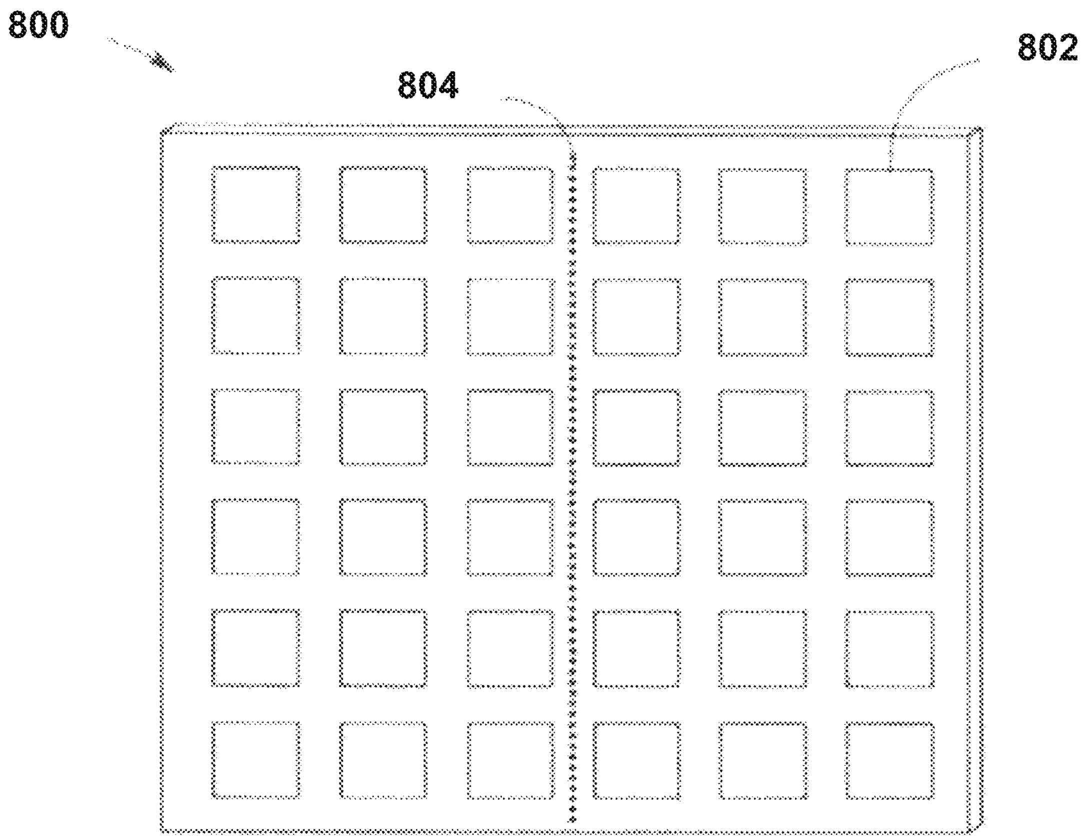
FIG. 8A illustrates an example multi-mode transmitter, in accordance with some embodiments.

FIG. 8A illustrates an example embodiment of a multimode transmitter. Some elements of this figure are described above.

A multimode transmitter 800, such as transmitter 102, is configured to operate as or includes a wireless power router and/or a communication network router, whether in a serial manner, such as one at a time, or a parallel manner, such as concurrently. More particularly, transmitter 800 is configured to define a pocket of energy via a plurality of wireless power waves so that a first receiver is able to interface with the pocket of energy, as described herein. Transmitter 800 is configured to emit the wireless power waves, as described herein. For example, at least one of the wireless power waves can be based on a radio frequency.

Transmitter 800 is also configured to provide a network communication signal to a second receiver so that the second receiver is able to interface with the network signal (i.e., is able to access the Internet using the network signal). Such provision can be performed in a wired manner, such as via a cable, a wire-line, or others. Such provision can also be performed in a wireless manner, such as optical, radio, laser, sound, infrared, or others. Such provision can based at least in part on the transmitter receiving a unique identifier from the second receiver, such as a media access control (MAC) address. For example, the network signal includes at least one of an Ethernet signal, a WI-FI signal, an optical signal, a radio signal, an infrared signal, a laser signal, or another type of signal, whether via a short range communication protocol, such as BLUETOOTH, or via a long range communication protocol, such as a satellite signal or a cellular signal, such as a cell site. The network signal is based at least in part on a network, and the network is or includes at least one of a local area network (LAN), a wide area network (WAN), a storage area network (SAN), a backbone network, a metropolitan area network, a campus network, a virtual private network, a global area network, a personal area network (PAN), or others, whether for an intranet, an extranet, an internetwork, or darknet.

Transmitter 800 includes a plurality of antenna elements 802, as described herein, and a radio frequency integrated circuit (RFIC). Antenna elements 802 and RFIC are arranged in a flat array arrangement, which reduces losses due a shorter distance between components. However, other types of arrangements are possible, such as non-flat, for instance, hemispherical. Transmitter 800 is configured to regulate a phase and an amplitude of pocket-forming operations in antenna elements 802, as described herein. For example, such regulation can be via corresponding RFIC in order to generate a desired pocket-forming output and null-space steering. Furthermore, transmitter 800 can be configured so that multiple pocket-forming outputs may charge a higher number of receivers and allow a better wave trajectory to such receivers. Transmitter 800 can include an omnidirectional antenna.

In some embodiments, transmitter 800 includes or is coupled to a plurality of arrays comprising antenna elements 802. Such coupling can be direct or indirect, wired or wireless, and/or local or remote. For example, such coupling can be via a wire spanning between transmitter 800 and at least one of such arrays. Note that such arrays can be embodied as one unit or a plurality of inter-coupled units or intra-coupled units. Such coupling can be direct or indirect, wired or wireless, and/or local or remote. For example, such coupling can be via a wire spanning between at least two of such arrays. Also, note that at least two of such arrays can be identical to each other or different from each based on at least one of structure, function, shape, size, coupling characteristics, or material properties. A presence of such arrays may increase or decrease a number of antenna elements 802 operating for each application, such as either for a wireless power transmission or a communication network signal transmission. In some embodiments, transmitter 800 lacks distinct array division, such as visual, such as into the first portion and the second portion. Resultantly, at least one of such arrays comprising antenna elements 802 operates for the communication network signal transmission only, and the switch, as described herein, changes an operational mode to enable the power router functionality. For example, transmitter 800 is configured to operate such that a first portion of an array, as described herein, such as a half, transmits the network signal, such as a WI-FI signal, and a second portion of the array, such as the other half, defines the pocket of energy, such as described herein. Line 804 represents a division in the array arrangement. Note that although the first portion and the second portion are symmetrical, the first portion and the second portion can be asymmetrical. Also, note that the first portion and the second portion can differ from each other or be identical to each other in at least one of a shape, a size, and a number of antenna elements 802.

In some embodiments, transmitter 800 includes an antenna, as described herein. Therefore, transmitter 800 defines the pocket and provides the network signal via the antenna. Transmitter 800 can define the pocket and provide the signal simultaneously. Alternatively or additionally, transmitter 800 is configured to switch between a first operational mode and a second operational mode. Resultantly, transmitter 800 includes a switch configured to switch between the first mode and the second mode. The switch can be hardware based, such as an A/B switch, a knob, or a lever. The switch can also be software based, such as via a set of processor-executable instructions, for instance. via machine code. Such switch can switch manually, such as via a user input, for instance, via a button. Such switch can also switch automatically, such as via a set of processor-executable instructions, for instance via machine code. In the first mode, transmitter 800 defines the pocket only. In the second mode, transmitter 800 provides the network signal only. For example, such switch can be an A/B switch, whether manually switchable or automatically switchable, based on at least one input criterion, which can be remotely updateable. Note that transmitter 800 can be configured so that the communication network router functionality and the wireless power functionality are simultaneously operating, such as parallel operation, whether dependent or independent on each other, or only the communication network router functionality or the wireless power functionality operates at one time, such as serial operation, whether dependent or independent on each other.

In some embodiments, transmitter 800 includes a first antenna, as described herein, and a second antenna, as described herein. Therefore, transmitter 800 defines the pocket via the first antenna and provides the network signal via the second antenna. The first antenna and the second antenna can be controlled via a controller, whether or not transmitter 800 includes such controller, whether or not such controller is local or remote to transmitter 800, whether or not such controller is directly or indirectly coupled to at least one of the first antenna and the second antenna. Note that the first antenna and the second antenna can be part of a larger antenna, such as an array. Also, note that the first antenna and the second antenna can be coupled to each other. Further, the first antenna and the second antenna can be not coupled to each other. Transmitter 800 is configured to that the first antenna defines the pocket of energy and the second antenna provides the network signal simultaneously. Alternatively or additionally, transmitter 800 is configured to switch between a first operational mode and a second operational mode. Resultantly, transmitter 800 includes a switch configured to switch between the first mode and the second mode. The switch can be hardware based, such as an A/B switch, a knob, or a lever. The switch can also be software based, such as via a set of processor-executable instructions, for instance via machine code. Such switch can switch manually, such as via a user input, for instance, via a button. Such switch can also switch automatically, such as via a set of processor-executable instructions, for instance via machine code. In the first mode, transmitter 800, via the first antenna defines the pocket only. In the second mode, transmitter 800, via the second antenna, provides the network signal only. However, in some embodiments, the transmitter 800 includes a plurality of antennas, as described herein, such as at least two, defining the pocket of energy. In some embodiments, the plurality of antennas further provides the network signal. For example, such switch can be an A/B switch, whether manually switchable or automatically switchable, based on at least one input criteria, which can be remotely updateable. Note that transmitter 800 can be configured so that the communication network router functionality and the wireless power functionality are simultaneously operating, such as parallel operation, whether dependent or independent on each other, or only the communication network router functionality or the wireless power functionality operates at one time, such as serial operation, whether dependent or independent on each other.

In some embodiments, a device includes the first receiver and the second receiver. For example, an electronic device, such as a smartphone, includes the first receiver, embodied as a first hardware unit, as described herein, and the second receiver, embodied as a second hardware unit, such as a WI-FI card. Note that the first receiver is physically distinct from the second receiver, whether or not the first receiver is operably coupled to the second receiver. However, in other embodiments, a first device, such as a smartphone, includes the first receiver and a second device, such as a tablet computer, includes a second receiver. Yet, in other embodiments, the first receiver and the second receiver are one receiver, such as described herein.

In some embodiments, transmitter 800 includes a network communication unit, which can include the communication network router or be coupled to the communication network router, such as via wiring. Such unit can facilitate transmitter 800 in providing the network signal. Such unit can be implemented via hardware, such as a chip or an appliance, and/or software, such as a module or a software application, in any combination. Such unit can communicate in at least one of a wired manner and a wireless manner. Such unit includes at least one of a router, a network bridge, a firewall, a modem, a network switch, a printer server, or a network repeater. At least two of such components can be structurally distinct from each other or embodied as one unit. At least two of such components can be functionally distinct from each other or function as one unit.

The network bridge enables a connection, whether direct or indirect, such as a link, a path, a network, or a channel, between a plurality of communication networks for inter-communication there between. For example, a first network can be a wired network and a second network can be a wireless network, where the network bridge bridges the first network and the second network so that members of each of the first network and the second network can communicate with each other through the network bridge. Note that the first network and the second network can be of one type, such as based on a common protocol, such as Ethernet, or of different types, such as where the bridge translates a plurality of protocols. Also, note that the plurality of networks can be local to each other or remote from each other in any manner.

The firewall enables control, whether direct or indirect, of at least one of incoming network traffic and outgoing network traffic based on a set of rules applied thereon. For example, the firewall can operate as a barrier between a first network and a second network. The firewall can be network-layer based or a packet-filter based. The firewall can also be application-layer based. The firewall can also be proxy-server based. The firewall can also be network address translation based.

The modem enables signal modulation and signal demodulation. The modem can be a networking modem, such as a broadband modem, or a voice modem.

The network switch enables a connection, whether direct or indirect, of a plurality of devices together on a communication network via packet switching, such as based on a unique network address, for instance MAC address. The switch operates at least one level of an Open Systems Interconnection model (OSI) model, including at least one of a data link layer and a network layer. The network switch can be a multilayer switch. The network switch can be managed or unmanaged.

The print server enables a connection, whether direct or indirect, of a printer to a computer, such as a desktop computer or a laptop computer, over a network. The printer server can receive a print job from the computer, manage the job with other, if any, and send the job to the printer. In some embodiments, the print server is a networked computer. In some embodiments, the print server is a dedicated network device. In some embodiments, the print server is a software application.

The network repeater enables a regeneration or a retransmission of a signal at a higher level or a higher power than when received, such as due to a transmission loss. The network repeater can communicate such signal over an obstruction or extend a range of the signal. The network repeater can translate the signal from a first communication protocol to a second communication protocol. In some embodiments, transmitter 800 is configured for tethering, such as connecting one device to another. For example, transmitter 800 allows sharing of a network connection with another device, such as a tablet or a smartphone. Such tethering can be done over any type of network described herein. The tethering can be in a wired manner or a wireless manner.

In some embodiments, the network signal is encrypted, whether onboard or via another device. Such encryption can be performed via a symmetric key architecture, where an encryption key is identical to a decryption key. For example, the key can include alphanumeric or biometric information. However, the network communication signal is encrypted via a public key encryption architecture, such as comprising a public key and a private key, for instance a Pretty Good Privacy (PGP) method. The network signal can be encrypted automatically, such as via an algorithm, for instance a set of processor-executable instructions. However, the network signal can also be encrypted manually, such as via a user input. The network signal can be decrypted in a manner, as described herein. Also, transmitter 800 can include at least one of an encryption chip and a decryption chip to facilitate the provision of the encryption signal. Note that the encryption chip and the decryption chip can be embodied as at least one of a functional unit and a structural unit.

In some embodiments, transmitter 800 is configured to define the pocket via a signal path to the first receiver. The signal path is defined via transmitter 800 based at least in part on at least one of a gain information obtained from the second receiver and a phase information obtained from the second receiver. At least one of the gain information and the phase information can be obtained based on transmitter 800 providing the network signal, such as based at least in part on receiving a response from the second receiver.

In some embodiments, transmitter 800 defines the pocket of energy adaptively, as described herein, based on providing the network signal. Such adaption can be based at least in part on at least partially avoiding at least a wireless power wave obstacle portion, such as a chair, positioned between transmitter 800 and the first receiver. For example, transmitter 800 can define the pocket of energy via a signal path to the first receiver. The signal path is defined via transmitter 800 based at least in part on at least one of a gain information obtained from the second receiver and a phase information obtained from the second receiver, such as based at least in part on receiving a response from the second receiver. The at least partially avoiding is based at least in part on the signal path, as previously established.

In some embodiments, transmitter 800 defines the pocket of energy indoors, such as within a structure, for instance, a building, a tunnel, a vehicle, a hangar, a warehouse, a tent, an arena, or others. Such defining can be based at least in part on bouncing at least one of the wireless power waves from at least one of a floor, a wall extending from the floor, and a ceiling extending from the wall. For example, transmitter 800 can define the pocket of energy via a signal path to the first receiver. The signal path is defined via transmitter 800 based at least in part on at least one of a gain information obtained from the second receiver and a phase information obtained from the second receiver, such as based at least in part on receiving a response from the second receiver. The bouncing is at least until the signal path is defined. However, in other embodiments, transmitter 800 defines the pocket of energy outdoors, such as at a camp site, an air field, a vehicle, a stadium, a street, a yard, a park, a field, or others.

In some embodiments, transmitter 800 is configured to determine a position of the first receiver based at least in part on a signal triangulation of the second receiver, such as a cellular signal. Transmitter 800 defines the pocket of energy based at least in part on the position.

Figure 8B:
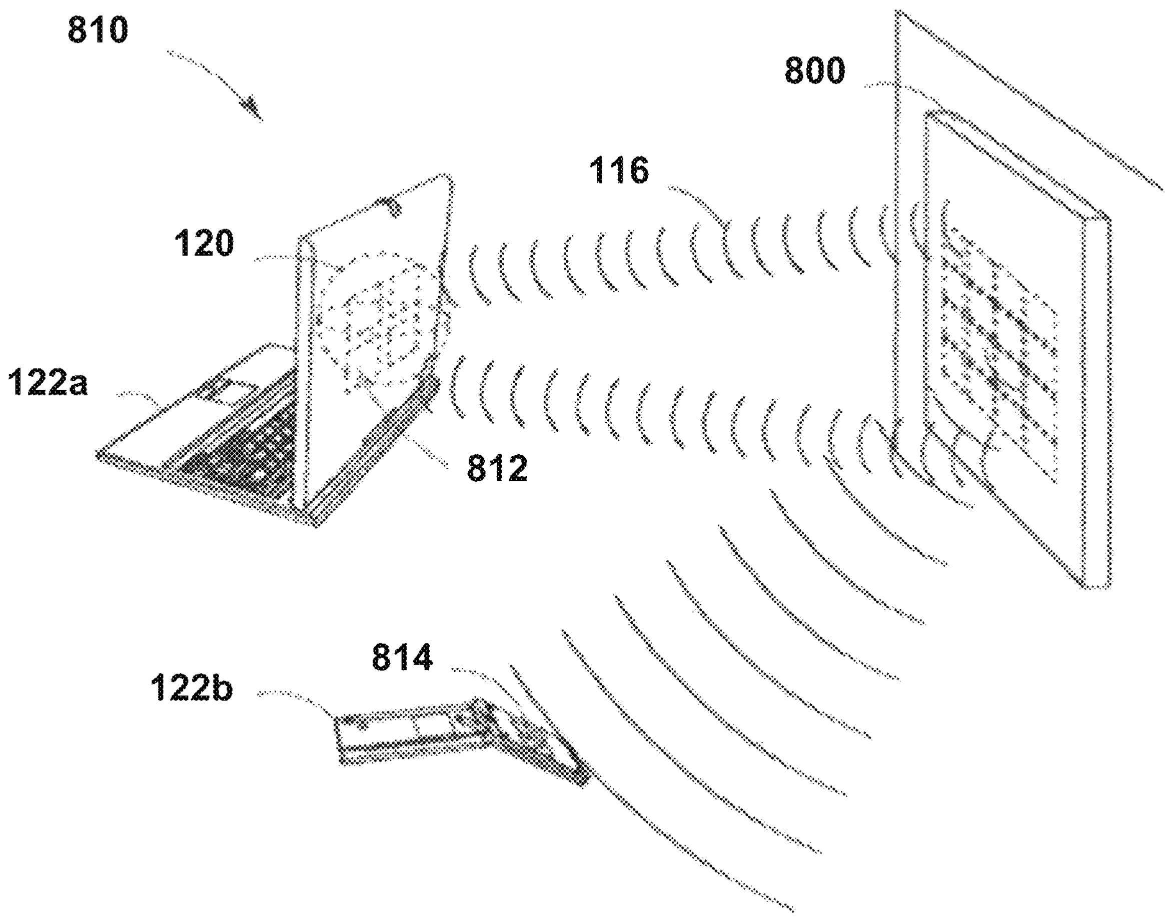
FIG. 8B illustrates a multi-mode transmitter defining a pocket of energy and providing a network signal, in accordance with some embodiments.

FIG. 8B illustrates an example embodiment 810 of a multimode transmitter defining a pocket of energy and providing a network signal.

Transmitter 800 outputs power waves 116 to define pocket of energy 812. Receiver 120 interfaces with pocket energy 812 to charge laptop computer 122*a*. Transmitter 800 also provides a network signal to phone 122*b*, which includes a network receiver 814 to interface with the network signal. Transmitter 800 determines which signal to output (network or power) through micro-controller (e.g., processor 104, FIG. 1), which, for example, receives a unique identifier, such as a MAC address of laptop computer 122*a* or phone 122*b*.

For example, once transmitter 800 identifies and locates receiver 120, a channel or path can be established by knowing the gain or the phases coming from receiver 120, as described herein. Transmitter 800 starts to transmit controlled power waves 116, via antenna elements 802 (FIG. 8B), which converge in 3-dimensional space. Power waves 116 are produced using power source (not shown) and a local oscillator chip using a suitable piezoelectric material. Power waves 116 are controlled by RFIC, which includes a chip for adjusting phase and/or relative magnitudes of RF signals, which serve as inputs for antenna elements 802 to form constructive and destructive interference patterns (pocket-forming). Pocket-forming may take advantage of interference to change the directionality of the antenna elements 802 where constructive interference generates pocket of energy 812 and destructive interference generates a null space. Receiver 120 utilizes pocket of energy 812 produced by the pocket-forming for charging or powering an electronic device, for example laptop computer 122*a* and thus effectively providing wireless power transmission using pocket-forming.

Transmitter 800 also identifies and locates receiver 814 from smartphone 122*b*. Smartphone 122*b* may request the network signal, such as a WI-FI signal. Therefore, transmitter 800 may send the requested network signal in parallel with the power waves 116 for powering laptop computer 122*a*.

In some embodiments, a network router, such as a WI-FI router, includes a housing, which houses transmitter 800 that outputs power waves 116 to define pocket of energy 812, as described herein, and a network signal, such as a WI-FI signal, as described herein. Such output can be concurrent or non-concurrent. The router can also be configured to provide a wired network connection, whether for a same network or a different network. The router can be used to wirelessly charge a first electronic device and to wirelessly provide network access to a second electronic device. Note that the first device and the second device can be one device or different devices. For example, the router can wirelessly charge a cellular phone, as described herein, and simultaneously provide an internet connection to the cellular phone, as described herein. Alternatively, transmitter 800 includes a WI-FI router or WI-FI circuitry which is configured to power a tablet computer and provide an internet connection to that tablet computer.

Figure 8C:
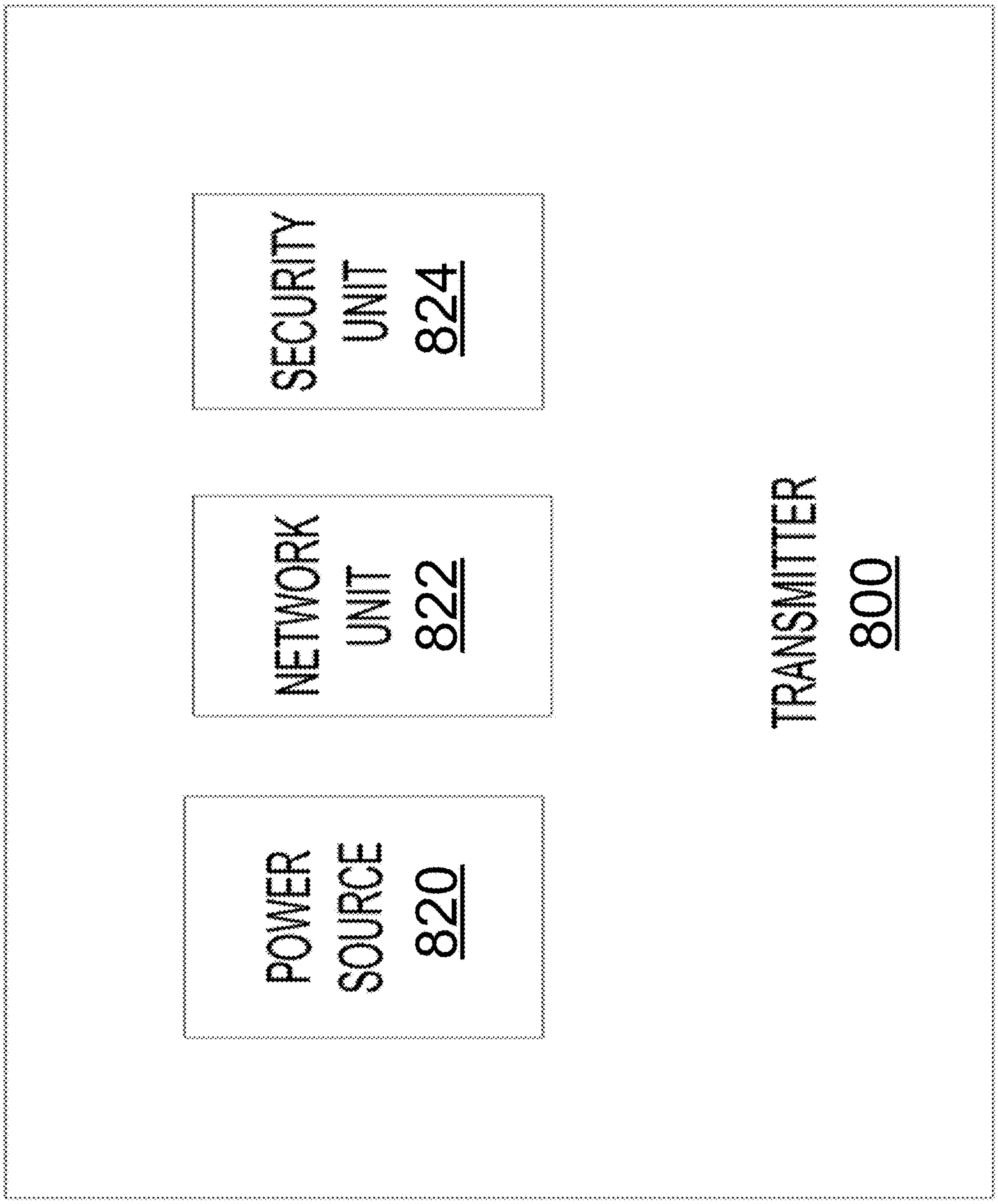
FIG. 8C is a block diagram of an example multi-mode transmitter.

FIG. 8C illustrates a schematic diagram of an example embodiment of a multimode receiver. Thus, same reference characters identify identical and/or like components described above and any repetitive detailed description thereof will hereinafter be omitted or simplified in order to avoid complication.

Transmitter 800 includes power source 820, a network unit 822, and a security unit 824 operably interconnected with each other in any operational manner, whether directly or indirectly. Note that network unit 822 and security unit 824 can also be one unit. Network unit 822 includes the network communication unit, as described herein. Security unit 824 enables security operations, such as encryption or decryption, as described herein. For example, security unit 824 includes at least one of the encryption chip, the decryption chip, and the encryption-decryption chip. Power source 820 can operate as described herein. However, in other embodiments, power source 820 can also receive power, include, or be at least one of a mains electricity outlet, a wireless power receiver, as described herein, or an energy storage device, such as a battery. In some embodiments, transmitter 800 receives power, includes, or is a renewable energy source, such as a wind turbine, a liquid turbine, a photovoltaic cell, a geothermal turbine, or others. For example, transmitter 800 includes the renewable energy source or is coupled to the renewable energy source, whether directly or indirectly, whether locally or remotely. For example, the wind turbine can be at least one of a vertical axis turbine and a horizontal axis turbine, or others. The liquid turbine can be at least one of a reaction turbine or an impulse turbine, or others. The photovoltaic cell can be at least one of a silicon cell and a thin film cell, or others. The geothermal turbine can be steam-based or others.

FIGS. 8A-8C illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 8A-8C.

Presented below an example of a multi-mode transmitter.

In some embodiments, a multi-mode transmitter includes a first antenna element and a second antenna element. Further, the transmitter is configured to emit a first signal by the first antenna element and a second signal by the second antenna element, where the first signal includes a plurality of wireless power waves establishing a pocket of energy. Moreover, the second signal is different from the first signal and the second signal provides WI-FI access.

In some embodiments, the transmitter includes an antenna array, and the antenna array includes the first antenna element and the second antenna element.

In some embodiments, the antenna array is defined via a first portion and a second portion, and the transmitter is configured to emit the first signal via the first portion, and the transmitter is configured to emit the second signal via the second portion.

In some embodiments, the first portion and the second portion are symmetrical geometrically.

In some embodiments, the first portion and the second portion are asymmetrical geometrically.

In some embodiments, the first portion includes a first plurality of antenna elements and the second portion includes a second plurality of antenna elements. Moreover, in some embodiments, the first plurality of antenna elements is numerically different from the second plurality of antenna elements. Alternatively, in some embodiments, the first plurality of antenna elements is numerically identical to the second plurality of antenna elements.

In some embodiments, the transmitter is configured to switch between a first mode and a second mode, and the transmitter is configured to emit the first signal during the first mode only and the second signal during the second mode only.

In some embodiments, the transmitter is configured to emit the first signal to a first receiver and the second signal to a second receiver, and a device includes the first receiver and the second receiver.

In some embodiments, the transmitter is configured to emit the first signal to a first receiver coupled to a first device and the second signal to a second receiver coupled to a second device different from the first device.

In some embodiments, the transmitter is configured to emit the first signal to a first receiver and the second signal to a second receiver, and the first receiver and the second receiver are one receiver.

In some embodiments, the transmitter includes a third antenna element, and the transmitter is configured to emit the first signal concurrently by the first antenna element and the third antenna element.

In some embodiments, the second signal provides WI-FI access by providing a device that receives the second signal with an internet connection.

Figure 9A:
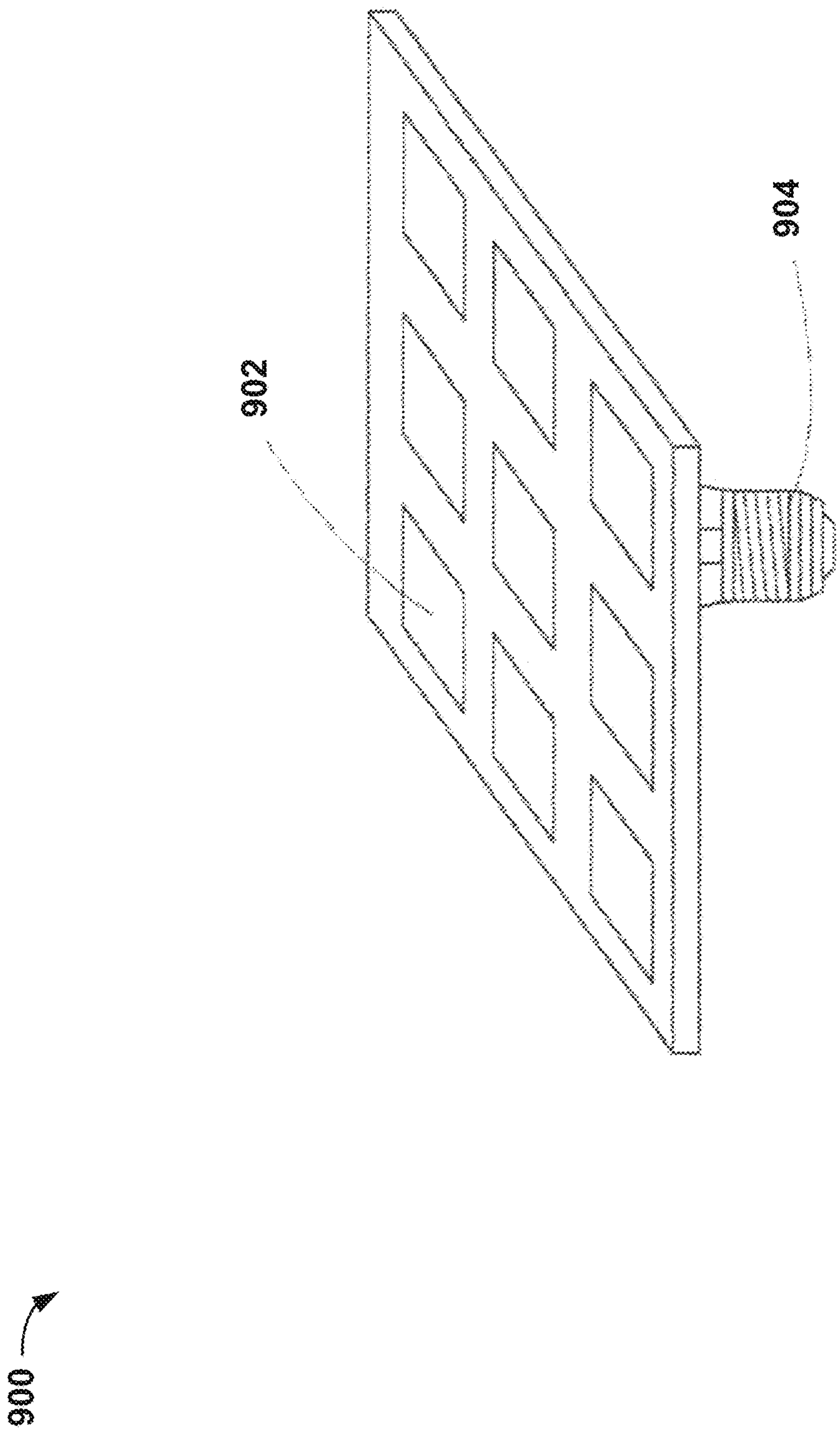
FIG. 9A illustrates a transmitter having a screw cap for power coupling, in accordance with some embodiments.
Figure 9B:
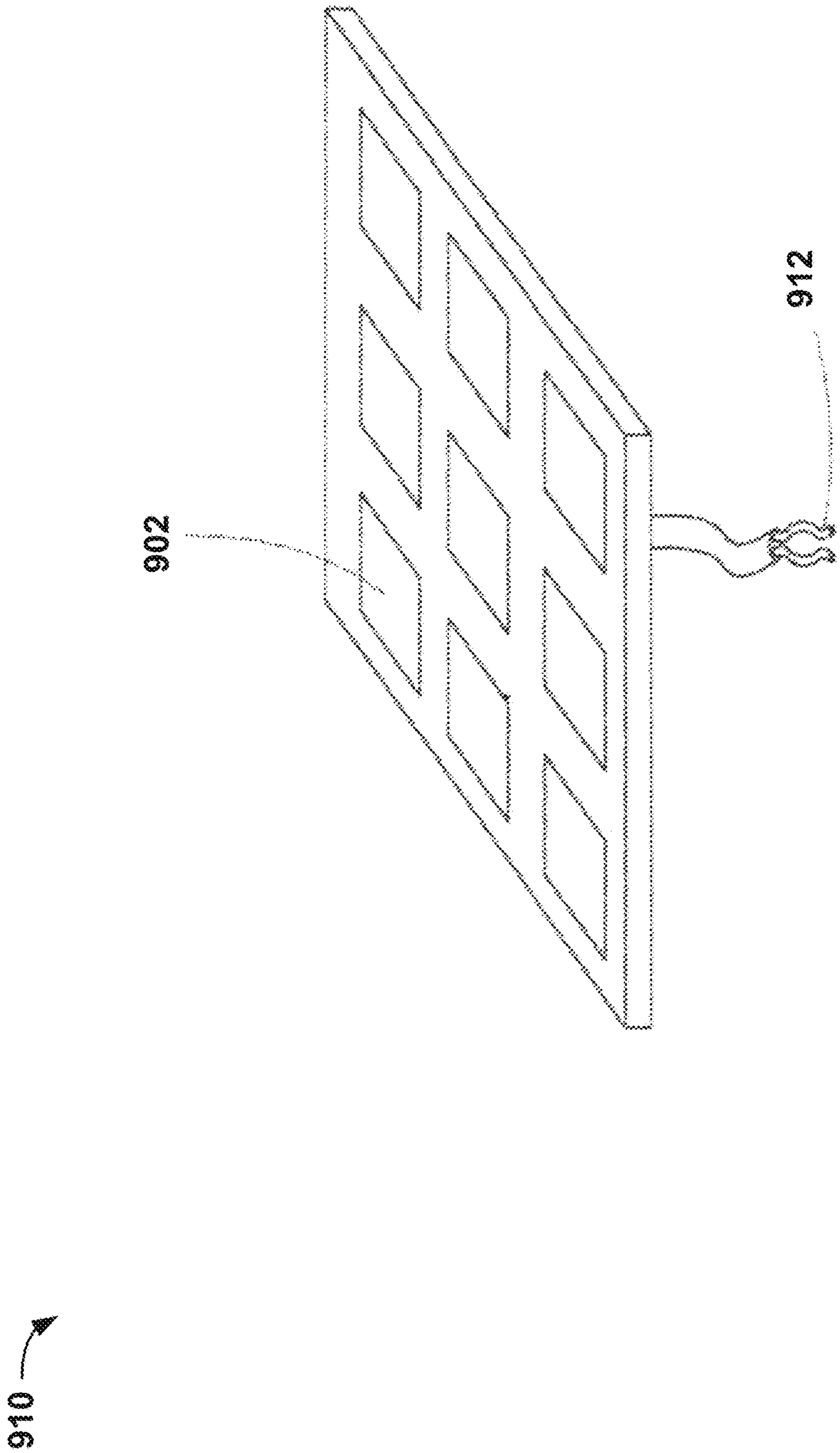
FIG. 9B illustrates a transmitter having bare wires for power coupling, in accordance with some embodiments.
Figure 9C:
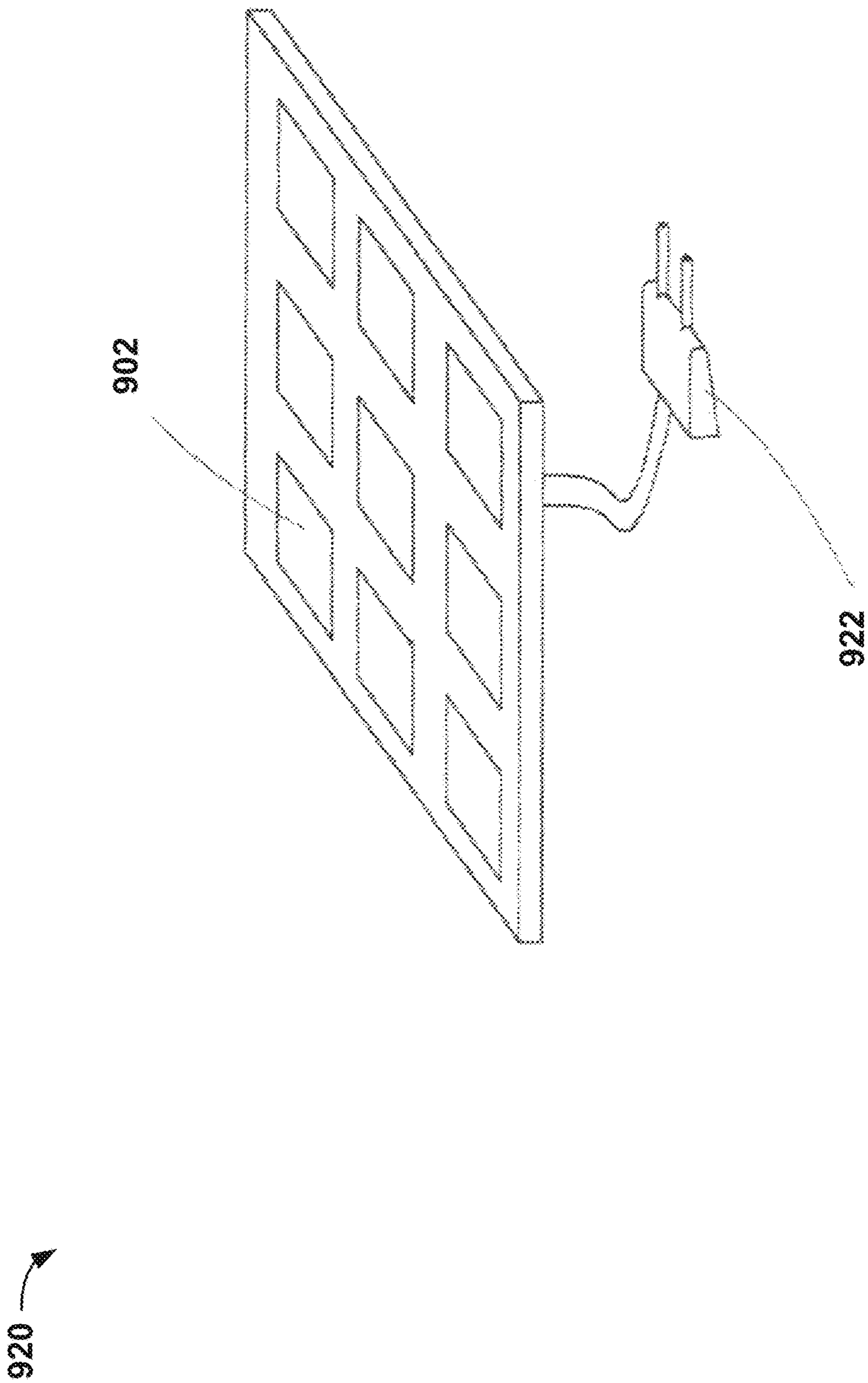
FIG. 9C illustrates a transmitter having a power plug for power coupling, in accordance with some embodiments.

FIGS. 9A-9C illustrate various power couplings for transmitters used in wireless power transmission systems, in accordance with some embodiments.

FIG. 9A depicts a flat transmitter 900 (e.g., an embodiment of the transmitter 102, FIG. 1) of a predetermined size to fit into a number of spaces, which includes antenna elements 902. Transmitter 900 includes a screw cap 904. Screw cap 904 connects the transmitter 900 to a light socket, wherein the light socket operates as a power source for the transmitter 900.

Screw cap 904 may include a variety of electronics devices, such as, capacitors, inductors, power converters and the like. Such electronic devices may be intended for managing the power source, which feeds transmitter 900.

Furthermore, transmitter 900 including screw cap 904 as power connection may increase versatility of transmitter 900, because transmitter 900 is able to be located in every place where a screw cap 905 is received by a light socket.

Transmitter 900 includes several shapes which may vary in dependence with final application and user preferences.

FIG. 9B depicts a flat transmitter 910 (e.g., an embodiment of the transmitter 102, FIG. 1), which includes antenna elements 904. Transmitter 910 includes a cable 912 with a pair of wires for connection to the power source. Power source includes an electrical service in a building or mobile vehicle and the like.

Cables 912 include labels of positive and negative cables in case of connecting to a DC current power source and/or ILA and L2 cables in case of AC current power source. Furthermore, more cables may be included, and such cables may be for three-phase power source and a ground cable connection.

Transmitter 910 includes a variety of electronics devices, such as, capacitors, inductors, power converters and the like. Such electronic devices may be intended for managing the power source which may feed transmitter 910.

Transmitter 910 is located in several places due to the cables 912, which may be connected to any power source, and such power source may be AC or DC in dependence with final application and user preferences.

Transmitter 910 includes several shapes which may vary in dependence with final application and user preferences.

FIG. 9C depicts a transmitter 920 (e.g., an embodiment of the transmitter 102, FIG. 1) which includes antenna elements 902 in a flat arrangement. Transmitter 920 is connected to a power source through one or more power plug 922. Such power plug 922 complies with the standard of each country and/or region. Power plug 922 is intended to connect transmitter 920 to one or more power outlet on the walls, floors, ceilings and/or electric adapters.

Transmitter 920 includes a variety of electronics devices, such as capacitors, inductors, power converters and the like. Such electronic devices are intended for managing the power source which feeds transmitter 920.

Transmitter 920 includes several shapes which may vary in dependence with final application and user preferences.

FIGS. 9A-9C illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 9A-9C.

Presented below is an example method of coupling a transmitter to a power source.

In some embodiments, an example method includes receiving, by an antenna of a receiver coupled to the electronic device, pockets of energy generated in response to RF waves emitted by a pocket-forming transmitter coupled to a power source through a power coupling and converting, by a rectifying circuit of the receiver, the received pockets of energy into electricity to charge the electronic device.

In some embodiments, the power coupling of the transmitter includes an Edison screw cap for insertion into a light socket connected to the power source, and the power source is an electrical service available to a user of the electronic device.

In some embodiments, the power coupling of the transmitter includes a cable with a pair of wires for connection to the power source, and the power source is an electrical service available to a user of the electronic device.

In some embodiments, the power coupling of the transmitter includes an electrical plug for insertion into a socket connected to the power source, and the power source is an electrical service available to a user of the electronic device.

Figure 10C:
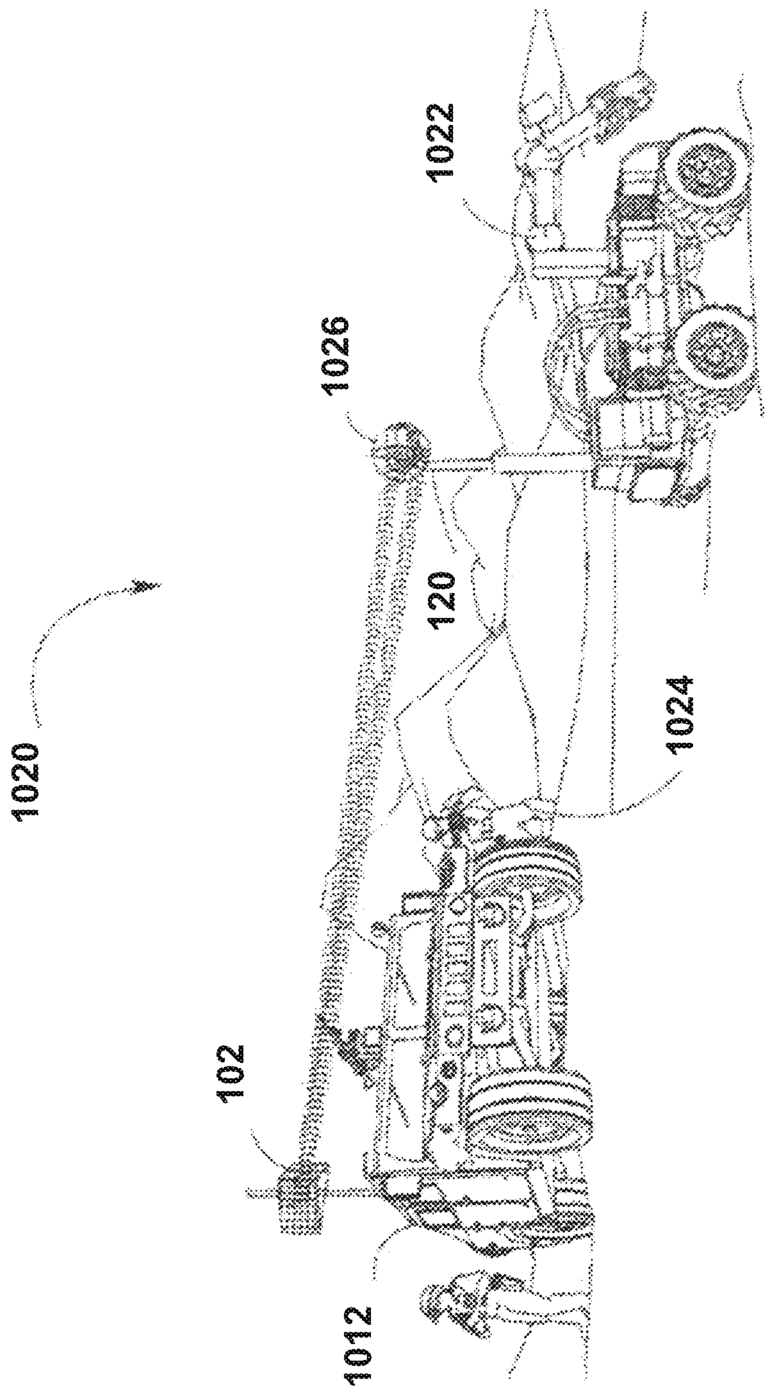

FIGS. 10A-10C illustrate wireless power transmission systems used in military applications, in accordance with some embodiments.

FIG. 10A is an example embodiment of a power distribution system 1000 in a military camp where troops may be settled in remote locations. Power distribution system 1000 may include a mobile power generator 1002, which may serve to power electrical equipment. Mobile power generator 1002 may be a mobile diesel generator or other sources such as solar photovoltaic arrays, wind turbines or any reliable power source or combination thereof coupled with mobile power generator 1002. The power generator 1002 is configured to power a transmitter 102, which may enable wireless power transmission. Transmitter 102 may use mobile power generator 1002 as a power source to form pockets of energy. Pockets of energy may form at constructive interference patterns and can be 3-dimensional in shape whereas null-spaces may be generated at destructive interference patterns. Electrical devices 1004 such as radios, laptops or any devices requiring a power input may be coupled with a receiver 120 (not shown). Receiver 120 may then utilize pockets of energy produced by pocket-forming for charging or powering electrical devices 1004.

Transmitter 102 may form pockets of energy covering a range from about a few feet to hundreds of feet depending on the size of the antenna array. For the foregoing application, about 30 to about 60 feet may suffice. Additional transmitters 102 may be used to extend the distance in a power distribution system. A central transmitter 102 coupled with mobile power generator 1002 may serve as a central distribution center while additional transmitters 102 may be placed at a distance and retransmit energy received from the central transmitter to reach greater distances. Each transmitter 102 size may be relative to the desired transmission distance.

FIG. 10B is another example embodiment of a power distribution system 1010. A transmitter 102 coupled with a mobile power generator 1002 may be mounted over a military vehicle 1012 in order to add mobility. Military vehicle 1012 may be any vehicle with enough robustness and ruggedness for battlefield applications such as a high mobility multi-purpose wheeled vehicle (HMMWV/Humvee) armored trucks, tanks or any vehicle capable of carrying transmitter 102 coupled with mobile power generator 1004. Military vehicle 1012 may accompany soldiers into the battlefield and serve as a power source for electrical devices 1004 carried by soldiers. Electrical devices 1004 carried by soldiers may be coupled with receivers 120 (not shown in FIG. 10B) in order to receive energy from transmitter 102.

FIG. 10C is another embodiment of power distribution system 1020 where remote controlled vehicles 1022 designed for espionage, detecting mines or disabling bombs may be powered wirelessly. In this embodiment, remote control and power may be critical factors to prevent exposure or harm to human soldiers 1024. Remote controlled vehicle 1022 may be coupled with a receiver 120. A transmitter 102 coupled with a mobile power generator 1004 may form pockets of energy 1026 at constructive interference patterns that may be 3-dimensional in shape whereas null-spaces may be generated at destructive interference patterns. A receiver 120 may then utilize pockets of energy 1026 produced by pocket-forming for charging or powering remote controlled vehicle 1022.

FIGS. 10A-10C illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 10A-10C.

Presented below are example systems and methods of wireless power transmission in military applications.

In some embodiments, an example method includes: (i) communicating, by a receiver associated with a mobile electronic device, a security code to a transmitter coupled to a power source, the transmitter configured to recognize the security code; (ii) receiving, by an antenna of the receiver associated with the mobile electronic device, a pocket of energy generated in response to transmission signal waves emitted by the transmitter, the transmission signal waves being emitted upon recognition of the security code by the transmitter; and (iii) charging, by the receiver, the mobile electronic device, the receiver including a rectifying circuit to convert the received pocket of energy into electricity.

In some embodiments, the power source is one or more of a mobile diesel generator, a mobile gasoline generator, solar panels, and wind turbines.

In some embodiments, the method further includes charging, by the receiver, the mobile electronic device by establishing a path for the pocket of energy to converge in 3-dimensional space upon an antenna of the receiver. The antenna of the receiver is in communication with an antenna of the transmitter and the antenna of the transmitter is broadcasting the transmission signal waves.

In some embodiments, the transmitter includes a plurality of antennas, a radio frequency integrated circuit, and a processor configured to implement security logic and a communications component.

In some embodiments, the method further includes receiving, by the receiver associated with the mobile electronic device, the pocket of energy generated in response to transmission signal waves emitted by a secondary transmitter, the transmission signal waves being emitted by a secondary transmitter in response to the transmission signal waves emitted by the transmitter.

In some embodiments, the receiver receives the pocket of energy from the transmitter and is switched to the secondary transmitter to continue charging the mobile electronic device.

In some embodiments, the pocket of energy is regulated by utilizing adaptive pocket-forming.

In some embodiments, the power source is a mobile generator mechanically coupled to the transmitter and configured to extend reach of the transmission signal waves emitted by transmitter.

In some embodiments, the receiver is in a remote controlled vehicle.

In some embodiments, another example method includes, at a receiver having a communications component, at least one antenna element, and a rectifying circuit: (i) communicating, by the communications component of the receiver, a communications signal, which includes a security code, to a transmitter coupled to a power source, and the transmitter is configured to recognize the security code; (ii) receiving, by the at least one antenna element of the receiver, energy from a plurality of power transmission waves that forms a constructive interference pattern proximate to a location of the receiver, and the transmitter transmits the plurality of power transmission waves in response to recognizing the security code communicated to the transmitter by the receiver; and (iii) charging, using electricity generated by the rectifying circuit using the energy from the plurality of power transmission waves received by the at least one antenna element of the receiver, an electronic device that is coupled with the receiver.

In some embodiments, the transmitter includes a plurality of antennas, a radio frequency integrated circuit, a processor configured to implement a security logic used to recognize the security code, and a communications component.

In some embodiments, the transmitter, in response to recognizing the security code communicated to the transmitter by the receiver: (i) transmits the plurality of power transmission waves to form the constructive interference pattern in proximity to the receiver in response to determining that the receiver is within range of the transmitter; and (ii) transmits the plurality of power transmission waves to a secondary transmitter, that is distinct and separate from the transmitter, in response to determining that the receiver is outside the range of the transmitter, and the secondary transmitter re-transmits the plurality of power transmission waves that forms the constructive interference pattern proximate to the location of the receiver.

In some embodiments, an example system for secured wireless charging of a mobile electronic device includes: (i)

a mobile electronic device coupled to a receiver; (ii) the receiver configured to communicate a security code to a transmitter; and (iii) the transmitter configured to: receive the security code from the receiver; recognize, using security logic of the transmitter, the security code; and in response to recognizing the security code, transmit a plurality of power transmission waves that forms a constructive interference pattern proximate to a location of the receiver. The receiver is further configured to: receive, via an antenna element of the receiver, energy from the plurality of power transmission waves; and charge, using electricity generated using the energy from the plurality of power transmission waves received by the antenna element of the receiver, the mobile electronic device.

In some embodiments, the system further includes a secondary transmitter distinct and separate from the transmitter. The transmitter is further configured to, in response to determining that the receiver is outside a range of the transmitter, transmit the plurality of power transmission waves to the secondary transmitter; and the secondary transmitter is configured to re-transmit the plurality of power transmission waves that form a constructive interference pattern proximate to the location of the receiver.

In some embodiments, another example method includes, at a transmitter having a communications component, at least one processor, and a plurality of antenna elements: (i) receiving, by the communications component, a communication signal from a receiver that includes a security code; (ii) analyzing via the at least one processor, using security logic of the transmitter, the security code received from the receiver; and (iii) in response to recognizing the security code, transmitting, by at least some of the plurality of antenna elements, a plurality of power transmission waves that forms a constructive interference pattern proximate to a location of the receiver. In some embodiments, at least one antenna element of the receiver receives energy from the plurality of power transmission waves transmitted by the transmitter; and the receiver, using electricity generated from the plurality of power transmission waves received from the transmitter, charges or powers an electronic device that is coupled with the receiver.

In some embodiments, the plurality of power transmission waves is a plurality of RF power transmission waves.

In some embodiments, the transmitter is a far-field transmitter.

Figure 11A:
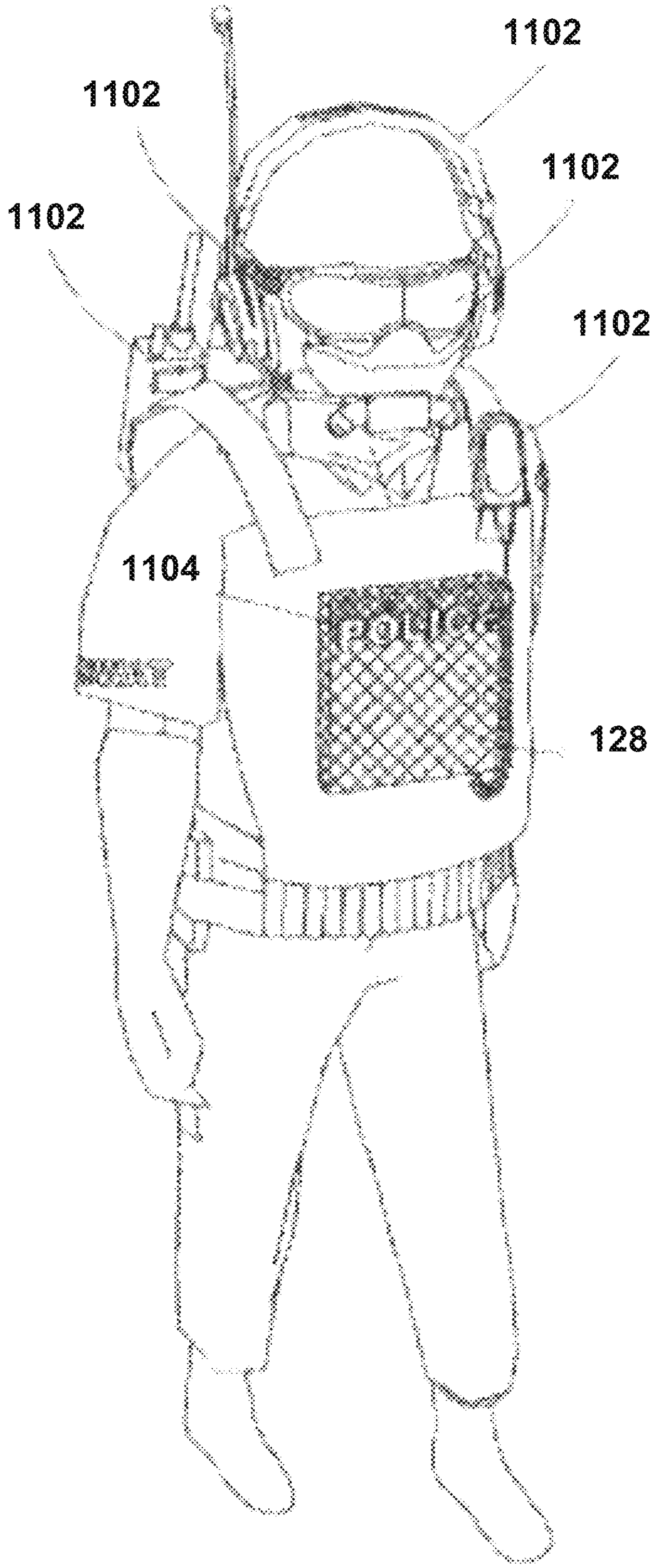
FIG. 11A illustrates a law enforcement officer wearing a uniform with an integrated wireless power receiver, in accordance with some embodiments.
Figure 11B:
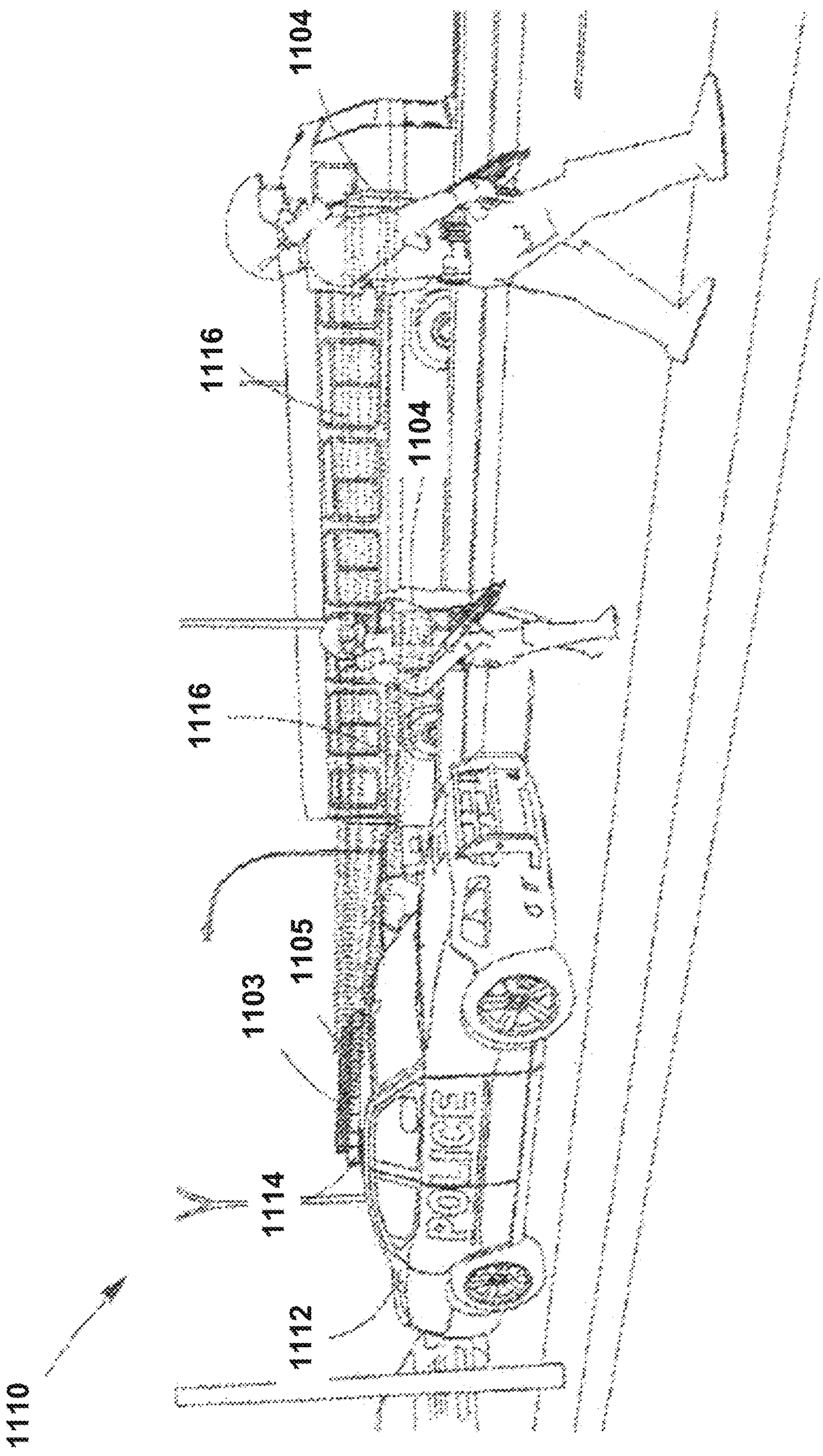
FIGS. 11B-11D illustrate wireless power transmitters integrated with various types of mobile law enforcement equipment (e.g., a police squad car and a SWAT team vehicle) for use in conjunction with law enforcement operations, in accordance with some embodiments.
Figure 11C:
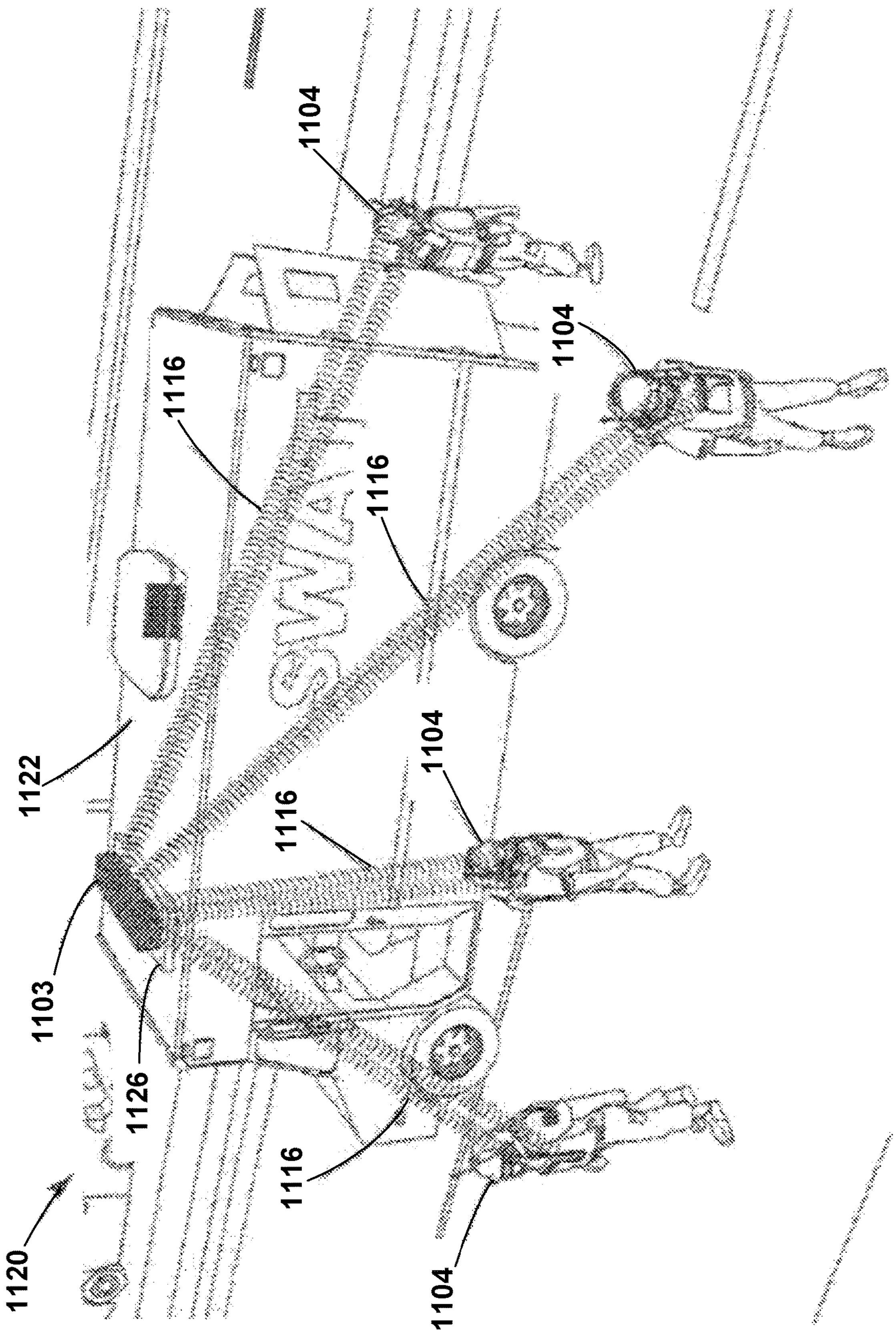
Figure 11D:
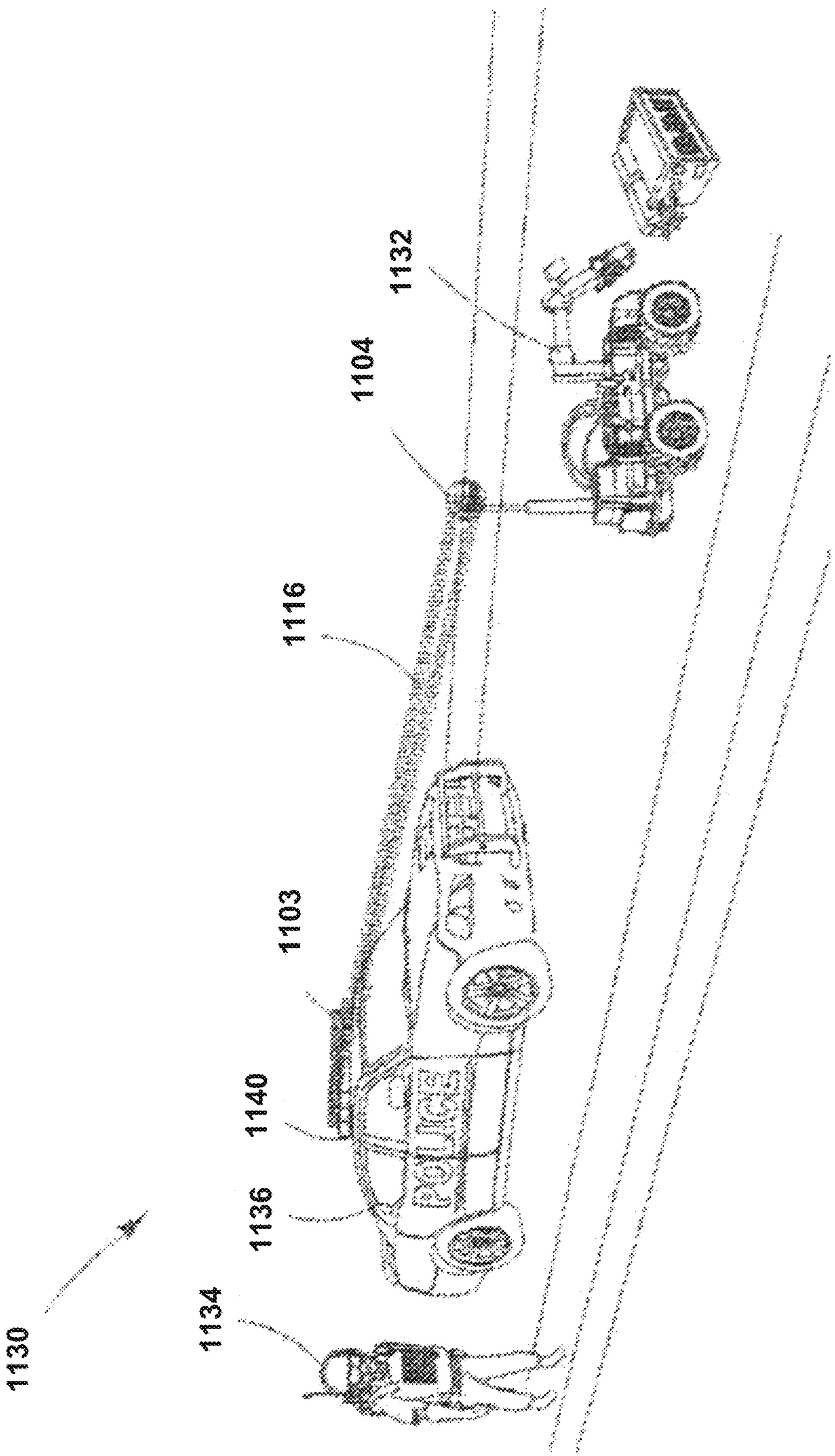

FIG. 11A illustrates a law enforcement officer wearing a uniform with an integrated wireless power receiver, in accordance with some embodiments.

In FIG. 11A, a law enforcement officer is wearing a uniform with an integrated receiver 1104. Uniform with an integrated receiver 1104 (e.g., an embodiment of the receiver 120, FIG. 1) may include electrical devices 1102 such as radios, night vision goggles, and wearable cameras among others. Electrical devices 1102 may be coupled to receiver 1104 through wires strategically distributed in the uniform. Receiver 1104 may then have an array of sensor elements 128 distributed thereon.

FIGS. 11B-11D illustrate wireless power transmitters integrated with various types of mobile law enforcement equipment (e.g., a police squad car and a SWAT team vehicle) for use in conjunction with law enforcement operations, in accordance with some embodiments.

FIG. 11B illustrates a mobile power source 1110 for police officers wearing uniforms with an integrated receiver 1104. Mobile power source 1100 may also serve electrical devices 1102 coupled with receivers 1104 independently. In some embodiments, a police car 1112 may include a transmitter 1103 (e.g., an embodiment of the transmitter 102, FIG. 1) which may be placed on top of siren 1114. Transmitter 1103 may be coupled to any suitable battery management system in police car 1112 to get the power necessary to enable wireless power transmission. Transmitter 1103 may include an array of transducer elements 1105 which may be distributed along the edge of the structure located on top of siren 1114. Transmitter 1103 may then transmit controlled RF waves 1116 which may converge in 3-dimensional space. These RF waves 1116 may be controlled through phase and/or relative amplitude adjustments to form constructive and destructive interference patterns (pocket-forming). Uniforms with an integrated receiver 1104 may then utilize pockets of energy produced by pocket-forming for charging or powering electrical devices 1102.

FIG. 11C illustrates a mobile power source 1120 for specialized police officers wearing uniforms with an integrated receiver 1104. Mobile power source 1120 may also serve electrical devices 1102 coupled with receivers 1104 independently. In FIG. 11C, a SWAT Mobile Command Truck 1122 may include a transmitter 1103 which may be placed on top of siren 1126. Transmitter 1103 may be coupled to any suitable battery management system in SWAT Mobile Command Truck 1122 to get the power necessary to enable wireless power transmission. Transmitter 1103 may include an array of transducer elements 204 which may be distributed along the edge of the structure located on top of siren 1126. Transmitter 1103 may then transmit controlled RF waves 1116 which may converge in 3-dimensional space. These RF 1116 may be controlled through phase and/or relative amplitude adjustments to form constructive and destructive interference patterns (pocket-forming). Uniforms with an integrated receiver 1104 may then utilize pockets of energy produced by pocket-forming for charging or powering electrical devices 1102.

FIG. 11D illustrates a mobile power source 1130 for remote controlled vehicles 1132 designed for espionage, detecting mines or disabling bombs that may be powered wirelessly. In this embodiment, remote control and power may be critical factors to prevent exposure or harm to police officers 1134. In some embodiments, a police car 1136 may include a transmitter 1103, which may be placed on top of siren 1140. Transmitter 1103 may be coupled to any suitable battery management system in police car 1136 to get the power necessary to enable wireless power transmission. Transmitter 1103 may include an array of transducer elements 1105, which may be distributed along the edge of the structure located on top of siren 1140. Transmitter 1103 may then transmit controlled RF waves 116, which may converge in 3-dimensional space. These RF waves 1116 may be controlled through phase and/or relative amplitude adjustments to form constructive and destructive interference patterns (pocket-forming). Remote controlled vehicle 1132 may be coupled with the receiver 1104. The receiver 1104 may then utilize pockets of energy produced by pocket-forming for charging or powering remote controlled vehicle 1132.

In summary, law enforcement officers may be required to carry a great deal of equipment which in most cases are electrical devices, the wireless power distribution system disclosed here may charge or power the electrical devices wirelessly. In some embodiments, the wireless power distribution system may include at least one transmitter coupled with any suitable battery management system in a Law Enforcement vehicle, in other embodiments, a Law Enforcement uniform may be coupled with wireless receiver components that may use the pockets of energy to charge or power the electrical devices.

FIGS. 11A-11D illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 11A-11D.

Presented below are example systems and methods of wireless power transmission in law enforcement applications.

In some embodiments, an example method for wireless power transmission for electrical devices used by law enforcement equipment is provided. The method includes: emitting RF waves from a pocket-forming transmitter each having an RF wave; integrated circuit, transducer elements, and communication circuitry; generating pockets of energy from the transmitter to converge in 3-dimensional space at predetermined locations within a predefined range; incorporating a receiver within a law enforcement uniform; attaching the electrical devices to the receiver; and convening the pockets of energy in 3-dimensional space from the transmitter to the receiver located within the law enforcement uniform to charge or power the electrical devices. In some embodiments, the electrical devices are radios, night vision goggles, wearable cameras, flashlights, sensors and other portable law enforcement electrical devices for use in law enforcement. In some embodiments, the electrical devices are coupled to the receiver through wires strategically distributed in the uniform. In some embodiments, the transmitter and receiver include transducer and sensor elements, respectively.

In some embodiments, an example apparatus for wireless power receipt by a law enforcement equipment device includes: a receiver configured to be removably coupled to an article of clothing and configured to communicate a security code to a transmitter, the receiver comprising: an antenna configured to receive a pocket of energy, the pocket of energy being generated in response to power transmission waves from the transmitter, the power transmission waves being transmitted upon recognition of the security code by the transmitter; and a rectifying circuit configured to convert the received pocket of energy into electricity to charge a law enforcement equipment removably coupled to the article of clothing.

In some embodiments, the receiver further communicates to the transmitter information including an identification, a location, and an indication of the power level of the law enforcement equipment.

In some embodiments, the antennas of the receiver are arranged as an array integrated into the article of clothing.

It should be noted that the embodiments described above in FIGS. 10A-10C equally apply to the embodiments shown in FIGS. 11A-11D.

FIGS. 12A-12D illustrate tracking systems that upload data to a cloud-based service for use in conjunction with wireless power transmission systems, in accordance with some embodiments.

Figure 12A:
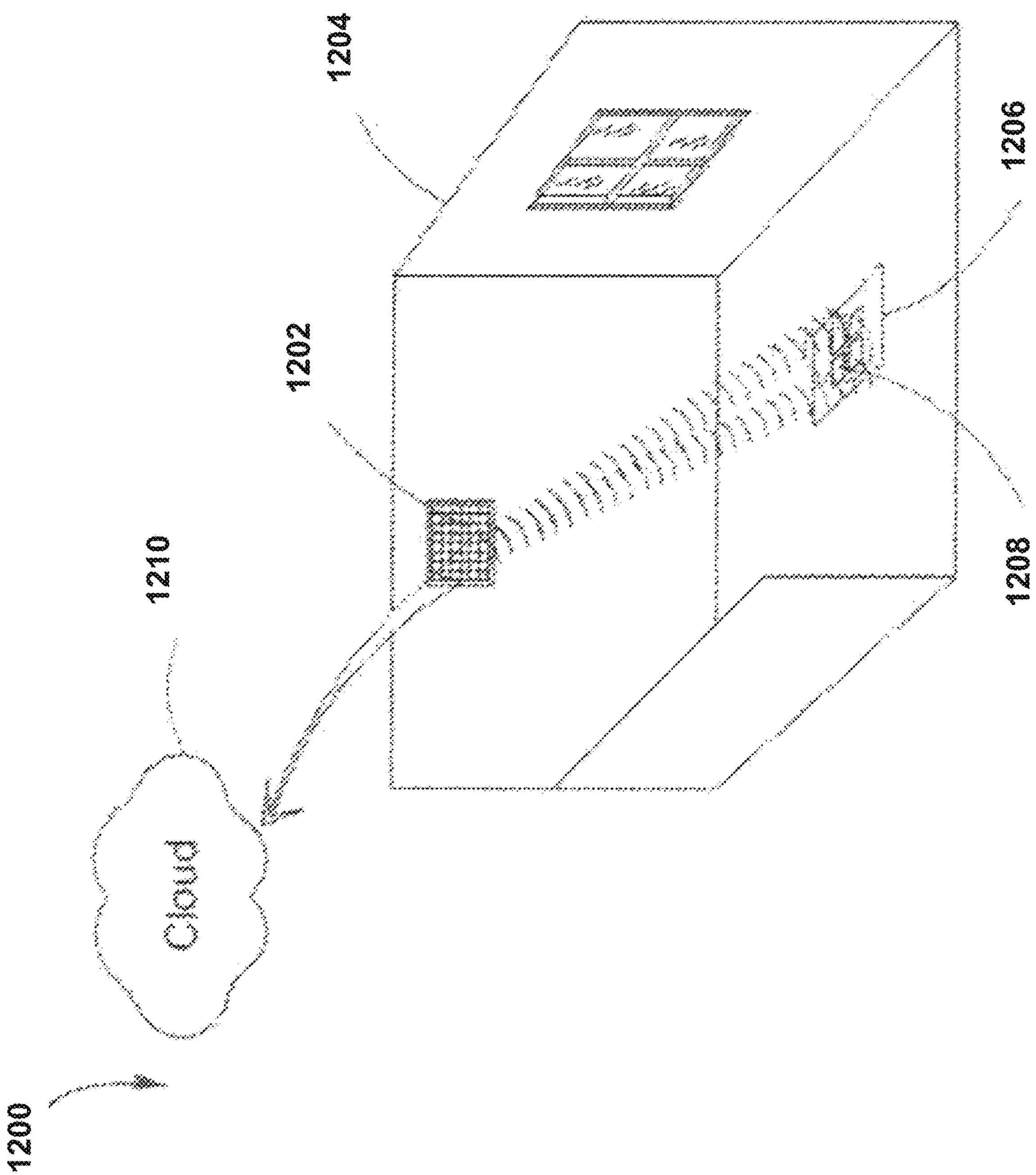
FIGS. 12A-12D illustrate tracking systems that upload to a cloud-based service for use in conjunction with wireless power transmission systems, in accordance with some embodiments.

FIG. 12A shows a wireless tracking system 1200 for determining the location of objects or living beings. In some embodiments, wireless tracking system 1200 may be applied in a wireless power transmission system using pocket-forming techniques. Transmitter 1202 (e.g., an embodiment of the transmitter 102, FIG. 1) may be in house 1204 placed on a suitable location, such as on a wall, for an effective wireless power transmission to electronic device 1206. Objects or living beings may use an electronic device 1206 with embedded or adapted receiver 1208. Receiver 1208 (e.g., an embodiment of the receiver 120, FIG. 1) may include components described in FIG. 1 and transmitter 1202 may also include components described in FIG. 1.

While transmitter 1202 may charge or power receiver 1208, micro-controller 208 (from transmitter 1202) may be able to process information provided by communications component from receiver 1208, as described above. This information may be repeatedly uploaded to a cloud-based service 1210 to be stored in a database in determined intervals of time. Through data stored in database, the information may be read through a suitable interface such as computer software from any suitable computing device and from any suitable location. Transmitter 1202 may use a unique identifier of receiver 1208 for identifying and tracking electronic device 1206 from other devices. The unique identifier of receiver 1208 may be according to the type of communications component that may be used in receiver 1208; for example, if a protocol is used, the MAC address may be the unique identifier. This unique identifier may allow the information of electronic device 1206 with receiver 1208 to be mapped and stored in the database stored in cloud-based service 1210. Other unique identifiers may include International Mobile Equipment Identity (IMEI) numbers, which usually include a 15-digit unique identifier associated with all GSM, UNITS and LTE network mobile users; Unique Device ID (UDID) from iPhones, iPads and Mods, comprising a combination of 40 numbers and letters set by Apple; Android ID, which is set by Google and created when a user first boots up the device; or International Mobile Subscriber Identity (IMSI), which is a unique identification associated with the subscriber identity module (SIM). Furthermore, a user may be able to obtain user credentials to access the database stored in a private or public cloud-based service 1210 to obtain the information of receiver 1208. In some embodiments, cloud-based service 1210 may be public when the service, provided by the same transmitter 1202 or wireless manufacturer, is utilized in the public network by using only the user credentials for obtaining the desired information. And, cloud-based service 1210 may be private when transmitter 1202 may be adapted to a private network that has more restrictions besides user credentials.

In some embodiments, in order to track the location of a determined living being or object, a cloud-based service 1210 may be suitable for finding the location of receiver 1208. For example, when receiver 1208 may not be in house 1204, a user may be able to access with user credentials a suitable interface such as an Internet explorer, to visually depict the places where receiver 1208 was located, using information uploaded in database from the cloud-based service 1210. Also, if receiver 1208 may reach power or charge from another transmitter 1202 located in public establishments such as stores, coffee shops, and libraries, among others, the information may be uploaded to cloud-based service 1210, where the user may also be able to depict the information stored in the cloud-based service 1210.

In some embodiments, wireless tracking system 1200 may be programmed to send notifications when living beings or objects are not in the place where it/she/he has to be. For example, if a cat is not at owner's home, a notification such as an interactive message may be sent to a cellphone notifying that the cat is not at home. This interactive message service may be adapted to cloud-based service 1210 as an extra service. The interactive message may be optionally sent to an e-mail or to computer software as it may be desired. Furthermore, additional information may be included in the interactive message such as current location, time, battery level of receiver 1208, among other types of data.

In some embodiments, wireless tracking system 1200, may operate when receiver 1208 includes at least one audio component, such as a speaker or microphone, which may enable location determination via sonic triangulation or other such methods.

In some embodiments, transmitter 1202 may be connected to an alarm system which may be activated when receiver 1208 is not located in the place where it has to be.

Figure 12B:
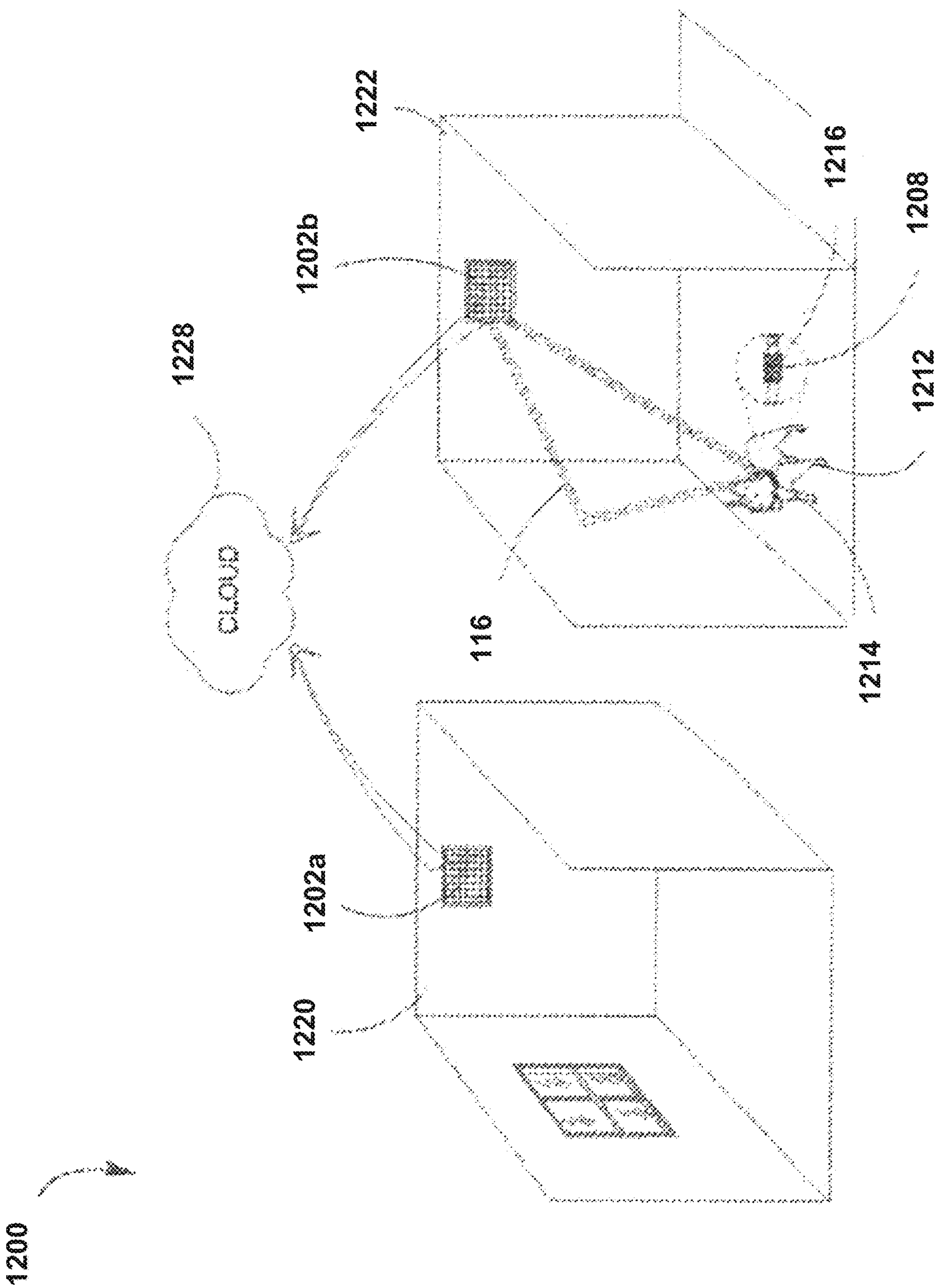

In one example, FIG. 12B shows a wireless tracking system 1200 for tracking the location of a dog 1212. In some embodiments, dog 1212 is wearing a necklace collar 1214 that may include an integrated chip 1216 with an embedded receiver 1208. Dog 1212 may be outside first room 1220 and inside second room 1222. First room 1220 may be the place where dog 1212 lives; however dog 1212 escaped and arrived at second room 1222 (e.g., a coffee shop). In first room 1220, a first transmitter 1202*a* (e.g., an embodiment of the transmitter 102, FIG. 1) is hanging on a wall, and in second room 1222, a second transmitter 1202*b* (e.g., an embodiment of the transmitter 102, FIG. 1) is hanging on a wall. First transmitter 1202*a* detects that dog 1212 is not at home, here the interruption of RF waves 116 transmission to receiver 1208 from necklace collar 1214 allows first transmitter 1202*a* to detect the absence of dog 1212 in first room 1220. In some embodiments, the type of communication component to communicate first transmitter 1202*a* or second transmitter 1202*b* with receiver 1208, is a WI-FI protocol.

Subsequently, the owner of dog 1212 receives a message notification informing him/her that his/her dog 1212 is outside first room 1220. When dog 1212 arrived at second room 1222, receiver 1208 received RF waves 116 from second transmitter 1202*b*, while this second transmitter 1202*b* detects the presence of a new receiver 1208 and uploads the location and time to database stored in the public cloud-based service 1228. Afterwards, the owner of dog 1212 accesses public cloud-based service 1228 through a smartphone application for tracking the location of dog 1212. The owner may have his/her credentials to access cloud-based service 1228, where the user account is mapped with MAC address of first transmitter 1202*a* and receiver 1208. In the cloud-based service 1228, a display is provided with the locations with determined times where dog 1212 has been during its absence from first room 1220, using the MAC address of receiver 1208. Finally, the owner is now able to rescue his/her dog 1212 by knowing the current location where dog 1212 is.

Figure 12C:
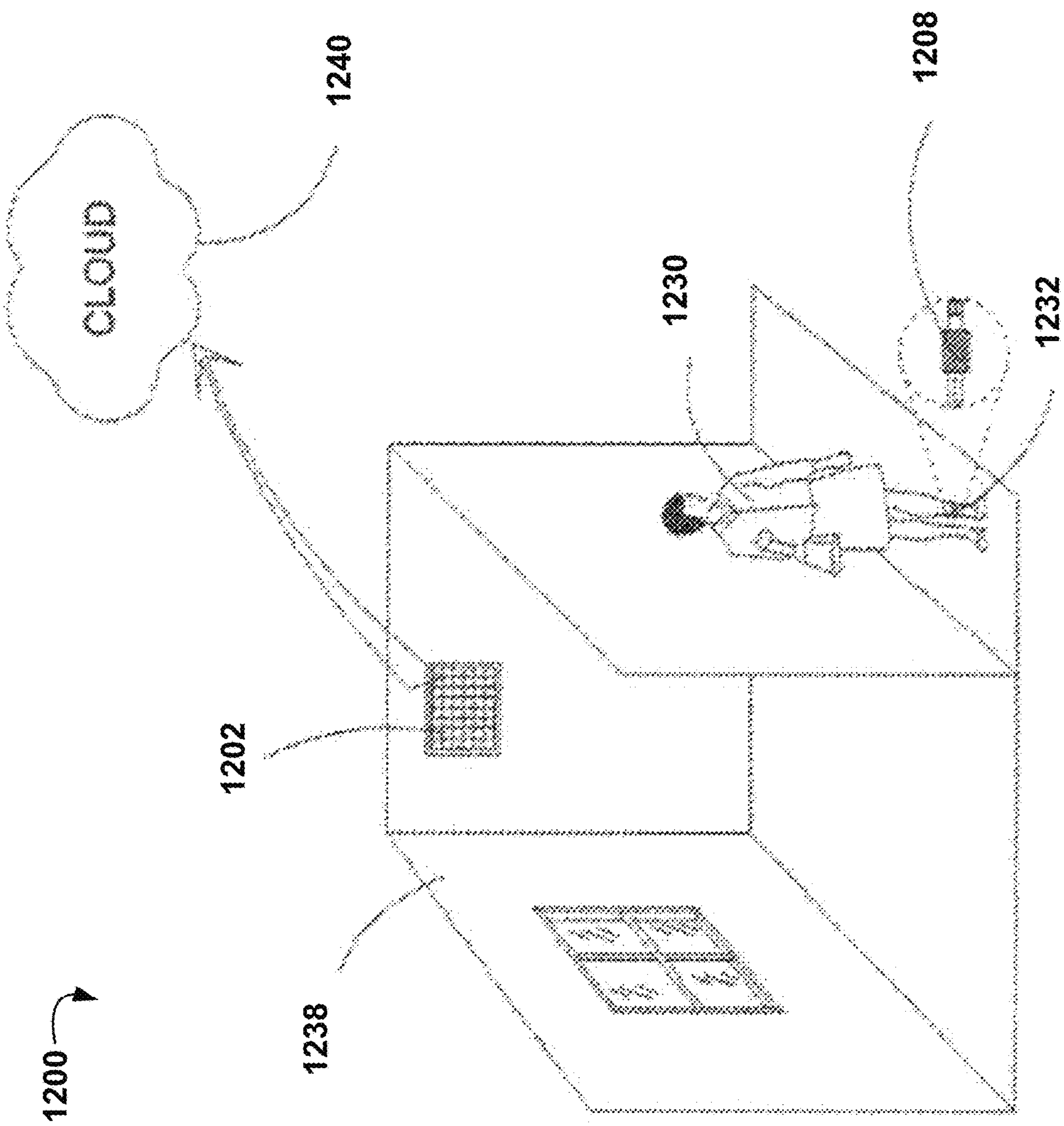

In another example, FIG. 12C shows a wireless tracking system 1200 for tracking and controlling the location of a woman 1230 that has conditional liberty in her house 1238, in this example, woman 1230 is wearing an ankle monitor 1232 that may include a GPS chip 1216 with an adapted receiver 1208 to charge its battery. Ankle monitor 1232 receives RF waves 116 from transmitter 1202 that is hanging on a wall from house 1238. Receiver 1208 communicates with transmitter 1202 through a ZIGBEE protocol. In this case, the unique identifier which is used to identify receiver 1208 is Personal Area Network Identifier (PAN ID). Receiver 1208 sends information to transmitter 1202 about the battery status, how many times battery has been charged, battery age indicator, and cycle efficiency. This information may be uploaded to a private cloud-based service 1240 which, is monitored by a police station that supervises woman 1230. Further, transmitter 1202 may include an alarm system which may be activated when receiver 1208 is not receiving RF waves 116 or/and woman 1230 is not in house 1238. This alarm system provides an audio RF alert, while transmitter 1202 sends a notification to computer software of police office.

As shown in FIG. 12C, woman 1230 escaped house 1238; therefore the alarm system is activated providing audio sound alert and a police office receives a message notification informing it that woman 1230 is outside house 1238. Then, a police officer detects the location of woman 1230 in a map using the GPS chip 1216 from ankle monitor 1232. Further, the police officer accesses the private cloud-based network to monitor the battery life and the last time when receiver 1208 received RF waves 116. The police officer may also have his/her credentials to access the private cloud-based service 1240, where the user account is mapped with PAN ID of transmitter 1202. In addition, if the woman 1230 arrived to a public place such as coffee shop, receiver 1208 may upload information and location of the woman 1230 to public cloud-based service 1240 which may be transferred to private cloud-based service 1240; this operation is used as a back-up tracking system in case GPS does not work appropriately. Finally, the woman 1230 may be found and handcuffed by police officer due to location was provided by GPS and/or private-cloud based service.

Figure 12D:
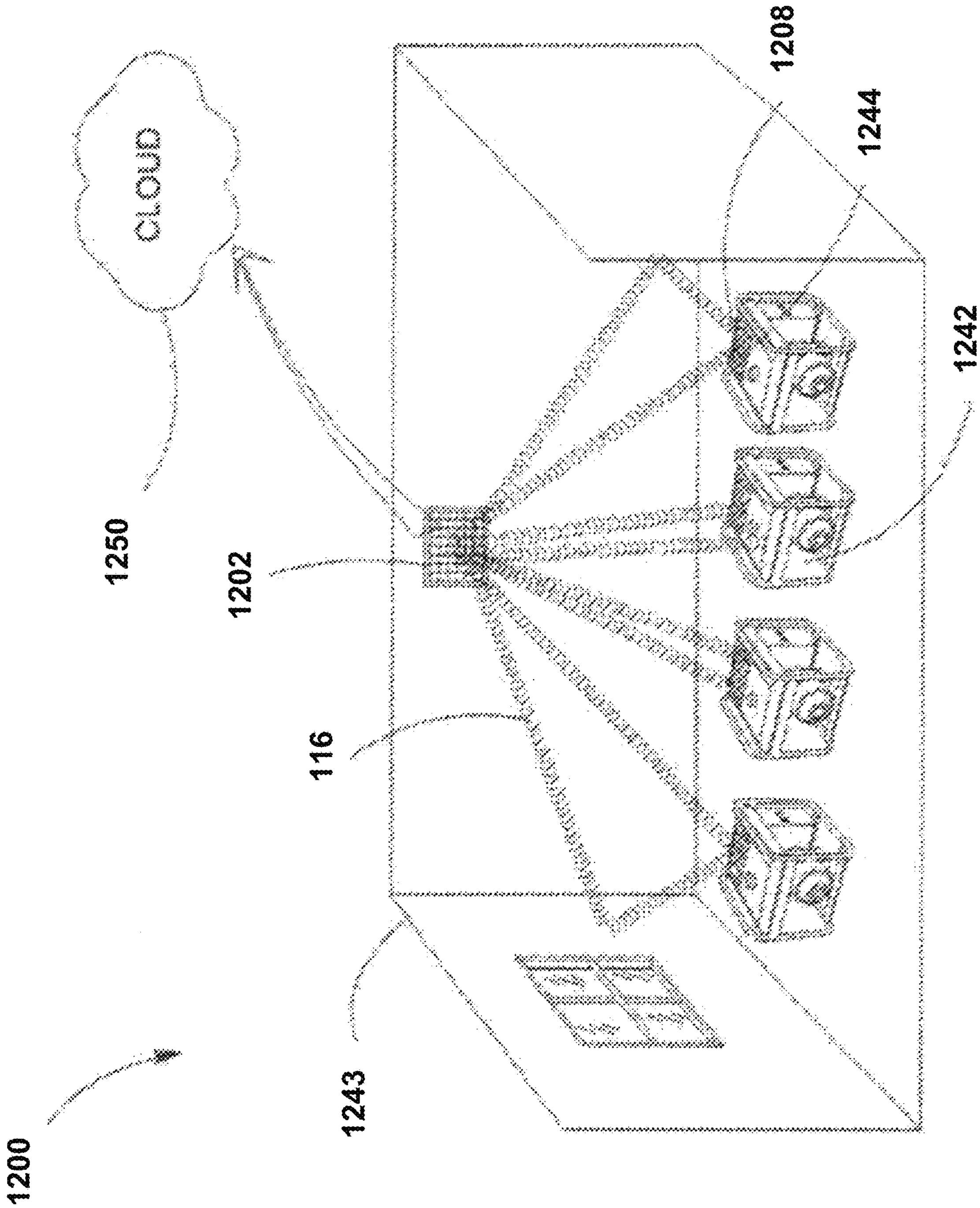

In one more example, FIG. 12D shows a wireless tracking system 1200 for tracking and controlling commodities of generators 1242 stored inside a warehouse 1243. Here, one transmitter 1202 is used, which is hanging on a wall of warehouse 1243. Each generator 1242 has an electronic tag 1244 with an adapted receiver 1208. Transmitter 1202 may transfer RF waves 116 to each receiver 1208 for powering and tracking each electronic tag 1244. The communication component used in these receivers 1208 is a BLUETOOTH protocol. In this embodiment, the unique identifier is U LIII for the BLUETOOTH protocol. If one or more generators are illegally removed from warehouse 1243, transmitter 1202 activates an alarm and notifies a security guard through an interactive message informing him/her that one or more generators 1242 are being stolen. The security guard accesses a cloud-based service 1250 through an application and identifies generators 1242 that were stolen through UUID of each electronic tag 1244. The security guard receives another interactive message informing the current location of the stolen generators 1242, in which this information was obtained when receivers 1208 from electronic tags 1244 receive RF waves 116 from other transmitter 1202. This other transmitter 1202 may upload the information of the current location of the stolen generators, allowing the guard to find these generators 1242.

FIGS. 12A-12D illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 12A-12D.

Presented below are example methods of wireless power transmission in tracking systems.

In some embodiments, an example method includes: (i) transmitting, by a transmitter, a plurality of wireless power transmission waves; (ii) defining, by the transmitter, a pocket of energy via the waves whereby a receiver is configured to interface with the pocket of energy to charge an electronic device coupled to the receiver; (iii) receiving, by the transmitter, a signal from the receiver based on the receiver interfacing with the pocket of energy; and (iv) tracking, by the transmitter, the electronic device based on the signal from the receiver, and the electronic device is associated with a living being or object.

In some embodiments, the signal includes a unique identifier associated with the electronic device.

In some embodiments, the unique identifier includes at least one of a media access control (MAC) address, an International Mobile Equipment identity number, a 15-digit unique identifier for at least one of a Global System for Mobile Communications (GSM) network, a Universal Mobile Telecommunications System (UMTS) network, and a Long Term Evolution (LTE) network, a Unique Device ID for at least one of a smartphone and a portable music player, an Android advertising ID, and an International Mobile Subscriber identity for a SIM card.

In some embodiments, the transmitter includes a controller and a communication device coupled to the controller, and the communication device is configured to communicate with the receiver in order to control the tracking.

In some embodiments, the signal includes information corresponding to at least one of a battery level of the electronic device, a geographical location of the electronic device, and a unique identifier associated with the electronic device.

In some embodiments, the method further includes uploading, by the transmitter, the information to a cloud based service.

In some embodiments, the electronic device is at least one of a bracelet, a necklace, a belt, a ring, an ear chip, and a watch.

In some embodiments, the receiver is coupled to at least one of a global positioning system (GPS) chip and a real-time location system chip.

In some embodiments, the method further includes decoding, by the transmitter, a short RF signal to identify at least one of a gain and a phase of the receiver, and the decoding facilitates a determination of a geographical location of the receiver; and tracking, by the transmitter, the device based on the decoding.

In some embodiments, another example method includes: (i) transmitting, by a set of a plurality of antennas of a transmitter, a plurality of power waves, such that at least a portion of the plurality of power waves are phase shifted by the transmitter to converge to form a first constructive interference pattern at a first location of a receiver that is coupled with an electronic device; (ii) receiving, by a communications device of the transmitter, a signal from the receiver, the signal indicating a geographical location of the electronic device coupled to the receiver, a power level of a battery of the electronic device, and a unique identifier associated with the electronic device; (iii) storing, by the transmitter, into a database configured to store device data associated with one or more electronic devices, the geographical location and the unique identifier; and (iv) transmitting, by the set of the plurality of antennas of the transmitter, the plurality of power waves while receiving the signal from the receiver, such that at least a portion of the plurality of power waves are phase shifted by the transmitter to converge to form a second constructive interference pattern, distinct from the first constructive interference pattern, at the second location of the receiver, and the second location is based on at least one of the geographical location of the electronic device, the power level of the battery of the electronic device, and the unique identifier associated with the electronic device, and the receiver is configured to harvest energy from the first and second constructive interference patterns to at least partially power the electronic device.

In some embodiments, the method further includes: (i) identifying, by the transmitter, a new geographical location of the receiver based upon the signal received from the receiver; and (ii) updating, by the transmitter, the device data of the electronic device stored in one or more storage media according to at least one geographical location received from the signal, in response to identifying the new geographical location based on the signal.

In some embodiments, storing the geographical location into the database further includes: uploading, by the transmitter, the geographical location of the electronic device to the database of a cloud-based service.

In some embodiments, the method further includes: (i) determining whether the second location (e.g., the new geographic location) of the receiver indicates that the electronic device is located within a predetermined location; and (ii) in accordance with a determination that the second location of the receiver indicates that the electronic device is not located within the predetermined location, sending a notification to a user other than a user associated with the electronic device.

In some embodiments, the method further includes: (i) determining whether the second location (e.g., the new geographic location) of the receiver indicates that the electronic device is located within a predetermined location; and (ii) in accordance with a determination that the second location of the receiver indicates that the electronic device is not located within the predetermined location, activating an alarm system that is connected to the transmitter.

FIGS. 13A-13D illustrate wireless power transmission systems powered with alternative energy sources, in accordance with some embodiments.

Figure 13A:
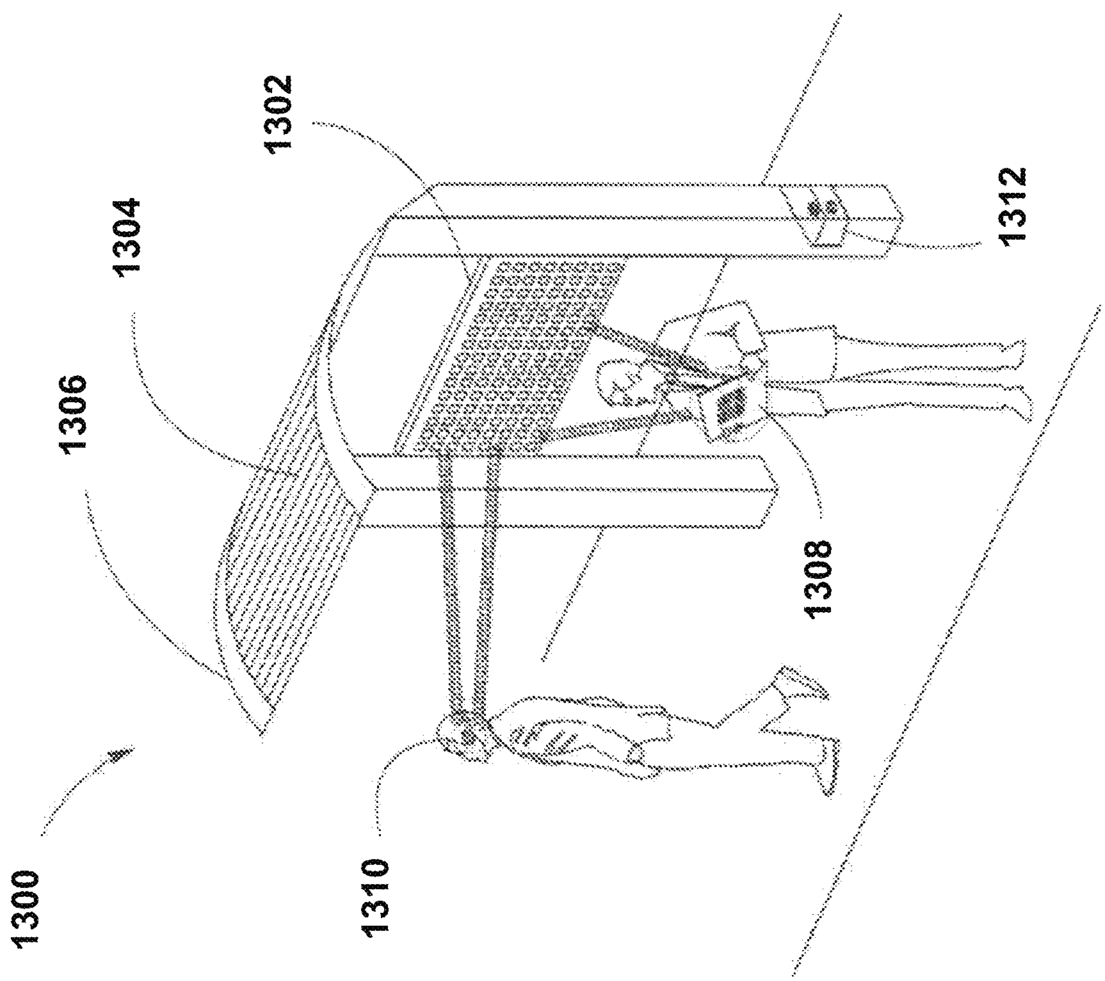
FIGS. 13A-13D illustrate various renewable energy sources for use in conjunction with wireless power transmission systems, in accordance with some embodiments.

FIG. 13A illustrates a wireless power transmission system (WPT) 1300 where a transmitter 1302, similar to transmitter 102 described in FIG. 1 above, utilizes at least one solar panel 1304 as power supply for providing wireless power, through pocket-forming, to users wanting to charge their electronic devices. In this embodiment, a bus stop station may include solar panel 1304 in its roof 1306 for providing solar power to transmitter 1302. Users at such a bus stop station may power their electronic devices, wirelessly through pocket forming, while waiting for transportation. In this embodiment, one user may charge a tablet 1308 while another user may power a BLUETOOTH headset 1310. Both electronic devices, i.e., tablet 1308 and/or headset 1310 may include receivers suitable for pocket forming (e.g., an embodiment of the receiver 120, FIG. 1). Moreover, the aforementioned bus stop station may include an energy storing unit 1312 for saving surplus solar energy. Such energy storing unit 1312 may function as battery component for transmitter 1302. WPT 1300 may be beneficial because users can power devices using alternative sources of energy different from coal or fuel oils. Moreover, electronic devices can be charged while traveling without requiring any wired connections and without the inconveniences typically associated with carrying chargers. The disclosed arrangement could also be employed in train stations, airports and other such places. Furthermore, energy storing unit 1312 can be used to provide power at such locations during the night, or during poor solar conditions.

Figure 13B:
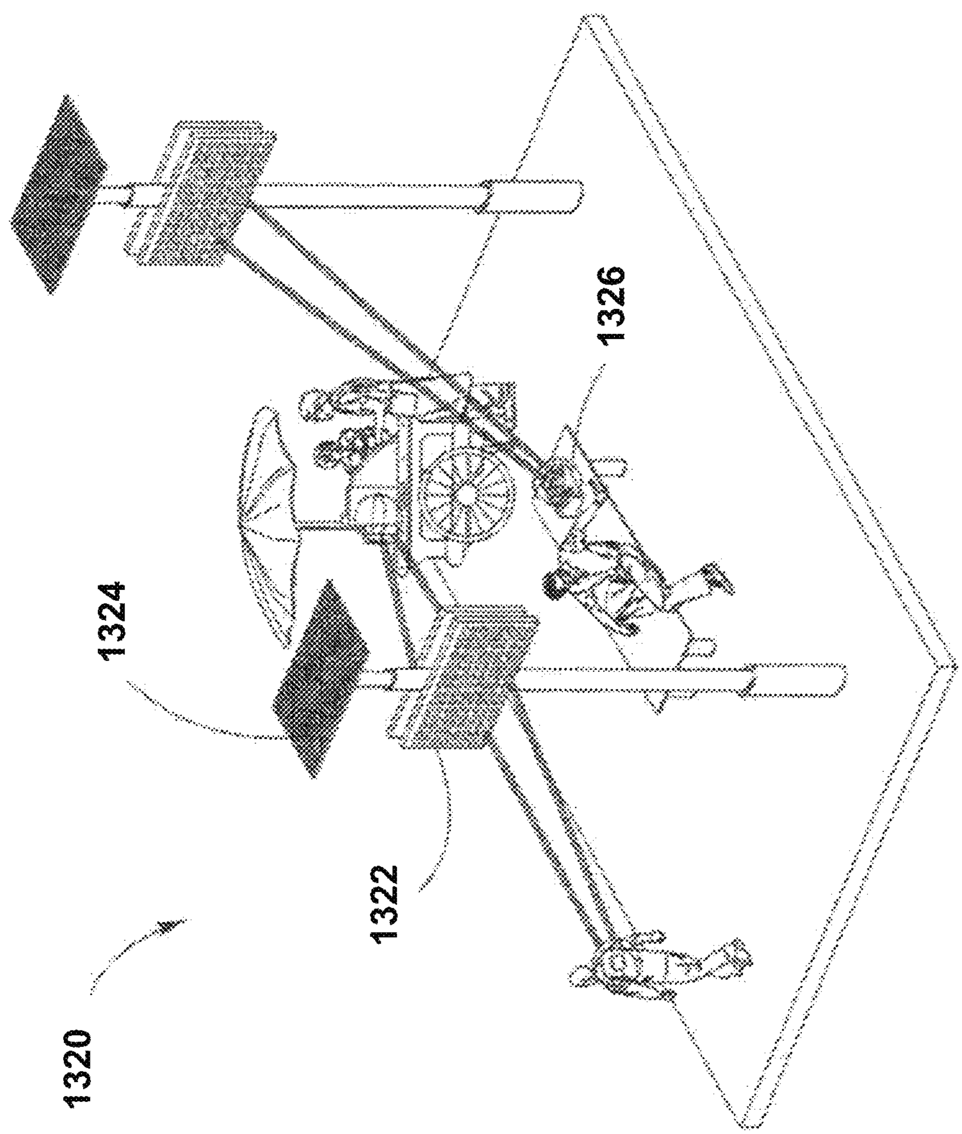

FIG. 13B illustrates a wireless power transmission system (WPT) 1320 where either one or a plurality of transmitters 1322 can be used to provide wireless power, through pocket-forming, to pedestrians wanting to charge electronic devices. As in the previous embodiment from FIG. 13A, transmitter 1322 can utilize solar panels 1324 as power supply. In addition, transmitter 1322 and solar panel 1324 can be placed in lamp pole structures and can be seen as mainstream infrastructure. Solar panels 1324 for this application can be from about 10 feet to about 30 feet in size. In this embodiment, pedestrians may charge their electronic devices, which may operatively be coupled to, attached to, or otherwise include receivers suitable for pocket-forming, while walking on the street on their way to work or while enjoying foods or beverages in food carts and the like. In some embodiments, WPT 1320 can be used wherever a lamp pole structure can be placed, for example, in parks, bridges and the like. In other variations of WPT 1320, pedestrians may charge portable rechargeable batteries 1326 which upon charging may be utilized at their homes or work sites. This foregoing embodiment may be beneficial for regions where electricity may be scarce, for example, in villages or in third world contexts. Moreover, electric companies can set up dedicated stations for powering such batteries 1326 and may charge a fee based on the amount of power requested. WPT 1320 may lead to spreading green infrastructures for power handling and distribution. Such an example can be seen in FIG. 13C below.

Figure 13C:
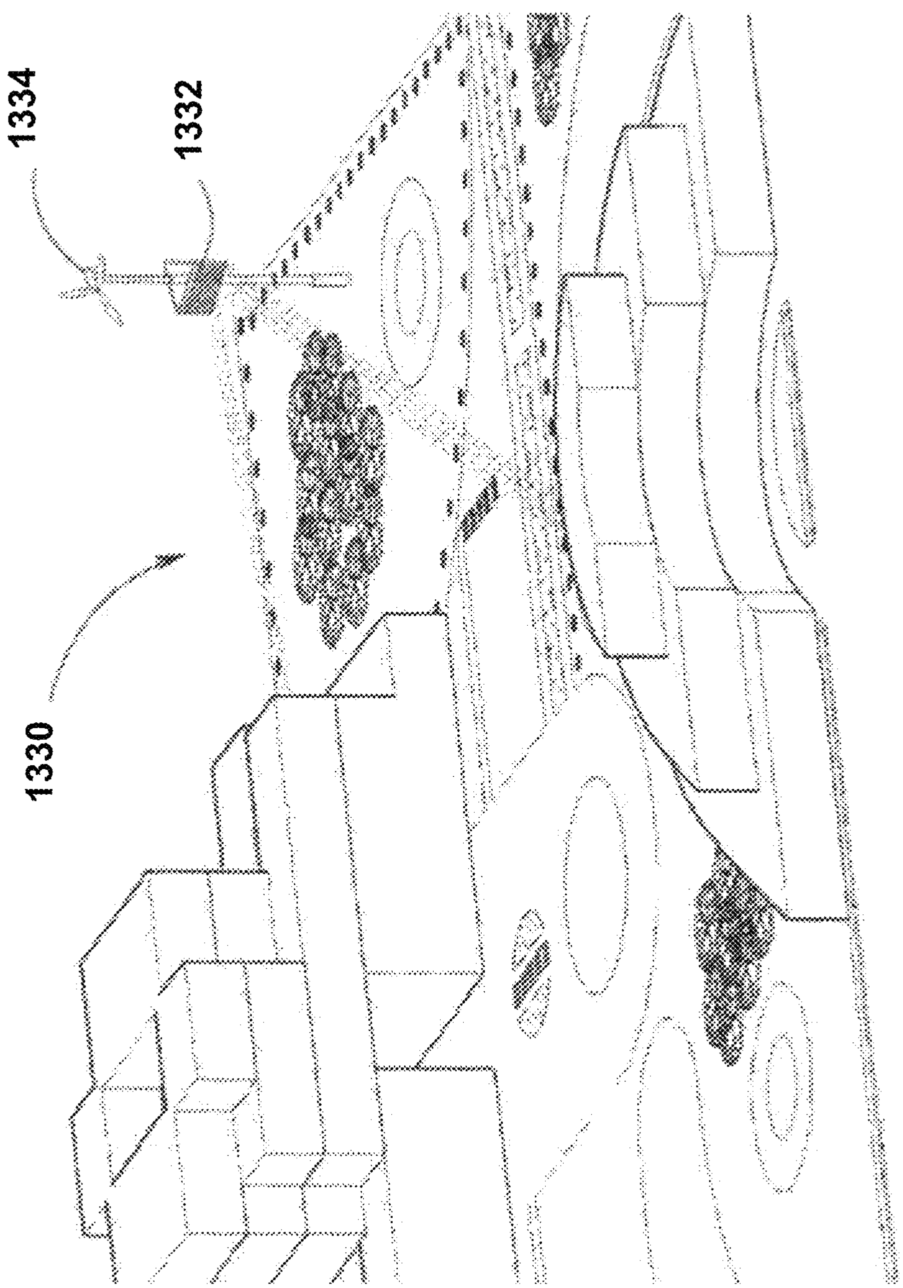

FIG. 13C illustrates a wireless power transmission system (WPT) 1330 where a transmitter 1332 may utilize a typical wind turbine 1334 as power supply. By using the power of the wind and the components typically associated with wind turbine 1334, power can be delivered wirelessly, through transmitter 1332 and pocket-forming, to houses or dedicated regions without utilizing wires, thereby reducing the cost associated with the distribution of energy. In addition, wireless power can be used by any user in the region utilizing a pocket-forming enabled device, i.e., utilizing devices which may operatively be coupled to, attached to or otherwise include receivers suitable for pocket-forming.

Figure 13D:
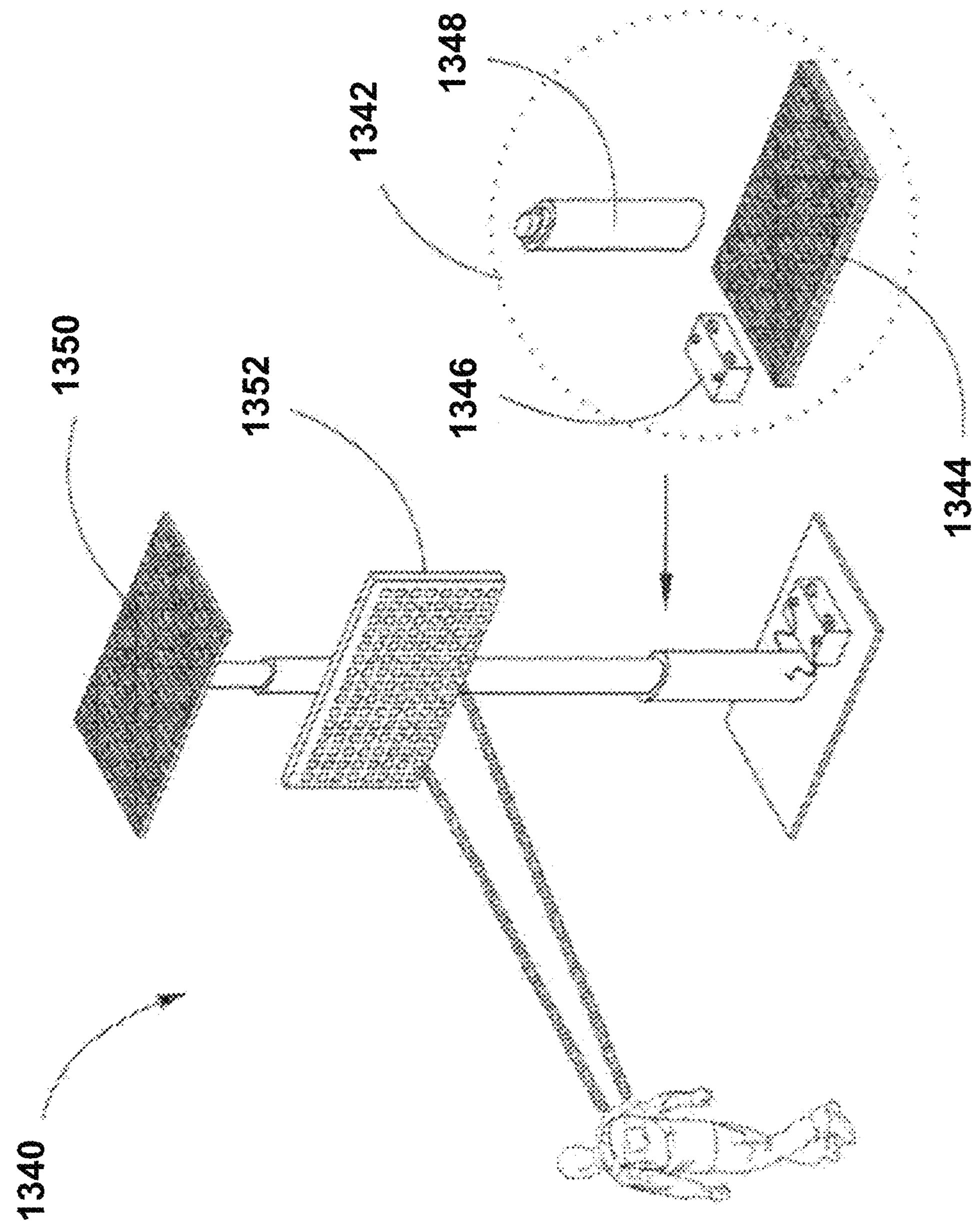

FIG. 13D illustrates a wireless power transmission system (WPT) 1340 where a portable assembly 1342 for delivering power wirelessly may be utilized. Assembly 1342 may include a power module 1344 which may further include a power source and a transmitter (not shown), a battery component 1346 for storing surplus energy, and a collapsible pole structure 1348 for mounting the aforementioned components. Pole structure 1348 can be made of a suitable material, for example aluminum, which provides high strength, durability, and low weight. Pole structure 1348 when extended can be about 10 to 30 feet in height. In its top part, a power source, such as a solar panel 1350 (included in module 1344) may be placed. Then, a transmitter 1350 (also from module 1344) may be attached to pole structure 1348 by suitable mechanical means such as brackets, fasteners, and the like. Moreover, transmitter 1352 may electrically be connected to solar panel 1350 to utilize solar energy for providing wireless power. Lastly, battery component 1346 may also be connected to store surplus energy which can be used to provide power during the night, or during poor solar conditions. Finished Assembly 1342 can be seen centered in FIG. 13D. This configuration for WPT 1340 can be beneficial when users requiring power find themselves in areas where electricity may be scarce, for example, in villages in the third world, in jungles, deserts, while navigating in the ocean, or any other situation or location where power may not be accessible.

FIGS. 13A-13D illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 13A-13D.

Presented below are example methods of wirelessly delivering power to receivers using renewable energy source.

In some embodiments, an example method includes transmitting controlled RF waves from a transmitter that converge to form pockets of energy in 3-dimensional space for powering a portable electronic device, connecting an alternate energy source to the transmitter to provide power to the transmitter, and capturing the pockets of energy by a receiver to charge or power the electronic device connected to the receiver.

In some embodiments, another example method includes: (i) receiving, by an antenna of a receiver associated with the mobile electronic device, a pocket of energy generated in response to transmission signal waves emitted by a pocket-forming transmitter coupled to a power source, the power source configured to use alternative energy; and (ii) converting, by a rectifying circuit of the receiver, the received pocket of energy into electricity to charge the electronic device.

In some embodiments, the power source is configured to use alternative energy includes a solar panel. In some embodiments, the solar panel is of a predetermined size and mounted on a pole configured to extend reach of the transmission signal waves emitted by the pocket-forming transmitter.

In some embodiments, the power source is configured to use alternative energy includes a wind turbine.

Figure 14A:
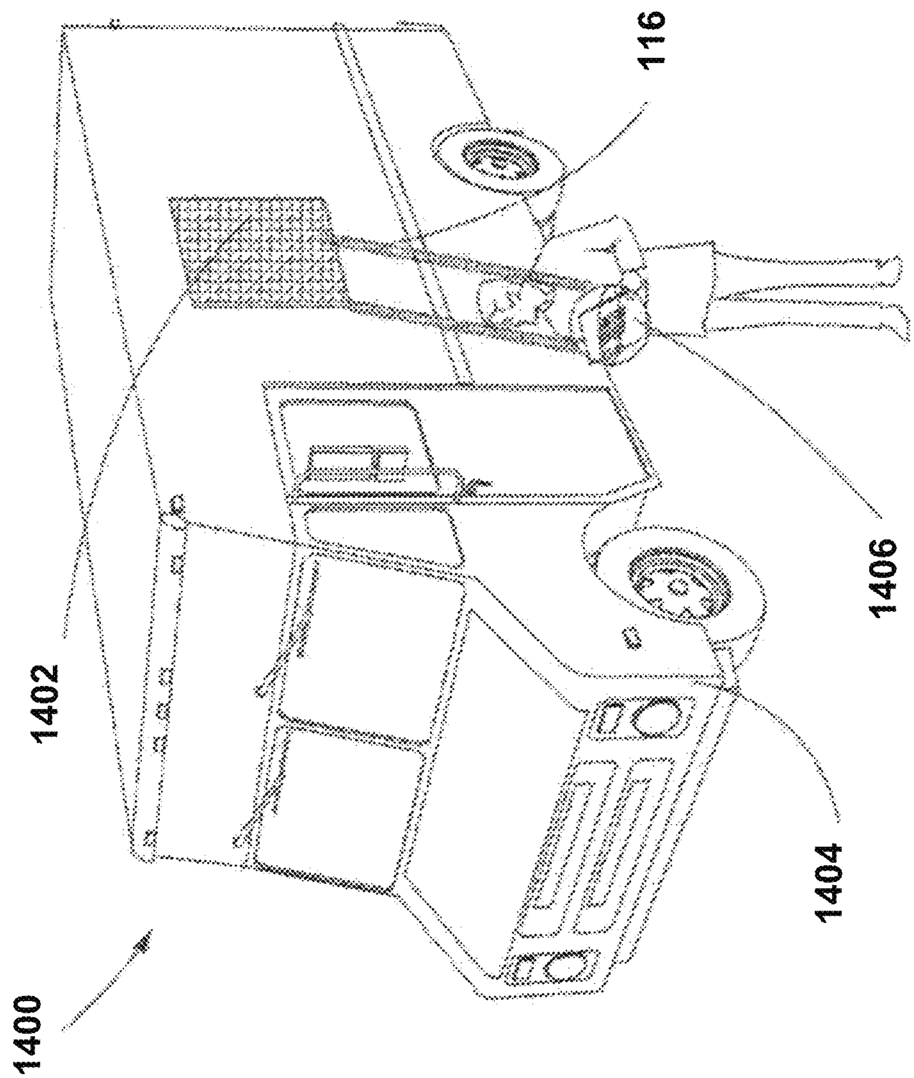
FIGS. 14A-14B illustrate wireless power transmission systems used in logistic services, in accordance with some embodiments.
Figure 14B:
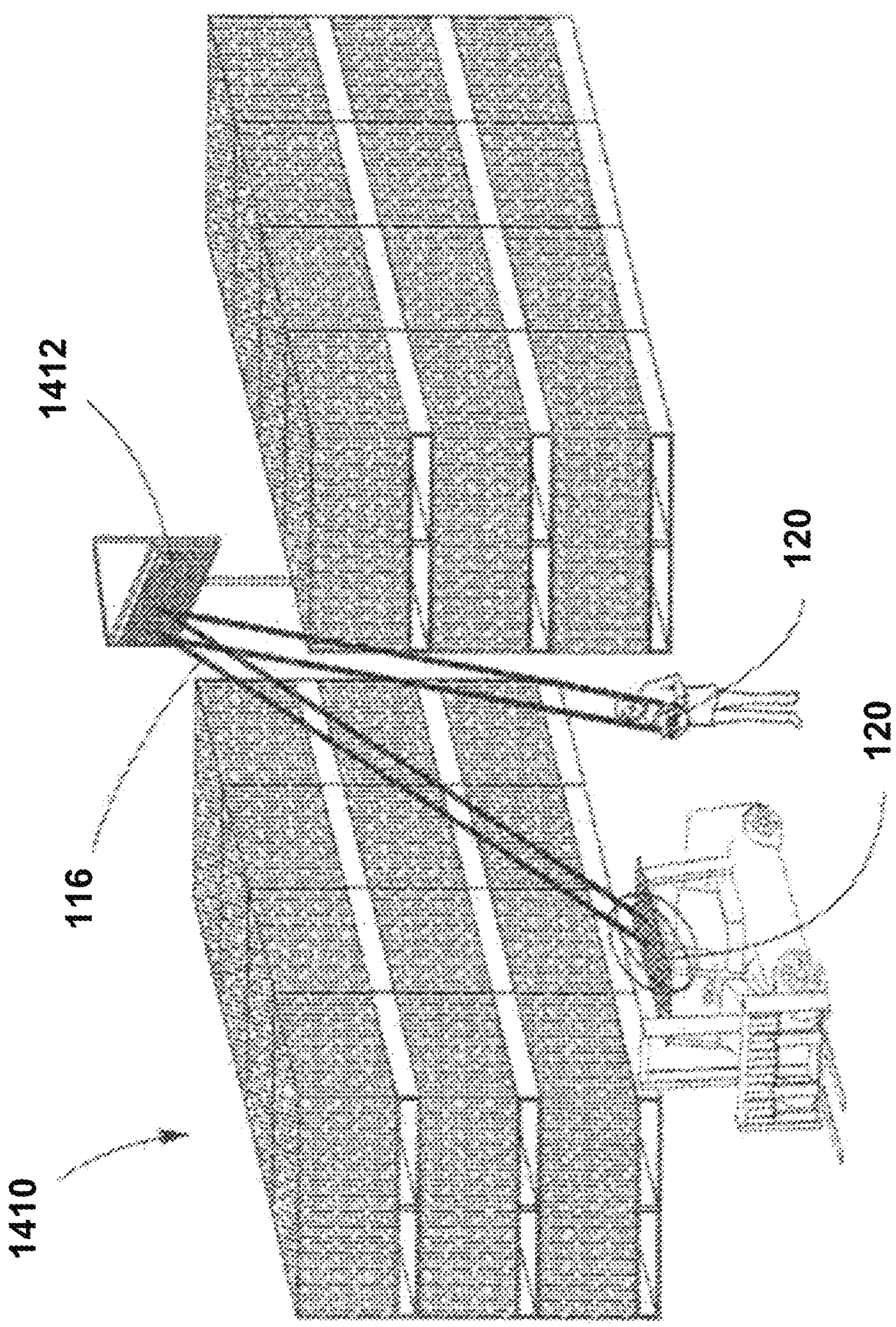

FIGS. 14A-14B illustrate wireless power transmission systems for logistic services, in accordance with some embodiments.

FIG. 14A shows a wireless power transmission system 1400 where a transmitter 1402 (e.g., an embodiment of the transmitter 102, FIG. 1) may be located on or within a delivery vehicle 1404, according to an embodiment. Delivery vehicle 1404 may be a postal truck, a pizza truck, armored truck for bank services and the like. Transmitter 1402 may use a diesel generator as power source, however, other power sources such as, an alternator of vehicle 1404, photovoltaic cells, and the like may be employed too. Transmitter 1402 may generate and direct RF waves 116 (FIG. 1) towards the receivers embedded or attached to electronic devices such as laptops, GPS, radios, cellphones, and tablets, among others. In addition, transmitter 1402 in delivery vehicle 1404 may wirelessly extend the life of batteries in the previously mentioned devices during the operation.

Transmitter 1402 may be in a door, wall, top of the delivery vehicle 1404 and the like. Furthermore, other transmitter 1402 configurations may be used in dependency of the region and requirement, such requirement may include transmitter 1402 on telescopic mast for increasing range.

FIG. 14B shows warehouse 1410 where one or more transmitters 1412 may be located in walls or ceiling for powering and charging electronic devices, such electronic devices may include tablets, laptops, cellphones, radios, lifters, hoists and the like. Transmitter 1412 may be connected to an electrical grid which may operate as power source, other power sources may be employed too. Transmitter 1412 may generate and direct RF waves 116 towards the receivers 120 embedded or attached to electronic devices such as laptops, GPS, radios, cellphones, hoists, and tablets, among others. In addition, transmitter 1412 may wirelessly extend the life of batteries in the previously mentioned devices during the operation.

Transmitter 1412 may be in/on the wall of the warehouse 1410, ceiling of the warehouse 1410, and the like. Furthermore, other transmitter 1412 configurations may be used in dependency of the region and requirement, such requirement may include transmitter 1412 on a telescopic mast for increasing range.

FIGS. 14A-14B illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 14A-14B.

Presented below is an example method of wirelessly delivering power to receivers used in logistic services.

In some embodiments, an example method includes: (i) communicating, by a receiver associated with the electronic logistics device, a power requirement for the electronic logistics device to a transmitter, (ii) receiving, by an antenna of the receiver, a pocket of energy generated in response to power transmission waves emitted by the transmitter, and (iii) converting, by a rectifying circuit of the receiver, the received pocket of energy into electricity to charge the electronic logistics device.

In some embodiments, the receiver includes a power converter and a communication component to establish communication with the transmitter when the electronic logistics device is within a predetermined distance from the pocket-forming transmitter.

In some embodiments, the communication component communicates with the transmitter through a transmission signal using a protocol selected from the group consisting of: BLUETOOTH®, WI-FI®, ZIGBEE®, or FM radio.

Figure 15A:
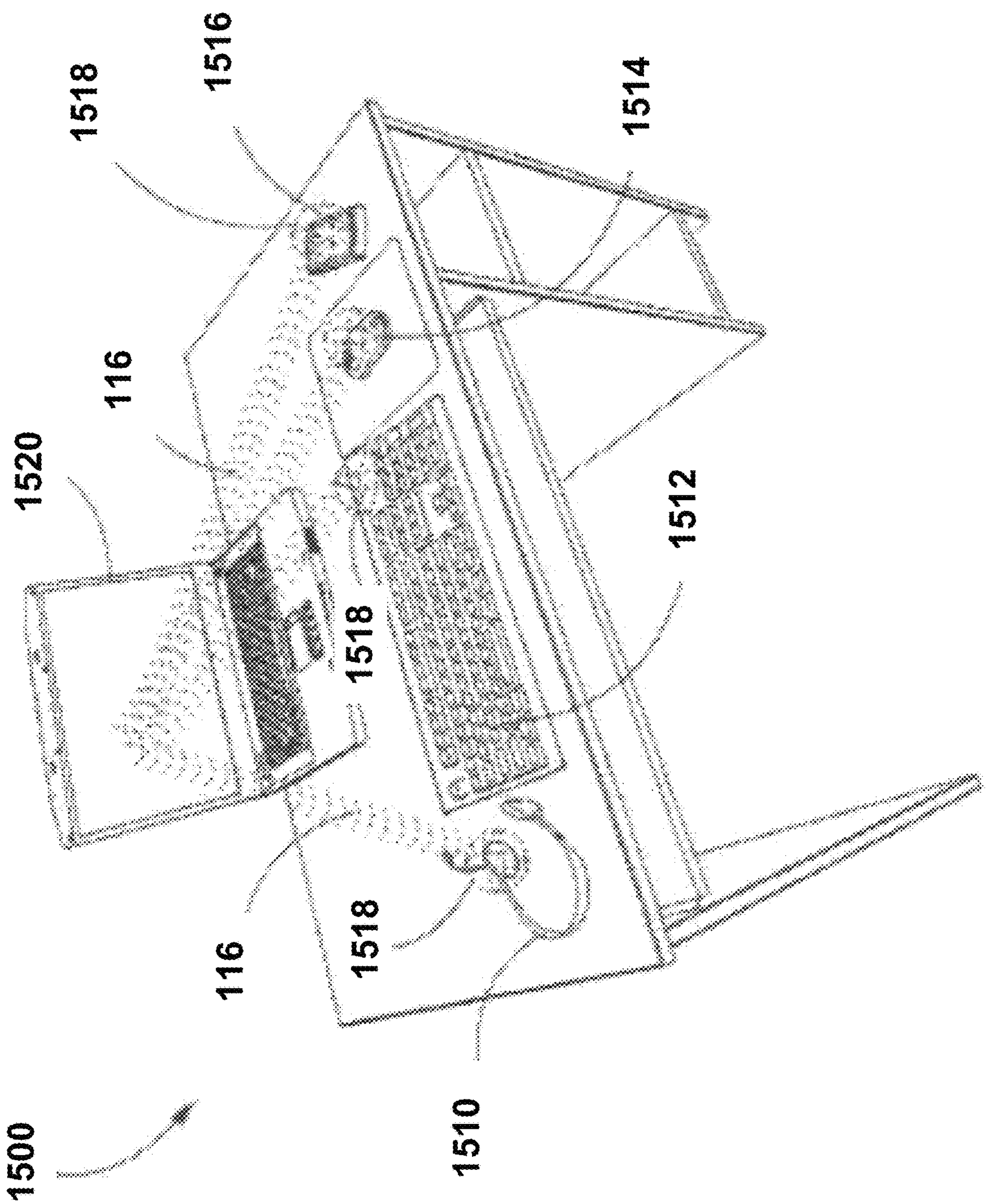
FIG. 15A illustrates a wireless power transmission system used for charging one or more peripheral devices via a transmitter associated with a laptop computer, in accordance with some embodiments.

FIG. 15A is an illustration showing a wireless power transmission system 1500 used for charging one or more peripheral devices via a transmitter (e.g., an embodiment of the transmitter 102, FIG. 1) associated with a laptop computer (e.g., a laptop with an embedded transmitter and which may also include an embedded receiver 120, FIG. 1), in accordance with some embodiments. The peripheral devices may include a headset 1510, a keyboard 1512, a mouse 1514, and a smartphone 1516, among others. In some embodiments, these peripheral devices may operate wirelessly with laptop computer through BLUETOOTH communication, and may include rechargeable batteries that are charged using wirelessly delivered power, as described below.

A transmitter (which may be embedded within the laptop 1520) may transmit controlled RF waves 116 which may converge in 3-dimensional space to form a pocket of energy near one or more of the peripheral devices. These RF waves 116 may be controlled through phase and/or relative amplitude adjustments to form constructive and destructive interference patterns (pocket-forming). Pockets of energy 1518 may be formed as constructive interference patterns and may be 3-dimensional in shape, while null-spaces may be generated using destructive interference of RF waves. As explained above, respective receivers 120 embedded in the peripheral devices convert energy from the RF waves that have accumulated in the pockets of energy 1518 to usable power for charging or powering batteries in the peripheral devices.

In some embodiments, the laptop computer 1520 may be connected to a conventional wall outlet for charging its battery to suitable levels, while providing wireless power transmission to the peripheral devices.

Figure 15B:
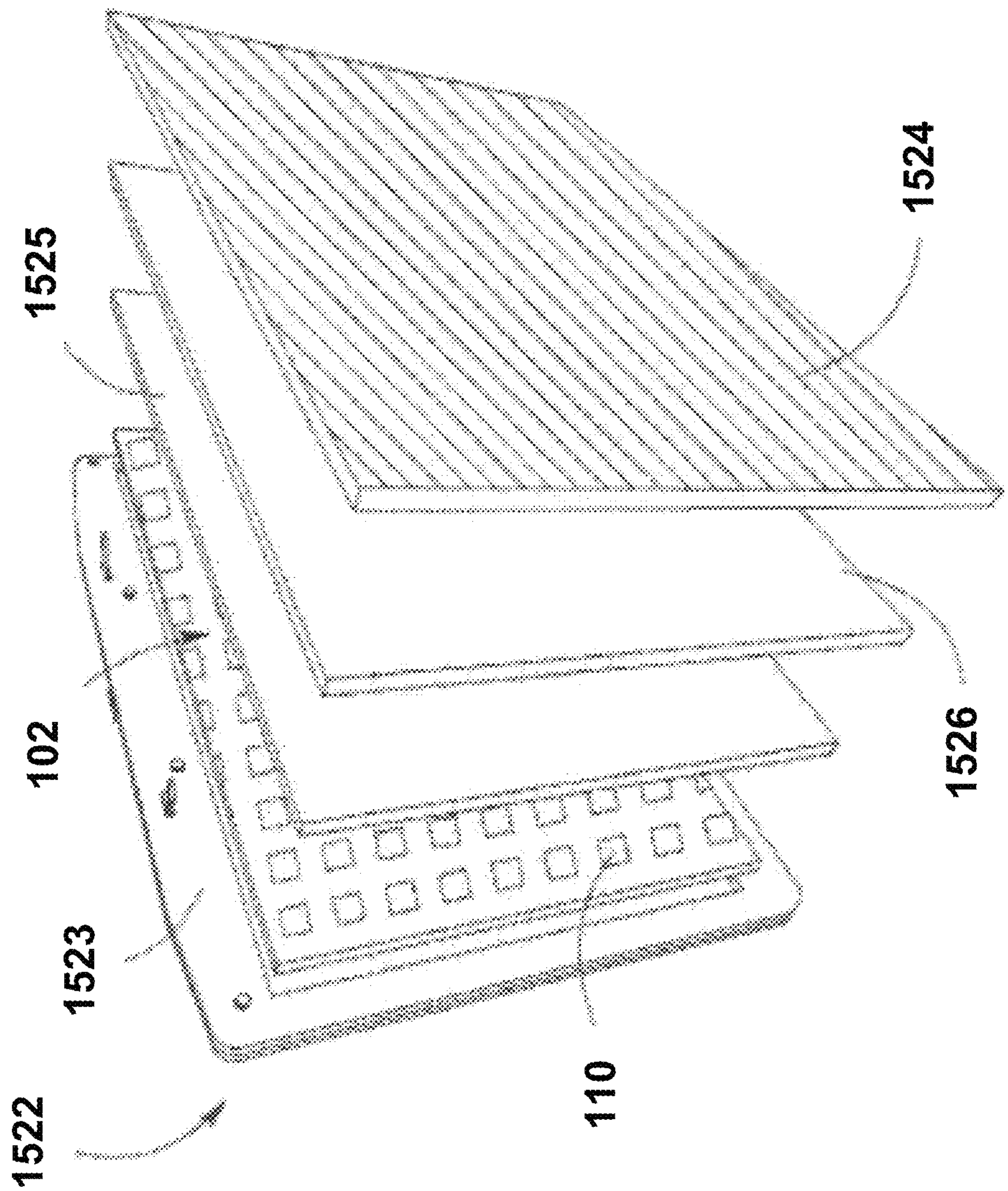
FIG. 15B is an exploded view of a laptop screen, showing components including an embedded wireless power transmitter, in accordance with some embodiments.

FIG. 15B is an exploded view of a laptop screen 1522, showing components including an embedded wireless power transmitter 102 with transducer elements 110 (FIG. 1), in accordance with some embodiments. In some embodiments, the laptop screen 1522 may be formed of different layers, including a front transparent screen layer 1524, a polarized film layer 1526, a LED/LCD back-light layer 1525, and a frame 1523. In some embodiments, transmitter 102 may be integrated in the screen, specifically between LED/LCD back-light layer 1525 and frame 1523. As shown in FIG. 15B, the transmitter 102 may include a plurality of transducer elements 110 facing out of the screen. This configuration of transducer elements 110 may allow suitable transmission of RF waves towards the peripheral devices discussed above in reference to FIG. 15A. In other embodiments, the transmitter 102 may be embedded in circuitry elements or metal mesh (touchscreen versions) of the screen.

Figure 15C:
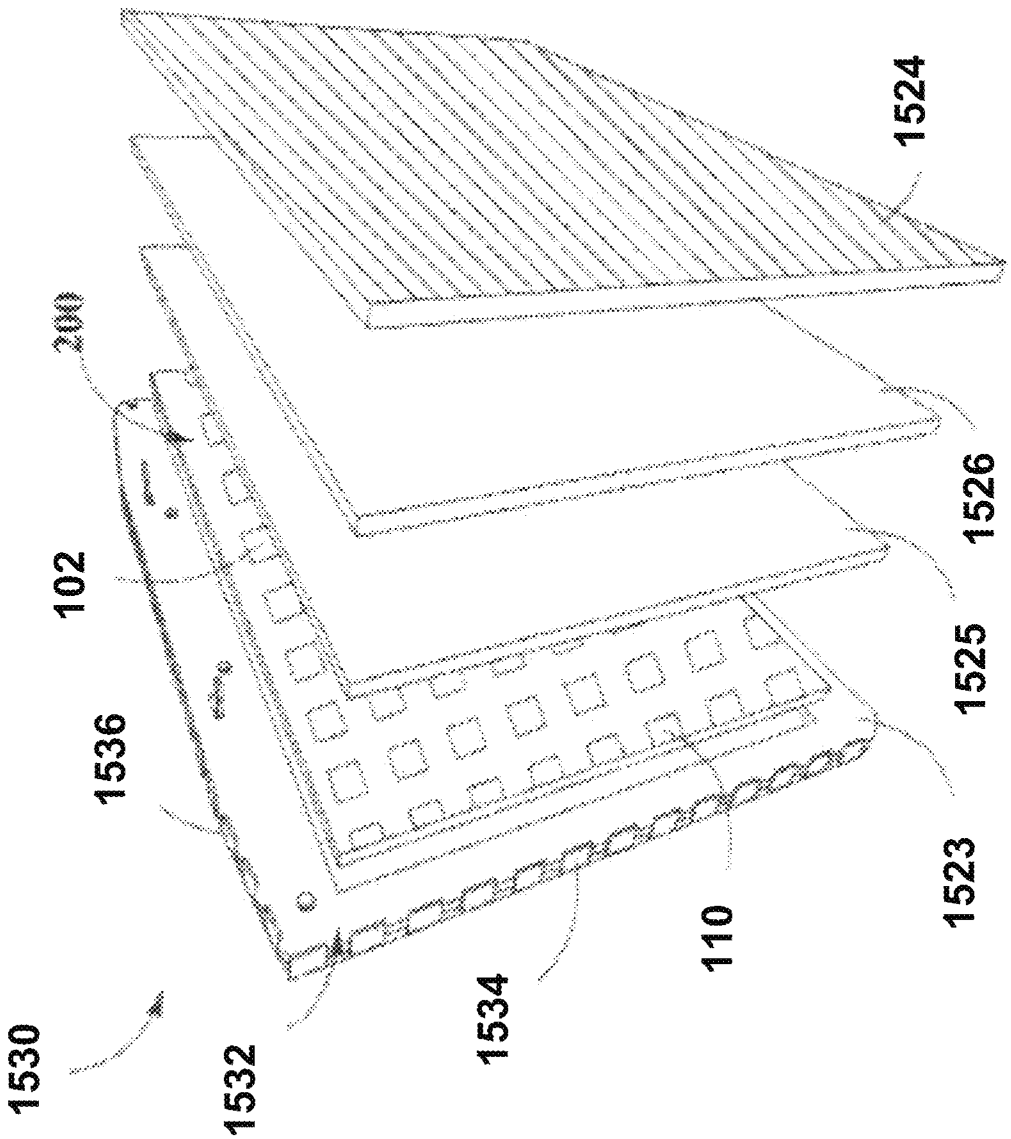
FIG. 15C is an exploded view of a laptop screen, showing components including an embedded wireless power transmitter and an embedded wireless power receiver, in accordance with some embodiments.

FIG. 15C is an exploded view of a laptop screen 1530, showing components including an embedded wireless power transmitter 102 with transducer elements 110 and an embedded wireless power receiver 1532 (e.g., an embodiment of receiver 120, FIG. 1), in accordance with some embodiments. The laptop screen 1530 may be formed of different layers, as described above in reference to FIG. 15B. In some embodiments, the transmitter 102 may be integrated between LED/LCD back-light layer 1525 and frame 1523, while receiver 1532 may be integrated along frame 1523. As shown in FIG. 15C, in some embodiments, transducer elements 110 of transmitter 102 may point out of the screen 1530, while sensor elements 1534 of receiver 1532 may be embedded around the edges of frame 1523 for allowing reception of RF waves from sources or transmitters at different locations.

The location and configuration of transmitter 102 and receiver 1532 in laptop computer screen 1530 may vary according to the application. In some embodiments, the receiver 1532 may be configured in the middle of the back of frame 1523 and may include high directional sensor elements 1536 that can be oriented towards a transmitter in proximity to the laptop computer 1520 for receiving suitable wireless power transmissions that may be used to power the laptop 1520. In other embodiments, laptop computer screen 1530 may include a single transmitter 102 that may also operate as a receiver 120, in which case the transmitter 102 may use same transducer elements 110 for transmitting and receiving RF waves. That is, the transmitter embedded in laptop computer screen 1530 may switch between those transducer elements 110 receiving RF waves for charging a battery of the laptop or transmitting RF waves for charging batteries in peripheral devices. An algorithm executed by a microcontroller of the laptop may be used to control the switching between transmitting and receiving RF waves.

Figure 15D:
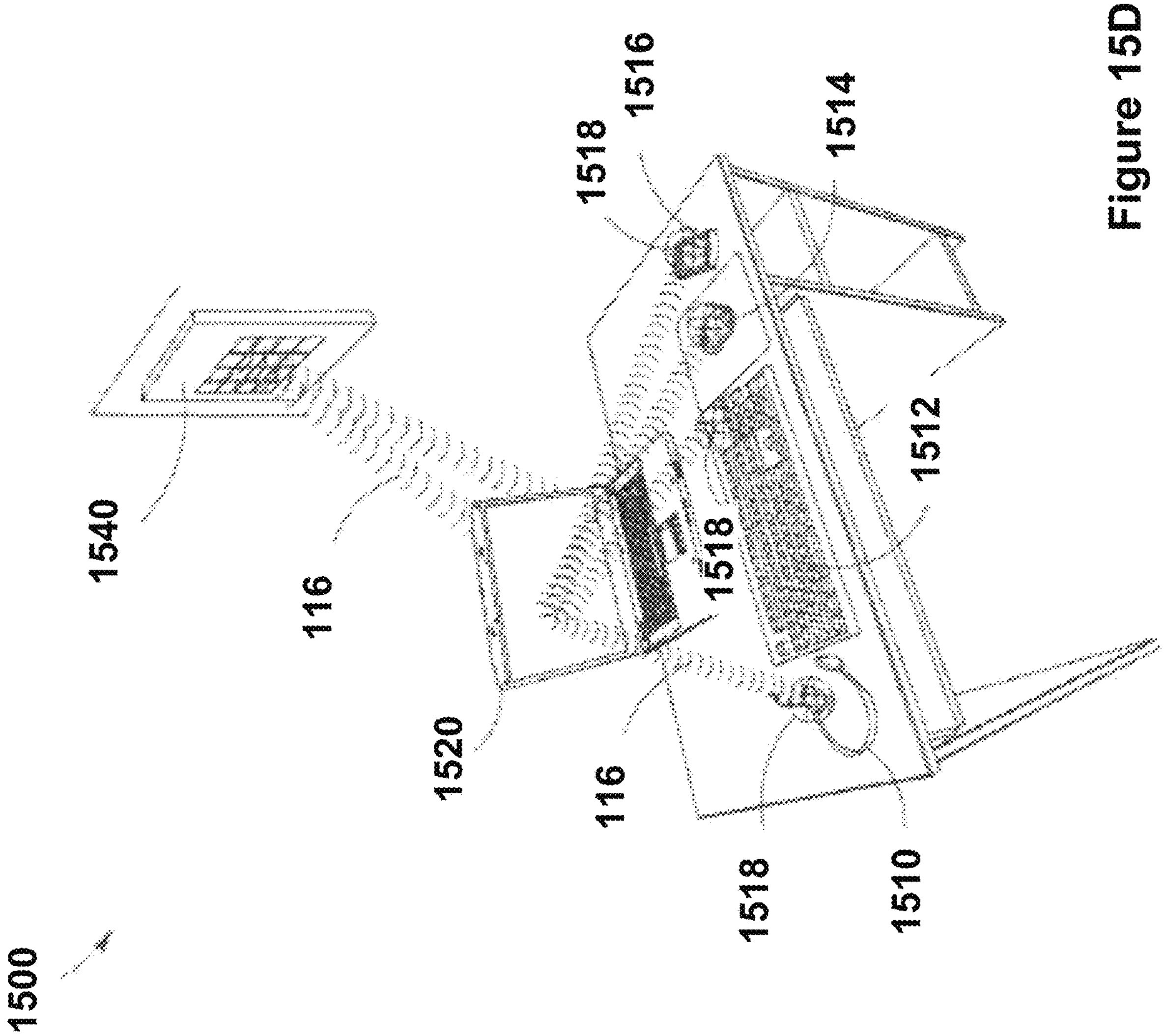
FIG. 15D illustrates a wireless power transmission system in which a laptop computer may receive and transmit radio frequency waves in a substantially simultaneous fashion, in accordance with some embodiments.

FIG. 15D is an illustration showing the wireless power transmission system 1500 of FIG. 15A, in which the laptop computer 1520 is also configured with an embedded receiver 120, so that the laptop 1520 may receive and transmit RF waves in a substantially simultaneous fashion, in accordance with some embodiments. In some embodiments, one or more separate transmitters 1540 may direct RF waves 116 towards edges of the laptop computer's screen where sensor elements of the embedded receiver may be integrated (not shown). In this way, pockets of energy may be captured by the sensor elements and utilized by the embedded receiver to charge a battery of the laptop 1520. Simultaneously, an embedded transmitter 102 (not shown), may direct RF waves towards one or more peripheral devices.

In some embodiments, transmitter 1540 may include a higher amperage power source such as a standard 120/220 volts AC house connection compared to transmitter 102 embedded in the laptop, which may obtain power only from a battery of the laptop. This may allow the transmitter 1540 to have a wider wireless charging range as compared to the embedded transmitter of the laptop. In some embodiments, the various peripheral devices 1510, 1512, 1514, and 1516 may receive wirelessly delivered power from either or both of the transmitter 1540 and the embedded transmitter of the laptop. In some embodiments, an algorithm processed by a microcontroller of the laptop and/or the transmitter 1540 may coordinate wireless power delivery operations between the transmitters. For example, this algorithm may decide which transmitter should send RF waves to wirelessly charge peripheral devices, depending on proximity and/or energy levels of a battery in the laptop computer.

Figure 15E:
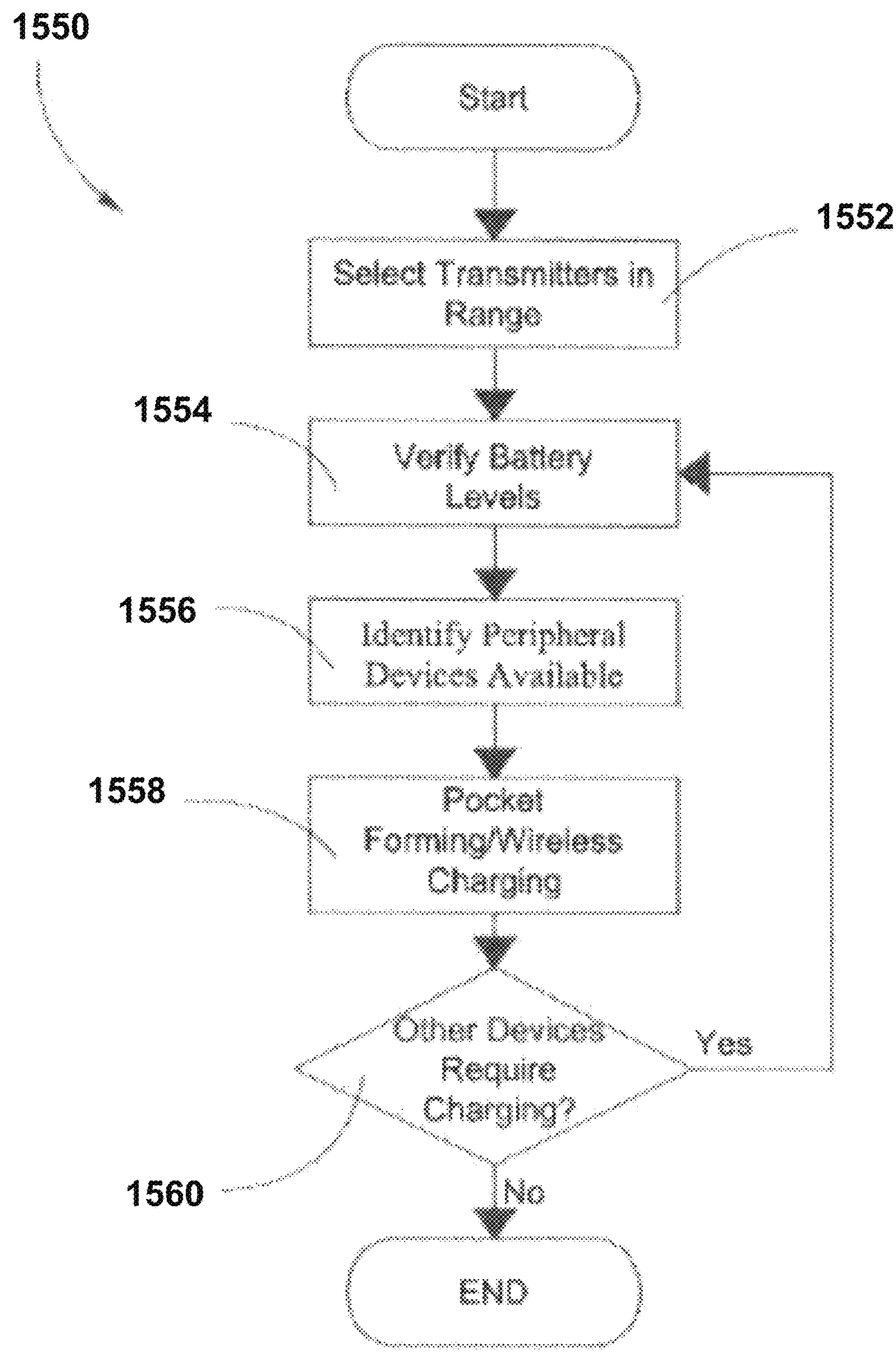
FIG. 15E is a flow diagram of a wireless power transmission process that may be implemented for charging one or more peripheral devices using a laptop computer, in accordance with some embodiments.

FIG. 15E is a flow diagram of a method of wireless power transmission that may be implemented for charging one or more peripheral devices using a laptop computer (e.g., the laptop discussed above in reference to FIGS. 15A-15D), in accordance with some embodiments.

Wireless power transmission process 1550 may begin by selecting one or more transmitters in range, at block 1552. One or more peripheral devices may require wireless charging, in which case, one or more transmitters in a room, or an embedded transmitter 102 of the laptop may be selected if they are within a suitable range. For example, if a smartphone is not within a suitable charging distance from the laptop (e.g., not on the table, or within 3-4 feet of the laptop), then a higher power transmitter 1540 may be selected for delivering wireless power. In some embodiments, a wireless charging distance for the embedded transmitter of the laptop may be within a range of about 1 to 3 meters, and if peripheral devices are outside this range, then they instead will be wirelessly charged by transmitter 1540.

The laptop may also include a software application that may provide information about distance, charging levels, efficiency, location, and optimum positioning of the laptop computer with respect to peripheral devices and transmitter 1540.

After selecting the transmitter within the optimal charging range, wireless power transmission process 1550 may continue by checking charge levels of the battery in the laptop, at block 1554. This check may be performed by a control module included in the laptop (not shown) or by a microcontroller included with the transmitted embedded in the laptop. In some embodiments, a charge level of the laptop must be above a certain threshold to allow the laptop to transmit wireless power. For example, minimum and maximum charging thresholds may be established at about 25% and 99% of total charge, respectively. That is, if battery charge is below the minimum threshold or 25%, then the laptop must be connected to a power outlet or it may receive wireless charging from transmitter 1540. When battery charge is at 99% or at least above 25%, the laptop 1520 may transmit RF waves for charging peripheral devices that are within range.

Wireless power transmission process 1550 may continue at block 1556, where a communications component of the embedded transmitter or transmitter 1540 may identify one or more peripheral devices that may require wireless charging. In some embodiments, priority charging orders are established and utilized to ensure that the one or more peripheral devices are charged in a particular order.

After the one or more peripheral devices are identified and charging priorities/parameters in the embedded transmitter or transmitter 1540 are set, transmission of RF waves towards designated peripheral devices can begin, at block 1558, where these RF waves may constructively interfere to generate pockets of energy proximate to the peripheral devices, which pockets of energy may be converted by respective embedded receivers to usable power for powering or charging the one or more peripheral devices, sequentially or simultaneously.

Using a communications component, the embedded transmitter of the laptop or transmitter 1540 on the wall may continuously check if there are other peripheral devices that may require wireless charging or powering, at block 1560. If new or additional peripheral devices are identified, then either transmitter may wirelessly charge the newly identified peripheral devices according to the established charging priorities, optimum ranges, battery levels and/or other parameters. If no further peripheral devices are recognized or need wireless charging, then wireless power transmission process 1550 may end.

FIGS. 15A-15E illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 15A-15E.

Presented below are example systems and methods of wirelessly delivering power to receivers using a transmitter coupled to an electronic device (e.g., a laptop).

In some embodiments, an example method includes, embedding a pocket-forming transmitter in a screen display of the computer system; transmitting power RF waves from the pocket-forming transmitter having a radio frequency integrated circuit, antenna elements, a microprocessor and communication circuitry; generating pockets of energy from the transmitter to converge in 3-dimensional space at predetermined locations; integrating a receiver having antenna elements and communication circuitry within the electronic device; and converting the pockets of energy from the transmitter to the integrated receiver to power the electronic device.

In some embodiments, the computer system is a laptop, notebook or nano-notebook. In some embodiments, computer system is a desktop computer, a tablet, iPad, iPhone, smartphone or other peripheral portable electronic devices.

In some embodiments, the computer system includes an embedded receiver whereby a separate transmitter in proximity to the computer system powers the computer system while the transmitter of the computer system wirelessly charges the electronic device.

In some embodiments, another example method includes, receiving, at a computer system that is coupled (e.g., directly, mechanically coupled) to a first transmitter, information identifying a location of a receiver device that requires charging, and the location is within a predetermined range of the computer system; in accordance with a determination that a charge level of the computer system is sufficient to allow the computer system to provide wireless power to the receiver device, transmitting a first set of power waves, via a plurality of antennas of the first wireless power transmitter, that converge proximate to the location of the receiver device to form a pocket of energy at the location;

and while transmitting the first set of power waves that converge proximate to the location of the receiver device to form the pocket of energy at the location: (i) receiving, at the computer system, a second set of power waves from a second wireless power transmitter, distinct and separate from the first wireless power transmitter, and (ii) charging the computer system by converting energy from the second set of power waves into usable electricity.

In some embodiments, the first transmitter is integrated between a back-light layer and a frame of a screen display of the computer system.

In some embodiments, the first transmitter is embedded in a screen of the computer system.

Figure 16B:
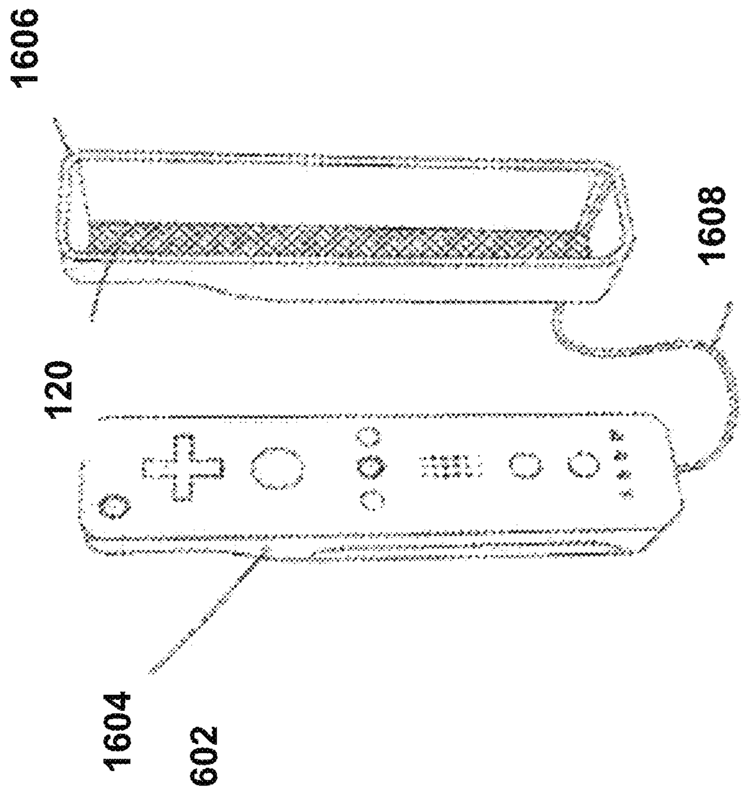
FIGS. 16A-16B are illustrations of game controllers that are coupled with wireless power receivers, in accordance with some embodiments.
Figure 16A:
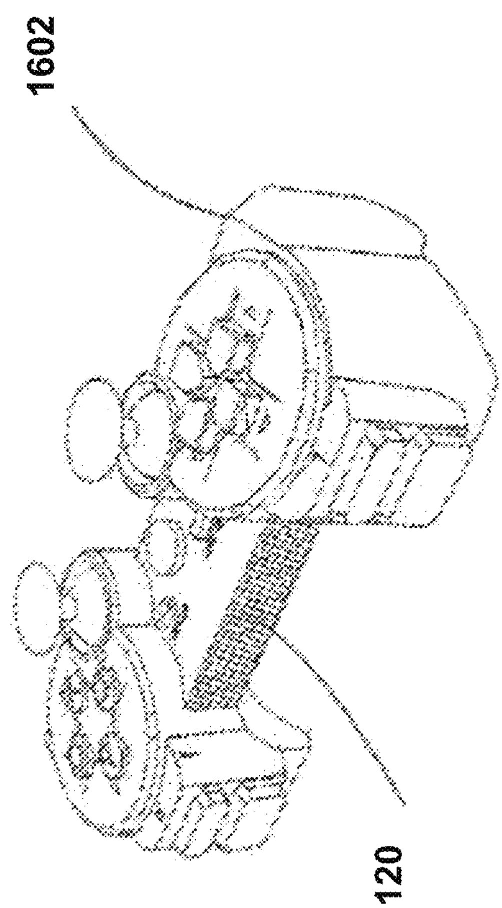

FIGS. 16A-16B are illustrations of game controllers that are coupled with wireless power receivers, in accordance with some embodiments. As shown in FIG. 16A, a receiver 120 may be integrated on a front side of the game controller 1602, and the receiver 120 may include an array of sensor elements strategically distributed to match the game controller's design.

In FIG. 16B, another game controller 1604 is shown and that controller includes a receiver 120 that is integrated with an additional case 1606 to provide wireless power receiver capabilities to the game controller 1604. Case 1606 may be made out of plastic rubber or any other suitable material for cases, and it may include an array of sensor elements located on the back side of the case, which number and type may be calculated according to the game controller design. Case 1606 may also be connected to game controller 1604 through a cable 1608, or in other embodiments, the case 1606 may be attached to a surface of the game controller 1604.

FIGS. 16C-16G illustrate various wireless power transmission systems in which power is wirelessly delivered to electronic devices using RF waves, in accordance with some embodiments.

Figure 16C:
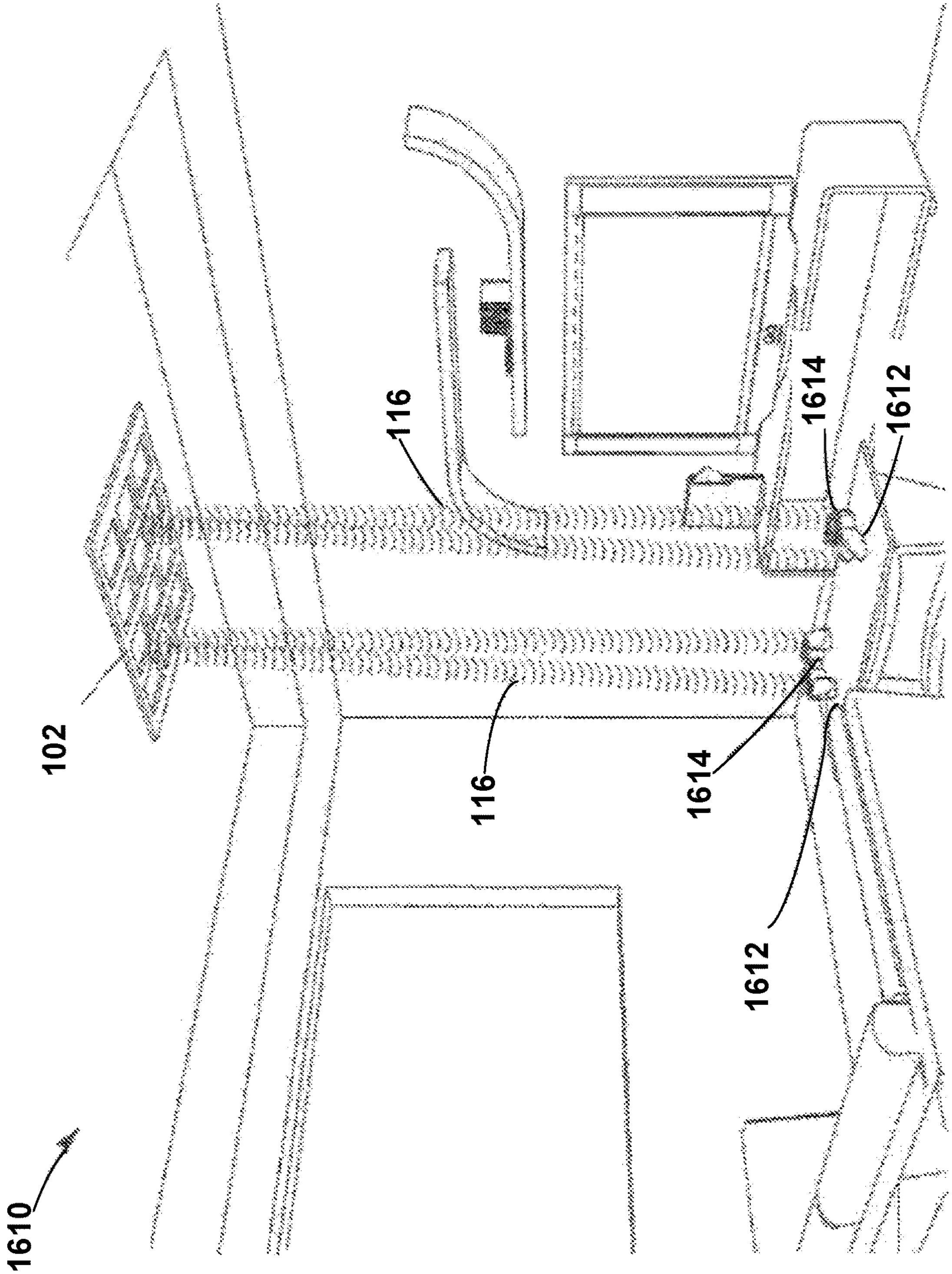
FIGS. 16C-16G illustrate various wireless power transmission systems in which power is wirelessly delivered to electronic devices, in accordance with some embodiments.

FIG. 16C illustrates a wireless power delivery system 1610 that wirelessly transmits power to game controllers 1612, using pocket-forming. In some embodiments, transmitter 102 may be located at the ceiling of a living room pointing downwards, and may transmit controlled RF waves 116 which may converge in 3-dimensional space. The amplitude of the RF waves 116 may be controlled through phase and/or relative amplitude adjustments to form constructive and destructive interference patterns (pocket-forming), and produce controlled pockets of energy 1614. Receiver 120, embedded or attached to game controllers 1612, may then utilize energy from the pockets of energy for charging or powering an electronic device.

Figure 16D:
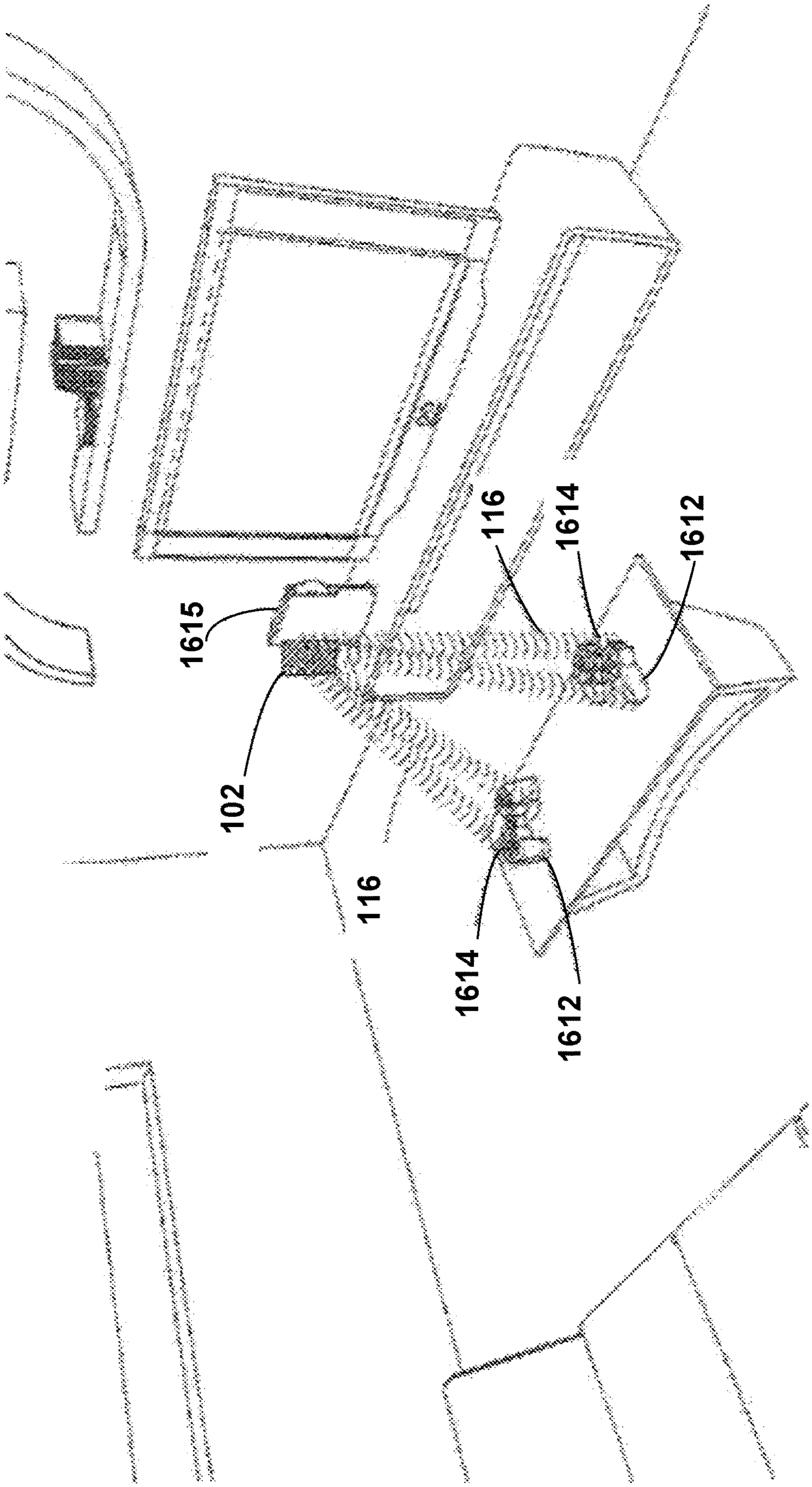

In FIG. 16D, the transmitter 102 is coupled with a game console 1615, and the receivers embedded within respective game controllers 1612 wirelessly receive RF waves from the transmitter 102 and then convert energy from the RF waves that has accumulated in pockets of energy 1614 into usable power.

Figure 16E:
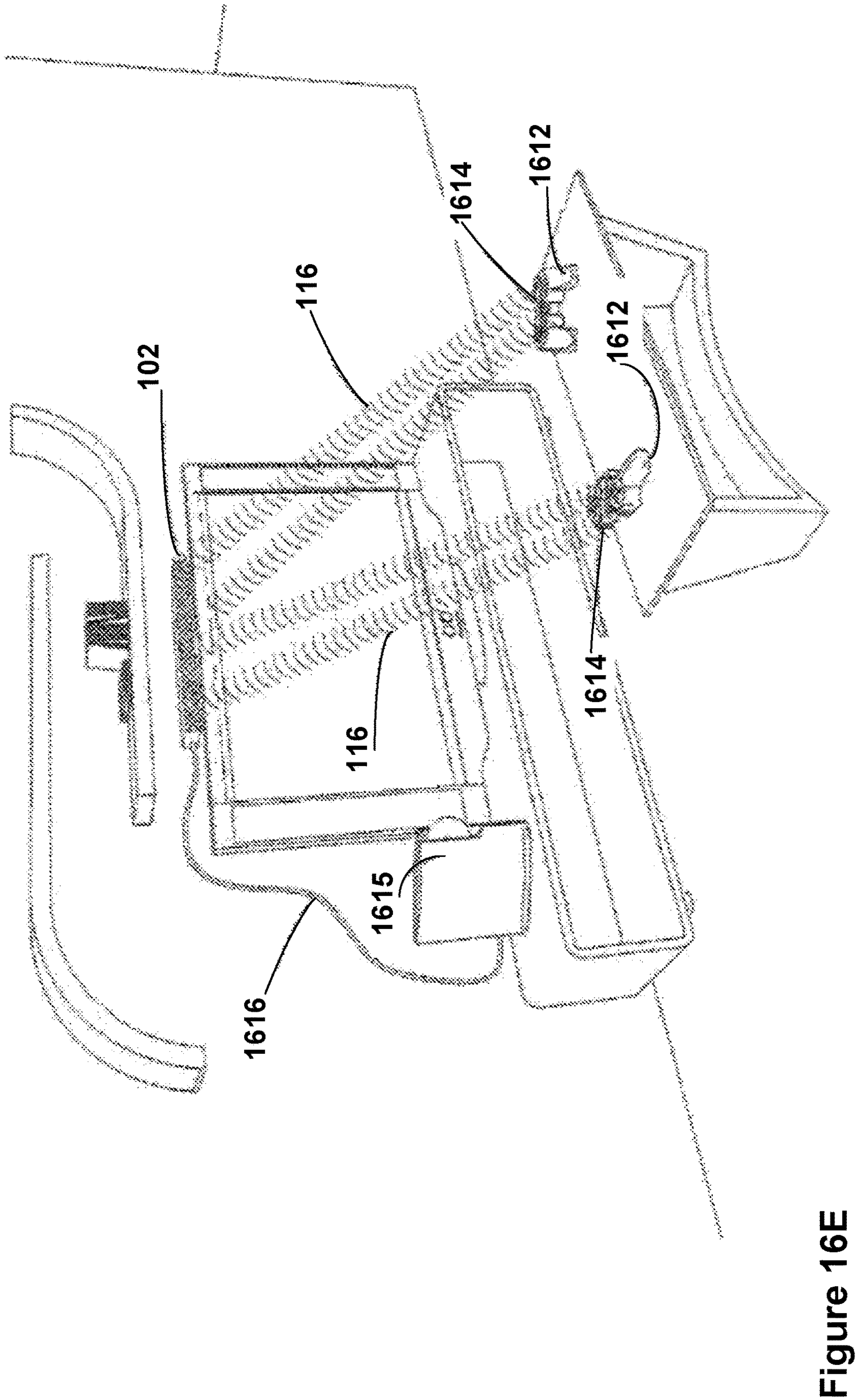

In FIG. 16E, the transmitter 102 is coupled with a game console 1615 via a cable 1616 (such as a USB cable), and the receivers embedded within respective game controllers 1612 wirelessly receive RF waves from the transmitter 102 and then convert energy from the RF waves that has accumulated in pockets of energy 1614 into usable power. In some embodiments, the game console 1615 produces power along the cable 1616, and the transmitter uses that power to generate RF waves that are then transmitted to the game controllers 1612 for charging and powering purposes, as described above.

Figure 16F:
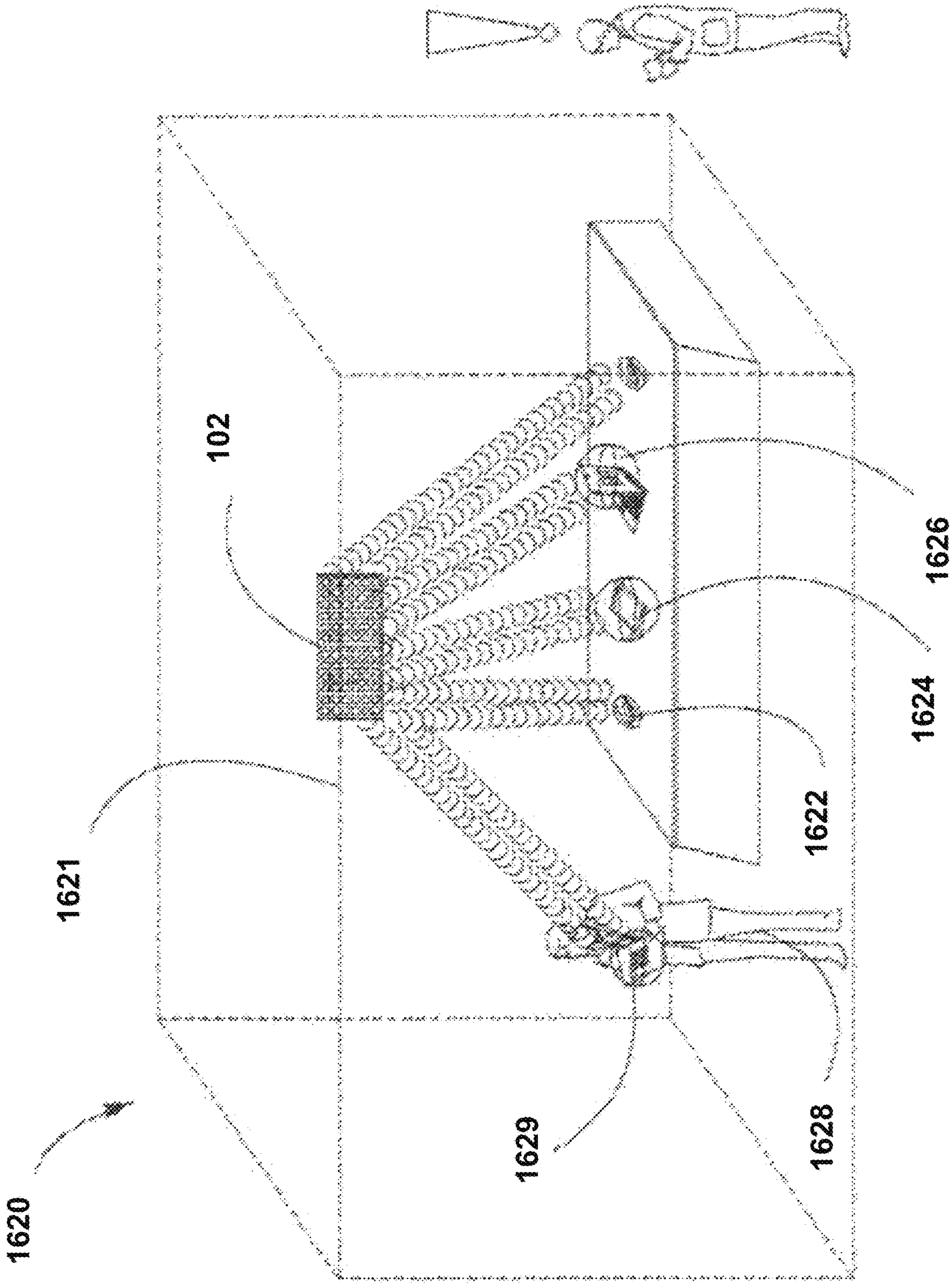

FIG. 16F illustrates a wireless power delivery system 1620 where various electronic devices, for example a smartphone 1622, a tablet 1624, and a laptop 1626 may receive power, through pocket-forming techniques (as described throughout this detailed description), utilizing a transmitter 102 at a predefined range 1621. In some embodiments, these devices may include embedded receivers 120 (or be otherwise operatively coupled to receivers) and capacitors for obtaining necessary power for performing their intended functions. In some embodiments the system 1620 may be utilized in retail stores where interaction between electronic devices (used for showcase) and potential buyers may be limited due to the presence of wired connections. A potential buyer 1628 may be interested in acquiring a tablet 1629 and, because the system 1620 has been implemented, the buyer 1628 may interact freely with the tablet 1629 before purchasing, but subject to certain restrictions. For example, were buyer 1628 to step out of the range at which transmitter 102 wirelessly delivers power, tablet 1629 may no longer operate (as can be seen in the rightmost part of FIG. 16F for another buyer). In some embodiments, the transmitter 102 may also detect when a tablet or other device travels outside of its range, and may then issue an alarm.

Figure 16G:
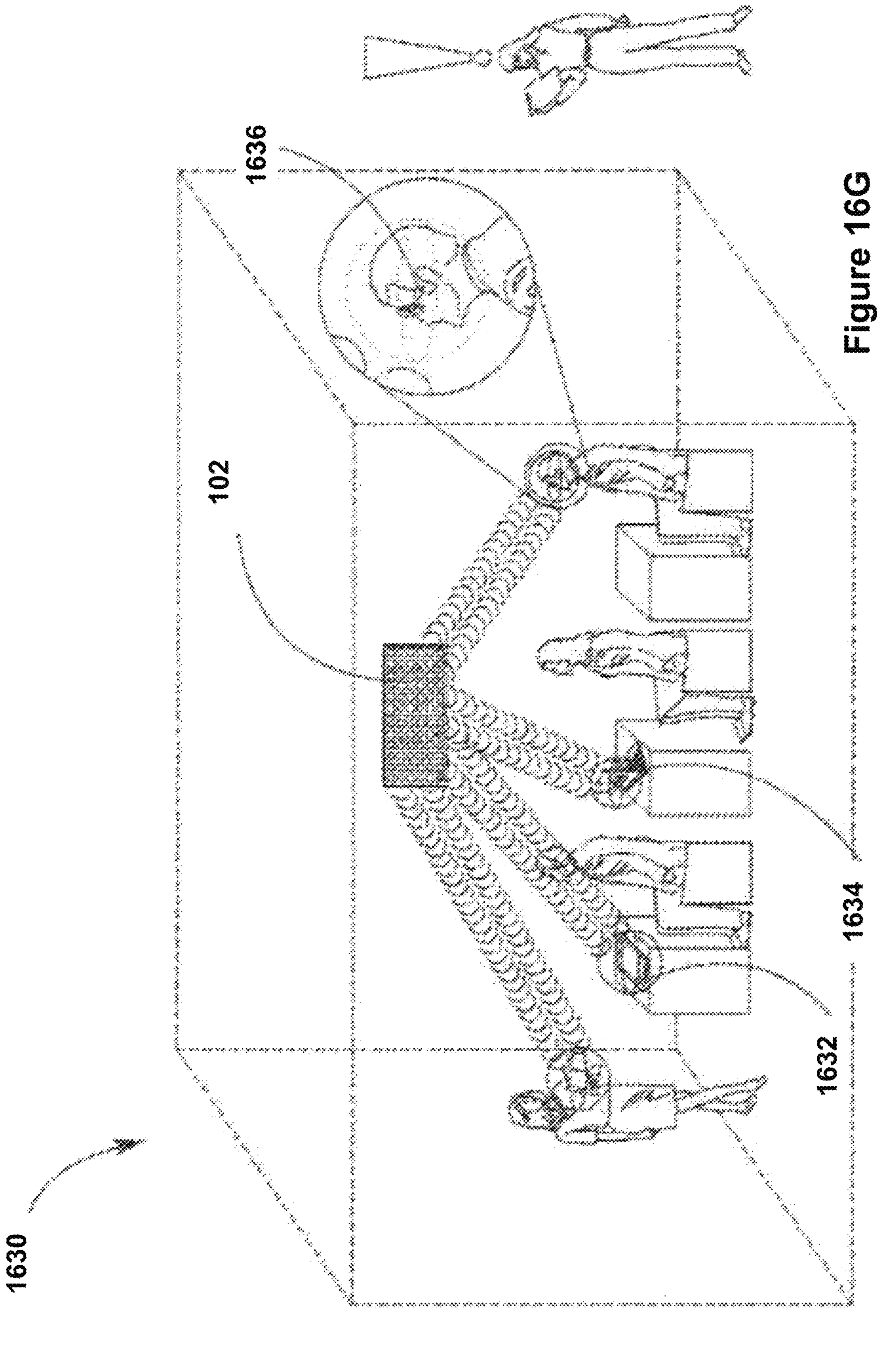

The wireless power delivery system of FIG. 16F may be applied to other settings, such as educational environments 1630, as shown in FIG. 16G. For example, in educational programs for developing or unprivileged cities, regions and countries, teachers and students may be provided with tablets, electronic readers, laptops or even virtual glasses for imparting and taking notes during lectures. However, such equipment may be expensive. Therefore, measures for preventing unauthorized usage of such devices may be employed. For example, devices may be wired to school chairs so that they may not be taken outside classrooms. However, utilizing electronic devices with embedded wireless power receivers may improve the foregoing situation. In some embodiments, a transmitter 102 inside a classroom may provide wireless power, through pocket-forming techniques, to various electronic devices with embedded receivers and capacitors (not shown), for example an e-reader 1632, a laptop 1634, and virtual glasses 1636 which may be used by different users in the educational setting. The foregoing electronic devices may become inoperable outside the range of transmitter 102, as can be seen in the rightmost part of FIG. 16G.

Figure 16H:
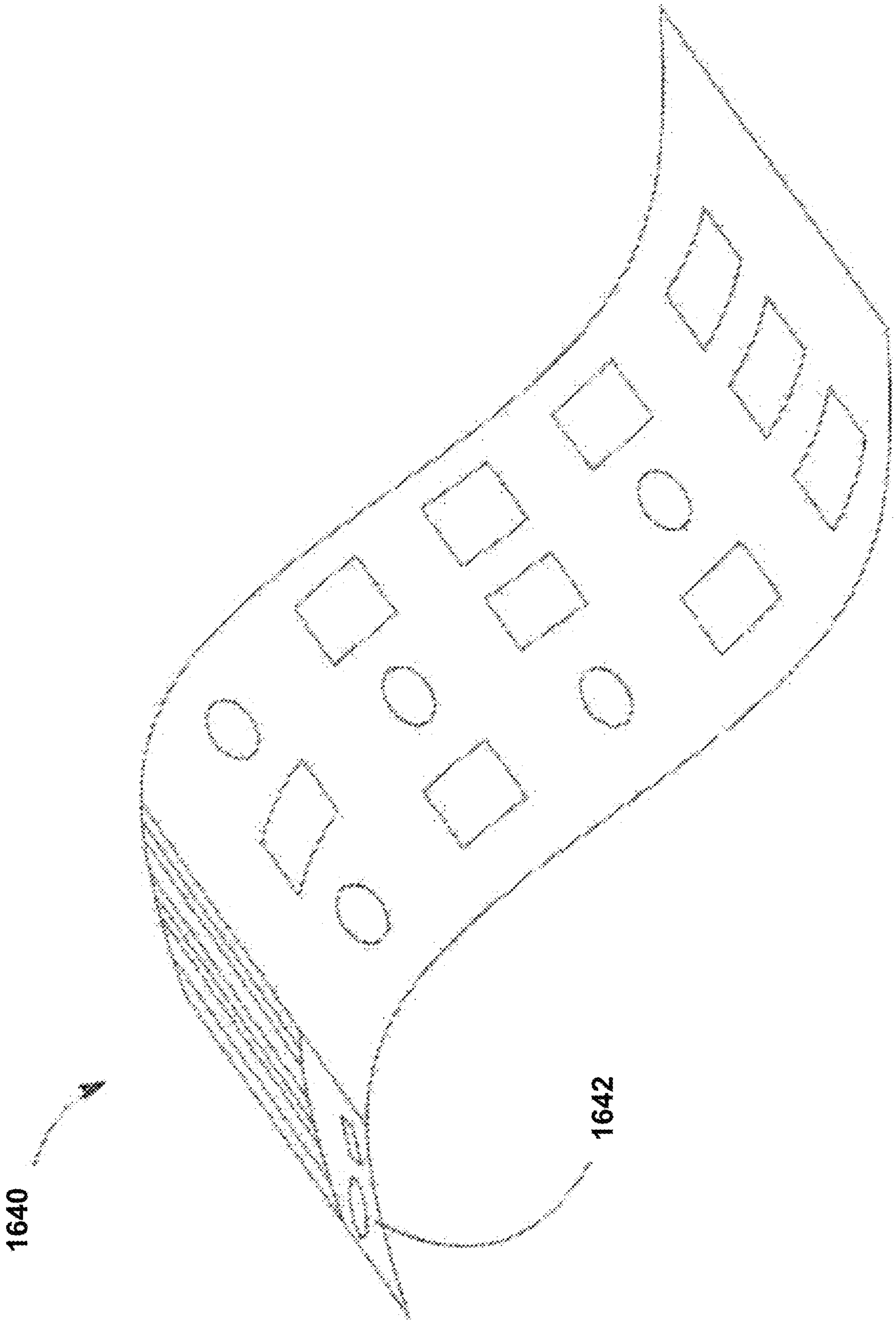
FIG. 16H illustrates an improved roll-able electronic paper display used to explain certain advantages of wireless power transmission systems, in accordance with some embodiments.

FIG. 16H illustrates an improved rollable electronic paper display 1640 used to explain certain advantages of wireless power transmission systems, in accordance with some embodiments. In some embodiments, the display 1640 is produced using flexible organic light emitting diodes (FOLED). In some embodiments, the display 1640 may include at least one embedded receiver 1642 (e.g., an embodiment of the receiver 120 described herein) with a capacitor in one of its corners. Thus, the circuitry for providing power to rollable electronic paper display 1640 may be confined to only a fraction of its surface area, This may improve transparency of the rollable electronic paper display 1640. In other embodiments, an e-reader including the aforementioned receivers and capacitors, may diminish its weight considerably, as well as improve its display brightness. Currently, the weight of e-readers may be driven by their batteries, e.g., up to about 60% to about 80% of the total weight. However, by utilizing the structure described herein, batteries may not be required to be as powerful, thereby reducing overall size and weight of the batteries, and in turn diminishing weight of e-readers. Moreover, by diminishing such weight considerably, e-readers can be made thinner. In some embodiments, previous volume used up for battery allocation, can be distributed to increase display capacity.

FIGS. 16A-16H illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 16A-16H.

Presented below are example methods of wirelessly delivering power to receivers in controllers and other devices.

In some embodiments, an example method of wirelessly supplying power to a game controller includes: (i) receiving, by a transmitter, a communication signal indicating a power requirement from a game controller; (ii) generating, by the transmitter, one or more power transmission waves in response to the communication signal from the game controller; (iii) controlling, by the transmitter, the generated power transmission waves, and the transmitter shifts a phase and a gain of a power transmission wave with respect to other power transmission waves based on the communication signal; and (iv) transmitting, by the transmitter, the one or more power transmission waves through at least two antennas coupled to the transmitter.

In some embodiments, the method further includes receiving, by the transmitter, an indication of power remaining in a battery coupled to the game controller and a location of the game controller.

In some embodiments, the game controller is coupled to a receiver, the receiver configured to receive a pocket of energy from the transmitter.

In some embodiments, the receiver includes a plurality of antennas adapted to be a part of an external cover of the game controller.

In some embodiments, another example method includes: (i) receiving, by a transmitter and from a receiver coupled with a game controller, a communication signal indicating a power requirement of the game controller; (ii) in response to receiving the communication signal from the receiver: determining a location of the game controller based on the communication signal; and generating, by the transmitter, a plurality of radio frequency (RF) power transmission waves; and (iii) controlling, by the transmitter, transmission of the generated plurality of RF power transmission waves through at least two antenna elements coupled to the transmitter, and the transmitter shifts a phase and a gain of a respective RF power transmission wave with respect to other respective RF power transmission waves so that the plurality of RF power transmission waves converges to form a constructive interference pattern in proximity to the determined location of the game controller.

In some embodiments, the receiver is coupled with the game controller via an external cover of the game controller, and the receiver includes a plurality of antennas adapted to be a part of the external cover of the game controller.

In some embodiments, the transmitter is a far-field transmitter.

In some embodiments, the method further includes, in response to receiving an additional communication signal from an additional receiver coupled to an additional game controller, and the additional receiver is distinct from the receiver and the additional game controller is distinct from the game controller: controlling, by the transmitter, transmission of an additional plurality of RF power transmission waves so that the additional plurality of RF power transmission waves converges to form an additional constructive interference pattern in proximity to a location of the additional game controller, and the location of the additional game controller is determined by the transmitter based on the additional communication signal.

In some embodiments, the transmitter is coupled with a game console, and generating the plurality of RF power transmission waves includes generating the plurality of RF power transmission waves using power received from the game console.

In some embodiments, an example method includes: (i) connecting a pocket-forming transmitter to a power source; (ii) generating RF waves from a RF circuit embedded within the transmitter; (iii) controlling the generated RF waves with a digital signal processor m the transmitter; (iv) transmitting the RF waves through antenna elements connected to the transmitter within a predefined range; and (v) capturing the RF waves forming pockets of energy converging in 3-dimensional space at a receiver with antenna elements connected to the electronic device within the predefined range to convert the pockets of energy into a DC voltage for charging or powering the electronic device.

In some embodiments, the transmitter identifies each electronic device within the predefined range and delivers power to each approved electronic device through pocket-forming but disables, locks out and removes power from each electronic device when the approved electronic device is moved out of the range of the transmitter for security reasons.

In some embodiments, the transmitter identifies each receiver requesting power and then only powers approved electronic devices within the predefined range of the transmitter.

In some embodiments, the method further includes generating multiple pockets of energy from the pocket-forming transmitter to power or charge multiple, approved electronic devices in an educational setting within the predefined range of the transmitter. In some embodiments, the electronic devices in the educational setting are tablets, electronic readers, laptops, virtual glasses or smartphones provided wireless power through pocket-forming whenever in range of the transmitter but disabled whenever outside of the predefined range of the transmitter.

In some embodiments, another example method includes, transmitting, by a plurality of antennas of a transmitter, a plurality of power waves forming a constructive interference pattern at a location of a receiver, and the receiver is configured to receive power waves only from the transmitter when the receiver is within a predefined distance threshold from the transmitter; and detecting, based on communications signals received from the receiver, that the receiver has moved to a new location. In response to detecting that the receiver has moved to the new location, determining, by a controller of the transmitter, whether the new location of the receiver is within the predefined distance threshold; in response to determining by the controller of the transmitter that the new location is within the predefined distance threshold, adjusting, by the controller of the transmitter, the plurality of antennas such that transmission of the plurality of power waves forms a new constructive interference pattern at the new location of the receiver. The method further includes, in response to determining that the new location is not within the predefined distance threshold, providing, by the transmitter, an indication that the receiver is not within the predefined distance threshold, and the receiver is configured to be inoperable upon exceeding the predefined distance threshold from the transmitter.

In some embodiments, the transmitter: (i) identifies a plurality of receivers, including the receiver, as being within the predefined distance threshold; (ii) delivers power to each approved receiver of the plurality of receivers through one or more constructive interference patterns formed by convergence of power waves in proximity to each approved receiver; and (iii) ceases delivering power to a respective approved receiver when the respective approved receiver is moved out of the predefined distance threshold from the transmitter.

In some embodiments, providing the indication includes issuing an alarm.

In some embodiments, the method further includes, in response to determining by the controller of the transmitter that the new location is within the predefined distance threshold, determining, based on the communications signals received from the receiver, an optimum time and location for forming the new constructive interference pattern at the new location of the receiver.

FIGS. 17A-17G illustrate various articles (e.g., heating blanket, heating sock, heating glove, warming jacket, shirt, cap, and cooling shirt) with embedded wireless power receivers, in accordance with some embodiments.

Figure 17A:
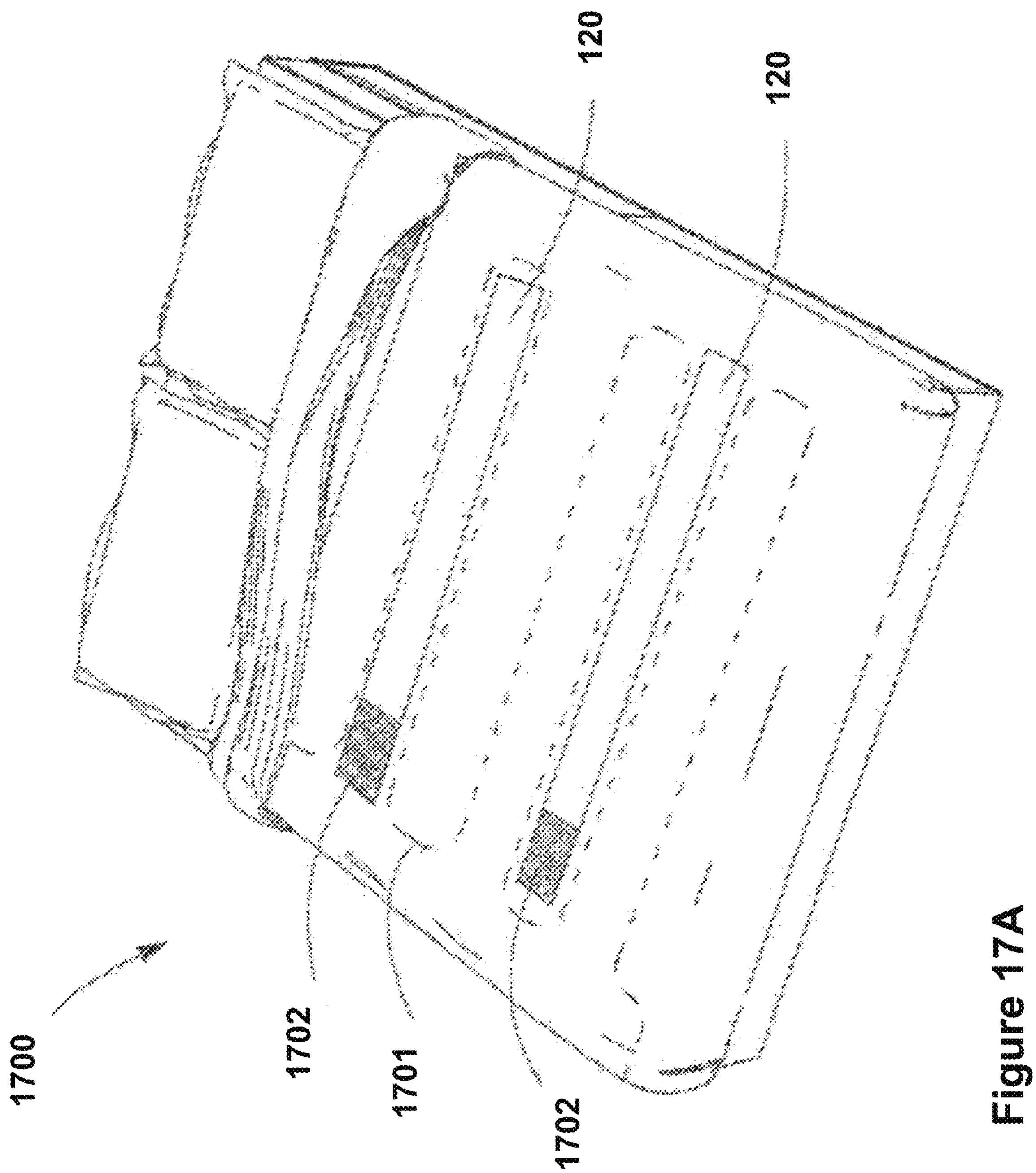
FIGS. 17A-17G illustrate various articles (e.g., heating blanket, heating sock, heating glove, warming jacket, shirt, cap, and cooling shirt) with embedded wireless power receivers, in accordance with some embodiments.
Figure 17B:
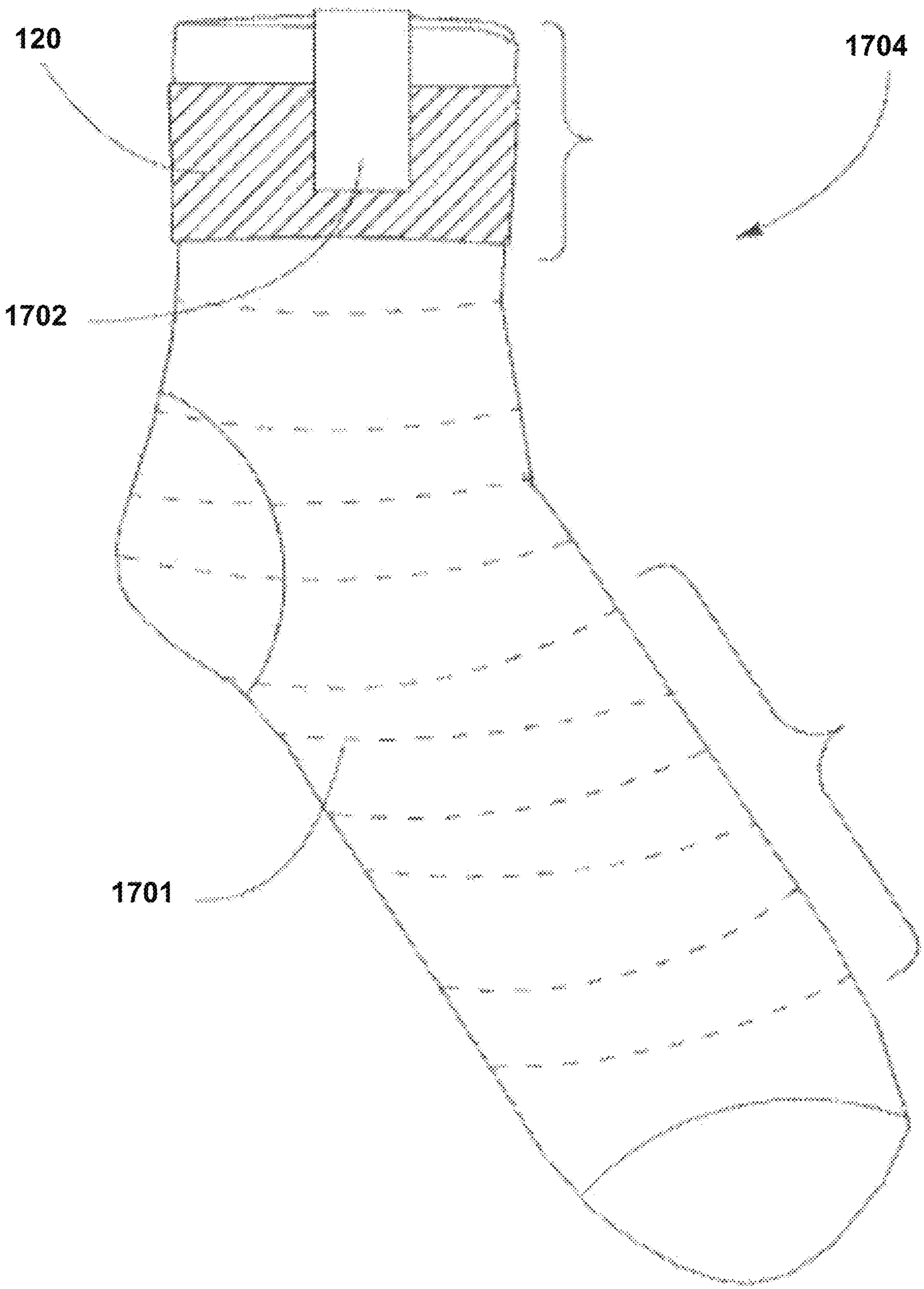
Figure 17C:
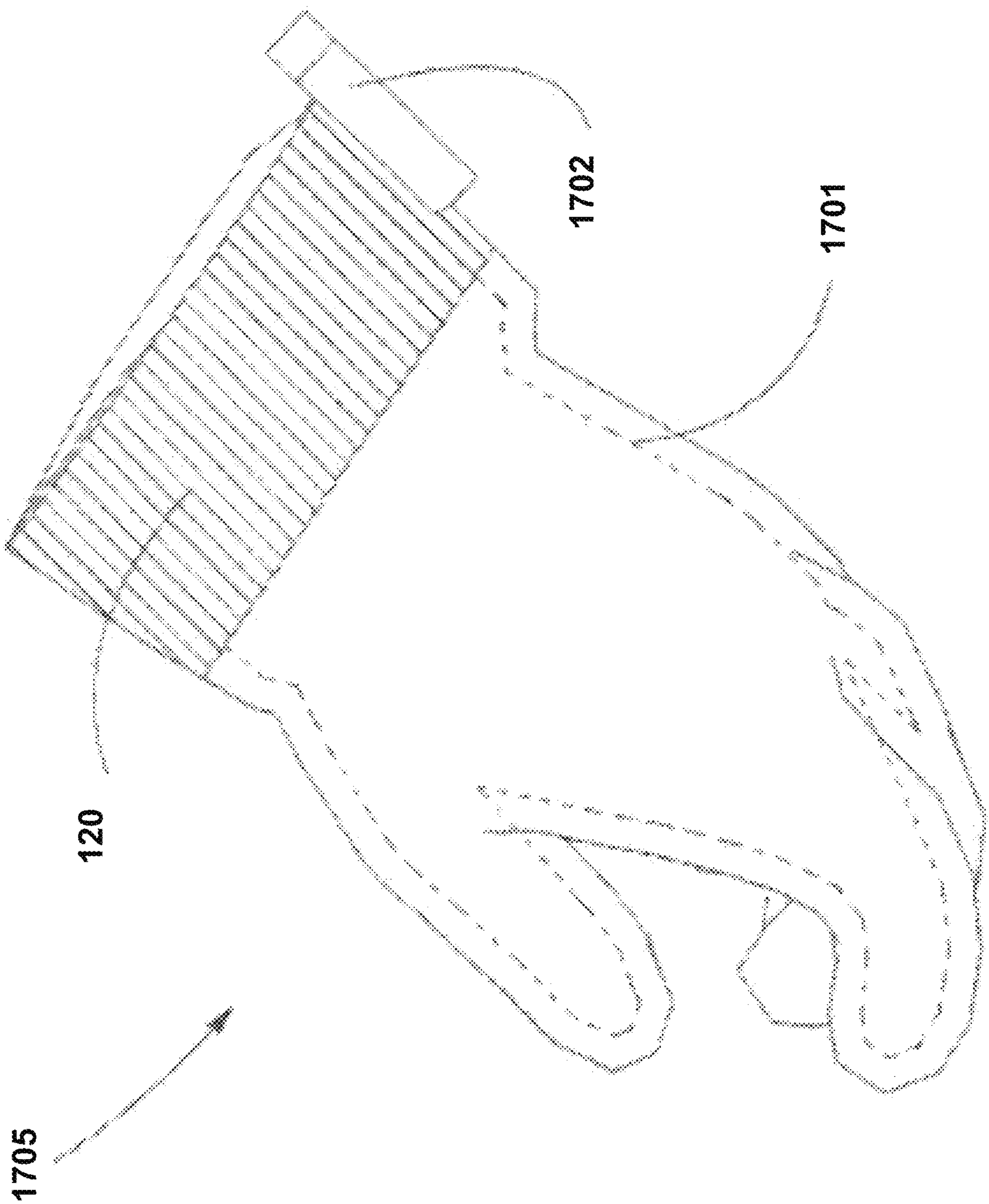
Figure 17D:
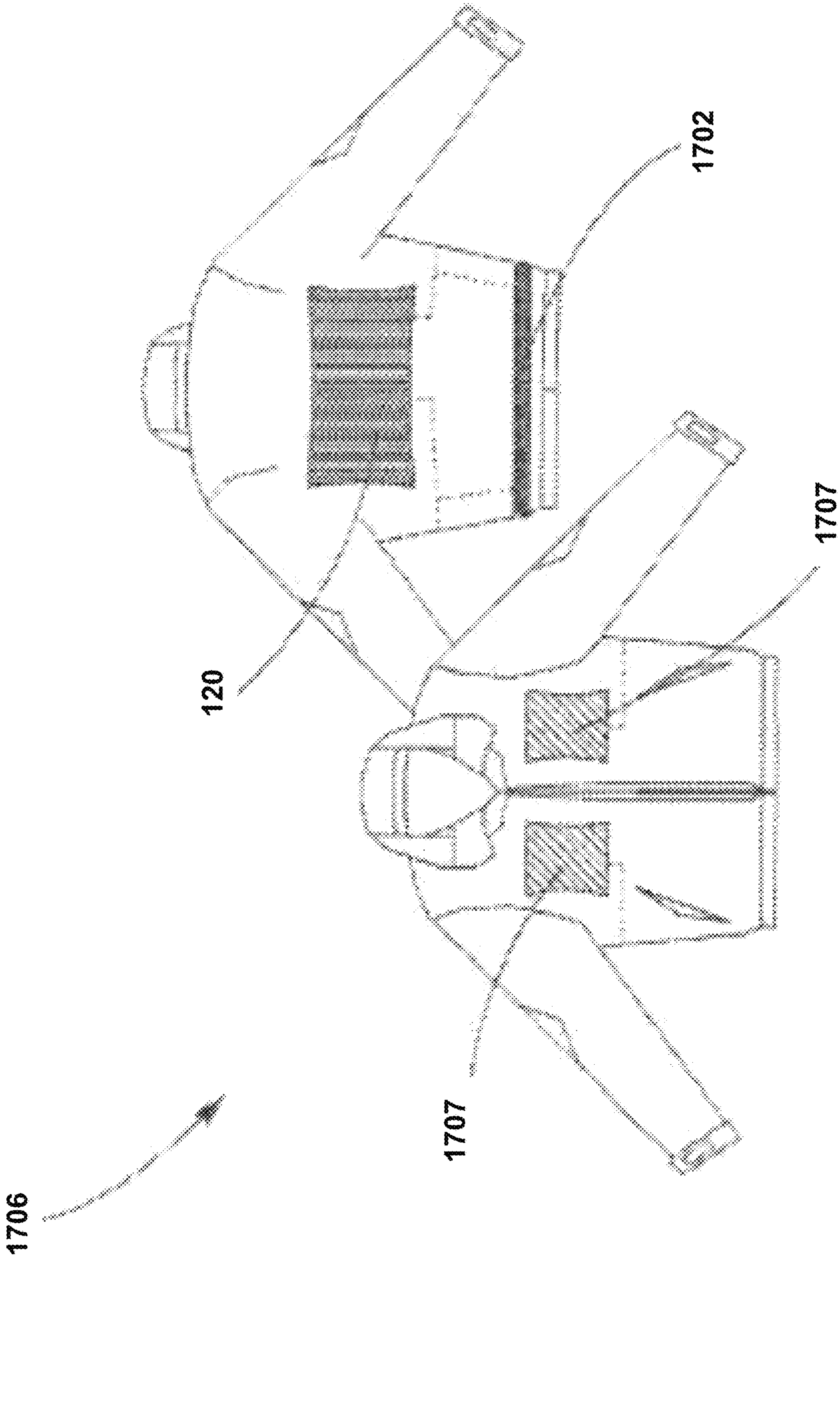
Figure 17E:
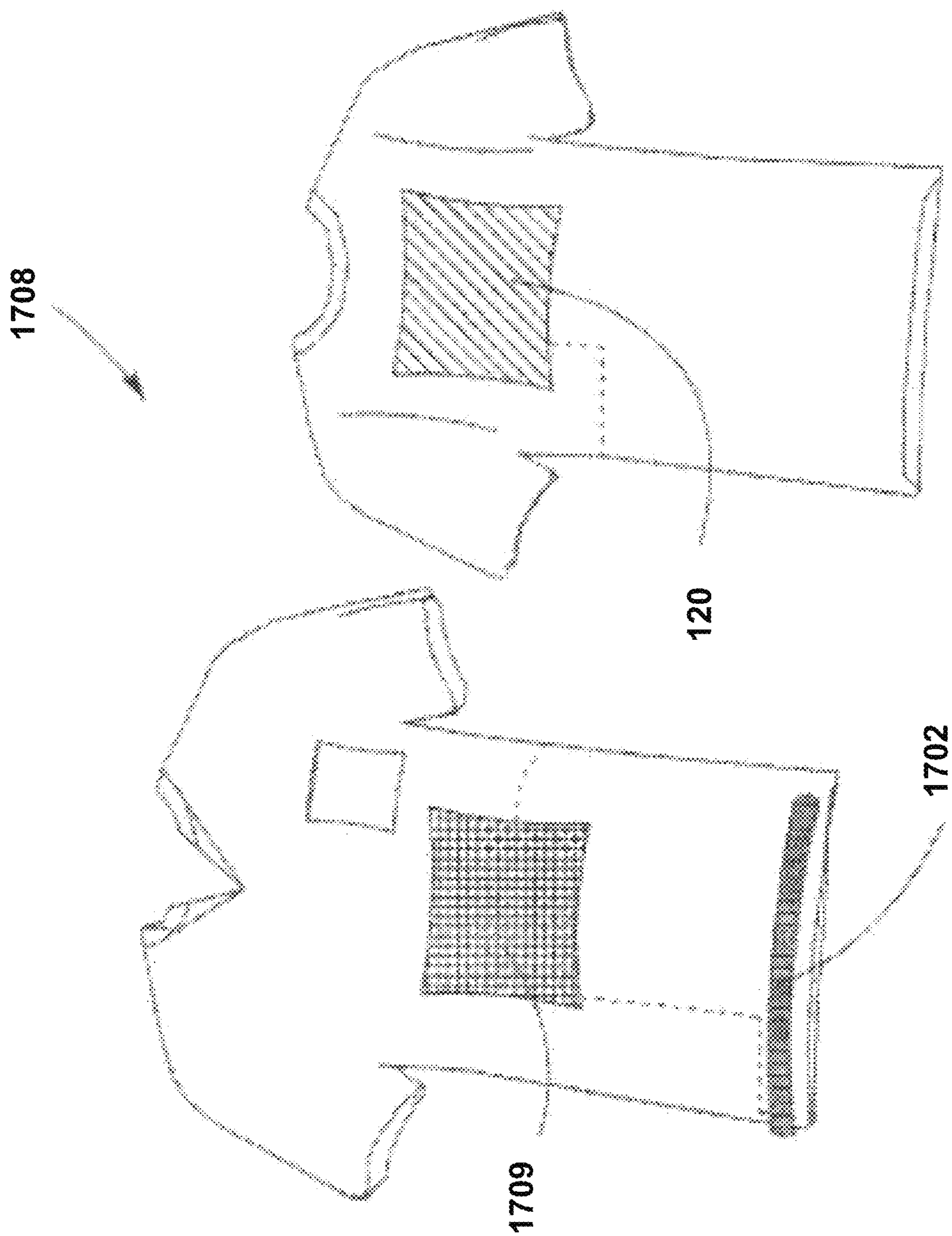
Figure 17F:
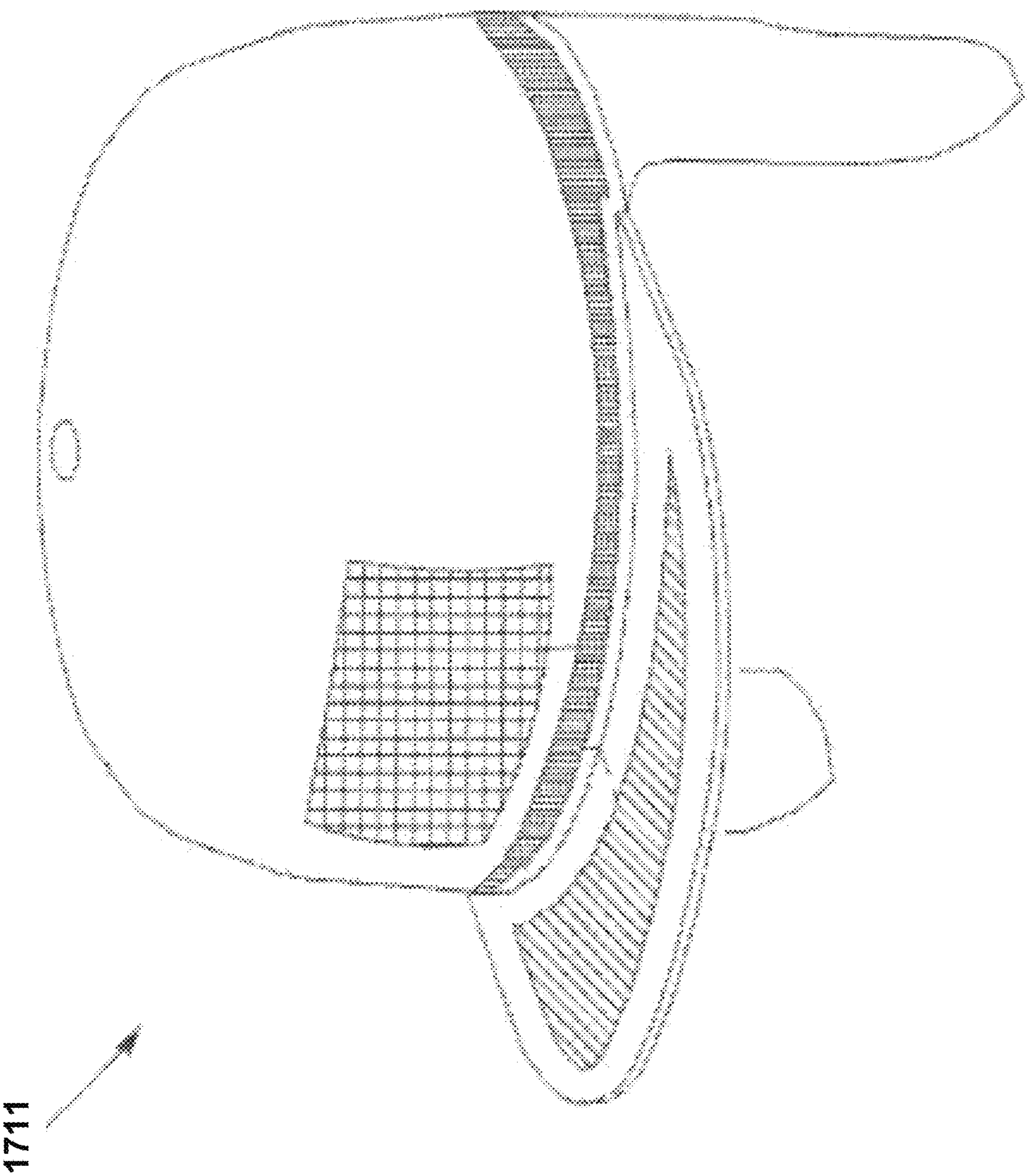
Figure 17G:
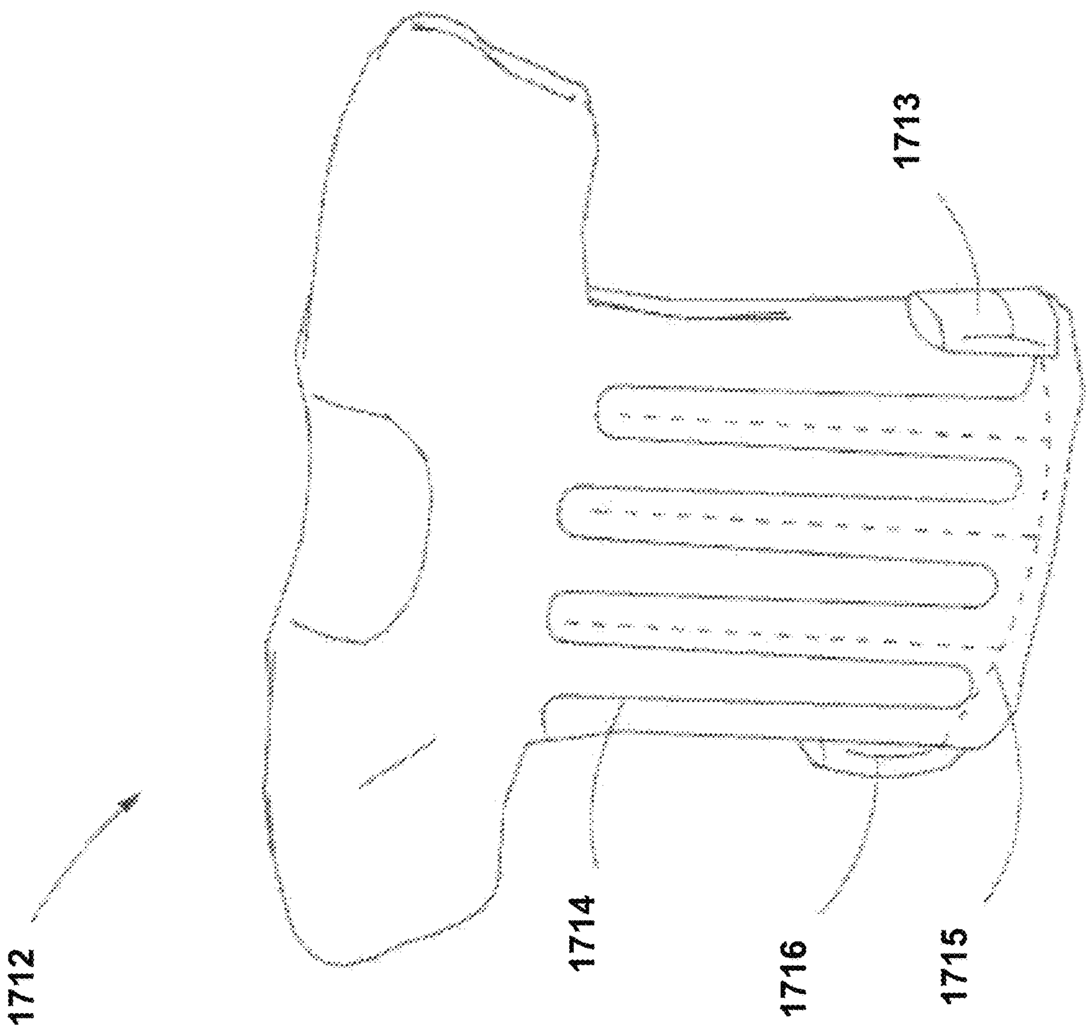

In particular, FIG. 17A shows a heating blanket 1700, according to an embodiment, which includes a heating circuit 1701, receivers 120, and flexible batteries 1702; FIG. 17B illustrates a heating sock 1704 with a heating circuit 1701, a receiver 120 and flexible rechargeable batteries 1702; FIG. 17C shows a heating glove 1705 with a heating circuit 1701, a receiver 120 and batteries 1702; FIG. 17D illustrates a heating jacket 1706 that includes heating patches 1707, a receiver 120 and flexible batteries 1702; FIG. 17E shows a shirt 1708 with a display 1709, a receiver 120, and flexible batteries 1702; FIG. 17F illustrates a cap 1711 with a display, a receiver, and flexible batteries; and FIG. 17G shows a cooling shirt 1712 with a cooling liquid reservoir 1713, cooling tubes 1714, sensor wiring 1715, and case 1716 (in some embodiments, case 1716 may include a battery, a receiver and a pump for controlling the flow of cooling liquid through cooling tubes 1714).

In some embodiments the articles of clothing with embedded receivers may operate at 7.4V and may be powered or charged wirelessly (as described herein).

In example #1, a portable electronic heating jacket that may operate at 7.4V may be powered or charged. In this example, a transmitter 102 may be used to deliver pockets of energy onto heating jacket, in a process similar to the one depicted in FIG. 1. Transmitter 102 may have a single array of 8×8 flat panel antennas where all the antenna elements may operate in the same frequency band. Flat antennas may occupy less volume than other antennas, hence allowing a transmitter 102 to be located in small and thin spaces, such as, walls, mirrors, doors, ceilings and the like. In addition, flat panel antennas may be optimized for operating at long distances into narrow hall of wireless power transmission, such feature may allow operation of portable devices in long areas such as, train stations, bus stations, airports and the like. Furthermore, flat panel antennas of 8×8 may generate smaller pockets of energy than other antennas since its smaller volume, this may reduce losses and may allow more accurate generation of pockets of energy. In this way, heating jacket may be charged without being plugged and even during use. Heating jacket may include a receiver (e.g., an embodiment of receiver 120, FIG. 1) coupled to antenna elements; the optimal amount of antenna elements that may be used with receivers for heating jacket may vary from about 10° F. to about 200° F., being most suitable at about 50° F.; however, the amount of antennas within receivers may vary according to the design and size of the heating jacket. Antenna elements may be made of different conductive materials such as cooper, gold, and silver, among others. Furthermore, antenna elements may be printed, etched, or laminated onto any suitable non-conductive flexible substrate and embedded in the heating jacket.

In example #2, a portable electronic heating socks, that may operate at 7.4V may be powered or charged. In this example, a transmitter 102 may be used to deliver pockets of energy onto receivers 120 embedded on the heating socks following a process similar to the one depicted in FIG. 1.

FIGS. 17A-17G illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 17A-17G.

Presented below are example methods of wirelessly delivering power to receivers in clothing.

In some embodiments, an example method includes: (i) receiving, by a transmitter, a communication of a power requirement of a temperature regulating component coupled to an article of clothing; (ii) generating, by the transmitter, a plurality of power transmission waves to form a pocket of energy in response to the power requirement; (iii) controlling, by the transmitter, generated power transmission waves to provide phase shifting and gain shifting with respect to other power transmission waves; and (iv) transmitting, by the transmitter, the power transmission waves through at least two antennas coupled to the transmitter.

In some embodiments, the pocket of energy is received by a receiver associated with the temperature regulating component, the receiver being configured to be coupled to the article of clothing.

In some embodiments, the temperature regulating component includes an electrical resistance heater configured to dissipate the electrical energy as heat within the article of clothing.

In some embodiments, the temperature regulating component includes a sensor coupled to the article of clothing, the sensor configured to determine the temperature of the article of clothing.

In some embodiments, the receiver includes a plurality of antennas, a power converter, and a communications component configured to communicate with the transmitter.

In some embodiments, the receiver communicates to the transmitter information including a temperature of the article of clothing and an indication of the power level of the temperature regulating component.

In some embodiments, an example receiver includes: (i) an antenna configured to receive a pocket of energy formed by a convergence of power transmission waves from a transmitter; and (ii) a rectifying circuit configured to convert the received pocket of energy into electricity to charge a temperature regulating component associated with the article of clothing, the temperature regulating component being configured to alter temperature of the article of clothing to a desired temperature.

In some embodiments, the temperature regulating component includes an electrical resistance heater configured to dissipate the electrical energy as heat within the article of clothing.

In some embodiments, the temperature regulating component includes a sensor coupled to the article of clothing, the sensor configured to determine the temperature of the article of clothing.

In some embodiments, another example wireless power receiver embedded in an article of clothing includes: (i) a flexible antenna forming a pattern in the article of clothing, the flexible antenna being configured to receive radio frequency (RF) wireless power waves from a far-field wireless power transmitter, and some of the RF wireless power waves constructively interfere at the flexible antenna and some RF wireless power waves destructively interfere near the flexible antenna; (ii) a rectifying circuit coupled to the flexible antenna, the rectifying circuit being configured to rectify the received RF wireless power waves into a direct current; (iii) a temperature regulating component coupled to the rectifying circuit, the temperature regulating component being configured to alter a temperature of the article of clothing to a desired temperature using the direct current, and the temperature regulating component includes a sensor coupled to the article of clothing, the sensor configured to determine the temperature of the article of clothing; and (iv) a communications component in communication with the far-field wireless power transmitter, the communications component being configured to communicate information to the far-field wireless power transmitter, including the temperature of the article of clothing determined by the sensor.

In some embodiments, the temperature regulating component further includes an electrical resistance heater configured to dissipate the direct current as heat within the article of clothing.

FIGS. 18A-18B are illustrations of medical devices with wireless power receivers coupled thereto, in accordance with some embodiments.

FIGS. 18A-18B are illustrations of medical devices with wireless power receivers coupled thereto, in accordance with some embodiments. For example, FIG. 18A shows a blood glucose meter 1801 that includes a receiver 120. FIG. 18B shows a portable medical electronic device such as a portable ultrasound machine 1802 that includes multiple receivers 120, coupled to both a front and side portion of the device 1802.

The above described may not be limited to portable electronic medical devices shown in FIGS. 18A-18B. Receiver 120 may also be included in a plurality of medical electronic devices such as infrared electronic thermometer, electronic pads like tablets, blood pressure monitor, blood glucose meter, pulse oximeter, and ECG among others. The number and type of sensor elements are calculated according the medical electronic device's design.

Figure 18D:
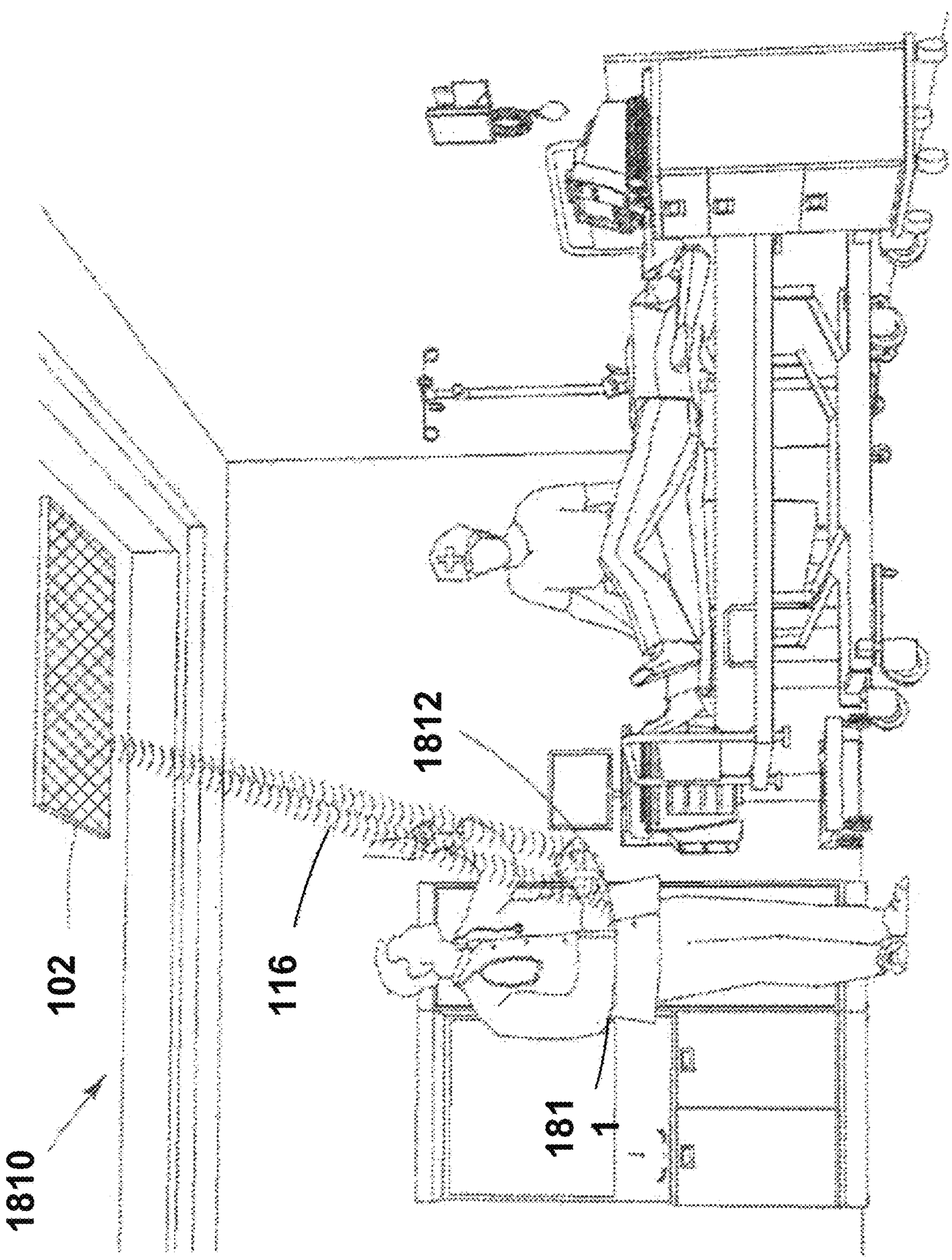
Figure 18E:
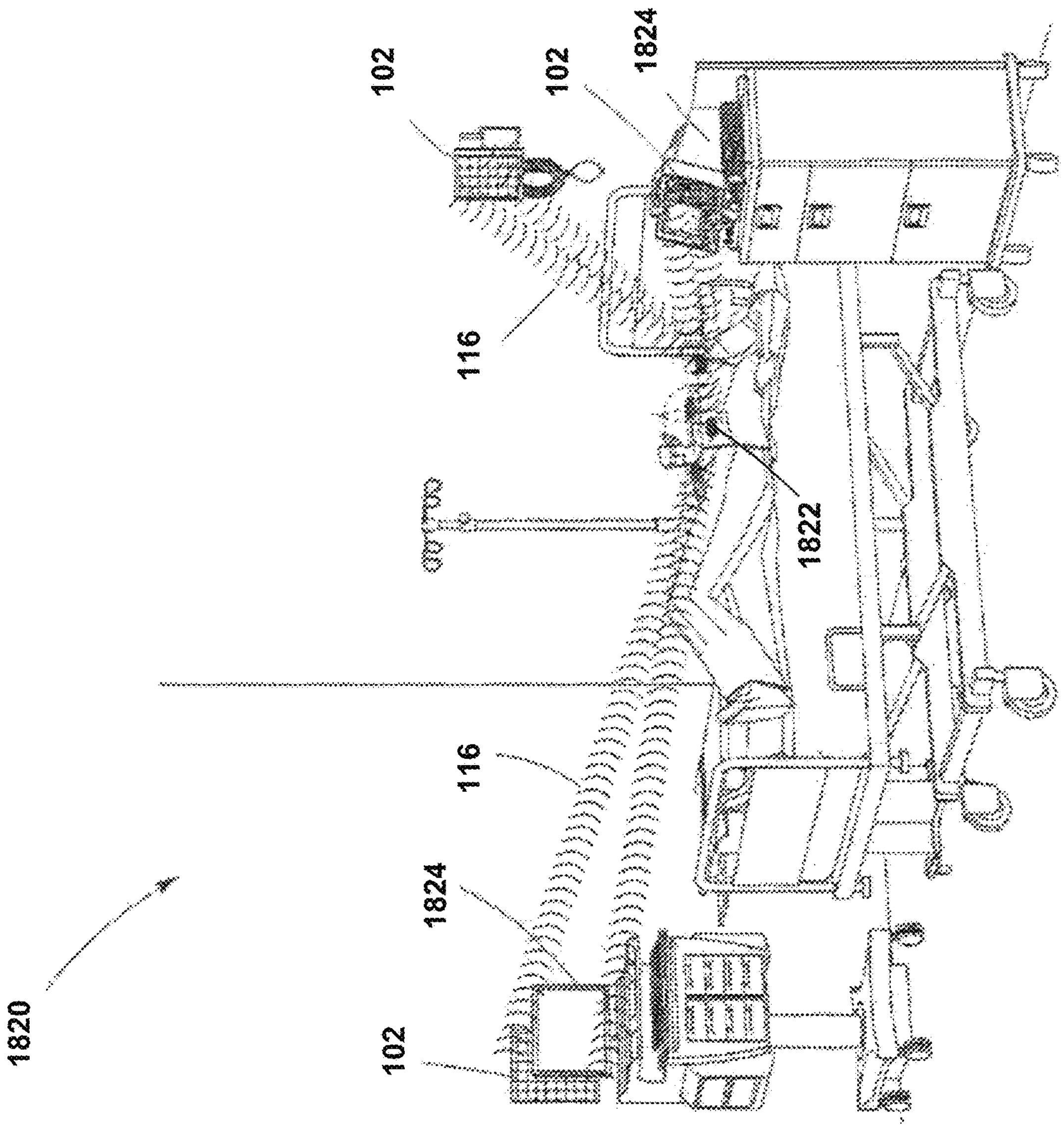

FIGS. 18C-18E are illustrations of wireless power transmission systems for wirelessly delivering power to medical devices, in accordance with some embodiments.

FIGS. 18C-18D show wireless power delivery system 1810, in accordance with some embodiments. Transmitter 102 may be located at the ceiling of a room pointing downwards, and may transmit controlled RF waves 116 which may converge in 3-dimensional space to form pockets of energy. A receiver 120, embedded or attached to portable electronic medical device 1812, may then convert energy that has accumulated by constructively interfering RF waves at pockets of energy 1811 for charging or powering these devices.

FIG. 18E illustrates a wireless power delivery system 1820 for wirelessly providing power to wireless sensors 1822, which may be used for measuring physiological parameters of a patient. In some embodiments, multiple transmitters 102 attached to or embedded in medical devices 1824 may provide controlled RF waves 116 to wireless sensors 1822.

In some embodiments, the wireless power delivery techniques for health care environments may even be utilized in rooms in which a patient has a pacemaker, as the RF waves will not interfere with or damage functioning of those types of devices because electromagnetic fields are not generated when using RF waves to wirelessly deliver power.

FIGS. 18A-18E illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 18A-18E.

Presented below are example methods of wirelessly delivering power to receivers in medical devices.

In some embodiments, an example method of wireless power receipt by an electronic medical device includes: (i) communicating, by a receiver associated with the electronic medical device, a power requirement and an identifier for the electronic medical device to a transmitter, the identifier being data uniquely associated with the electronic medical device; (ii) receiving, by an antenna of the receiver, a pocket of energy formed by converging power transmission waves; and (iii) converting, by a rectifying circuit of the receiver, the received pocket of energy into electricity to charge the electronic medical device.

In some embodiments, the electronic medical device is a sensor configured to record medical information from a patient. In some embodiments, the electronic medical device is configured to record a blood glucose level from a patient. In some embodiments, the electronic medical device is configured to communicate an electronic medical record with a medical professional.

In some embodiments, the receiver is configured to transmit information to a medical professional located remotely from the electronic medical device.

In some embodiments, the receiver communicates information (e.g., instructions) to a transmitter of the power transmission waves to determine an optimum time and location for receiving a pocket of energy from the transmitter.

In some embodiments, an example method of wireless transmission of power to an electronic medical device or a sensor includes: (i) generating pocket forming power radio frequency (RF) signals from a RF circuit embedded within a transmitter connected to a power source; (ii) generating communication signals from a communication circuit embedded within the transmitter, and the transmitter includes a communication antenna configured to transmit and receive communications signals to and from a receiver coupled to an electronic device, and the electronic device is a medical device or a sensor; (iii) controlling the generated power RF signals and the communication signals with a digital signal processor coupled to the transmitter; and (iv) transmitting the power RF signals by at least two antennas electrically connected to the RF circuit within the transmitter. An antenna of the receiver is configured to capture energy from the pocket of energy produced by the pocket-forming power RF signals in converging in 3-dimensional space, and the receiver is configured to convert the energy into a DC voltage for charging or powering the medical device or the sensor coupled to the receiver. The method further includes: (v) transmitting, by the communication circuit of the transmitter, instructions in the communication signals to the receiver to generate location data, power requirements, and timing data; and (vi) receiving, by the communication circuit, the communications signals from the receiver, and the communication signals received from the receiver provide an optimum time and location data indicating the location associated with the electronic device coupled to the receiver for converging the power RF signals to form the pocket of energy in 3-dimensional space at the location.

In some embodiments, the pocket-forming transmitter is centrally located in a recovery room, operating room, patient room, emergency room or common area of a hospital for charging the electronic medical device or the sensor.

In some embodiments, the at least two antennas of the transmitter are located on a ceiling in a room, for charging the electronic device.

Figure 19A:
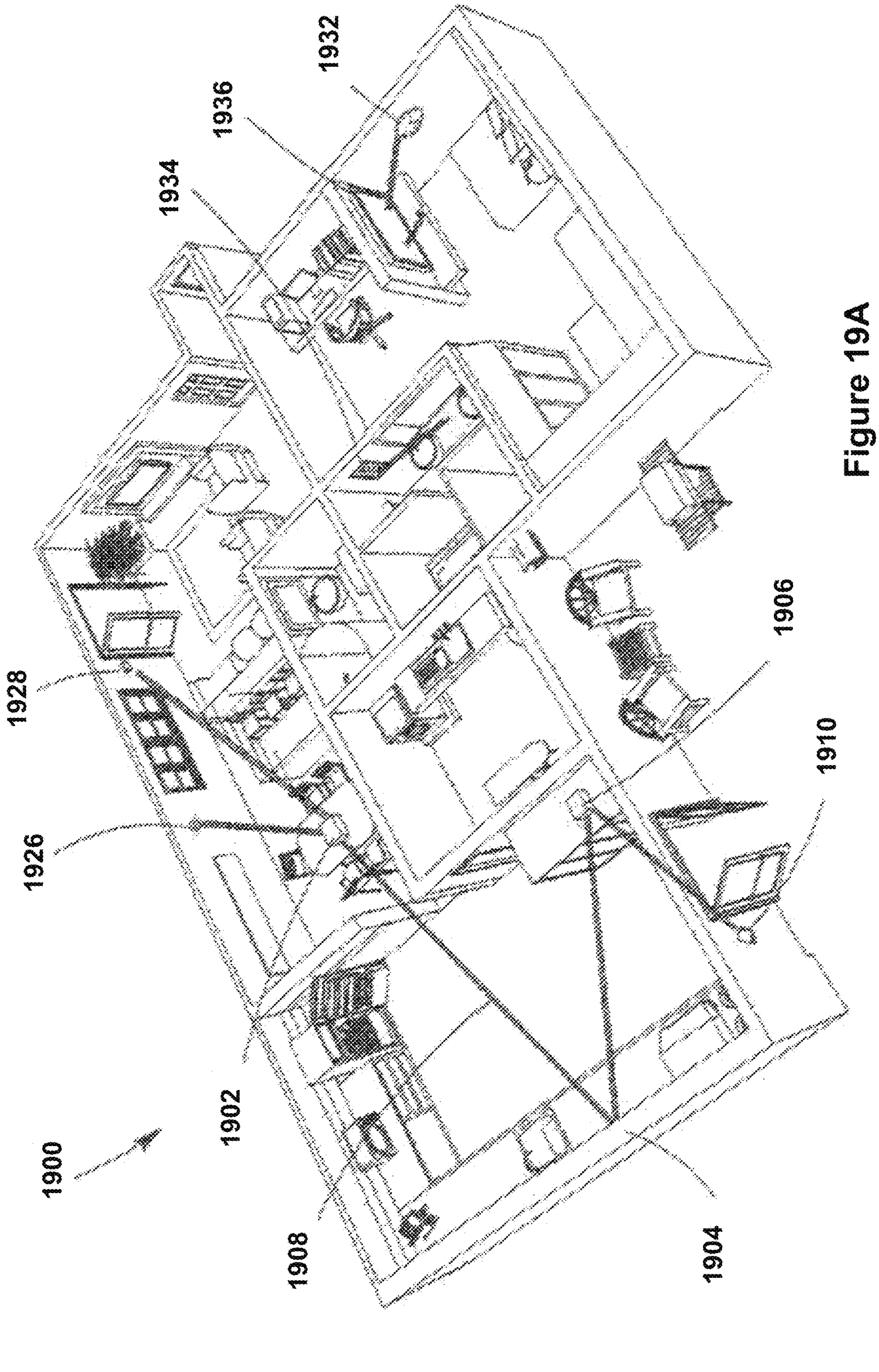
FIG. 19A is an illustration of a house configured with a number of wireless power transmitters and receivers, in accordance with some embodiments.

FIG. 19A is an illustration of a house configured with a number of wireless power transmitters and receivers, in accordance with some embodiments.

FIG. 19A depicts a wireless powered house 1900, which may include a plurality of transmitters 102 (e.g., instances of the transmitter 102, FIG. 1) connected to a single base station 1902, which may also include a main transmitter. In some embodiments, base station 1902 manages wireless power delivery to mobile and non-mobile devices in wireless powered house 1900 (additional details regarding base stations are provided above). Additionally, transmitters 102 may be embedded into a plurality of electronic devices and objects in wireless powered house 1900.

Base station 1902 may enable communication between every transmitter 102 and receivers 120 in wireless powered house 1900. Furthermore, wireless powered house 1900 may include a variety of range enhancers, which may increase range of wireless power transmission, such range enhancers may include: reflectors 1904 and wireless repeaters 1906, Reflectors 1904 may be included in several places in the wireless powered house 1900, such as curtains, walls, floor, and ceiling among others. Wireless repeaters 1906 may include a receiver 120 and a transmitter 102 for re-transmitting power. FIG. 19A illustrates an example for using reflectors 1904 and wireless repeaters 1906, where a CCTV camera 1910 requires charge, but it is too far for receiving power at an optimal efficiency. However, base station 1902 may trace a trajectory for RF waves 1908, which may imply less losses and includes the use of reflectors 1904 that may be embedded in the walls and a wireless repeater 1906, which may receive the reflected RF waves 1908 and re-transmits these to the CCTV camera 1910 with higher power than the received.

In some embodiments, base station 1902 may send RF waves 1908 to any device in wireless powered house 1900, these devices may include static devices such as: smoke detectors 1926, digital door locks 1928, CCTV cameras 1910, wall clocks 1932 among others devices that require wired powered connections. The lack of cables for powering such devices may reduce work time for installing and maintaining those devices. Furthermore, walls, ceilings, and floors need not be drilled for installing cables.

Device locations may be updated automatically by base station 1902, which may set a communication channel between each device, regardless if it is a mobile or non-mobile device. Some devices such as mirrors 1934 may allow a transmitter 102 to be embedded therein in order to charge small devices and disposable devices in the bathroom and/or in the bedroom. Such devices may include: electric razors, electric toothbrushes, lamps, massagers, UV-sterilizers among others. Therefore, mirror 1934 may significantly reduce wired chargers for each electric device in bathrooms and bedrooms.

Similar to mirror 1934, televisions 1936 may include transmitters 102 for powering and charging mobile and non-mobile devices.

Base station 1902 may establish areas where wireless power transmission may have specialized protocols, these areas may include an infirmary, children's rooms, rooms for pregnant women, and other regions where devices may be sensitive to radio frequency waves but not to RF waves 1908. Some areas may represent a permanent null space, where no pockets of energy are generated. Furthermore, some receivers 120 may possess the same specialized protocols regardless their location in wireless powered house 1900. Such devices may include electric knives, drills, and lighters among others. Therefore, each device may be restricted to a specific area and to a specific user, thus, safety in wireless powered house 1900 may be higher. Hence, children may not be exposed or in proximity to harmful hardware and thieves may not be able to use stolen equipment outside the wireless powered house 1900.

Figure 19B:
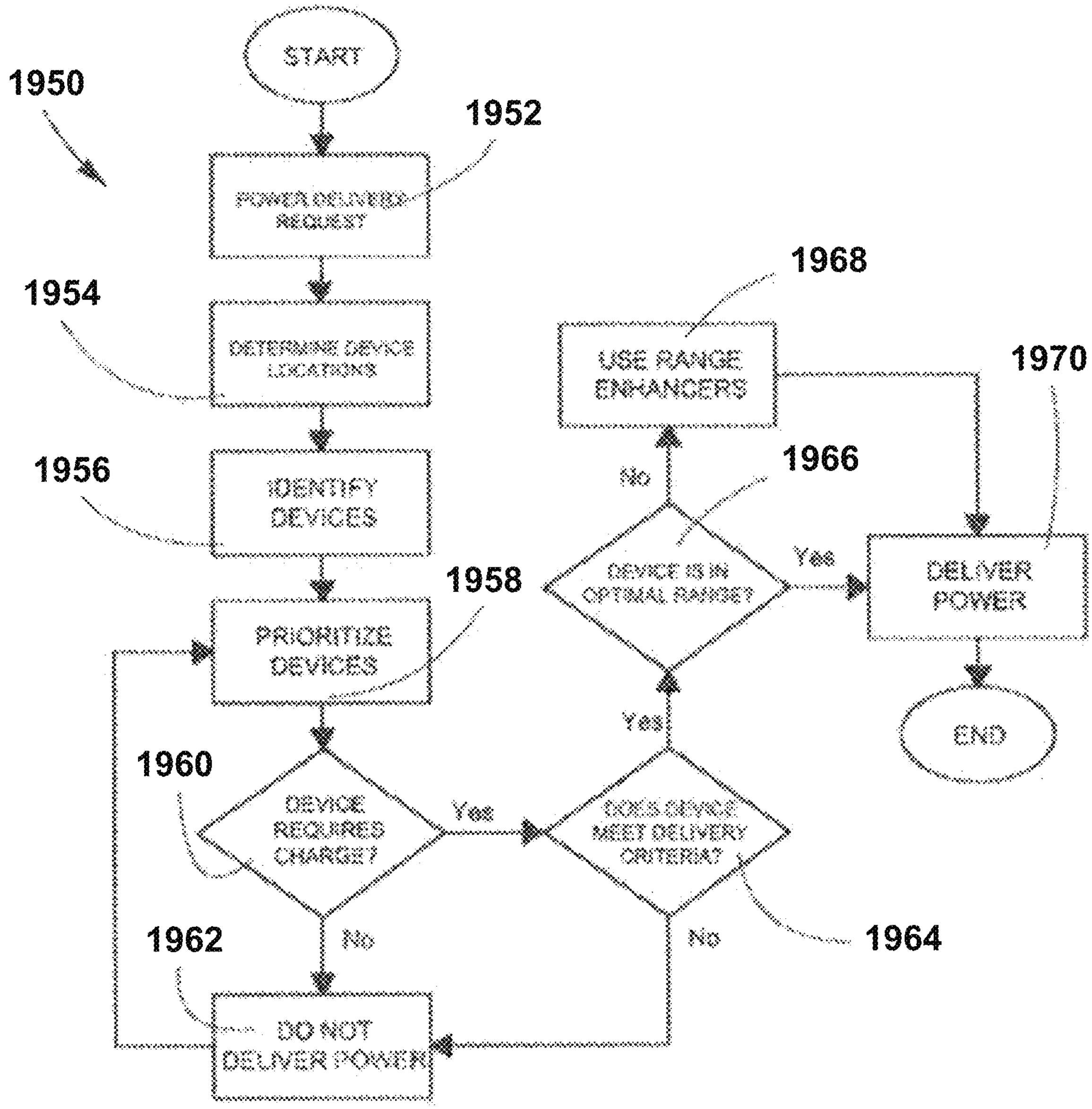
FIG. 19B is a flow diagram of a wireless power transmission process that may be implemented for charging one or more devices located within a house configured with a number of wireless power transmitters and receivers, in accordance with some embodiments.

FIG. 19B is a flow diagram of an example routine that may be utilized by a microcontroller of a base station in a wireless powered house to control wireless power transmission, in accordance with some embodiments.

Routine 1950 may begin when any transmitter 102 in wireless powered house 1900 receives a power delivery request Step 1952 from receiver 120. Subsequently, at determine device locations Step 1954, a receiver 120 may send a signal via BLUETOOTH, RF waves, or infrared, among others to the closest transmitter 102. Then, transmitter 102 may determine a location of receiver 120 in wireless powered house 1900. After this procedure, at identify devices Step 1956 receiver 120 may send a signature signal to the closest transmitter 102, such signal may be coded using suitable techniques such as delay encoding, orthogonal frequency-division multiplexing (OFDM), code division multiplexing (CDM) or other suitable binary coding for identifying a given electronic device including receiver 120. At this step, micro-controller may obtain information from receiver 120 such as type of device, manufacturer, serial number, and total power required. Then, the micro-controller in base station 1902 may proceed to authenticate where it may evaluate the signature signal sent by receiver 120. The micro-controller may proceed to a decision. If receiver 120 is not authorized to receive power, micro-controller may decide to block it. If receiver 120 is authorized, it may receive charge based on its assigned priority, such value is determined at prioritize devices Step 1558, such value may be set by the user preferences and charge level of the equipment, such charge level may be determined in device requires charge Step 1560. If the device does not requires charge, transmitter 102 may not charge it at do not deliver power Step 1562. Furthermore, such device may be listed as low priority to charge during prioritize devices Step 1558.

In addition, if multiple receivers 120 are requiring power, the micro-controller may deliver power equally to all receivers 120 or may utilize a priority status for each receiver 120. In some embodiments, the user may choose to deliver more power to its smartphone, than to its gaming device. In other cases, the user may decide to first power its smartphone and then its gaming device. Furthermore, smoke detectors 1926, digital door locks 1928, CCTV cameras 1910 among others similar devices, may have the highest priority.

When the receiver 120 is authorized to receive charge, it has to meet some criteria at does device meet delivery criteria Step 1964. The foregoing powering criteria may depend on the electronic device requiring power and/or based in user preferences. For example, smartphones may only receive power if they are not being used, or maybe during usage but only if the user is not talking through it, or maybe during usage as long as WI-FI is not compromised among other such criteria. In the case of a user custom profile, the user may specify the minimum battery level its equipment can have before delivering power, or the user may specify the criteria for powering his or her device among other such options. In addition, in wireless powered house 1900, some devices may possess some special criteria, as described in FIG. 19A; such devices may be required to operate in specific rooms. Such devices may include drillers, electric knives, lighters, electric screwdrivers, saws, among others. Furthermore, some devices may require some user authentication, which may be achieved through password verification or biometric authentication. These two criteria may be used in combination for a maximum level of safety. Such combination may generate a single criterion related to parental control protocol, which may also include managing power intensity for toys and operation areas for them.

Alternatively, the micro-controller may also record data on a processor on transmitter 102. Such data may include powering statistics related to how often a device requires power, at what times the device is requesting power, how long it takes to power the device, how much power was delivered to such device, the priority status of devices, where the device is mostly being powered (for example, at home or in the workplace). In addition, such statistics could be uploaded to a cloud based server so that the user can look at all such statistics. Thus, the aforementioned statistics can help the micro-controller decide when to stop delivering power to such a user.

Continuing, does device meet delivery criteria? Step 1964, micro-controller in base station 1902 may determine if receiver 120 is within the optimal range from the closest transmitter 102, such analysis may be carried out at device is in optimal range? Step 1966. If receiver 120 is within the optimal range, then transmitter 102 may deliver power at deliver power Step 1970, if receiver 120 is out of the optimal range, then micro-controller may use reflectors 1904 and wireless repeaters 1906 for increasing the optimal range, such operation may be performed at use range enhancers Step 1968. Subsequently, receiver 120 may receive charge at deliver power Step 1970.

FIGS. 19A-19B illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 19A-19B.

Presented below are example systems and methods of wirelessly delivering power to receivers in a wirelessly powered house.

An example method includes receiving, by a base station, a communication of a power requirement for an electronic device coupled to a receiver, and the base station is coupled to a plurality of transmitters, and activating, by the base station, a transmission of a plurality of power transmission waves from at least one of the plurality of transmitters to form a pocket of energy converging proximate to at least one receiver to charge the electronic device.

In some embodiments, the method further includes controlling, by the base station, each of the plurality of transmitters to deliver a pocket of energy at a determined time and location to charge of the electronic device through the at least one receiver.

In some embodiments, the method further includes determining, by the base station, priority among a plurality of electronic devices to receive, through the at least one receiver, the pocket of energy from at least one of the plurality of transmitters.

In some embodiments, the method further includes communicating, by the base station, with the at least one receiver and the plurality of transmitters through a communication signal using a protocol selected from the group consisting of: BLUETOOTH®, WI-FI, ZIGBEE®, or FM radio.

In some embodiments, the pocket of energy is regulated by utilizing adaptive pocket-forming.

In some embodiments, an example charging apparatus includes a base station coupled to a power source; and a first communication component coupled to the base station and configured to transmit information to a plurality of transmitters and a plurality of receivers, each of the plurality of transmitters comprising: (i) an antenna configured to transmit power transmission waves that converge to become a pocket of energy; and (ii) a second communication component configured to communicate with the base station and at least one of the plurality of receivers.

In some embodiments, the base station is configured to receive information from at least one of the plurality of receivers, the information including an identification, a location, and an indication of the power level of at least one of the plurality of electronic devices associated with the at least one of the plurality of receivers.

Figure 20A:
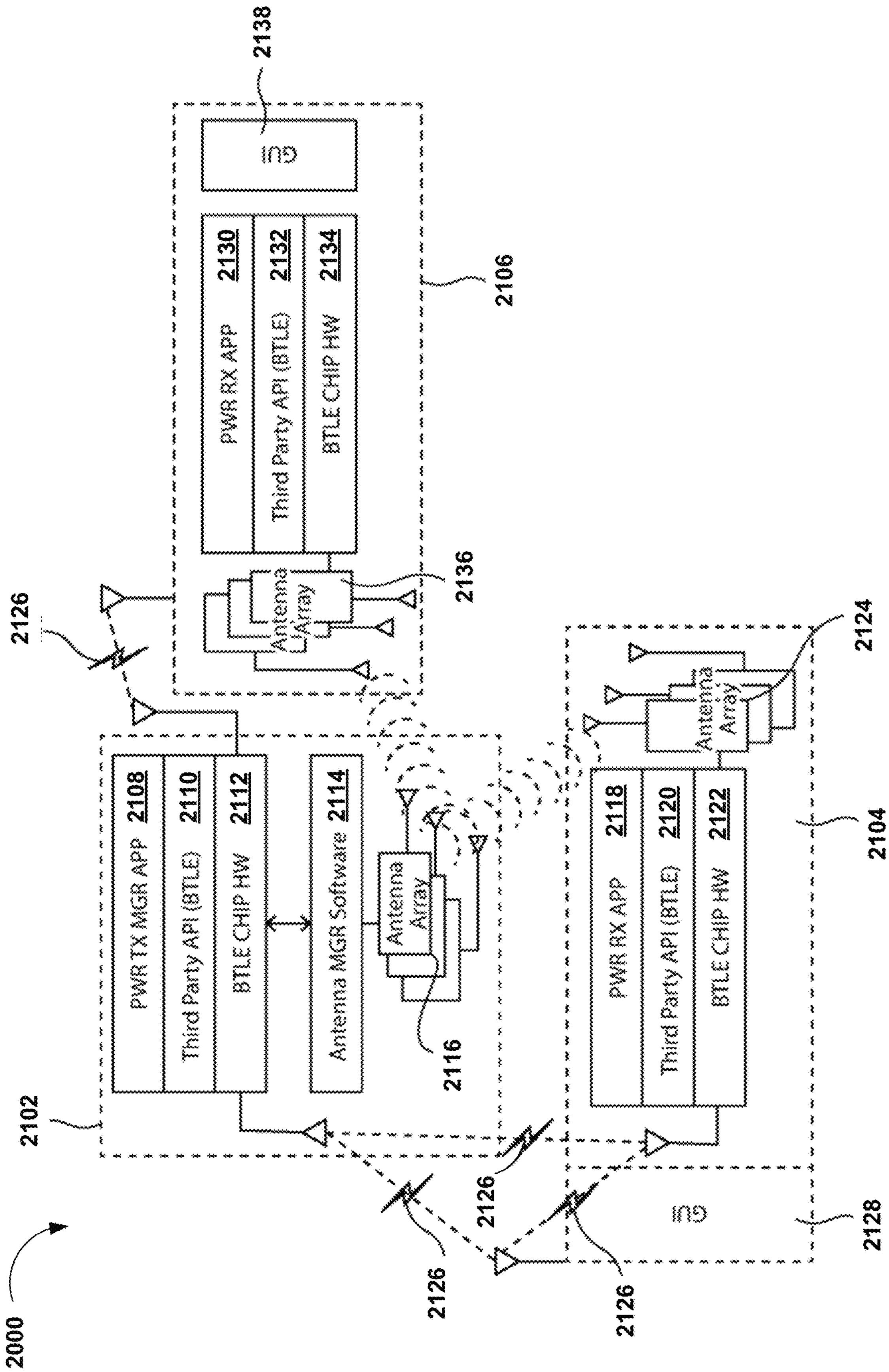
FIG. 20A illustrates a system architecture for a wireless power network, in accordance with some embodiments.

FIG. 20A shows a system architecture 2000 for a wireless power network, according to an embodiment. System architecture 2000 may enable the registration and communication controls between wireless power transmitter 2102 and one or more wireless power receivers (e.g., an embodiment of the receiver 120, FIG. 1) within a wireless power network. Wireless power receivers may include covers 2104 and customer pocket-forming enabled devices 2106.

In one embodiment, wireless power transmitter 2102 (e.g., an embodiment of the transmitter 102, FIG. 1) may include a microprocessor that integrates a power transmitter manager app 2108 (PWR TX MGR APP), and a third party application programming interface 2110 (Third Party API) for a BLUETOOTH Low Energy chip 2112 (BTLE CHIP HW). Wireless power transmitter 102 may also include an antenna manager software 2114 (Antenna MGR Software) to control an RF antenna array 2116 that may be used to transmit controlled Radio Frequency (RF) waves which may converge in 3-dimensional space. These RF waves may be controlled through phase and/or relative amplitude adjustments to form constructive and destructive interference patterns (pocket-forming). Pockets of energy may form at constructive interference patterns that may be 3-dimensional in shape whereas null-spaces may be generated at destructive interference patterns. Pockets of energy may be formed on wireless power receivers (covers and customer pocket-forming enabled devices 2106). In some embodiment, BLUETOOTH Low Energy chip 2112 may be another type of wireless protocol such as WiFi or the like.

Power transmitter manager app 2108 may include a database (not shown), which may store system status, configuration, or relevant information from wireless power receivers such as, identifiers, voltage ranges, location, signal strength and/or any relevant information from a wireless power receivers.

Power transmitter manager app 2108 may call third party application programming interface 2110 for running a plurality of functions such as start a connection, end a connection, and send data among others. Third party application programming interface 2110 may command BLUETOOTH Low Energy chip 2112 according to the functions called by power transmitter manager app 2108.

Third party application programming interface 2110 at the same time may call power transmitter manager app 2108 through a callback function which may be registered in the power transmitter manager app 2108 at boot time. Third party application programming interface 2110 may have a timer callback that may go for ten times a second, and may send callbacks every time a connection begins, a connection ends, a connection is attempted, or a message is received.

Covers 2104 may include a power receiver app 2118 (PWR RX APP), a third party application programming interface 2120 (Third party API) for a BLUETOOTH Low Energy chip 2122 (BTLE CHIP HW), and a RF antenna array 2124 which may be used to receive and utilize the pockets of energy sent from wireless power transmitter 2102.

Power receiver app 2118 may call third party application programming interface 120 for running a plurality of functions such as start a connection, end the connection, and send data among others. Third party application programming interface 2120 may have a timer callback that may go for ten times a second, and may send callbacks every time a connection begins, a connection ends, a connection is attempted, or message is received.

Covers 2104 may be paired to a wireless device such as a smartphone, or tablet among others via a BTLE connection 2126 by using a graphical user interface (GUI 2128) that may be downloaded from any suitable application store and may run on any suitable operating system such as iOS and Android, among others. Covers 2104 may also communicate with wireless power transmitter 2102 via a BTLE connection 2126 to send important data such as an identifier for the device as well as battery level or charge status information, antenna voltage, any other hardware status, software status, geographic location data, or other information that may be of use for the wireless power transmitter 2102.

In other embodiments, GUI 2128 may also be installed on a wireless device (smartphones or tablets) that may not have the cover 2104. GUI 2128 may perform operations to communicate with power transmitter manager app 2108 via BTLE connection 2126 or any other wireless communication protocols such as Wi-Fi, and LAN among others. In this embodiment, GUI management app still performs the same function as previously described, to manage or monitor the wireless power transmission system.

Customer pocket-forming enabled devices 2106 may refer to a wireless device such as smartphones, tablets, or any of the like that may include an integrated wireless power receiver circuit for wireless power charging (e.g., receiver 120, FIG. 1). Customer pocket-forming enabled devices 2106 may include a power receiver app 2130 (PWR RX APP), and a third party application programming interface 2132 (Third Party API) for a BLUETOOTH Low Energy chip 2134 (BTLE CHIP HW). Customer pocket-forming enabled devices 2106 may also include an RF antenna array 2136 which may receive and utilize pockets of energy sent from wireless power transmitter 2102. GUI 2138 may be downloaded from any suitable application store and may run on any suitable operating system such as iOS and Android, among others.

Power receiver app 2130 may call third party application programming interface 2132 for running a plurality of functions such as start a connection, end the connection, and send data among others. Third party application programming interface 2132 may have a timer callback that may go for ten times a second, and may send callbacks every time a connection begins, a connection ends, a connection is attempted, or message is received.

Customer pocket-forming enabled devices 2106 may also communicate with wireless power transmitter 2102 via a BTLE connection 2126 to send important data such as an identifier for the device as well as battery level information, antenna voltage, geographic location data, or other information that may be of use for the wireless power transmitter 2102.

Figure 20B:
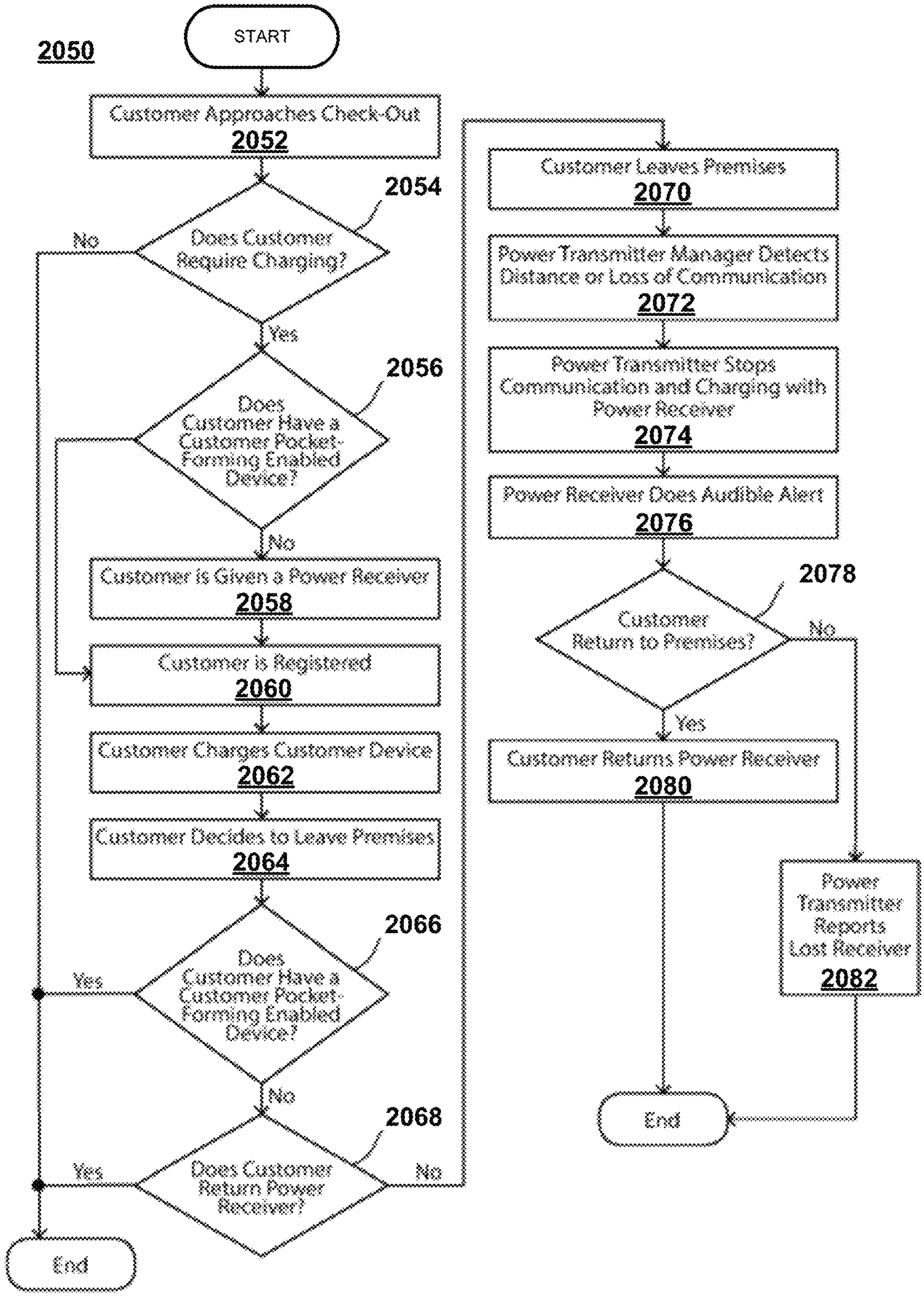
FIG. 20B is a flow diagram for an off-premises alert method for wireless power receivers in a wireless power network, in accordance with some embodiments.

FIG. 20B shows a flowchart for an off-premises alert method 2500 for wireless power receivers in a wireless power network.

The wireless power network may include one or more wireless power transmitter and multiple wireless power receivers that may be either a cover or a customer pocket-forming enabled devices.

Method 2050 may include automated software embedded on a wireless power receiver that may be triggered every time a wireless power receiver is turned on.

In one embodiment, method 2050 may start at step 2052 when a customer goes into a shop and approaches the check-out. Then, at step 2054, an employee of the shop that may be at the counter may ask the customer if he or she requires charging for the customer's device. If the customer does not require charging for his or her device, then the process ends. If the customer does require charging, the employee may ask the customer if his or her device has a customer pocket-forming enabled device, at step 2056. If the customer's device is not a pocket forming enabled device, then at step 2058, the customer is given a power receiver device, also referred as a cover, and the employee may use a GUI to register the given cover at step 2060. Likewise, if the customer does have a pocket-forming enabled device, the employee may use a GUI to register the customer pocket-forming enabled device at step 2060. Then, at step 2062, customer may charge his or her device for the time they need charge. Next, at step 2064, the customer may decide to leave the premises. Then, at step 2066, if the customer has a customer pocket-forming enabled device, the customer may just leave the premises and the process ends. However, if the customer has a power receiver or cover, then the customer may return the cover and leave the premises or he or she may forget to return the cover, at step 2068.

If customer forgets to return the cover, he or she may leave the premises at step 2070. Subsequently, at step 2072, when the customer is at a certain distance away from the store, the power transmitter manager at the store may detect the distance or loss of communication with the power receiver or cover lent to the customer. In other embodiments, the power receiver detects no communication with the power transmitter manager for a minimum amount of time. Then, at step 2074, the power transmitter manager may stop communication with and charging the power receiver. The power receiver, then at step 2076, may generate an audible alert that the customer may hear as he or she goes further from the store. Subsequently, at step 2078, the customer may decide to whether return to premises or not. If customer returns to premises, then at step 2080, customer may return the power receiver. If customer decides to not return to premises, then at step 2082, power transmitter reports details of the lost receiver such as when, where, and receiver's ID among others, to the system management server or the remote information service that are both part of the wireless power transmission system's network.

Examples

In example #1 a customer enters a coffee shop and buys a cup of coffee. At checkout, the customer asks for power to charge a smartphone. The customer's smartphone includes a suitable GUI for interacting with a wireless power network. A power receiver or cover with an embedded power receiver is associated with the customer, by an employee using a GUI device, and the cover is given to the customer. Then, the smartphone is paired with a power receiver or cover. The smartphone starts receiving power from the power transmitter as long as the customer stays in the coffee shop. After some time, the smartphone reaches a desired level of charge and the customer leaves the coffee shop. Subsequently, when the customer is at a certain distance away from the coffee shop, the power transmitter manager may detect the distance or loss of communication with the power receiver or cover lent to the customer, and then stop charging and communication with the power receiver. Then, the power receiver or cover may generate an audible alert that may increase in volume as the customer gets further from the coffee shop. The customer then hears the alert and returns to the coffee shop to return the power receiver or cover.

FIGS. 20A-20B illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 20A-20B.

Presented below are example systems and methods of wirelessly delivering power to receivers in off-premises alert systems.

In some embodiments, an apparatus includes an antenna array, configured to receive pocket-forming energy in three-dimensional space from a transmitter (e.g., transmitter 102, FIG. 1), a power receiver (e.g., a receiver 120, FIG. 1) operatively coupled to the antenna array, the power received further being configured to be coupled to a device. and communications for wirelessly communicating data to the transmitter and the device. In some embodiments, the power receiver is configured to detect an absence of least one of (i) pocket-forming energy and (ii) data communication from the transmitter, and the power receiver is configured to generate an alarm based on the detected absence.

In some embodiments, the data includes registration data indicating an identity of at least one of (i) the device and (ii) a user associated with the device.

In some embodiments, the communications is configured to transmit registration data to the transmitter prior to the receipt of pocket forming energy in the antenna array.

In some embodiments, the power receiver is configured to generate the alarm after a predetermined time period after the detected absence.

In some embodiments, the alarm is an audible alarm, and the power receiver is configured to increase the volume of the audible alarm over a time period.

In some embodiments, the communicated data includes at least one of identification data for the device, device battery level data, device charge status data, antenna voltage data, device hardware status data, device software status data and geographic location data.

In some embodiments, the power receiver is configured to modify the generated alarm based on the geographic location data.

In some embodiments, a method includes (i) configuring a device to receive pocket-forming energy in three dimensional space in an antenna array from a transmitter via a power receiver configured to be coupled o the device, (ii) wirelessly communicating data from communications coupled to the power receiver to the transmitter and the device, (iii) detecting, via the power receiver, an absence of least one of (a) pocket-forming energy and (b) data communication from the transmitter, and (iv) generating an alarm via the power receiver for the device based on the detected absence.

In some embodiments, the data includes registration data indicating an identity of at least one of (i) the device and (ii) a user associated with the device.

In some embodiments, the registration data is communicated to the transmitter prior to the receipt of pocket forming energy in the antenna array.

In some embodiments, the alarm is generated after a predetermined time period after the detected absence.

In some embodiments, the alarm is an audible alarm, and the alarm is modified to increase the volume of the audible alarm over a time period.

In some embodiments, the communicated data includes at least one of identification data for the device, device battery level data, device charge status data, antenna voltage data, device hardware status data, device software status data and geographic location data.

In some embodiments, the generated alarm is modified based on the geographic location data.

Figure 21A:
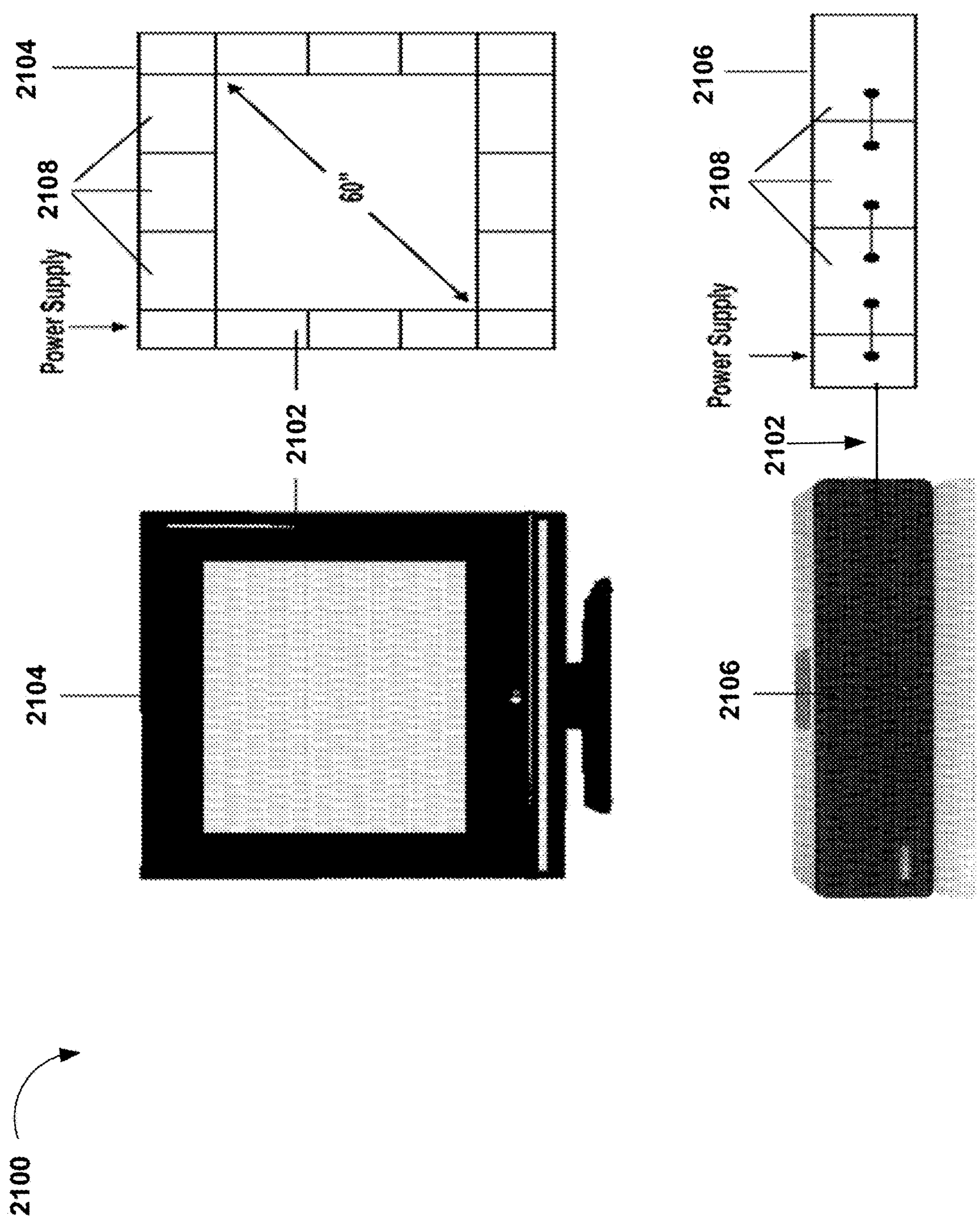
FIG. 21A illustrates a diagram of architecture for incorporating a transmitter into different devices, in accordance with some embodiments.

FIG. 21A depicts a diagram of architecture 2100 for incorporating transmitter 2102 (e.g., an embodiment of the transmitter 102, FIG. 1) into different devices. For example, the flat transmitter 2102 may be applied to the frame of a television 2104 or across the frame of a sound bar 2106. Transmitter 2102 may include multiple tiles 2108 with antenna elements and RFICs in a flat arrangement. The RFIC may be directly embedded behind each antenna elements; such integration may reduce losses due the shorter distance between components.

Tiles 2108 can be coupled to any surface of any object. Such coupling can be via any manner, such as fastening, mating, interlocking, adhering, soldering or others. Such surface can be smooth or rough. Such surface can be of any shape. Such object can be a stationary object, such as a building portion or an appliance, or a movable object, whether self-propelled, such as a vehicle, or via another object, such as handheld. Tiles 2108 can be used modularly. For example, tiles 2108 can be arranged to form any 2-dimensional or 3-dimensional shape, whether open or closed, symmetrical or asymmetrical. In some embodiments, tiles 2108 can be arranged in a figure shape, or a device/structure shape, such as a tower. Tiles 2108 can be configured to couple to each other, such as via interlocking, mating, fastening, adhering, soldering, or others. Tiles 2108 can be configured to operate independently of each other or dependently on each other, whether synchronously or asynchronously. In some embodiments, tiles 2108 are configured to be fed serially or in parallel, whether individually or as a group. Tiles 2108 can be configured to output from at least one side, such as top, lateral, or bottom. Tiles 2108 can be rigid, flexible, or elastic. In some embodiments, at least one other component, whether digital, analog, mechanical, electrical or non-electrical, can be positioned between at least two of tiles 2108. In some embodiments, at least one of tiles 1650 can be run via a hardware processor coupled to a memory.

Tiles 2108 can be used for heat map technology, as described herein. For example, transmitter 2102 includes multiple tiles 2108 with antenna elements and RFICs in a flat arrangement, where transmitter 2102 can facilitate heat map creation for a group of tiles 2108, such as for a particular receiver (e.g., an embodiment of the receiver 120, FIG. 1), such as when tiles 2108 send BLE identifiers for heat map generation. In some embodiments, the group of tiles 2108 is defined via tiles 2108 positioned within a specified distance, such as how many tiles 2108 positioned within a specified distance are sending out signals, scanning an area, and receiving receiver input, such as locational input. Note that such performance can occur simultaneously under different communication protocols as well, such BLE® and ZIGBEE®. In some embodiments, at least two groups of tiles 2108 perform different tasks. In some embodiments, a group of tiles 2108 includes two tiles, such as when the two tiles are each eight inches long by two inches wide. In some embodiments, an entire array can run along a perimeter of television 2104, where the array includes via a plurality of tiles 2108 arranged in or functioning as a plurality of groups of tiles 2108 as each of such groups might obtain a different heat map, as described herein, which can be subsequently analyzed together to obtain a better grand scale heat map understanding. Accordingly, a plurality of heat map sets can exists without being reconciled with each other as each of the heat map sets can include different information. For example, a first heat map can be associated with a first device and a second heat map associate with a second device, different from the first device.

For example, a television 2104 may have a bezel around a television 2104, comprising multiple tiles 2108, each tile comprising of a certain number of antenna elements. For example, if there are 20 tiles 2108 around the bezel of the television 2104, each tile 2108 may have 24 antenna elements and/or any number of antenna elements.

Note that tiles 2108 are positioned or configured to avoid signal interference with television 2104 or wiring coupled to television 2104. Alternatively or additionally, television 2104 can be shielded against such signal interference. Similar configurations can be applied to sound bar 2106 or any other type of speaker, whether a standalone speaker or a component of a larger system. However, also note that such tiles 2108 can be arranged on any device, whether a standalone device or a component of a larger system, whether electronic or non-electronic.

In tile 2108, the phase and the amplitude of each pocket-forming in each antenna element may be regulated by the corresponding RFIC in order to generate the desired pocket-forming and transmission null steering. RFIC singled coupled to each antenna element may reduce processing requirement and may increase control over pocket-forming, allowing multiple pocket-forming and a higher granular pocket-forming with less load over microcontroller, thus, a higher response of higher number of multiple pocket-forming may be allowed. Furthermore, multiple pocket-forming may charge a higher number of receivers and may allow a better trajectory to such receivers.

RFIC may be coupled to one or more microcontrollers, and the microcontrollers may be included into an independent base station or into the tiles 2108 in the transmitter 2102. A row or column of antenna elements may be connected to a single microcontroller. In some implementations, the lower number of RFICs present in the transmitters 2102 may correspond to desired features such as: lower control of multiple pocket-forming, lower levels of granularity and a less expensive embodiment. RFICs connected to each row or column may allow reduce costs by having fewer components because fewer RFICs are required to control each of the transmitters 2104. The RFICs may produce pocket-forming power transmission waves by changing phase and gain, between rows or columns.

In some implementations, the transmitter 2102 may use a cascade arrangement of tiles 2108 comprising RFICs that may provide greater control over pocket-forming and may increase response for targeting receivers. Furthermore, a higher reliability and accuracy may be achieved from multiple redundancies of RFICs.

In one embodiment, a plurality of PCB layers, including antenna elements, may provide greater control over pocket-forming and may increase response for targeting receivers. Multiple PCB layers may increase the range and the amount of power that could be transferred by transmitter 2102. PCB layers may be connected to a single microcontroller or to dedicated microcontrollers. Similarly, RFIC may be connected to antenna elements.

A box transmitter 2102 may include a plurality of PCB layers inside it, which may include antenna elements for providing greater control over pocket-forming and may increase response for targeting receivers. Furthermore, range of wireless power transmission may be increased by the box transmitter 2102. Multiple PCB layers may increase the range and the amount of RF power waves that could be transferred or broadcasted wirelessly by transmitter 2102 due the higher density of antenna elements. PCB layers may be connected to a single microcontroller or to dedicated microcontrollers for each antenna element. Similarly, RFIC may control antenna elements. The box shape of transmitter 2102 may increase action ratio of wireless power transmission. Thus, box transmitter 2102 may be located on a plurality of surfaces such as, desks, tables, floors, and the like. In addition, box transmitter may include several arrangements of PCB layers, which may be oriented in X, Y, and Z axis, or any combination these.

In some embodiments, sound bar 2106 is elongated, such as by being four feet long and two inches high. Such shaping provides a provision of tiles 2108 along a longitudinal axis of sound bar 2106 such that at least some of tiles 2108 are able to send or receive signals, as described herein, in a surrounding manner.

Figure 21B:
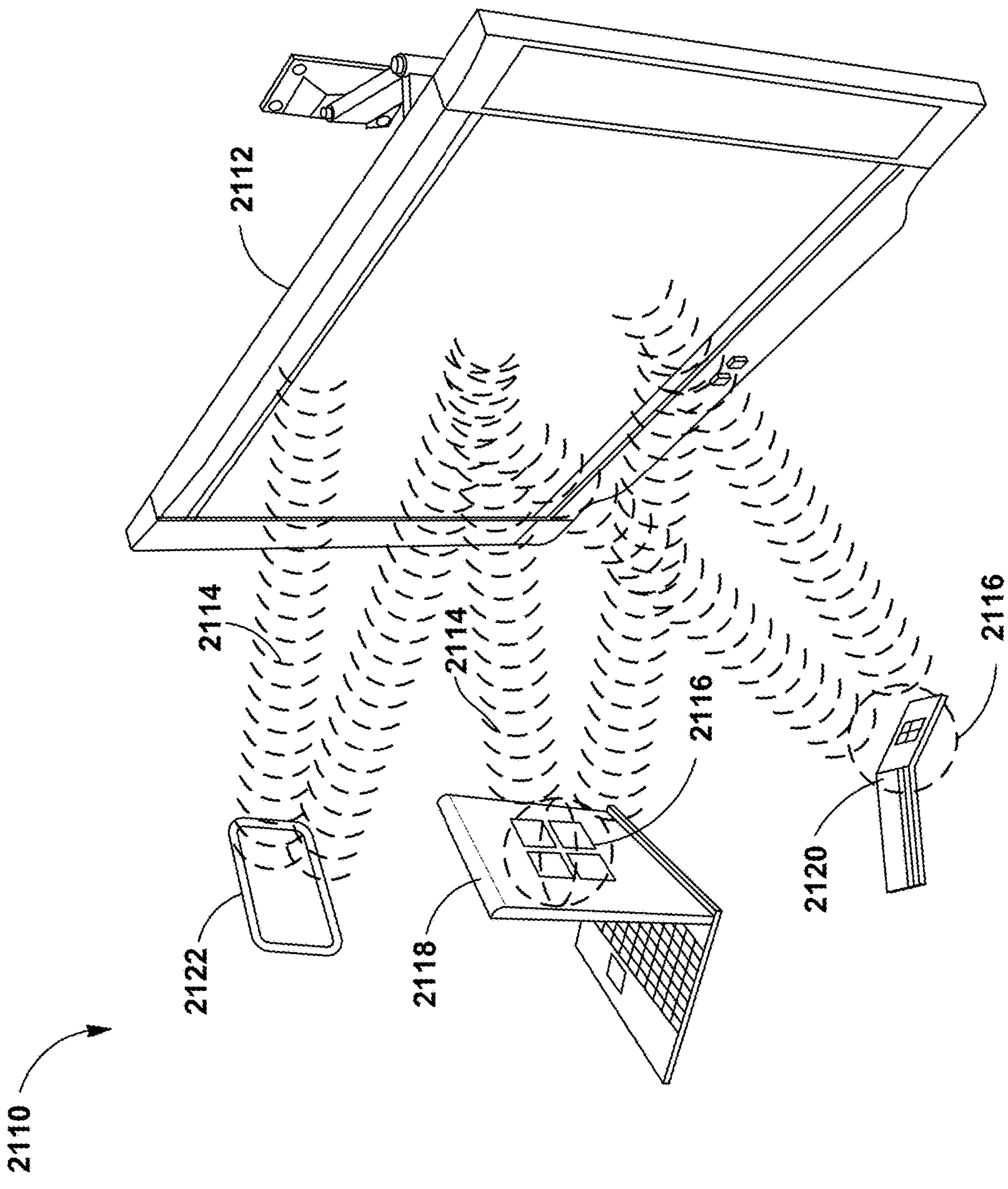
FIG. 21B illustrates an example embodiment of a television (TV) system outputting wireless power, in accordance with some embodiments.

FIG. 21B illustrates an example embodiment of a television (TV) system outputting wireless power. Some elements of this figure are described above. Thus, same reference characters identify identical and/or like components described above and any repetitive detailed description thereof will hereinafter be omitted or simplified in order to avoid complication.

A wireless power transmission 2100 that includes pocket-forming is described. The transmission 2110 entails a TV system 2112 transmitting a plurality of controlled wireless power waves 2114 converging in multidimensional space. The TV system 2112 uses a transmitter, as described herein, such as transmitter 102, to output waves 2114, such as in any direction, such as frontal or lateral or backward or upward or downward. The transmitter can be powered via the TV system 2112 or another power source, such as a battery, whether coupled to or not to the TV system 2112. Alternatively or additionally, the transmitter can power the TV system 2112 or the transmitter and TV system 2112 are powered independently of each other, such as from two different power sources, such as a battery and mains electricity. Waves 2114 are controlled through phase and/or relative amplitude adjustments to form constructive and destructive interference patterns, such as pocket-forming. Pockets of energy 2116 are formed at constructive interference patterns of waves 2114 and are 3-dimensional in shape, whereas null-spaces are generated at destructive interference patterns of waves 2114. A receiver, as described herein, such as receiver 120, utilizes pockets of energy 2116 produced by pocket-forming for charging or powering an electronic device, for example a laptop computer 2118, a mobile phone 2120, a tablet computer 2122 or any electrical devices at least within reach or a defined range from TV system 2112, such as about 20 feet in a specific direction, an arc comprising a peak height distance of about 20 feet, or a radius of 20 feet, and thus effectively providing wireless power transmission 2110. In some embodiments, adaptive pocket-forming may be used to regulate power on electronic devices. In some embodiments, TV system 2112 includes a speaker or a sound bar, whether as described herein, or of another type. In some embodiments, TV system 2112 includes a remote control unit, which can include a receiver, as described herein, configured to receive wireless power from TV system 2112, as described herein.

Figure 21C:
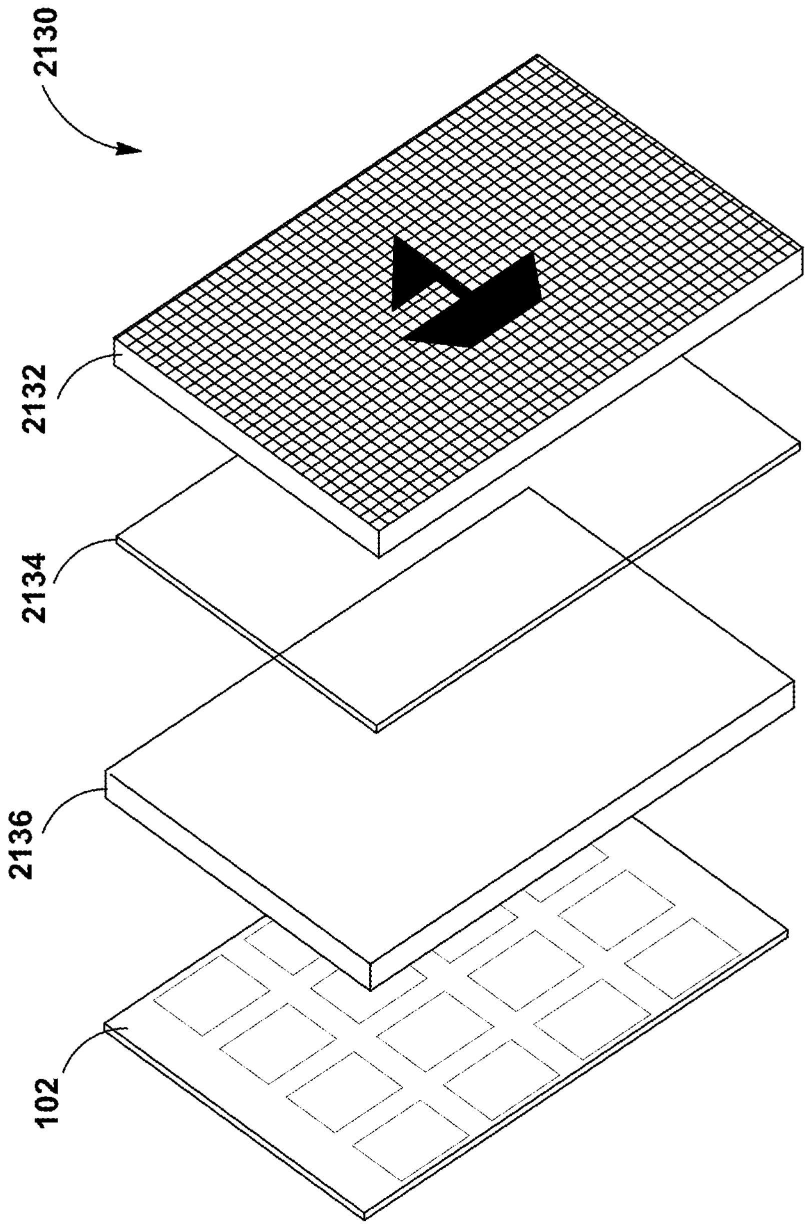
FIG. 21C illustrates an example embodiment of an internal structure of a TV system, in accordance with some embodiments.

FIG. 21C illustrates an example embodiment of an internal structure of a TV system. Some elements of this figure are described above. Thus, same reference characters identify identical and/or like components described above and any repetitive detailed description thereof will hereinafter be omitted or simplified in order to avoid complication.

An internal structure view 2130 depicts TV system 2112 with a transmitter, as described herein. TV system 2112 includes a plurality of components. TV system 2112 includes a front transparent screen layer 2132, a polarized film layer 2134, and an LED/LCD backlight layer 2136. TV system 2112 additionally include transmitter 102, as described herein. In another embodiment, transmitter 102 may be integrated within at least one of layers 2132, 2134, 2136 instead of as a separate layer.

In other embodiments, most of the circuitry of transmitter 102 is placed inside TV system 2112, with antenna elements 1106 placed around the edges of TV system 3002. In other embodiments, antenna elements are placed on the outside surface of a back portion of TV system 2112. In yet further embodiments, antenna elements can be printed micro-antennas which can be built-in on TV system 2112 display area. Such printed-antennas can be produced with well-known in the art photolithographic or screen printing techniques. Such antennas can be beneficial because they can be printed at tinny scales which render them invisible to the human eye. Note that TV system can be of any type, such as a liquid crystal display (LCD), a plasma, a cathode ray, or others.

Figure 21D:
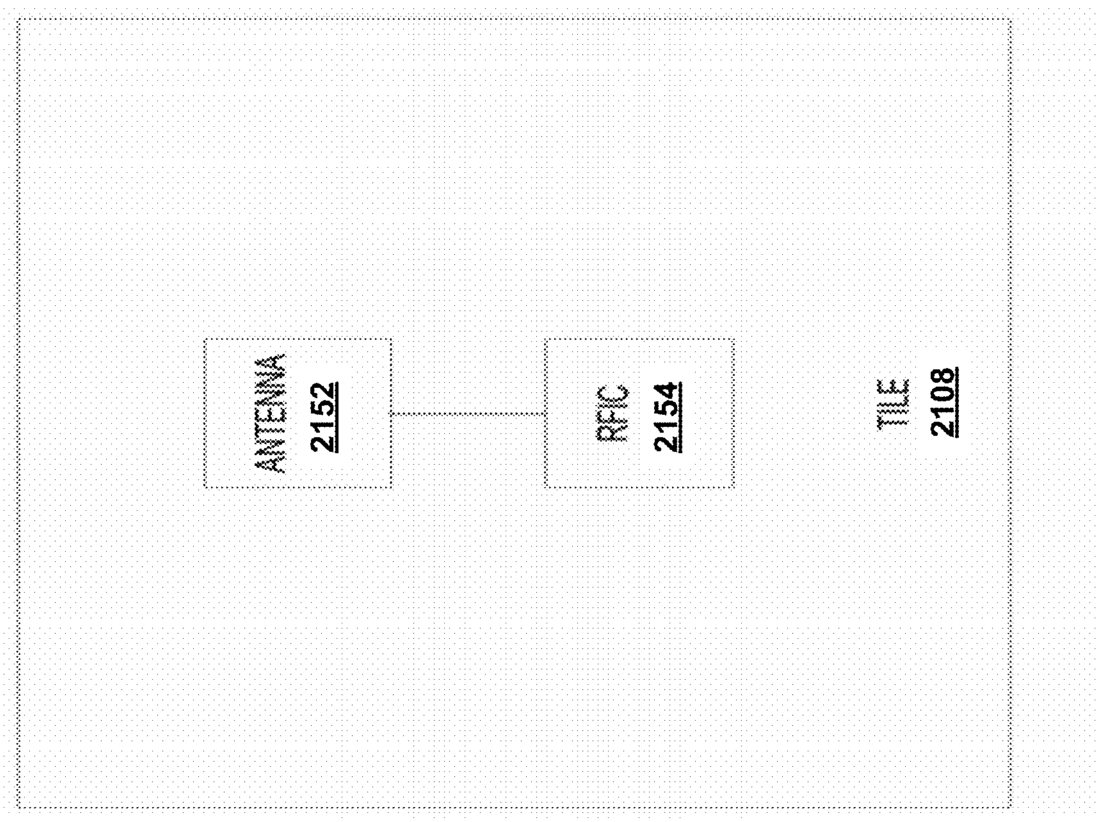
FIG. 21D illustrates an example embodiment of a tile architecture, in accordance with some embodiments.

FIG. 21D illustrates an example embodiment of a tile architecture. Some elements of this figure are described above. Thus, same reference characters identify identical and/or like components described above and any repetitive detailed description thereof will hereinafter be omitted or simplified in order to avoid complication.

A tile 2108 (FIG. 21A) includes an antenna 2152 and an RFIC 2154 coupled to antenna 2152, as described herein. Tile 2108 can be structure in any way as described herein. Tile 2108 operates are described herein. Although tile 2108 is shaped in a rectangular shape, in other embodiments, tile 2108 can be shaped differently, whether in an open shape or a closed shape. For example, tile 2108 can be shaped as a star, a triangle, a polygon, or others.

FIGS. 21A-21D illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 21A-21D.

Presented below are example systems for wirelessly delivering power to receivers using transmitters in various devices.

In some embodiments, an example system for wireless power transmission includes: (i) a sound bar frame; and (ii) a plurality of tiles positioned along the sound bar frame. At least one of the tiles includes an antenna and a radio frequency integrated circuit (RFIC) coupled to the antenna and the RFIC is configured to engage the antenna such that the antenna emits a plurality of wireless power waves defining a pocket of energy.

In some embodiments, an example system for wireless power transmission includes: (i) a display frame; and (ii) a plurality of tiles positioned along the sound bar frame. At least one of the tiles includes an antenna and a radio frequency integrated circuit (RFIC) coupled to the antenna and the RFIC is configured to engage the antenna such that the antenna emits a plurality of wireless power waves defining a pocket of energy.

In some embodiments, an example system for wireless power transmission includes: (i) a speaker enclosure; and (ii) a plurality of tiles positioned along the sound bar frame. At least one of the tiles includes an antenna and a radio frequency integrated circuit (RFIC) coupled to the antenna and the RFIC is configured to engage the antenna such that the antenna emits a plurality of wireless power waves defining a pocket of energy.

In some embodiments, the tiles are configured to operate dependent on each other.

In some embodiments, the tiles are configured to operate independent of each other.

In some embodiments, the sound bar frame includes an external face, and the tiles are coupled to the external face. In some embodiments, the display frame includes an external face, and the tiles are coupled to the external face. In some embodiments, the speaker enclosure includes an external face, and the tiles are coupled to the external face.

In some embodiments, the sound bar frame includes an internal face, and the tiles are coupled to the internal face. In some embodiments, the display frame includes an internal face, and the tiles are coupled to the internal face. In some embodiments, the speaker enclosure includes an internal face, and the tiles are coupled to the internal face.

In some embodiments, the sound bar frame includes the tiles. In some embodiments, the display frame includes the tiles. In some embodiments, the speaker enclosure includes the tiles.

In some embodiments, the system further includes a display, and the display frame frames the display, and the tiles define a closed shape, and the closed shape encloses the display. Moreover, in some embodiments, the display is configured to receive power from a first power source, and the at least one of the tiles is configured to receive power from a second power source, and the first power source and the second power source are one power source.

In some embodiments, the system further includes a speaker, where the sound bar frame encloses the speaker, the tiles define a closed shape, and the closed shape encloses the speaker. In some embodiments, the speaker is configured to receive power from a first power source, where the at least one of the tiles is configured to receive power from a second power source. The first power source and the second power source are one power source.

In some embodiments, the system further includes a speaker, and the speaker enclosure encloses the speaker, and the tiles define a closed shape, and the closed shaped encloses the speaker. Moreover, in some embodiments, the speaker is configured to receive power from a first power source, and the at least one of the tiles is configured to receive power from a second power source, and the first power source and the second power source are one power source.

In some embodiments, the system further includes a controller coupled to the RFIC in the at least one of the tiles, where the controller is positioned off the tiles.

In some embodiments, the tiles are in contact with each other. In addition, in some embodiments, the tiles are coupled to each other. Alternatively, in some embodiments, the tiles avoid contact with each other.

In some embodiments, the tiles define a row. Alternatively or in addition, in some embodiments, the tiles define a column.

In some embodiments, the tiles are powered serially. In some embodiments, the tiles are powered in parallel.

In some embodiments, tiles identify a path via which the pocket of energy is defined.

In some embodiments, the tiles are part of an antenna array.

In some embodiments, the tiles define the pocket of energy.

In some embodiments, the at least one of the tiles includes a controller coupled to the RFIC, and the controller is configured to control the RFIC.

Figure 22:
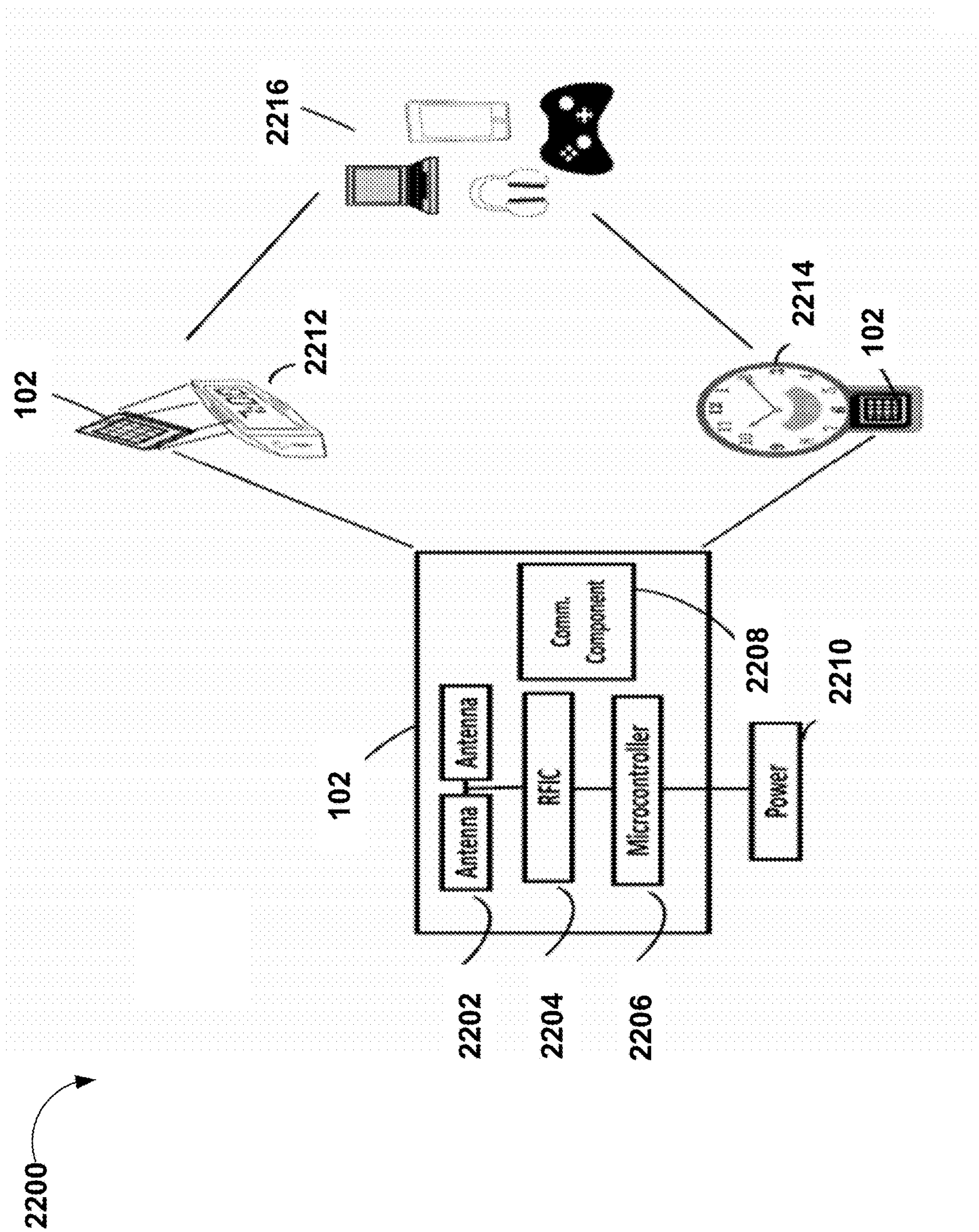
FIGS. 22-24 illustrate transmitters integrated with various devices, in accordance with some embodiments.

FIG. 22 illustrates a transmitter integrated with a timing device. In some embodiments, a timing device capable of wireless power transmission includes a housing comprising: a transmitter 102 configured to generate a plurality of wireless power transmission waves, the transmitter 102 comprising: a plurality of antennas 2202 (e.g., an embodiment of antennas 110, FIG. 1) configured to transmit the wireless power transmission waves in response to a communication signal indicating a power requirement of an electronic device; a digital signal processor 2204 configured to control the plurality of wireless power transmission waves in order to form a pocket of energy in a plurality of predetermined regions in a space; and a communication component 2208 configured to communicate with a receiver (e.g., receiver 120, FIG. 1) coupled to the electronic device; a time display 2212 on a surface of the housing; and a power source 2210 coupled to the transmitter 102 and the time display 2212. The time display 2212 can be from a digital clock, or an analog clock 2214, or couple to a transmission of time from a component associated with the transmitter 102.

In some embodiments, a method for wireless transmission of power to an electronic device from a timing device includes establishing, by a transmitter associated with the timing device, a connection with a power source, the timing device being configured to house the transmitter and a time display; receiving, by the timing device, a reference time obtained from an atomic clock; presenting, by the timing device, the reference time on a time display of the timing device; providing, by the timing device, the reference time to a processor of the transmitter; generating, by the transmitter associated with the timing device, a plurality of wireless power transmission waves to form a pocket of energy; receiving, by the transmitter associated with the timing device, a transmission of a power requirement and location of an electronic device through a receiver associated with the electronic device; and transmitting, by the transmitter associated with the timing device, the plurality of wireless power transmission waves using a plurality of antennas in order to form a pocket of energy in a plurality of predetermined regions at the receiver in response to the received transmission.

FIG. 22 illustrates examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIG. 22.

Figure 23:
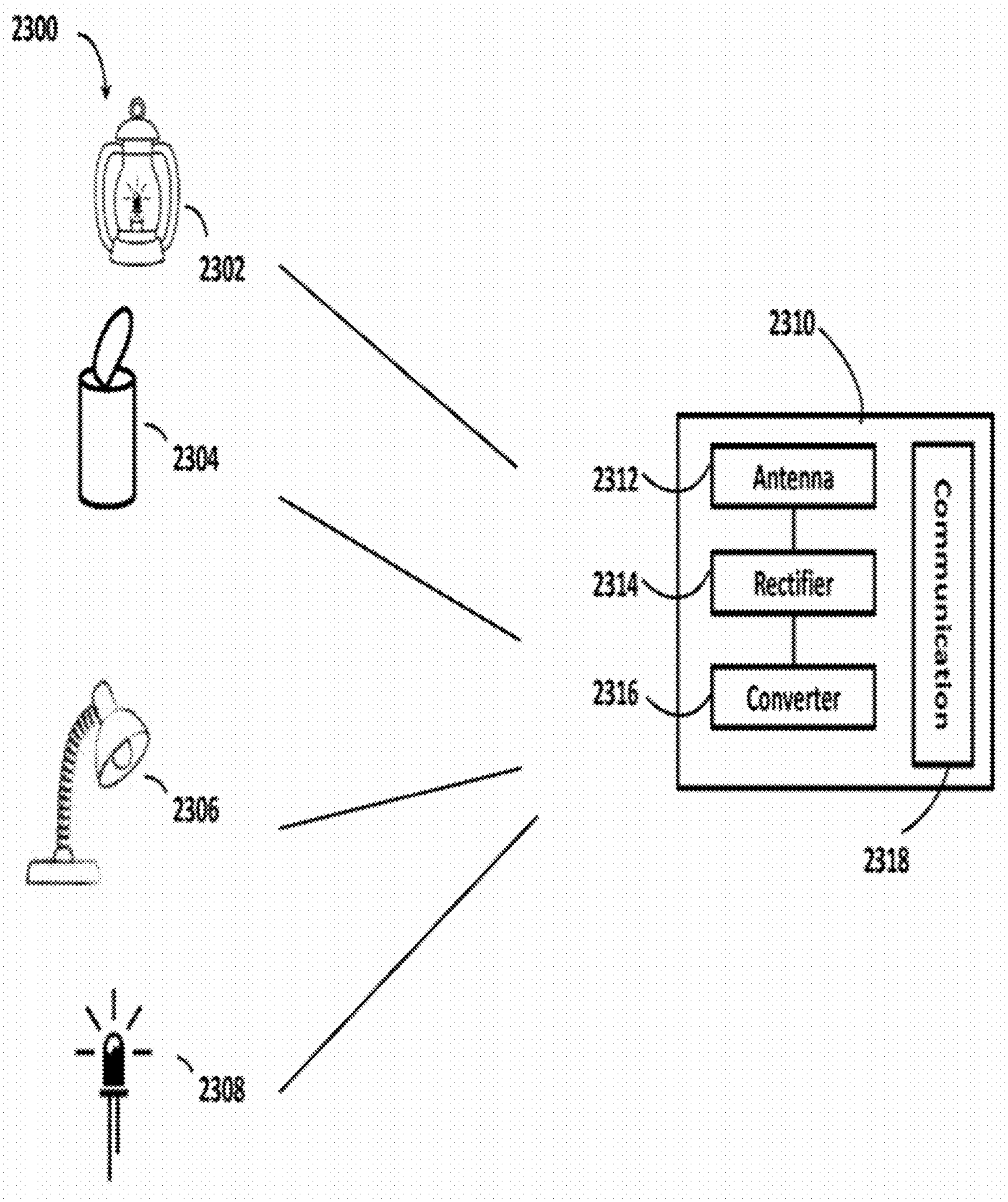

FIG. 23 illustrates an example embodiment of lighting devices, such as a lantern 2302, a flameless candle 2304, a desk lamp 2306, or a LED lighting device 2308, coupled to a receiver (e.g., an embodiment of the receiver 120, FIG. 1), where the receiver 2302 may be used for receiving wireless power transmission from a transmitter (e.g., an embodiment of the transmitter 102, FIG. 1). Each lighting device may include a light generating component (e.g., LED bulb, halogen bulb, or other bulb, diode, or capacitor) coupled to a battery or other power source. Receiver 2310 may be embedded in these devices or otherwise coupled to the lighting devices. In some implementations, the receiver 2310 may include one or more antenna elements 2312. The number, spacing and type of antenna elements 2312 may be calculated according to the design, size and/or type of external battery. The receiver 2310 also includes other components such as a rectifier 2314, an electric current converter 2316, and a communications component 2318 that includes a communication circuit associated with a communication antenna. In some implementations, terminating the transmission of power from the transmitter will result in turning off all the lighting devices that were powered by the wireless power from the transmitter. In some implementations, the receipt of power at the receiver may be terminated. In some implementations, a string of lighting devices may be connected through a single receiver system.

Figure 24:
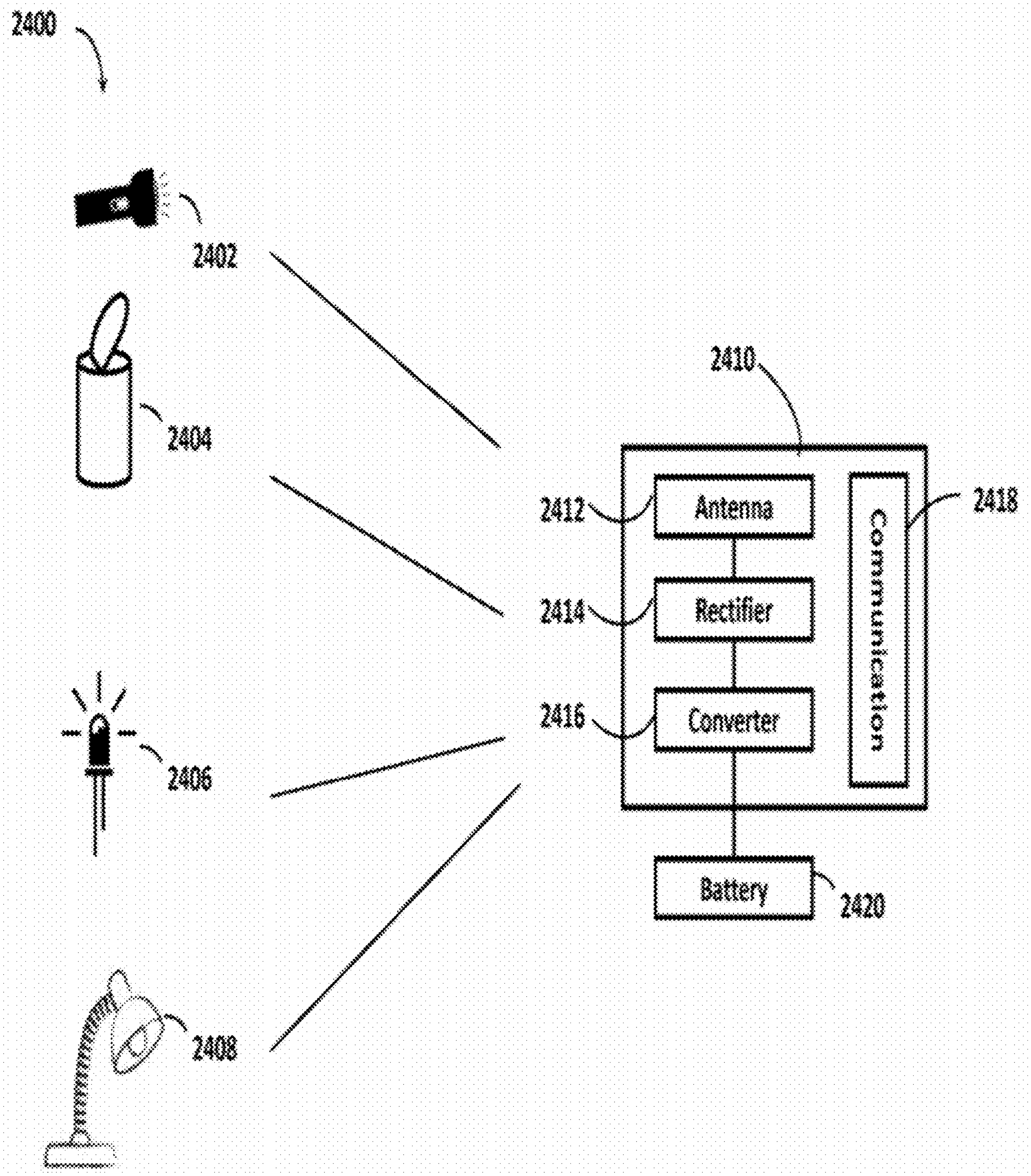

FIG. 24 illustrates an example embodiment of lighting devices, such as a flashlight 2402, a flameless candle 2404, a LED lighting device 2406, or a desk lamp 2408, coupled to a receiver 2410 (e.g., an embodiment of the receiver 120, FIG. 1), where the receiver 2410 may be used for receiving wireless power transmission from a transmitter (e.g., an embodiment of the transmitter 102, FIG. 1). Receiver 2410 may be coupled to a battery 2420 that is associated with the lighting devices, either as an embedded or built-in battery or an external one. In some implementations, the receiver 2410 may include one or more antenna elements 2412. The number, spacing and type of antenna elements 2412 may be calculated according to the design, size and/or type of external battery. The receiver 2410 also includes other components such as a rectifier 2414, an electric current converter 2416, and a communications component 2418 including a communication circuit associated with a communication antenna.

FIGS. 23 and 24 illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 23 and 24

Presented below are example devices for and methods of wirelessly delivering power to receivers using transmitters in various lighting devices.

In some embodiments, a lighting device with a wireless power transmission receiver includes a receiver coupled to the lighting device, the receiver comprising: (i) an antenna element configured to receive one or more power transmission waves converging to form a pocket of energy and generate an electrical current by harvesting energy from the one or more power transmission waves, and the electrical current is in an alternating current form of electricity; (ii) a rectifier coupled to the antenna element and configured to rectify the alternating current form of electricity into a direct current form of electricity; and (iii) a power converter coupled to the rectifier and configured to generate a constant voltage output of electrical current in the form of direct current, and the power converter is communicatively coupled to the lighting device, and and the receiver provides the direct current to the lighting device.

In some embodiments, the receiver is integrated into the lighting device.

In some embodiments, the lighting device is portable.

In some embodiments, the lighting device is selected from the group consisting of: a lantern, a lamp, a flameless candle, and a LED device.

In some embodiments, the receiver further includes one or more communications components configured to transmit a communication signal to a transmitter, and the communication signal identifies the receiver to the transmitter and indicates the location of the receiver relative to the transmitter.

In some embodiments, the lighting device further includes a battery coupled to the lighting device. Furthermore, in some embodiments, the battery is configured to function as a sole source of power for the lighting device. Alternatively, in some embodiments, the battery is configured to be a back-up source of power for the lightening device. In some embodiments, the battery is removably coupled to the lighting device. The battery may be integrated into the lighting device.

In some embodiments, an example method of providing wireless power to a lighting device includes interfacing, by an antenna element of a receiver associated with a lighting device, with a pocket of energy defined via a plurality of wireless power transmission waves; producing, by the antenna element of the receiver, electrical energy having an alternating current form based on the pocket of energy; and rectifying, by a rectifier of the receiver, the alternating current form of electricity into a direct current form of electricity, and the rectifier is coupled to the antenna element. The method further includes converting, by a power converter of the receiver, the direct current form of electricity to a constant voltage output of electrical current, and the power converter is coupled to the rectifier; and providing, by the power converter of the receiver, the electrical energy to power the lighting device.

Figure 25A:
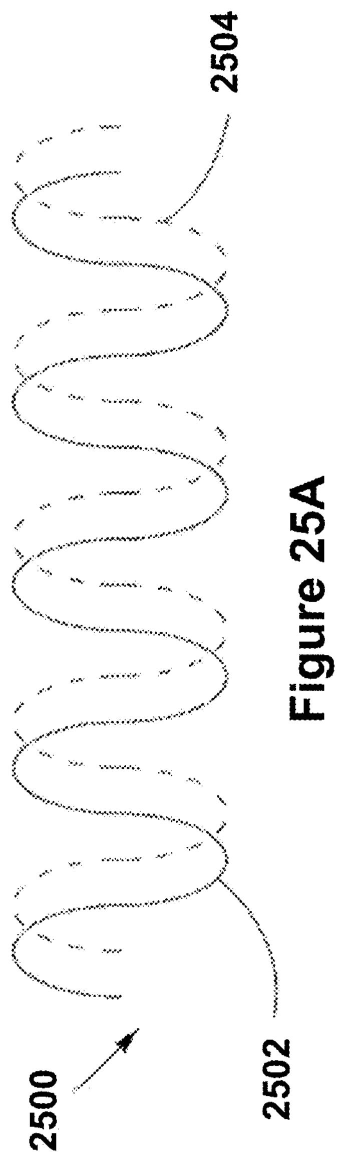
FIGS. 25A and 25B illustrate waveforms for wireless power transmission with selective range, which may get unified in single waveform, in accordance with some embodiments.
Figure 25B:
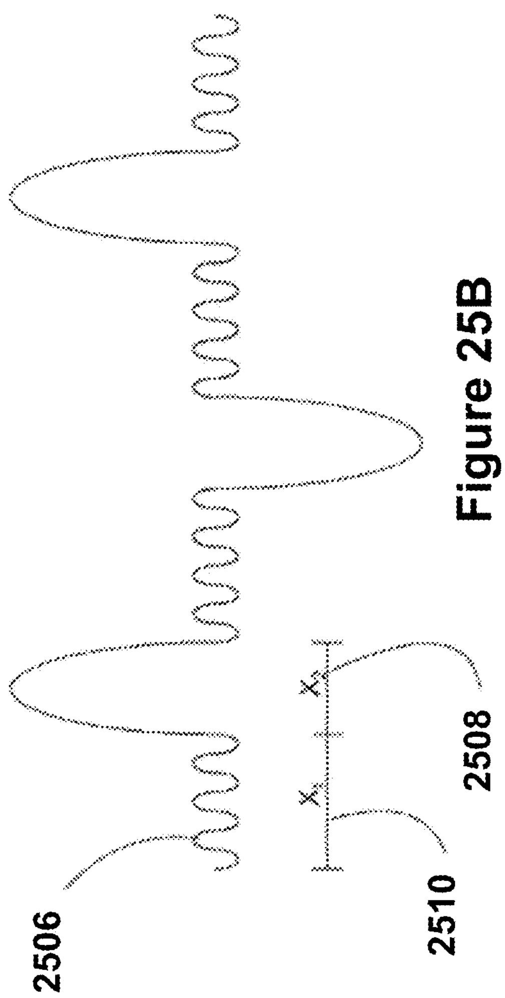
Figure 26:
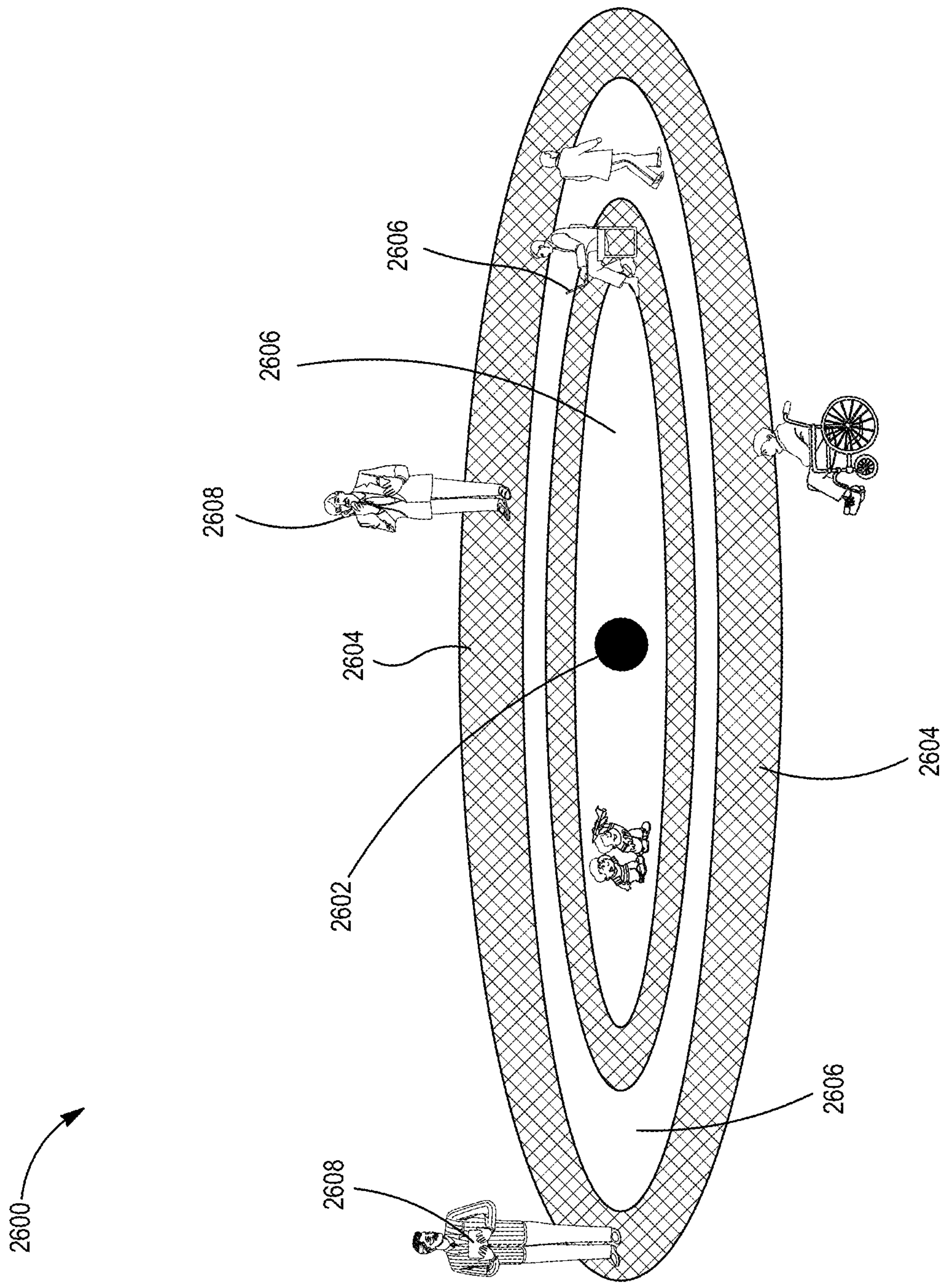
FIGS. 26 and 27 illustrate wireless power transmission with selective range, where a plurality of pockets of energy may be generated along various radii from transmitter, in accordance with some embodiments.
Figure 27:
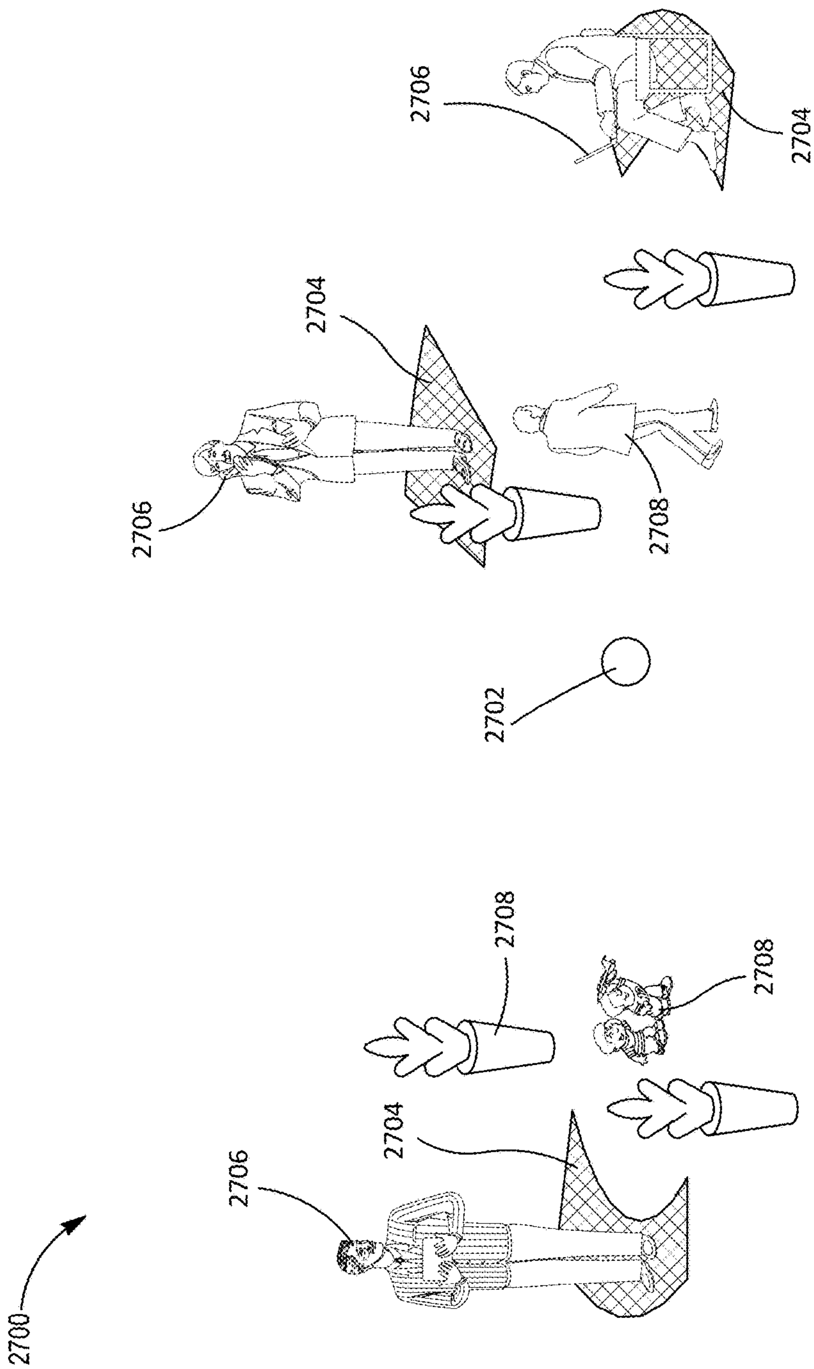

FIGS. 25-27 illustrate wireless power transmission with selective range in accordance with some embodiments.

FIGS. 25A and 25B depict a wireless power transmission principle 2500, where two waveforms, for example waveform 2502 and waveform 2504, as depicted in FIG. 25A may result in a unified waveform 2506 as depicted in FIG. 25B. Such unified waveform 2506 may be generated by constructive and destructive interference patterns between waveform 2502 and waveform 2504.

As depicted in FIG. 25A, at least two waveforms with slightly different frequencies such as waveform 2502 and waveform 2504 may be generated at 5.7 Gigahertz (GHz) and 5.8 GHz respectively. By changing the phase on one or both frequencies using suitable techniques such as pocket-forming, constructive and destructive interferences patterns may result in unified waveform 2506. Unified waveform 2506 may describe pockets of energy and null-spaces along pocket-forming, such pockets of energy 108 may be available in certain areas where a constructive interference exists; such areas may include one or more spots which may move along pocket-forming trajectory and may be contained into wireless power range 2508 X2. Wireless power range 2508 X2 may include a minimum range and a maximum range of wireless power transmission 100, which may range from a few centimeters to over hundreds of meters. In addition, unified waveforms 2506 may include several null-spaces, which may be available in certain areas where a destructive interference exists, such areas may include one or more null-spaces which may move along pocket-forming trajectory and may be contained into wireless power range 2510 X1. Wireless power range 2510 X1 may include a minimum range and a maximum range of wireless power transmission 100, which may range from a few centimeters to over hundreds of meters.

FIG. 26 depicts wireless power transmission with selective range 2600, where a transmitter 2602 may produce pocket-forming for a plurality of receivers 2608. Transmitter 2602 may generate pocket-forming through wireless power transmission with selective range 2600, which may include one or more wireless charging radii 2604 and one or more radii of null-space 2606. A plurality of electronic devices may be charged or powered in wireless charging radii 2604. Thus, several spots of energy may be created, such spots may be employed for enabling restrictions for powering and charging electronic devices, such restrictions may include: Operation of specific electronics in a specific or limited spot contained in wireless charging radii 2604. Furthermore, safety restrictions may be implemented by the use of wireless power transmission with selective range 2600, such safety restrictions may avoid pockets of energy 108 over areas or zones where energy needs to be avoided, such areas may include areas including sensitive equipment to pockets of energy 108 and/or people who do not want pockets of energy 108 over and/or near them.

FIG. 27 depicts wireless power transmission with selective range 2700, where a transmitter 2702 may produce pocket-forming for a plurality of receivers 2706. Transmitter 2702 may generate pocket-forming through wireless power transmission with selective range 2700, which may include one or more wireless charging spots 2704. A plurality of electronic devices may be charged or powered in wireless charging spots 2704. Pockets of energy may be generated over a plurality of receivers 2706 regardless of the obstacles 2708 surrounding them, such effect may be produced because destructive interference may be generated in zones or areas where obstacles 2708 are present. Therefore, pockets of energy 108 may be generated through constructive interference in wireless charging spots 2704. Location of pockets of energy may be performed by tracking receivers 2706 and by enabling a plurality of communication protocols by a variety of communication systems such as, Bluetooth technology, infrared communication, WI-FI, FM radio among others.

FIGS. 25-27 illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 25-27.

Presented below are example systems and methods for wireless power transmission with selective range to power a portable electronic device.

A system for wireless power transmission with selective range to power a portable electronic device may include: (i) a transmitter for generating at least two pocket-forming RF waves through an antenna connected to the transmitter, (ii) a micro-controller within the transmitter for controlling the at least two pocket-forming RF waves to accumulate pockets of energy in regions of space in the form of constructive interference patterns of the generated RF waves, and (iii) a selective range for charging or powering the electronic device in a predetermined variety of spots in regions of space with the accumulated pockets of energy surrounded by null-spaces without accumulated pockets of energy.

In some embodiments, the micro-controller changes a phase on one or more RF waves in pocket-forming with constructive and destructive interference patterns resulting in a unified waveform in the predetermined variety of spots for charging the electronic device. Furthermore, in some embodiments, the unified waveform defines pockets of energy and null-spaces along pocket-forming whereby the pockets of energy are available in certain predetermined regions of space where constructive interference exists defining one or more hot spots for charging the electronic devices over a minimum or maximum selected range responsive to a program within the micro-controller. Furthermore, in some embodiments, the unified waveform is comprised of at least two RF waves with slightly different frequencies with phase shifting on one or both frequencies to form a wireless power range from a few centimeters to over hundreds of meters.

In some embodiments, the transmitter provides pocket-forming for a plurality of receivers including one or more wireless charging radii surrounded by one or more radii of null-space to create spots enabling restrictions for powering and charging electronic devices.

In another system for wireless power transmission with selective range to power a portable electronic device, the system may include: (i) a transmitter for generating at least two RF waves and short RF control signals having at least two RF antennas to transmit at least two RF waves through the antennas converging in 3-dimensional space to accumulate as pockets of energy in the form of constructive interference patterns of RF waves, (ii) a micro-controller within the transmitter for controlling constructive interference patterns of the RF waves to accumulate pockets of energy in predetermined areas or regions in 3-dimensional space and for controlling the destructive interference patterns of the RF waves to form null-spaces surrounding the pockets of energy, where the constructive interference patterns of RF waves form charging hot spots of a predetermined selected range for charging portable electronic devices and where the destructive interference patterns of RF waves form null spots of a predetermined selected range surrounding the charging spots without charging energy therein.

In some embodiments, the hot spots include one or more wireless charging radii and one or more null-space radii whereby the hot spots are created for enabling restrictions for powering and charging the electronic device.

In some embodiments, the predetermined selected range of charging spots provide safety restrictions to eliminate pockets of energy over areas or zones where energy is avoided to protect sensitive equipment or people within predetermined designated regions in 3-dimensional space.

In some embodiments, the system further includes a receiver connected to the portable electronic device having a micro-controller to communicate with the transmitter micro-controller to generate wireless charging spots over a plurality of receivers regardless of the obstacles surrounding the receivers for the predetermined selected range from the transmitter. Furthermore, in some embodiments, the micro-controllers for the transmitter and receiver locate, track or direct the pockets of energy over preselected range of hot spots by enabling a plurality of standard wireless communication protocols of Bluetooth, Wi-Fi, FM, or Zigbee. Furthermore, in some embodiments, the micro-controllers of the transmitter and receiver dynamically adjust pocket-forming over preselected ranges to regulate power on one or more targeted receivers. Furthermore, in some embodiments, the receiver and transmitter micro-controllers communicate to change frequencies and phase on one or more RF waves to form a unified waveform that describes pockets of energy and null-spaces along pocket-forming, where pockets of energy are available in certain predetermined areas where a constructive interference of the waves exist and such areas include one or more spots which move along pocket-forming trajectory and are contained within the wireless power range that include either a minimum or maximum range of wireless power transmission.

In some embodiments, the antennas operate in predetermined frequencies at generally 900 MHz, 2.4 GHz, and 5.7 GHz to transmit at least two RF waveforms to create a unified waveform for a preselected range for charging hot spots and null-space spots.

In some embodiments, the antennas operate in frequency bands of generally 900 MHz, 2.4 GHz, or 5.7 GHz bands.

In some embodiments, the electronic devices are various electronic equipment, smartphones, tablets, music players, computers, toys and others powered at the same time over selected ranges and restricted locations for each electronic device.

A method for wireless power transmission with selective range to power a portable electronic device may include: (i) generating pocket-forming RI waves from a transmitter through an antenna connected to the transmitter, (ii) accumulating pockets of energy in regions of space in the form of constructive interference patterns of the generated RF waves, and (iii) employing a selective range for charging or powering the electronic device in a predetermined variety of spots with the accumulated pockets of energy surrounded by null-spaces without accumulated pockets of energy.

In some embodiments, the method comprises intercepting the accumulated pockets of energy in regions of space by a receiver with an RF antenna connected to the portable electronic device.

In some embodiments, the method comprises implementing an adaptive power focusing to avoid obstacles interfering with the RF signals between the receiver and the transmitter for regulating two or more receivers providing charging or powering of the portable electronic device.

In some embodiments, the null-spaces are generated in the form of destructive interference patterns of the generated RF waves and the null-spaces are distributed in predetermined selective zones around the variety of spots.

In some embodiments, the employing the selective range increases control over electronic devices to receive charging by limiting the operation area of certain portable electronic devices to eliminate pockets of energy in sensitive areas including people or other equipment affected by pockets of energy.

In another system for wireless power transmission with selective range to power a portable electronic device, the system may include: (i) a transmitter comprising an antenna configured to transmit one or more power transmission waves and (ii) a micro-controller within the transmitter configured to control transmission of the power transmission waves. In some embodiments, the micro-controller: (i) generates a pocket of energy at a location relative to a receiver by transmitting the one or more power transmission waves to accumulate at the location relative to the receiver resulting from constructive interference patterns associated with accumulation of the one or more power transmission waves at the location and (ii) selects the location to generate the pocket of energy from a selective range of one or more predetermined locations for charging or powering the electronic device characterized by the accumulation of power transmissions signals resulting in one or more pockets of energy surrounded by a corresponding null-space.

In some embodiments, the null-spaces are generated in the form of destructive interference patterns of the generated power transmission waves and are distributed in one or more zones substantially adjacent to at least one pocket of energy from the one or more pockets of energy.

In some embodiments, each selected range of charging hot spots is surrounded by one or more null-spaces resulting from destructive interference patterns corresponding to the constructive interference patterns forming the pocket of energy at the hot spot and the one or more null-spaces inhibit formation of pockets of energy over and/or at one or more sensitive locations having people or sensitive equipment.

In some embodiments, the antennas operate in predetermined frequencies at ranges of about 900 MHz to about 5.7 GHz to transmit at least two power transmission waveforms to create a unified waveform for a preselected range for charging hot spots.

In another method for wireless power transmission with selective range to power a portable electronic device, the method may include: (i) transmitting, by a transmitter, the power transmission waves to converge at a predetermined location relative to a receiver, (ii) accumulating, by the transmitter, the power transmission waves at the location, thereby forming a constructive interference pattern at the location, where the constructive interference pattern establishes a pocket of energy, and (iii) establishing, by the transmitter, a selective range of one or more intervals of distance from the transmitter for one or more predetermined locations, where the transmitter establishes a pocket of energy at each respective predetermined location.

In some embodiments, the method comprises establishing, by the transmitter, the one or more pockets of energy in particular regions of space such that the pockets of energy are capable of being intercepted by a receiver with one or more antennas.

In some embodiments, the method comprises: (i) receiving, by the transmitter, from the receiver one or more communications signals containing data indicating the relative location of the receiver, one or more obstacles situated between the transmitter and the receiver, and indicating an amount of power received the receiver and (ii) responsive to receiving the one or more communications signals, automatically adjusting, by the transmitter, the power transmission waves to avoid the one or more obstacles situated between the receiver and the transmitter in accordance with the data of the one or more communications signals.

In some embodiments, the method comprises selecting, by the transmitter, a safer range at an interval of distance corresponding to a next predetermined location in the one or more predetermined locations to establish a respective pocket of energy, in response to receiving an instruction to avoid establishing one or more pockets of energy at at least one of the predetermined locations identified in the instruction as coinciding with one or more sensitive locations associated with people or sensitive equipment.

FIGS. 28-31 illustrate examples of wireless power transmission using a button to designate locations, in accordance with some embodiments.

Figure 28:
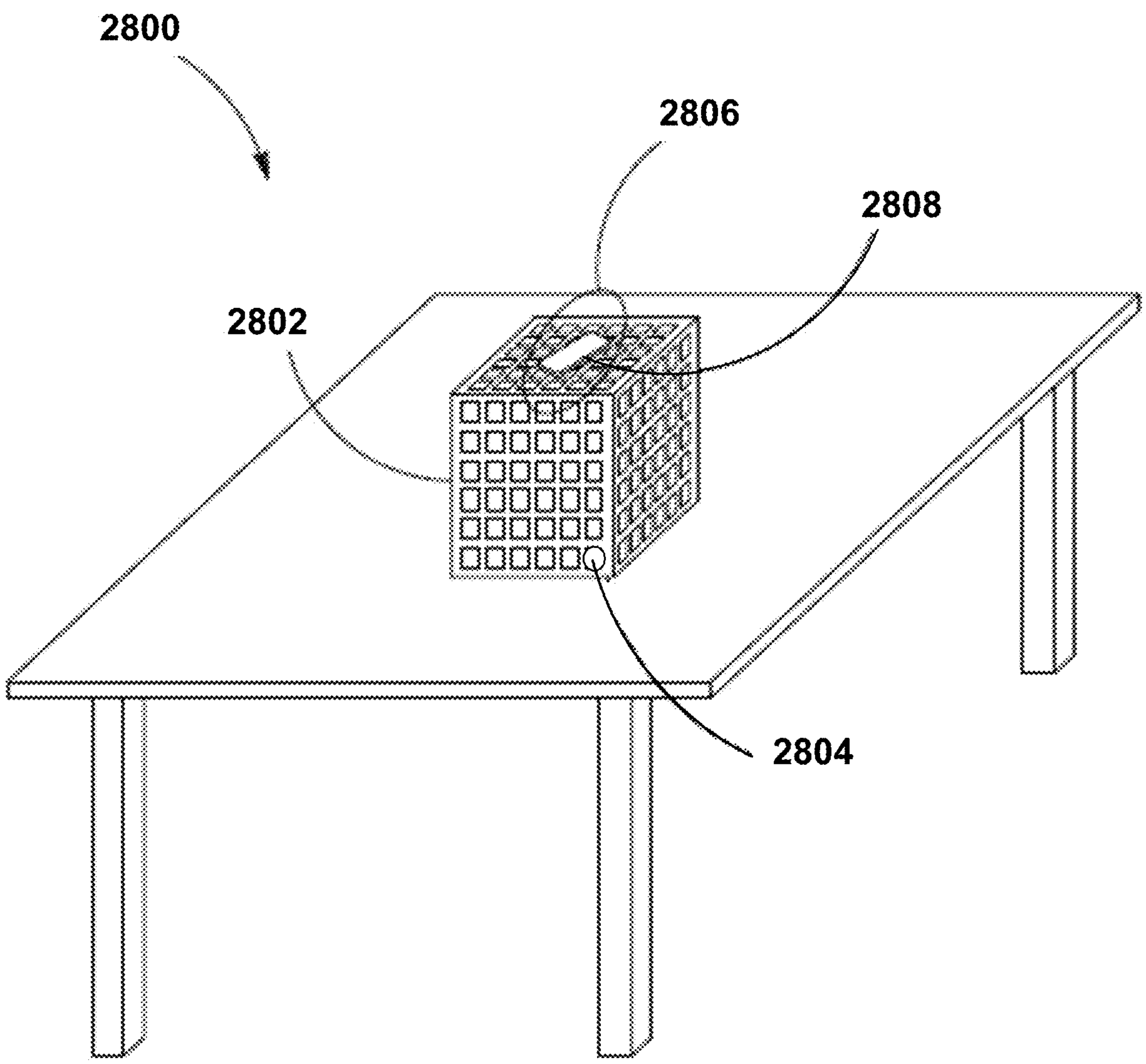
FIGS. 28 and 29 illustrate transmitters having buttons to create pockets of energy, in accordance with some embodiments.

FIG. 28 illustrates a wireless power transmission 2800 where a transmitter 2802 (e.g., transmitter 102, FIG. 1) may include a button 2804 which upon activation may create at least one pocket of energy 2806 in its top surface. A smartphone 2808 operatively coupled to a receiver (not shown), upon being placed atop such surface, may receive power wirelessly by utilizing the aforementioned pocket of energy 2806. This configuration for wireless power transmission 2800 can be beneficial whenever smartphone 2808 cannot communicate its location by to transmitter 2802, for example whenever smartphone 2808 runs out of power completely. In addition, smartphone 2808 may charge faster because of its proximity to transmitter 2802. An even further advantage of this configuration is that if the user decides to remove smartphone 2808 (after smartphone 2808 has built the minimum charge for establishing communication with transmitter 2802) form the surface of transmitter 2802, smartphone 2808 may still receive power wirelessly through (e.g., pocket-forming. Thus, the mobility of smartphone 2808 may not be compromised.

Figure 29:
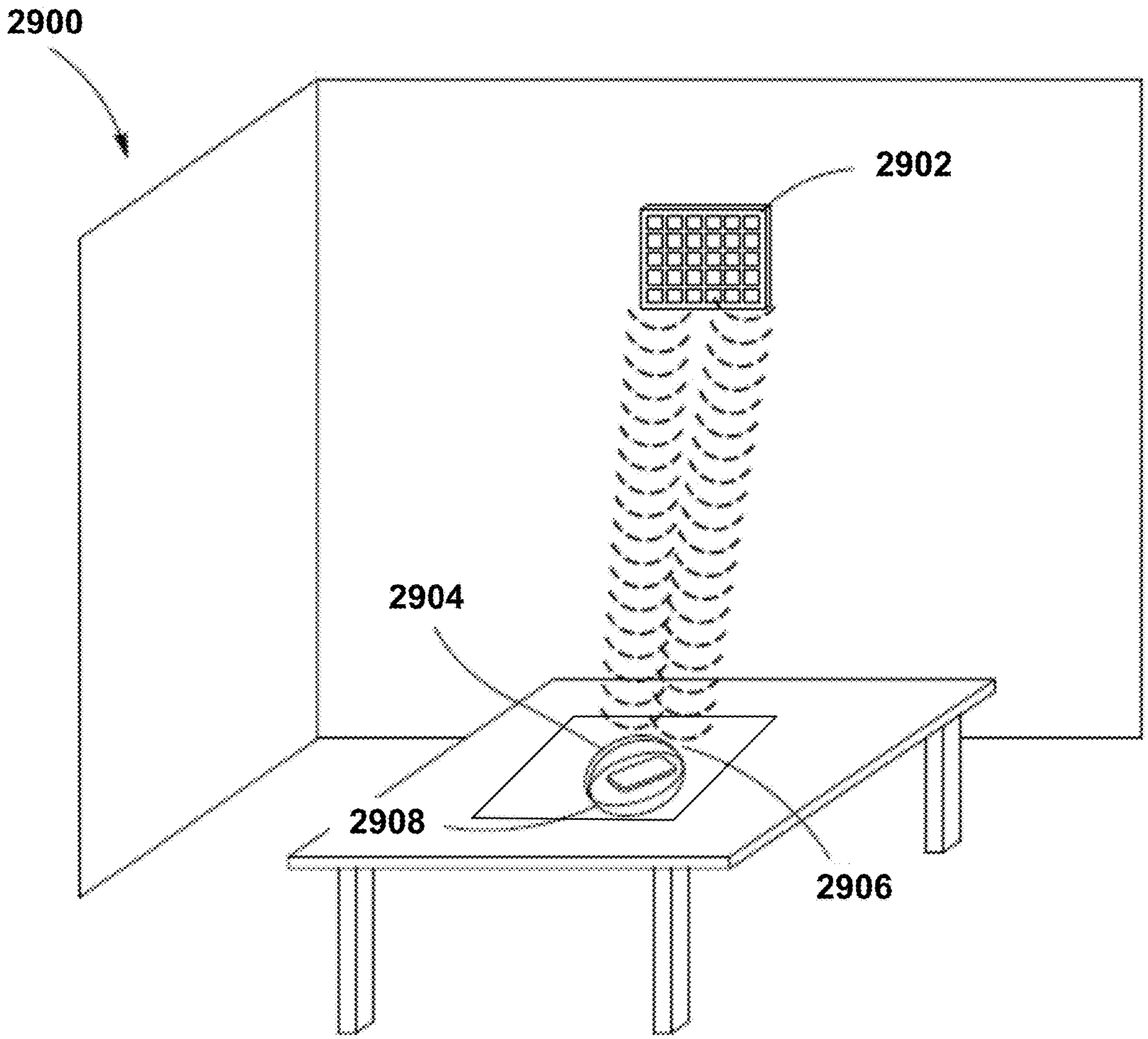

FIG. 29 illustrates an alternative configuration to wireless power transmission in the form of a wireless power transmission (WPT) 2900 where a transmitter 2902 (e.g., transmitter 102, FIG. 1) may create at least one pocket of energy 2904 on a portable mat 2906. Mat 2906 may include at least one receiver and at least one transmitter (not shown) for receiving wireless power from transmitter 2902 and re-transmitting such power, through pocket-forming, to a device, for example a smartphone 2908 operatively coupled to a receiver (not shown). In some embodiments, mat 2906 may communicate to transmitter 2902 through short RF signals sent through its antenna elements or via standard communications protocol. The foregoing may allow transmitter 2902 to easily locate mat 2906. The disclosed configuration may be beneficial whenever smartphone 2908 may not be able to communicate directly to transmitter 2902. This configuration may also be beneficial because mat 2906 can be placed virtually in any desirable and easy to reach location. Lastly, transmitter 2902 may include a button (not shown) similar to that of transmitter 2802 which upon activation may produce pocket of energy 2904 upon mat 2906. The duration of pocket of energy 2904 upon mat 2906 can be custom defined to suit the needs of various users. An even further advantage of WPT can be that other devices may be placed in the vicinity of mat 2906 and can too receive power wirelessly, i.e. electronic devices requiring charge may not even be required to be placed upon mat 2906.

Figure 30B:
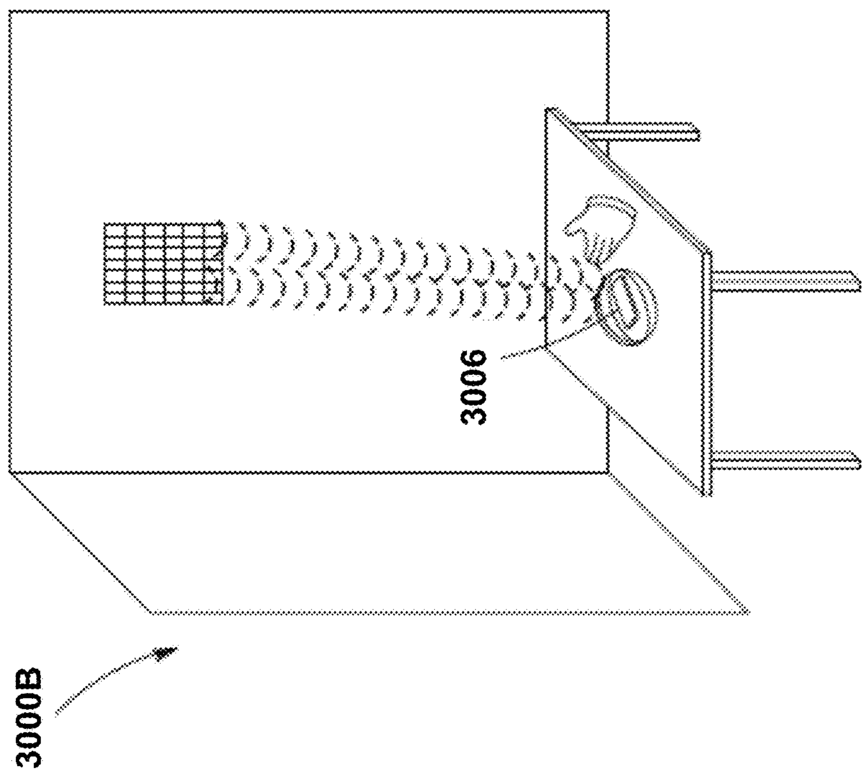
FIGS. 30A, 30B, and 31 illustrate a tracer used for establishing locations of pockets of energy, in accordance with some embodiments.
Figure 30A:
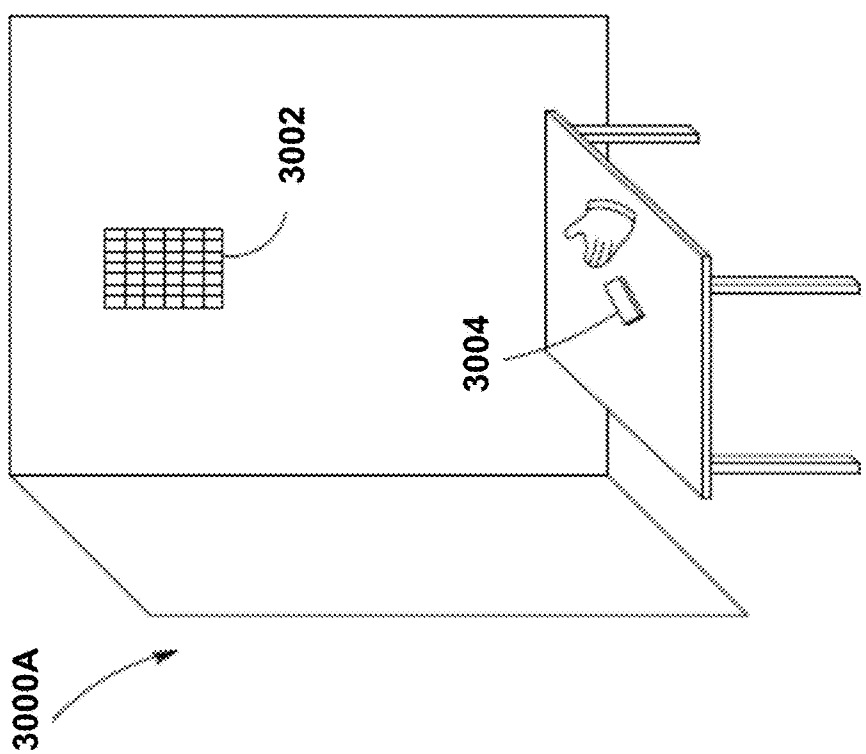

FIG. 30A depicts a wireless power transmission 3000A. Referring first to FIG. 30A, a smartphone 3004 operatively coupled to a receiver (not shown) may be out of usable power and may not be able to communicate with a transmitter 3002 (e.g., transmitter 102, FIG. 1). In this embodiment, a tracer can be used to communicate to transmitter 3002 the locations at which power should be delivered. Tracer can include a communications component within it (not shown), as those described above for transmitters and receivers, for communicating the foregoing locations to the transmitter 3002. Such communications component may become active at the user's request. For example, tracer can include an activation button (not shown) which after being pressed may activate the aforementioned communications component.

FIG. 30B illustrates a wireless power transmission including a tracer which may serve for establishing desired locations for the generation of pockets of energy over at least one receiving device, according to an exemplary embodiment.

Following this activation, communications component may send a request to transmitter 3002 for creating a pocket of energy 3006 at the location of tracer. In order to charge smartphone 3004, users may activate tracer at the same or approximate location of smartphone 3004. Upon building the necessary charge, smartphone 3004 may optionally communicate its location to transmitter 3002 (by its own means) to continue the wireless delivery of power. In other embodiments, pockets of energy 3006 can be created at areas or regions of space which may be beneficial or easy to reach for users but where no electronic devices may be present. In this case, electronic devices requiring charge such as smartphone 3004 can be moved to the foregoing locations for utilizing pockets of energy 3006. The duration of pockets of energy 3006, at the absence of electronic devices requiring charge, may be custom defined by users. In some other embodiments, the duration of pockets of energy 3006 can be given by the operation of tracer, for example, at least one pocket of energy 3006 can be generated upon activating tracer. Such pocket of energy 3006 may remain active until a second press of the activation button of tracer.

In the foregoing configuration of wireless power transmission, electronic devices such as smartphone 3004 can utilize smaller and cheaper receivers. The foregoing can be accomplished because receivers may not require a communications component on their own for communicating locations to transmitter 3002. Rather, tracer can be used to perform such function. In some other embodiments, tracer can take the form of accessories which may connect to electronic via connections such as Universal Serial Bus (USB). In this case, tracer may become active upon being connected to a device, and may control the totality of the wireless delivery of power. In some embodiments, users may create as many pockets of energy 3006 as devices requiring charge.

Figure 31:
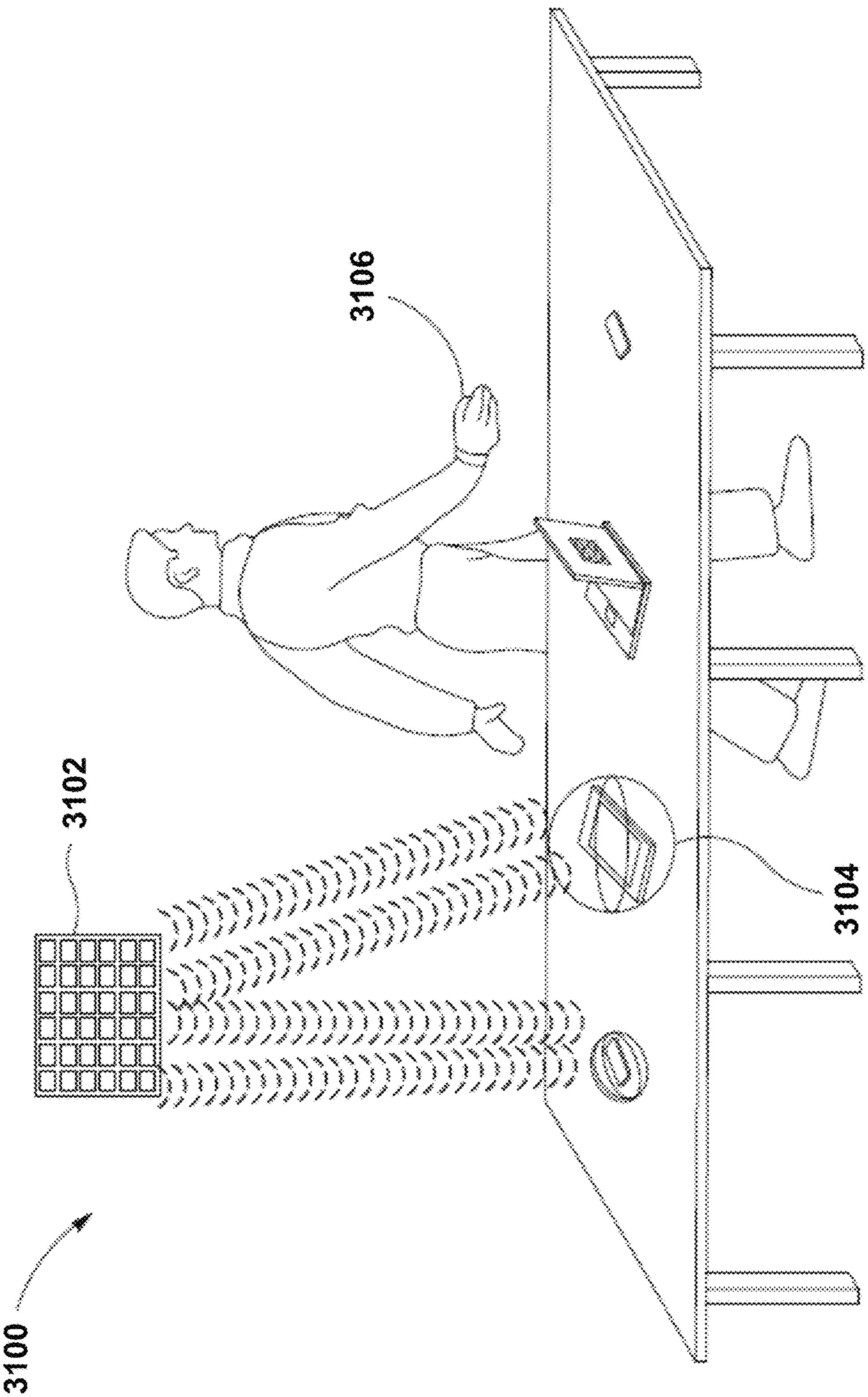

FIG. 31 illustrates a wireless power transmission 3100 where a user carrying a tracer 3106 may create various pockets of energy 3104 in different locations for powering various electronic devices which may include receivers for pocket-forming. Pockets of energy 3104 may be formed by a transmitter 3102, at the request and locations the user specifies. In addition, once devices build up charge they may optionally communicate their location to transmitter 3102 (by their own means) to continue the wireless delivery of power.

FIGS. 28-31 illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 28-31.

Presented below are example apparatuses and methods for wireless powering of an electronic device using a button to designate locations.

An apparatus for wireless powering of an electronic device may include: (i) a pocket-forming transmitter for transmitting controlled power RF waves to form pockets of energy in 3-dimensional space to charge the electronic device and (ii) a receiver connected to the electronic device or in close proximity to the electronic device for capturing the pockets of energy to charge or power the electronic device when the electronic device is unable to communicate with the transmitter due to a low battery power level.

In some embodiments, the apparatus comprises a tracer used to communicate with the transmitter to send pockets of energy near the tracer location to charge the electronic device in close proximity to the tracer location when activated. Furthermore, in some embodiments, the tracer when activated directs a predetermined number of pockets of energy to several locations in the vicinity of the tracer to charge multiple electronic devices at the same time for a predetermined time related to the activation of the tracer. Furthermore, in some embodiments, the tracer comprises an activation switch to begin communication with the transmitter to continue sending pockets of energy to the location of the tracer for a predetermined amount of time or until the switch is activated again causing the pockets of energy from the transmitter to cease. Furthermore, in some embodiments, the activation of the tracer provides signals to the transmitter to send a predetermined number of pockets of energy to different locations for powering multiple electronic devices or receivers configured for pocket-forming to power other electronic devices in proximity to the receivers.

In some embodiments, the apparatus comprises a portable mat having both a transmitter and receiver for communicating with the transmitter to receive pockets of energy for re-transmitting power to the electronic device placed on the mat or in close proximity thereto until the electronic device reaches a predetermined power level to communicate directly with the transmitter to continue receiving power even after moving away from the mat. Furthermore, in some embodiments, the mat communicates to the transmitter through short RF signals sent through antenna elements within the mat. Furthermore, in some embodiments, the apparatus utilizes adaptive pocket-forming to regulate the pockets of energy to power the mat for re-transmitting power to electronic devices on or in proximity to the mat that are low on power and unable to communicate directly with the transmitter to receive a charge.

In some embodiments, the receiver captures the pockets of energy to charge or power the electronic device connected to the receiver or in the immediate vicinity of the receiver.

In some embodiments, the transmitter is a portable block configuration that comprises an activation button to create at least one pocket of energy on a top surface of the transmitter to power the electronic device placed on the top surface or in proximity to the transmitter when the electronic device is too low on battery power to communicate directly with the transmitter.

In some embodiments, the electronic device is charged to a predetermined level to establish communication with the transmitter for continuing to receive power from the transmitter through pocket-forming when moved away from the proximity of the transmitter.

A method for wireless powering of an electronic device may include: (i) transmitting controlled radio frequency waves from a pocket-forming transmitter to converge pockets of energy in 3-dimensional space and (ii) capturing the pockets of energy in a receiver to charge or power the electronic device connected to the receiver or in the immediate vicinity of the receiver.

In some embodiments, the method comprises coupling a receiver of the electronic device out of usable power to communicate with the transmitter through use of a tracer communicating with the transmitter to send pockets of energy to the location of the tracer whereupon the electronic device near the location of the tracer is charged until a predetermined power level is reached allowing direct communication between the electronic device and the transmitter to continue the charging.

Figure 32:
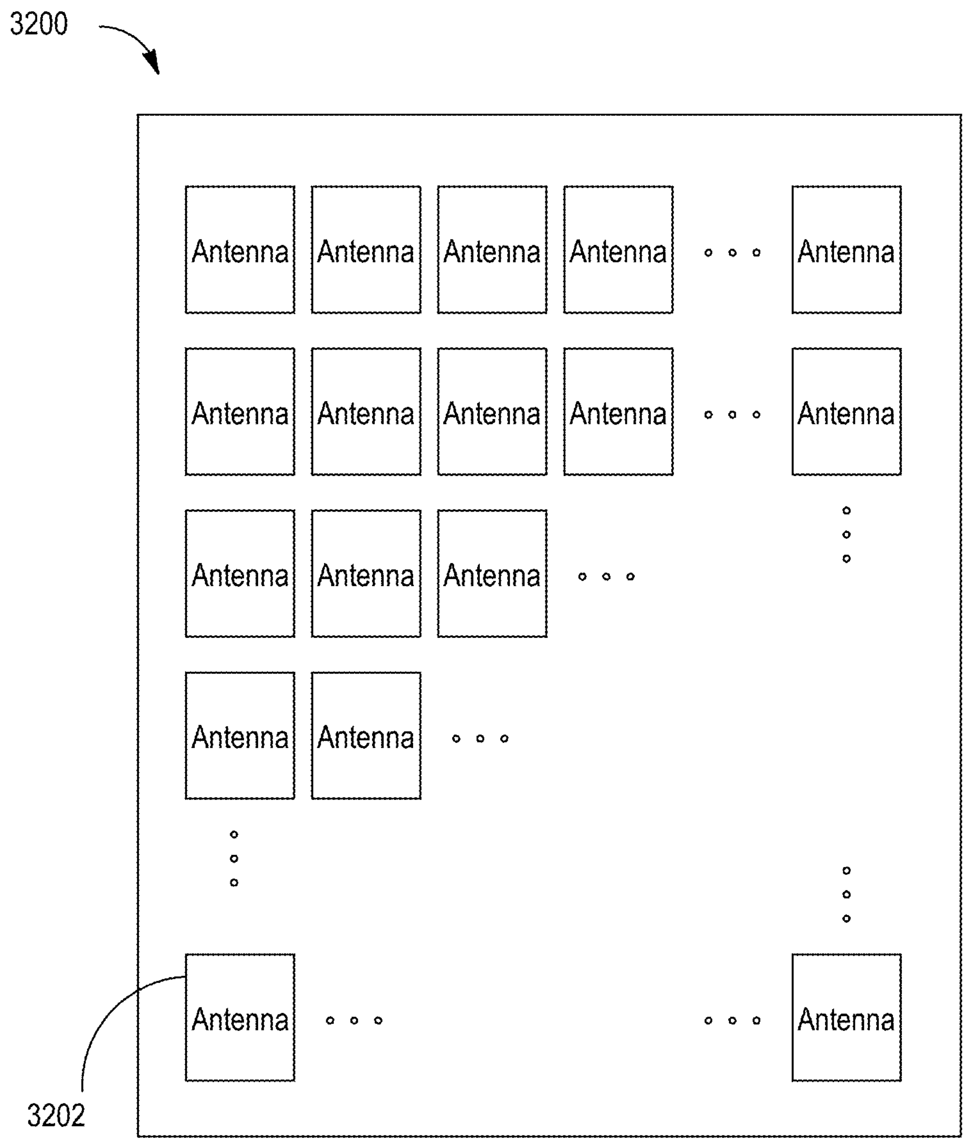
FIG. 32 is an exemplary illustration of a flat panel antenna array that may be used in a transmitter, in accordance with some embodiments.

FIGS. 32 and 33 illustrate examples of wireless power transmission antenna arrays, in accordance with some embodiments.

FIG. 32 is an exemplary illustration of a flat panel antenna array 3200 that may be used in transmitter 102, described in FIG. 1. Flat panel antenna array 3200 may then include an N number of antenna elements 3202 where gain requirements for power transmitting may be from 64 to 256 antenna elements 3202 which may be distributed in an equally spaced grid. In one embodiment, flat panel antenna array 3200 may have an 8×8 grid to have a total of 64 antenna elements 3202. In another embodiment, flat panel antenna array 3200 may have a 16×16 grid to have a total of 256 antenna elements 3200. However, the number of antenna elements 3200 may vary in relation with the desired range and power transmission capability on transmitter 102, the more antenna elements 3202, the wider range and higher power transmission capability. Alternate configurations may also be possible including circular patterns or polygon arrangements.

Flat panel antenna array 3200 may also be broken into numerous pieces and distributed across multiple surfaces (multi-faceted).

Antenna elements 3202 may include flat antenna elements 3202, patch antenna elements 3202, dipole antenna elements 3202 and any suitable antenna for wireless power transmission. Suitable antenna types may include, for example, patch antennas with heights from about ½ inch to about 6 inches and widths from about ½ inch to about 6 inches. Shape and orientation of antenna elements 3202 may vary in dependency of the desired features of transmitter 102 orientation may be flat in X, Y, and Z axis, as well as various orientation types and combinations in three dimensional arrangements. Antenna elements 3202 materials may include any suitable material that may allow radio signal transmission with high efficiency, good heat dissipation and the like.

Antenna elements 3202 may include suitable antenna types for operating in frequency bands such as 900 MHz, 2.5 GHz or 5.8 GHz as these frequency bands conform to Federal Communications Commission (FCC) regulations part 18 (Industrial, Scientific and Medical equipment). Antenna elements 202 may operate in independent frequencies, allowing a multichannel operation of pocket-forming.

In addition, antenna elements 3202 may have at least one polarization or a selection of polarizations. Such polarization may include vertical pole, horizontal pole, circularly polarized, left hand polarized, right hand polarized, or a combination of polarizations. The selection of polarizations may vary in dependency of transmitter 102 characteristics. In addition, antenna elements 3202 may be located in various surfaces of transmitter 200.

Antenna elements 3202 may operate in single array, pair array, quad array and any other suitable arrangement, which may be designed in accordance with the desired application.

Figure 33A:
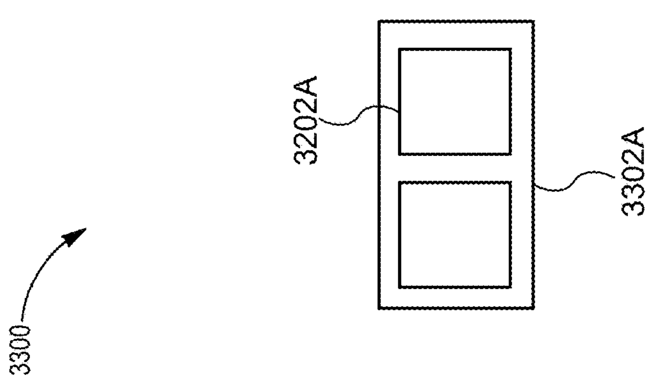
FIGS. 33A-33C show various antenna arrays, in accordance with some embodiments.
Figure 33B:
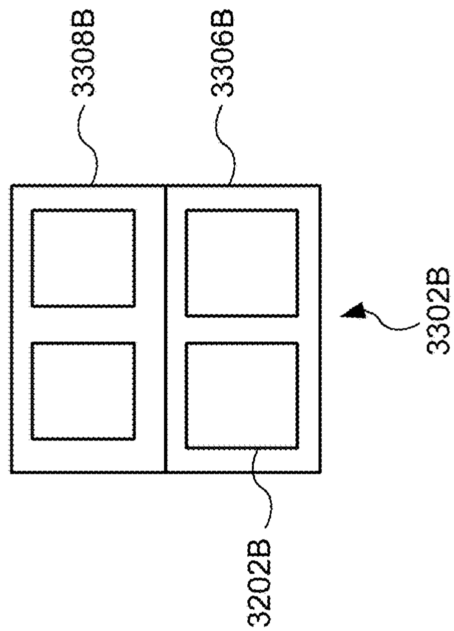
Figure 33C:
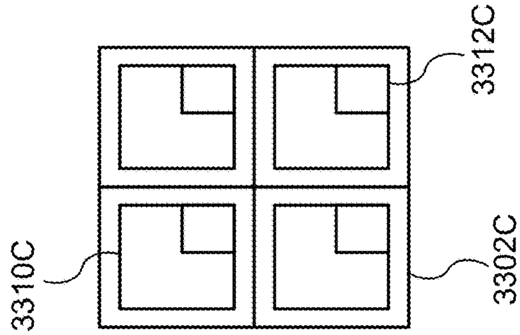

FIGS. 33A-33C shows antenna arrays 3300 according to various embodiments. Antenna arrays 3300 may include suitable antenna types for operating in frequency bands such as 900 MHz, 2.5 GHz, and 5.8 GHz, as these frequency bands may comply with the FCC regulations, part 18.

FIG. 33A shows a single array 3302A where all antenna elements 3302 may operate at 5.8 GHz. Thus single array 3302A may be used for charging or powering a single device, similar to the embodiment described in FIG. 1. FIG. 33B shows pair array 3302B, where the top half 3308B of antenna elements 3202B may operate at 5.8 GHz and the bottom half 3306B may operate at 2.4 GHz. Pair array 3302B may then be used to charge or power, at the same time, two receivers that may operate at different frequency bands such as the ones described above. As seen in FIG. 33B, antenna elements 3202B may vary in size according to the antenna type.

FIG. 33C shows a quad array 3302C where each antenna element 3202 may be virtually divided to avoid power losses during wireless power transmission. In this embodiment, each antenna element 3202 may be virtually divided in two antenna elements 3202, antenna element 3310C and antenna element 3312C. Antenna element 3310C may be used for transmitting in 5.8 GHz frequency band and antenna element 3312C may be used for transmitting in 2.4 GHz frequency band. Quad array 3302C may then be used in situations where multiple receivers 106 operating at different frequency bands require to be charged or powered.

In example #1 a portable electronic device that may operate at 2.4 GHz may be powered or charged. In this example, a transmitter 102, may be used to deliver pockets of energy onto one electronic device, as in FIG. 1. This transmitter may have a single array of 8×8 of flat panel antennas where all the antenna elements may operate in the frequency band of 2.4 GHz. Flat antennas may occupy less volume than other antennas, hence allowing a transmitter to be located at small and thin spaces, such as, walls, mirrors, doors, ceilings and the like. In addition, flat panel antennas may be optimized for operating to long distances into narrow hall of wireless power transmission, such feature may allow operation of portable devices in long areas such as, train stations, bus stations, airports and the like. Furthermore, flat panel antennas of 8λ8 may generate smaller pockets of energy than other antennas since its smaller volume, this may reduce losses and may allow more accurate generation of pockets of energy, such accuracy may be employed for charging/powering a variety of portable electronic devices near areas and/or objects which do not require pockets of energy near or over them.

In example #2 two electronic devices that may operate at two different frequency bands may be powered or charged at the same time. In this example, the transmitter 102, may be used to deliver pockets of energy onto two electronic devices. In this example, the transmitter may have a pair array with different type of antennas, flat panel antennas and dipole antennas, where ½ of the array may be formed by flat panel antennas and the other half by dipole antennas, as shown in FIG. 33B. As described in example #1, flat panel antennas may be optimized to radiate power within narrow halls at considerable distances. On the other hand, dipole antennas may be employed for radiating power at nearer distances but covering more area because of their radiation pattern. Furthermore, dipole antennas may be manually adjusted, this feature may be beneficial when the transmitter is located at crowded spaces and transmission needs to be optimized.

FIGS. 32 and 33 illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 32 and 33.

Presented below are example systems and methods for transmitting wireless power using antenna arrays.

A system for transmitting wireless power may include: (i) a transmitter for generating two or more RF waves having at least two RF transmit antennas to form controlled constructive interference patterns from the generated RF waves, (ii) a micro-controller within the transmitter controlling the constructive interference patterns of generated RF waves for pocket-forming to accumulate pockets of energy in predetermined areas or regions in space, (iii) a receiver with at least one antenna to receive the accumulated pockets of energy converging in 3-dimensional space to a targeted electronic device, and (iv) a communication network connected to the transmitter and receiver for determining the areas or regions in space to receive the pockets of energy from the transmitter through an array of antennas for charging or operating the targeted electronic device.

In some embodiments, the transmitter generates RF waves to form controlled destructive interference patterns that form null-spaces without pockets of energy and the array of antennas is an 8×8 grid having a total of 64 antenna elements distributed in an equally spaced grid.

In some embodiments, the array of antennas is a 16×16 having a total of 256 antenna elements distributed in an equally spaced grid.

In some embodiments, the number of antennas varies depending upon the predetermined range and power transmission.

In some embodiments, an antenna arrangement includes circular patterns or polygon configurations for charging or operating a plurality of electronic devices.

In some embodiments, the antennas operate in a frequency band of at least one of about 900 MHz, about 2.5 GHz, and about 5.8 GHz.

In some embodiments, the antennas have at least one polarization or a polarization including a vertical pole, horizontal pole, a circularly polarized, left hand polarized, right hand polarized or a combination of polarizations.

In some embodiments, the antennas operate in at least one of a single array, pair array, quad array or any other suitable array arrangement for transmission of pockets of energy.

In some embodiments, the antennas are arranged in a pair array where the top half of the antennas operates at 5.8 GHz and the bottom half of the array operates at 2.4 GHz and at least one of such operation is driven by the transmitter and controlled by the micro-controller.

In some embodiments, the micro-controller dynamically adjusts the pocket-forming through a predetermined antenna array to regulate power on one or more targeted electronic devices.

In another system for transmitting wireless power, the system may include: (i) a transmitter having two RF antennas in an array for generating pockets of energy, (ii) a receiver electrically connected to at least one electronic device for receiving the pockets of energy, and (iii) a micro-controller connected to a power source for controlling the generated pockets of energy delivered to the electronic device from a predetermined array of antennas.

In some embodiments, the generated pockets of energy are received by a plurality of electronic devices at a higher efficiency due to antenna array orientation on the transmitter and receiver directed by the microcontroller in response to a communication signal from the receiver.

In some embodiments, the system further includes a radio frequency integrated circuit driven by a predetermined program in the micro-controller for pocket-forming to charge or operate the electronic device through an antenna array including an N number of antenna elements in the range of 64 to 256 antenna elements distributed in an equally spaced grid on the transmitter.

A method for transmitting wireless power may include: (i) generating two or more RF waves from a transmitter with at least two RF transmit antennas, (ii) forming controlled constructive and destructive interference patterns from the generated RF waves by a radio frequency integrated circuit controlled by a microcontroller, (iii) accumulating energy or power in the form of constructive interference patterns from the RF waves to form pockets of energy, (iv) converging the pockets of energy in 3-dimensional space to a targeted electronic device, and (v) arranging the antennas in an array optimal for charging or operating the targeted electronic device with the pockets of energy.

In some embodiments, the number and type of antennas varies in relationship to a predetermined desired range and power transmission capability of the transmitter whereby the greater the number of antennas results in a wider range and a higher power delivery of pockets of energy to the targeted electronic device.

In some embodiments, the antennas are flat antennas, patch antennas, dipole antennas or any other antennas configured for transmission of pockets of energy.

In another system for transmitting wireless power, the system may include: (i) a first device comprising a controller, a transmitter coupled to the controller, and a plurality of antennas coupled to the transmitter, where the antennas output a plurality of RF waves so a controlled constructive interference pattern is formed based on the waves, and where the controller controls the pattern so a pocket of energy is formed in a first defined area, (ii) a second device comprising a receiver and an antenna coupled to the receiver, where the second device is charged via the antenna engaging the pocket based on the second device being positioned in the area, and (iii) a computer communicating with the first device and the second device so the computer is able to determine the area.

In some embodiments, an orientation of the array is optimized for maximum efficiency and the controller controls the second device in response to receiving a signal from the second device. Furthermore, in some embodiments, the first device comprises a flat panel antenna array comprising a number of antennas where a gain requirement for power transmission ranges from 64 to 256 antennas distributed in an equally spaced grid for enhancing reception of the pocket of energy by the second device.

In some embodiments, a number of the antennas are optimized for at least one of a transmission range and a transmission power.

In some embodiments, at least one of a number and a type of antennas in the array corresponds to at least one of a predetermined desired range and a power transmission capability of the first device so an increase in a value of the number corresponds to at least one of a wider range and a higher power delivery associated with the pocket.

In another system for transmitting wireless power, the system may include a first device comprising a controller, a transmitter coupled to the controller, and a plurality of RF antennas coupled to the transmitter, where the antennas are arranged in an array, and where the controller controls the transmitter so the antennas generate a pocket of energy so a second device is able to be charged via the pocket based on the second device being positioned in proximity of the pocket.

In another method for transmitting wireless power, the method may include: (i) forming, by a first device, a constructive interference pattern based on a plurality of RF waves output via the first device, where the first device comprises a transmitter and an antenna coupled to the transmitter and (ii) defining, by the first device, a pocket of energy based on the constructive pattern so a second device is able to be charged via the pocket based on the second device being positioned in proximity of the pocket.

Figure 34:
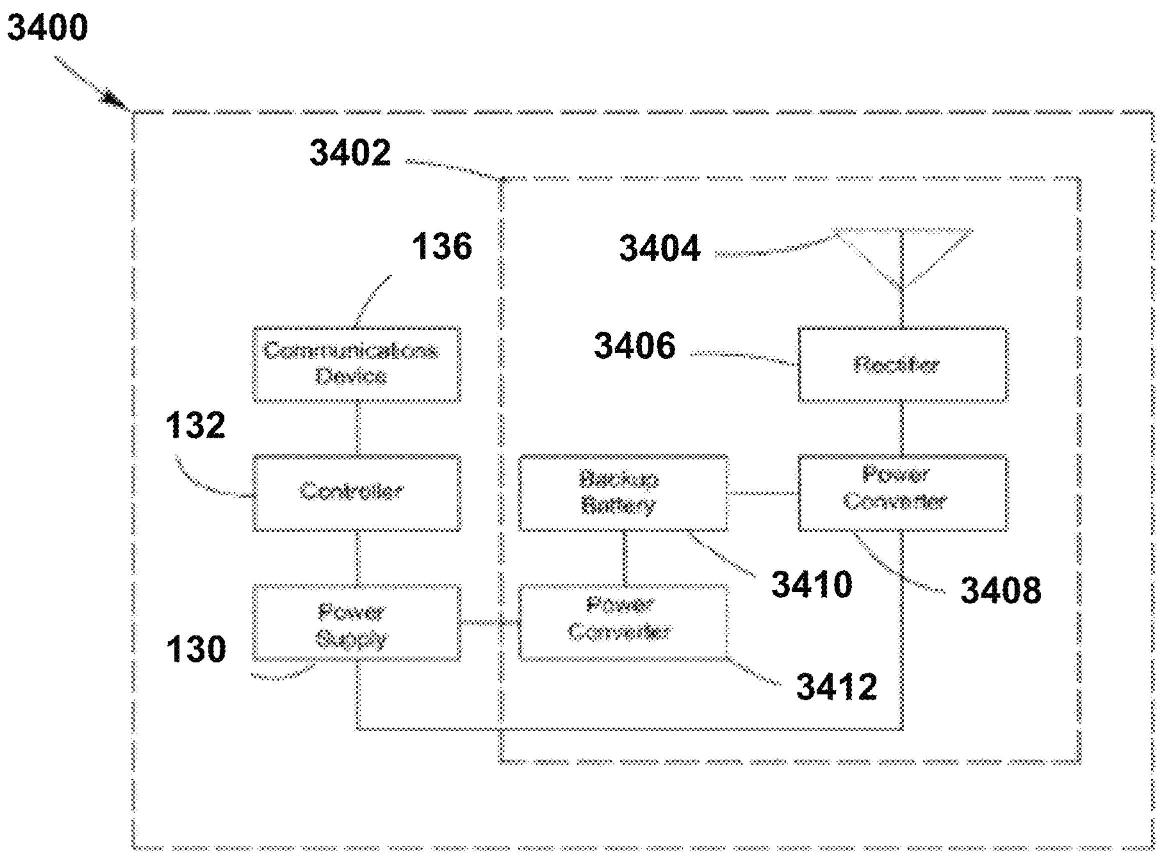
FIG. 34 illustrates an electronic device including at least one embedded receiver that contains a backup battery, in accordance with some embodiments.

FIGS. 34 and 35 illustrate systems for wireless transmission of power to a portable electronic device having a backup battery, in accordance with some embodiments.

FIG. 34 illustrates an electronic device 3400, similar to electronic device 122 described in FIG. 1. Electronic device 3400 may include at least one embedded receiver 3402, that may have a backup battery 3410 as an additional feature compared to the receiver 120 described in FIG. 1. Embedded receiver 3402, may also include a subset of antenna elements 3404 for converting pockets of energy, produced through pocket-forming, into AC voltage, at least one rectifier 3406 where AC voltage may be converted to direct current (DC) voltage, and at least one power converter 3408 for providing constant DC voltage output to either a backup battery 3410 or to power supply 130.

In this embodiment, backup battery 3410 may be an additional source of energy for electronic device 3400 and may be any suitable battery that provides enough voltage to power or charge electronic device 3400. Backup battery 3410 may also require a power converter 3412 to deliver DC voltage to power supply 130. Backup battery 3410 may be charged while embedded receiver 3402 is capturing pockets of energy from the transmitter to which is connected. In other embodiments, power converter 3408 may pass DC voltage directly to power supply 130 without charging backup battery 3410. In yet another embodiment power converter 3408 may pass DC voltage to both power supply 130 and backup battery 3410 at the same time. Power supply 130 may constantly provide DC voltage to micro-controller 132 and communications device 136 as long as it does not run out of charge or power from embedded receiver 3402.

Figure 35A:
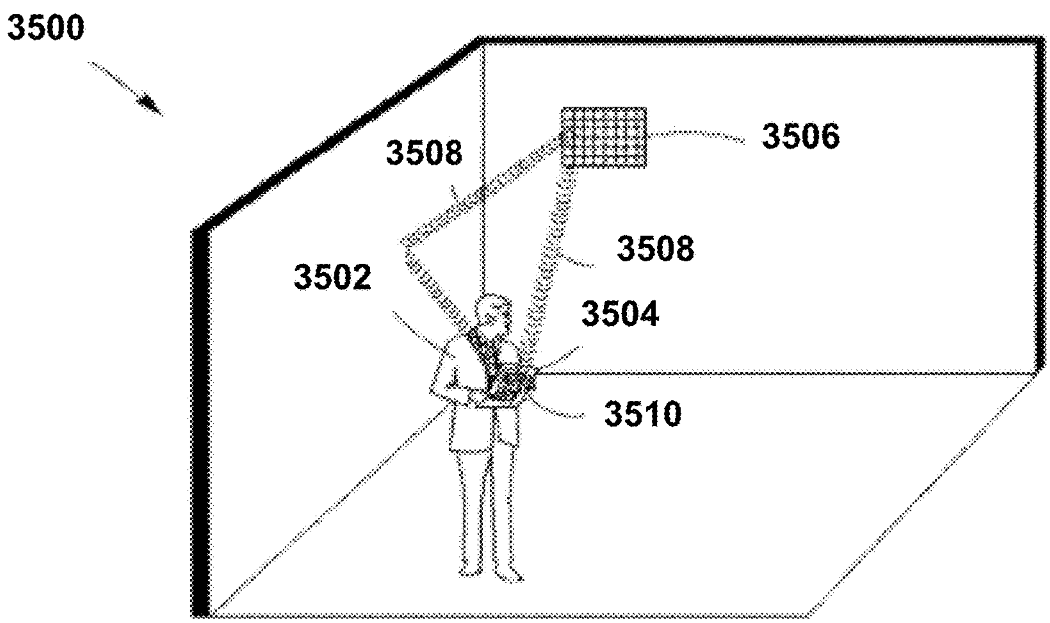
FIGS. 35A and 35B show examples where wireless power transmission may or may not occur, in accordance with some embodiments.
Figure 35B:
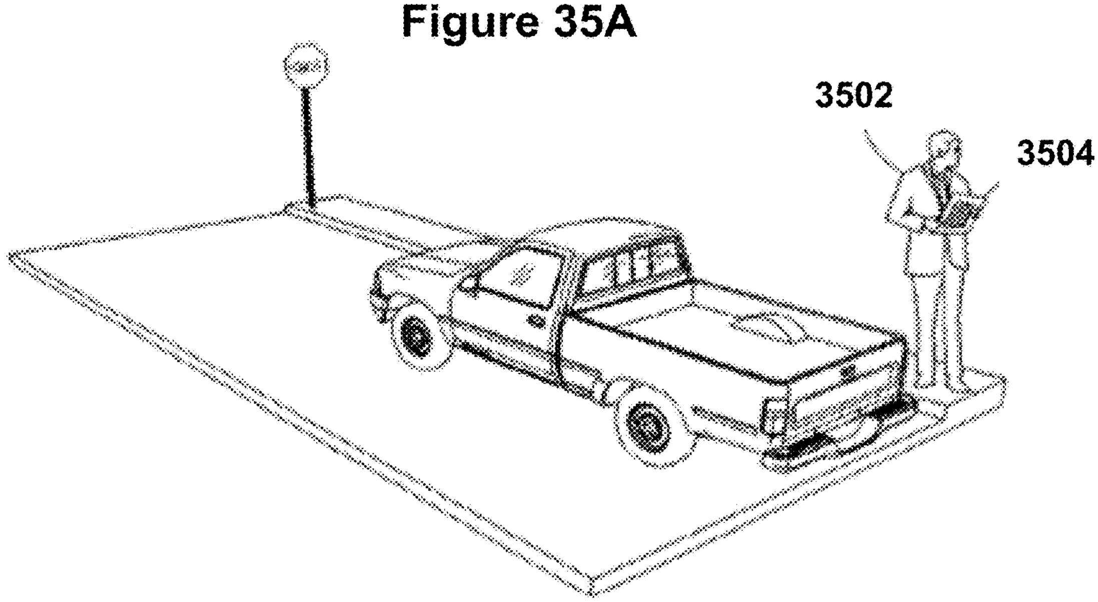

FIGS. 35A and 35B illustrate two embodiments where wireless power transmission 3500 may or may not occur. In FIG. 35A, a user 3502 may be inside a room and may hold on his hands an electronic device, which in this case, may be a tablet 3504. Tablet 3504 may include a receiver (not shown) either embedded to it or as a separate adapter connected to tablet 3504. The receiver embedded or connected to tablet 3504 may be as the one described in FIG. 34, hence including an additional feature such as a backup battery (not shown). The backup battery included in the receiver may be fully or partially charged while wireless power transmission takes place. FIG. 35A also shows a transmitter 3506, as the one described in FIG. 1. Transmitter 3506 may transmit controlled RF waves 3508 which may converge in 3-dimensional space and deliver pockets of energy 3510 to the receiver. In this embodiment, the receiver may either power tablet 3504 directly or charge backup battery first and then power tablet 3504.

FIG. 35B shows an example where wireless power transmission may not occur. In this embodiment, user 3502 may be found outdoors walking down the sidewalk where transmitter 3506 may not be available, and hence no wireless power transmission may occur. However, tablet 3504 may still have an extra source of power (backup battery 3410) included as an internal part of the receiver. As described in FIG. 35A, backup battery 3410 may have been charged while transmitter 3506 was available. Tablet 3504 may then use the available power from the backup battery 3410 in the receiver when power supply 130 (tablet 3504's battery) runs out. Thus, power supply 130 life can be greatly increased.

FIGS. 34 and 35 illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 34 and 35.

Presented below are example hybrid receivers and hybrid charging methods for wireless transmission of power to a portable electronic device having a backup battery.

A hybrid receiver for wireless transmission of power to a portable electronic device may include: (i) an antenna for receiving pockets of energy formed from constructive interference patterns of RF waves from a transmitter and for transforming the pockets of energy into AC voltage, (ii) a rectifier connected to the antenna for converting the AC voltage into DC voltage, (iii) a power converter for changing the DC voltage into a constant DC voltage, (iv) a power source within the portable electronic device connected to the power converter for receiving the constant DC voltage to power or charge the power source, and (v) a backup battery connected to the power converter for receiving the constant DC voltage to power or charge the backup battery.

In some embodiments, the hybrid receiver communicates with the transmitter through short RF waves or pilot signals sent through the antenna.

In some embodiments, the power source is a rechargeable or disposable lithium-ion battery.

In some embodiments, the hybrid receiver is embedded in the portable electronic device.

In some embodiments, the power converter powers the electronic device directly or charges the backup battery first and then powers the electronic device.

In some embodiments, the hybrid receiver and transmitter each comprises a controller connected to a communication device for communications between the hybrid receiver and the transmitter to control the power received by the backup battery or the power source. Furthermore, in some embodiments, the hybrid receiver and transmitter controllers are a digital signal processor, a microprocessor, or an ASIC.

In some embodiments, backup battery and power source status information control the power delivered to the backup battery or the power source.

In some embodiments, the power converter is directly connected between the backup battery and the power source of the hybrid receiver.

In some embodiments, the backup battery is connected to the power source of the receiver.

In some embodiments, the hybrid receiver implements externally the connection of the hybrid receiver to the portable electronic device in the configuration of a case. Furthermore, in some embodiments, the hybrid receiver connects the case to the electronic device through a universal serial bus or electrical plug.

In some embodiments, the power converter of the hybrid receiver is connected to the power source and to the backup battery for maintaining the power levels for charging the power source and backup battery for continuous use without total loss of power during continuous operation of the electronic device.

In some embodiments, the power converter of the hybrid receiver comprises two power converters, one connected to the backup battery and the power source and the other connected between the backup battery and the power source to regulate the constant direct current voltage to operate the portable electronic device.

In some embodiments, the power converter powers simultaneously the backup battery and the power source.

In some embodiments, the hybrid receiver communicates power status of the backup battery and power source to the transmitter and a transmitter DSP through a RF integrated circuit that controls the phases and amplitudes of the power RF signals in each transmitter antenna in order to generate the desired pocket-forming to power the backup battery and power source.

A hybrid charging method for wireless transmission of power to a portable electronic device may include: (i) connecting a hybrid receiver to an internal power source and a backup battery, (ii) receiving pockets of energy comprised of power RF signals at receiver antenna elements to produce an AC voltage from a RF circuit connected to a transmitter, (iii) rectifying the AC voltage to a direct current voltage, (iv) converting the direct current voltage to a constant direct current voltage output, and (v) providing the constant direct current voltage output to power either or both the backup battery and the internal power source of the hybrid receiver.

In some embodiments, the method comprises transmitting simultaneously both Wi-Fi signals and power RF signals from the transmitter to the receiver.

In another hybrid charging method for wireless transmission of power to a portable electronic device, the method may include: (i) supplying RF power signals to a hybrid receiver comprising antenna elements, a DSP, a rectifier, a power converter, a backup battery, a power supply and a communications device, (ii) generating the RF power signals through a RF integrated chip controlled by a DSP in a transmitter with a communication device controlled by the DSP, (iii) communicating the power status of the backup battery and power supply of the receiver to the transmitter through the transmitter and receiver communication devices on short RF signals with standard wireless communication protocols, and (iv) transmitting the power RF signals to the antenna elements of the hybrid receiver for rectifying the AC voltage at the antenna elements into a direct current voltage and converting the direct current voltage into a constant direct current voltage for powering the backup battery and the power source of the receiver.

In some embodiments, the method comprises: (i) decoding the short RF signals to identify the gain and phase of the receiver to determine the direction of the receiver, (ii) transmitting pockets of energy consisting of power RF signals from the transmitter through at least two RF antennas in the transmitter to the antenna elements of the receiver, and (iii) running continuously the portable electronic device with either the power source or the backup battery while charging either the backup battery or the power source to provide an inexhaustible source of operating power for the electronic device.

FIGS. 36-41 illustrate wireless power transmission environments utilizing reflectors, in accordance with some embodiments.

Figure 36:
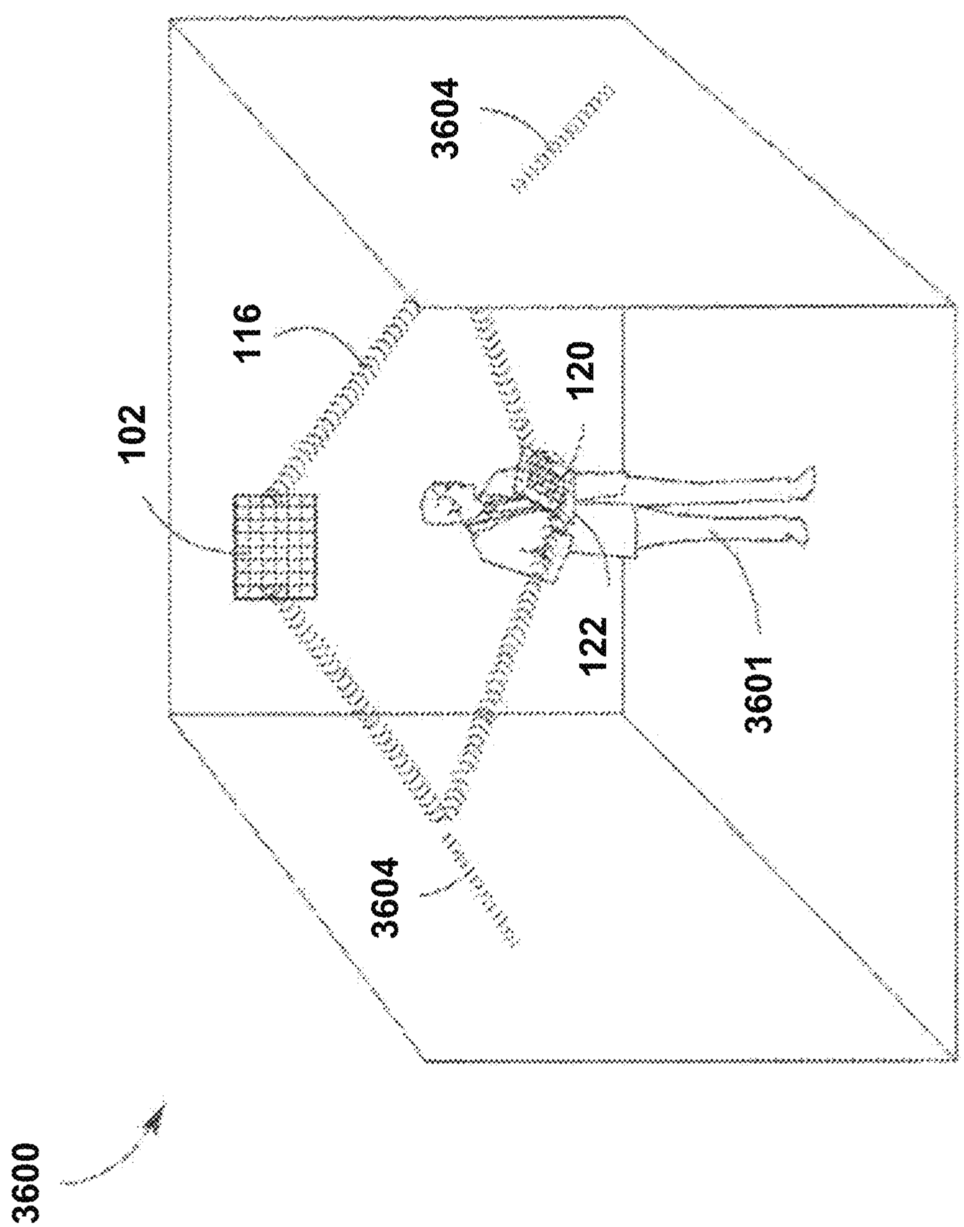
FIG. 36 illustrates a wireless power transmission using adaptive pocket-forming using reflected RF waves, in accordance with some embodiments.

Referring now to FIG. 36, an exemplary illustration of a wireless power transmission 3600 using adaptive pocket-forming can include a user 3601 inside a room holding an electronic device 122 which may include a receiver 120 either embedded or as a separate adapter. A transmitter 102 may be hanging on one of the walls of the room behind user 3601, as shown in FIG. 36. As user 3601 may seem to be obstructing the path between receiver 120 and transmitter 102, RF waves 116 may not be easily aimed to receiver 120 in a linear direction.

Given that the signals generated from receiver 120 may be omnidirectional (according to the type of antenna elements used), these signals may bounce over the walls, floor, and/or ceiling until they find transmitter 102. Almost instantly, a micro-controller (not shown in FIG. 36) which may reside in transmitter 102, may recalibrate the signals sent by receiver 120 by adjusting gain and phases, forming conjugates taking into account the built-in phases of antenna elements. Once calibration is performed, transmitter 102 may focus RF waves 116 in one or more channels following one or more paths as described in FIG. 36. Subsequently, a pocket of energy may be generated on electronic device 122 while avoiding obstacles such as user 3601 or any room furniture such as chairs, tables, and sofas (not shown in FIG. 36).

While wireless power transmission 3600 is illustrated as using the room wails to reflect the transmitted RF waves 116 towards receiver 120, other room structures such as ceiling or floor may also be used for this purpose. However, depending on the thickness and materials used in the room walls, ceiling or floor, the reflected RF waves 116 can lose significant signal power as they can go through or be absorbed by these structures. For example, as shown in FIG. 36, if a portion waves 116 goes through room walls made of wood, cement or plaster; the signal power of RF waves 116 reaching receiver 120 can be decreased to up to about 50%, thereby negatively affecting charging efficiency.

Figure 37:
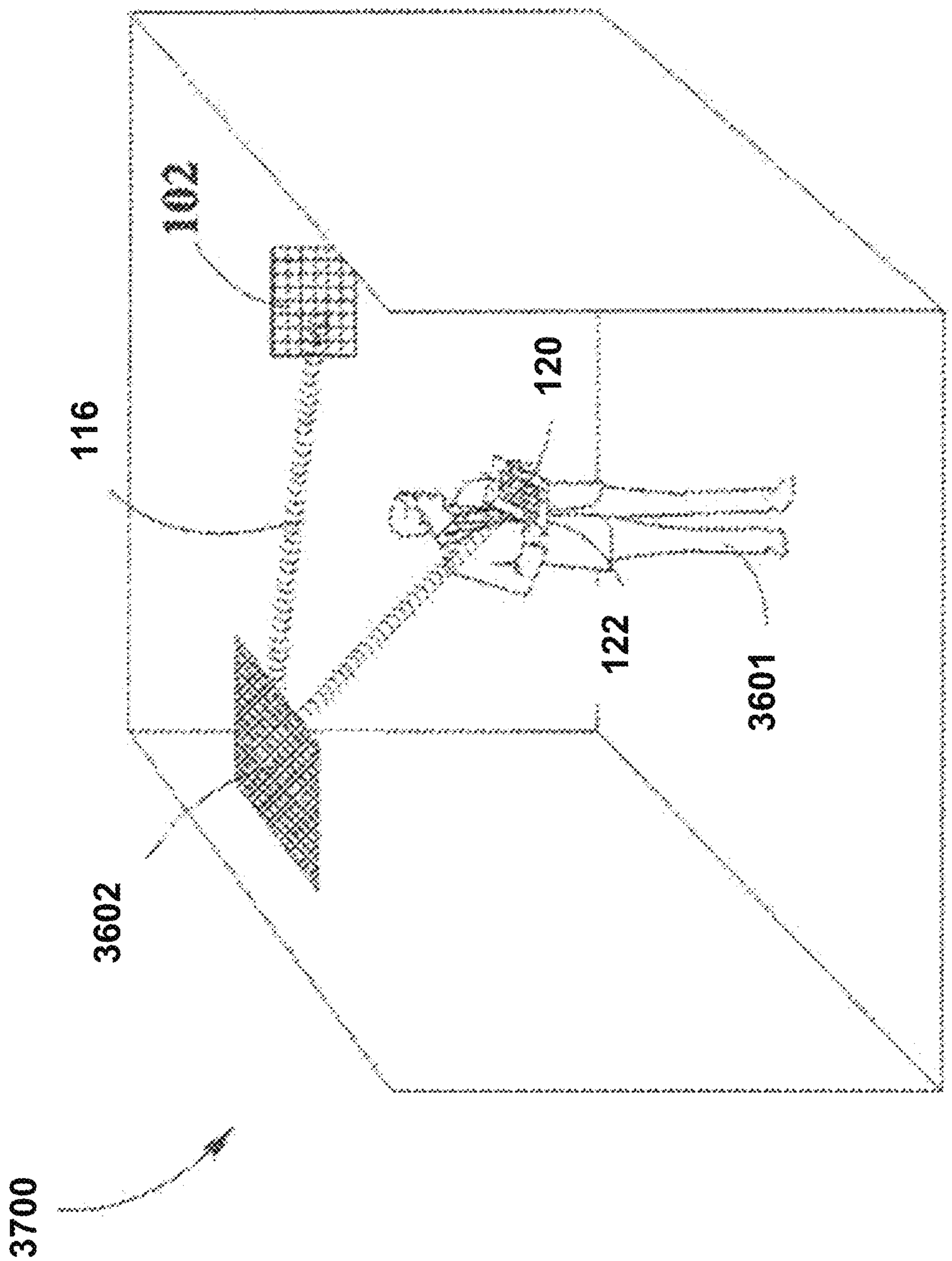
FIGS. 37 and 38 illustrate wireless power transmissions using a reflector for improving power transmission and charging efficiency, in accordance with some embodiments.

FIG. 37 illustrates a wireless power transmission 3700 using pocket forming and a reflector 302, according to an embodiment. Transmitter 102 can be purposely aimed at reflector 3602, so that the generated RF waves 116 can be accurately and efficiently reflected towards the location of electronic device 122, which can be under user 3601 operation or it can be just resting over any room furniture (not shown in FIG. 36). According to an embodiment, reflector 3602 can be made of metallic materials such as steel, aluminum, copper, and the like, in order to reflect close to 100% of the RF waves 116 power directly towards receiver 120 in electronic device 122 for the generation of pockets of energy that provide suitable charge or power. In another embodiment, reflector 3602 can be capable of increasing the power of reflected RF waves 116 by a factor between about 2 and 3, thereby enhancing the charging efficiency of electronic device 122 and improving the spatial 3-dimensional pocket formation.

Reflector 3602 can be a sheet of metal exhibiting a rectangular shape within suitable dimensions, preferably between 1 and 2 ft. Surface area of reflector 3602 may vary according to the dimensions of RF waves 116 which typically may be less than 1 foot wide. In another embodiment, reflector 3602 can include a printed circuit board (PCB) with a metal layer that can bounce off RF waves 116 generated by transmitter 102.

Reflector 3602 can be positioned in the room ceiling in order to avoid as many obstacles as possible when reflecting RF waves 116 towards electronic device 122. However, other locations or structures across the room can also be considered. For example, reflector 3602 may be positioned in the walls or floor, relative to the location of electronic device 122 and transmitter 102. Reflector 3602 can also be slightly tilted according to a desired reflection path relative to the location of electronic device 122. In addition, reflector 3602 may be painted or covered according to the color, texture or decoration of room walls, ceiling, or floor.

Mounting methods of reflector 3602 in room ceiling, walls, or floor can include four screws at each corner of reflector 3602, in addition to suitable adhesives or glues that may securely install reflector 3602 relative to transmitter 102 and electronic device 122.

Figure 38:
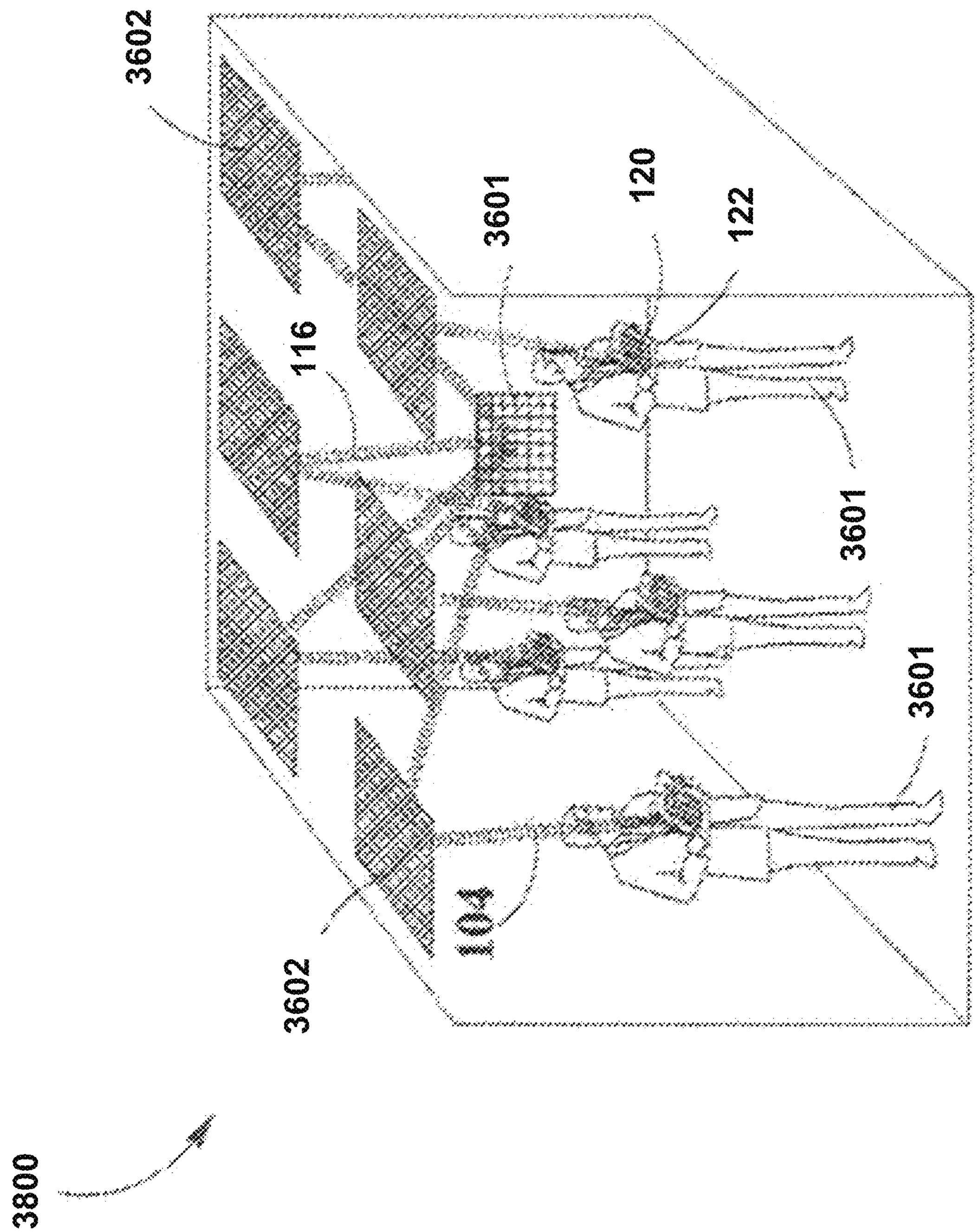

Referring now to FIG. 38, a wireless power transmission 3800 may utilize pocket forming in combination with a plurality of reflectors 3602, according to an embodiment. Two or more reflectors 3602 can be positioned in the room ceiling in order to reflect transmitted RF waves 116 into different areas across the room. According to some aspects of this embodiment, transmitter 102 can he purposely aimed at any of the six reflectors 3602, as shown in FIG. 37, for allowing the reflection of RF waves 116 towards one or more locations in the room where electronic device 122 or a user 3601 holding said electronic device 122 may be positioned. As previously explained, receiver 120 incorporated into electronic device 122 can receive reflected RF waves 116 for the generation of pockets of energy that can suitability charge electronic device 122.

In another embodiment, a plurality of transmitters 102 can be installed in the room so as to match the number of reflectors 3602 installed in the ceiling. In such case, one transmitter 102 may correspond to one reflector 3602, where all transmitters 102 can simultaneously generate RF waves 116 aimed at corresponding reflectors 3602, which can then redirect these RF waves 116 across the room for providing pockets of energy to a plurality of electronic devices 122 at the same time. This can also allow continuous charging for a user 3601 who may be utilizing electronic device 122, while being in constant movement across the room.

In FIG. 38, a plurality of reflectors 3602 can also be combined with a single transmitter 102 capable of producing multi-pocket forming. In such case, transmitter 102 can generate multiple RF waves 116 aimed at reflectors 3602, which can then redirect these RF waves 116 across the room, thereby powering one or more electronic devices 122 at the same time.

Figure 39:
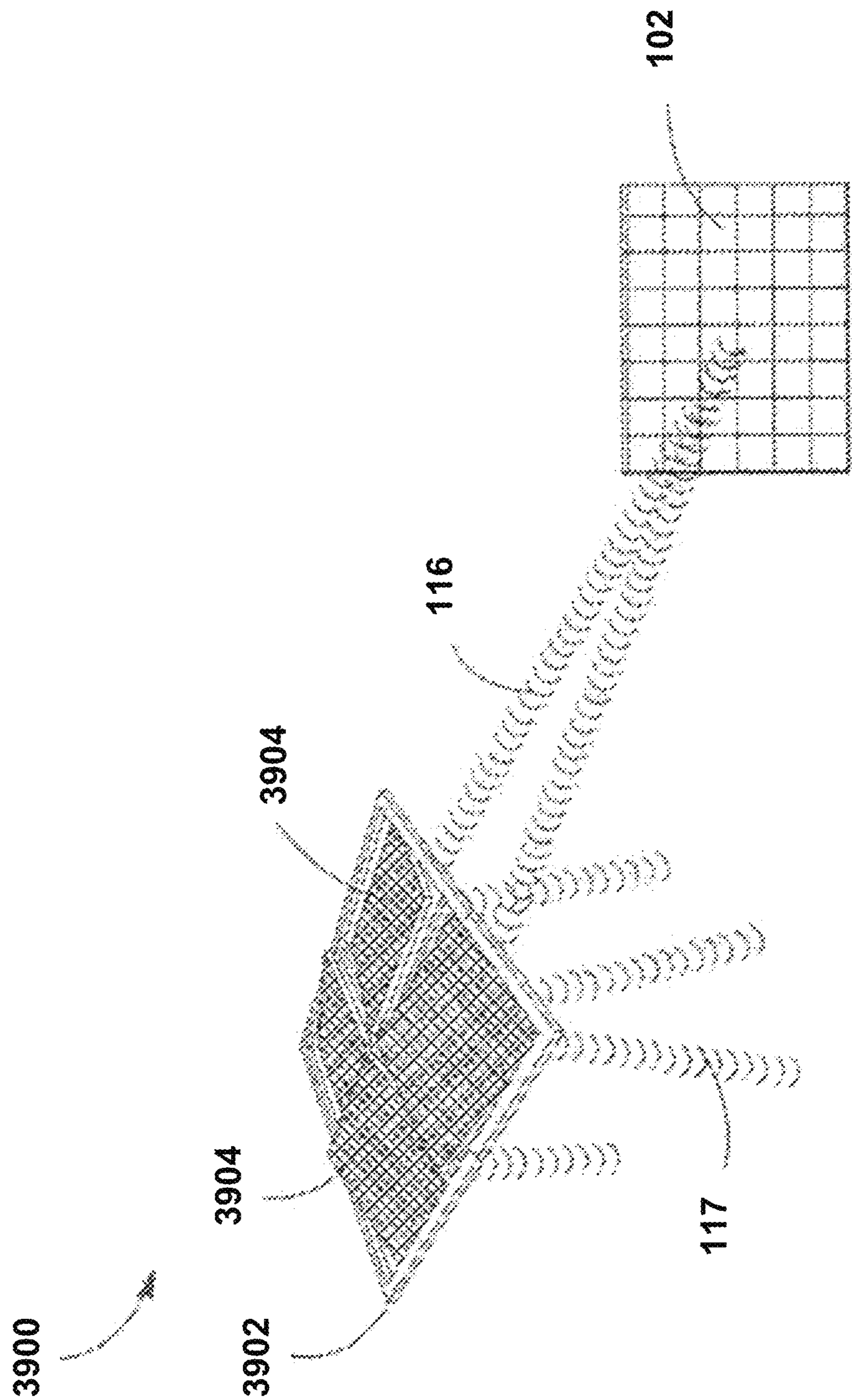
FIG. 39 illustrates a reflector structure that can include one or more reflector pieces which can be independently aligned for reflecting RF waves in different directions during wireless power transmission, in accordance with some embodiments.

FIG. 39 shows a reflector structure 3900 that can be used in wireless power transmission, according to an embodiment. Similar to reflector 3602 in FIG. 37, reflector structure 3900 can be installed in the room ceiling in order to redirect the formation of pockets of energy according the position of electronic device 122. This reflector structure 3900 may include a frame 3902 enclosing individual two or more reflector pieces 3904 which can be angled or tilted depending on the desired direction of the reflected RF wave 117. For example, each of these reflector pieces 3904 can be differently angled relative to transmitter 102 to cover each of the four quadrants of the room. Depending on which reflector piece 3904 the transmitted waves 116 hit, reflected waves 117 can he scattered in four different quadrants according to the configuration of each reflector piece 3904 in reflector structure 3900.

According to some aspects of this embodiment, reflector structure 3900 can exhibit a suitable dimension of about 2 ft×2 ft, which can translate into a 1 square foot surface area for each reflector piece 3904. Similar to reflector 3602, these reflector pieces 3904 can be made of suitable metal materials such as copper, steel and aluminum capable of reflecting most of the signal power of RF waves 116 towards receiver 120 in electronic device 122, in this manner achieving a more efficient power generation and battery charging.

Although reflectors 3902 and reflector pieces 3904 are shown within respective shapes, features and geometric relationships, other geometric relationships, features and shapes may be contemplated.

Figure 40A:
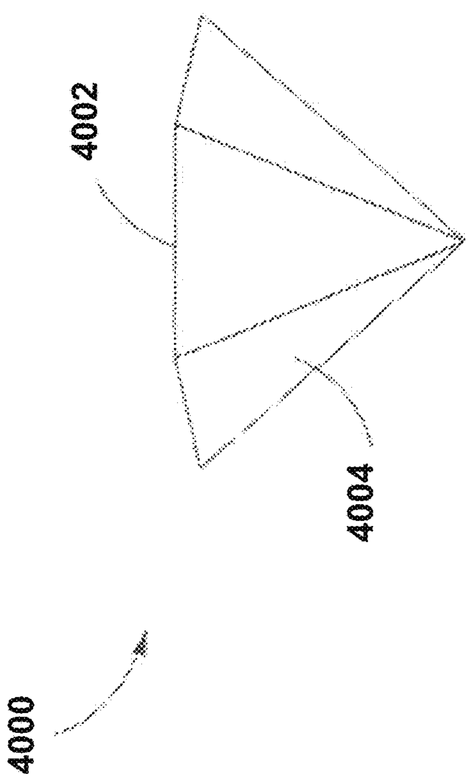
FIGS. 40A and 40B illustrates reflector configurations that can be used during a wireless power transmission, in accordance with some embodiments.

FIG. 40 shows reflector configurations 4000 that can be applied in reflectors 3602 and reflector pieces 3904, according to an embodiment. FIG. 40A shows a pyramid configuration 602 with three or more faces 604. Compared to pyramid configuration 4002, reflectors 3602 and reflector pieces 3904 in wireless power transmission 3700, 3800 can typically exhibit a flat surface which can provide only one dedicated or specific angle of reflection. Reflectors 3602 and reflector pieces 3904 incorporating pyramid configuration 4002 can offer more than one angle of reflection depending on which face 4004 the transmitted RF waves 116 hit. In this way, RF waves 116 can be reflected in more than one direction, without requiring moving or tilting reflector 3602 and reflector pieces 3904.

Figure 40B:
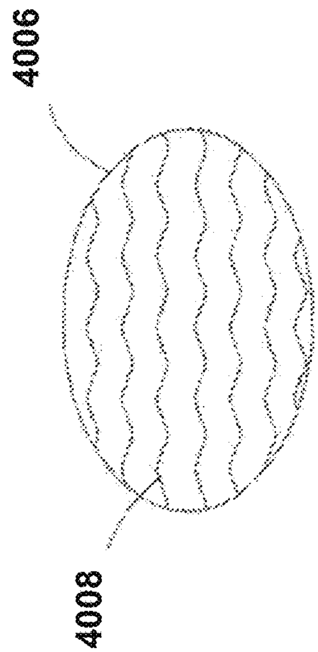

FIG. 40B shows an oval-shape configuration 4006 that can also be applied to reflector 3602 and reflector pieces 3904 in order to reflect RF waves 116 in more than one direction, without requiring any change their position or orientation. This uneven oval-shape configuration 4006 can include a plurality of curves 4008 which may form an uneven surface texture compared to the typically smooth surface of reflector 3602 and reflector pieces 3904 used in wireless power transmission 3700, 3800. When transmitted RF waves 116 strike a reflector 3602 or reflector piece 3904 using oval-shape configuration 4006, the uneven surface texture can scatter the reflected RF waves 116 in different directions that may correspond the location of electronic device 122.

Figure 41:
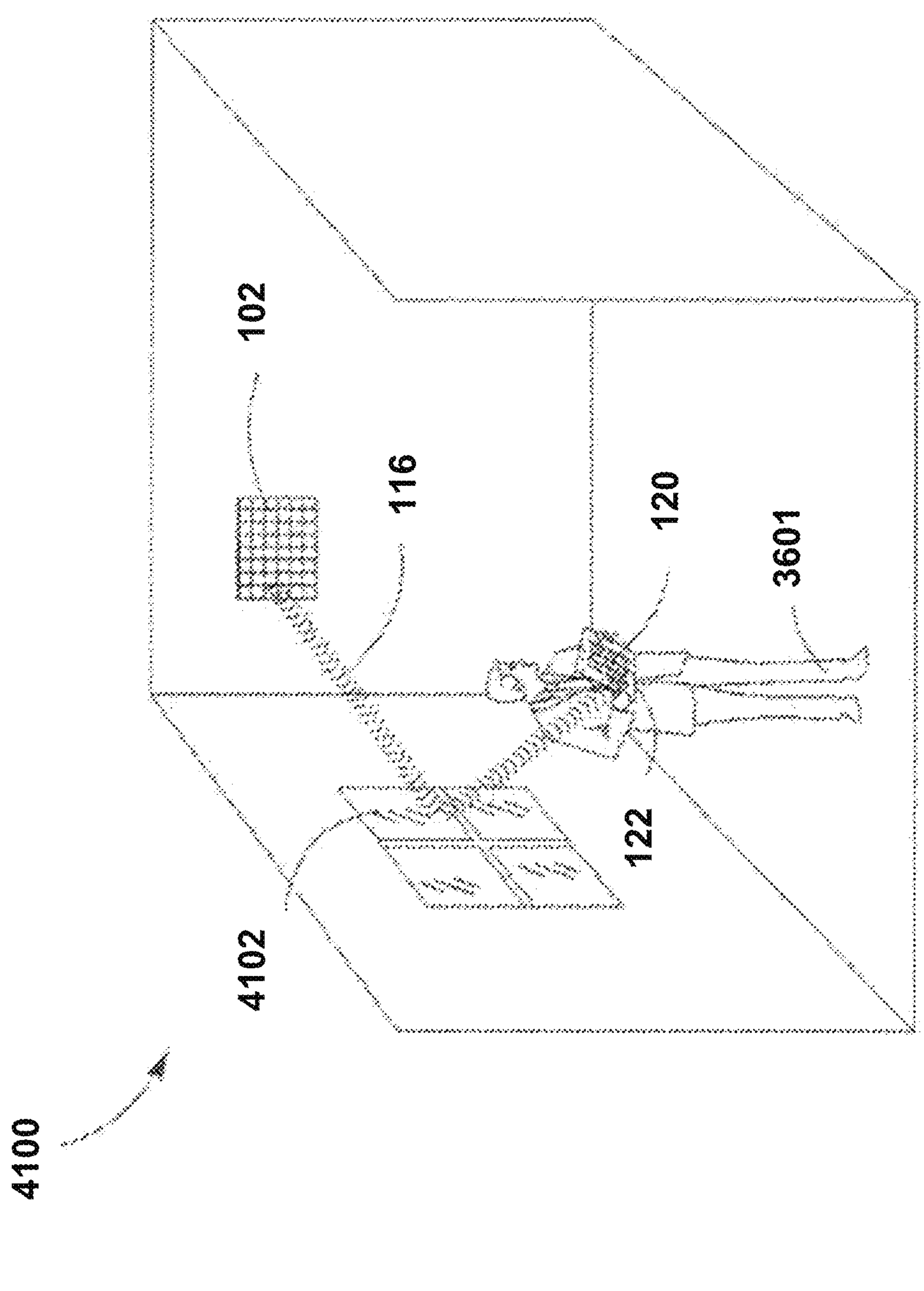
FIG. 41 illustrates a wireless power transmission that may include a window reflector for improving power transmission and charging efficiency, in accordance with some embodiments.

Referring now to FIG. 41, a wireless power transmission 4100 can employ pocket forming in conjunction with a window reflector 4102 for powering electronic device 112, according to an embodiment. Window reflector 4102 can be formed when a commercially available insulating film is installed in a room window, where this insulating film can include a flexible and transparent metallic layer capable of reflecting RF waves 116. According to some aspects of this embodiment, transmitter 102 can be purposely aligned towards window reflector 4102, which can then redirect RF waves 116 to receiver 120 in electronic device 122 for the generation of pockets of energy capable of charging electronic device 122. In another embodiment, the metallic layer included in window reflector 4102 can be configured for allowing certain wavelengths of communication signals, such as satellite or cellphone, to pass through window reflector 4102, while reflecting nearly 100% of RF waves 116 from transmitter 102 towards electronic device 122 for charging.

In other embodiments, metallic paint can also be applied to different structures in the room to act as reflectors of RF waves 116, where the reflection efficiency may vary according to the metallic concentration in the paint composition.

FIGS. 36-41 illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 36-41.

Presented below are example systems and methods for transmitting wireless power utilizing reflectors.

A system for transmitting wireless power may include: (i) a transmitter for generating two or more RF waves having at least two RF transmit antennas in an array to form controlled constructive interference patterns from the generated RF waves for generating pockets of energy, (ii) a micro-controller within the transmitter controlling the constructive interference patterns of generated RF waves for pocket-forming to accumulate pockets of energy in predetermined areas or regions in space, (iii) a receiver mounted within a targeted electronic device with at least one antenna to receive the accumulated pockets of energy converging in 3-dimensional space to the targeted electronic device, (iv) a communication network connected to the transmitter and receiver for determining the areas or regions in space to receive the pockets of energy from the transmitter through an array of antennas for charging or operating the targeted electronic device, and (v) a reflector having one or more angles of reflection for directing pockets of energy to the targeted electronic device within a space.

In some embodiments, the reflector is made of metallic materials comprising steel, aluminum, copper, or similar materials to reflect approximately 100% of the pockets to predetermined locations within the 3-dimensional space.

In some embodiments, the reflector has a predetermined square footage of between 1 and 2 feet squared to reflect the transmitter-generated RF waves forming the constructive interference patterns creating the pockets of energy in the direction of the receiver to charge or power the electronic device.

In some embodiments, the reflector is generally configured in a flat panel mounted on a wall, ceiling, or floor and is capable of being painted or covered according to a color, texture, or decoration of the room walls, ceiling, or floor.

In some embodiments, the reflector is a plurality of reflectors positioned within a room ceiling in order to reflect transmitted RF waves into different areas across the room.

In some embodiments, the transmitters are a plurality of transmitters and the number of reflectors installed within a space are a plurality of reflectors matching the number of transmitters where all of the transmitters simultaneously generate RF waves that are aimed at corresponding reflectors to redirect RF waves across the space for providing pockets of energy to electronic devices equal to the number of reflectors.

In some embodiments, the antennas operate in frequency bands of 900 MHz, 2.5 GHz, or 5.8 GHz bands.

In some embodiments, the reflector is a plurality of reflectors combined with a single transmitter to generate multiple RF waves aimed at the plurality of reflectors that redirect the multiple RF waves across the space to power one or more electronic devices.

In some embodiments, the reflector or reflector components are configured in a number of different geometric relationships or shapes capable of transmitting RF waves to the targeted electronic devices.

In some embodiments, the reflector is an oval-shape configuration in order to reflect RF waves in more than one direction without requiring any change in the position or orientation of the reflector and the reflector comprises a plurality of curves to form an uneven surface compared to a smooth surface to scatter reflected RF waves in different directions that may correspond to the locations of electronic devices.

In some embodiments, the reflector is incorporated into the insulating film installed within a room window comprised of a transparent metallic layer capable of reflecting RF waves to redirect RF waves to the receiver in the electronic device or the reflector is a metallic concentration within a paint composition to reflect and redirect RF waves to the receiver.

In some embodiments, the reflector comprises a frame enclosing individual reflector components configured to be angled or tilted depending on a predetermined direction relative to the transmitted pockets of energy in 3-dimensional spaces for charging or operating the electronic device. Furthermore, in some embodiments, the reflector components are angled relative to the transmitter to cover each of four quadrants of a room. Furthermore, in some embodiments, the reflector is a pyramid configuration with at least three faces offering more than one angle of reflection depending on the face transmitting the RF waves in one or more predetermined directions without requiring moving or tilting the reflector or reflector components.

In some embodiments, the reflector increases the power of the reflected RF waves forming the pockets of energy a factor of approximately 2 and 3 times and further enhances the charging efficiency of the targeted electronic device and improves the spatial 3-dimensional pocket of energy formation.

A method for transmitting wireless power may include: (i) generating two or more RF waves from a transmitter with at least two RF transmit antennas, (ii) forming controlled constructive interference patterns from the generated RF waves, (iii) accumulating energy or power in the form of constructive interference patterns from the RF waves to form pockets of energy, (iv) converging the pockets of energy in 3-dimensional space to a targeted electronic device, and (v) redirecting the transmitted RF waves to the targeted electronic device by a reflector for charging or operating the targeted electronic device with the pockets of energy.

FIGS. 42-45 illustrate examples of wireless power transmission using a transceiver pad, in accordance with some embodiments.

Figure 42:
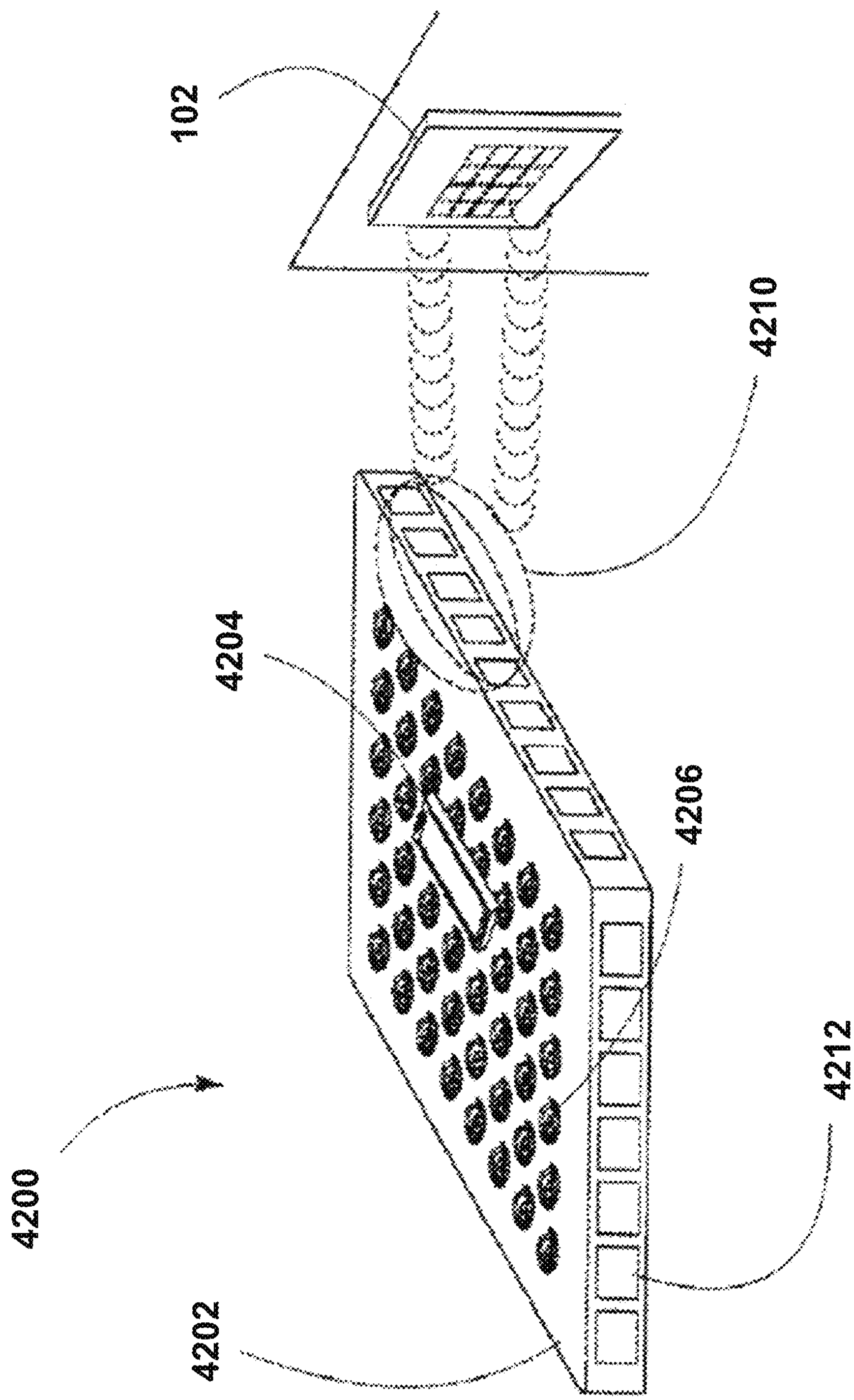
FIGS. 42 and 43 illustrate wireless power transmission where a pad, with improved portability, provides wireless power to an electronic device, in accordance with some embodiments.

FIG. 42 illustrates a wireless power transmission 4200 where a pad 4202, with improved portability, may provide wireless power to a smartphone 4204. In the prior art, pad 4202 may include a power chord which may connect to a wall outlet running on alternating current (AC) power. Such AC power may then be transmitted wirelessly to smartphone 4204, through magnetic induction or electrodynamics induction, via a plurality of inductive elements 4206. Inductive elements 4206 may include, for example, coils or inductors. As is known in the prior art, smartphone 4204 may also incorporate external hardware, such as cases, which may include a plurality of inductive elements 4206 (not shown) for receiving the power sent by pad 4202. The foregoing configuration may not really be wireless because a power chord may still be required. In addition, the location of pad 4202, and therefore of smartphone 4204 may negatively be affected by the location of an available power outlet, i.e. if the wall outlet is in hard-to-reach locations such as behind a sofa or TV screen, so will be pad 4202 and smartphone 4204. The foregoing situation can easily be solved by eliminating the power chord used in the prior art. In an embodiment, wireless power transmission 4200 may be carried out using a transmitter 102 and embedding at least one receiver (not shown) within pad 4202. Transmitter 102 may provide pockets of energy 4210 to embedded receivers which may provide power to inductive elements 4206 from pad 4202 for powering smartphone 4204 wirelessly. Antenna elements 4212 (as described with reference to FIG. 1), from the foregoing embedded receivers, may be placed outside the edges of pad 4202 for improved power reception independent of the location of transmitter 102. The foregoing configuration may be beneficial because pad 4202 may no longer be constrained by the location of a suitable wall outlet. In addition, pad 4202 can be put in easy-to-reach locations such as tables, counters and the like that are inside the range of transmitter 102. In some embodiments the range of transmitter 102 can be up to about 15 feet. The foregoing can be achieved by placing about 256 antennas in transmitter 102, and an embedded receiver with about 80 antennas. The power transmitted can be up to one watt.

Figure 43:
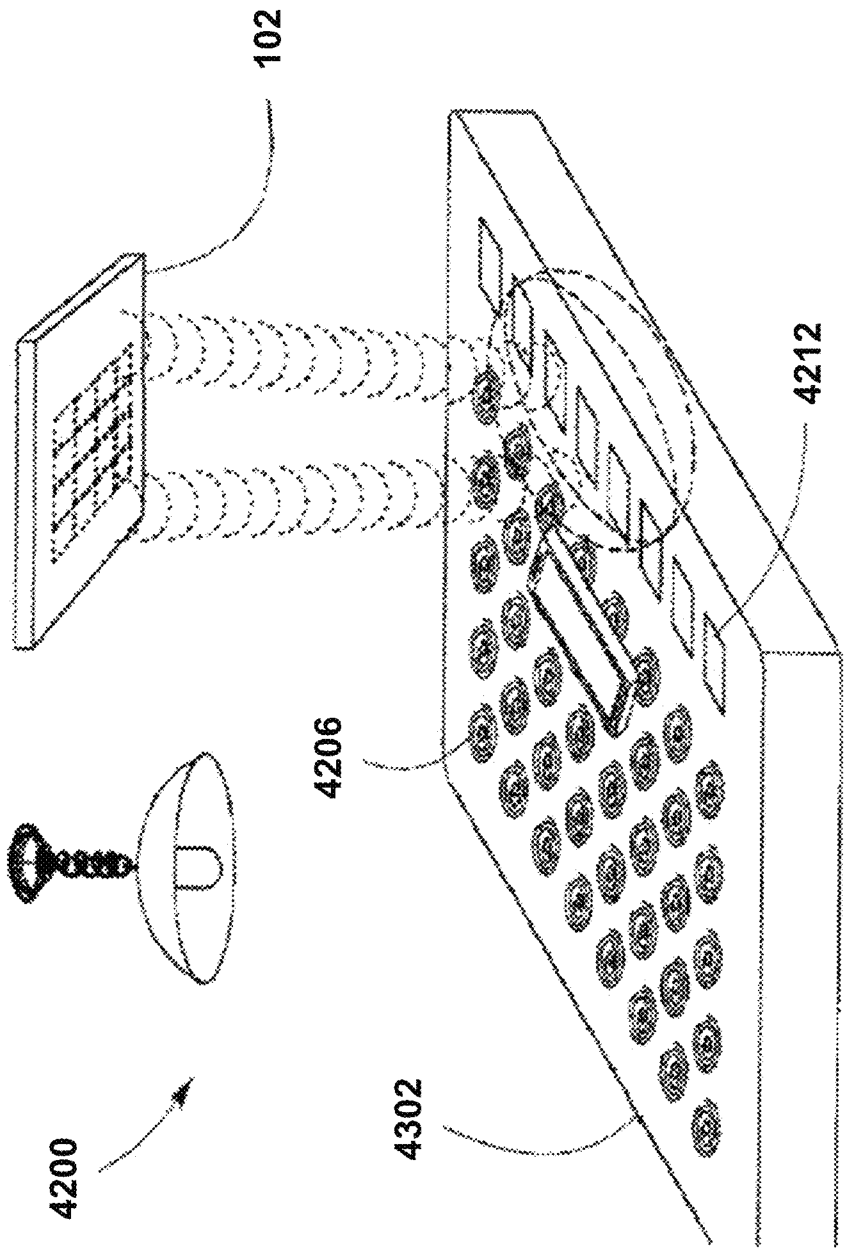

FIG. 43 illustrates another embodiment of wireless power transmission 4200 where a pad 4302 (similar to pad 4202 from FIG. 42 above) may include a plurality of inductive elements 4206 and at least one embedded receiver (not shown). Embedded receivers may include antenna elements 4212 located on the top surface of pad 4302. This configuration may be beneficial when using a transmitter 102 located above pad 4302, for example in ceilings. In other embodiments, the foregoing pads, as described through FIG. 42 and FIG. 43, may not use inductive elements 4206, but in contrast may utilize pocket-forming for transmitting power wirelessly. For example, transmitter 102 may provide power to either pad 4202 or pad 4302 through pocket-forming. Then, a second transmitter within either pad 4202 or pad 4302 may re-transmit the power sent by transmitter 102 to electronic devices nearby the aforementioned pads. Lastly, electronic devices requiring power may incorporate external hardware, for example cases, similar to those utilized in the prior art for magnetic induction or electrodynamics induction. Such external hardware may incorporate receivers suited for pocket-forming instead of inductive elements 4206. The aforementioned configuration may further expand the range wireless power transmission 4200 because electronic devices such as smartphone 4204 may not even be required to be placed on the pads, but only near the pads (up to 15 feet away for example). Thus, pad 4202 or pad 4302 may need only to be from about 2 inches×4 inches in surface area.

Figure 44:
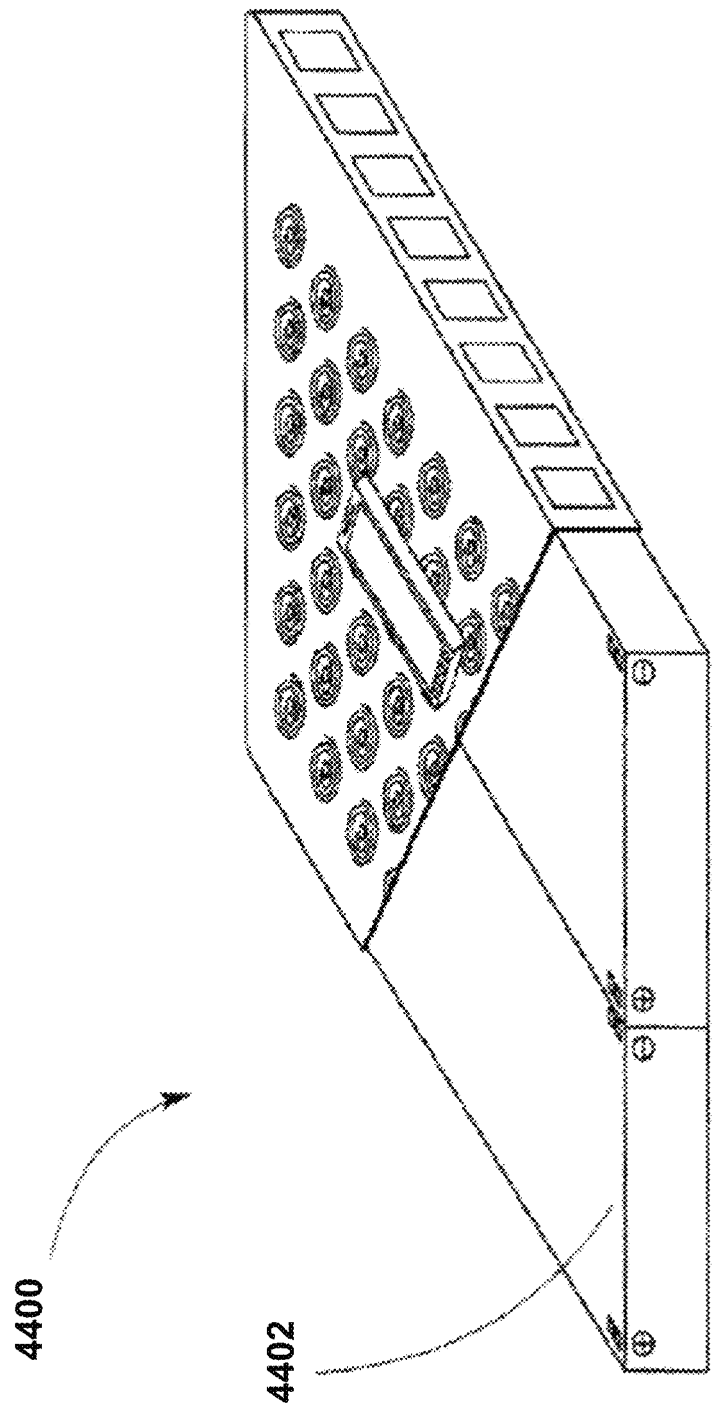
FIG. 44 illustrates a portable pad that includes a module for storing charge, in accordance with some embodiments.

FIG. 44 illustrates a pad 4400 which in this embodiment may include a plurality of inductive elements 4206, at least one embedded receiver (not shown) for powering smartphone 4204. As described above, with reference to at least one of FIG. 42 and FIG. 43, pad 4400 may receive power wireless through pocket-forming and may not require a power chord for connecting to a power supply such as a wall outlet. In some embodiments, pad 4400 may also include at least one module 4402 for storing charge, for example a lithium ion battery. Module 4402 may store charge while charging or not smartphone 404. In some embodiments, pad 4400 may utilize magnetic induction, electrodynamics induction of pocket-forming for powering smartphone 404 as described through FIG. 4 and FIG. 43. Once pad 4400 is charged, it may be placed at any location, or even carried around for powering electronic devices as described in FIG. 7 below.

Figure 45:
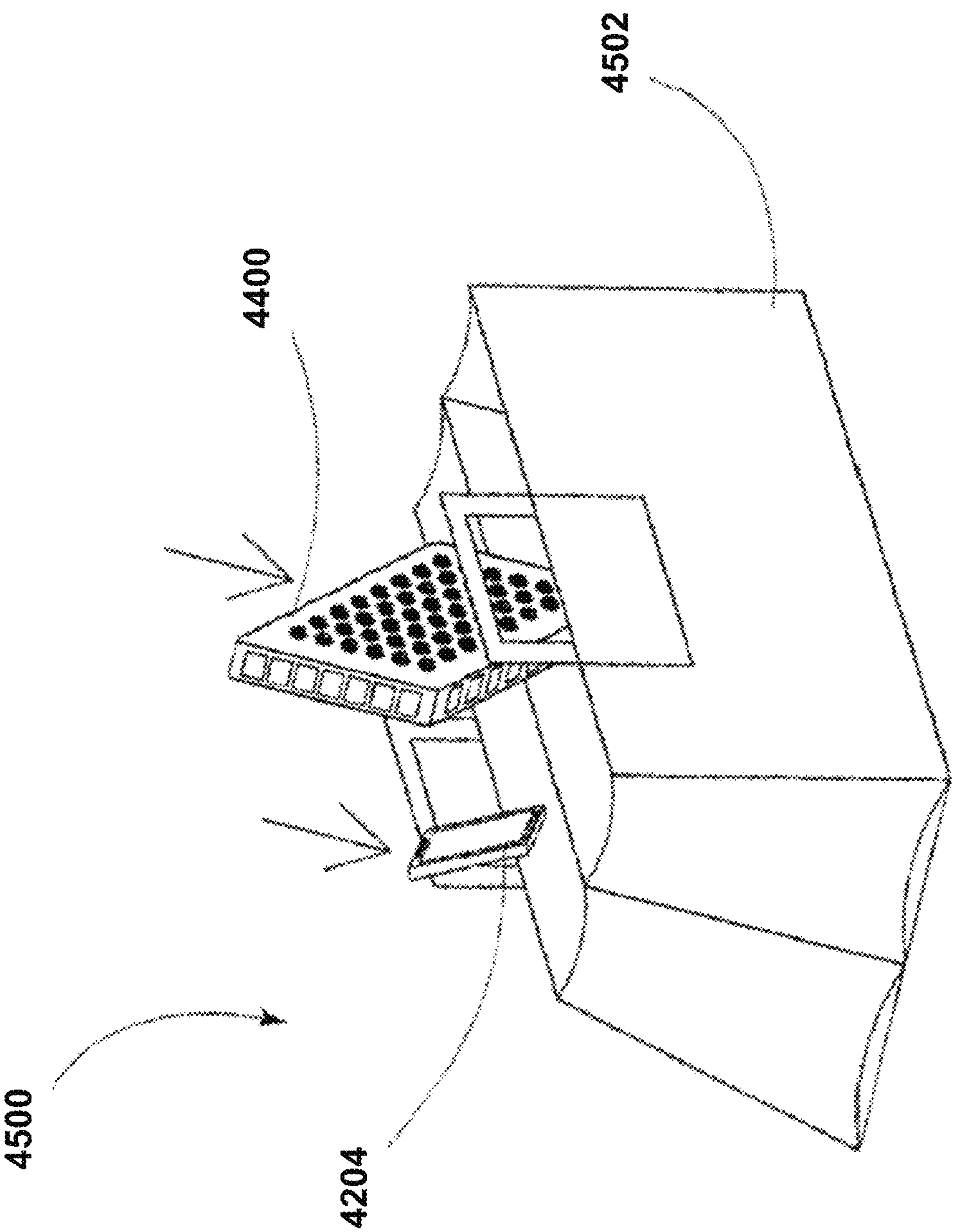
FIG. 45 illustrates an example situation where pad from FIG. 44 can be used, in accordance with some embodiments.

FIG. 45 illustrates an example situation 4500 where pad 4400 may be carried around in a briefcase 4502 for powering smartphone 404. Pad 4400 can be carried in backpacks, women purses and the like. In some embodiments, pad 4400 may be embedded within the foregoing items and sold as one charging unit. Furthermore, such a charging unit can be powered wirelessly through pocket-forming or may incorporate a power chord for plugging into a wall outlet. Devices inside a bag, purse or the like are by default not in use, and can therefore sacrifice mobility while powering using the former option.

FIGS. 42-45 illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 42-45.

Presented below are example portable wireless charging transceiver pads and methods for a portable wireless charging transceiver pad.

A portable wireless charging pad may include: (i) a pad receiver embedded within the charging pad connected to antenna elements on a surface of the pad for receiving pockets of energy from a pocket-forming power transmitter to charge a pad battery and (ii) a pad pocket-forming transmitter powered by the pad battery comprising a RF chip connected to antenna elements for generating pockets of energy to charge or power a portable electronic device having a receiver connected to a battery to capture the pockets of energy from the pad transmitter when in the proximity of the charging pad.

In some embodiments, the electronic device receiver communicates power requests to the pad transmitter through short RF waves or pilot signals sent between the electronic device receiver and the pad transmitter, respectively.

In some embodiments, the pad comprises inductive elements for charging the electronic device in close proximity to the inductive elements.

In some embodiments, the pockets of energy generated from the pad transmitter have a range of approximately 15 feet to the electronic device.

In some embodiments, the pad comprises a power cord and the pad battery is a lithium ion battery module connected to the pad transmitter and the lithium battery is charged either through the power cord or the pad receiver.

In some embodiments, the pad receiver and the pad transmitter each comprises a circuitry for a RF integrated circuit, an antenna array, a microcontroller, and a communication component circuit for communications between the pad receiver and the pad transmitter to control the powering and charging of the portable electronic device.

In some embodiments, the pad transmitter generates single or multiple pocket-forming for charging or powering one or more electronic devices located in proximity to the pad.

In some embodiments, the pad transmitter comprises integrated RF circuitry connected to an antenna array configured around a perimeter or on a surface of the pad.

In some embodiments, the pad comprises circuitry to accommodate both a power cord and a battery as a power source for the pad transmitter.

In some embodiments, the pad is configured in a generally flat rectangular shape of approximately 2 inches by 4 inches and is capable of being placed into a brief case, bag, or purse along with the electronic device to be charged or powered.

In some embodiments, the antenna elements of the pad receiver are in a generally flat configuration and located on a surface of the pad to receive the pockets of energy within a 15-foot range from the power transmitter.

In some embodiments, the pad transmitter is configured in the shape of a generally flat rectangular box having antenna elements around the circumference of the box for receiving the pockets of energy for the pad receiver.

A method for a portable wireless charging pad may include: (i) embedding at least one receiver within the pad, (ii) receiving pockets of energy from a pocket-forming transmitter at the receiver, and (iii) charging wirelessly a portable electronic device in proximity to the pad.

In some embodiments, the method comprises authenticating the electronic device in proximity to the pad for charging through Wi-Fi communication to a cloud based service for confirming the electronic device access for charging from the pad.

In some embodiments, the method comprises scanning for Bluetooth electronic devices available for wireless pad charging and prioritizing the charging or powering of the available electronic devices whereby the pad transmitter directs pocket-forming towards predetermined electronic devices in a predetermined priority order.

In some embodiments, the method comprises authenticating and selecting the electronic device receiver for the pad transmitter to charge by communicating requests for power over Bluetooth, infrared, Wi-Fi, and FM radio signals between the pad transmitter and the electronic device receiver.

In some embodiments, the method comprises transmitting simultaneously both Wi-Fi signals and pocket-forming RF waves from the pad transmitter to the portable electronic device receiver in proximity to the pad.

In another method for a portable wireless charging pad, the method may include: (i) supplying pockets of energy to a pad receiver comprising circuitry of an antenna element, a DSP, a rectifier, a power converter, and a communications device connected to a pad battery, (ii) pocket-forming in a pad transmitter comprising circuitry of antenna elements, a RF integrated chip controlled by a DSP for pocket-forming to develop pockets of energy for charging and powering a battery in an electronic device in proximity to the pad and a communication device controlled by the DSP, (iii) pocket-forming in a power transmitter supplying pockets of energy to the pad receiver, and (iv) communicating the power level of the pad battery from the pad receiver to the power transmitter through short RF signals between the pad receiver and power transmitter communication devices, respectively, over conventional wireless communication protocols.

In some embodiments, the method comprises: (i) decoding short RF signals from a portable electronic device receiver having communication circuitry to identify the gain and phase of the electronic device receiver to determine the proximity of the electronic device receiver to the pad, (ii) controlling the charging and powering of the electronic device by the decoded short RF signals, and (iii) charging the battery of the electronic device when in the proximity of the pad transmitter to provide an inexhaustible source of operating power for the electronic device.

In some embodiments, the method comprises uploading battery information and uploading the proximity information of the electronic device to the charging pad.

In another method for a portable wireless charging pad, the method may include: (i) searching for a wireless charging request from a portable electronic device within a predetermined range from the charging pad, (ii) scanning for a standard communication protocol signal representing the charging request from the portable electronic device, (iii) pocket-forming from a pad transmitter for supplying pockets of energy to an electronic device receiver requiring the charging, and (iv) ending wireless power transmission to the electronic device when a predetermined charging has occurred or when the electronic device is out of range from the charging pad.

Figure 46:
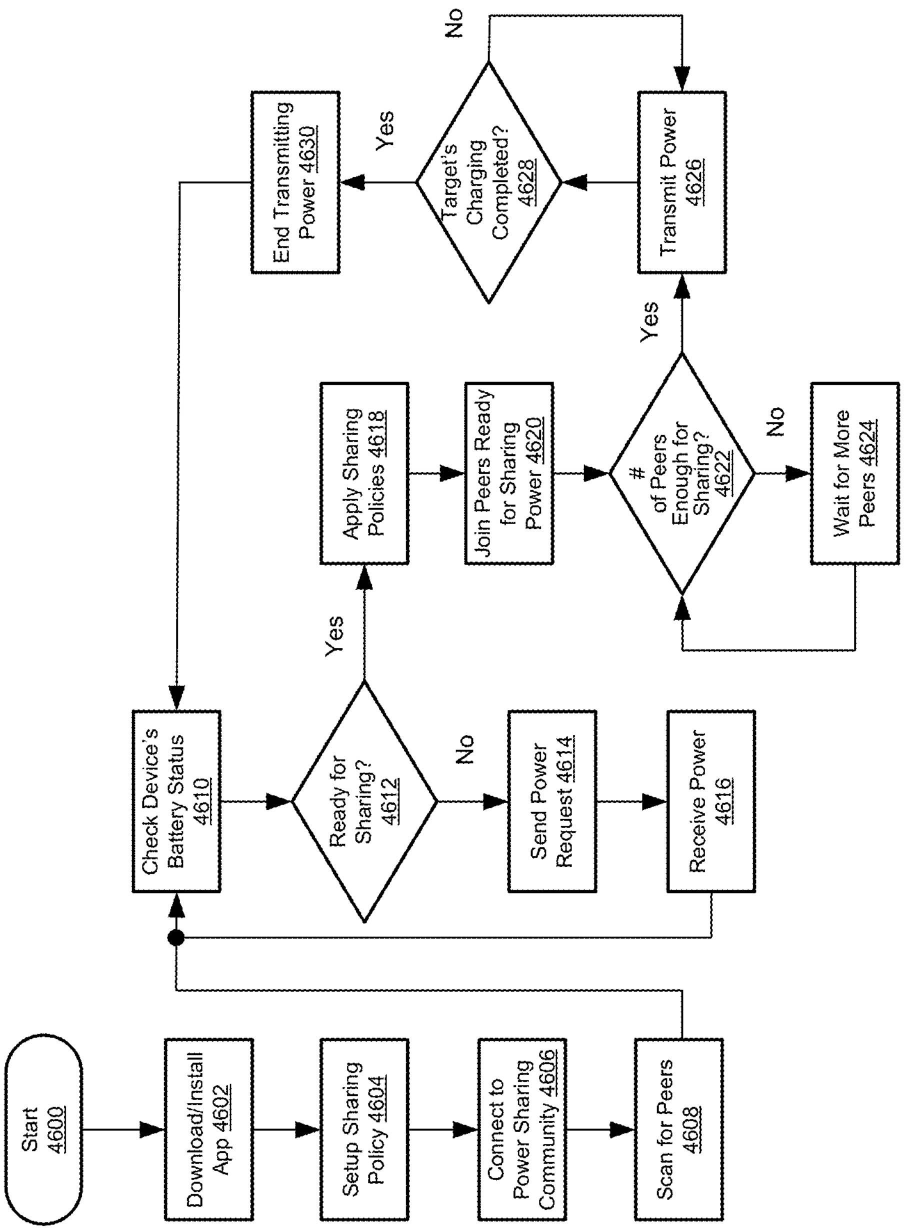
FIG. 46 illustrates a flowchart describing a method for social power sharing, in accordance with some embodiments.
Figure 47:
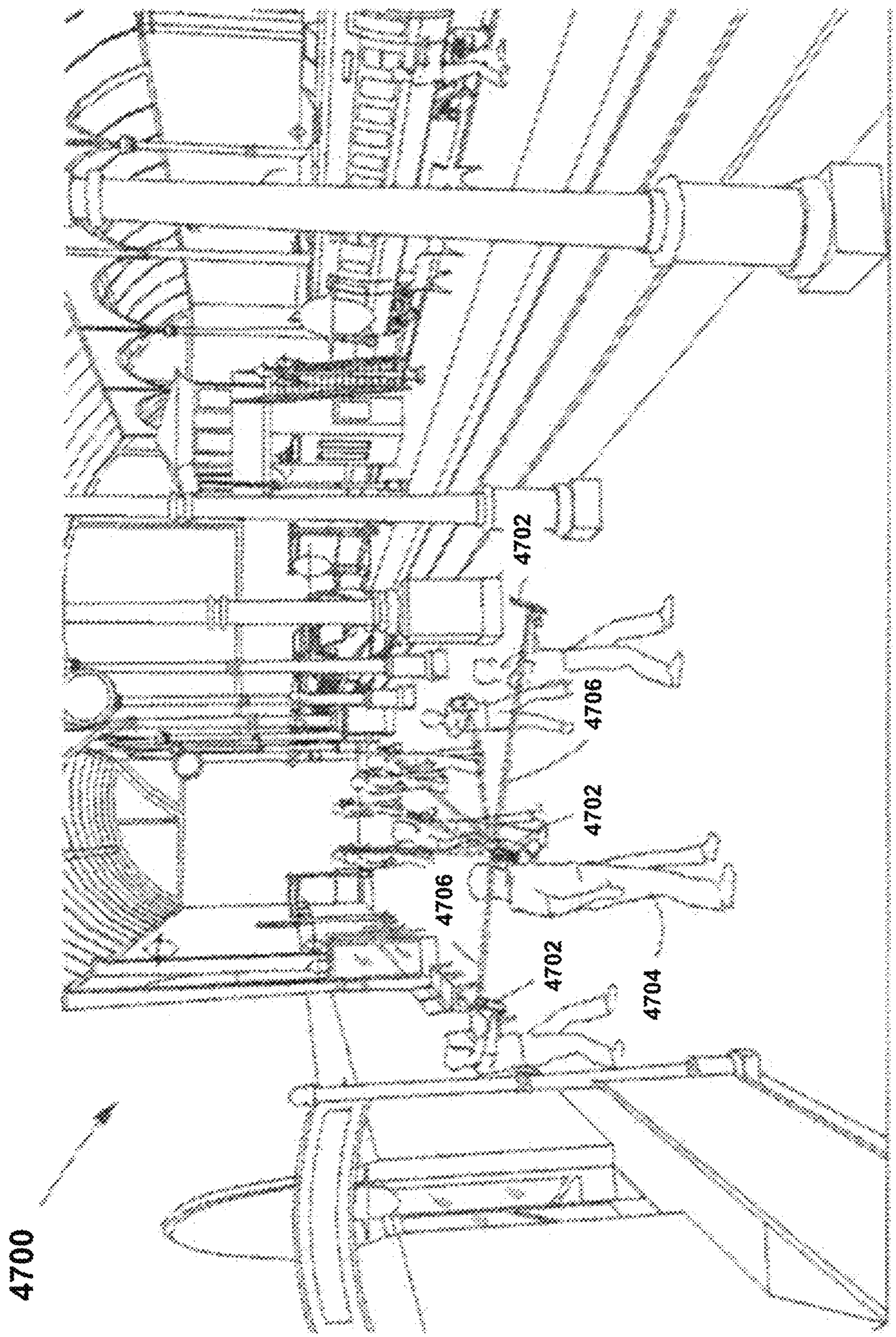
FIG. 47 illustrates an example situation where social power sharing may be applied, in accordance with some embodiments.

FIGS. 46 and 47 illustrate wirelessly sharing power between mobile electronic devices in public or other spaces, in accordance with some embodiments.

FIG. 46 illustrates a flowchart describing a method for social power sharing 4600, based on the concept explained in FIG. 1. Social power sharing 4600 may work with any mobile device that has Wi-Fi, Bluetooth or both as a built-in hardware, and may also include the receiver 120 described in FIG. 1.

The method for social power sharing 4600 may start by downloading and installing an App 4602 in the mobile device that is desired to either share or receive power. App 4602 may be developed to be compatible with any operating system for mobile devices available in the market. After installing App 4602, the user of the mobile device may need to setup a group of sharing policies 4604 in which a set of constrains may be defined. Within the set of constrains, the user may first need to grant permission to app 4602 by digital signing an agreement where the user allows full control of the built-in hardware of the mobile device needed for social power sharing 4600. After grating full control of the hardware needed, the user may also need to establish the working parameters for sharing its mobile device's power. The working parameters may include, but is not limited to, the minimum charge needed to start sharing, for example the user may define a. minimum charge of 80% of its battery to start sharing power. Another parameter may be the amount of charge that the user desires to share, for example the user may only wish to share 5% of its battery with others. Furthermore, the user may also define the timing for sharing, for example the user may define that the mobile device may only share power if the mobile device is idle.

After setting up the sharing policies 4604, app 4602 may connect to a power sharing community 4606. The connection may be established through any suitable network by either using Wi-Fi or Bluetooth. In one embodiment, App 4602 may need to be connected to the internet to download additional information from other users. In other embodiments, an internet connection may not be required. Once the mobile device is connected to the power sharing community 4606, app 4602 may start scanning for peers 4608 within the area. Peers 4608 may be all users that may have already connected their mobile devices to power sharing community 4606, and that may also be waiting to share or receive power. When scanning for peers 4608 is finished, app 4602 may proceed to check the device's battery status 4610 to determine if the mobile device is ready for sharing 4612 or not. App 4602 may then compare the actual battery status 4610 with the constrain previously defined. For example, if the actual battery status 4610 is 80% and the constrain was defined to allow power sharing only if the battery status is equal or greater than 80%, then app 4602 will subsequently enable the mobile device to start sharing power, however another set of policies 4616, previously defined, may be applied. If the battery status 4610 is below 80%, then app 4602 may be configured to send a power request message 4614 to power sharing community 4606. The mobile device may then receive power 4616, recharge and then go back to check battery status 4610.

Following the process, once all the sharing policies 4618 are applied, app 4602 may join other peers ready for sharing power 4620. Social power sharing 4600 may employ a great number of mobile devices connected and synced together so as to send pockets of energy 108 to a single mobile device. Since the transmission may be for low power, app 4602 may utilize at least a hundred mobile devices coordinated and aligned so as to focus all RF waves on a single device to create a pocket of energy with enough power to charge it. If the number of peers connected to power sharing community 4606 is enough for sharing 4622, then the mobile device may start to transmit power 4626 to a targeted mobile device. If the number of peers is not enough, then app 4602 may set the mobile device in a standby mode in order to wait for more peers 4624 until the number of peers is enough to start transmitting power. In some embodiments, app 4602 can decide to provide power even though the number of peers may not be sufficient for a fast charge, and may therefore issue a warning to the user requesting power.

App 4602 may constantly check within all peers how much power is being transmitted. When target's charging is completed 4628, app 4602 may end power transmission 4630 and return to check device's battery status 4610. If the target is not yet completed, app 4602 may continue transmitting power to the targeted mobile device. As long as app 4602 is running in the background, the process may run indefinitely or until the mobile device goes out of range.

FIG. 47 shows an example situation where social power sharing 4600 may be applied. In this embodiment, a crowded train station 4700 is disclosed. Train station 4700 may be a place where many people, having multiple mobile devices, may be found, People may spend a great deal of time waiting for the train that will take them to their destination, and in many occasions people may need to use their mobile devices to do multiple tasks such as check emails, make phone calls, browse the internet, or anything their mobile device may be able to do. The latter may be a reason for applying social power sharing 46400.

In FIG. 47, a group of people is shown, each person may have a mobile device 4702 which may already include a built-in Wi-Fi or Bluetooth module which could be used as a transmitter, similar to transmitter 102 described in FIG. 1. Also, each mobile device 4702 may also include a receiver 120, either attached or embedded to it. Furthermore, each mobile device 4702 may also have installed and configured app 4600 in its operating system, as the one described in FIG. 46.

In this embodiment, FIG. 47 shows a user 4704 receiving power from all the people that have accepted a request for sharing their power. Also FIG. 47 shows controlled RF waves 4706 being transmitted from each mobile device 4702 and aimed to user 4704. In this embodiment, all the people having mobile device 4702 may have already accepted to share at least 5% of their battery charge in order to help user 4703 to charge its mobile device 4702 faster. App 4602, as described in FIG. 46, may be responsible for controlling and coordinating social power sharing 200 within all users, including pocket-forming.

Examples

In example #1 a user may be found at a crowded bus station where he or she may have a smartphone which battery is almost empty, At the bus station, the user may then follow the method social power sharing 4600, described in FIG. 46, to request power from other users or peers within the area. The user may then connect his or her smartphone to power sharing community 4600, using app 4602, and send a power request. If the number of users connected to power sharing community in app 4602 is at least 100, then the user may start receiving power for a certain amount of time to charge his or her phone up to a point that allows the smartphone to have power few more hours.

In example #2 a user may be found at a crowded airport where he or she may have a tablet which battery is full of charge. At the airport, other users, having multiple mobile devices, may also be found. The user may then decide to share his or her tablet's battery charge with others by following the method social power sharing 4600, described in FIG. 46. The user may then connect his or her tablet to power sharing community 4606, using app 4602, and join other users or peers ready for sharing power. If the number of users connected to power sharing community 4606 is at least 100, then the user may start transmitting power for a certain amount of time to charge the user's mobile device that may have request for power and allow the mobile device to have power few more hours.

In example #3 users may configure app 4602 in their mobile devices to charge money for their power. In other words, a user may join a network where you can purchase or sell a certain amount of power to others. This latter modality may work for users that usually carry extra batteries and want to find a way to make some extra money.

FIGS. 46 and 47 illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 46 and 47.

Presented below are example apparatuses and methods for wirelessly sharing power between mobile electronic devices in public or other spaces.

An apparatus for wirelessly sharing power between mobile electronic devices in public or other spaces may include: (i) an application software configuring each mobile device to have a pocket-forming transmitter for generating power RF waves to form pockets of energy for wirelessly transmitting power in the form of pockets of energy and (ii) a power sharing community network defined by a mobile device having the application software installed thereon for directing the pockets of energy from transmitters associated with mobile devices having batteries charged to a predetermined limit to share power with mobile devices having low charged batteries.

In some embodiments, the communicating mobile devices on the power sharing network employ a predetermined number of mobile devices connected and synced together to send pockets of energy to a single or targeted mobile device.

In some embodiments, the mobile devices on the power sharing network scan for peer mobile devices to join together and to constantly check how much power is being transmitted to a low battery mobile device.

In some embodiments, the mobile electronic devices comprise built-in hardware that runs either or both Wi-Fi and Bluetooth wireless power sharing.

In some embodiments, the application software sets predetermined parameters for sharing or receiving power with or from other mobile devices on the network. Furthermore, in some embodiments, the predetermined parameters comprise a minimum battery charge on each mobile device to start sharing power on the network and comprises a limit on the battery charge from each mobile device shared with another mobile device on the network.

In some embodiments, the application software is configured to be compatible with any operating system for mobile devices.

In some embodiments, the pocket-forming transmitter of the powering mobile devices on the community network comprises a battery connected to a microcontroller with the application software for controlling a radio frequency integrated chip for driving at least two antennas for pocket-forming and for adjusting the transmitter antennas to form the pockets of energy used by a receiver on a targeted mobile device for powering or charging the same.

In some embodiments, the mobile devices receive recharge power from other mobile devices on the community network and then go back to a check battery status when fully charged and becomes a power sharing mobile device on the network.

In some embodiments, the mobile devices each comprise a receiver communicating on the community network for capturing the pockets of energy converging in 3-dimensional space through antennas to charge or power a battery when below a minimum battery charge.

In another apparatus for wireless sharing of power between mobile electronic devices in public or other spaces, the apparatus may include: (i) an application software for downloading to mobile electronic devices to configure the mobile devices to transmit pocket-forming controlled RF power waves to form pockets of energy that converge in 3-dimensional space and (ii) communication circuitry on each mobile device driven by the application software with predetermined parameters for networking each mobile device with the application software to either power share or power receive from a power sharing community network comprising the mobile electronic devices.

A method for wirelessly sharing power between mobile electronic devices in public or other spaces may include: (i) downloading application software to mobile electronic devices, (ii) networking mobile electronic devices with the application software together into a power sharing community network between mobile electronic devices, (iii) transforming each mobile electronic device with the application software into a pocket-forming transmitter on the power sharing community network, and (iv) emitting controlled RF power waves from the mobile electronic devices on the network to power other networked mobile devices through pockets of energy.

In some embodiments, the method comprises broadcasting short RF signals through antenna elements in the transmitter and a receiver on each mobile device with the application software for communicating between the transmitter and the receiver on one mobile device to at least one other mobile device on the power sharing community network to establish a path or channel for the pockets of energy from each mobile device to converge in 3-dimensional space upon antennas of the receiver of a targeted mobile electronic device for charging or powering the same.

In some embodiments, the method comprises utilizing adaptive pocket-forming to regulate the pockets of energy to power the mobile electronic devices on the community network.

In some embodiments, the method comprises scanning for peer mobile electronic devices on the community network to check battery status of each peer mobile device on the network to determine if each mobile device on the network is in a power mode for sharing power on the community network or in a low power mode requiring charging from the community network.

Figure 48A:
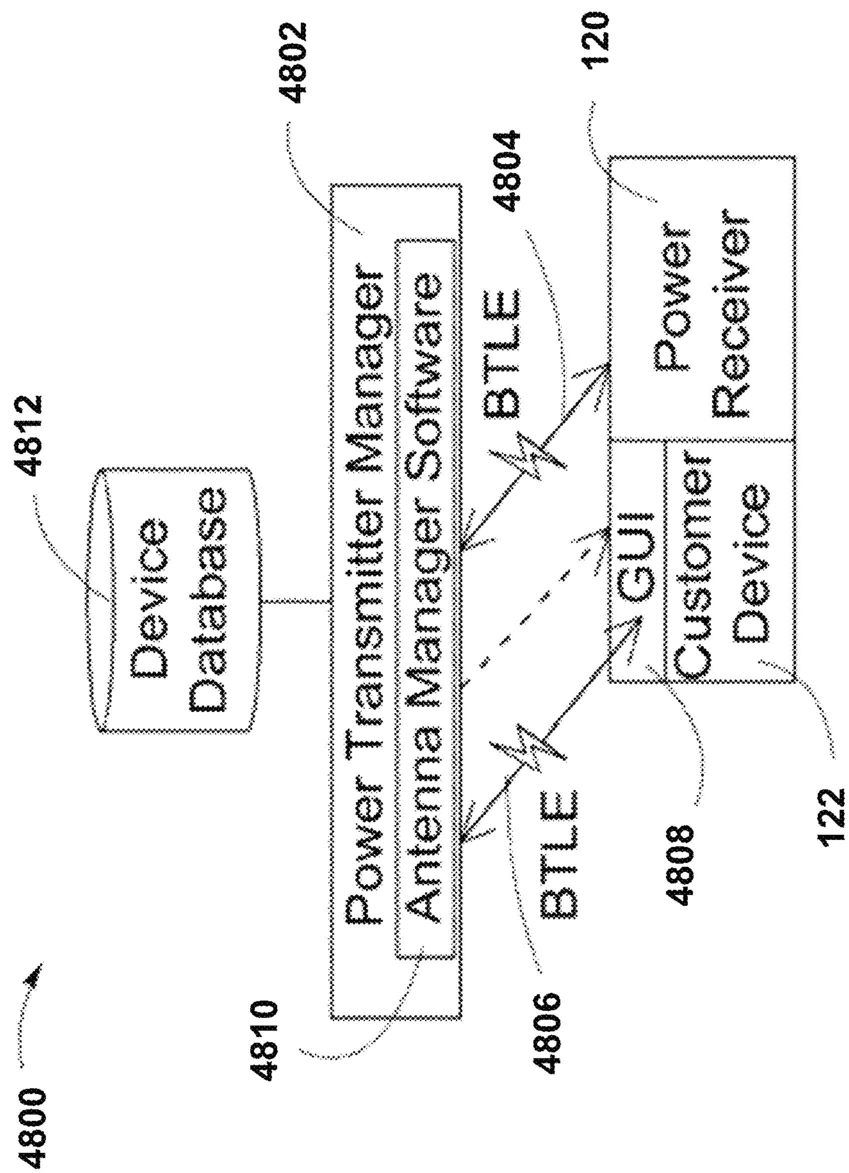
FIG. 48A illustrates a wireless power transmission system using a wireless power transmitter manager, in accordance with some embodiments.
Figure 48B:
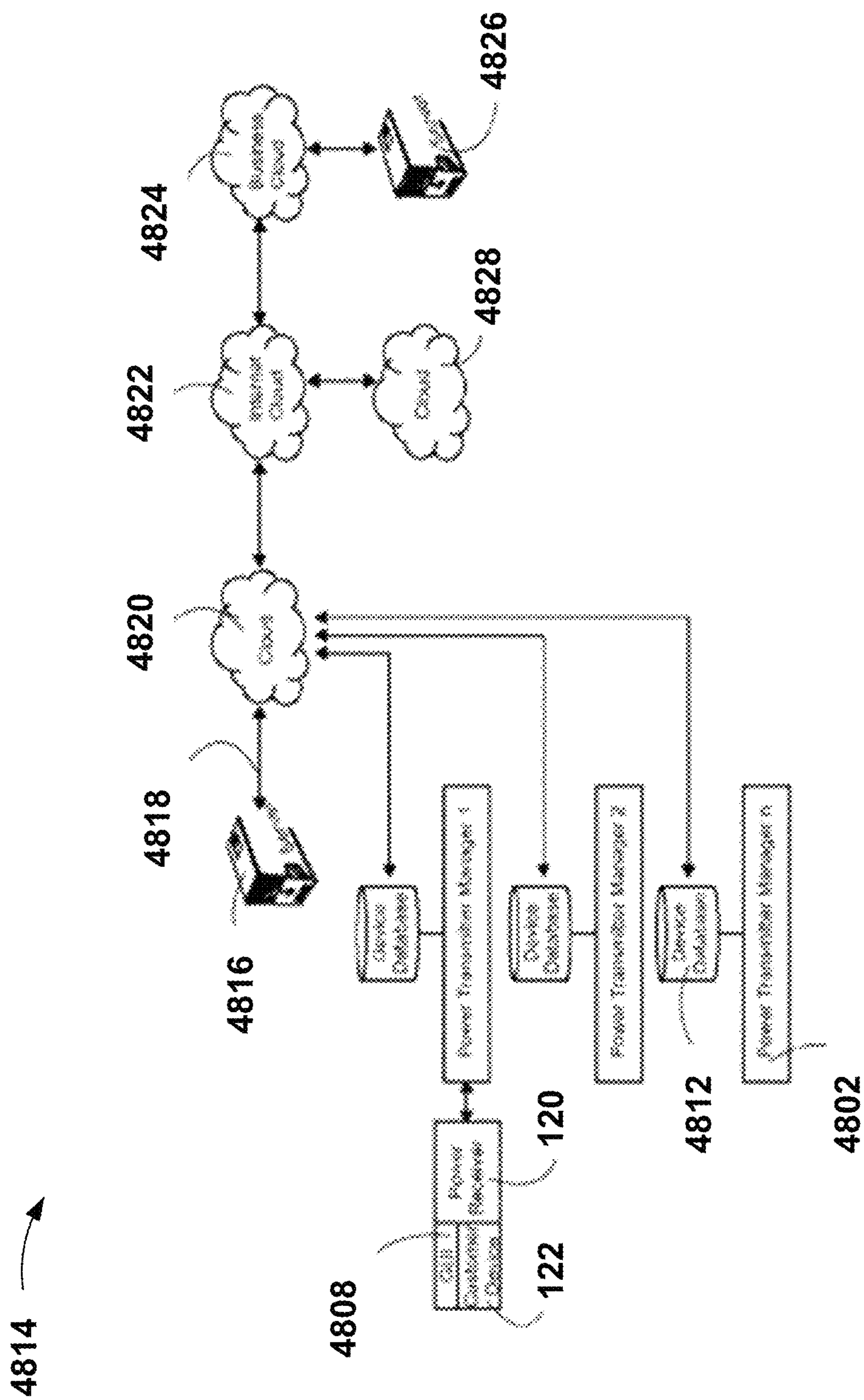
FIG. 48B illustrates a wireless power transmission network, in accordance with some embodiments.
Figure 48C:
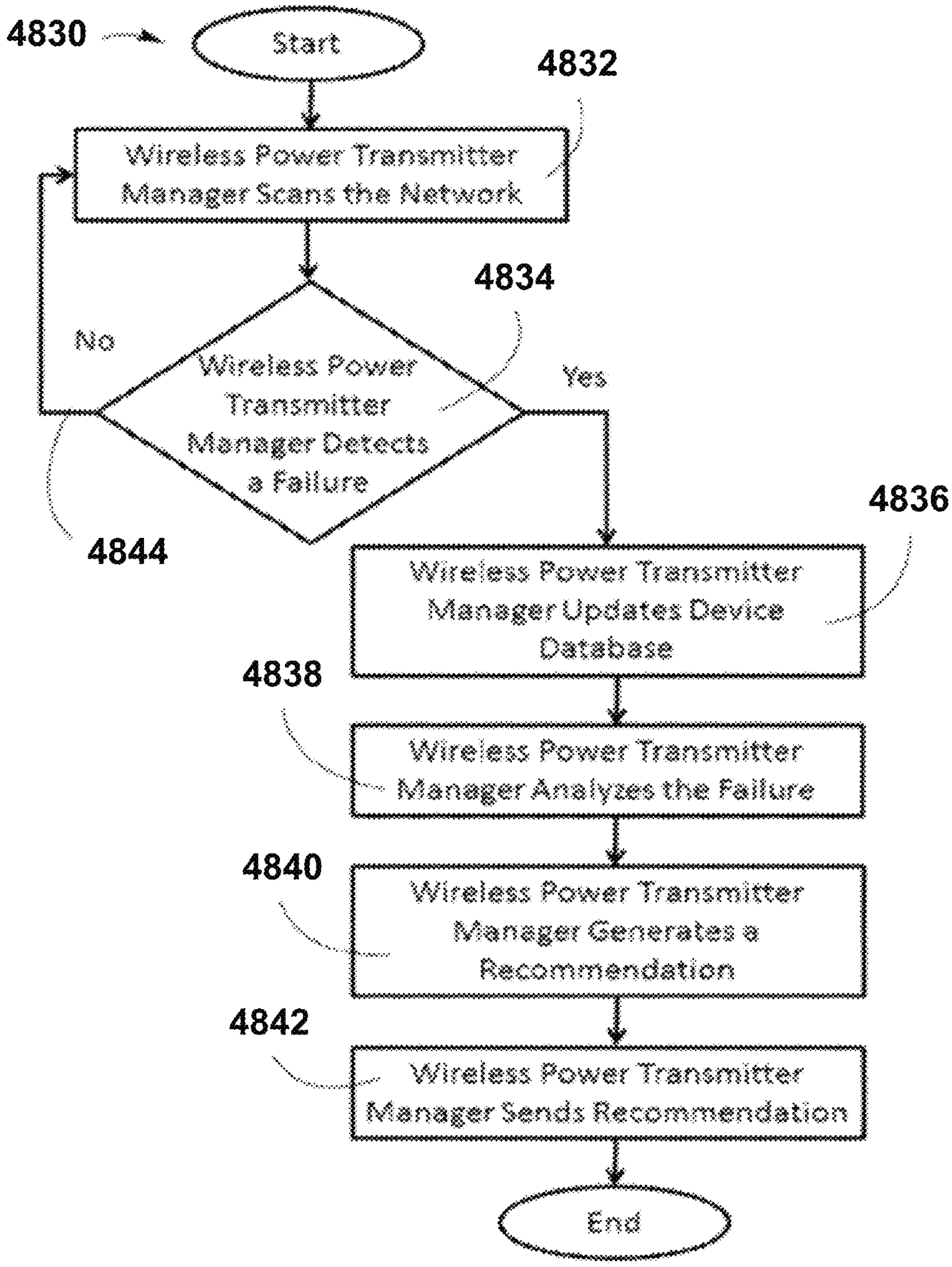
FIG. 48C is a flowchart of a method for self-system analysis in a wireless power transmission network, in accordance with some embodiments.

FIGS. 48A-48C illustrate wireless power transmission systems, networks, and methods, in accordance with some embodiments.

FIG. 48A shows a wireless power transmission system 4800 using a wireless power transmitter manager 4802, according to an embodiment. Wireless power transmitter manager 4802 may include a processor with computer-readable medium, such as a random access memory (RAM) (not shown) coupled to the processor. Examples of processor may include a microprocessor, an application specific integrated circuit (ASIC), and field programmable object array (FPOA), among others.

Wireless power transmitter manager 4802 may transmit controlled radio RF waves which may converge in 3-dimensional space to a wireless power receiver 120 (FIG. 1) for charging or powering a customer device 122 (FIG. 1). These RF waves may be controlled through phase and/or relative amplitude adjustments to form constructive and destructive interference patterns (pocket-forming). Pockets of energy may form at constructive interference patterns and can be 3-dimensional in shape whereas null-spaces may be generated at destructive interference patterns.

Wireless power receiver 120 may be paired with customer device 122 or may be built into customer device 122. Examples of customer devices 122 may include laptop computer, smartphones, tablets, music players, and toys, among other. Customer device 122 may include a graphical user interface (GUI) 4808. Wireless power transmitter manager 4802 may receive customer device's signal strength from advertisement emitted by wireless power receiver 120 and GUI 4808 for detecting if wireless power receiver 120 is paired with GUI 4808 and also for the purpose of detecting if wireless power receiver 120 is nearer to wireless power transmitter manager 4802 than to any other wireless power transmitter manager 4802 in the wireless power transmission system 4800. Wireless power receiver 120 may be defined as assigned to wireless power transmitter manager 4802, which may have exclusive control and authority to change the wireless power receiver's record in device database 4812 until wireless power receiver 120 moves to a new location closer to another wireless power transmitter manager 4802. An individual copy of wireless power receiver's record may be stored in device database 4812 of each wireless power transmitter manager 4802 and also in each server of wireless power transmission system 4800, through a cloud (not shown in FIG. 48A).

According to some aspects of this embodiment, one or more servers (not shown in FIG. 48A) may be a backup of device database 4812 shared by every wireless power transmitter manager 4802 in wireless power transmission system 4800.

Wireless power transmitter manager 4802 may transfer power in a range up to 30 feet.

Wireless power transmitter manager 4802 may use, but is not limited to, Bluetooth low energy (BTLE) to establish a communication link 4804 with wireless power receiver 120 and a control link 4806 with customer device's GUI. Wireless power transmitter manager 4802 may use control link 4806 to receive commands from and receive pairing information from customer device's GUI.

Wireless power transmitter manager 4802 may include antenna manager software 4810 to track customer device 122. Antenna manager software 4810 may use real time telemetry to read the state of the power received by customer device 122.

According to some aspects of this embodiment, wireless power transmitter manager 4802 may include a device database 4812, where device database 4812 may store three sub-dimensions of data: past, present, and future. The future data may include customer device's 122 power schedules. The present data may include the locations and/or movements in the system, configuration, pairing, errors, faults, alarms, problems, messages sent between the wireless power devices, and tracking information, among others. The past data may include details such as the amount of power customer device 122 used, the amount of energy that was transferred to customer device's battery, and thus sold to the customer who has or owns the device, the amount of time customer device 122 has been assigned to a given wireless power transmitter manager, when did customer device 122 start pairing with GUI 4808, activities in the system, any action or event of any wireless power device in the system, errors, faults, and design problems, among others, for each customer device 122 in wireless power transmission system 4800. Device database 4812 may also store customer device's power schedule, customer device's status, names, customer sign-in names, authorization and authentication credentials, encrypted information, areas, details running the system, and information about all wireless power devices such as wireless power transmitter managers, wireless power receivers, end user hand-held devices, and servers, among others.

In other situations, there can be multiple wireless power transmitter managers 4802 and/or multiple wireless power receivers 120 for powering various customer devices 122.

FIG. 48B illustrates a wireless power transmission network 4801, according to an embodiment.

In a wireless power transmission network 4801, multiple wireless power transmitter managers and/or multiple wireless power receivers may be used for powering various customer devices 122 (FIG. 1). A wireless power receiver 120 (FIG. 1) may be paired with customer device 122 or may be built in customer device 122. Examples of customer devices 122 may include smartphones, tablets, music players, toys and others at the same time. Customer device 122 may include a graphical user interface (GUI) 4808.

Each wireless power transmitter manager 4802 in wireless power transmission network 4801 may receive customer device's signal strength from advertisement emitted by wireless power receiver 120 and GUI 4808 for the purpose of detecting if wireless power receiver 120 is paired with GUI 208 and also for detecting if wireless power receiver 120 is nearer to wireless power transmitter manager 4802 than to any other wireless power transmitter manager 4802 in the wireless power transmission network 4801. Wireless power receiver 120 may be defined as assigned to wireless power transmitter manager 4802, which may have exclusive control and authority to change the wireless power receiver's record in device database 4812 until wireless power receiver 120 moves to a new location closer to another wireless power transmitter manager 4802. An individual copy of wireless power receiver's record may be stored in device database 4812 of each wireless power transmitter manager 4802 and also in each server 4816 of wireless power transmission network 4814, through a cloud 4818.

According to some aspects of this embodiment, one or more servers 4816 may function as a backup of device database 4812 in the wireless power transmission network 4814. Server 4816 may search devices in wireless power transmission network 4814. Server 4816 may locate device database 4812 through user datagram protocol (UDP) packets that are broadcast when a given wireless power transmitter manager 4802 boots up. The UDP packet may include the universally unique identifier (UUID) of wireless power transmitter manager 4802 and also its location. To back up a specific device database 4812, server 4816 may request access to a given wireless power transmitter manager 4802 in the network 4814. Server 4816 may establish a connection with wireless power transmitter managers 4802 and wireless power transmitter manager 4802 may accept the connection and wait for the first amount of data from server 4816. The first amount of data may be 128 bits UUID and once wireless power transmitter manager 4802 verifies the data, it may allow server 4816 to read a device database 4812. Server 4816 may backup device database 4812. Also wireless power transmitter manager 4802 may be able to reestablish its own device database 4812 from the information stored in server 4816. For example, if a given wireless power transmitter manager 4802 experiences a power interruption, resulting in a software restart or system boot up, it may broadcast a UDP packet to search any server 4816 in the network 4814. Once wireless power transmitter manager 4802 finds server 4816, it may establish a TCP connection to restore its own device database 4812.

Each wireless power transmitter manager in wireless power transmission network 4814 may include device database 4812. When a record change in a given device database 4812, this change may be distributed to all device databases 4812 in wireless power transmission network 4814.

Device database 4812 may store three sub-dimensions of data: past, present, and future. The future data may include customer device's 122 power schedules. The present data may include the locations and/or movements in the system, configuration, pairing, errors, faults, alarms, problems, messages sent between the wireless power devices, and tracking information, among others. The past data may include details such as the amount of power customer device 122 used, the amount of energy that was transferred to customer device's battery, and thus sold to the customer who has or owns the device, the amount of time customer device 122 has been assigned to a given wireless power transmitter manager 4802, when did customer device 122 start pairing with GUI 4808, activities in the system, any action or event of any wireless power device in the system, errors, faults, and design problems, among others, for each customer device 122 in wireless power transmission network. Device database 4812 may also store customer device's power schedule, customer device's status, names, customer sign-in names, authorization and authentication credentials, encrypted information, areas, details running the system, and information about all wireless power devices such as wireless power transmitter managers, wireless power receivers, end user hand-held devices, and servers, among others.

Each wireless power device in wireless power transmission network 4814 may include a UUID. When a given wireless power transmitter manager 4802 boots up, and periodically thereafter, it may broadcast a UDP packet that contains its unique UUID, and status to all devices in wireless power transmission network 4814. The UDP packet is only distributed through the local network. Each wireless power transmitter manager 4802 and server 4816 in wireless power transmission network may establish, but is not limited to, a WiFi connection 4818 to share updated device database's records between other wireless power devices in the system, including such device database information as: quality control information, wireless power device's status, wireless power device's configuration, control, logs, schedules, statistics, and problem reports, among others.

In another aspect of this embodiment, any wireless power transmitter manager, besides using UDP packets to send information through wireless power transmission network 4814, may also use transmission control protocol (TCP) to exchange information outside the local network.

In another aspect of this embodiment, server 4816 and wireless power transmitter managers 4802 may be connected to a cloud 4818. Cloud 4818 may be used to share between wireless power devices any device database information, among others.

According to some aspects of this embodiment, each wireless power transmitter manager 4802 and server 4816 in the network may be connected to a business cloud 4824 through an internet cloud 4822. Business cloud 4824 may belong to a given business using a service provider to offer wireless power transfer to their users. Business cloud 4824 may be connected to a business service provider server 4826. Business service provider server 4826 may store marketing information, customer billing, customer configuration, customer authentication, and customer support information, among others.

Internet cloud 4822 may be also connected to a service provider cloud 4828. Service provider cloud 4828 may store marketing and engineering information, such as less popular features, errors in the system, problems report, statistics, and quality control, among others.

Each wireless power transmitter manager 4802 may periodically establish a TCP connection with business cloud 4824 and service provider cloud 4828 to send its respective device database 4812.

In a different aspect of this embodiment, each wireless power transmitter manager 4802 in wireless power transmission network 4814 may be able to detect failures in the network. Examples of failure in the network may include overheating in any wireless power transmitter manager 4802, malfunction, and overload, among others. If a failure is detected by any of wireless power transmitter manager 4802 in the system, then the failure may be analyzed by any wireless power transmitter manager 4802 in the system. After the analysis is completed, a recommendation may be generated to enhance or correct the system. The recommendation may be sent through cloud 4820 to business service provider server 4826 and also to service provider cloud 4828. Service provider cloud 4828 may use the recommendation as quality control, engineering control, and to generated statistics, among others. Also, the recommendation may be communicated to the person in charge of managing wireless power transmission network 4814 by text messages or email. Also, any device in the network with a copy of device database 4812 may be able to perform an analysis and generate a recommendation to enhance or correct the system.

In another aspect of this embodiment, each wireless power transmitter manager 4802 may send an alert message for different conditions, where wireless power transmitter manager 4802 may include an LED, which blinks for indicating under which conditions wireless power transmitter manager 4802 may be working.

In another aspect of this embodiment, wireless power transmitter manager 206 may be able to detect failures on its own performance. If wireless power transmitter manager 4802 detects a failure, the analysis may be performed locally by wireless power transmitter manager 4802. After the analysis is completed, a recommendation may be generated to enhance or correct the system. Then wireless power transmitter manager 4802 may send the information through cloud 4820 to business service provider server 4826 and service provider cloud 4828. Also the recommendation may be communicated to the person in charge of managing wireless power transmission network 4814 by text messages or email.

FIG. 48C is a flowchart 4830 of a method for self-system analysis in a wireless power transmission network, according to an embodiment.

In a wireless power transmission network, multiple wireless power transmitter managers and/or multiple wireless power receivers may be used for powering various customer devices.

Each wireless power transmitter manager in the system may scan the wireless power transmission network, at step 4832. Each wireless power transmitter manager in wireless power transmission network may receive customer device's signal strength from advertisement emitted by a wireless power receiver and a graphical user interface (GUI) for the purpose of detecting if a wireless power receiver is paired with GUI and also for detecting if wireless power receiver is nearer to wireless power transmitter manager than to any other wireless power transmitter manager in the wireless power transmission network. Wireless power receiver may be defined as assigned to wireless power transmitter manager, which may have exclusive control and authority to change the wireless power receiver's record in device database until wireless power receiver moves to a new location closer to another wireless power transmitter manager. An individual copy of wireless power receiver's record may be stored in device database of each wireless power transmitter manager and also in each server of wireless power transmission network, through a cloud.

According to some aspects of this embodiment, one or more servers may function as a backup of the device database in the wireless power transmission network. The servers and wireless power transmitter managers in the wireless power transmission network may be connected to the cloud. The cloud may be used to share between system devices: quality control information, statistics, and problem reports, among others.

Wireless power transmitter manager may search for wireless power receivers to communicate with and send power. A wireless power receiver may be paired with customer device or may be built in customer device. Examples of customer devices may include smartphones, tablets, music players, toys and others at the same time. Customer device may include a GUI.

Wireless power transmitter manager may be able to detect failures in the wireless power transmission network, at step 4834. Examples of failure may include loss of power, failure in the hardware or software of the wireless power transmitter manager, malfunction in a wireless power transmitter manager, and overload of the wireless power transmitter manager, and malfunction in a wireless power receiver, overheating or other environmental problems, and intrusion, among others.

If wireless power transmitter manager detects a failure in the wireless power transmission network, it may update its device database to register the failure, at step 4836. Each wireless power transmitter manager in wireless power transmission network may include a device database, where device database may store three sub-dimensions of data: past, present, and future. The future data may include customer devices power schedules. The present data may include the locations and/or movements in the system, configuration, pairing, errors, faults, alarms, problems, messages sent between the wireless power devices, and tracking information, among others. The past data may include details such as the amount of power customer device used, the amount of energy that was transferred to customer device's battery, and thus sold to the customer who has or owns the device, the amount of time customer device has been assigned to a given wireless power transmitter manager, when did customer device start pairing with the graphical user interface (GUI), activities in the system, any action or event of any wireless power device in the system, errors, faults, and design problems, among others, for each customer device in wireless power transmission network. Device database may also store customer device's power schedule, customer device's status, names, customer sign-in names, authorization and authentication credentials, encrypted information, areas, details running the system, and information about all wireless power devices such as wireless power transmitter managers, wireless power receivers, end user hand-held devices, and servers, among others.

When a record changes in a given device database, this change may be distributed to all device databases in wireless power transmission network.

Subsequently, wireless power transmitter manager may analyze the failure in the wireless power transmission network, at step 4838. In another aspect of this embodiment the failure may be analyzed by any device in the wireless power transmission network with a copy of device database.

After the analysis is completed, a recommendation may be generated to enhance or correct the system, at step 4840.

Wireless power transmitter manager may send the recommendation to a business service provider server and also to service provider cloud, at step 4842. Service provider cloud may use the recommendation as quality control, engineering control, and to generated statistics, among others. Also, the recommendation may be communicated to the person in charge of managing wireless power transmission network by text messages or email.

Else wireless power transmitter manager may continue scanning the wireless power transmission network, at step 4844.

Example

An example is a wireless power transmission network with components similar to those described in FIG. 48B. The wireless power transmission network may be working in a school, where students may charge their electronic devices wirelessly. A student may be charging his cellphone in the science classroom. The student starts moving because he needs to take another class in a different classroom. The student arrives to the computer classroom, but he is unable to continue charging his cellphone. At the same time that the student arrives to the computer classroom, the wireless power transmitter manager near the computer classroom exceeds the amount of electronic devices to be powered. Wireless power transmitter manager may detect a failure in its performance and may start analyzing the reason performance was affected. Wireless power transmitter manager may find that an overload was the reason of its performance being affected. After the analysis is completed, a recommendation may be generated to enhance the system by installation of another wireless power transmitter manager. This recommendation may be sent to the manager of the wireless power transmission network by text messages or email. Also, the recommendation may be sent to the school service provider server and to the service provider cloud.

FIGS. 48A-48C illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 48A-48C.

Presented below are example systems and methods for wirelessly providing power and detecting faults.

A system for wirelessly providing power may include: (i) a plurality of power sources, each comprising a wireless power transmitter and a wireless power transmitter manager, operatively coupled to the wireless power transmitter, where the wireless power transmitter manager is configured to control RF waves to form three-dimensional pockets of energy for providing power from the wireless power transmitter to a respective receiver, and where each of the wireless power transmitters are configured to detect a fault in at least one of the wireless power transmitter and the respective receiver, (ii) a communication apparatus for communicating with a network, and (iii) a server, communicatively coupled to each of the plurality of power sources via the network, the server being configured to receive any of the detected faults transmitted from the power sources, process the received faults and provide a recommendation for correcting the received fault.

In some embodiments, each of the plurality of power sources further comprises a storage device operatively coupled to the wireless power transmission manager, the storage device being configured to store information for a device associated with the receiver that is registered with each power source, and communicate the information to a cloud. Furthermore, in some embodiments, each of the wireless power transmitter managers are configured to update the stored information for the device in response to the detected fault. Furthermore, in some embodiments, the device information comprises at least one of (1) a power schedule for the device, (2) location of the device, (3) movement of the device, (4) configuration of the device, (5) amount of power used by the device, (6) amount of power transmitted to the device from the wireless power transmitter, (7) pairing of the device with the system, and (8) other wireless power devices registered with the device. Furthermore, in some embodiments, the server is configured to receive the stored information for each device associated with the respective receiver that is registered with each power source. Furthermore, in some embodiments, the wireless power transmission manager is configured to process the information for the device to determine at least one of quality control information, device status, wireless power transmitter configuration, control, statistics and problem reports.

In some embodiments, the communication apparatus is configured to receive the recommendation from the server in response to the transmission of the detected fault.

In some embodiments, the server is further configured to receive information regarding at least one receiver's location to its respective power source and to other power sources in the system.

In some embodiments, the communication apparatus is configured to communicate to a business cloud within the cloud.

In some embodiments, the wireless power transmitter is configured to transmit the detected fault to the network via the communication apparatus.

A method for wirelessly providing power may include: (i) controlling RF waves in a wireless power transmitter via a wireless transmitter manager, to form three-dimensional pockets of energy for providing power from the wireless power transmitter to a receiver, (ii) detecting, via the wireless power transmitter, a fault in at least one of the wireless power transmitter and the receiver, and (iii) transmitting the detected fault to a network via a communication apparatus.

FIGS. 49-56 illustrate enhanced receivers, transmitters, and methods for performing maximum power point transfer (MPPT), in accordance with some embodiments.

Figure 49A:
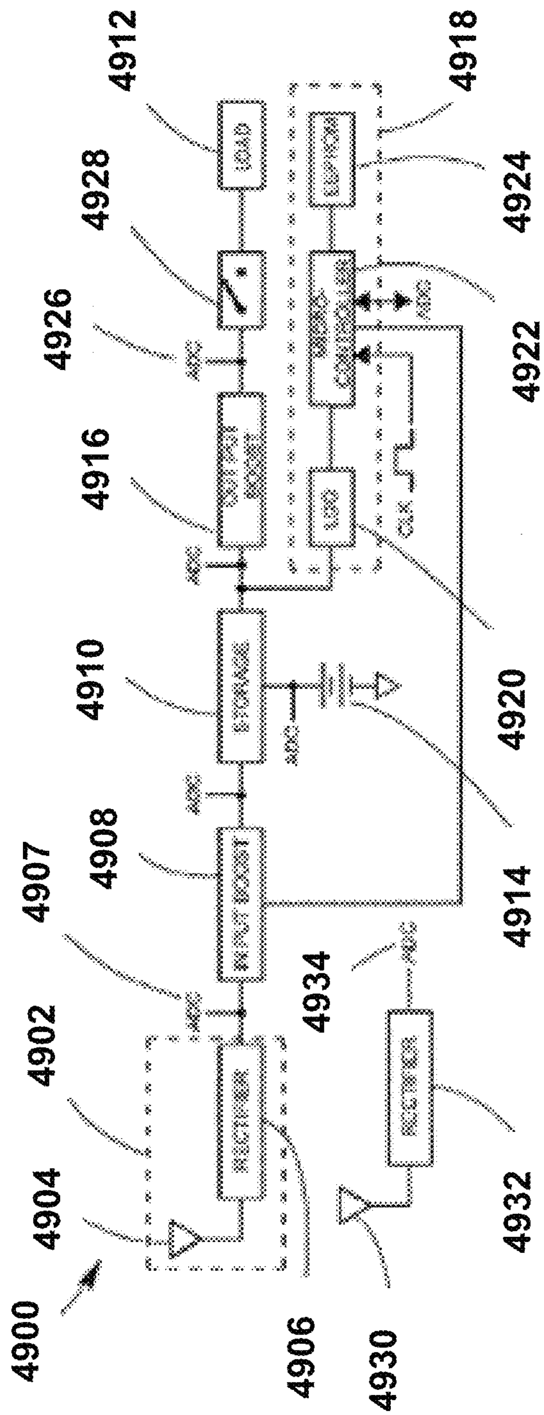
FIG. 49A illustrates a block diagram of an enhanced receiver that may be used for extracting and converting power from power transmission waves, in accordance with some embodiments.

FIG. 49A shows a block diagram of receiver configuration 4900 which can be used for wireless powering or charging one or more electronic devices 122 as exemplified in wireless power transmission 100 (FIG. 1). According to some aspects of this embodiment, receiver 120 may operate with the variable power source generated from transmitted RF waves 116 to deliver constant and stable power or energy to electronic device 122. In addition, receiver 120 may use the variable power source generated from RF waves 116 to power up electronic components within receiver 120 for proper operation.

Receiver 120 may be integrated in electronic device 122 and may include a that can be made of any suitable material to allow for signal or wave transmission and/or reception, for example plastic or hard rubber. This housing may be an external hardware that may be added to different electronic equipment, for example in the form of cases, or can be embedded within electronic equipment as well.

Receiver 120 may include an antenna array 4902 which may convert RF waves 116 or pockets of energy into electrical power. Antenna array 4902 may include one or more antenna elements 4904 coupled with one or more rectifiers 4906. RF waves 116 may exhibit a sinusoidal shape within a voltage amplitude and power range that may depend on characteristics of transmitter 102 and the environment of transmission. The environment of transmission may be affected by changes to or movement of objects within the physical boundaries, or movement of the boundaries themselves. It is also affected by changes to the medium of transmission; for example, changes to air temperature or humidity. As a result, the voltage or power generated by antenna array 4902 at the receiver 120 may be variable. As an illustrative embodiment, and not by way of limitation, the alternating current (AC) voltage or power generated by antenna element 4904 from RF waves 116 or pocket of energy may vary from about 0 volts at 0 watts to about 5 volts at 3 watts.

Antenna element 4904 may include suitable antenna types for operating in frequency bands similar to the bands described for transmitter 102 from FIG. 1. Antenna element 4904 may include vertical or horizontal polarization, right hand or left hand polarization, elliptical polarization, or other suitable polarizations as well as suitable polarization combinations. Using multiple polarizations can be beneficial in devices where there may not be a preferred orientation during usage or whose orientation may vary continuously through time, for example electronic device 122. On the contrary, for devices with well-defined orientations, for example a two-handed video game controller, there might be a preferred polarization for antennas which may dictate a ratio for the number of antennas of a given polarization. Suitable antenna types may include patch antennas with heights from about ⅛ inch to about 6 inches and widths from about ⅛ inch to about 6 inches. Patch antennas may have the advantage that polarization may depend on connectivity, i.e. depending on which side the patch is fed, the polarization may change. This may further prove advantageous as receiver 120 may dynamically modify its antenna polarization to optimize wireless power transmission.

Rectifier 4906 may include diodes or resistors, inductors or capacitors to rectify the AC voltage generated by antenna element 4904 to direct current (DC) voltage. Rectifier 4906 may be placed as close as is technically possible to antenna element 4904 to minimize losses. In one embodiment, rectifier 4906 may operate in synchronous mode, in which case rectifier 4906 may include switching elements that may improve the efficiency of rectification. As an illustrative embodiment and not by way of limitation, input boost converter 4908 may operate with input voltages of at least 0.6 volts to about 5 volts to produce an output voltage of about 5 volts. In addition, input boost converter 4908 may reduce or eliminate rail-to-rail deviations and may operate as a step-up DC-to-DC converter to increase the voltage from rectifier 4906 to a voltage level suitable for proper operation of receiver 120. In one embodiment, intelligent input boost converter 4908 may exhibit a synchronous topology to increase power conversion efficiency.

As the voltage or power generated from RF waves 116 may be zero at some instants of wireless power transmission, receiver 120 can include a storage element 4910 to store energy or electric charge from the output voltage produced by input boost converter 4908. In this way, storage element 4910 may deliver a constant voltage or power to a load 4912 which may represent the battery or internal circuitry of electronic device 122 requiring continuous powering or charging. For example, load 4912 may be the battery of a mobile phone requiring constant delivery of 5 volts at 2.5 watts.

Storage element 4910 may include a battery 4914 to store power or electric charge from the voltage received from input boost converter 4908. Battery 4914 may be of different types, including but not limited to, alkaline, nickel-cadmium (NiCd), nickel-metal hydride (NiHM), and lithium-ion, among others. Battery 4914 may exhibit shapes and dimensions suitable for fitting receiver 120, while charging capacity and cell design of battery 4914 may depend on load 4912 requirements. For example, for charging or powering a mobile phone, battery 4914 may deliver a voltage from about 3 volts to about 4.2 volts.

In another embodiment, storage element 4910 may include a capacitor (not shown in FIG. 49A) instead of battery 4914 for storing and delivering electrical charge or power to load 4912. As a way of example, in the case of charging or power a mobile phone, receiver may include a capacitor with operational parameters matching the load device's power requirements.

Receiver 120 may also include an output boost converter 4916 operatively coupled with storage element 4910 and input boost converter 4908, where this output boost converter 4916 may be used for matching impedance and power requirements of load 4912. As an illustrative embodiment, and not by way of limitation, output boost converter 4916 may increase the output voltage of battery 4914 from about 3 or 4.2 volts to about 5 volts which may be the voltage required by the battery 4914 or internal circuitry of a mobile phone. Similar to input boost converter 4908, output boost converter 4916 may be based on a synchronous topology for enhancing power conversion efficiency.

Storage element 4910 may provide power or voltage to a communication subsystem 4918 which may include a low-dropout regulator (LDO 4920), a main system micro-controller 4922, and an electrically erasable programmable read-only memory (EEPROM 4924). LDO 4920 may function as a DC linear voltage regulator to provide a steady voltage suitable for low energy applications as in main system micro-controller 4922. Main system micro-controller 4922 may be operatively coupled with EEPROM 4924 to store data pertaining to the operation and monitoring of receiver 120. Main system micro-controller 4922 may also include a clock (CLK) input and general purpose inputs/outputs (GPIOs).

In one embodiment, intelligent input boost converter 4908 may include a built-in micro-controller (not shown in FIG. 49A) operatively coupled with a main system micro-controller 4922. The main system micro-controller 4922 may actively monitor the overall operation of receiver 120 by taking one or more power measurements 4926 (ADC) at different nodes or sections as shown in FIG. 49A. For example, main system micro-controller 4922 may measure how much voltage or power is being delivered at rectifier 4906, input boost converter 4908, battery 4914, output boost converter 4916, communication subsystem 4918, and/or load 4912. Main system micro-controller 4922 may communicate these power measurements 4926 to load 4912 so that electronic device 122 may know how much power it can pull from receiver 120. In another embodiment, main system micro-controller 4922, based on power measurements 4926, may control the power or voltage delivered at load 4912 by adjusting the load current limits at output boost converter 4916.

Main system micro-controller 4922 may monitor the voltage levels at the output of the main antenna array 4902 using ADC node point 4907.

In another embodiment, main system micro-controller 4922 may regulate how power or energy can be drained from storage element 4910 based on the monitoring of power measurements 4926. For example, if the power or voltage at input boost converter 4908 runs too low, then main system micro-controller 4922 may direct output boost converter 4916 to drain battery 4914 for powering load 4912.

Yet in another embodiment, receiver 120 may have a dedicated antenna element 4930 operatively coupled with a corresponding rectifier 4932, where these dedicated antenna element 4930 and rectifier 4932 may be used for continuously monitoring the surrounding pocket of energy. This dedicated antenna element 4930 may be separate from the main antenna array 4902. More specifically, the main system micro-controller 4922 may measure power level at ADC node point 4934 to compare against actual DC power levels extracted from the receiver 120 system.

Receiver 120 may include a switch 4928 for resuming or interrupting power being delivered at load 4912. In one embodiment, main system micro-controller 4922 may control the operation of switch 4928 according to terms of services contracted by one or more users of wireless power transmission 100 or according to administrator policies.

Figure 49B:
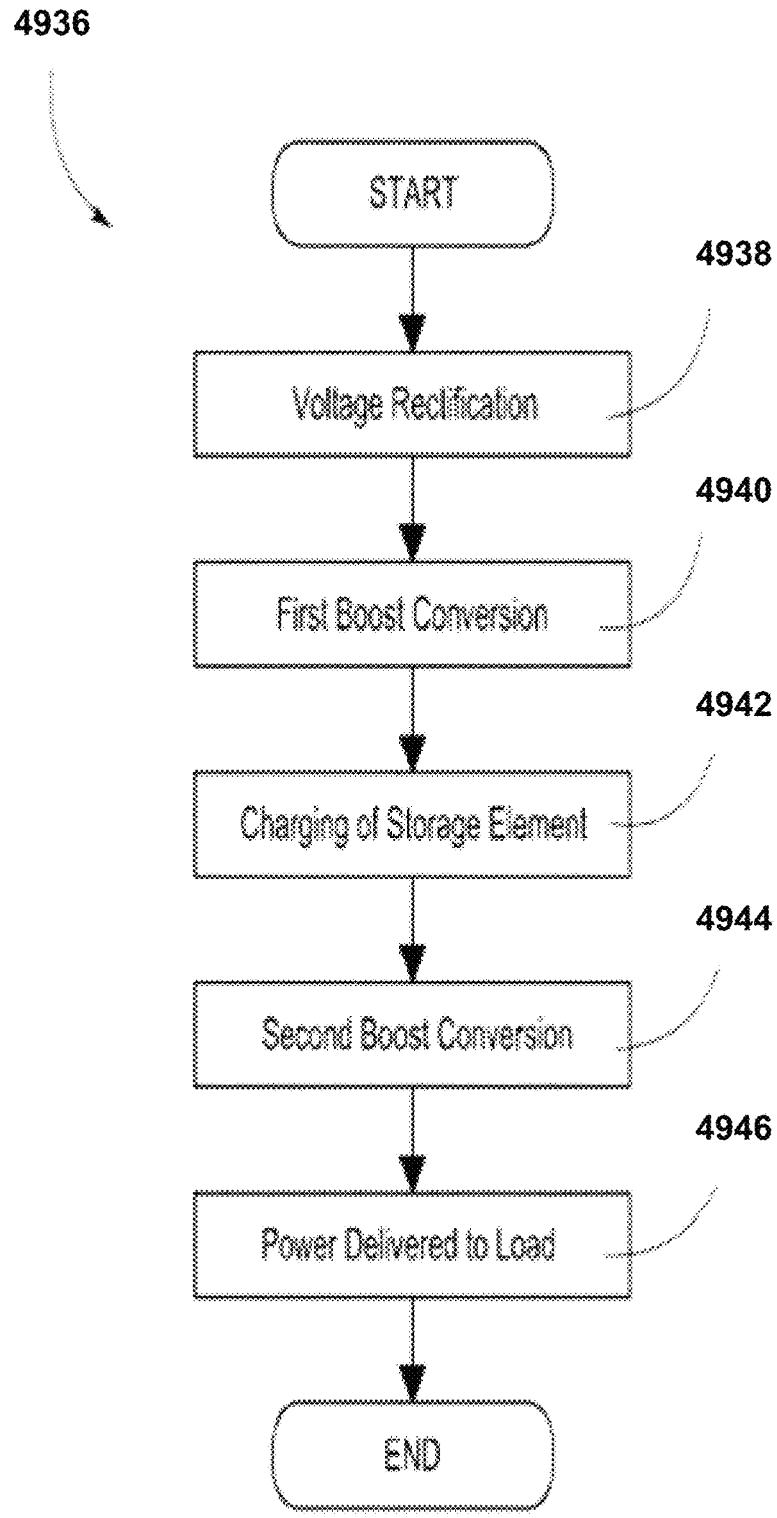
FIG. 49B illustrates a flowchart of a wireless power transmission process that may be implemented by an enhanced receiver during wireless power transmission, in accordance with some embodiments.

FIG. 49B shows an exemplary power conversion process 4936 that may be implemented in a receiver during wireless power transmission. According to some aspects of this embodiment, power conversion process 4936 may allow energy harvesting from power transmission waves from pockets of energy, which may provide voltage or power to internal components of a receiver, which may be embedded in an electronic device.

Power conversion process 4936 may start when antenna element may convert power transmission waves and/or pockets of energy into AC voltage or power. At step 4938, rectifier may rectify this AC voltage or power into DC voltage or power. The DC voltage or power generated at rectifier may be variable depending on conditions for extracting power from power transmission waves in a pocket of energy.

Subsequently at step 4940, input boost converter may step up the DC voltage or power obtained from rectifier to a voltage or power level that may be used by storage element or other internal components of receiver. In one embodiment, input boost converter may receive an input, which may be based on a maximum power point transfer (MPPT) algorithm, from micro-controller for adjusting and optimizing the amount of power that can be pulled from antenna array. The stabilized and increased voltage at input boost converter may be directly utilized by load, but it may not be continuous at all times given the inherently characteristics of power transmission waves.

The stabilized DC voltage produced by input boost converter may be used to charge storage element, where storage element may be in the form of a battery or a capacitor, at step 4942. Storage element may maintain suitable charging levels at all times for delivering continuous power to load. In addition, storage element may provide suitable power or voltage to communication subsystem.

The voltage or power generated by storage element can be step up by output boost converter to match impedance and power requirements of load, at step 4944. In one embodiment, micro-controller may set up current limits at output boost converter to adjust the amount of power being delivered at load according to the application.

After a second boost conversion, output boost converter may now supply stable and continuous power or voltage to load within suitable electrical specifications for charging or powering electronic device, which may be operatively coupled with receiver, at step 4946.

In some embodiments, a micro-controller may control switch to interrupt or resume the delivery of power or voltage at load, according to terms of services contracted by users of wireless power transmission service. For example, if wireless power transmission is a service provided to a user of receiver, then micro-controller, through the use of switch, can interrupt or resume the powering or charging of electronic device according to the status of user's contract. Furthermore, micro-controller may regulate the operation of switch based on charging or powering priorities established for one or more electronic devices. For example, micro-controller may open switch if the electronic device coupled with receiver has a lower powering or charging priority compared to another electronic device coupled with a suitable receiver that may require charging and that may have a higher priority for charging. In this case, transmitter may direct power transmission waves towards the receiver coupled with the electronic device, with higher charging and powering priority.

Figure 49C:
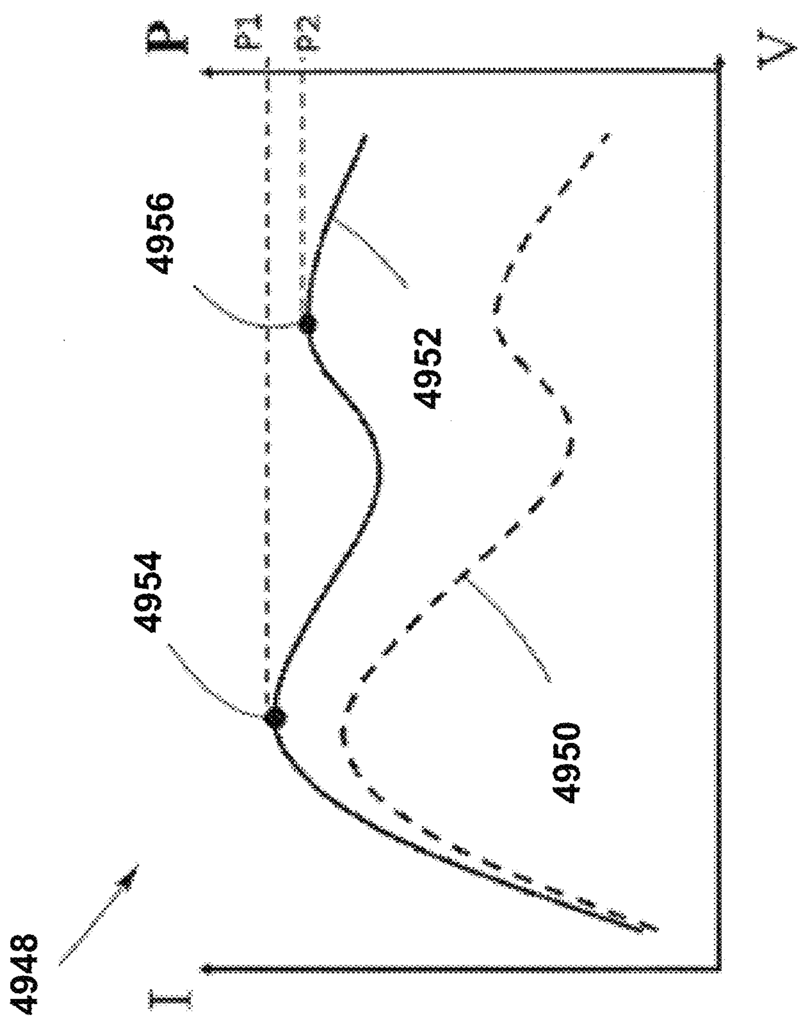
FIG. 49C illustrates the maximum power point transfer (MPPT) of characteristic curves, in accordance with some embodiments.

FIG. 49C illustrates a graph 4948, depicting (I) the intensity of current available from main antenna array, (P) the power available from main antenna array, and (V) the voltage from main antenna array. FIG. 49C shows a current-to-voltage curve 4950 that may be obtained from receiver 120 (FIG. 1) operation and which may vary according to the characteristics of receiver 120. FIG. 49C also shows a corresponding power curve 4952 which may represent the power available (current×voltage) from the main antenna array 4902.

In one embodiment, voltage levels measured at ADC node point 4907 may not necessarily exhibit a linear relationship with the available current from the main antenna array 4902. Thus, power curve 4952 may have multiple local peaks, including a global power maximum 4954 at P1, and a local power maximum 4956 at P2.

The MPPT algorithm running in the input boost converter 4908 may continuously track for a global power maximum 4954 in graph 4948, so that input boost converter 4908 may be able to extract the maximum amount of power from antenna array 4902. However, in some circumstances, the MPPT algorithm may be stuck at a local power maximum 4956 which may not correspond to the global power maximum 4954 in graph 4948. When operating at a local power maximum 4956, intelligent input boost converter 4908 may not be able to maximize the amount of power that can be extracted from antenna array 4902.

It may be an object of embodiments described herein to adjust the MPPT algorithm to control the operation of intelligent input boost converter 4908 so that it can continuously operate at global power maximum 4954 to make the best use of the power that can be extracted from antenna array 4902 in receiver 120 system.

Figure 49D:
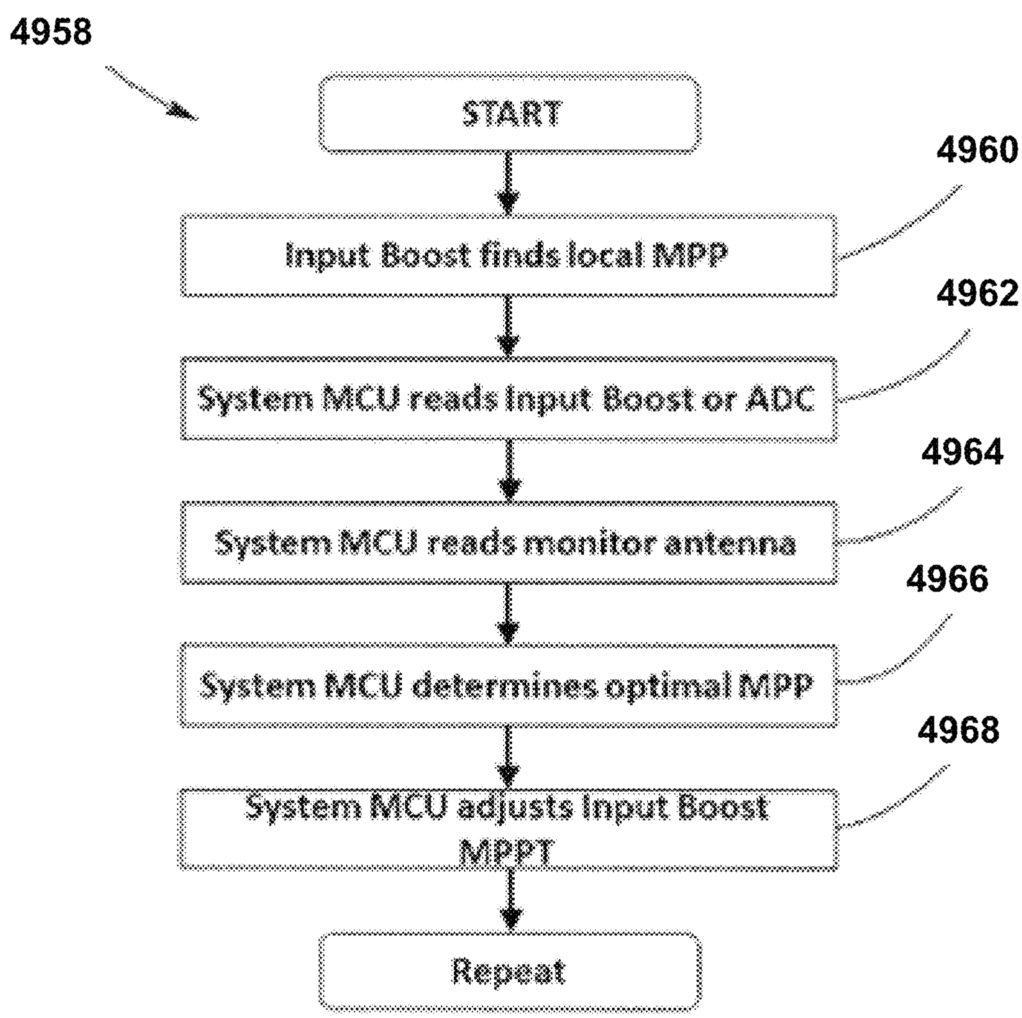
FIG. 49D illustrates a flowchart for the method enabled by the proprietary MPPT algorithm controlling maximum power point transfer and operation of the input boost converter, in accordance with some embodiments.

FIG. 49D shows a MPPT management method 4958 that may be used for maximizing the amount of power that can be extracted from antenna array 4902 to deliver continuous and suitable power to receiver 120 (FIG. 1).

At monitoring step 4960, the built-in micro-controller in the intelligent input boost converter 4908 may monitor voltage from antenna array 4902 and search for a global power maximum 4954 or local power maximum 4956.

At step 4962, the main system micro-controller 4922 may read the result from the input boost converter 4908 or use ADC node point 4907 to establish the input boost converter 4908 current operational MPPT. Subsequently, at step 4964, the main system micro-controller 4922 may read the voltage of dedicated antenna element 4930 at ADC node point 4934. At step 4966, the combination of the input boost converter 4908 MPP and the output value of dedicated antenna element 4904 may be used to either index a predefined look-up table or be used in an algorithm. This result may or may not require an adjustment of the operational input parameters of the input boost converter 308 MPPT algorithm. Once action is determined, the main system micro-controller 4922 may adjust the MPPT algorithm executed by input boost converter 4908, thus moving the operation of input boost converter 4908 from local power maximum 4956 P2 to global power maximum 4954 P1, at step 4968.

The predefined MPPT tables may include a characterization of a plurality of receivers 120 in terms of ability to extract power from a particular field. For example, the capability of receiver 120 for extracting power from RF waves 116 may vary according to the configuration of antenna array 4902. In one embodiment, these MPPT tables may be determined by laboratory measurements of different receivers 120 in a way that a particular receiver 120 may be mapped to an optimal MPPT.

In one embodiment, main system micro-controller 4922 may use the information contained in MPPT tables to provide initial conditions for running an optimal MPPT at intelligent input boost converter 4908 according to the specific characteristics or configuration of receiver 120.

Figure 50A:
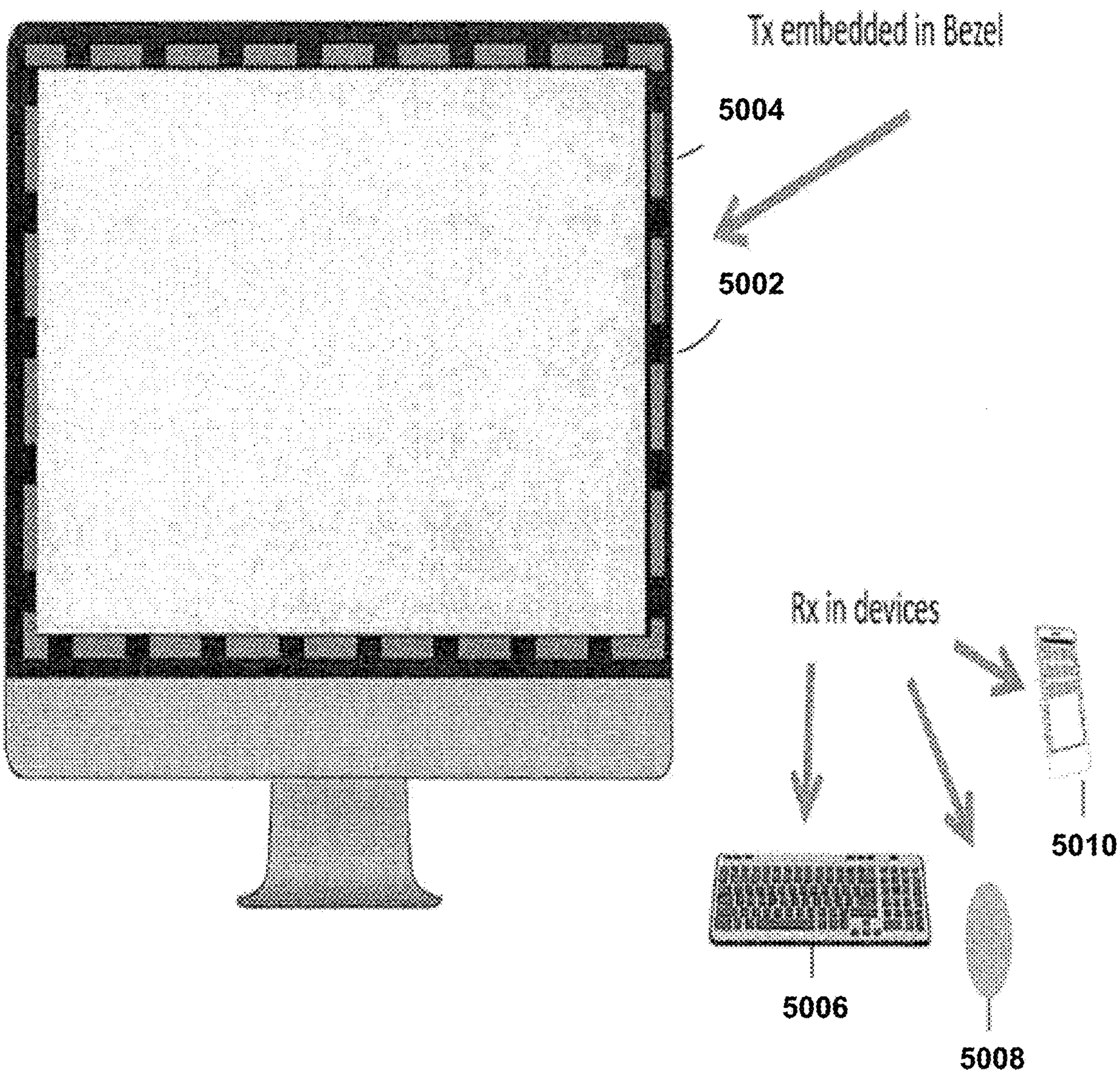
FIG. 50A illustrates a plurality of transmitter antennas positioned in a bezel of a computer display, in accordance with some embodiments.

FIG. 50 shows a plurality of transmitter antennas positioned in a bezel of a computer display in a segmented closed shape to wirelessly transmit energy to a plurality of receiver antennas of electronic devices, according to an embodiment. As illustrated, a computer display 5002 includes a bezel with a plurality of transmitter antennas 5004 positioned in a segmented closed shape along the bezel. Note that the transmitter antennas 5004 can be coupled to or included with the computer display 5002. Such coupling can include retrofitting. For example, the transmitter antennas 5004, such as the antenna elements 2202 (FIG. 22) described above, can number at least two hundred, but a lower amount of the transmitter antennas 5004 is possible as well, such as at least two. Also, for example, the transmitter antennas 5004 can be positioned in a continuous closed shape along the bezel. Moreover, for example, the transmitter antennas 5004 can be positioned in an open shape along the bezel, whether continuous or segmented. In other embodiments, at least one of the transmitter antennas 5004 is positioned in another area or areas of the computer display 5002 in any shape, whether open or closed, or in any manner, whether continuous or segmented, such as a rear face, a sidewall, a floor, a ceiling, a stand, a leg, or a surface mount, or positioned within the computer display 5002.

The computer display 5002 is a desktop display or an all-in-one computer display. The computer display 5002 is rectangular shaped, but other shapes are possible, such as a square, a triangle, a pentagon, a trapezoid, a star, a sphere, a pyramid, or others. The computer display 5002 is of liquid crystal display (LCD) type, but other display types are possible, such as a light emitting diode (LED) type, a plasma type, a cathode ray tube (CRT) type, an electrophoretic type, a laser type, a surface-conduction electron-emitter display (SED) type, a field emission display (FED) type, a mechanical type, or others. The computer display 5002 is supported on a stand or a leg. However, in other embodiments, the computer display 5002 can be any type of a display, whether stationary, portable, mobile, billboard, vehicular, or wearable, whether battery powered, mains electricity powered, movement powered, or renewable energy powered, such as a photovoltaic cell or a fluid turbine, whether with a stand or one or more legs or without a stand or one or more legs or whether coupled to a surface, such as a sidewall, a ceiling, or a floor, whether touch enabled or not, whether haptic enabled or not. In other embodiments, the computer display 5002 is a television display. Note that the computer display 5002 can include or be coupled to a speaker or a sound bar.

The transmitter antennas 5004 can be positioned on the bezel, within the bezel, or underneath the bezel. For example, the transmitter antennas 5004 can be embedded in the bezel. As described above, the transmitter antennas 5004 are operably coupled to the RFIC 2204 (FIG. 22) to enable wireless transmission of energy, as described herein. Accordingly, the computer display 5002 operates as the transmitter 102 (FIG. 1), as described herein. However, in other embodiments, the computer display 5002 operates as the receiver 120 (FIG. 1), as described herein.

The transmitter antennas 5004 wirelessly transmit energy to a keyboard 5006, a mouse 5008, and a mobile phone 5010. Each of the keyboard 5006, the mouse 5008, and the mobile phone 5010 includes a storage device, such as a battery or a capacitor. Each of such storage devices provides stored energy for operation of each of the keyboard 5006, the mouse 5008, and the mobile phone 5010. Each of the keyboard 5006, the mouse 5008, and the mobile phone 5010 also includes or is coupled to the receiver 120, as described herein. The receiver 120 includes at least one antenna element 4904 (FIG. 49A). The receiver 120 is coupled to the storage device and configured to interface with the wirelessly transmitted energy, as described herein, such that each storage device of the keyboard 5006, the mouse 5008, and the mobile phone 5010 is at least partially charged thereby. Note that although the keyboard 5006, the mouse 5008, and the mobile phone 5010 are shown, such depiction is an example and other devices of any type can be used, where such devices include or are coupled to the receiver 120, as described herein. For example, such devices can comprise any type of medical equipment.

Figure 50B:
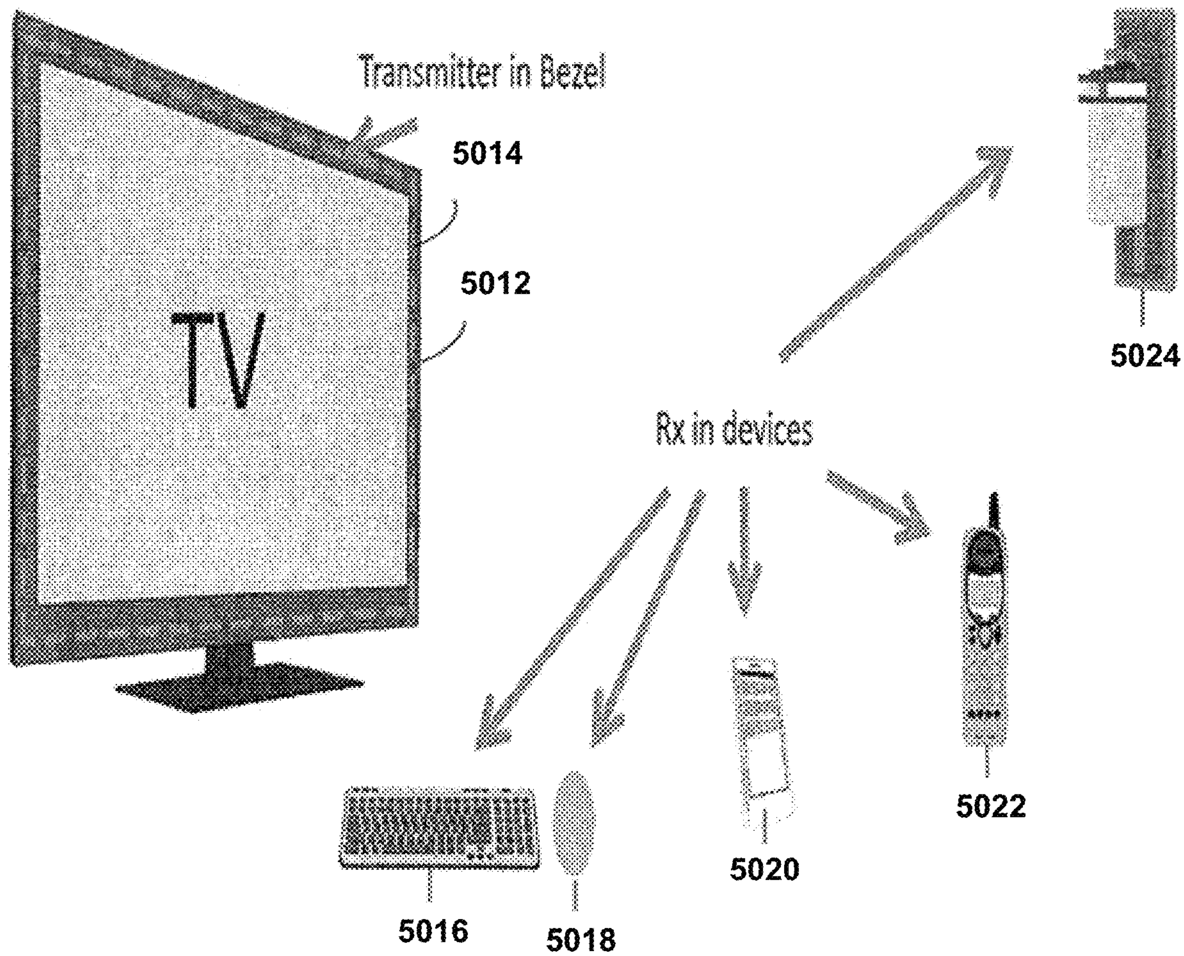
FIG. 50B illustrates a plurality of transmitter antennas positioned in a bezel of a television display, in accordance with some embodiments.

FIG. 50B shows a plurality of transmitter antennas positioned in a bezel of a television display in a segmented closed shape to wirelessly transmit energy to a plurality of receiver antennas of electronic devices, according to an embodiment. As illustrated, a television display 5012 includes a bezel with a plurality of transmitter antennas 5014 positioned in a segmented closed shape along the bezel. Note that the transmitter antennas 5014 can be coupled to or included with the television display 5012. Such coupling can include retrofitting. For example, the transmitter antennas 5014, such as the antenna elements 2202 (FIG. 22) described above, can number at least two hundred, but a lower amount of the transmitter antennas 5014 is possible as well, such as at least two. Also, for example, the transmitter antennas 5014 can be positioned in a continuous closed shape along the bezel. Moreover, for example, the transmitter antennas 5014 can be positioned in an open shape along the bezel, whether continuous or segmented. In other embodiments, at least one of the transmitter antennas 5014 is positioned in another area or areas of the television display 5012 in any shape, whether open or closed, or in any manner, whether continuous or segmented, such as a rear face, a sidewall, a floor, a ceiling, a stand, a leg, or a surface mount, or positioned within the television display 5012.

The television display 5012 is rectangular shaped, but other shapes are possible, such as a square, a triangle, a pentagon, a trapezoid, a star, a sphere, a pyramid, or others. The television display 5012 is of LCD type, but other display types are possible, such as an LED type, a plasma type, a CRT type, an electrophoretic type, a laser type, a SED type, a FED type, a mechanical type, or others. The television display 5012 is supported on a stand or a leg. However, in other embodiments, the television display 5012 can be any type of a display, whether stationary, portable, mobile, billboard, vehicular, or wearable, whether battery powered, mains electricity powered, movement powered, or renewable energy powered, such as a photovoltaic cell or a fluid turbine, whether with a stand or one or more legs or without a stand or one or more legs or whether coupled to a surface, such as a sidewall, a ceiling, or a floor, whether touch enabled or not, whether haptic enabled or not. In other embodiments, the television display 5012 is a computer display. Note that the television display 5012 can include or be coupled to a speaker or a sound bar.

The transmitter antennas 5014 can be positioned on the bezel, within the bezel, or underneath the bezel. For example, the transmitter antennas 5014 can be embedded in the bezel. As described above, the transmitter antennas 5014 are operably coupled to the RFIC 2204 (FIG. 22) to enable wireless transmission of energy, as described herein. Accordingly, the television display 5012 operates as the transmitter 102 (FIG. 1), as described herein. However, in other embodiments, the television display 5012 operates as the receiver 120 (FIG. 1), as described herein.

The transmitter antennas 5014 wirelessly transmit energy to a keyboard 5016, a mouse 5018, a cellular phone 5020, a cordless phone 5022, and a lamp 5024. Each of the keyboard 5016, the mouse 5018, the cellular phone 5020, the cordless phone 5022, and the lamp 5024 includes a storage device, such as a battery or a capacitor. Each of such storage devices provides stored energy for operation of each of the keyboard 5016, the mouse 5018, the cellular phone 5020, the cordless phone 5022, and the lamp 5024. Each of the keyboard 5016, the mouse 5018, the cellular phone 5020, the cordless phone 5022, and the lamp 5024 also includes or is coupled to the receiver 120, as described herein. The receiver 120 includes at least one antenna element 4904 (FIG. 49A). The receiver 120 is coupled to the storage device and configured to interface with the wirelessly transmitted energy, as described herein, such that each storage device of the keyboard 5016, the mouse 5018, the cellular phone 5020, the cordless phone 5022, and the lamp 5024 is at least partially charged thereby. Note that although the keyboard 5016, the mouse 5018, the cellular phone 5020, the cordless phone 5022, and the lamp 5024 are shown, such depiction is an example and other devices of any type can be used, where such devices include or are coupled to the receiver 120, as described herein. For example, such devices can comprise any type of medical equipment.

Figure 50C:
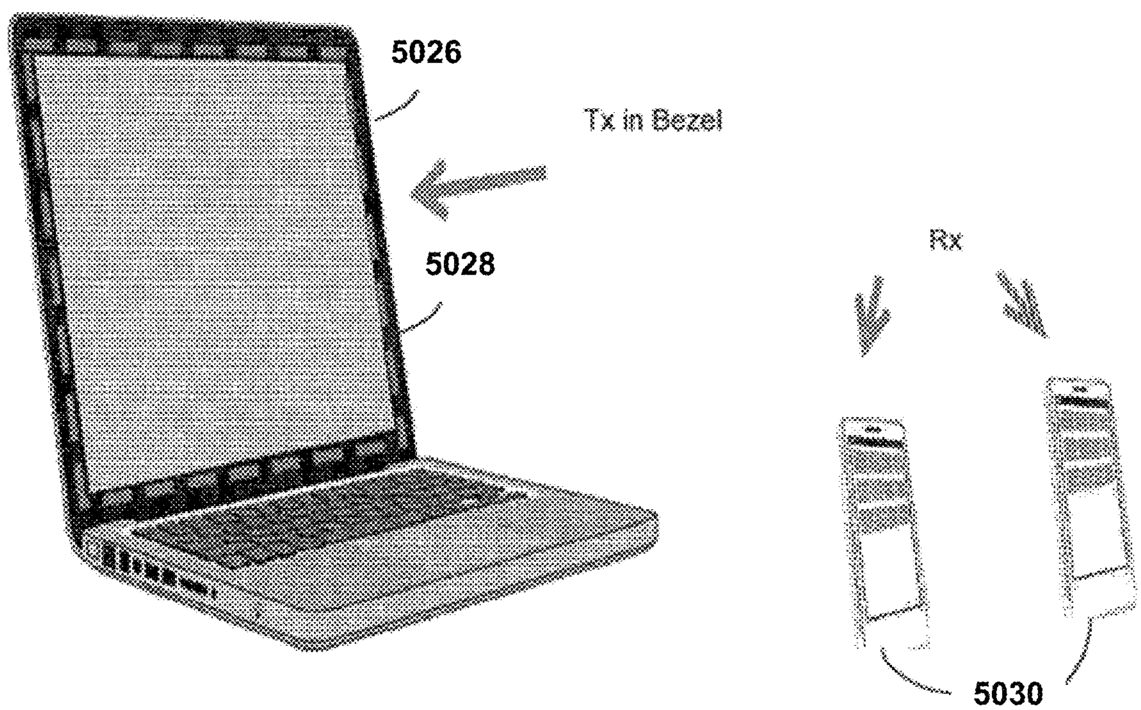
FIG. 50C illustrates a plurality of transmitter antennas positioned in a bezel of a laptop display, in accordance with some embodiments.
Figure 51A:
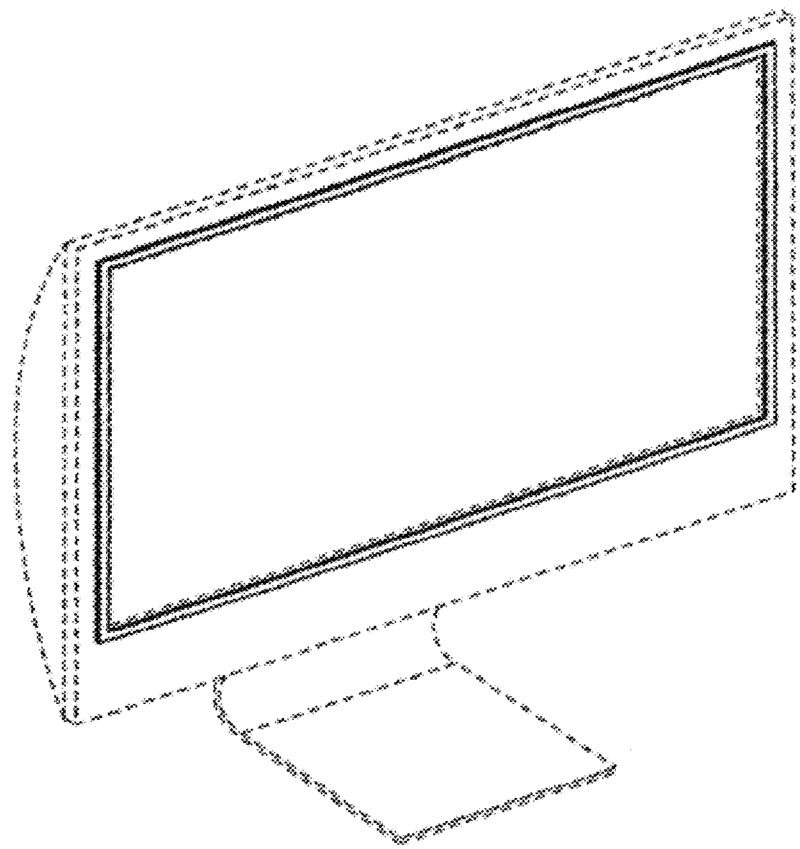
FIGS. 51A-51E illustrate various views of a display with a transmitter antenna having a continuous closed shape on a frontal face of the display, in accordance with some embodiments.
Figure 51B:
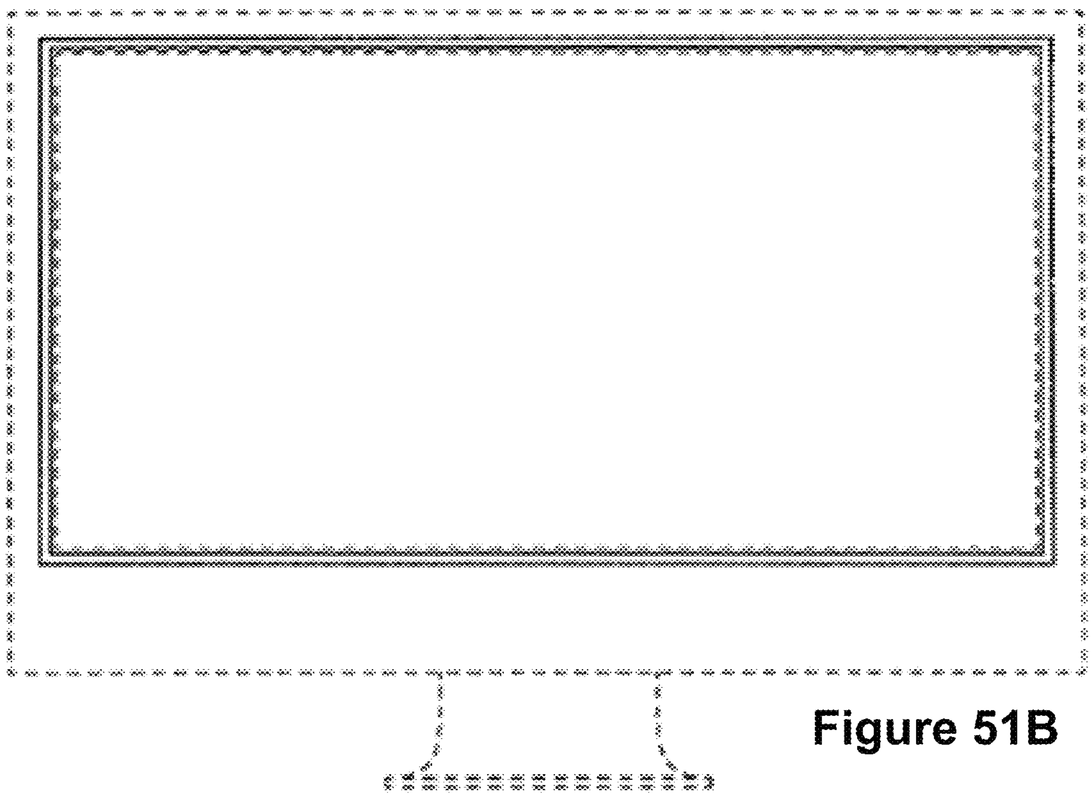
Figure 51C:
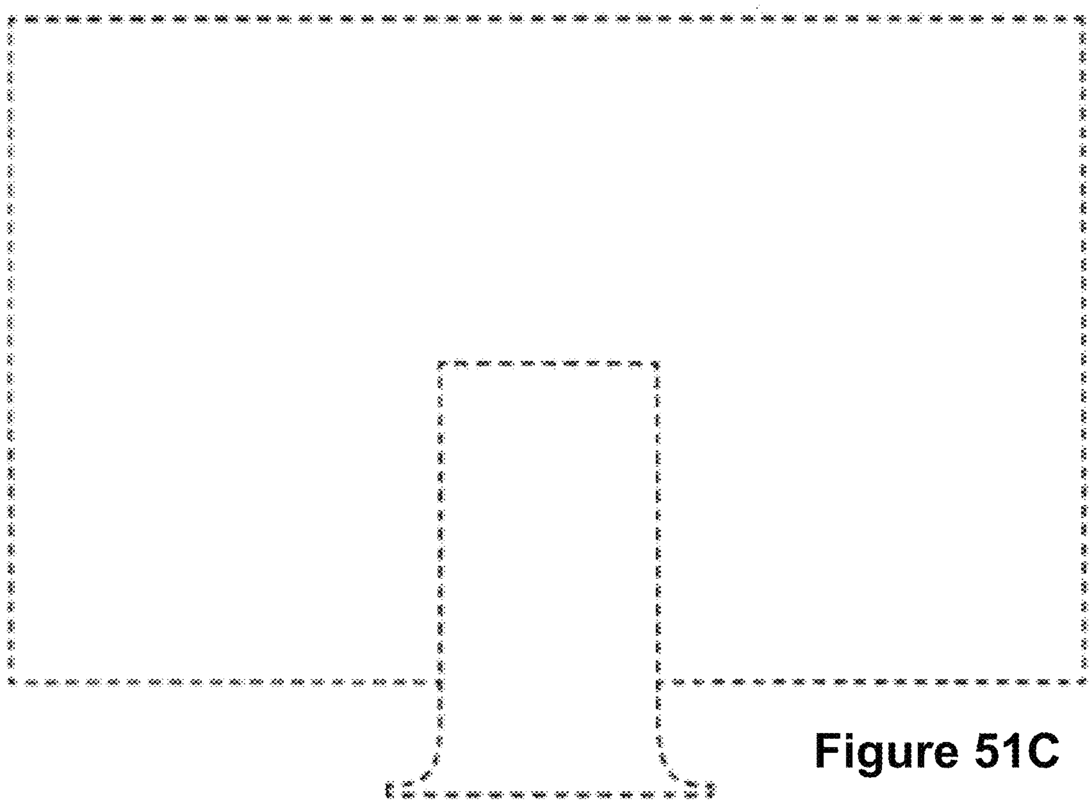
Figure 51D:
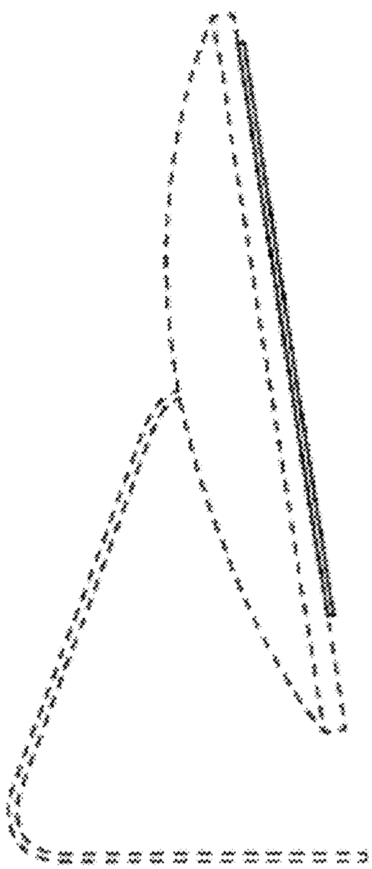
Figure 51E:
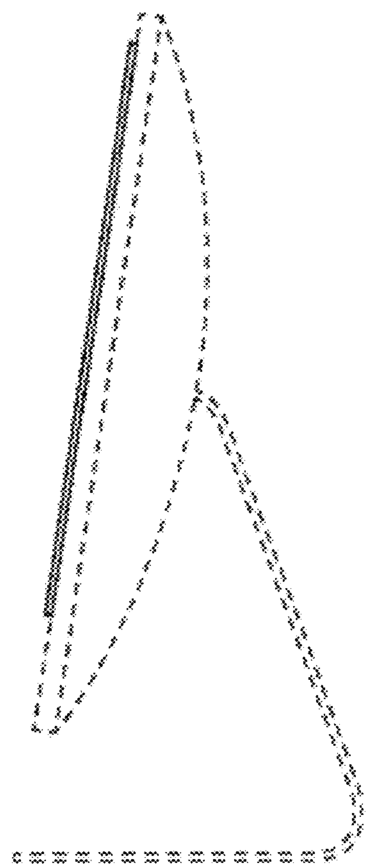
Figure 52A:
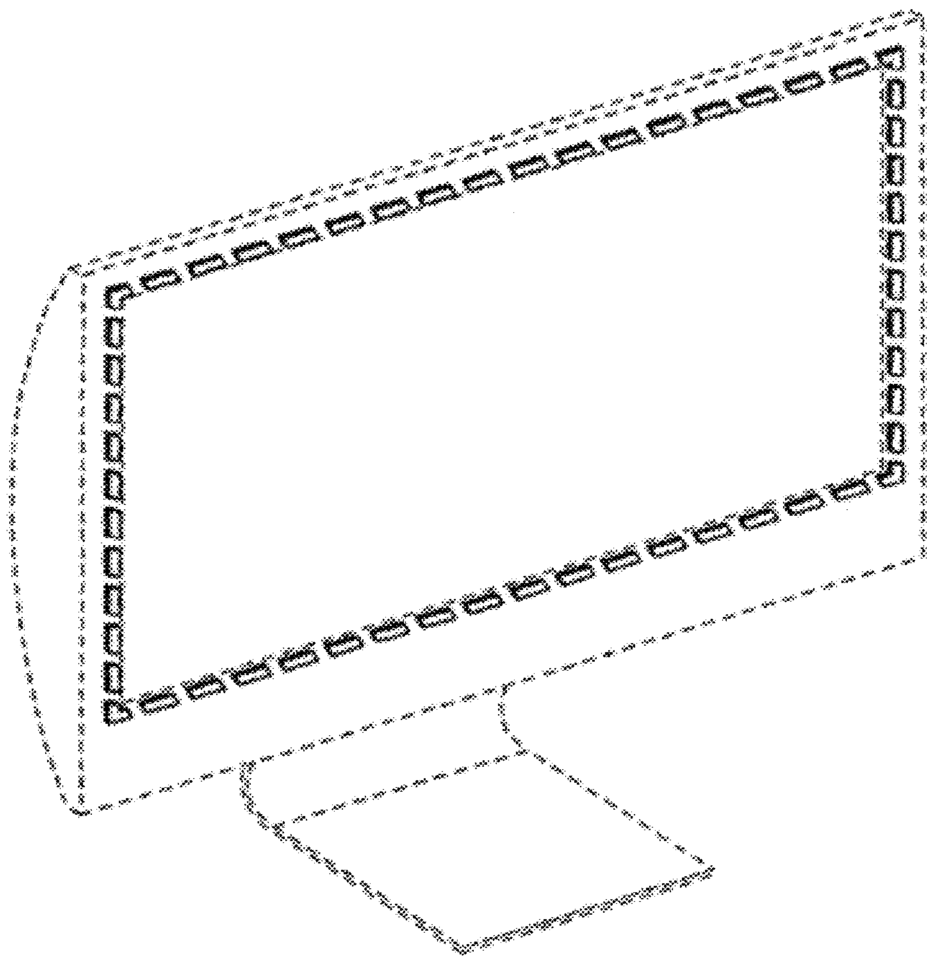
FIGS. 52A-52E illustrate various views of a display with a plurality of transmitter antennas positioned in a segmented closed shape on a frontal face of the display, in accordance with some embodiments.
Figure 52B:
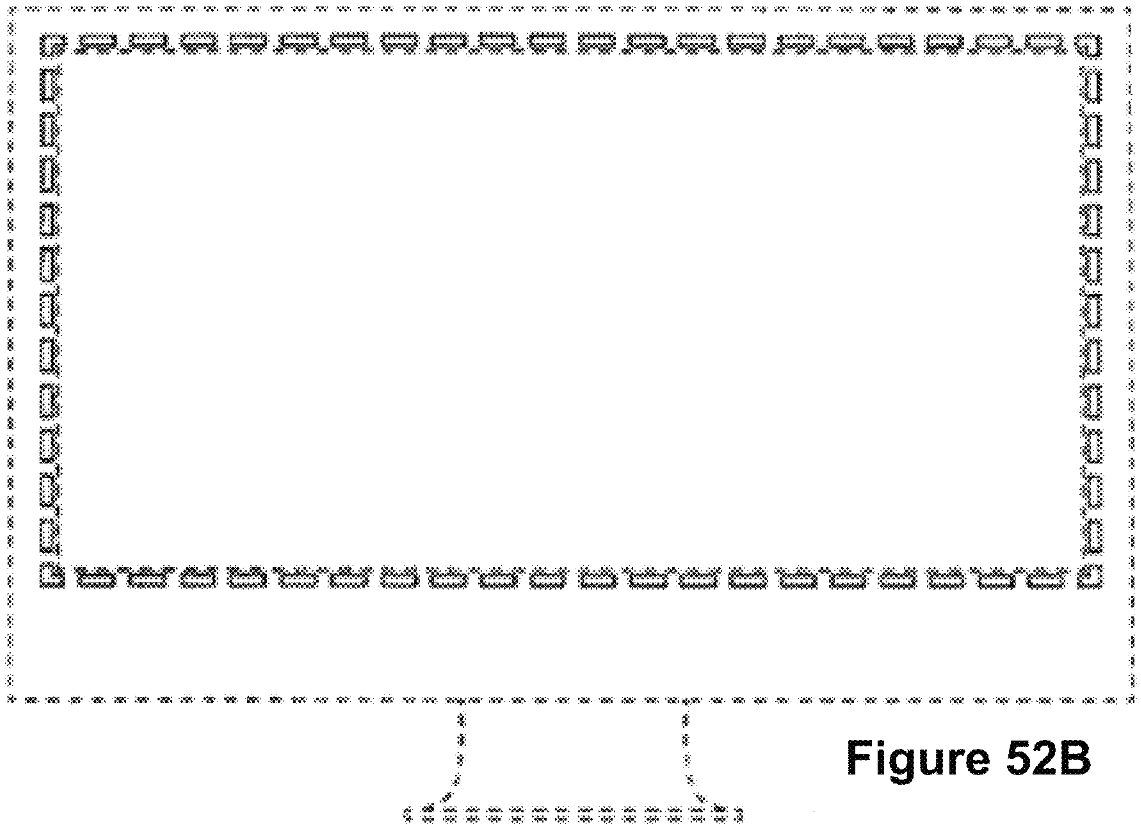
Figure 52C:
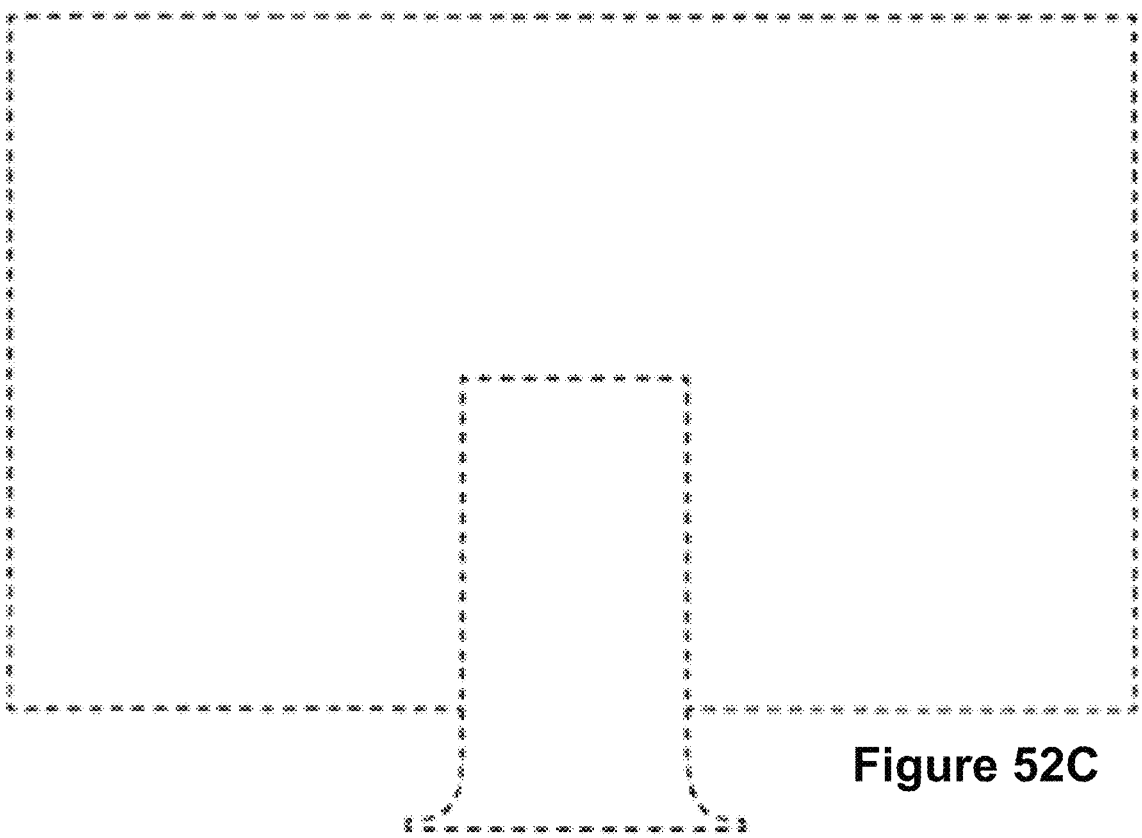
Figure 52D:
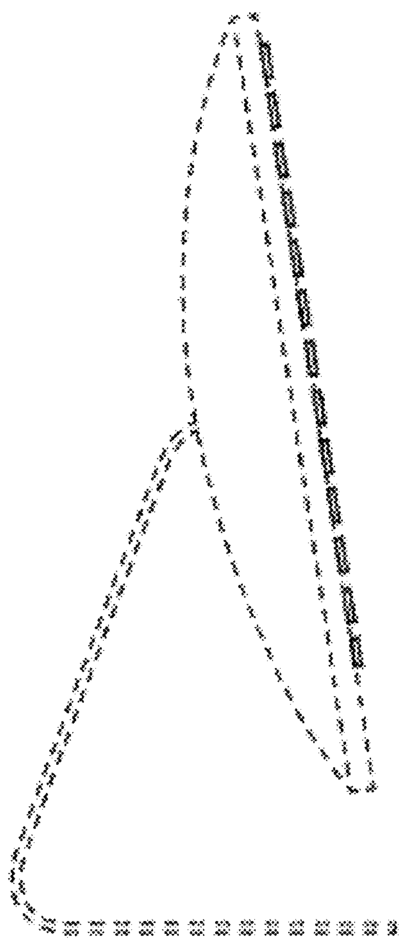
Figure 52E:
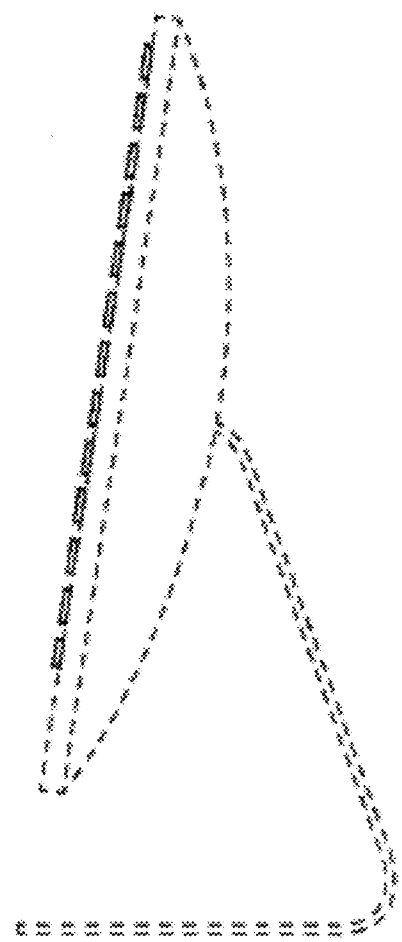
Figure 53A:
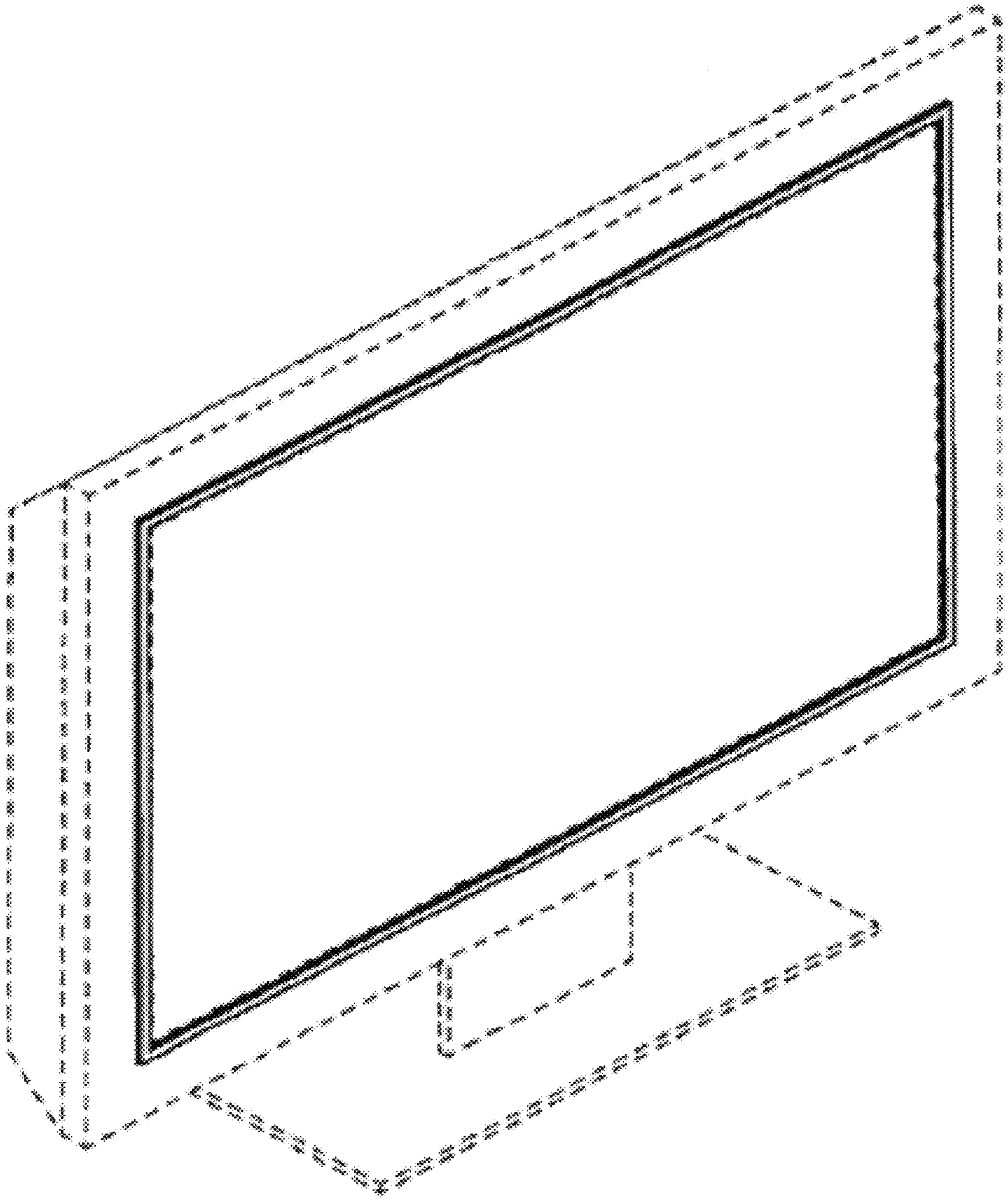
FIGS. 53A-53E illustrate various views of a display with a transmitter antenna having a continuous closed shape on a frontal face of the display, in accordance with some embodiments.
Figure 53B:
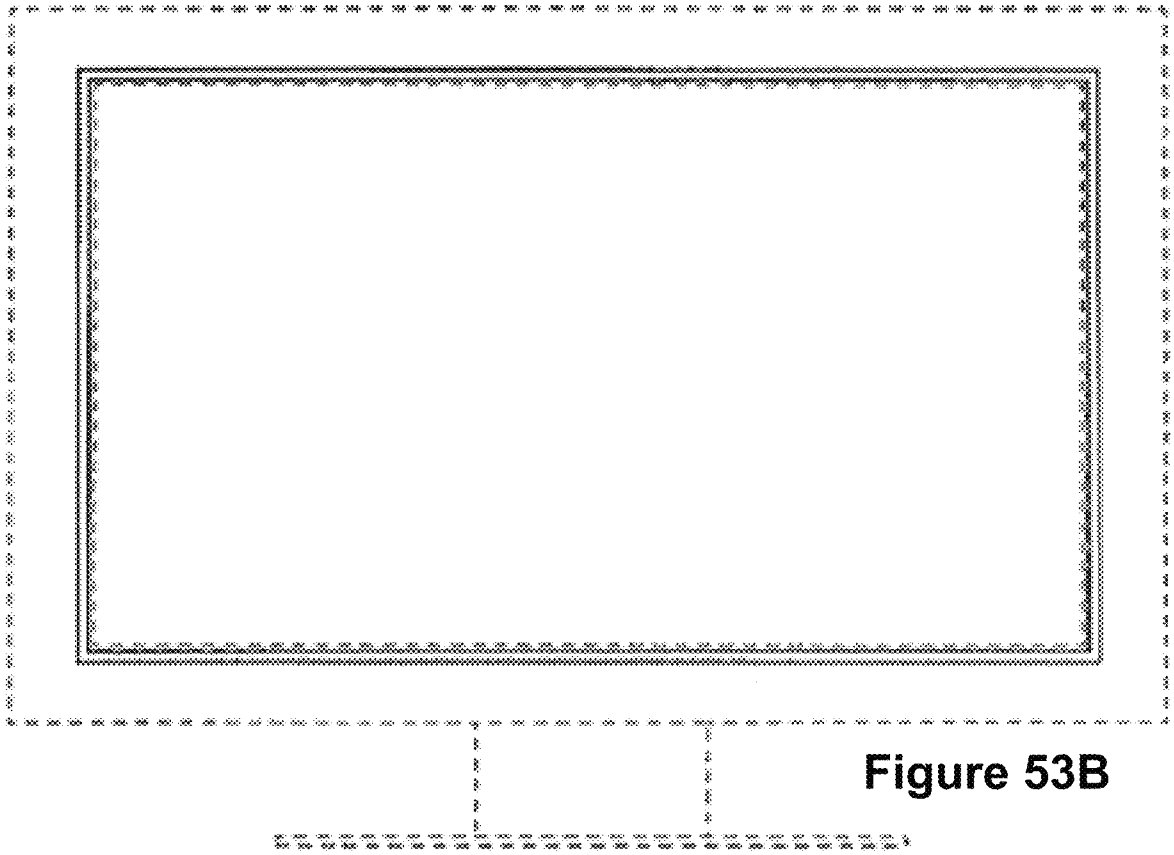
Figure 53C:
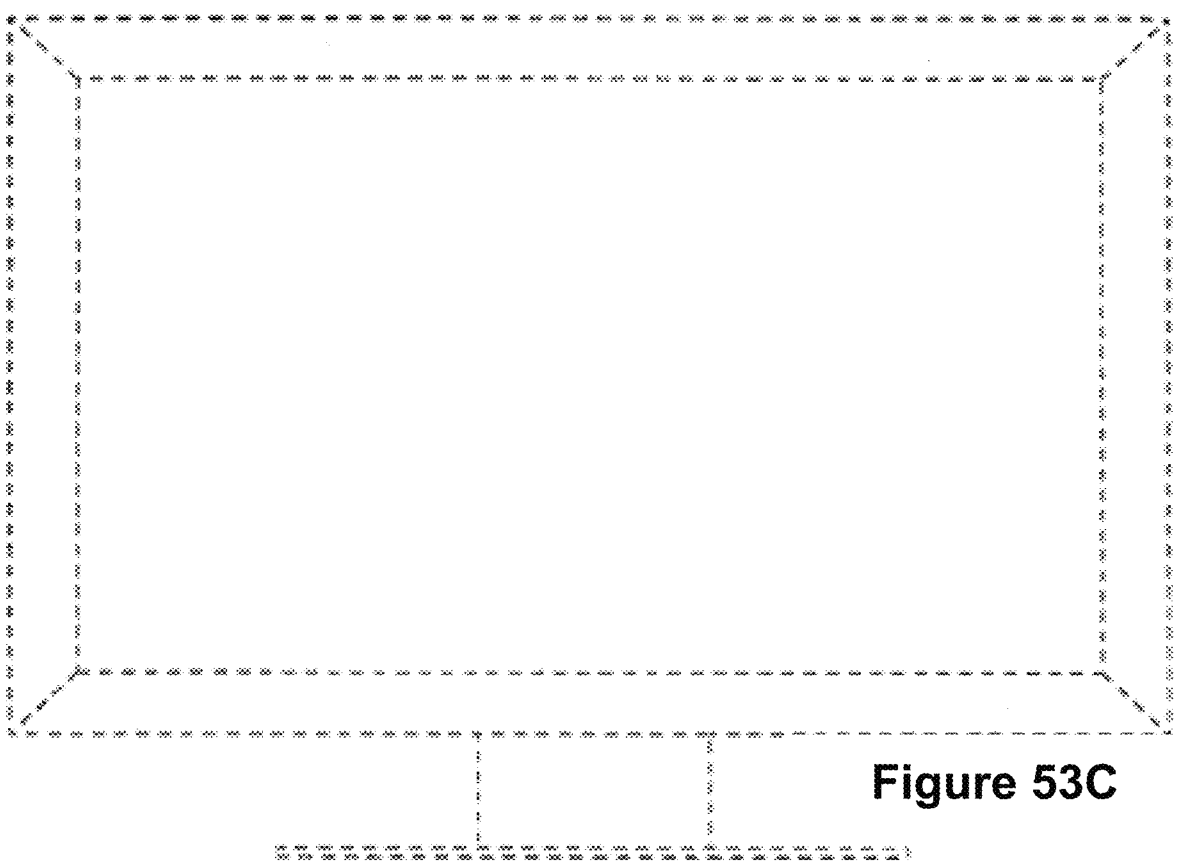
Figure 53D:
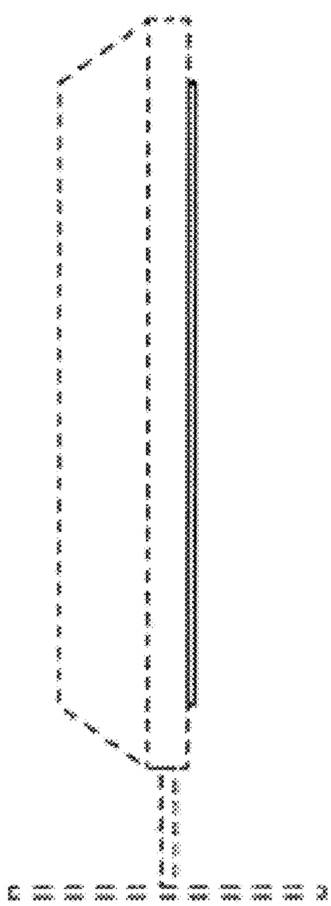
Figure 53E:
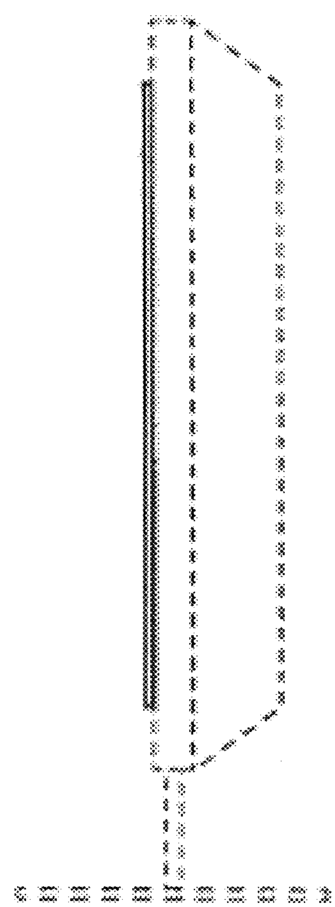
Figure 54A:
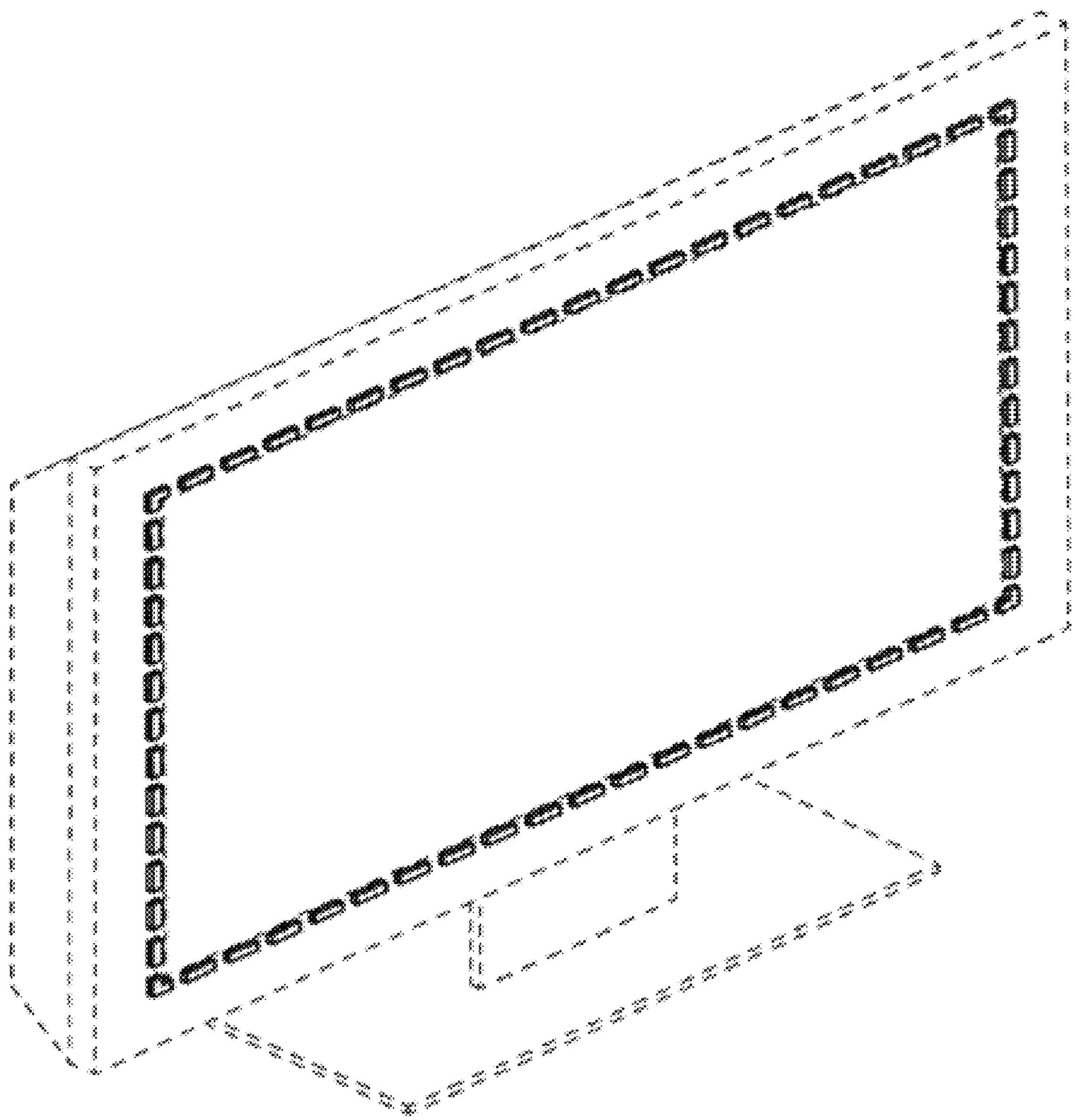
FIGS. 54A-54E illustrate various views of a display with a plurality of transmitter antennas positioned in a segmented closed shape on a frontal face of the display, in accordance with some embodiments.
Figure 54B:
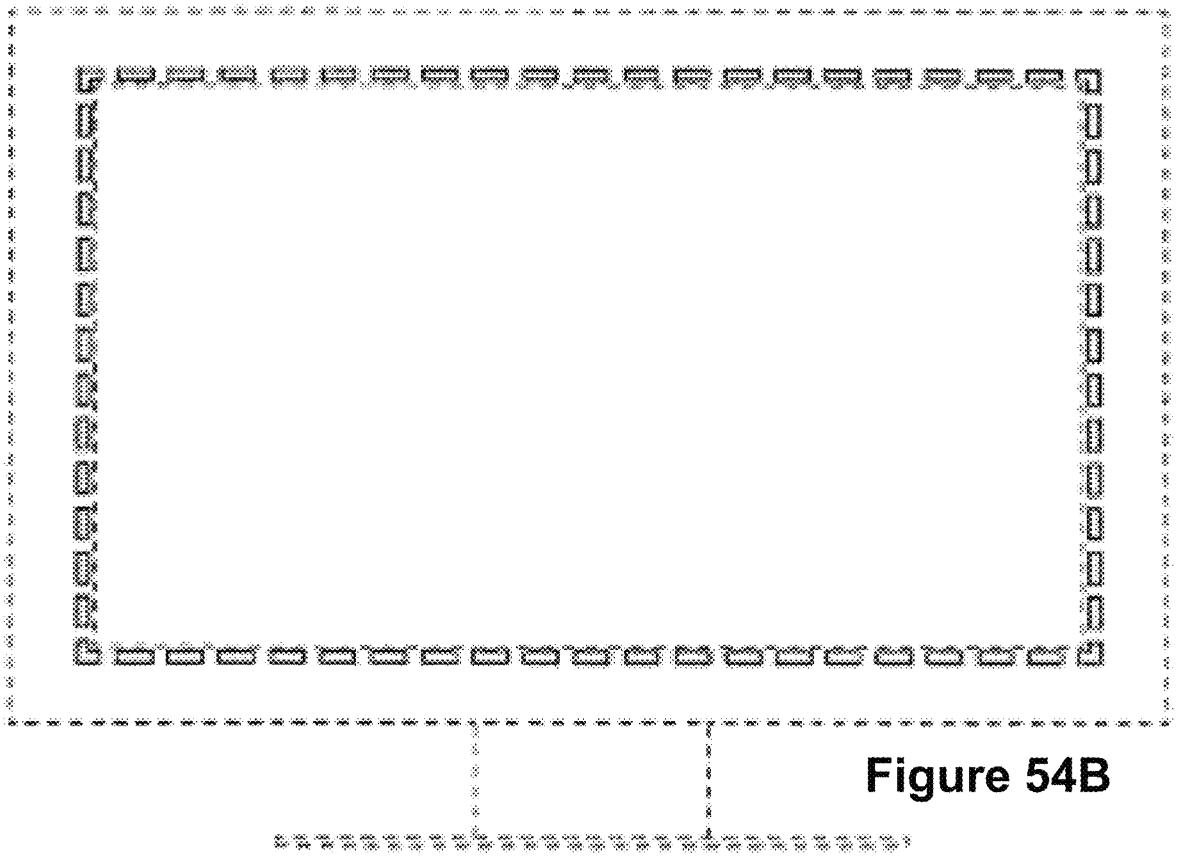
Figure 54C:
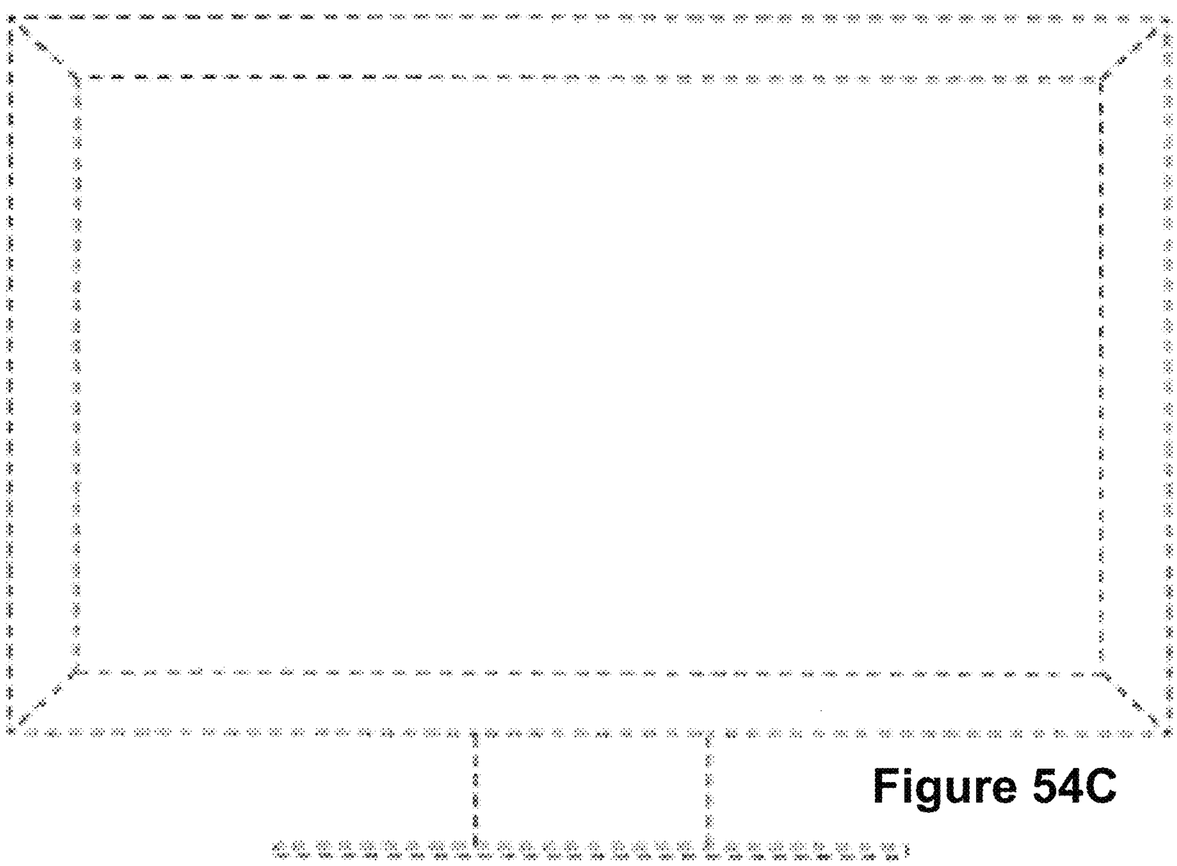
Figure 54D:
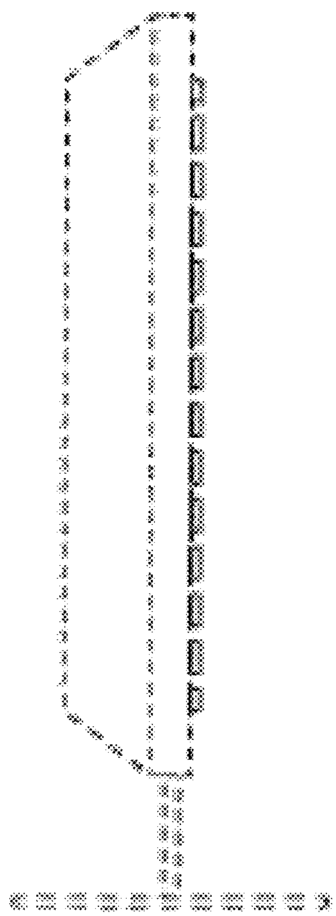
Figure 54E:
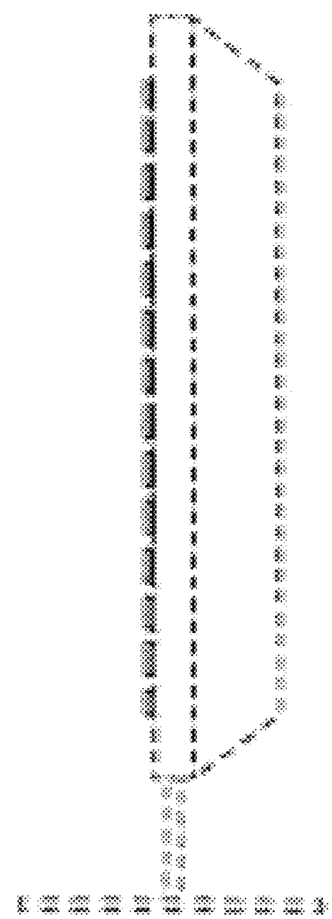
Figure 55A:
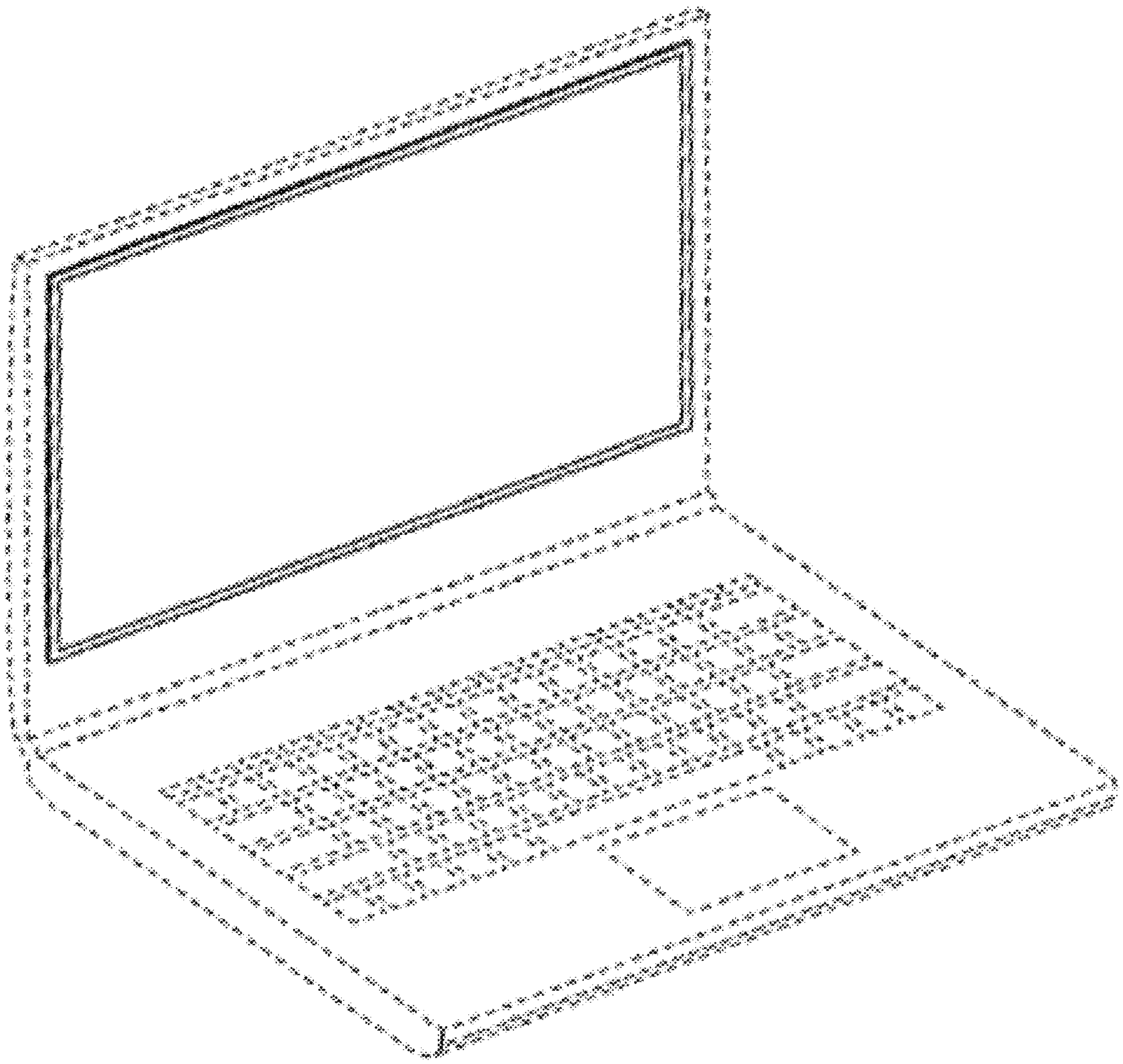
Figure 55D:
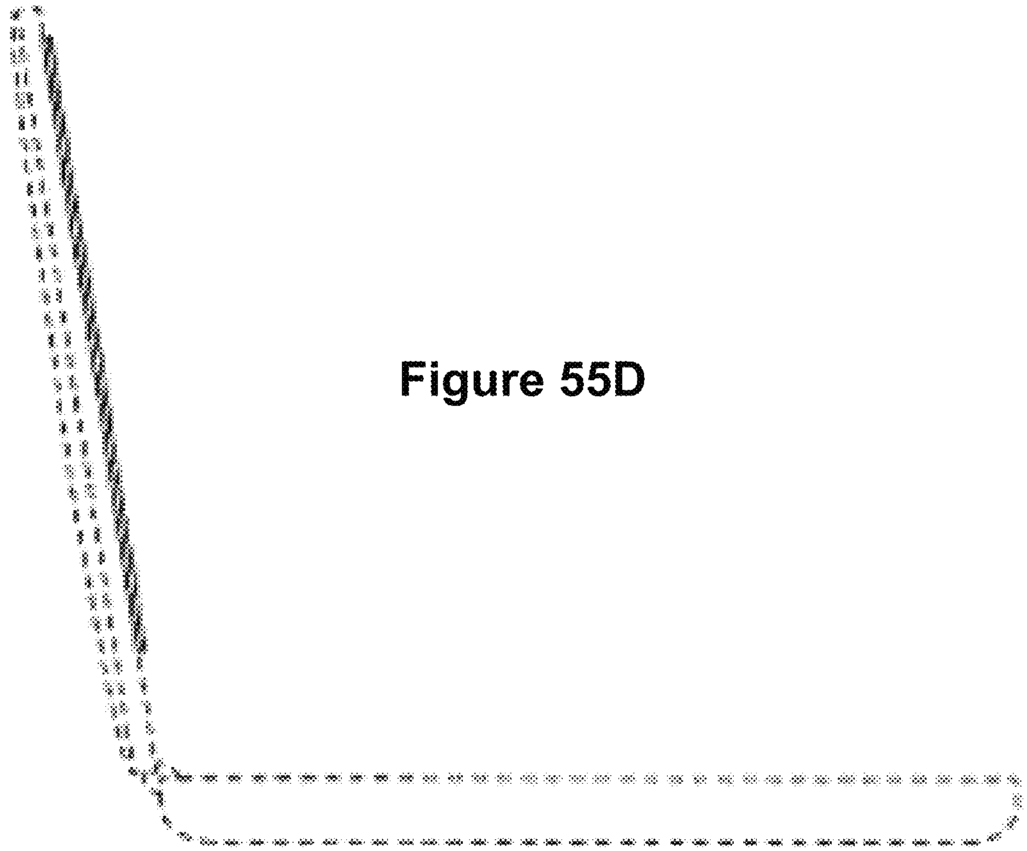
Figure 55E:
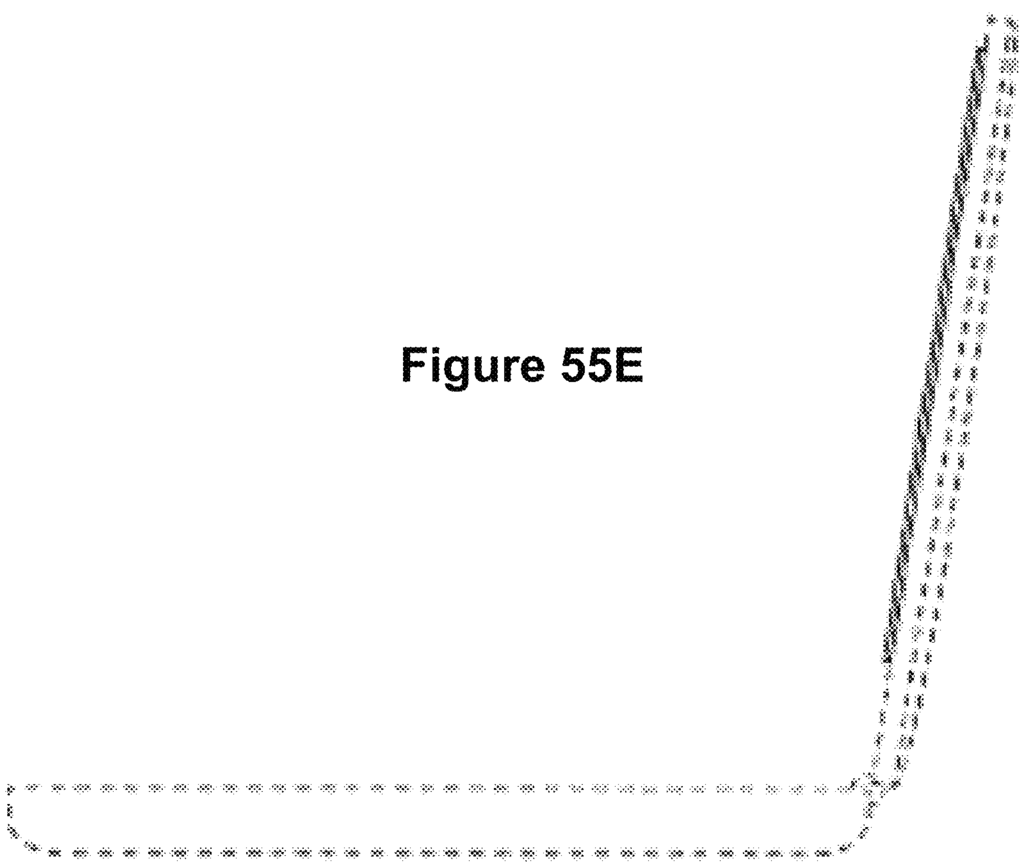
Figure 56A:
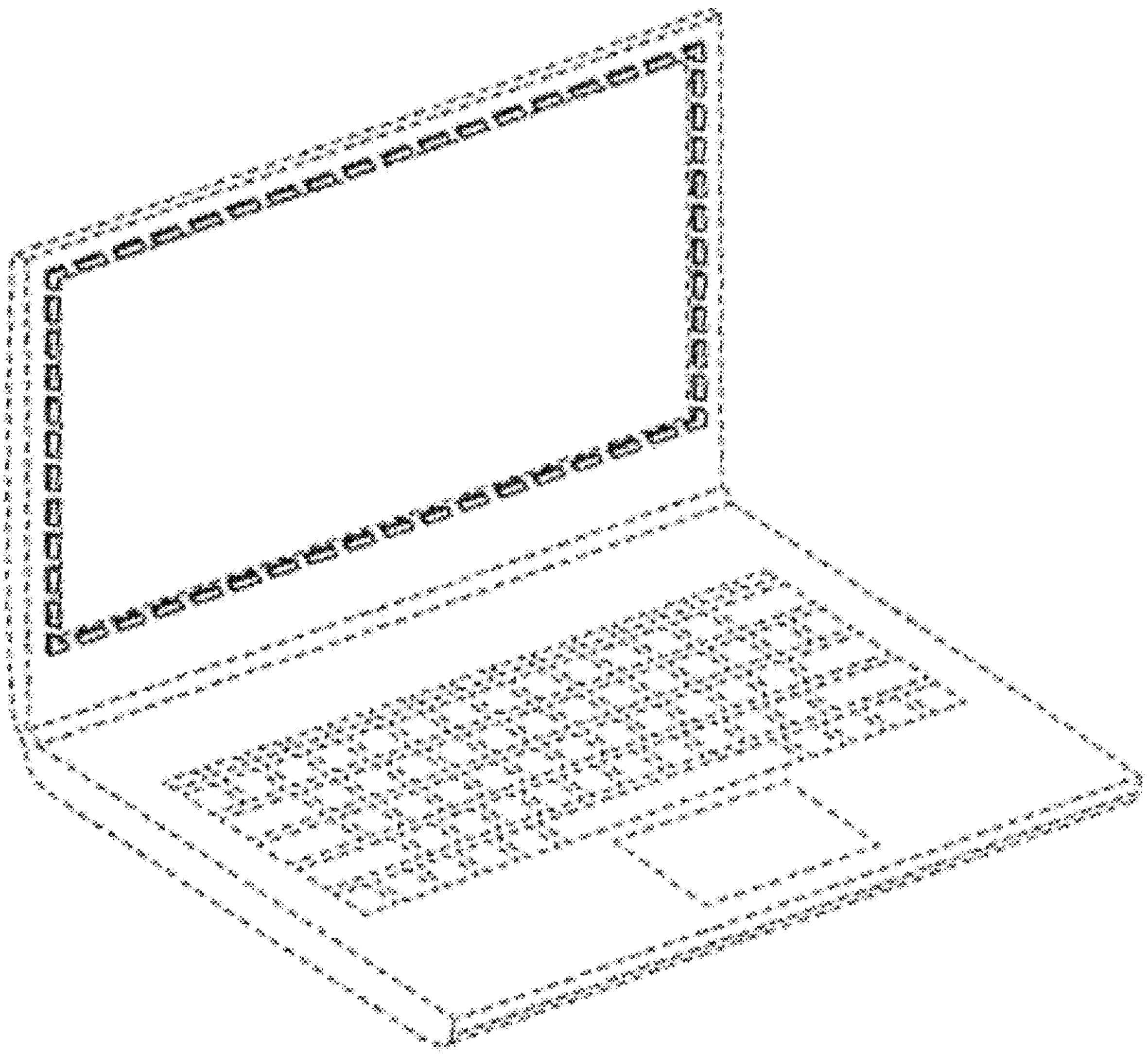
Figure 56D:
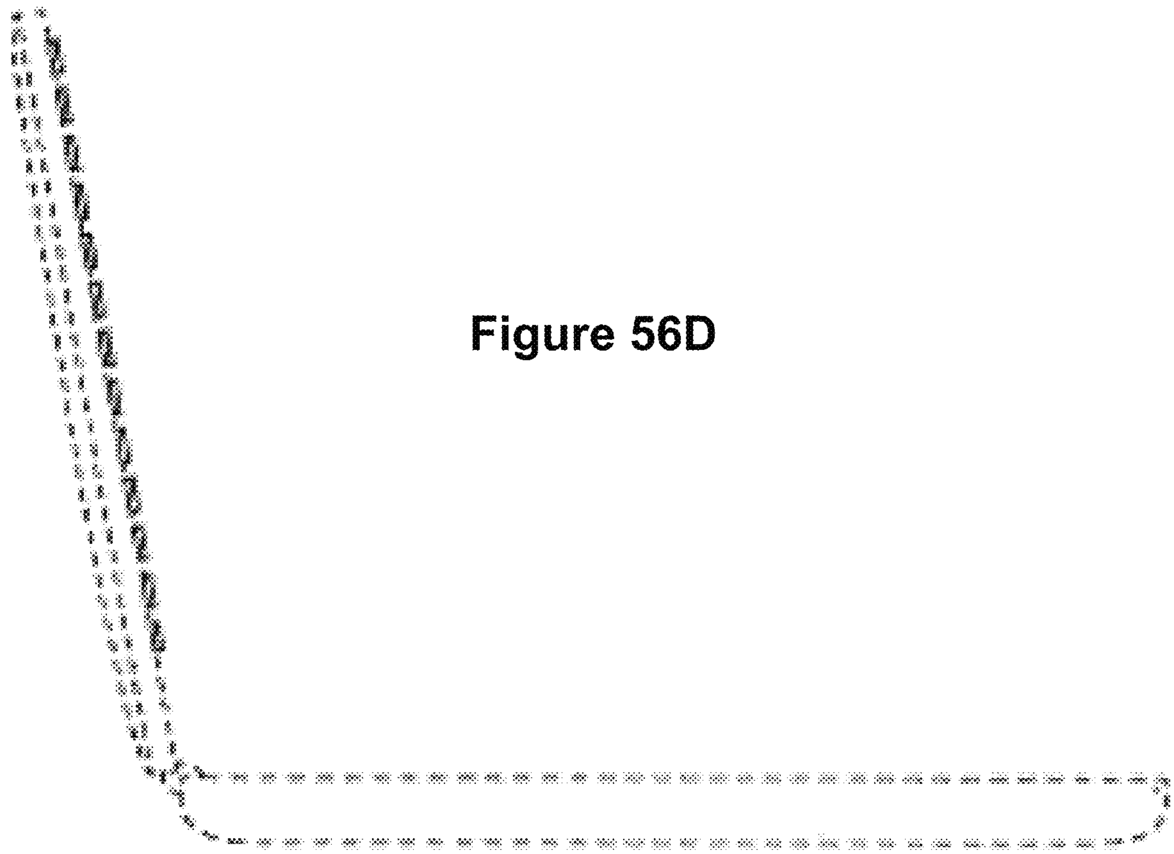
Figure 56E:
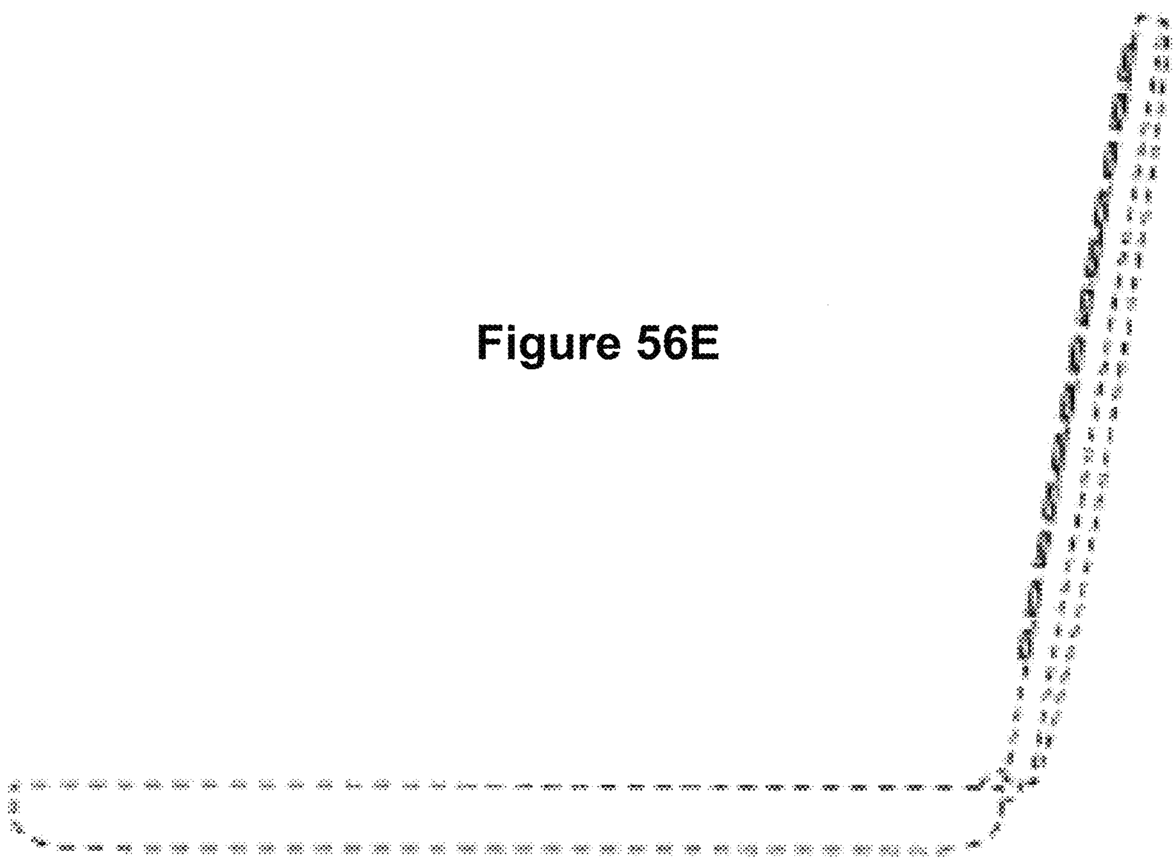

FIG. 50C shows a plurality of transmitter antennas positioned in a bezel of a laptop display in a segmented closed shape to wirelessly transmit energy to a plurality of receiver antennas of electronic devices, according to an embodiment. As illustrated, a laptop display 5026 includes a bezel with a plurality of transmitter antennas 5028 positioned in a segmented closed shape along the bezel. Note that the transmitter antennas 5028 can be coupled to or included with the laptop display 5026. Such coupling can include retrofitting. For example, the transmitter antennas 5028, such as the antenna elements 2202 (FIG. 22) described above, can number at least two hundred, but a lower amount of the transmitter antennas 5028 is possible as well, such as at least two. Also, for example, the transmitter antennas 5028 can be positioned in a continuous closed shape along the bezel. Moreover, for example, the transmitter antennas 5028 can be positioned in an open shape along the bezel, whether continuous or segmented. In other embodiments, at least one of the transmitter antennas 5028 is positioned in another area or areas of the laptop display 5026 in any shape, whether open or closed, or in any manner, whether continuous or segmented, such as a rear face, a sidewall, a floor, or a ceiling, or positioned within the laptop display 5026 or another area or areas of the laptop, such as a keyboard portion.

The laptop display 5026 is rectangular shaped, but other shapes are possible, such as a square, a triangle, a pentagon, a trapezoid, a star, a sphere, a pyramid, or others. The laptop display 5026 is of LCD type, but other display types are possible, such as an LED type, a plasma type, a CRT type, an electrophoretic type, a laser type, a SED type, a FED type, a mechanical type, or others. The laptop display 5026 is coupled to the keyboard portion of the laptop. However, in other embodiments, the laptop display 5026 can be any type of a display, whether battery powered, mains electricity powered, movement powered, or renewable energy powered, such as a photovoltaic cell or a fluid turbine, whether touch enabled or not, whether haptic enabled or not. In other embodiments, laptop display 5026 is a computer display or a television display. Note that the laptop display 5026 can include or be coupled to a speaker or a sound bar.

The transmitter antennas 5028 can be positioned on the bezel, within the bezel, or underneath the bezel. For example, the transmitter antennas 5028 can be embedded in the bezel. As described above, the transmitter antennas 5028 are operably coupled to the RFIC 2204 (FIG. 22) to enable wireless transmission of energy, as described herein. Accordingly, the laptop display 5026 operates as the transmitter 102 (FIG. 1), as described herein. However, in other embodiments, the laptop display 5026 operates as the receiver 120 (FIG. 1), as described herein.

The transmitter antennas 5028 wirelessly transmit energy to a plurality of cellular phones 5030. Each of the cellular phones 5030 includes a storage device, such as a battery or a capacitor. Each of such storage devices provides stored energy for operation of each of the cellular phones 5030. Each of the cellular phones 5030 also includes or is coupled to the receiver 120, as described herein. The receiver 120 includes at least one antenna element 4904 (FIG. 49A). The receiver 120 is coupled to the storage device and configured to interface with the wirelessly transmitted energy, as described herein, such that each storage device of the cellular phones 5030 is at least partially charged thereby. Note that although the cellular phones 5030 are shown, such depiction is an example and other devices of any type can be used, where such devices include or are coupled to the receiver 120, as described herein. For example, such devices can comprise any type of medical equipment.

FIGS. 51A-51E show various views of a display with a transmitter antenna having a continuous closed shape on a frontal face of the display, according to an embodiment. Note that the transmitter antenna is not flush with the display. However, in other embodiments, the transmitter antenna is at least partially flush with the display. In yet other embodiments, the transmitter antenna is at least partially recessed into the display. Note that any permutations or combinations of flush or recessed transmitter antenna configurations are possible, in whole or in part. Also, such display can be a computer display or a television display, as described herein.

FIGS. 52A-52E show various views of a display with a plurality of transmitter antennas positioned in a segmented closed shape on a frontal face of the display, according to an embodiment. Note that the transmitter antennas are not flush with the display. However, in other embodiments, at least one of the transmitter antennas is at least partially flush with the display. In yet other embodiments, at least one of the transmitter antennas is at least partially recessed into the display. Note that any permutations or combinations of flush or recessed transmitter antenna configurations are possible, in whole or in part for at least one transmitter antenna. Also, such display can be a computer display or a television display, as described herein.

FIGS. 53A-53E show various views of a display with a transmitter antenna having a continuous closed shape on a frontal face of the display, according to an embodiment. Note that the transmitter antenna is not flush with the display. However, in other embodiments, the transmitter antenna is at least partially flush with the display. In yet other embodiments, the transmitter antenna is at least partially recessed into the display. Note that any permutations or combinations of flush or recessed transmitter antenna configurations are possible, in whole or in part. Also, such display can be a computer display or a television display, as described herein.

FIGS. 54A-54E show various views of a display with a plurality of transmitter antennas positioned in a segmented closed shape on a frontal face of the display, according to an embodiment. Note that the transmitter antennas are not flush with the display. However, in other embodiments, at least one of the transmitter antennas is at least partially flush with the display. In yet other embodiments, at least one of the transmitter antennas is at least partially recessed into the display. Note that any permutations or combinations of flush or recessed transmitter antenna configurations are possible, in whole or in part for at least one transmitter antenna. Also, such display can be a computer display or a television display, as described herein.

FIGS. 55A-55E show various views of a laptop display with a transmitter antenna having a continuous closed shape on a frontal face of the laptop display, according to an embodiment. Note that the transmitter antenna is not flush with the laptop display. However, in other embodiments, the transmitter antenna is at least partially flush with the laptop display. In yet other embodiments, the transmitter antenna is at least partially recessed into the laptop display. Note that any permutations or combinations of flush or recessed transmitter antenna configurations are possible, in whole or in part.

FIGS. 56A-56E show various views of a laptop display with a plurality of transmitter antennas positioned in a segmented closed shape on a frontal face of the laptop display, according to an embodiment. Note that the transmitter antennas are not flush with the laptop display. However, in other embodiments, at least one of the transmitter antennas is at least partially flush with the laptop display. In yet other embodiments, at least one of the transmitter antennas is at least partially recessed into the laptop display. Note that any permutations or combinations of flush or recessed transmitter antenna configurations are possible, in whole or in part for at least one transmitter antenna.

FIGS. 49-56 illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 49-56.

Presented below are example receivers and methods for maximum power point transfer.

A receiver may include: (i) a plurality of antenna elements configured to receive a wireless signal comprising energy resulting from a constructive interference pattern of a plurality of wireless power transmission signal waves emitted from a visual output device, (ii) a plurality of rectifiers corresponding to the antenna elements and configured to rectify the energy received by the antenna elements, where the rectifiers comprise a first rectifier and a second rectifier, (iii) an input boost converter coupled to the first rectifier, configured to step up the energy rectified by the first rectifier, and configured to determine at least one of a global power maximum and a local power maximum produced in the first rectifier, and (iv) a controller coupled to the input boost converter and the second rectifier, configured to determine an available energy at the second rectifier, configured to determine a maximum power point (MPP) value from the first rectifier via the input boost converter, and configured to transmit an operational instruction to the input boost converter to further step up the energy rectified by the first rectifier.

In some embodiments, the input boost converter comprises a second controller coupled to the controller.

In some embodiments, the operational instruction comprises data to configure the input boost converter to further step up the energy rectified by the first rectifier to the global power maximum.

In some embodiments, the controller is configured to index the available energy and the MPP value in a look-up table.

In some embodiments, the controller is configured to compare the available energy to the MPP value and determine the operational instruction thereby.

In some embodiments, the receiver comprises an output boost converter, the controller is configured to determine a load requirement for the receiver, and the controller is configured to control an operation of at least one of the input boost converter and the output boost converter based on the load requirement.

In some embodiments, the receiver comprises a storage element coupled to the input boost converter and configured to store at least a portion of the first energy as rectified by the first rectifier, input into the input boost converter, and output from the input boost converter.

In some embodiments, the receiver comprises a communication component, an output boost converter, and a storage element coupled to the output boost converter, the controller is configured to obtain a measurement of a voltage from at least one of the first rectifier, the input boost converter, the storage element, and the output boost converter, and the controller is configured to communicate the measurement to a load via the communication component.

In some embodiments, the controller is configured to control an operation of the output boost converter by adjusting a load current limit at the output boost converter.

In another receiver, the receiver may include: (i) a first antenna element configured to receive a first wireless signal comprising a first energy resulting from a first constructive interference pattern of a first plurality of wireless power transmission waves emitted from a visual output device, (ii) a first rectifier coupled to the first antenna element and configured to rectify the first energy received by the first antenna element, (iii) a second antenna element configured to receive a second wireless signal comprising a second energy resulting from a second constructive interference pattern of a second plurality of wireless power transmission signal waves emitted from the visual output device, (iv) a second rectifier coupled to the second antenna element and configured to rectify the second energy received by the second antenna element, (v) an input boost converter coupled to the first rectifier, configured to step up the first energy rectified by the first rectifier, and configured to determine at least one of a global power maximum and a local power maximum produced in the first rectifier, and (vi) a controller coupled to the input boost converter and the second rectifier, configured to determine an available energy at the second rectifier based on the second energy, configured to determine a MPP value from the first rectifier via the input boost converter, and configured to transmit an operational instruction to the input boost converter to further step up the first energy rectified by the first rectifier.

A method may include: (i) receiving, by a first antenna element of a receiver, a first wireless signal comprising a first energy resulting from a first constructive interference pattern of a first plurality of wireless power transmission waves emitted from a visual output device, (ii) rectifying, by a first rectifier of the receiver, the first energy received by the first antenna element, (iii) receiving, by a second antenna element of the receiver, a second wireless signal comprising a second energy resulting from a second constructive interference pattern of a second plurality of wireless power transmission signal waves emitted from the visual output device, (iv) rectifying, by a second rectifier of the receiver, the second energy received by the second antenna element, (v) stepping up, by an input boost converter of the receiver, the first energy rectified by the first rectifier, (vi) determining, by the input boost converter of the receiver, at least one of a global power maximum and a local power maximum produced in the first rectifier, (vii) determining, by a controller of the receiver, an available energy at the second rectifier based on the second energy, (viii) determining, by the controller of the receiver, a MPP value from the first rectifier via the input boost converter, and (ix) transmitting, by the controller of the receiver, an operational instruction to the input boost converter to further step up the first energy rectified by the first rectifier.

FIGS. 57-62 illustrate systems and methods for wireless power transmission with selective range and multiple adaptive pocket-forming, in accordance with some embodiments.

Figure 57:
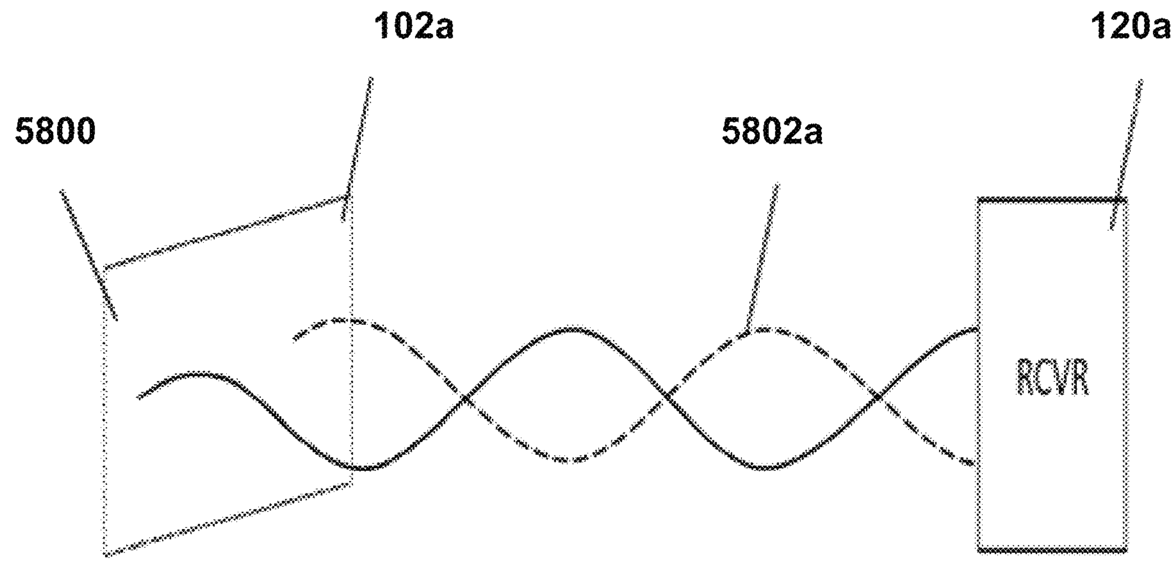
FIGS. 57 and 58 illustrate waveforms for wireless power transmission with selective range, which may get unified in a single waveform, in accordance with some embodiments.
Figure 58:
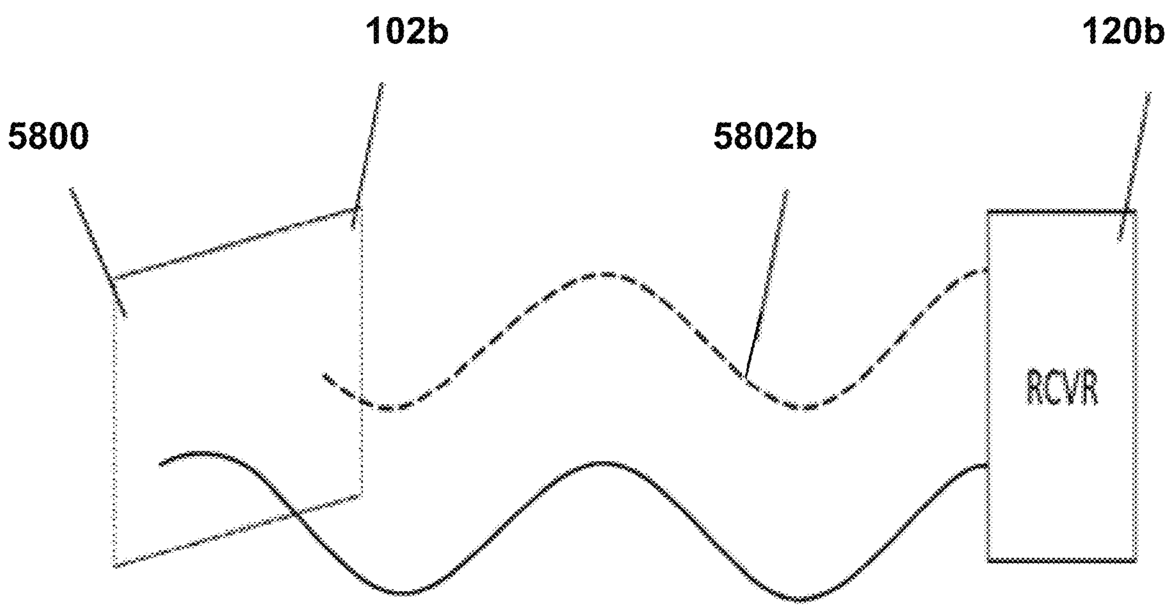

FIGS. 57 and 58 show an exemplary system 5800 implementing wireless power transmission principles that may be implemented during exemplary pocket-forming processes. A transmitter 102 (FIG. 1) comprising a plurality of antennas in an antenna array, may adjust the phase and amplitude, among other possible attributes, of power transmission waves 5802, being transmitted from antennas of the transmitter 102. As shown in FIG. 57, in the absence of any phase or amplitude adjustment, power transmission waves 5802*a* may be transmitted from each of the antennas and will arrive at different locations and have different phases. These differences are often due to the different distances from each antenna element of the transmitter 102*a* to a receiver 120*a* or receivers 120*a*, located at the respective locations.

Continuing with FIG. 57, a receiver 120*a* may receive multiple power transmission signals, each comprising power transmission waves 5802*a*, from multiple antenna elements of a transmitter 102*a*; the composite of these power transmission signals may be essentially zero, because in this example, the power transmission waves add together destructively. That is, antenna elements of the transmitter 102*a* may transmit the exact same power transmission signal (i.e., comprising power transmission waves 5802*a* having the same features, such as phase and amplitude), and as such, when the power transmission waves 5802*a* of the respective power transmission signals arrive at the receiver 120*a*, they are offset from each other by 180 degrees. Consequently, the power transmission waves 5802*a* of these power transmission signals "cancel" one another. Generally, signals offsetting one another in this way may be referred to as "destructive," and thus result in "destructive interference."

In contrast, as shown in FIG. 58, for so-called "constructive interference," signals comprising power transmission waves 5802*b* that arrive at the receiver exactly "in phase" with one another, combine to increase the amplitude of each signal, resulting in a composite that is stronger than each of the constituent signals. In the illustrative example in FIG. 58, note that the phase of the power transmission waves 5802*a* in the transmit signals are the same at the location of transmission, and then eventually add up destructively at the location of the receiver 120*a*. In contrast, in FIG. 58, the phase of the power transmission waves 5802*b* of the transmit signals are adjusted at the location of transmission, such that they arrive at the receiver 120*b* in phase alignment, and consequently they add constructively. In this illustrative example, there will be a resulting pocket of energy located around the receiver 120*b* in FIG. 58; and there will be a transmission null located around receiver in FIG. 57.

Figure 59:
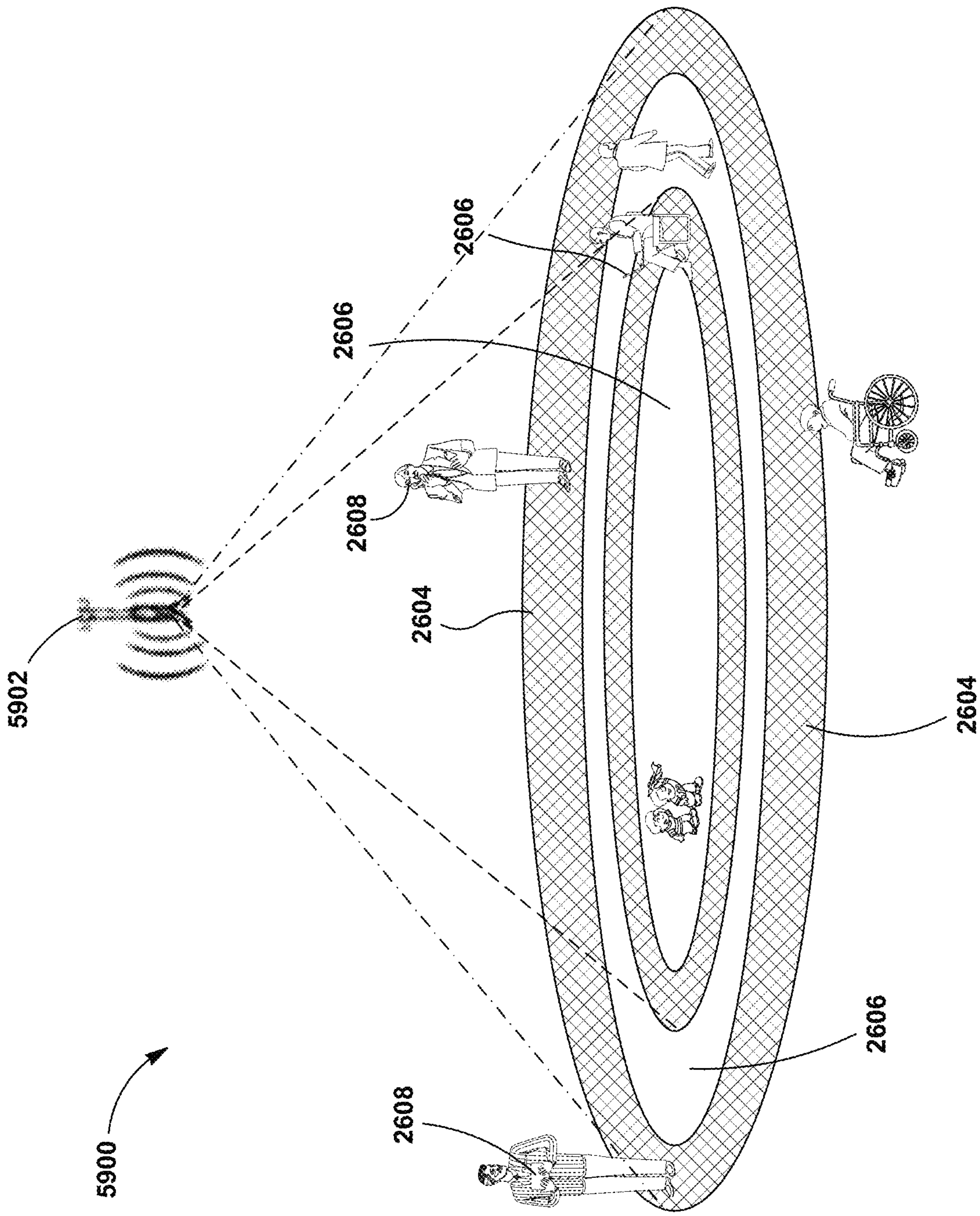
FIG. 59 illustrates wireless power transmission with selective range, where a plurality of pockets of energy may be generated along various radii from transmitter, in accordance with some embodiments.

FIG. 59 depicts wireless power transmission with selective range 5900, where a transmitter 5902 may produce pocket-forming for a plurality of receivers associated with electrical devices 2608 (FIG. 26). Transmitter 5902 may generate pocket-forming through wireless power transmission with selective range 5900, which may include one or more wireless charging radii 2604 (FIG. 26) and one or more radii of a transmission null at a particular physical location 2606. A plurality of electronic devices 2608 may be charged or powered in wireless charging radii 2604. Thus, several spots of energy may be created, such spots may be employed for enabling restrictions for powering and charging electronic devices 2608. As an example, the restrictions may include operating specific electronics in a specific or limited spot, contained within wireless charging radii 2604. Furthermore, safety restrictions may be implemented by the use of wireless power transmission with selective range 5900, such safety restrictions may avoid pockets of energy over areas or zones where energy needs to be avoided, such areas may include areas including sensitive equipment to pockets of energy and/or people which do not want pockets of energy over and/or near them. In embodiments such as the one shown in FIG. 59, the transmitter 5902 may comprise antenna elements found on a different plane than the receivers associated with electrical devices 2608 in the served area. For example, the receivers of electrical devices 2608 may be in a room where a transmitter 5902 may be mounted on the ceiling. Selective ranges for establishing pockets of energy using power transmission waves, which may be represented as concentric circles by placing an antenna array of the transmitter 5902 on the ceiling or other elevated location, and the transmitter 5902 may emit power transmission waves that will generate 'cones' of energy pockets. In some embodiments, the transmitter 5902 may control the radius of each charging radii 2604, thereby establishing intervals for service area to create pockets of energy that are pointed down to an area at a lower plane, which may adjust the width of the cone through appropriate selection of antenna phase and amplitudes.

Figure 60A:
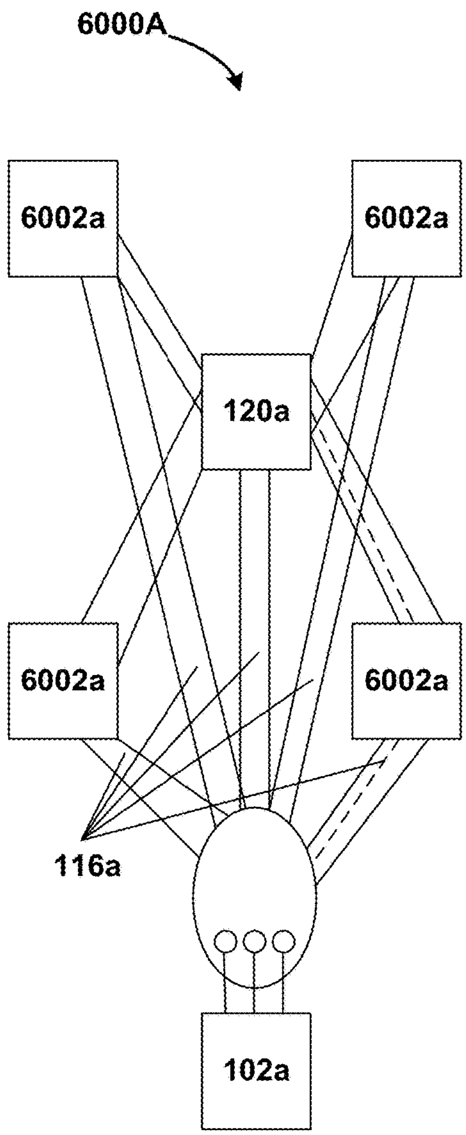
FIGS. 60A and 60B illustrate diagrams of architecture for wirelessly charging client computing platform, in accordance with some embodiments.
Figure 60B:
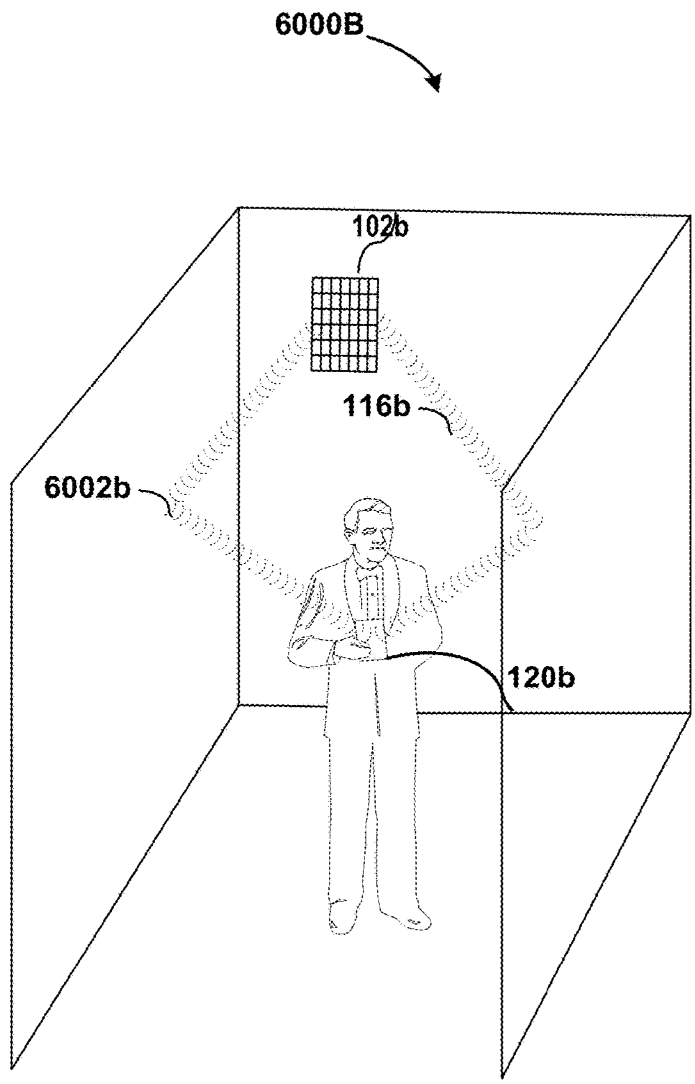

FIGS. 60A and 60B illustrate a diagram of architecture 6000A and 6000B for a wirelessly charging client computing platform, according to an exemplary embodiment. In some implementations, a user may be inside a room and may hold on his hands an electronic device (e.g., a smartphone, tablet). In some implementations, electronic device may be on furniture inside the room. The electronic device may include a receiver 120*a*, 120*b* (FIG. 1) either embedded to the electronic device or as a separate adapter connected to electronic device. Receivers 120*a* and 120*b* may include all the components described in FIG. 1. A transmitter 102*a*, 102*b* may be hanging on one of the walls of the room right behind user. Transmitters 102*a* and 102*b* may also include all the components described in FIG. 1.

As user may seem to be obstructing the path between receivers 120*a*, 120*b* and transmitters 102*a*, 102*b*, RF waves may not be easily aimed to the receivers 120*a*, 120*b* in a linear direction. However, since the short signals generated from receivers 120*a*, 120*b* may be omni-directional for the type of antenna element used, these signals may bounce over the walls 6002*a*, 6002*b* until they reach transmitters 102*a*, 102*b*. A hot spot 6002*a*, 6002*b* may be any item in the room which will reflect the RF waves. For example, a large metal clock on the wall may be used to reflect the RF waves to a user's cell phone.

A micro controller in the transmitter adjusts the transmitted signal from each antenna based on the signal received from the receiver. Adjustment may include forming conjugates of the signal phases received from the receivers and further adjustment of transmit antenna phases taking into account the built-in phase of antenna elements. The antenna element may be controlled simultaneously to steer energy in a given direction. The transmitters 102*a*, 102*b* may scan the room and look for hot spots 6002*a*, 6002*b*. Once calibration is performed, transmitters 102*a*, 102*b* may focus RF waves in a channel following a path that may be the most efficient paths. Subsequently, RF signals 116*a*, 116*b* (FIG. 1) may form a pocket of energy on a first electronic device and another pocket of energy in a second electronic device while avoiding obstacles such as user and furniture.

When scanning the service area, the room in FIGS. 60A and 60B, the transmitters 102*a*, 102*b* may employ different methods. As an illustrative example, but without limiting the possible methods that can be used, the transmitters 102*a*, 102*b* may detect the phases and magnitudes of the signal coming from the receiver and use those to form the set of transmit phases and magnitudes, for example by calculating conjugates of them and applying them at transmit. As another illustrative example, the transmitter may apply all possible phases of transmit antennas in subsequent transmissions, one at a time, and detect the strength of the pocket of energy formed by each combination by observing information related to the signal from the receivers 120*a*, 120*b*. Then the transmitters 102*a*, 102*b* repeat this calibration periodically. In some implementations, the transmitters 102*a*, 102*b* do not have to search through all possible phases, and can search through a set of phases that are more likely to result in strong pockets of energy based on prior calibration values. In yet another illustrative example, the transmitters 102*a*, 102*b* may use preset values of transmit phases for the antennas to form pockets of energy directed to different locations in the room. The transmitter may for example scan the physical space in the room from top to bottom and left to right by using preset phase values for antennas in subsequent transmissions. The transmitters 102*a*, 102*b* then detect the phase values that result in the strongest pocket of energy around the receivers 120*a*, 120*b* by observing the signal from the receivers 120*a*, 120*b*. It should be appreciated that there are other possible methods for scanning a service area for heat mapping that may be employed, without deviating from the scope or spirit of the embodiments described herein. The result of a scan, whichever method is used, is a heat-map of the service area (e.g., room, store) from which the transmitters 102*a*, 102*b* may identify the hot spots that indicate the best phase and magnitude values to use for transmit antennas in order to maximize the pocket of energy around the receiver.

The transmitters 102*a*, 102*b* may use the Bluetooth connection to determine the location of the receivers 120*a*, 120*b*, and may use different non-overlapping parts of the RF band to channel the RF waves to different receivers 120*a*, 120*b*. In some implementations, the transmitters 102*a*, 102*b* may conduct a scan of the room to determine the location of the receivers 120*a*, 120*b* and form pockets of energy that are orthogonal to each other, by virtue of non-overlapping RF transmission bands. Using multiple pockets of energy to direct energy to receivers may inherently be safer than some alternative power transmission methods since no single transmission is very strong, while the aggregate power transmission signal received at the receiver is strong.

Figure 60C:
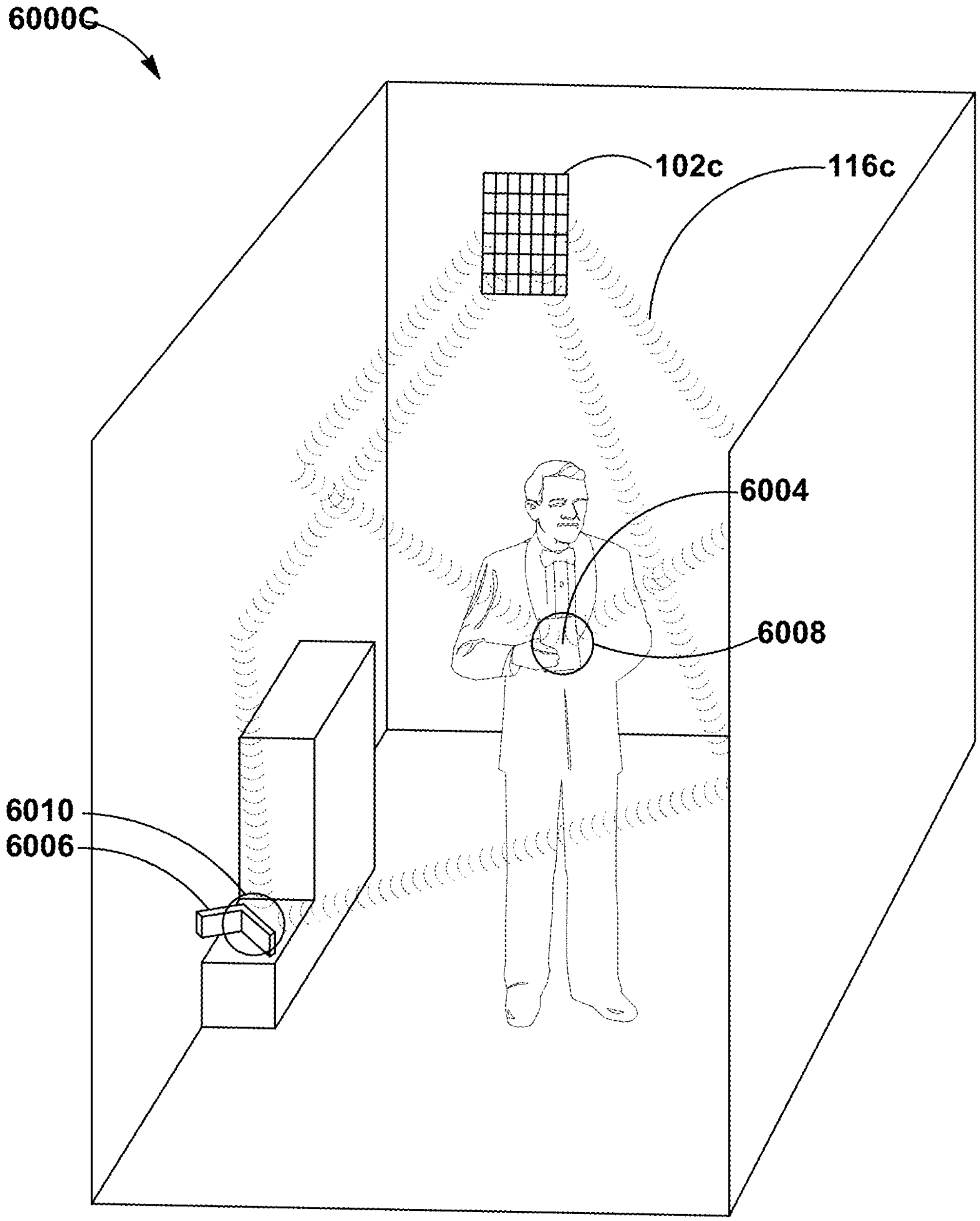
FIG. 60C illustrates multiple adaptive pocket-forming, in accordance with some embodiments.

FIG. 60C is an exemplary illustration of multiple adaptive pocket-forming 6000C. In this embodiment, a user may be inside a room and may hold on his hands an electronic device, which in this case may be a tablet 6004. In addition, smartphone 6006 may be on furniture inside the room. Tablet 6004 and smartphone 6006 may each include a receiver either embedded to each electronic device or as a separate adapter connected to tablet 6004 and smartphone 6006. Receiver may include all the components described in FIG. 1. A transmitter 102*c* (FIG. 1) may be hanging on one of the walls of the room right behind user. Transmitter 102*c* may also include all the components described in FIG. 1. As user may seem to be obstructing the path between receiver and transmitter 102*c*, RF waves 116*c* (FIG. 1) may not be easily aimed to each receiver in a line of sight fashion. However, since the short signals generated from receivers may be omni-directional for the type of antenna elements used, these signals may bounce over the walls until they find transmitter 102*c*. Almost instantly, a microcontroller which may reside in transmitter 102*c*, may recalibrate the transmitted signals, based on the received signals sent by each receiver, by adjusting gain and phases and forming a convergence of the power transmission waves such that they add together and strengthen the energy concentrated at that location—in contrast to adding together in a way to subtract from each other and diminish the energy concentrated at that location, which is called "destructive interference" and conjugates of the signal phases received from the receivers and further adjustment of transmit antenna phases taking into account the built-in phase of antenna elements. Once calibration is performed, transmitter 102*c* may focus RF waves following the most efficient paths. Subsequently, a pocket of energy 6008 may form on tablet 6004 and another pocket of energy 6010 in smartphone 6006 while taking into account obstacles such as user and furniture. The foregoing property may be beneficial in that wireless power transmission using multiple pocket-forming 6000C may inherently be safe as transmission along each pocket of energy is not very strong, and that RF transmissions generally reflect from living tissue and do not penetrate.

Once transmitter 102*c* identities and locates receiver, a channel or path can be established by knowing the gain and phases coming from receiver. Transmitter 102*c* may start to transmit controlled RF waves 116*c* that may converge in 3-dimensional space by using a minimum of two antenna elements. These RF waves 116*c* may be produced using an external power source and a local oscillator chip using a suitable piezoelectric material. RF waves 116*c* may be controlled by RFIC that may include a proprietary chip for adjusting phase and/or relative magnitudes of RF signals, which may serve as inputs for antenna elements to form constructive and destructive interference patterns (pocket-forming). Pocket-forming may take advantage of interference to change the directionality of the antenna elements where constructive interference generates a pocket of energy and deconstructive interference generates a null in a particular physical location. Receiver may then utilize pocket of energy produced by pocket-forming for charging or powering an electronic device, for example a laptop computer and a smartphone and thus effectively providing wireless power transmission.

Multiple pocket-forming 6000C may be achieved by computing the phase and gain from each antenna of transmitter to each receiver. The computation may be calculated independently because multiple paths may be generated by antenna elements from transmitter to antenna elements from receiver.

An example of the computation for at least two antenna elements may include determining the phase of the signal from the receiver and applying the conjugate of the receive parameters to the antenna elements for transmission.

In some embodiments, two or more receivers may operate at different frequencies to avoid power losses during wireless power transmission. This may be achieved by including an array of multiple embedded antenna elements in transmitter 102*c*. In one embodiment, a single frequency may be transmitted by each antenna in the array. In other embodiments, some of the antennas in the array may be used to transmit at a different frequency. For example, ½ of the antennas in the array may operate at 2.4 GHz while the other ½ may operate at 5.8 GHz. In another example, ⅓ of the antennas in the array may operate at 900 MHz, another ⅓ may operate at 2.4 GHz, and the remaining antennas in the array may operate at 5.8 GHz.

In another embodiment, each array of antenna elements may be virtually divided into one or more antenna elements during wireless power transmission, where each set of antenna elements in the array can transmit at a different frequency. For example, an antenna element of the transmitter may transmit power transmission signals at 2.4 GHz, but a corresponding antenna element of a receiver may be configured to receive power transmission signals at 5.8 GHz. In this example, a processor of the transmitter may adjust the antenna element of the transmitter to virtually or logically divide the antenna elements in the array into a plurality patches that may be fed independently. As a result, ¼ of the array of antenna elements may be able to transmit the 5.8 GHz needed for the receiver, while another set of antenna elements may transmit at 2.4 GHz. Therefore, by virtually dividing an array of antenna elements, electronic devices coupled to receivers can continue to receive wireless power transmission. The foregoing may be beneficial because, for example, one set of antenna elements may transmit at about 2.4 GHz and other antenna elements may transmit at 5.8 GHz, and thus, adjusting a number of antenna elements in a given array when working with receivers operating at different frequencies. In this example, the array is divided into equal sets of antenna elements (e.g., four antenna elements), but the array may be divided into sets of different amounts of antenna elements. In an alternative embodiment, each antenna element may alternate between select frequencies.

The efficiency of wireless power transmission as well as the amount of power that can be delivered (using pocket-forming) may be a function of the total number of antenna elements used in a given receivers and transmitters system. For example, for delivering about one watt at about 15 feet, a receiver may include about 80 antenna elements while a transmitter may include about 256 antenna elements. Another identical wireless power transmission system (about 1 watt at about 15 feet) may include a receiver with about 40 antenna elements, and a transmitter with about 512 antenna elements. Reducing in half the number of antenna elements in a receiver may require doubling the number of antenna elements in a transmitter. In some embodiments, it may be beneficial to put a greater number of antenna elements in transmitters than in receivers because of cost, because there will be much fewer transmitters than receivers in a system-wide deployment. However, the opposite can be achieved, e.g., by placing more antenna elements on a receiver than on a transmitter as long as there are at least two antenna elements in a transmitter 102*c*.

Figure 61:
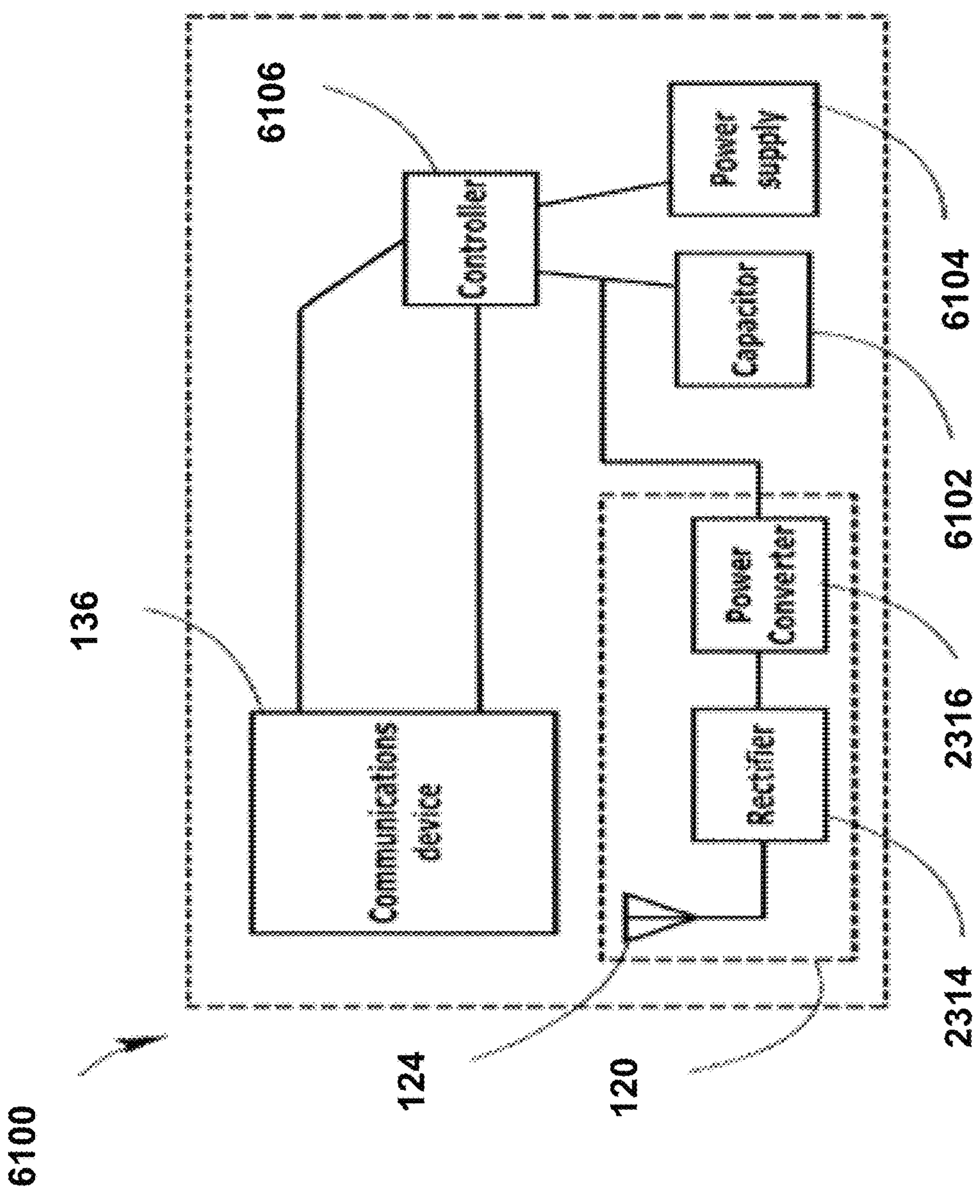
FIG. 61 illustrates an electronic device including at least one embedded receiver and at least one auxiliary power supply for improving a portable electronic device's main power supply life, in accordance with some embodiments.

FIG. 61 illustrates an electronic device 6100 comprising an embedded receiver 120 (FIG. 1), which may be integrated into the electronic device 6100 or otherwise detachably coupled within the electronic device 6100, as discussed above with reference to FIG. 1. The electronic device 6100 may further comprise a capacitor that may store electrical energy and serve the function of an auxiliary power supply 6102, which may improve the period of time the electronic device 6100 may be used, particularly after a power supply 6104 is depleted.

An embedded receiver 120 may comprise one or more antenna elements 124 capable of receiving power transmission waves from a pocket of energy and converting energy caused by the power transmission waves into AC voltage, as discussed above with reference to FIG. 1. The embedded receiver 120 may further comprise a rectifier circuit 2314 (FIG. 23) configured to convert the AC voltage into direct current (DC) voltage, and a power converter 2316 (FIG. 23) configured to provide a constant DC voltage output to the capacitor serving as the auxiliary power supply 6102. Although in the exemplary system 6100 embodiment, the auxiliary power supply 6102 may be a capacitor, it should be appreciated that the auxiliary power supply 6102 may be any combination of one or more electrical circuits capable of receiving, storing, and supplying a charge on behalf of the electronic device 6100; for example, the auxiliary power supply 6102 may be a battery. Capacitors, however, may be easily and cheaply be manufactured in small sizes, which may be beneficial for many wearable devices. The auxiliary power supply 6102 may fully or partially power the electronic device 6100, and thus the auxiliary power supply 6102 may fully or partially decrease the power demands placed on a power supply 6102 by the electronic device 6100.

In some embodiments, an embedded receiver 120 in the electronic device 6100 may use a communications device 136 (FIG. 1) also embedded within the electronic device 6100 to communicate with a transmitter and/or other electronic devices. In some embodiments, the electronic device 6100 may not include a communications device 136, and thus the embedded receiver 120 may comprise a communications component (not shown). In some embodiments, the electronic device 6100 may comprise a micro-controller 6106 circuit that not only control the intended functions of the electronic device 6100, but the micro-controller may also manage power loads on auxiliary power supply 6102 and/or power supply 6104. In other embodiments, the micro-controller 6106 may be embedded within the embedded receiver 120. The foregoing configuration may be beneficial when implementing receivers on electronic devices that may not include a micro-controller 6106, for example, an ordinary analog wristwatch.

Figure 62A:
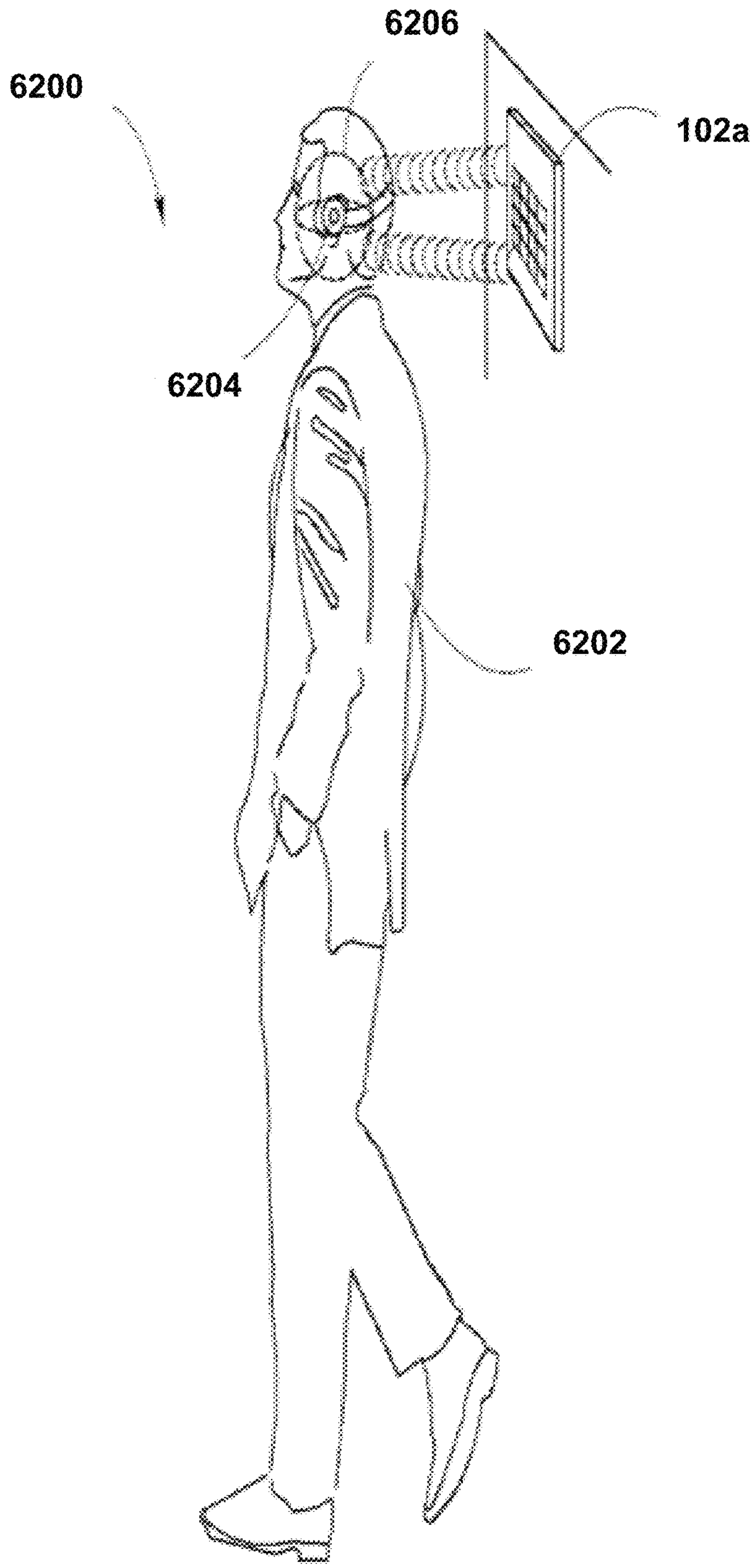
FIG. 62A illustrates an electronic wearable device in the form of a Bluetooth headset including at least one embedded receiver for providing wireless power transmission, in accordance with some embodiments.

FIG. 62A illustrates implementation of a wireless power transmission system 6200 in which an individual user 6202 may be wearing a Bluetooth-enabled headset 6204, and wireless power transmissions may be powering the headset 6204, through pocket-forming established by transmitter 102*a* (FIG. 1). The headset 6204 may include an embedded receiver (not shown) for utilizing pockets of energy 6206 to power a capacitor (not shown) embedded within the headset 6204. In some embodiments, such as the exemplary system 6200, the embedded receiver may utilize a native Bluetooth chip (not shown) of the headset 6204 for communicating wirelessly with the transmitter 102*a*. The headset 6204 may use a native, embedded micro-controller to manage power loads being generated between the capacitor and the native power supply of the headset 6204. In some implementations, the transmitter 102*a* may be located within a house or on other such buildings where the individual 6202 may be frequently located, thereby providing convenient charging to the headset 6204. In other embodiments, the transmitter 102*a* may be placed inside a car belonging to the individual 6202 to power the headset 6204 while driving.

Figure 62B:
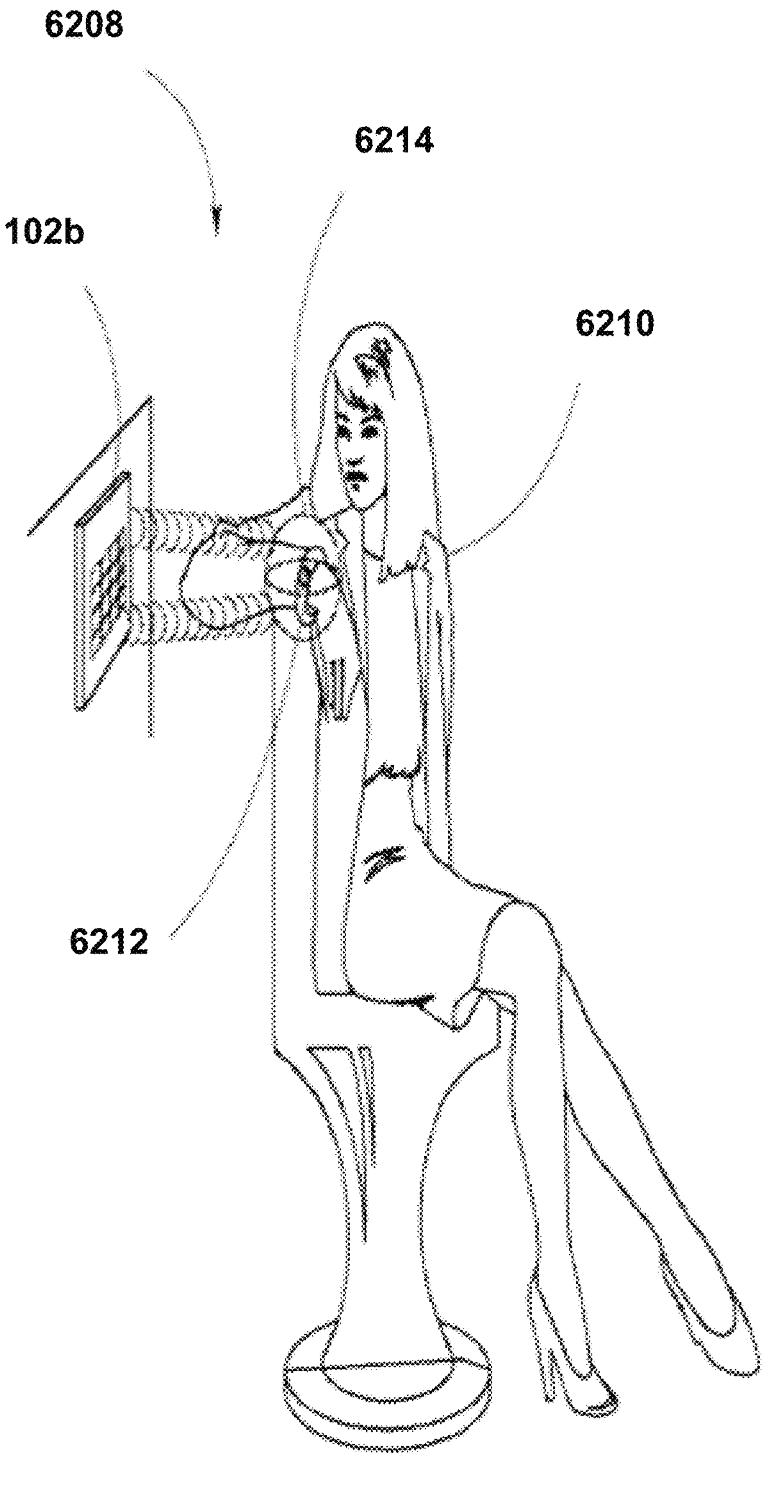
FIG. 62B illustrates an electronic wearable device in the form of a wristwatch including at least one embedded receiver, for providing wireless power transmission, in accordance with some embodiments.

FIG. 62B illustrates wireless power transmission 6208 where an individual user 6210 may be wearing a typical digital wristwatch 6210, which may be powered by power transmission waves from pockets of energy established by a transmitter 102*b* (FIG. 1). The wristwatch 6212 may include an embedded receiver (not shown) for utilizing pockets of energy 6214 to provide power (i.e., electrical charge) to a capacitor (not shown) embedded within the wristwatch 6212. However, typical wristwatches, such as wristwatch 6212, may not include a Bluetooth chip or a micro-controller, in which case, the embedded receiver may include an optional communications device and an embedded micro-controller. In this embodiment, communications device can be a Bluetooth chip.

Figure 62C:
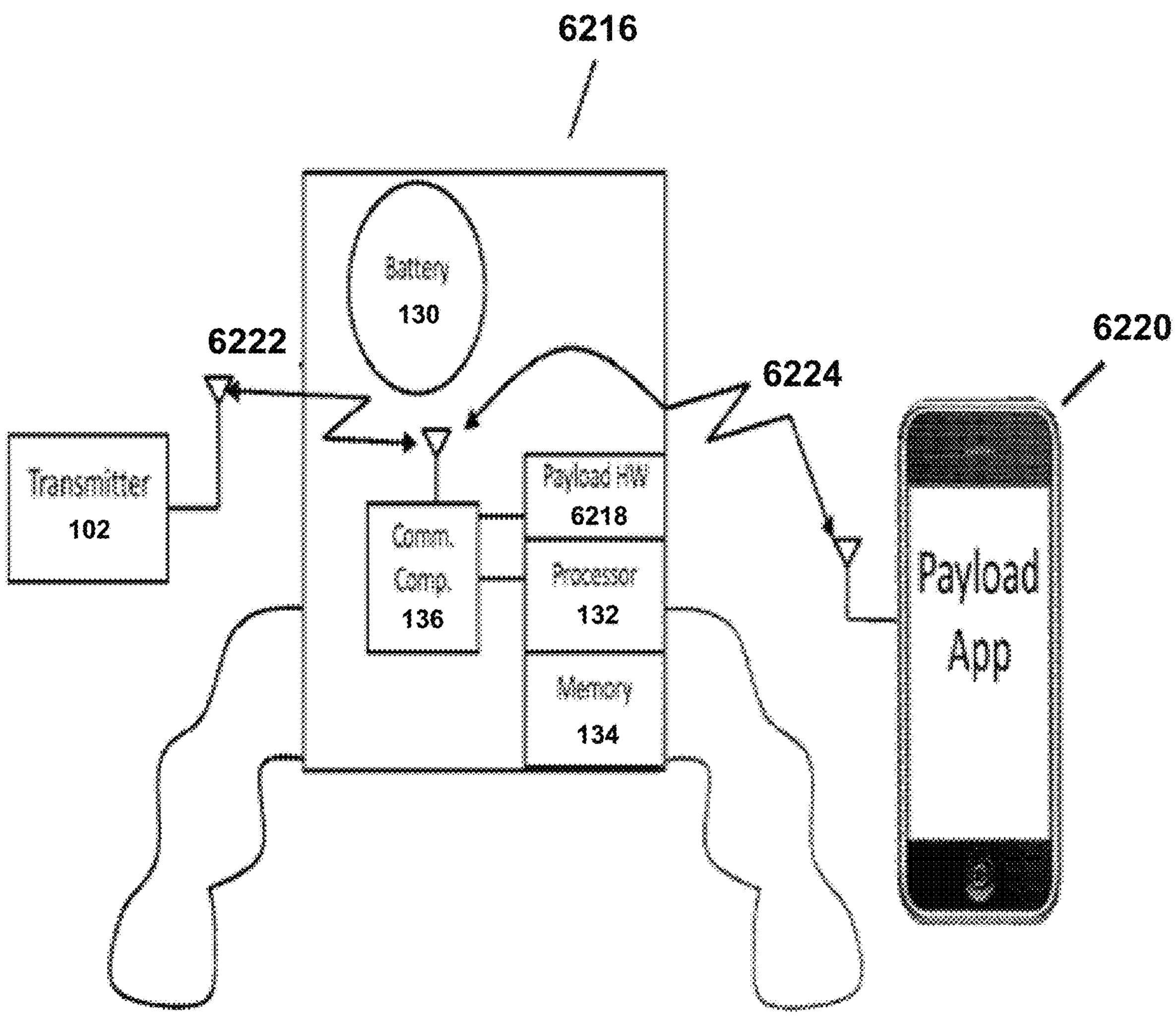
FIG. 62C illustrates a schematic representation of a wearable device, in accordance with some embodiments.

FIG. 62C shows a schematic representation of a wearable device 6216, which may be a type of computing device comprising a receiver, as described above. A wearable 6216 may be an article of clothing (e.g., shirt, hat, pants, shoes) or other personal accessory (e.g., jewelry, belt, book bag, wristband, watch, anklet) of a user, and may comprise a computing processor 132 (FIG. 1), payload hardware 6218, a battery 130 (FIG. 1), and a communication component 136 (FIG. 1), which in FIG. 62C is a Bluetooth® low-energy antenna and processor (BLE). The wearable 6216 may further comprise memory 134 (FIG. 1) for storing the computer's programming and payload application data.

A computing processor 132 of the wearable 6216 may be integrated circuitry capable of performing power and payload functionality for the wearable 6216. The wearable 6216 may communicate payload application data with a smart device 6220 to provide the user with the desired functionality, for which the wearable 6216 was designed. For example, if the wearable 6216 is a heart rate monitor, then the payload application executed by the smart device 6220 may be a software application that provides features such as heart rate tracking, dietary data, exercise data, among other heart health information and features. In this example, the payload application data may be heart rate measurements observed by the wearable 6216. The smart device 6220 may be any computing device comprising a processor capable of executing the payload application and that is capable of communicating payload application instructions and data over a wireless protocol, such as Bluetooth®, NFC, BLE, RFID, Wi-Fi, and the like. Non-limiting examples of the smart device 6220 may include a smartphone, laptop, or other computing device.

Payload hardware 6218 may be circuitry of the wearable 6216 capable of executing various processes and tasks in accordance with the features of the payload application and functional purpose of the wearable 6216. Returning to the example in which the wearable 6216 is a heart rate monitor, which may be worn on a user's wrist: in this example, the payload hardware 6218 may comprise components capable of measuring the user's heart rate and blood pressure. The processor 132 of the wearable 6216 may receive the measurements from the payload hardware 6218 and then produce payload application data from the measurements. Although the examples of a wearable 6216 describe a heart rate monitor, it should be appreciated that the wearable 6216 may be any device that is worn by the user and provides various computing features (e.g., smart watches, smart glasses). As such, a wearable 6216 may comprise payload hardware 6218 rendering the wearable 6216 capable of the intended functionality.

In some embodiments, the wearable 6216 may comprise a battery 130 capable of holding an electrical charge. The battery 130 may power the computing processor 132 and the payload hardware 6218. In some embodiments, the battery 130 of the wearable 6216 may receive the electrical charge from the communications component 136, which may comprise a receiver configured to harvest energy from pockets of energy produced by transmitters 102 (FIG. 1). In some embodiments, the wearable 6216 may forego a battery 130 and may be powered entirely by electrical energy harvested by a receiver of the communications component 136.

A communications component 136 may be circuitry of the wearable 6216 that may communicate control signals 6222 with a transmitter 102 data using one or more wireless communications protocols (e.g., Bluetooth, BLE, Wi-Fi, NFC, RFID). The communications component 136 may communicate payload application data over a second communication channel 6224 with a smart device 6220 executing a payload application associated with the functionality of the wearable 6216. The wearable 6216 may communicate control signals 6222 with a transmitter 102 concurrently to communicating the payload application data to the smart device 6220 over the second communication channel 6224. In some embodiments, the wearable 6216 may communicate simultaneously with both the transmitter 102 and the smart device 6220. In such embodiments, the communications component 136 and the processor 132 may be capable of receiving and processing the respective communications signals simultaneously. In some embodiments, the wearable 6216 may alternate communications between the transmitter 102 and the smart device 6220. In such embodiments, the processor 132 and communications component 136 may communicate with each device for a predetermined period of time.

Control signals 6222 may contain control data produced by the processor 132 and communications component 136 of the wearable 6216, which the transmitter 102 may use to adjust power transmission waves that the transmitter 102 emits to generate pockets of energy. The control data of the control signals 6222 may contain, for example, data indicating the location of the wearable relative to the transmitter 102, and data indicating the amount of power that the wearable 6216 has effectively harvested from a pocket of energy generated by the transmitter 102. In some cases, the control signals 6222 may include an advertisement signal for establishing a first communication between the transmitter 102 and the communications component 136 of the wearable 6216.

Payload application data collected by the payload hardware 6218 may be transmitted to the smart device 6220, over a second communication channel 6224. The second communication channel 6224 hosting the payload application data may implement any wireless communication protocol capable of transmitting the payload application data from the wearable to the smart device 6220. In some embodiments, the communications component 136 may transmit the payload application data at a given interval. In some embodiments, the payload application data may be transmitted at the moment the wearable 6216 and the smart device 6220 are brought into communicative proximity; in such embodiments, the second communication channel 6224 may be automatically established, and the smart device 6220 and wearable 6216 may then automatically exchange payload application data collected by the payload hardware 6218 of the wearable 6216.

In some embodiments, the wearable 6216 may comprise memory 134, which may be a non-transitory machine-readable storage media that is capable of storing binary data. In some cases, the memory 134 may store programming associated with the payload application that may be executed by the processor 132 and/or the payload hardware 6218. When the processor 132 executes the programming stored in the memory 134, the payload hardware 6218 may collect measurements and perform various tasks intended to provide the intended functionality of the wearable 6216 and the associated payload application. In some cases, the memory 134 may store control data that may inform transmitters 102 of an optimal waveform and direction for transmitting power transmission waves to establish pockets of energy. In such cases, the wearable 6216 may transmit the control data for the transmitters 102 to determine how the power transmission waves should be produced and transmitted. The processor 132 may continuously update the memory 134 with control data representing more effective ways for the transmitters 102 to produce and transmit power control waves.

A smart device 6220 may be any computing device comprising a processor that executes a payload application associated with the wearable 6216, a communication component that communicates payload application data and instructions with the wearable 6216 over a second communications channel 6224. In some embodiments, communication between wearable and smart device 6220 may be through Bluetooth Low Energy (BLE), Wi-Fi, or other wireless communication protocol. Application payload data may include wearable 6216 status or usage reports, or payload application data generated by the wearable 6216. As an example, for embodiments in which the wearable 6216 is a heart rate monitor, the payload application data may include heart rate measurements or physical exertion data.

A transmitter 102 may be any device that emits power transmission waves that establish a pocket of energy, which may be harvested by receivers and converted to electric energy. The transmitter 102 may transmit power transmission waves to a wireless power receiver, which may be a component of the communications component 136 of the wearable 6216 shown in FIG. 62C. In some embodiments, the wearable 6216 may communicate an advertisement signal to establish a first communication channel, which hosts control data 6222. After establishing the first communication channel hosting control data 6222, the transmitter 102 may then begin communicating control data 6222 with the wearable 6216, to manage delivery of electrical energy to the battery 130 of the wearable 6216. In some embodiments, the wearable 6216 may use the same or a different communication channel to upload application payload data to the transmitter 102, which the transmitter 102 may upload to a server of a computing service associated with the transmitter 102. Control data may include wearable 6216 device status and usage reports.

Figure 62D:
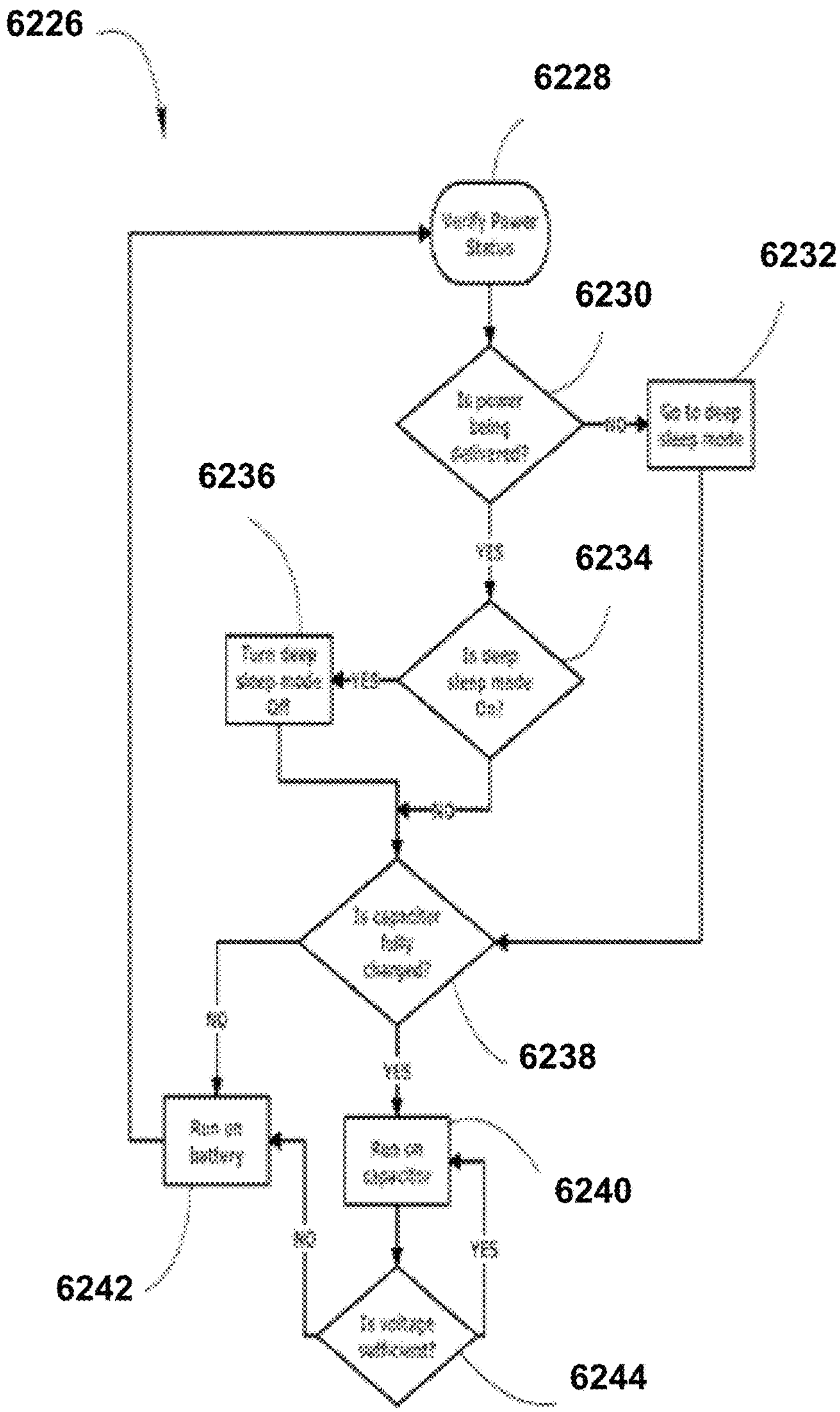
FIG. 62D illustrates an algorithm for managing power loads on an electronic device, in accordance with some embodiments.

FIG. 62D illustrates a logical execution of method 6226 implemented by a controller of a receiver or electronic device. The exemplary method 6226 may be used for managing power loads on auxiliary power supply, which may be in the form of a capacitor and/or a power supply in the form of battery. The method 6226 may begin at a verify power step 6228 where a micro-controller may determine whether power is being delivered to an embedded receiver of the electronic device.

After verifying power step 6228, the micro-controller may continue to a power decision step 6230 where the micro-controller may determine whether to proceed to a deep sleep mode step 6232 or to proceed to a deep sleep mode decision step 6234; the determination may be based on a power delivery status. That is, if power is not being delivered, the micro-controller may proceed to deep sleep mode step 6232 where power saving may be prioritized. On the other hand, if the power is being delivered, the micro-controller may proceed to a deep sleep mode decision step 6234, where the micro-controller may determine whether the electronic device is in deep sleep mode. If the electronic device is in deep sleep mode, then the micro-controller may proceed to a turn deep sleep mode off step 6236, where deep sleep mode may be turned off After determining a determination of sleep mode status, the micro-controller may proceed to a capacitor charge decision step 6238. However, if the electronic device is not in deep sleep mode, the micro-controller may proceed directly to capacitor charge decision step 6238.

At capacitor charge decision step 6238, the micro-controller determine whether to proceed to an operate on capacitor step 6240, or proceed to an operate on battery step 6242. If auxiliary power supply, in the form of a capacitor, is fully charged, then the micro-controller may proceed to operate on capacitor step 6240 in which a capacitor may provide power to the electronic device. On the other hand, if the auxiliary power supply, in the form of a capacitor, is not fully charged, then the micro-controller may proceed to operate on battery step 6242 where the power supply, in the form of a battery, may provide power to the electronic device.

Referring back to the operate on capacitor step 6240, in some cases a sub-routine may be added where the micro-controller may ordinarily proceed to a voltage verification step 6244. In voltage verification step 6244, the micro-controller may continuously or on predefined time intervals, verify the voltage across the auxiliary power supply to detect and prevent the electronic device from turning off. If the voltage level across the auxiliary power supply is not sufficient for powering the electronic device, the micro-controller may proceed to operate on battery step 6242. Otherwise, the micro-controller may remain at the operate on capacitor step 6240. In many circumstances, where micro-controller reaches an operate on battery step 6242, the method 6226 may begin, again, to verify power delivery status and minimize the power load on the power supply. In addition, when on deep sleep mode step 6232, the micro-controller may proceed to a capacitor charge decision step 6238, in which the micro-controller may decide whether to operate on deep sleep mode and whether to draw energy from power supply or auxiliary power supply.

In other embodiments of the method 6226, the micro-controller may decide to power the electronic device using the power supply and auxiliary power supply simultaneously. This option may be beneficial when the power load on the electronic device is too large for a capacitor to handle alone. However, such a configuration may still diminish the power load on the power supply. In other embodiments, a plurality of capacitors can be used as an auxiliary power supply to compensate for power surges or high power demands.

FIGS. 57-62 illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 57-62.

Presented below are example wearable devices and wireless power charging systems.

A wearable device may include: (i) one or more antenna elements configured to extract energy from one or more power transmission waves establishing a pocket of energy and further configured to convert the energy of the power transmission waves to an electrical current, (ii) a communication component configured to transmit to a transmitter one or more control signals indicating a location of the wearable device relative to the transmitter, (iii) a rectifier configured to convert the electrical current produced from the antenna elements from an alternating current (AC) to a direct current (DC), and (iv) a battery configured to store energy from the electrical current.

In some embodiments, the wearable device comprises an auxiliary power supply configured to store energy from the electrical current. Furthermore, in some embodiments, the auxiliary power supply is a capacitor circuit. Furthermore, in some embodiments, the auxiliary power supply is a second battery. Furthermore, in some embodiments, the wearable device is powered by the auxiliary power supply upon the battery of the wearable device being depleted.

In some embodiments, the wearable device comprises a processor configured to monitor a power level of the battery of the device. Furthermore, in some embodiments, the processor is further configured to switch an auxiliary power supply upon determining the battery level is depleted. Furthermore, in some embodiments, the processor is further configured to execute one or more payload application instructions received from a smart device associated with the wearable device.

In some embodiments, the communication component is further configured to broadcast an advertisement signal to a transmitter in response to determining the battery level requires a recharge threshold.

In another wearable device, the wearable device may include: (i) payload hardware configured to capture one or more measurements in accordance with a payload application associated with the wearable device, (ii) a processor configured to execute the payload application according to one or more instructions received from a smart device, and (iii) a communications component configured to communicate payload application data and payload application instructions with the smart device, and (iv) a power supply detachably coupled to a receiver, where the power supply is configured to receive electrical current from the receiver.

In some embodiments, the power supply of the wearable device is a battery configured to store the electrical current.

In some embodiments, the wearable device further comprises a processor configured to determine an amount of energy received from the receiver. Furthermore, in some embodiments, the processor is further configured to charge a battery of the wearable device in response to determining the amount of energy received from the receiver exceeds a threshold amount.

In some embodiments, the wearable device is further configured to receive electrical current stored in a second battery of the receiver.

A wireless power charging system may include: a wearable device comprising: (i) payload hardware configured to capture one or more measurements in accordance with a payload application associated with the wearable device, (ii) a processor configured to execute the payload application according to one or more instructions received from a smart device, and (iii) a communications component configured to communicate payload application data and payload application instructions with the smart device, where the wearable device is detachably coupled to a receiver. In some embodiments, the receiver comprises: (i) one or more antenna elements configured to extract energy from one or more power transmission waves in a pocket of energy and convert the energy of the power transmission wave to an electrical current and (ii) a rectifier configured to convert the electrical current produced from the antenna elements from an AC to a DC, wherein the DC current is provided to the wearable device.

In some embodiments, the receiver further comprises a second communications component configured to transmit to a transmitter one or more control signals indicating a location of the wearable device relative to the transmitter.

In some embodiments, the wearable device further comprises a battery storing energy from the electrical current output from the receiver.

In some embodiments, the receiver further comprises a DC-to-DC converter circuit configured to generate a consistent output of DC current from the DC current produced by the rectifier.

In some embodiments, the receiver further comprises a battery configured to store the energy from DC current produced by the rectifier.

FIGS. 63A-63H show exemplary graphical user interface (GUI) embodiments for status and usage reporting (graphical user interface demo). Primary display options (as seen at the left side of various display views, for example the screen shot of FIG. 63A) include dashboard, devices, locations, transmitters, accounts, and settings.

Figure 63A:
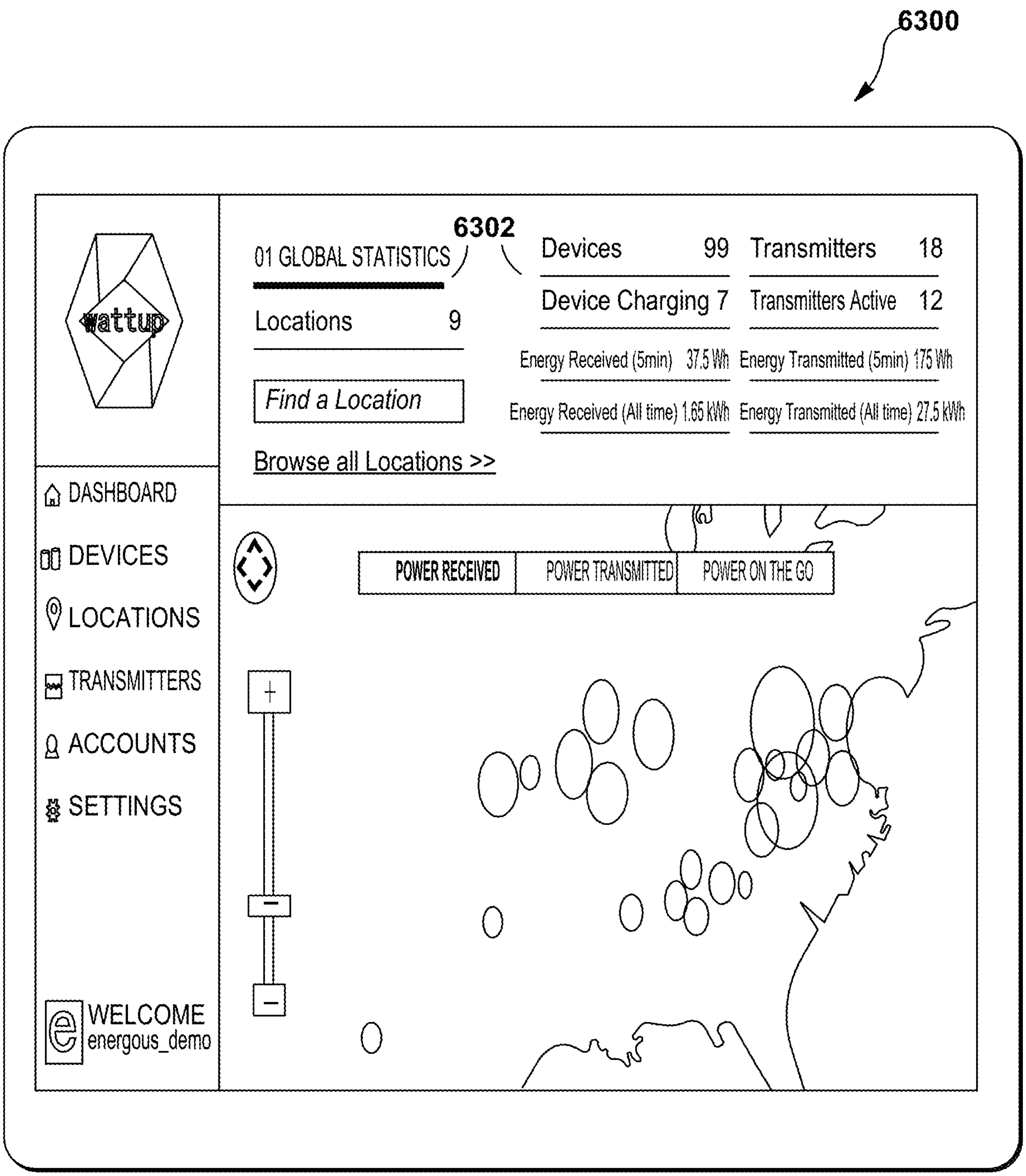
FIGS. 63A-63H are various screenshots of graphical user interfaces for a wireless power transmission management system, in accordance with some embodiments.

FIG. 63A shows an exemplary graphical user interface (GUI) 6300 for users to administer their account for a wireless power management system. The GUI 6300 exemplifies the scalable nature of the wireless power management system, as applied to display 6302 of statistics. Local, regional, national, or international organizations can view data and graphical depictions (e.g. the bubble charts seen here) of power transfer statistics, such as number of power transmitters, number of power receivers, volume of power transmitted, number of devices recognized, and number of devices currently charging.

Figure 63B:
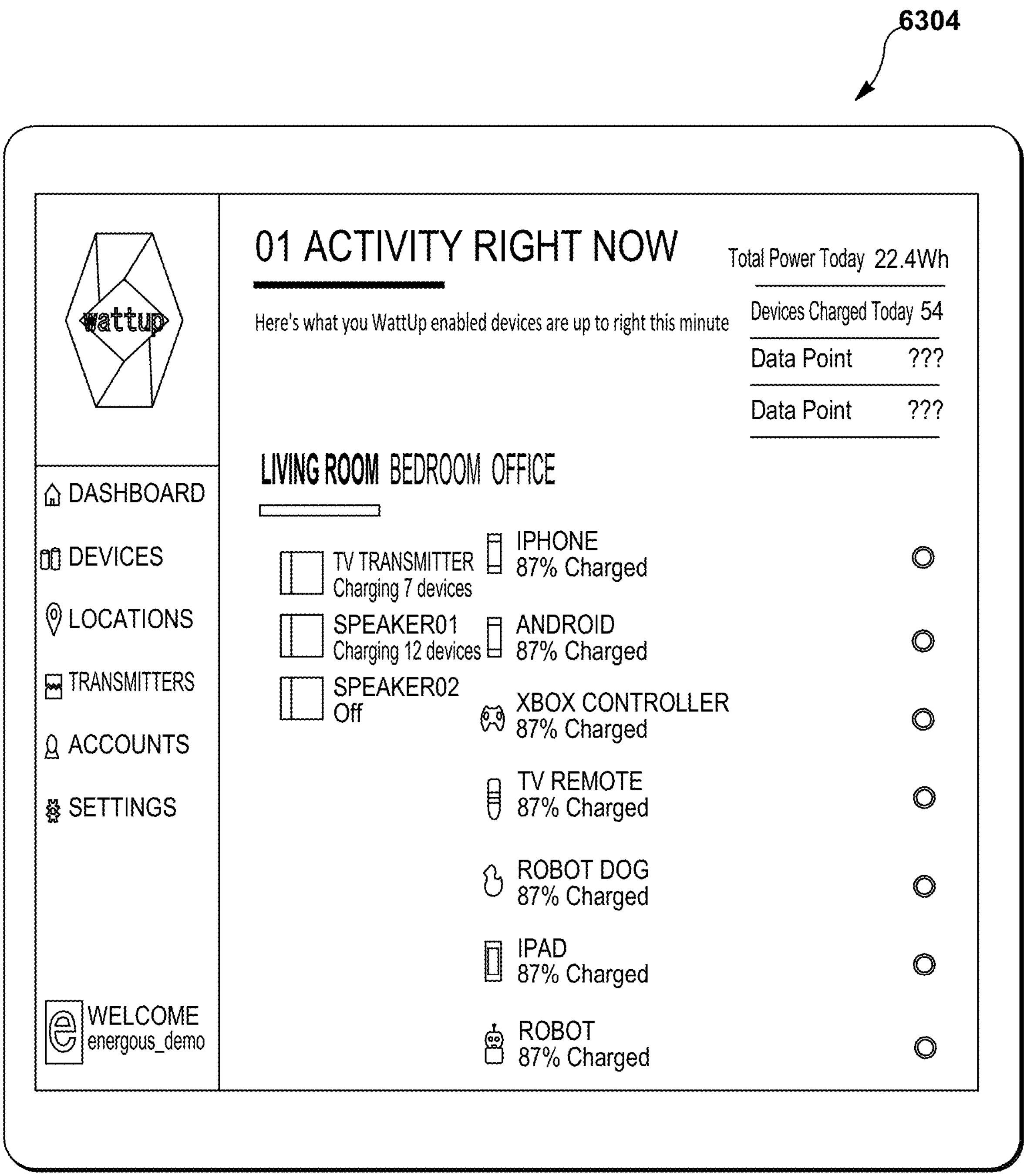

FIG. 63B shows an exemplary GUI 6304 of the system displaying location and tracking within a home, office, or other facility. The user can select a room or other area within the facility, such as living room, and view status and usage metrics for transmitters (e.g. how many devices are currently being charged) and devices (charging status for each device). Data on the cloud-based management system can be viewed, as seen here, using a web portal.

Figure 63C:
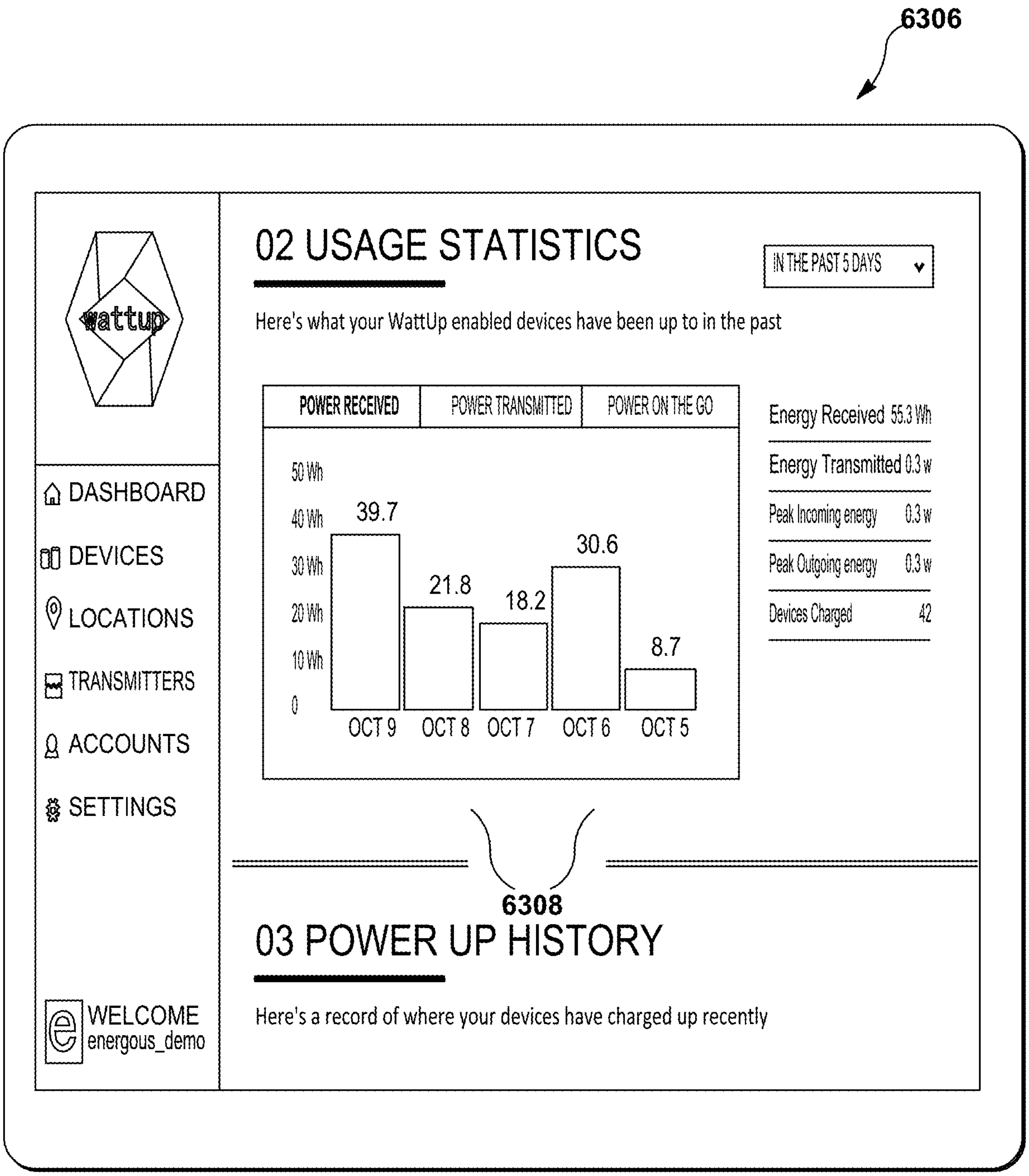
Figure 63D:
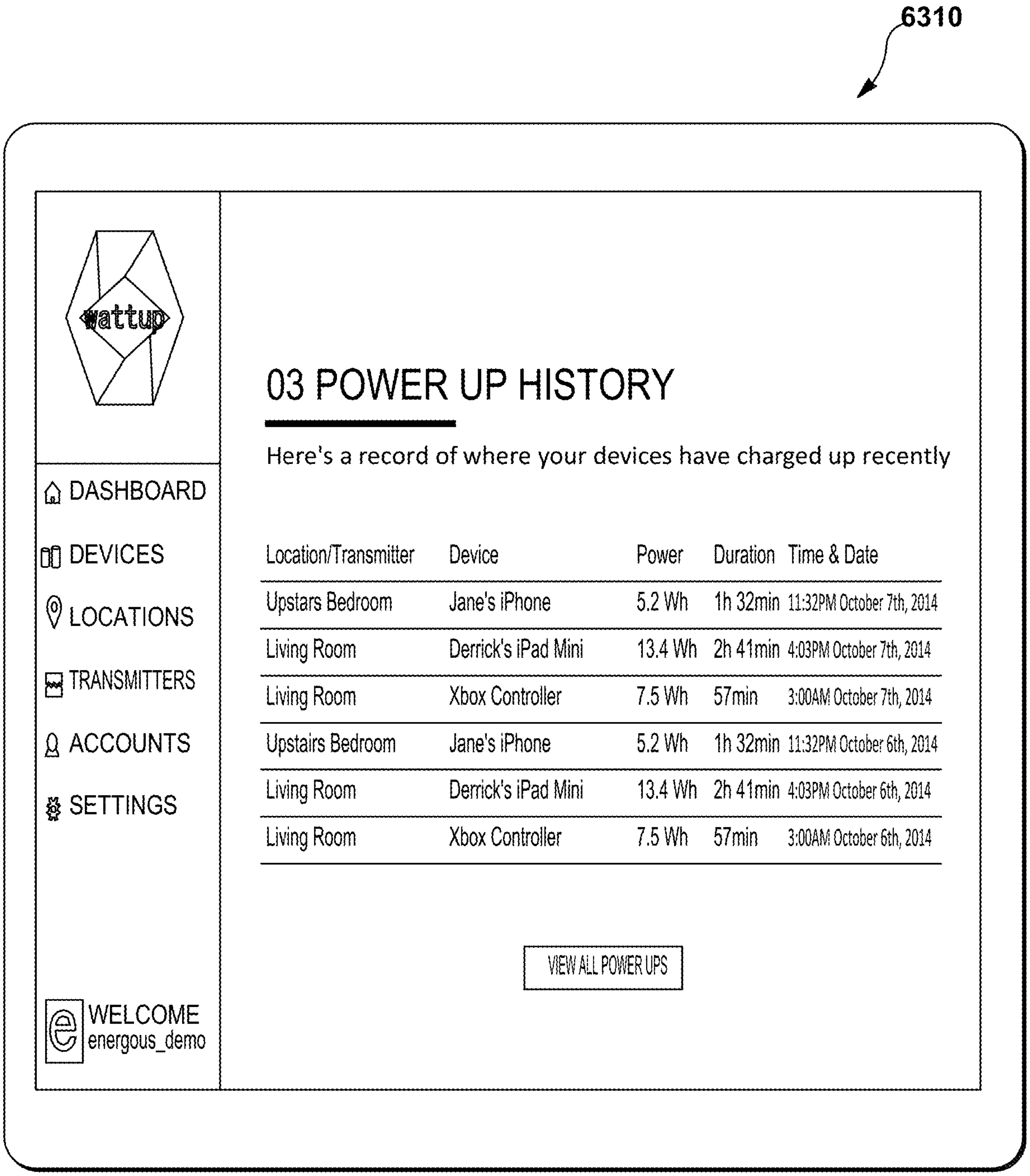

FIG. 63C shows an exemplary GUI 6306 of the system displaying various types of status and usage data that is compiled by the management system, and made available to users, through the GUI 6306, to help them analyze and manage their use of the wireless power service. The GUI 6306 shows a bar chart 6308 of power received by a user's devices in each of the last five days. FIG. 63D shows an exemplary GUI 6310 of the system displaying recent usage history, i.e. a record of where and when each of a user's devices has received power, total power received and duration of power transfer.

Figure 63E:
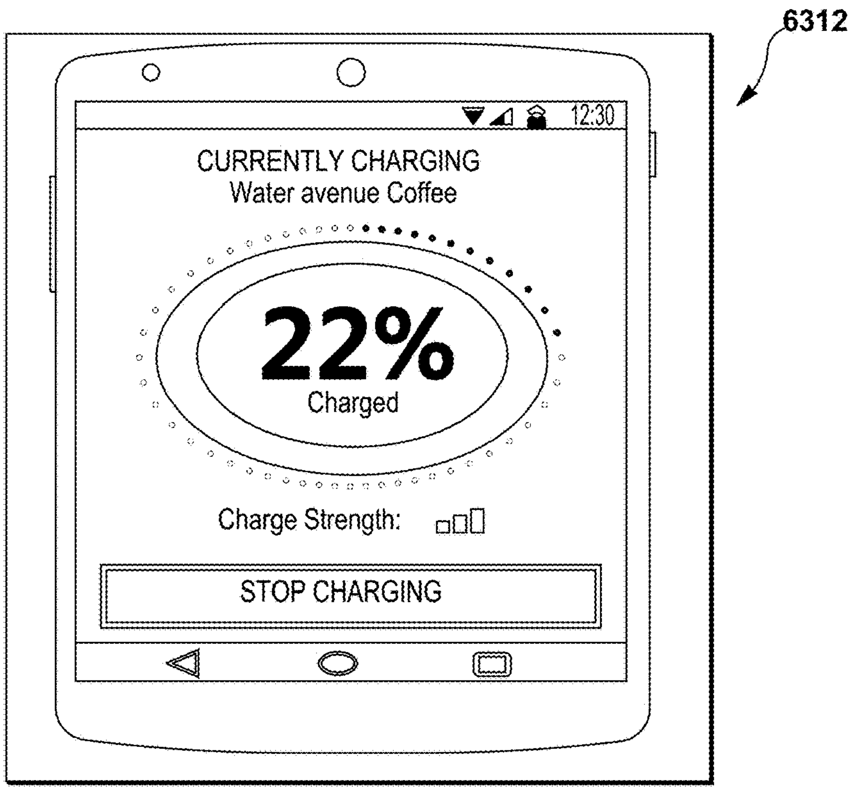
Figure 63F:
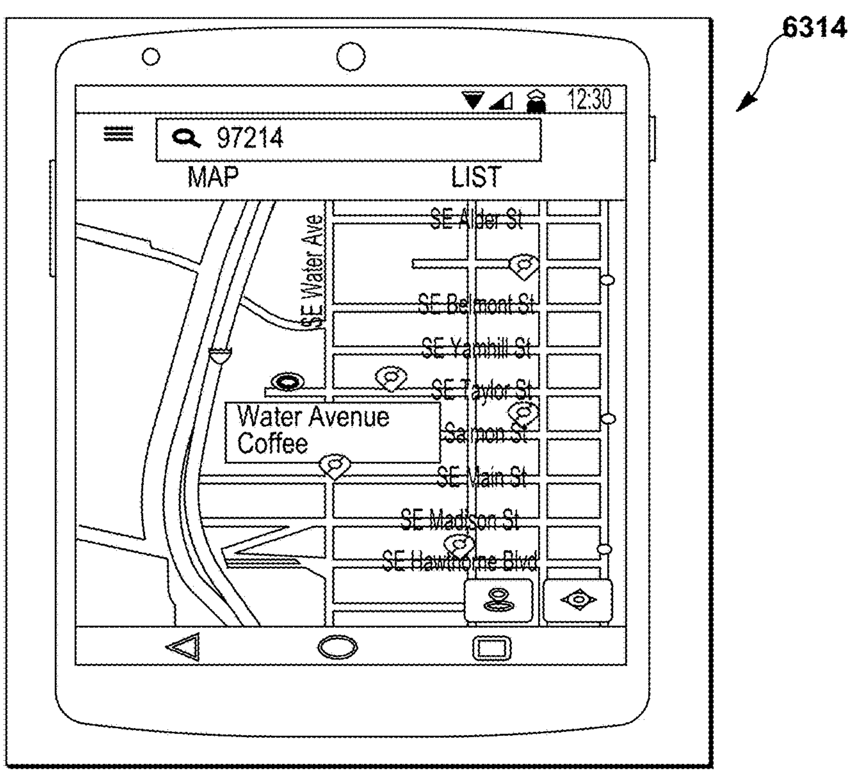

Another format of status and usage reporting uses the form factor for PDAs and other mobile devices. FIGS. 63E and 63F show two views of a mobile phone app. These status and usage data represent a subset of the data available on using a web browser on a workstation, but are tailored to the most important status and usage categories for mobile device users. The mobile app GUI 6312 of FIG. 63E shows the charging status and charge strength of a mobile phone. The mobile app GUI 6314 of FIG. 63F provides another example of location information, a map of a neighborhood with names and locations of businesses providing the wireless charging service.

Figure 63G:
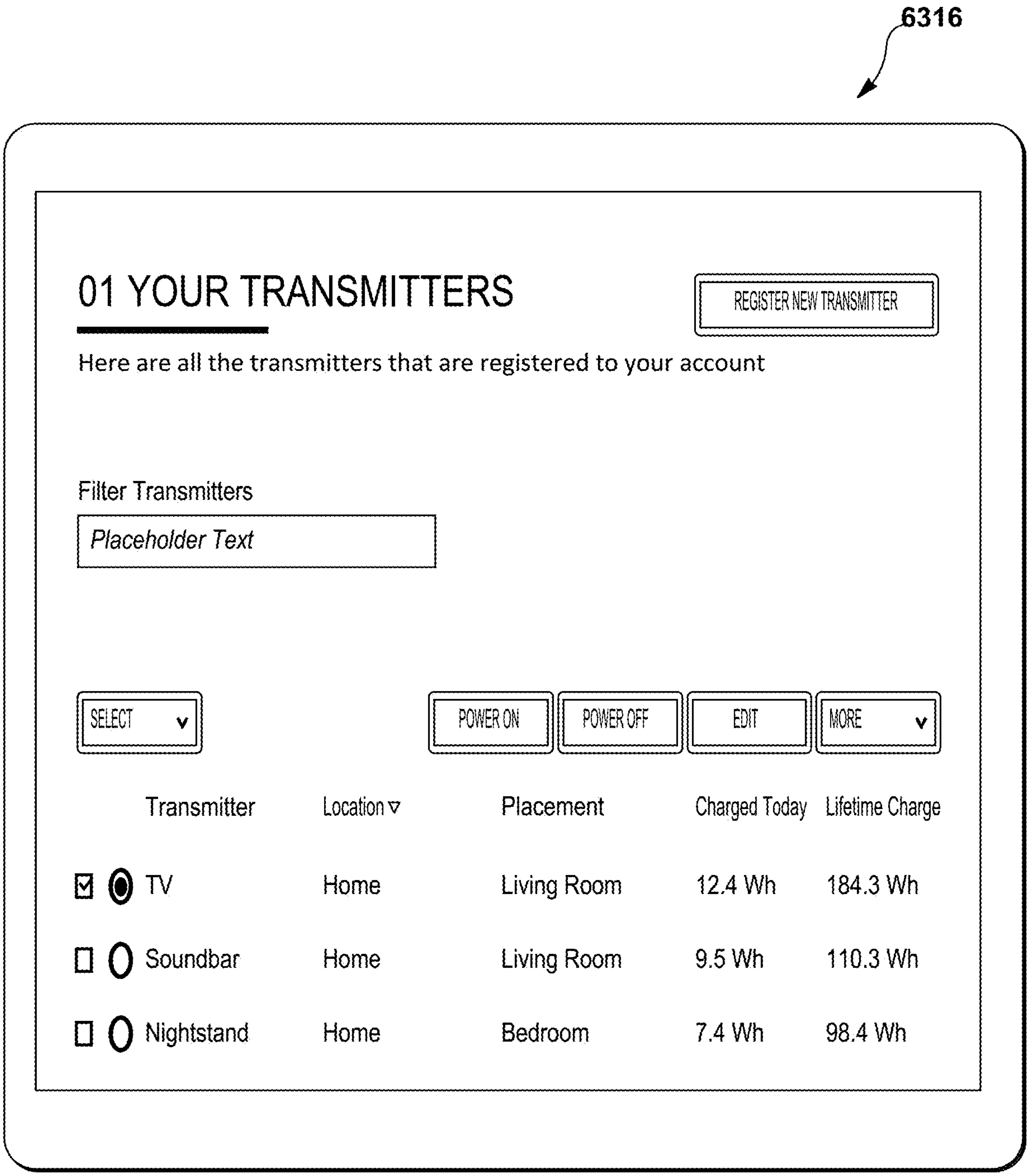

FIG. 63G shows an example of an Accounts GUI 6316, showing status and usage information for all transmitters that are registered to the account. This accounts screen permits an authorized user to register a new transmitter to the account. Other accounts screens permit users to register receivers and devices newly included in the management system, and to view status and usage data for such receivers and devices.

Figure 63H:
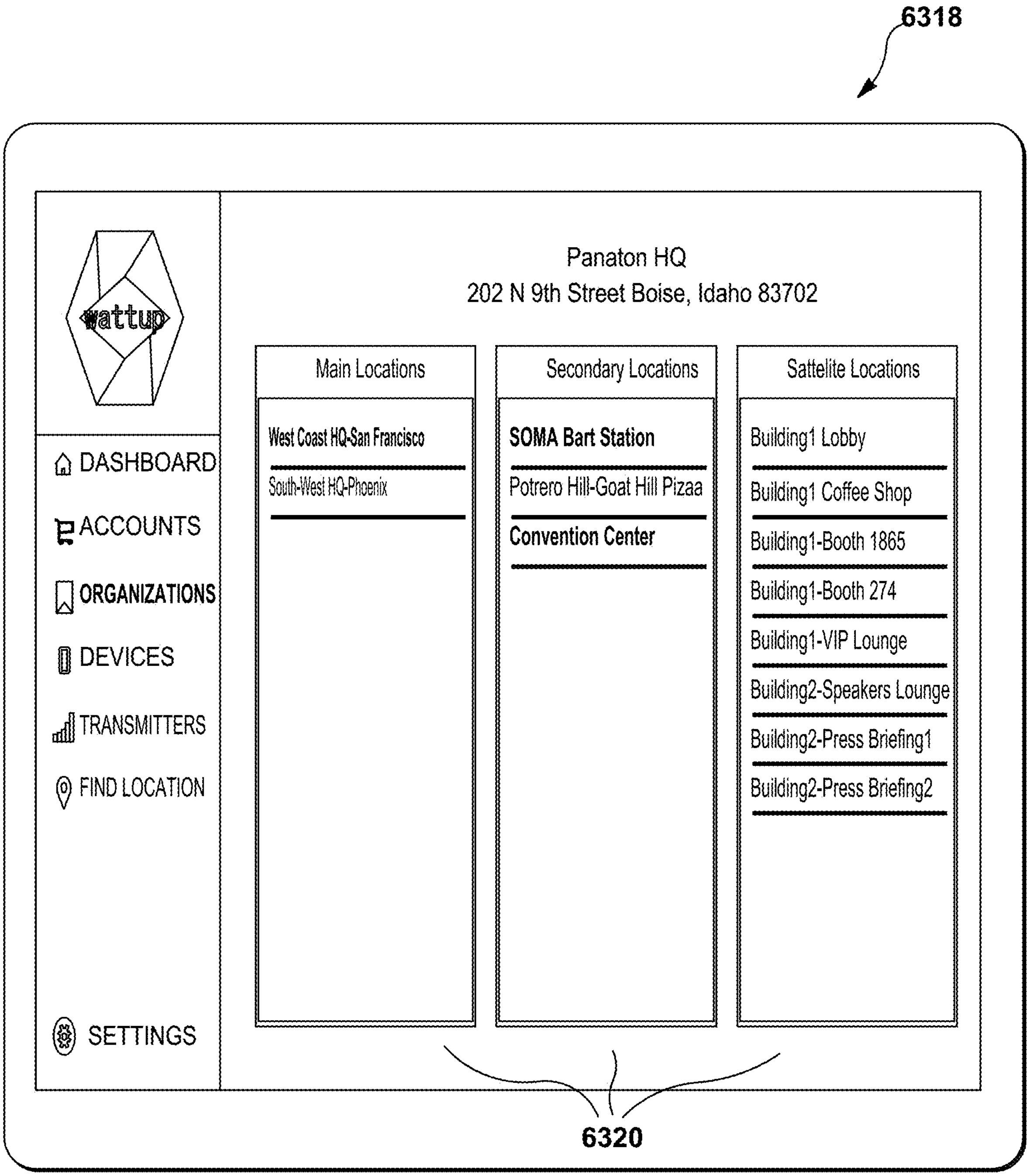

FIG. 63H, with Organizations GUI 6318, illustrates how organizations can remotely monitor their power transfer activities at other geographic locations. Here an organization has a headquarters in Boise Id. with primary, secondary, and satellite locations in other parts of the U.S., as displayed at 6320. A representative of the organization can select any of these locations using this screen, and monitor wireless power status and usage analytics at the selected location.

FIGS. 63A-63H illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 63A-63H.

Presented below are example processor-based systems and methods for managing a wireless power transmission system.

A processor-based system for managing a wireless power transmission system comprising at least one power transmitter, configured to generate pocket-forming energy in 3-dimensional space to at least one power receiver may include: (i) a processor, (ii) a database operatively coupled to the processor, and (iii) communications, operatively coupled to the processor, where the communications is operable to communicate with a network, where the processor is configured to receive system operation data from the at least one power transmitter via the network and to communicate the system operation data to a cloud, and where the system operation data comprises at least one of power transmitter status, power transmitter usage, power receiver status, and power receiver usage.

In some embodiments, the processor is configured to generate a record of the received system operation data.

In some embodiments, the processor is configured to generate an analysis of the received system operation data.

In some embodiments, the processor is configured to communicate the received system operation data to a client device for display using a graphical user interface (GUI). Furthermore, in some embodiments, the client device is operable to manage the wireless power transmission system using the GUI. Furthermore, in some embodiments, the client device is associated with the receiver for charging the client device with the pocket-forming energy generated by the at least one power transmitter. Furthermore, in some embodiments, the client device is a workstation that is not charged with the pocket-forming energy generated by the at least one power transmitter. Furthermore, in some embodiments, the client device is configured to download the GUI from an application store to communicate with the processor.

In some embodiments, the system operation data comprises at least one of errors, faults, trouble reports, logs of operational events, a command issued by the at least one power receiver, power receiver and power transmitter hardware configurations, amount of power transmitted per power transmitter and per power receiver, metrics of software and hardware activity, metrics of automatic operation performed by system software, location of the at least one power receiver, a transmitter communications transition, and power receiver charge scheduling configuration.

In some embodiments, the system operation data comprises at least one of client device battery level information, receiver antenna voltage, client device geographic location data, client device hardware configurations, metrics of client device charging activity, and client device charge scheduling.

In some embodiments, the processor is configured to receive the system operation data by one of XML and SMTP.

In some embodiments, the network comprises one of a local area network (LAN), virtual private network (VPN) and a wireless area network (WAN).

In some embodiments, the processor is configured to communicate the system operation data to a business cloud within the cloud.

A processor-based method for managing a wireless power transmission system comprising at least one power transmitter, configured to generate pocket-forming energy in 3-dimensional space to at least one power receiver for charging may include: (i) configuring, by a processor, communications operatively coupled to the processor and a database, to communicate with a network, (ii) receiving, by the processor, system operation data from the at least one power transmitter via the communications, where the system operation data comprises at least one of power transmitter status, power transmitter usage, power receiver status, and power receiver usage, and (iii) communicating, by the processor, the received system operation data to a client device for display using a graphical user interface (GUI).

Figure 64A:
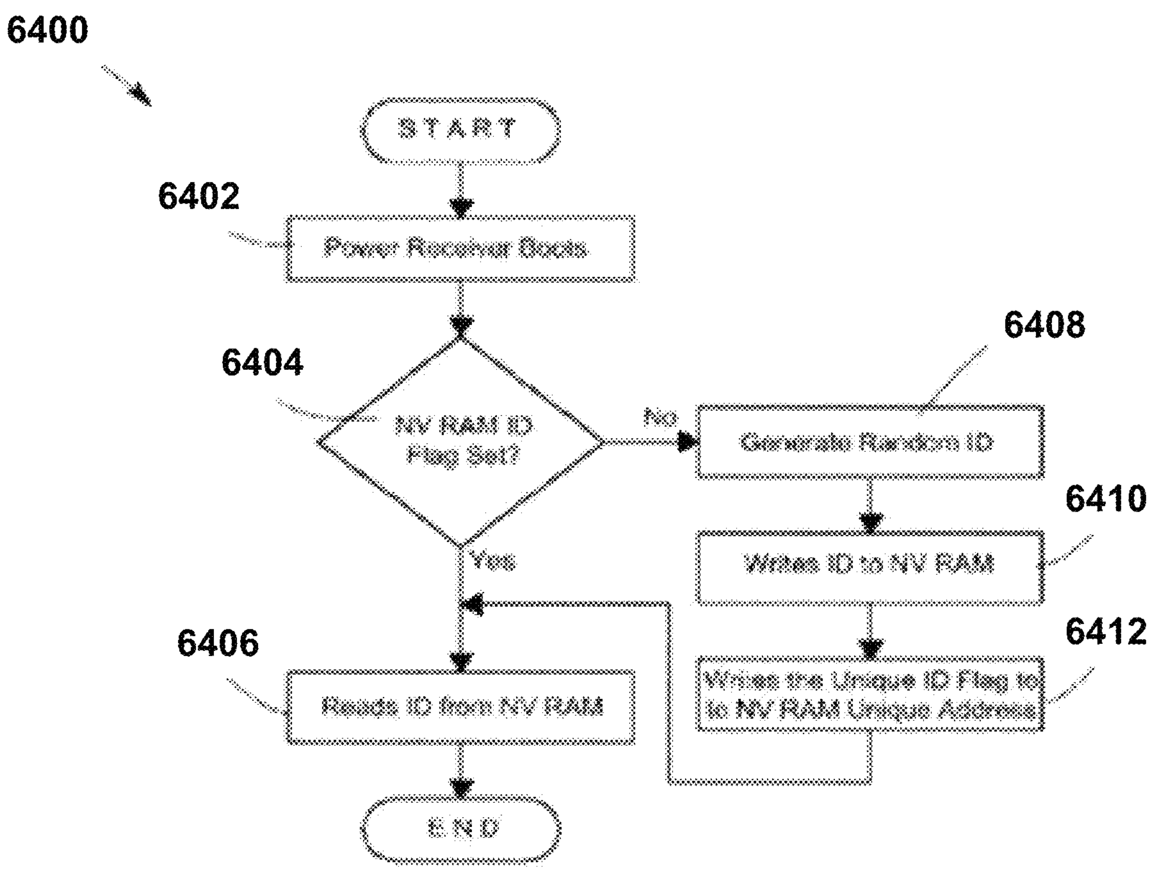
FIG. 64A shows a flowchart of a method that may be used to generate a unique identifier for a wireless power receiver device within a wireless power network, in accordance with some embodiments.
Figure 64B:
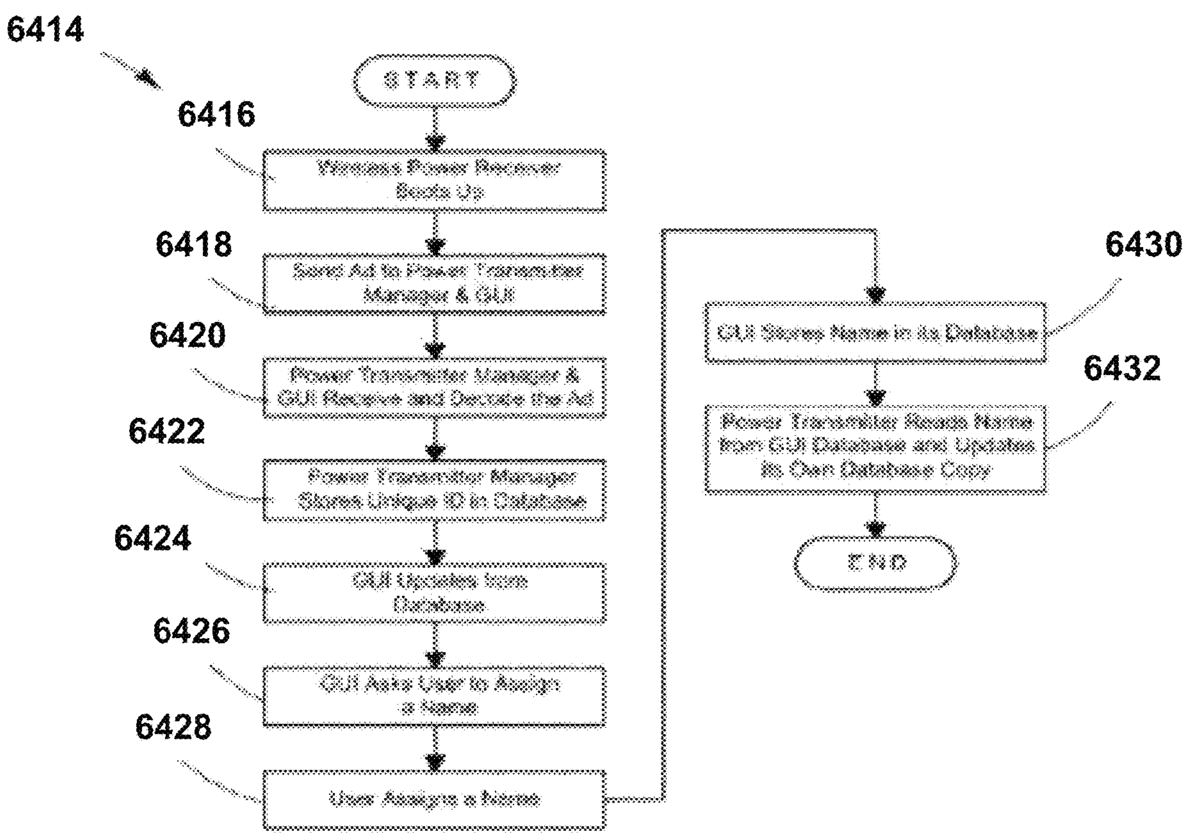
FIG. 64B shows a flowchart of a method for registering and associating a wireless power receiver to a wireless power network, in accordance with some embodiments.

FIGS. 64A and 64B show flowcharts of methods that may be used to generate a unique identifier for a wireless power receiver device within a wireless power network and to register and associate a wireless power receiver to a wireless power network.

FIG. 64A shows a flowchart of a method 6400 that may be used to generate a unique identifier for one or more wireless power receiver within a wireless power network.

Method 6400 may include automated software embedded on a wireless power receiver chip that may be triggered the first time a wireless power receiver is turned on.

In one embodiment, method 6400 may start at step 6402 when a wireless power receiver, either a cover or a customer pocket-forming enable device, boots up the first time within a wireless power network. Then, at step 6404, method 6400 may check if the ID flag at a unique address is in non-volatile (NV) RAM is set in the wireless power receiver. If ID flag is set, at step 6406, the method 6400 reads from its unique address in NVRAM in the wireless power receiver and it continues normal operation. If ID flag is not set, then at step 6408, the method 6400 triggers a suitable random number generator method to generate a random ID which may be 32-bits or greater. Once the ID is generated, at step 6410, the method 6400 writes the ID to its unique address in NV RAM. Finally, at step 6412, method 6400 may write the unique 32-bits (or greater) ID flag to unique address in NV RAM, read ID from NV RAM and continue normal operation.

In another embodiment, method 6400 may also be used to not only generate unique IDs for wireless power receivers, but also to generate unique IDs for wireless power transmitters and GUIs. By generating unique IDs for each of the components in a wireless power network, the components may be more easily associated to users and have friendly names. For example, a user may have in his or her home more than one wireless power transmitter located at different places such as the living room, bedrooms, and kitchen among others. Then the power transmitter's unique ID may be associated with a custom label for each of the wireless power transmitters at different locations.

FIG. 64B shows a flowchart of a method 6414 for registering and associating one or more wireless power receivers to a wireless power network.

In one aspect of the present disclosure, method 6414 may include automated software embedded on a wireless power receiver chip that may be triggered when a wireless power receiver boots up. Therefore, method 6414 may start at step 6416, when a wireless power receiver boots up when turned on by the user. Then, at step 6418, the wireless power receiver broadcasts advertisement, which may include a unique ID number, to any power transmitter manager and GUI that is within its range. Next, at step 6420, power transmitter manager and GUI, that are within the radio of the wireless power receiver broadcast, receive and decode the advertisement. Then, power transmitter manager, at step 6422, may store the unique ID number of said wireless power receiver in a database. This database may serve to store relevant information from wireless power receivers such as, identifiers, voltage ranges, location, signal strength and/or any relevant information. Following method 6414, at step 6424, GUI may update and sync all relevant information from said transmitter's database for better control of the wireless power devices. At step 6426, GUI may ask the user to assign a name for the wireless power receiver that may have joined the wireless power network. Next, at step 6428, the user assigns a name of its preference. Then, at step 6430, GUI syncs that name and stores it in its database. Finally, at step 6432, power transmitter manager reads name from GUI database and updates its own database copy. The system database in power transmitter devices and GUI devices may be identical between every device, when up to date. All system devices may operate and communicate so as to keep each one's database up to date.

FIGS. 64A and 64B illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 64A and 64B.

Presented below are example apparatuses and methods for wirelessly receiving power and an example apparatus for wirelessly transmitting power.

An apparatus for wirelessly receiving power may include: (i) a processor, (ii) communication links, operatively coupled to the processor, (iii) a memory, operatively coupled to the processor, and (iv) a receiver operatively coupled to the processor, where the receiver is configured to wirelessly extract power from three-dimensional pockets of energy present in RF waves. In some embodiments, the processor is configured to determine if an identification value for the apparatus is stored in the memory, and, if no identification value is stored, generate an identification value for the apparatus. Furthermore, in some embodiments, the processor is configured to transmit to the communication links one of (i) the stored identification value and (ii) the generated identification value. Furthermore, in some embodiments, the receiver is configured to begin wirelessly extracting power after the processor has transmitted the stored or generated identification value to the communication links.

In some embodiments, the memory is a non-volatile random access memory (NVRAM). Furthermore, in some embodiments, the processor is configured to determine if the identification value for the apparatus is stored in the memory from a unique address in the NVRAM memory.

In some embodiments, the processor is configured to generate the identification value for the apparatus using a random number generator.

In some embodiments, the processor is configured to determine if the identification value for the apparatus is stored in the memory during a boot-up process.

In some embodiments, the processor is configured to store information regarding one or more transmitters responding to the transmitted stored or generated identification value.

In some embodiments, the apparatus further comprises at least one of a power receiver app, an application programming interface and a graphical user interface.

In some embodiments, the processor is configured to receive or generate one or more other identification values for at least one of a wireless power transmitter and graphical user interface.

A method for wirelessly receiving power may include: (i) determining, via a processor, if an identification value for the apparatus is stored in a memory, (ii) generating, via the processor, an identification value for the apparatus if the determining step determines that no identification value is stored, (iii) transmitting one of: the stored identification value and the generated identification value, and (iv) extracting power from three-dimensional pockets of energy present in RF waves via a receiver in the apparatus after the stored or generated identification value is transmitted.

In another apparatus for wirelessly transmitting power, the apparatus may include: (i) a processor, communications links, operatively coupled to the processor, (ii) a memory, operatively coupled to the processor, and (iii) a transmitter operatively coupled to the processor, where the transmitter is configured to wirelessly transmit power by three-dimensional pockets of energy present in RF waves. In some embodiments, the processor is configured to determine if an identification value for the apparatus is stored in the memory, and, if no identification value is stored, generate an identification value for the apparatus. Furthermore, in some embodiments, the processor is configured to transmit to the communication links one of (i) the stored identification value and (ii) the generated identification value. Furthermore, in some embodiments, the transmitter is configured to begin wirelessly transmitting power after the processor has transmitted the stored or generated identification value to the communications.

FIG. 65A-65D illustrate systems and processor-based methods for selectively charging one or more devices in a wireless power network, in accordance with some embodiments.

Figure 65A:
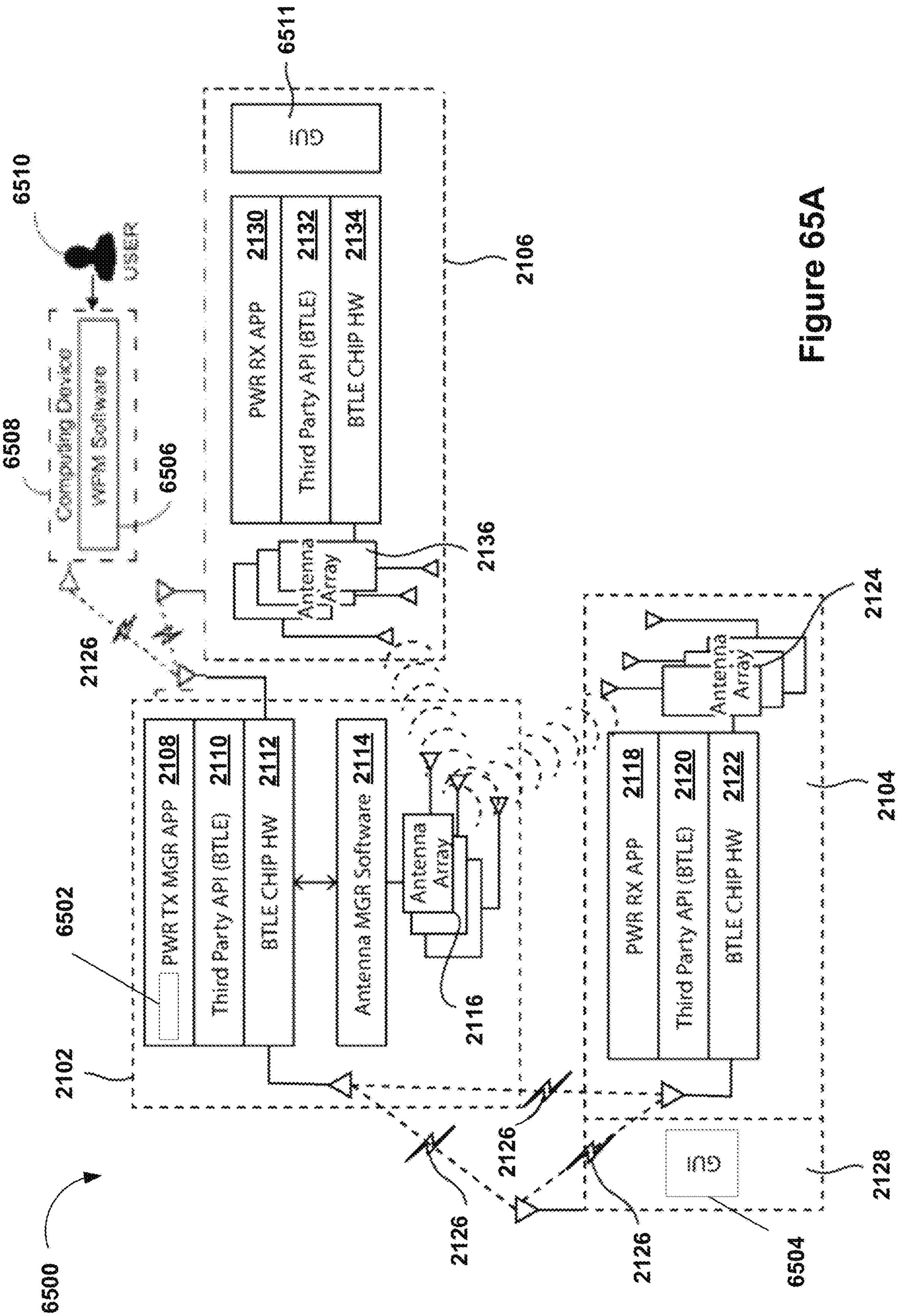
FIG. 65A illustrates an exemplary embodiment of a wireless power network including a transmitter and wireless receivers, in accordance with some embodiments.

FIG. 65A shows an exemplary embodiment of a wireless power transmission system 6500 in which one or more embodiments of the present disclosure may operate. Wireless power transmission system 6500 may include communication between wireless power transmitter 2102 (FIG. 20A) and one or more wireless powered receivers 2104 (FIG. 20A) and with client device 2128 (FIG. 20A). Client device 2128 may be paired with an adaptable paired receiver 2104 that may enable wireless power transmission to the client device 2128. In another embodiment, a client device 2106 (FIG. 20A) may include a wireless power receiver built in as part of the hardware of the device. Client device 2128 or 2106 may be any device which uses an energy power source, such as, laptop computers, stationary computers, mobile phones, tablets, mobile gaming devices, televisions, radios and/or any set of appliances that may require or benefit from an electrical power source.

In one embodiment, wireless power transmitters 2102 may include a microprocessor that integrates a power transmitter manager app 2108 (PWR TX MGR APP) (FIG. 20A) as embedded software, and a third party application programming interface 2110 (Third Party API) (FIG. 20A) for a Bluetooth Low Energy chip 2112 (BTLE CHIP HW) (FIG. 20A). Bluetooth Low Energy chip 2112 may enable communication between wireless power transmitter 2102 and wireless power receiver 2104 client devices 2128 and 2106, and others. Wireless power transmitter 2102 may also include an antenna manager software 2114 (Antenna MGR Software) (FIG. 20A) to control an RF antenna array 2116 (FIG. 20A) that may be used to form controlled RF waves which may converge in 3-dimensional space and create pockets of energy around wireless powered receivers. In some embodiments, Bluetooth Low Energy chips 2112 may utilize other wireless communication protocols, including Wi-Fi, Bluetooth, LTE direct, or the like.

Power transmitter manager app 2108 may call third party application programming interface 2110 for running a plurality of functions, including the establishing of a connection, ending a connection, and sending data, among others. Third party application programming interface 2110 may command Bluetooth Low Energy chip 2112 according to the functions called by power transmitter manager app 2108.

Power transmitter manager app 2108 may also include a distributed system database 6502, which may store relevant information associated with client devices 2128 or 2106, such as their identifiers for a client device 2128 or 2106, voltage ranges for power receiver 2104, location of a client device 2128 or 2106, signal strength and/or any other relevant information associated with a client device 2128 or 2106. Database 6502 may also store information relevant to the wireless power network, including receiver ID's, transmitter ID's, end-user handheld devices, system management servers, charging schedules, charging priorities and/or any other data relevant to a wireless power network.

Third party application programming interface 2110 at the same time may call power transmitter manager app 2108 through a callback function which may be registered in the power transmitter manager app 2108 at boot time. Third party application programming interface 2110 may have a timer callback that may go for ten times a second, and may send callbacks every time a connection begins, a connection ends, a connection is attempted, or a message is received.

Client device 2128 may include a power receiver app 2118 (PWR RX APP) (FIG. 20A), a third party application programming interface 2120 (Third party API) (FIG. 20A) for a Bluetooth Low Energy chip 2122 (BTLE CHIP HW) (FIG. 20A), and a RF antenna array 2124 (FIG. 20A) which may be used to receive and utilize the pockets of energy sent from wireless power transmitter 2102.

Power receiver app 2118 may call third party application programming interface 2120 for running a plurality of functions including establishing a connection, ending a connection, and sending data, among others. Third party application programming interface 2120 may have a timer callback that may go for ten times a second and may send callbacks every time a connection begins, a connection ends, a connection is attempted, or message is received.

Client device 2128 may be paired to an adaptable paired receiver 2104 via a BTLE connection 2126 (FIG. 20A). A graphical user interface (GUI) 6504 may be used to manage the wireless power network from a client device 2128. GUI 6504 may be a software module that may be downloaded from any suitable application store and may run on any suitable operating system such as iOS and Android, amongst others. Client device 2128 may also communicate with wireless power transmitter 2102 via a BTLE connection 2126 to send important data, such as an identifier for the device, battery level information, geographic location data, or any other information that may be of use for wireless power transmitter 2102.

A wireless power manager 6506 software may be used in order to manage wireless power transmission system 6500. Wireless power manager 6506 may be a software module hosted in memory and executed by a processor inside a computing device 6508. The wireless power manager 6506 may include a local application GUI or host a web page GUI, from where a user 6510 may see options and statuses, as well as execute commands to manage the wireless power transmission system 6500. The computing device 6508, which may be cloud-based, may be connected to the wireless power transmitter 2102 through standard communication protocols, including Bluetooth, Bluetooth Low Energy, Wi-Fi, or ZigBee, amongst others. Power transmitter manager app 2108 may exchange information with wireless power manager 6506 in order to control access by and power transmission to client devices 2128. Functions controlled by wireless power manager 6506 may include scheduling power transmission for individual devices, prioritizing between different client devices, accessing credentials for each client, tracking physical locations of power receivers relative to power transmitter areas, broadcasting messages, and/or any functions required to manage the wireless power transmission system 6500.

Multiple wireless power transmitter 2102 units may be placed together in the same area to deliver more power to individual power receivers or to power more receivers at the same time, said power receivers being within power reception range of all said power transmitters 2102.

Figure 65B:
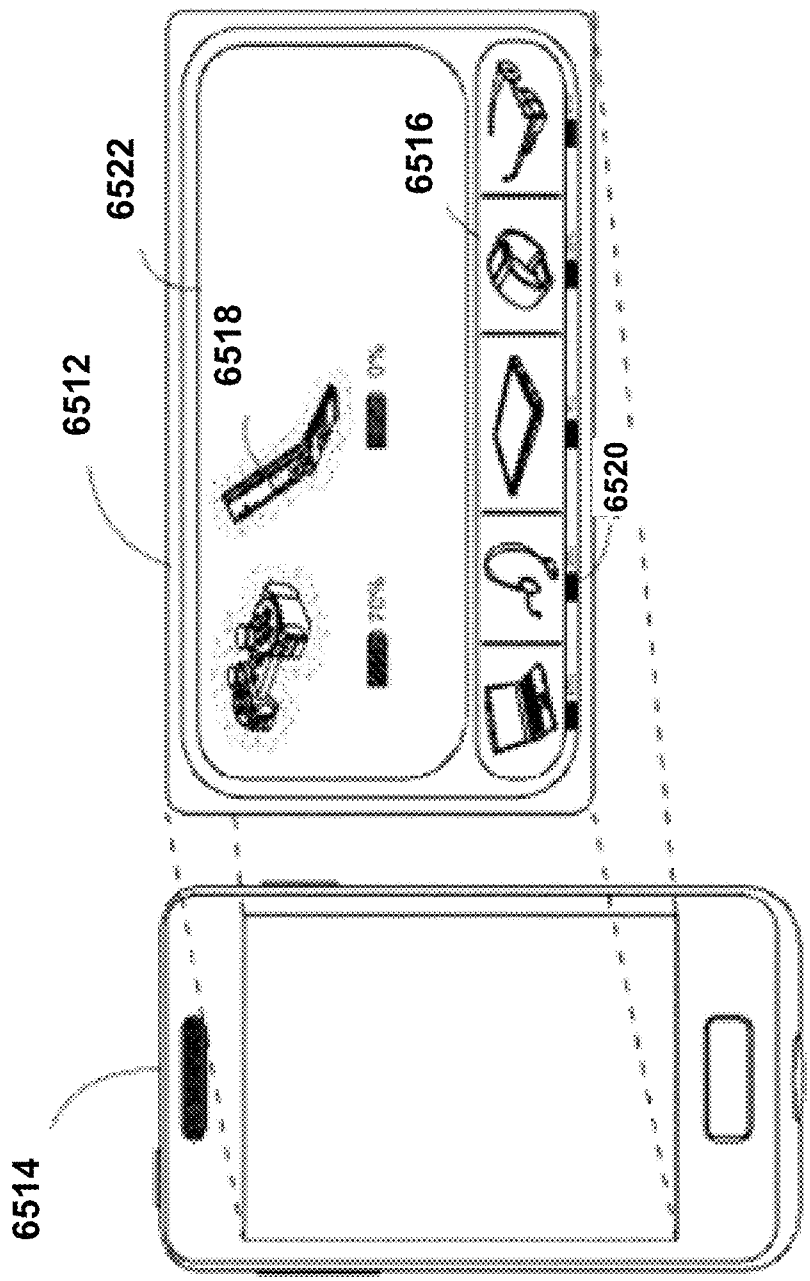
FIG. 65B is an exemplary embodiment of a Wireless Power Manager Graphic User Interface (GUI), in accordance with some embodiments.

FIG. 65B is an exemplary embodiment of a wireless power charging user interface (UI) 6512. Wireless power charging UI 6512 may be a software module hosted in memory and executed by a processor in a computing device 6514. Wireless power charging UI 6512 may be included as part of a wireless power manager application in order to select and deselect one or more wireless power devices to charge or power in a wireless power network.

Wireless power charging UI 6512 may include a charge off area 6516 which may display device icons that represent the different client devices 6518 that are not to have power transmitted to them in a wireless power network. If the device, represented by a given icon, contains a battery then its icon, or a sub-icon near the device icon may also additionally include a charge level 6520 icon which may serve as an indication of battery present charge or state and/or how much energy charge the client devices 6518 battery, if any, possess at the moment.

Wireless power charging UI 6512 may also include a charging area 6522 which may display icons that represent the different client devices 6518 that are receiving power from a wireless power transmitter in a wireless power network. Each icon may also include a charge level 6520 icon which may serve as an indication of battery present charge state and/or how much energy charge the client device's 6518 battery, if any, possess at the moment. A client device 6518 in the charging area 6522 may also include additional indicators to show a device is charging. For example, and without limitation, a client device 6518 icon may be surrounded by a flashing or pulsating halo when the device is receiving power; in another example the charge level 6520 icon may be flashing. In yet another example, the client device 6518 may include transparent overlapped text such as a message reading "Charging."

User may drag and drop a client device 6518 from the charge off area 6516 into the charging area 6522 in order to begin charging a device. A user may also select a client device 6518 from the charging area 6522 and drag and drop it into the charge off area 6516 in order to stop charging the device. The user may perform these actions using known in the art UI navigation tools such as, a mouse click or touch screen for example.

Figure 65C:
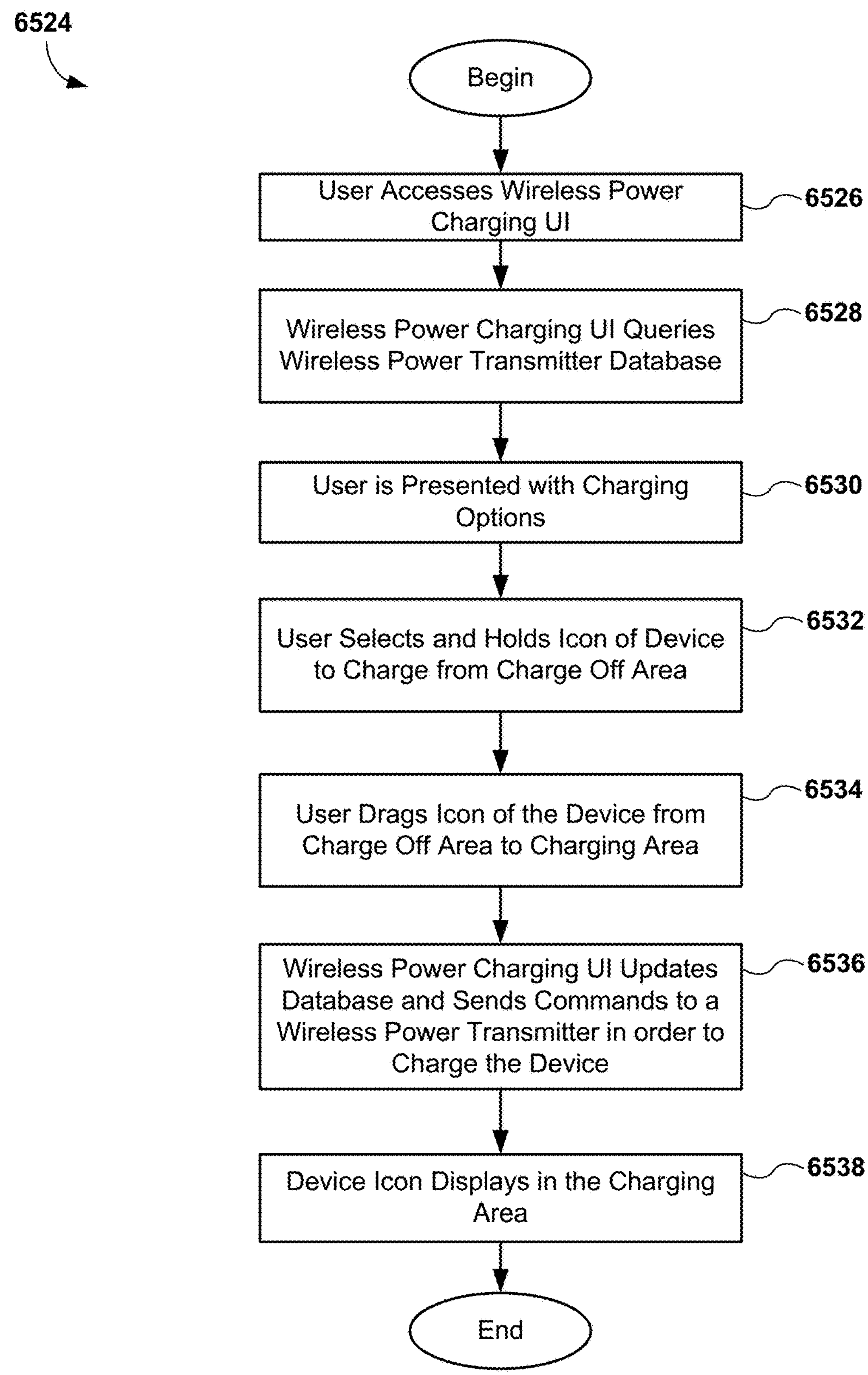
FIG. 65C is a flowchart of a process to manually enable power charging of a device in a wireless power network, in accordance with some embodiments.

FIG. 65C is a flowchart describing a process 6524 by which a user may charge a device in a wireless power network. The process may begin when a user accesses, logs on to, or begins to use the wireless power charging UI (block 6526). The wireless power charging UI may be a software module hosted in memory and executed by a processor in a suitable computing device, such as, a laptop computer, smartphone and the like. The wireless power charging UI may be a software module implemented as part of the wireless power manager application (described in FIG. 65A) used to manage a wireless power network. The wireless power charging software may then query (block 6528) a database stored in a wireless power transmitter in order to extract records of all wireless power receivers in the wireless power network. The wireless power charging UI may also create a local copy of the database in the memory of the computing device hosting the wireless power charging UI. A copy of the database may be re-created and mirrored into each computing device in the wireless power network in order to create a distributed database environment and enable sharing all the information across all computing devices in the wireless power network. Extracted information may include for example records indicating status of each wireless power receiver in the wireless power network, their associated client devices, battery level and charge status, owner, and/or any associated information from the components in a wireless power network. The extracted information may then be presented (block 6530) and shown to the user in a wireless power charging UI such as the one described in FIG. 65B. From the wireless power charging UI the user may select and hold the icon for the device he may desire to charge from the charge off screen area of the wireless power charging UI (block 6532). At this point the icon for the device may change or become highlighted in order to indicate that the device has been selected, for example the image of the icon may become larger when a user selects the device from the charge off area. The user may then drag the icon device from the charge off area to the charging area (block 6534). The wireless power charging UI may then update the database and send commands to the wireless power transmitter (block 6536) in order to begin charging the device. The database in the wireless power transmitter may then be updated with any necessary information. The charging area of the wireless power charging UI may then display an icon indicating that the selected device is charging (block 6538). The icon from the corresponding device may then be removed from the charge off area of the wireless power charging UI.

Figure 65D:
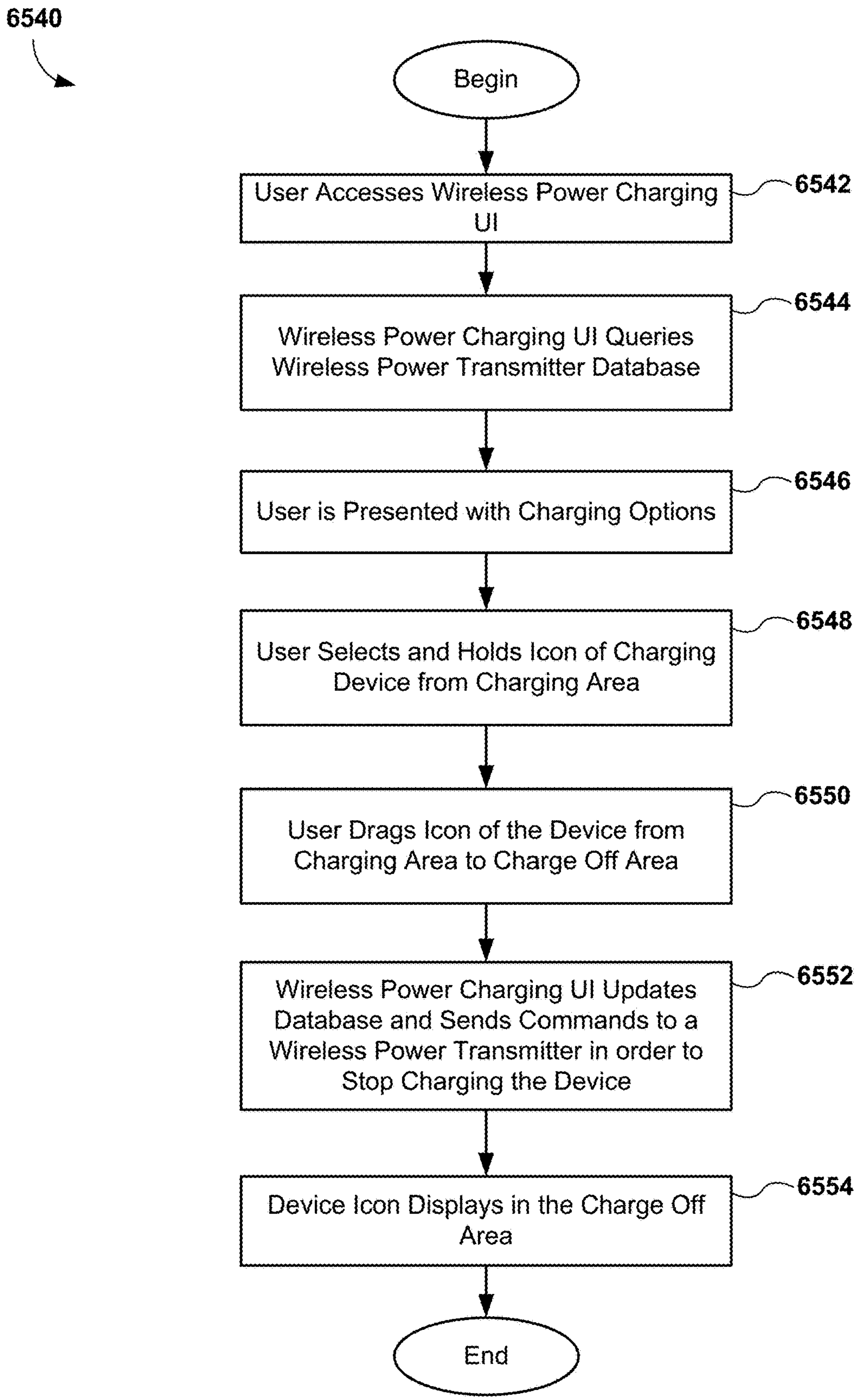
FIG. 65D is a flowchart of a process for disabling a device from charging in a wireless power network, in accordance with some embodiments.

FIG. 65D is a flowchart describing a process 6540 by which a user may disable a device from charging in a wireless power network. The process may begin when a user accesses the wireless power charging UI (block 6542). The wireless power charging UI may be a software module hosted in memory and executed by a processor in a suitable computing device, such as, a laptop computer, smartphone and the like. The wireless power charging UI may be a software module implemented as part of the wireless power manager application (described in FIG. 65A) used to manage a wireless power network. The wireless power charging software may then query (block 6544) a database stored in a wireless power transmitter in order to extract records of all wireless power receivers in the wireless power network. Extracted information may include for example records indicating status of each wireless power receiver in the wireless power network, their associated devices, battery level and charge status, owner, and/or any associated information from the components in a wireless power network. The extracted information may then be presented (block 6546) and shown to the user in a wireless power charging UI such as the one described in FIG. 65B. From the wireless power charging UI the user may select and hold the icon for the device he may desire to charge off, from within the charging area of the wireless power charging UI (block 6548). At this point the icon for the device may change or be highlighted in order to indicate that the device has been selected, for example the image of the icon may become larger when a user selects the device from the charging area. The user may then drag and drop the icon device from the charging area to the charge off area (block 6550). The wireless power charging UI may then update the database and send commands to the wireless power transmitter (block 6552) to disable charging the device. The database in the wireless power transmitter may then be updated with any necessary information. The charge off area of the wireless power charging UI may then display an icon of the device indicating that the selected device is no longer being charged (block 6554). The icon of the corresponding device may then be removed from the charging area of the wireless power charging UI.

FIGS. 65A-65D illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 65A-65D.

Presented below are example apparatuses and methods for selectively charging one or more devices in a wireless power network.

An apparatus for selectively charging one or more devices in a wireless power network may include: (i) a processor, (ii) a display, operatively coupled to the processor, (iii) communications for communicating with at least one transmitter configured to generate pocket-forming energy in 3-dimensional space within the wireless power network, where the processor is configured to determine the presence of one or more receivers configured to receive pocket-forming energy within the wireless power network, where the communications is configured to receive receiver data relating to each of the one or more receivers within the wireless power network, and an input for selecting an operational configuration for at least one of the one or more receivers for receiving pocket-forming energy.

In some embodiments, the receiver data comprises at least one of receiver status in the wireless power network, associated device data for each receiver, receiver battery level data and receiver charge status data.

In some embodiments, the display is configured to display the receiver data.

In some embodiments, the communications are configured to transmit the operational configuration to the at least one transmitter.

In some embodiments, the display is configured to display each receiver with a selected operational configuration.

In some embodiments, the operational configuration is selected via the input comprising a graphical user interface.

In some embodiments, the operational configuration comprises one of an enable and disable charging configuration.

A processor-based method for selectively charging one or more devices in a wireless power may include: (i) communicating with at least one transmitter configured to generate pocket-forming energy in 3-dimensional space within the wireless power network, (ii) determining and displaying the presence of one or more receivers configured to receive pocket-forming energy within the wireless power network, (iii) receiving receiver data relating to each of the one or more receivers within the wireless power network, and (iv) selecting an operational configuration for at least one of the one or more receivers for receiving pocket-forming energy.

In another processor-based method for selectively charging one or more devices in a wireless power network, the method may include: (i) registering with at least one transmitter configured to generate pocket-forming energy in 3-dimensional space within the wireless power network, (ii) determining and displaying the presence of one or more receivers configured to receive pocket-forming energy within the wireless power network, (iii) receiving receiver data relating to each of the one or more receivers within the wireless power network, and (iv) selecting one or more charging options for at least one of the one or more receivers for receiving pocket-forming energy within the wireless power network.

In some embodiments, the method includes transmitting the charging options to the at least one transmitter.

In some embodiments, the method includes displaying each receiver with a selected charging option.

In some embodiments, the charging option is selected via a graphical user interface.

Figure 66A:
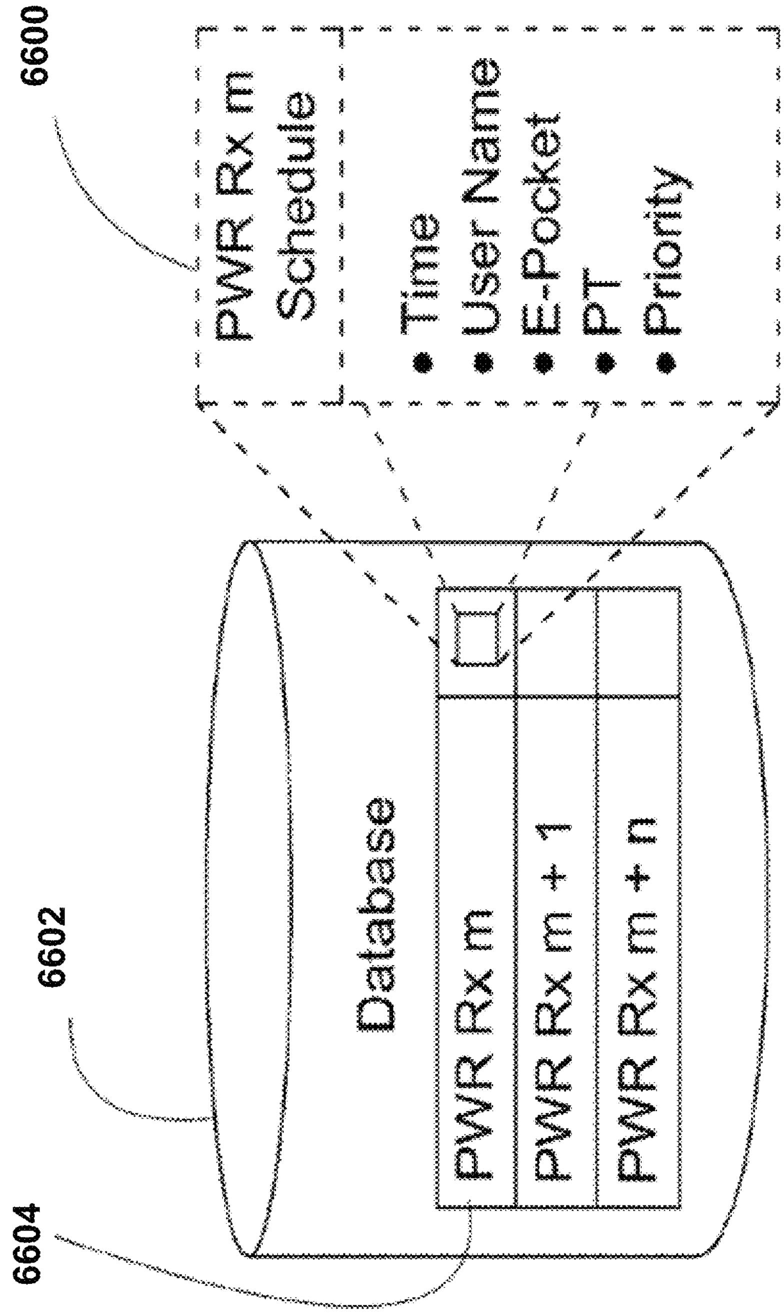
FIG. 66A is an exemplary embodiment of scheduling records stored in a database, in accordance with some embodiments.
Figure 66B:
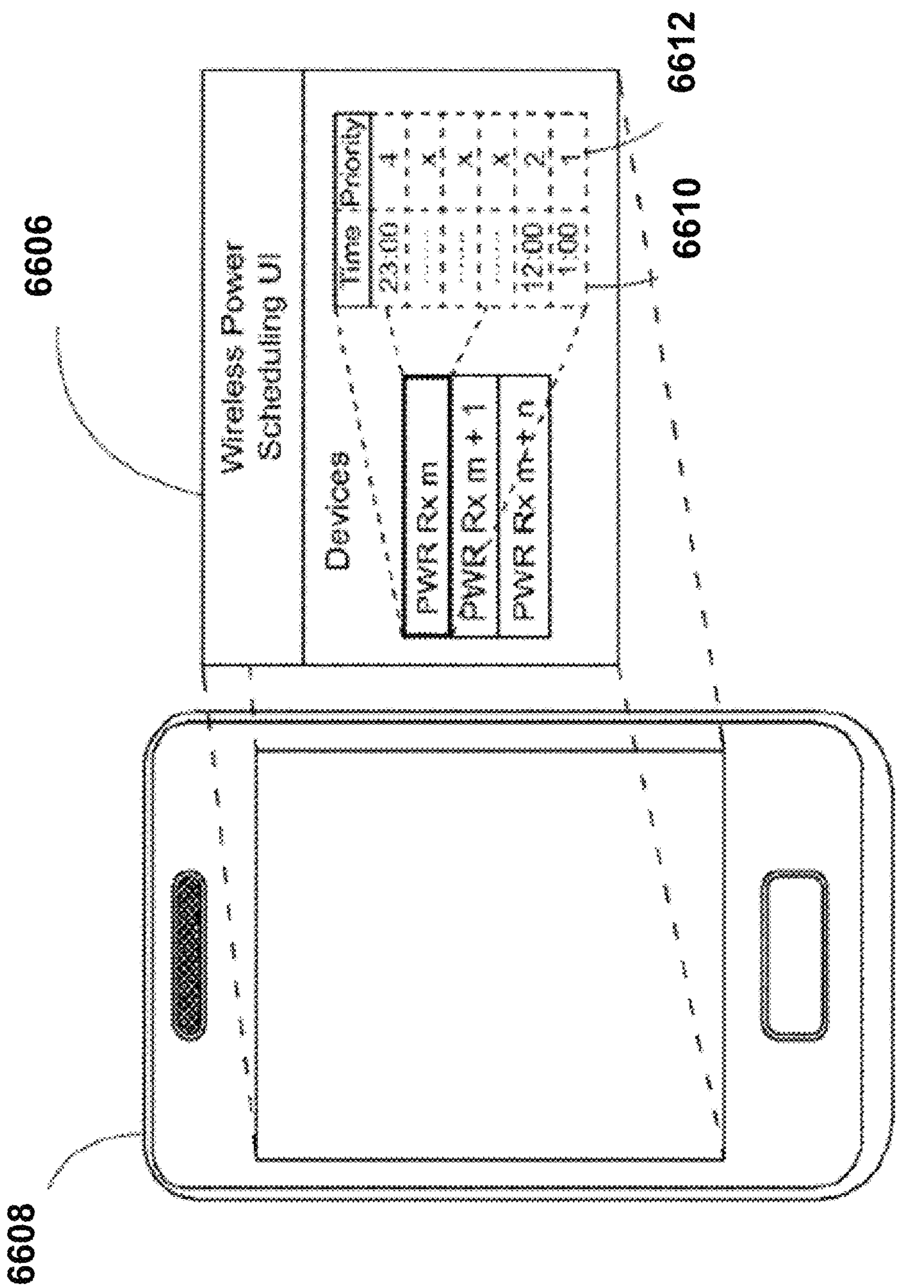
FIG. 66B is an exemplary embodiment of a wireless power scheduling UI, in accordance with some embodiments.
Figure 66C:
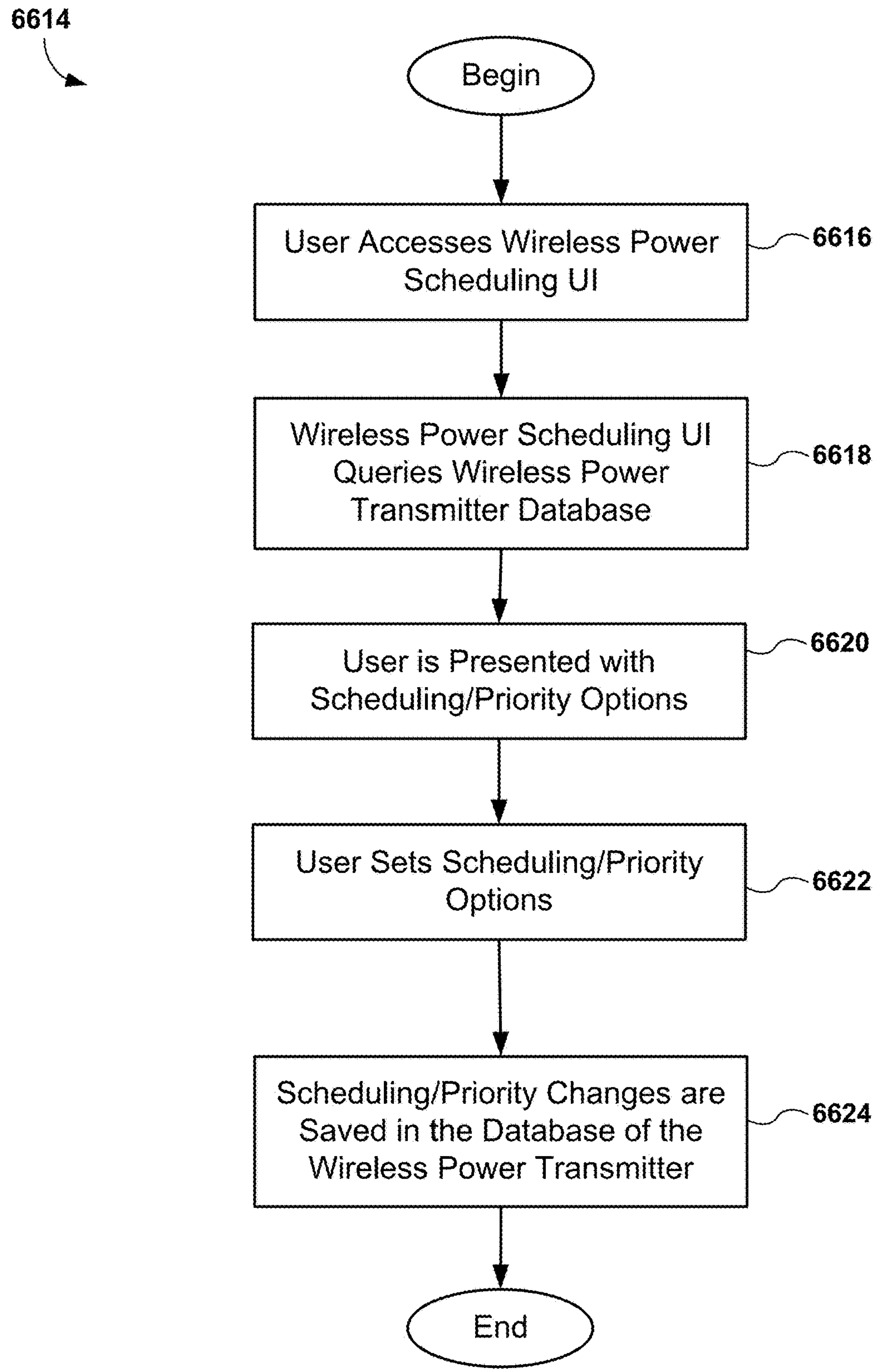
FIG. 66C is a flowchart of a process for managing charging schedules or priorities, in accordance with some embodiments.

FIGS. 66A-66C illustrate diagrams, interfaces, and methods of setting charging schedules, in accordance with some embodiments.

FIG. 66A is an exemplary embodiment of how scheduling records 6600 may be stored in the database 6602 in a wireless power network. The database 6602 may contain a power receiver record 6604 for each power receiver found in the wireless power network. Power receiver records 6604 may include scheduling records 6600 associated with each power receiver record 6604, and also a record for every other type of device in the wireless power network, such as power transmitter records, management server records, and client device records, all of which store such information as, but not limited to, status, control, command, and configuration. Power receiver records 6604 may include scheduling records 6600 associated with each power receiver record 6604. Scheduling records may include information such as time, user name, e-pocket, 3d or angular location, power transmitter manager, priority or/and any set of information used for automatic or manually scheduling power transmission to one or more power receiving devices. For example, time may serve to store times of the day at which device may be charged. Priority may serve to indicate the priority of charging the device over other devices, at a specific time. User name may serve to differentiate device users from each other and assign priorities depending on that. E-pocket may serve to store the physical location at which any wireless power receiver shall be immediately charged.

FIG. 66B is an exemplary embodiment of a wireless power scheduling UI 6606. Wireless power scheduling UI 6606 may be a software module hosted in memory and executed by a processor in a computing device 6608. Wireless power scheduling UI 6606 may also be included as part of a wireless power manager application in order to manage wireless power schedules in a wireless power network.

Wireless power scheduling UI 6606 may query scheduling records from a database in a wireless power transmitter and present them to a user in the display of a computing device 6608 such as, a smartphone or laptop, or web page. The user may select a power receiver and set scheduling options for that power receiver or execute any user interface function of the wireless power network using known in the art UI navigation tools such as, a mouse click or touch screen for example or by text message (SMS) or by email or by voice recognition or by motion gesture of handheld device, for example. In the exemplary embodiment the wireless power scheduling UI 6606 may allow the user to select time 6610 periods and assign a priority level 6612 for charging the device during that time period.

In another embodiment, a user may set priorities based on the user of a device. For example, the UI may present a user with the user names associated with each power receiver record. The user may then assign different priority levels 6612 for each user.

In another embodiment, priorities may be set depending on a place or location. For example, the UI may present a user with the pockets of energy (e-pockets) and a user may assign a priority level 6612 to the specific pocket of energy which in turn may be a fixed location.

Changes or configurations done by a user in wireless power scheduling UI 6606 may then be saved to the database in a wireless power transmitter. The wireless power transmitter may then refer to the scheduling records stored in the database in order to perform any time scheduled power transmission or identify transmission priorities.

FIG. 66C is a flowchart describing a process 6614 by which a user may set up charging schedules or priorities. The process may begin when a user accesses a wireless power scheduling UI (block 6616). The wireless power scheduling UI may be a software module hosted in memory and executed by a processor in a suitable computing device, such as, a laptop computer, smartphone and the like. The wireless power scheduling software may then query (block 6618) a database stored in a wireless power transmitter in order to extract scheduling records and priorities for all wireless power receivers in the wireless power network. The extracted information may then be presented (block 6620) to the user in a wireless power scheduling UI such as the one described in FIG. 66B. The user may then manage schedules and priorities (block 6622) for all the devices through the wireless power scheduling UI using any navigation tools provided by the computing device such as, for example, touchscreens, keyboards and mouse. Schedules and priorities set or changed by the user may then be saved to the database stored in a wireless power transmitter (block 6624).

A wireless power transmitter may continually query scheduling records and perform actions accordingly to automatically control the present state of charging for one or more power receivers.

FIGS. 66A-66C illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 66A-66C.

Presented below are example apparatuses and methods for controlling wireless power delivery.

An apparatus for controlling wireless power delivery, may include: (i) a transmitter comprising two or more antenna elements, (ii) a RF circuit, operatively coupled to the transmitter, (iii) a processor, operatively coupled to the RF circuit, where the processor is configured to generate pocket-forming energy in 3-dimensional space to one or more receivers via the transmitter and RF circuit, and (iv) a storage, operatively coupled to the processor, the storage being configured to store receiver data for each of the one or more receivers, where the processor is configured to process the receiver data to control the generation of pocket-forming energy.

In some embodiments, the receiver data comprises schedule data.

In some embodiments, the schedule data comprises one or more of time data, receiver user name data, energy pocket data, 3-dimensional data, angular location data, and receiver priority data.

In some embodiments, the processor is configured to receive and process modified receiver data to perform a modified control of generation of pocket-forming energy.

In some embodiments, the receiver data comprises feedback data comprising a measurement of pocket-forming energy being received at each receiver. Furthermore, in some embodiments, the processor is configured to perform a modified control of generation of pocket-forming energy based on the feedback data.

In some embodiments, the storage is configured to store transmitter data for one or more other apparatuses providing wireless power delivery.

A method for controlling wireless power delivery may include: (i) generating pocket-forming energy in 3-dimensional space, via a transmitter comprising two or more antenna elements, for transmission to one or more receivers, (ii) receiving receiver data for each of the one or more receivers, (iii) processing the receiver data, and (iv) controlling the generation of pocket-forming energy based on the processed receiver data.

In another method for controlling wireless power delivery, the method may include: (i) generating pocket-forming energy in 3-dimensional space, via a processor-controlled RF circuit operatively coupled to a transmitter comprising two or more antenna elements, (ii) receiving receiver data for each of the one or more receivers, (iii) processing the receiver data, and (iv) controlling at least one of a time, direction and power of generation of pocket-forming energy based on the processed receiver data.

FIGS. 67A-67E illustrate a wireless power transmission network diagram and methods of transmitter self-test, in accordance with some embodiments.

Figure 67A:
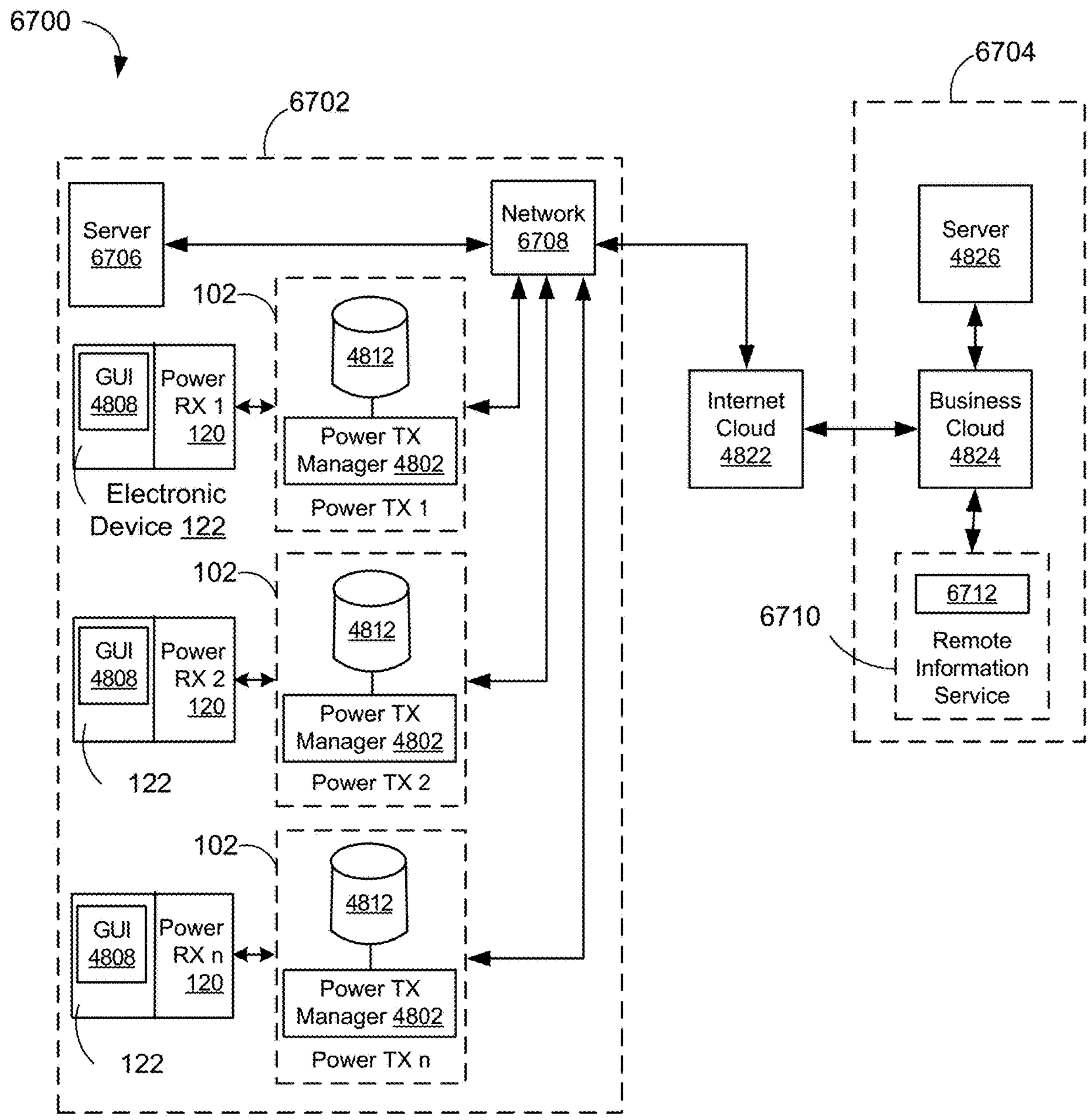
FIG. 67A shows a wireless power transmission network diagram, in accordance with some embodiments.

FIG. 67A illustrates a wireless power transmission system network 6700, according to an exemplary embodiment.

According to some embodiments, wireless power transmission system network 6700 may include multiple wireless power transmission systems 6702 capable of communicating with a remote information service 6704 through internet cloud 4822 (FIG. 48B).

In some embodiments, wireless power transmission system 6702 may include one or more wireless power transmitters 102 (FIG. 1), one or more power receivers 120 (FIG. 1), one or more optional back-up servers 6706 and a local network 6708.

According to some embodiments, each power transmitter 102 may include wireless power transmitter manager 4802 (FIG. 48A) software and a distributed wireless power transmission system database 4812 (FIG. 48A). Each power transmitter 102 may be capable of managing and transmitting power to one or more power receivers 120, where each power receiver 120 may be capable of charging or providing power to one or more electronic devices 122 (FIG. 1).

Power transmitter managers 4802 may control the behavior of power transmitters 102, monitor the state of charge of electronic devices 122, and control power receivers 120, keep track of the location of power receivers 120, execute power schedules, run system check-ups, and keep track of the energy provided to each of the different electronic devices 122, amongst others.

According to some embodiments, database 4812 may store relevant information from electronic devices 122 such as, identifiers for electronic devices 122, voltage ranges for measurements from power receivers 122, location, signal strength and/or any relevant information from electronic devices 122. Database 4812 may also store information relevant to the wireless power transmission system 6702 such as, receiver ID's, transmitter ID's, end-user handheld device names or ID's, system management server ID's, charging schedules, charging priorities and/or any data relevant to a power transmission system network 6700.

Additionally, in some embodiments, database 4812 may store data of past and present system status.

The past system status data may include details such as the amount of power delivered to an electronic device 122, the amount of energy that was transferred to a group of electronic devices 122 associated with a user, the amount of time an electronic device 122 has been associated to a wireless power transmitter 102, pairing records, activities within the system, any action or event of any wireless power device in the system, errors, faults, and configuration problems, among others. Past system status data may also include power schedules, names, customer sign-in names, authorization and authentication credentials, encrypted information, physical areas of system operation, details for running the system, and any other suitable system or user-related information.

Present system status data stored in database 4812 may include the locations and/or movements in the system, configuration, pairing, errors, faults, alarms, problems, messages sent between the wireless power devices, and tracking information, among others.

According to some exemplary embodiments, databases 4812 within power transmitters 102 may further store future system status information, where the future status of the system may be forecasted or evaluated according to historical data from past system status data and present system status data.

In some embodiments, records from all device databases 4812 in a wireless power transmission system 6702 may also be stored and periodically updated in server 6706. In some embodiments, wireless power transmission system network 6700 may include two or more servers 6706. In other embodiments, wireless power transmission system network 6700 may not include any servers 6706.

In another exemplary embodiment, wireless power transmitters 102 may further be capable of detecting failures in the wireless power transmission system 6702. Examples of failures in power transmission system 6702 may include overheating of any component, malfunction, and overload, among others. If a failure is detected by any of wireless power transmitters 102 within the system, then the failure may be analyzed by any wireless power transmitter manager 4802 in the system. After the analysis is completed, a recommendation or an alert may be generated and reported to owner of the power transmission system or to a remote cloud-based information service, for distribution to system owner or manufacturer or supplier.

In some embodiments, power transmitters 102 may use network 6708 to send and receive information. Network 6708 may be a local area network, or any suitable communication system between the components of the wireless power transmission system 6702. Network 6708 may enable communication between power transmitters, system management servers 6706 (if any), and other power transmission systems 6702 (if any), amongst others.

According to some embodiments, network 6708 may facilitate data communication between power transmission system 6702 and remote information service 6704 through internet cloud 4822.

Remote information service 6704 may be operated by the owner of the system, the manufacturer or supplier of the system, or a service provider. Remote management system may include business cloud 4824 (FIG. 48B), remote manager software 6710, and one or more backend servers 4826 (FIG. 48B), where the remote manager software 6710 may further include a general database 6712. Remote manager software 6710 may run on a backend server 4826, which may be a one or more physical or virtual servers.

General database 6712 may store additional backups of the information stored in the device databases 4812. Additionally, general database 4826 may store marketing information, customer billing, customer configuration, customer authentication, and customer support information, among others. In some embodiments, general database 6712 may also store information, such as less popular features, errors in the system, problems report, statistics, and quality control, among others.

Each wireless power transmitter 102 may periodically establish a TCP communication connection with remote manager software 6710 for authentication, problem report purposes or reporting of status or usage details, among others.

Figure 67B:
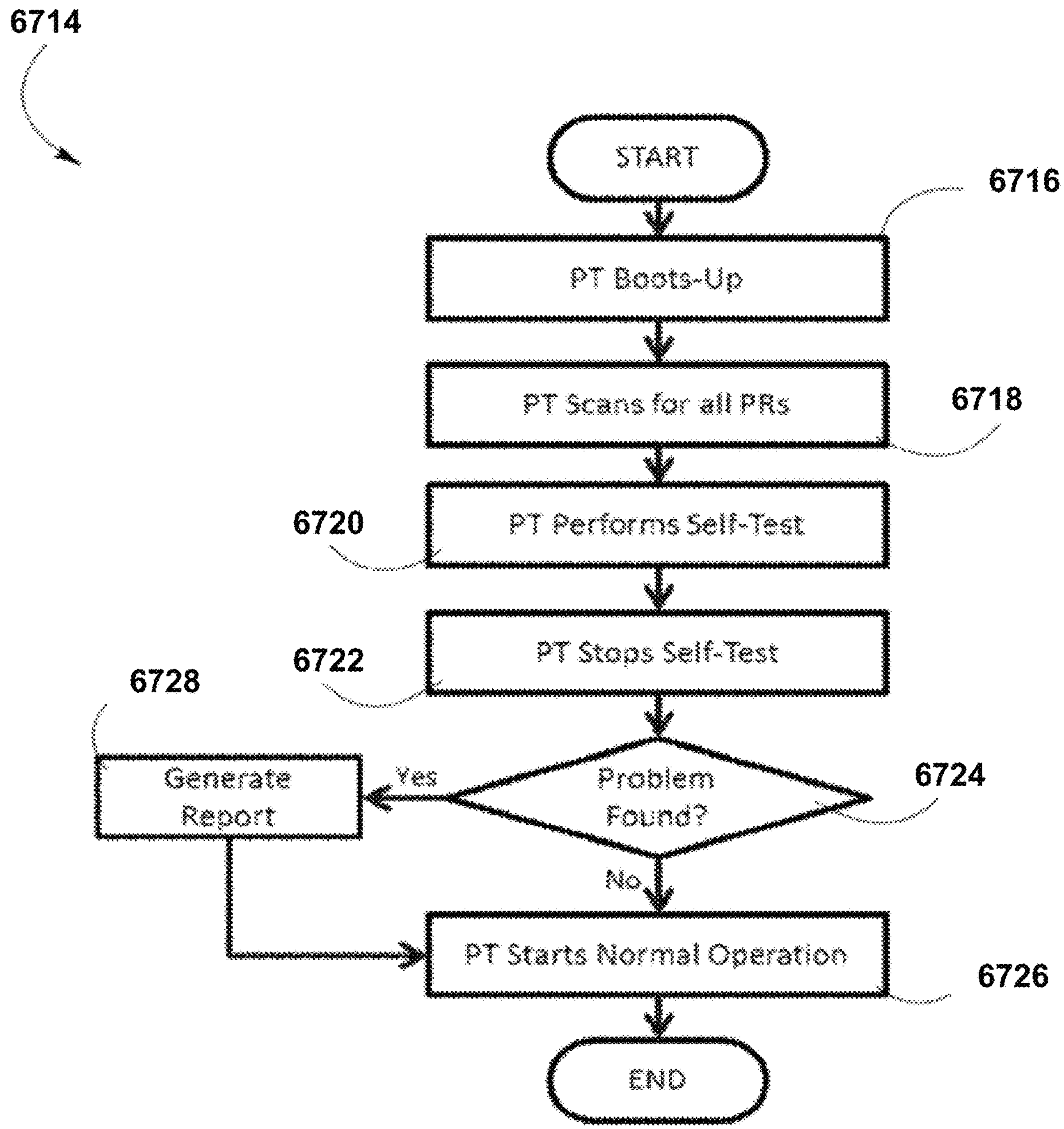
FIG. 67B is a flowchart showing a method for automatic initiation of a self-test of a power transmitter software at boot, in accordance with some embodiments.

FIG. 67B is a flowchart showing a method for automatic initiation at boot 6714 of a power transmitter self-test, according to an exemplary embodiment.

The method for automatic initiation at boot 6714 of a power transmitter (PT) self-test may start when a PT manager boots-up 6716 a PT. Subsequently, PT may scan 6718 for all power receivers (PR) within communications range. For each PR found, wireless power transmission system may command PT to perform 6720 a communication self-test for a finite period of time, and then PT stops 6722 the communication self-test. If the PT finds a problem 6724 during the self-test, PT manager may generate 6728 a report to inform a user, at a computing device, of the problem. Afterwards, PT may start its normal operation 6726.

Figure 67C:
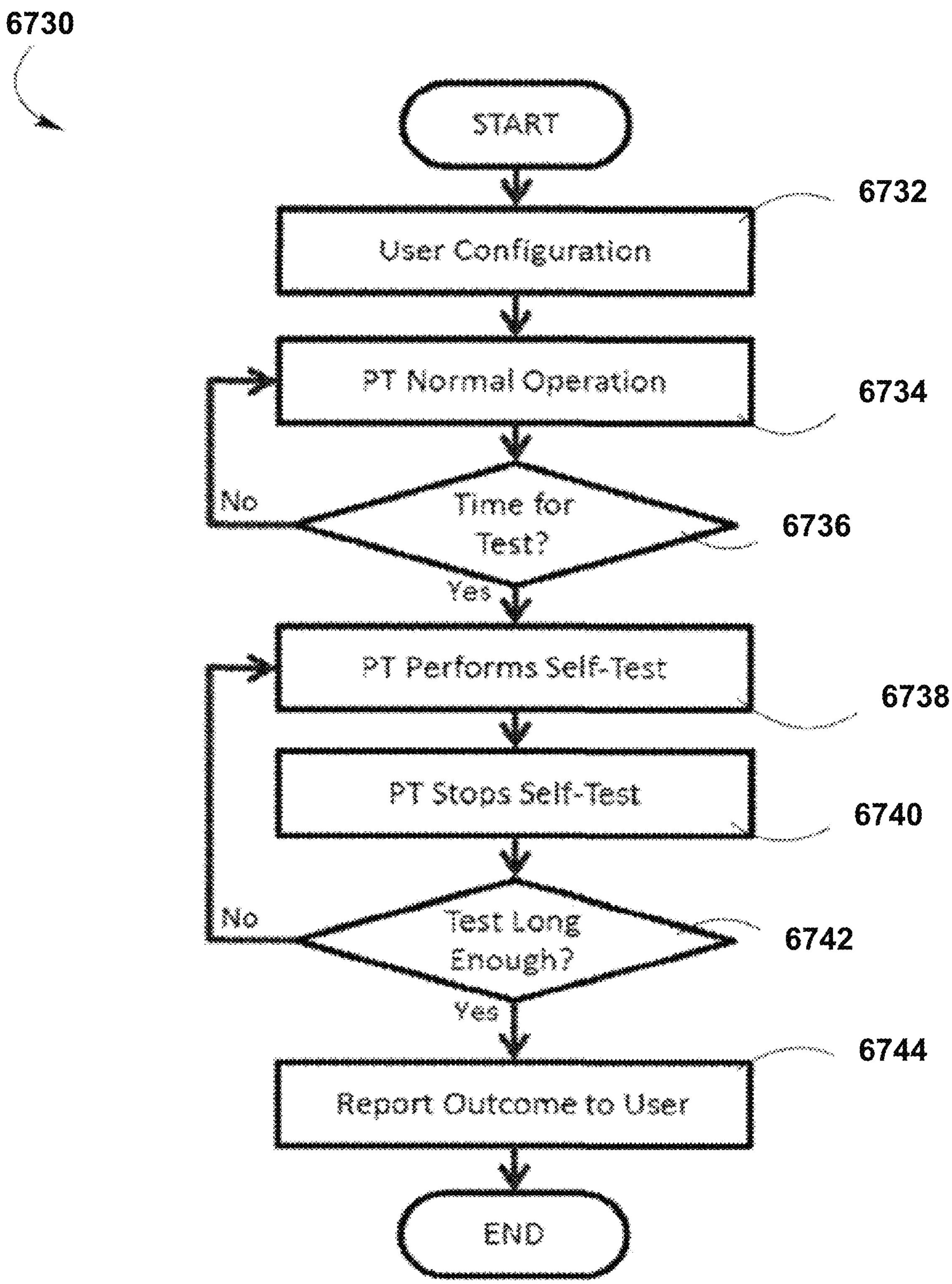
FIG. 67C is a flowchart showing a method for automatic initiation of a self-test during a normal operation of a power transmitter, in accordance with some embodiments.

FIG. 67C is a flowchart showing a method for automatic initiation during normal operation 6730 of a PT self-test, according to an exemplary embodiment.

Periodically, a wireless power transmission system may automatically initiate an automatic self-test and report outcome to system user. The wireless power transmission system may automatically initiate test of an individual system unit or end-to-end test of complete system. Control of automatic initiation of test for one or more PTs by system may be configured by user. Control of automatic initiation may include when to start automatically initiated test, what to test, and how long to run the automatic test, among other parameters.

The method for automatic initiation during normal operation 6730 of a PT self-test may start when a wireless power transmission system receives a user configuration 6732 from a user computing device. User configuration 6732 may be through a system management GUI web site hosted by the system management service that is cloud based or on a local server, or through a system management GUI app running on the user's mobile computing device.

Following user configuration 6732, PT may start its normal operation 6734, during which PT manager may employ the user configuration 6732 to check 6736 if it's time to perform the self-test. If current time does not correspond with the user configuration 6732, PT may continue with its normal operation 6734. If current time does correspond with the user configuration 6732, wireless power transmission system may command each configured PT to perform 6738 a communication self-test. Subsequently, after the period of time has been completed, according to user configuration 6732, wireless power transmission system may command the PTs whose period has been completed to stop 6740 self-test. Wireless power transmission system may then check 6742 if testing has been performed long enough. If self-test has not been performed long enough, wireless power transmission system may command each configured PT to again perform 6748 communication self-test. If self-test has been performed long enough PT manager application may send a report 6744 of the outcome to the user computing device and inform the user that the automatic self-test has been performed.

Figure 67D:
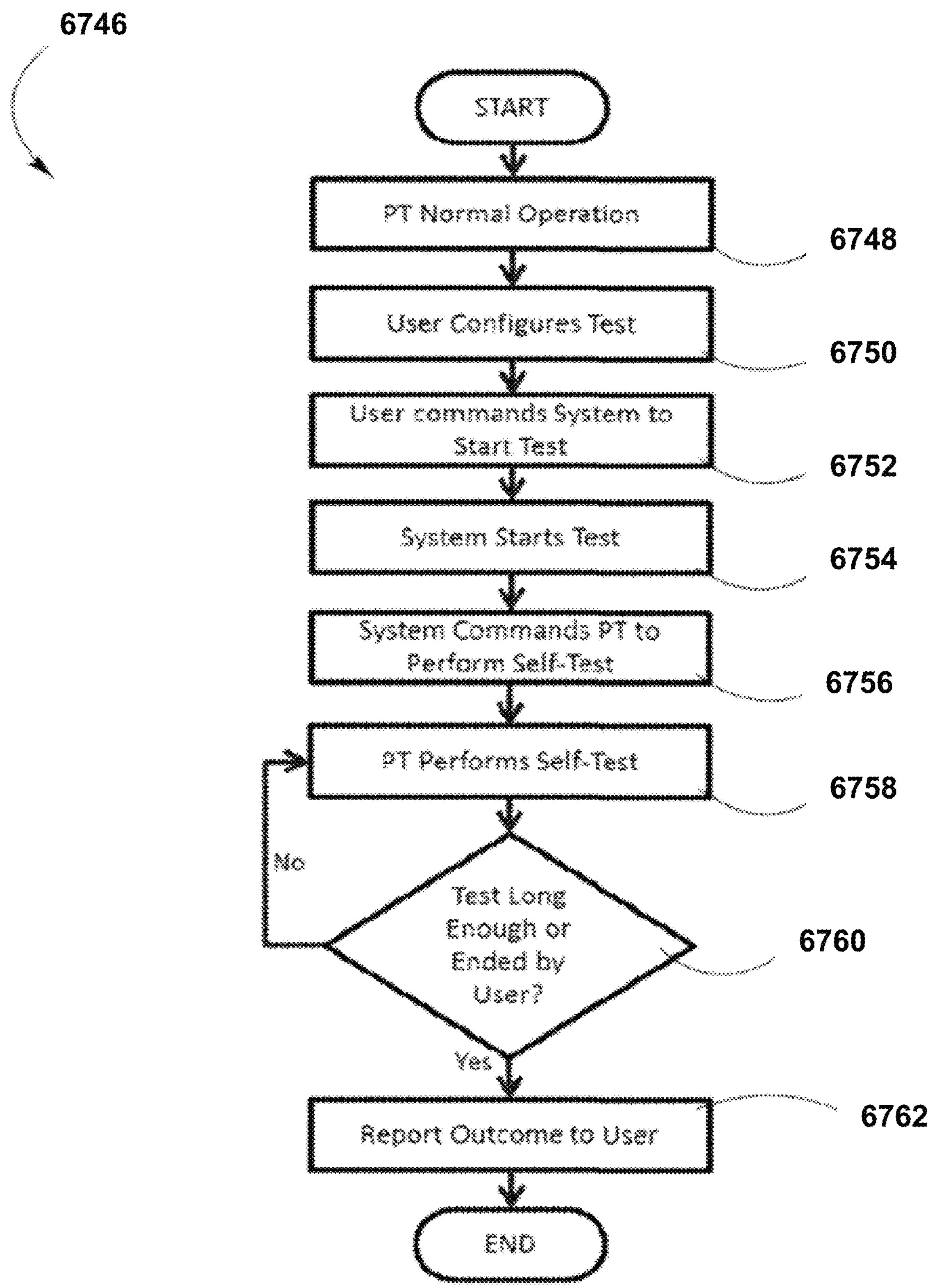
FIG. 67D is a flowchart showing a method for manually initiated power transmitter self-test, in accordance with some embodiments.

FIG. 67D is a flowchart showing a method for manual initiation 6746 of a PT self-test, according to an exemplary embodiment.

A user may employ a computing device and manually start a self-test of a single PT, specific set of PTs, or all system PTs. Manual initiation 6746 of self-test may be commanded by a user computer device operating the system management GUI, either an app running on a user computing device, or a web site hosted by a system management server.

The method for manual initiation 6746 of a PT self-test may start during PT normal operation 6748. A user employs a computing device to configure 6750 the test and subsequently command 6752 a wireless power transmission system to start the test. The wireless power transmission system may then start 6754 the test commanding 6756 each configured PT to perform 6758 the self-test. The algorithm employed by the wireless power transmission system to command the start of the test may be performed by a PT manager application in a wireless power transmission system cloud or a PT application running on the user computing device. The user, by means of a computing device, may specify the duration of test at start.

Wireless power transmission system may then check 6760 if testing has been performed long enough. If self-test has not been performed long enough, wireless power transmission system may command the next configured PT to perform 6758 a communication self-test. PT self-test may run indefinitely until self-test has been performed long enough or test is ended by a user by means of a computing device.

If self-test has been performed long enough or test is ended by a user computing device, then PT manager application may send a report 6762 of the outcome to the user at the system management GUI and inform the user that the automatic self-test has been performed.

Figure 67E:
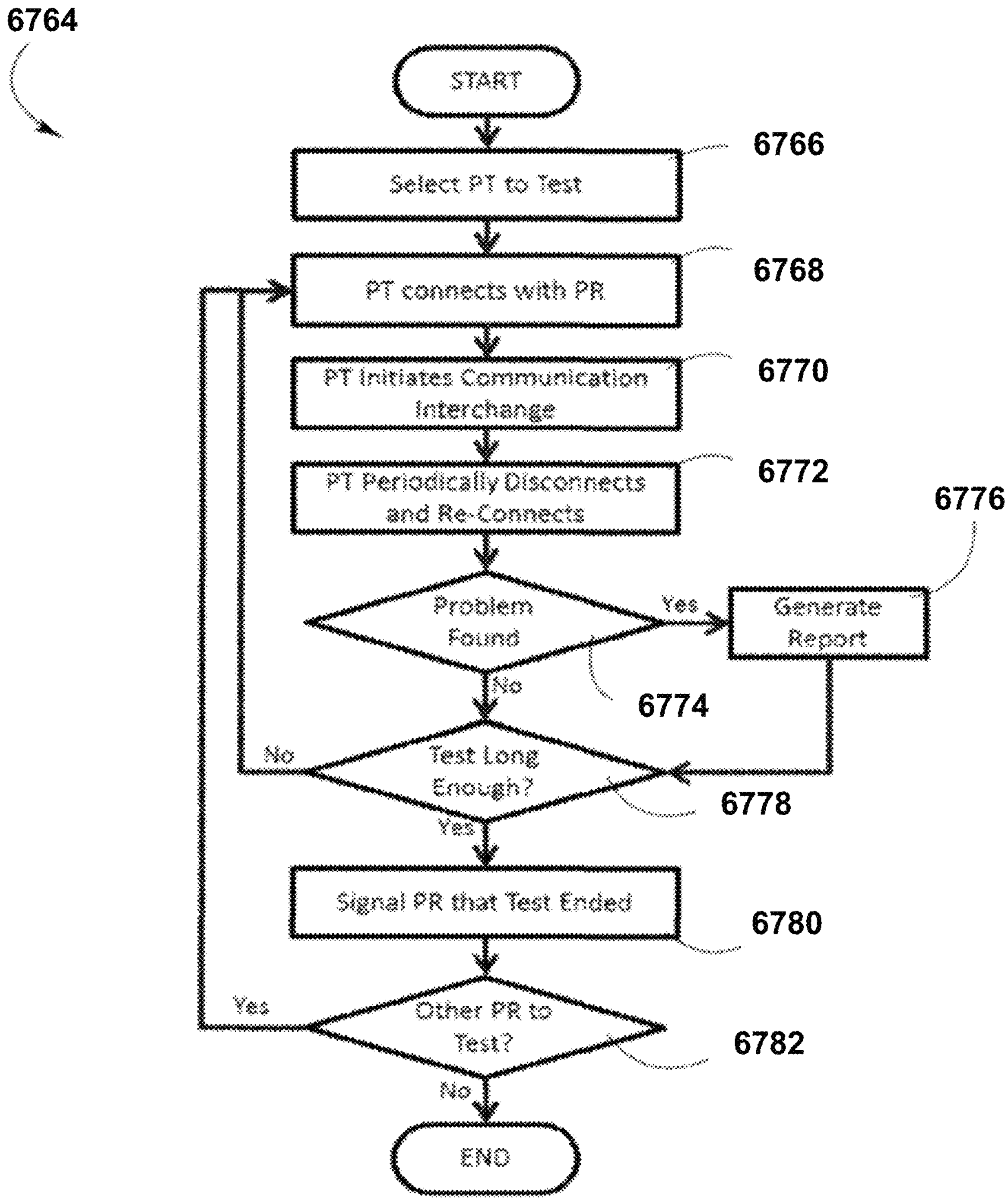
FIG. 67E is a flowchart showing a method for performing a self-test of a power transmitter, in accordance with some embodiments.

FIG. 67E is a flowchart showing a method for performing a PT communication self-test 6764, according to an exemplary embodiment.

In one embodiment, when a PT boots-up, PT may scan for all PRs within the communication range. For each PR found, PT may perform an automatic communication self-test for a finite period of time, and then PT may stop self-test and may start normal operation. Once boot-time communication self-test has passed, PT may periodically check if a command to run self-test has been communicated to it from system management software that is external to the PT.

In other embodiments, wireless power transmission system may periodically automatically initiate the automatic communication self-test and report outcome to system user. The system may automatically initiate the communication self-test of an individual system unit or an end-to-end test of the complete system. Control of automatic initiation of test by system may be configured by a user.

In another embodiment, a user may manually start self-test of a single transmitter, specific set of transmitters, or all system transmitters. Communication self-test may run indefinitely until stopped by user, or user may specify duration of test at start.

In some embodiments, a wireless power transmission system management software may communicate the self-test command to a PT in response to a user command entered at a client device that is running a system mobile management app, or at the system web page that is hosted by the system management server.

In some embodiments, a wireless power transmission system management software may communicate the self-test command to a PT automatically in response to some trigger event, such as the passage of a finite amount of time, or other. The command may indicate that the PT should run the test until commanded to stop, or run the test for a specific duration.

Method for performing a PT communication self-test 6764 may start when a wireless power transmission system's management application software, running on a system management server, selects 6766 a PT to test. Subsequently, the selected PT may scan for all PRs within communication range. For each PR found, the PT may connect 6768 and then initiate communication interchange 6770 with PR. Communication interchange 6770 may be in real-time. Once communication is established, the PT may perform any suitable type of system message exchange, employing any suitable type of system message between the PT and the PR. Then, PT may periodically disconnect and re-connect 6772 from PR, in order to test re-connection. PT may update metrics counters with software actions and operations.

Afterwards, wireless power transmission manager app may check 6774 if there is a problem of communication between PT and PR. If a problem is found, PT manager application may generate 6776 a report to send to the wireless power transmission manager app on the system management server any unexpected patterns of metrics counters or, unexpected operation, or any test failure. If a problem is not found, PT may report that self-test passed to the wireless power transmission manager application.

The wireless power transmission manager app may then check 6778 if testing has been performed long enough. If self-test has not been performed long enough, PT may connect 6768 to the next PR, and then initiate communication interchange 6770 with PR. If self-test has been performed long enough PT manager application may signal 6780 the PR that the self-test has ended, and then end communication with PR.

PT may check 6782 if there are other PRs to be tested and subsequently connect 904 with a PR to test and begin the process of method for performing a PT communication self-test 6764. If there are no other PRs to be tested, the process may end and tested PT may begin normal operation.

If transmitter started the test at boot, then test may end after a finite duration that may be set or hard-coded in the system software.

If test was started by external management software to run for a finite duration, then test may end when transmitter determines that duration has elapsed.

If test was started by external management software to run indefinitely, then test may only end when external management software communicates a command to transmitter to end the test.

After the communication self-test ends, each PT performing the self-test may end communication connection with latest PR being tested. PRs may begin normal operation.

The counts of all actions and operations, performed by the wireless power transmission system while testing connections and communication may be stored in metrics counters within a database. When the PT communication self-test 6764 is complete, said metrics counters may be compared with expected values. If said metrics counters match the expected values, then test passed, otherwise test failed. The wireless power transmission system may report to the user computing device the outcome of the test.

Example

Example #1 is an embodiment of the application of method for performing a PT communication self-test 6764, where a wireless power transmission system is being used in an office environment. The office environment includes a first and second wireless power transmitter, the two of which are in communication with a wireless power management service running on a server in the IT department. In example #1, the wireless power transmission system receives a command from a user computing device stating that the computing device is to be charged, and the wireless power transmission manager proceeds to command the PT within the communication range of the user computing device to perform PT communication self-test 6764 as described in FIG. 67E. The PT looks up in its copy of the system database the PR that powers said computing device. When checking the communication between the PT and the PR, unexpected patterns of metrics counters are identified and the self-test fails. The power transmitter manager software within the tested PT then generates a report including the information of the outcome of the self-test and communicates the generated report to the computing device, which is running the system management GUI, which notifies user computing device of test result.

FIGS. 67A-67E illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 67A-67E.

Presented below are example power systems and methods of operating a power system.

A power system may include: (i) a plurality of antenna elements, (ii) a RF circuit, operatively coupled to the plurality of antenna elements, (iii) a processing apparatus, operatively coupled to the RF circuit, where the processing apparatus is configured to cause the RF circuit and plurality of antenna elements to generate pocket-forming energy in 3-dimensional space, and (iv) communications for communicating with a receiver, configured to receive the pocket-forming energy in three dimensional space, where the processing apparatus is configured to perform a self-test of the power system upon the occurrence of a predetermined event.

In some embodiments, the predetermined event comprises one of a boot-up, passage of a predetermined period of time, a self-test command received in the communications from the receiver, and a self-test command received in the communications from a server.

In some embodiments, the processing apparatus is configured to transmit a result of the self-test via the communications.

In some embodiments, the result of the self-test comprises a comparison of the power systems functions to at least one metrics counter.

In some embodiments, the comparison comprises determining if patterns of metrics counters are present.

In some embodiments, the processing apparatus comprises at least one of a digital signal processor and a microcontroller.

In another power system, the system may include: (i) a plurality of antenna elements, (ii) a RF circuit, operatively coupled to the plurality of antenna elements the RF circuit being configured to adjust at least one of phase and magnitude of RF signals provided to the plurality of antenna elements, (iii) a processing apparatus comprising at least one of a microcontroller and a digital signal processor (DSP), operatively coupled to the RF circuit, where the processing apparatus is configured to cause the RF circuit and plurality of antenna elements to generate pocket-forming energy in 3-dimensional space, and (iv) communications for communicating with a receiver, configured to receive the pocket-forming energy in 3-dimensional space, where the processing apparatus is configured to perform a self-test of the power system upon the occurrence of a predetermined event.

A method of operating a power system may include: (i) configuring a processing apparatus to activate a RF circuit operatively coupled to a plurality of antenna elements to generate pocket-forming energy in three dimensional space, (ii) configuring communications to communicate with a receiver configured to receive the pocket-forming energy in 3-dimensional space, and (iii) performing, via the processing apparatus a self-test of the power system upon the occurrence of a predetermined event.

Figure 68A:
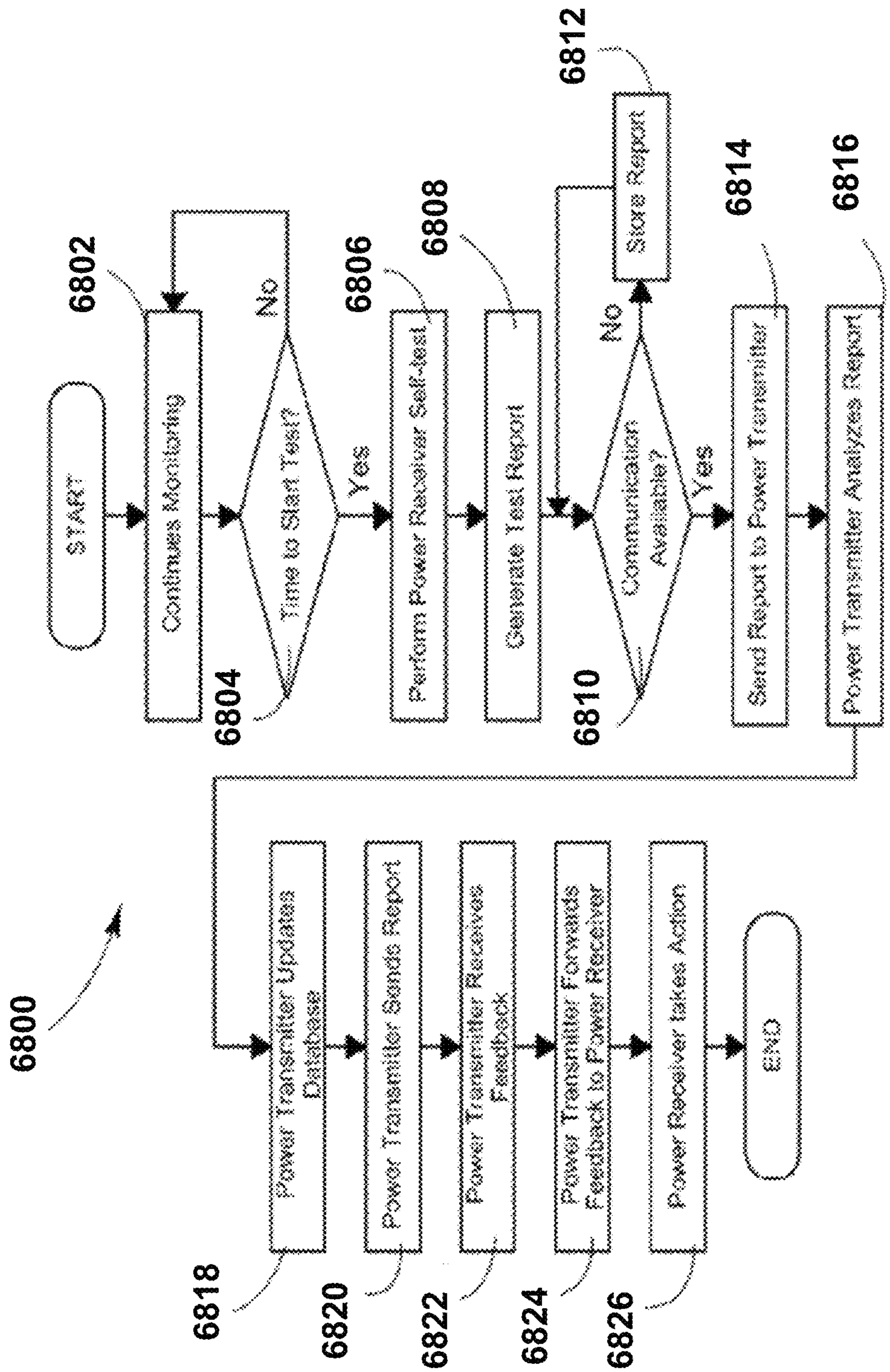
FIG. 68A is a flowchart of a method for automatically testing the operational status of a wireless power receiver, in accordance with some embodiments.
Figure 68B:
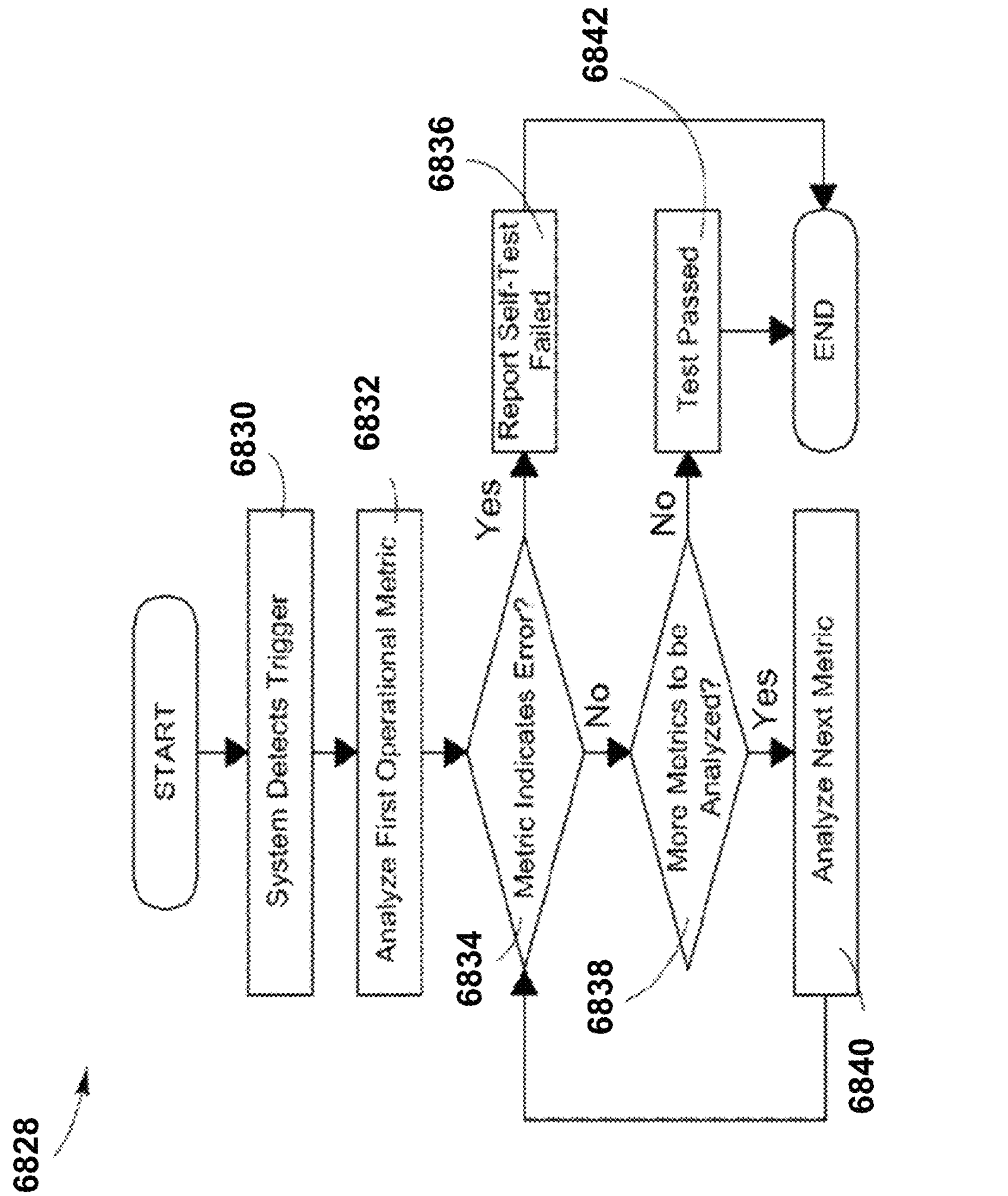
FIG. 68B is a flowchart of a method for performing a power receiver self-test, in accordance with some embodiments.

FIGS. 68A and 68B illustrate flowcharts of methods for wireless power receiver testing, in accordance with some embodiments.

FIG. 68A shows a flowchart of a method 6800 for automatically testing the operational status of a wireless power receiver unit in a wireless power transmission system, according to an embodiment.

In some embodiments, power receiver self-test software may be included in Power Receiver App, which performs communication with wireless power transmitters and manages the functionality of the power receiver for receiving power and transmitting it to its client device.

Method 6800 may start when a power receiver boots up and starts continuous monitoring 6802 of power receiver operational metrics. According to an embodiment, values of operational metrics counters may be stored in power receiver's memory. The counters may be updated whenever the power receiver's software detects any kind of event, status, or change in status, of receiver's software, hardware, operation, communication, or performance. According to some embodiments, power receiver memory for storage of system operational metrics may be volatile or non-volatile.

According to some embodiments, wireless power receiver software may include a timer callback from the underlying application programming interface (API) to the CPU. The timer callback may periodically trigger the software that self-tests the wireless power receiver, when time to start 6804 self-test is reached. In some embodiments, the self-test may also be run in response to a command received from a wireless power transmitter. In further embodiments, the self-test may also be initiated by boot-up or restart or reset of power receiver's software.

Then, wireless power receiver's software may perform self-test 6806. During self-test 6806, the wireless power receiver may analyze the present or past status of the receiver's software, hardware, operation, communication, or performance by analyzing the values of the receiver's operational metrics. According to some embodiments, power receiver's software may be capable of detecting indicators of past, present, or possible future errors based on the analysis of the system operational metrics. According to some embodiments, unexpected patterns in metrics may also be interpreted as errors. Self-test 6806 may test for any number of software, hardware, operation, communication, or performance errors.

According to some embodiments, self-test 6806 may check for and report errors for any kind of unexpected performance operational metrics such as low power transmitted to client device compared with power received at antennas, or such as power at receiver antenna unexpectedly too low for too much time, or such as unexpected low level of power efficiency from received RF power to transmitted electrical power to client device.

In some embodiments, self-test 6806 may check for and report errors for any kind of unexpected software operational metrics such as software stack overflow or underflow, or unexpected number or rate of software restarts or watchdog reboots, or metrics of power generated is impossibly high, or the like.

In some embodiments, self-test 6806 may check for and report errors for any kind of unexpected hardware operational metrics such as analog-to-digital values below or above expected limits, or errors with relay connection switch to client device in unexpected state, such as open when wireless power receiver is receiving power from a wireless power transmitter, or closed when the wireless power receiver is not receiving power from a wireless power transmitter; or errors for unexpected voltage measured before and after conditioning of voltage from wireless power receiver antenna rectifiers, or conditioning errors, or errors reported by any hardware device, or other erroneous hardware conditions.

In further embodiments, self-test 6806 may also check for and report errors for any kind of unexpected communication operational metrics such as count or rate of unexpected disconnections with wireless power transmitter, or count or rate of invalid received communications.

According to an exemplary embodiment, detection of errors may take place by analyzing only the system operational metrics, which may simplify the analysis procedure or may save software development time.

After self-test 6806, power receiver's software may generate a test report 6808, including system operational metrics and error reports, if found.

Afterwards, the power receiver App may check 6810 if there is an available communication connection with a power transmitter. If there is no communication connection established with a wireless power transmitter, the wireless power receiver may store 6812 the self-test 6806 results or details in its memory, where the memory may be volatile or non-volatile.

If there is an available communication connection with a wireless power transmitter, the wireless power receiver may send 6814 the self-test 6806 results to the power transmitter. The wireless power transmitter may then analyze 6816 operational metrics from the wireless power receiver and compare with operational metrics or other status at the wireless power transmitter to detect other errors.

In some exemplary embodiments, the wireless power receiver may report the results of the self-test 6806 that was performed just before establishment of communication connection. This may be reported immediately upon establishment of communication connection with a wireless power transmitter.

Furthermore, in some embodiments, a wireless power receiver may also perform its self-test 6806 immediately upon establishment of communication with a wireless power transmitter, and not wait until the next scheduled periodic time.

Then, wireless power transmitter may update 6818 its database and store the results of the analysis. Afterwards, wireless power transmitter may send 6820 the results to the user by a management mobile device GUI or system server hosted web page, by displayed graph, or line by line report or log of each error, and may include time stamp, ID of wireless power receiver, ID of wireless power transmitter, error code or label or description or other. In some embodiments, a wireless power receiver may be capable of reporting results or details of self-test 6806 by blinking or colored LED's, or system management server may report said results by SMS text message, email, or voice synthesis telephone or VOIP call, or other computer-to-human or computer-to-computer means.

According to some embodiments, the wireless power transmitter may communicate any of receiver's automatic self-test result information to any mobile system management GUI client device, or any system management server, or a remote wireless power transmission system information distribution service.

In some embodiments, the wireless power transmitter may distribute the self-test results through a distributed wireless power transmission database to each server, transmitter, and mobile device of said wireless power transmission system.

According to some embodiments, the wireless power transmitter may receive feedback 6822 from the user or a remote management system. In some embodiments, a user may issue one or more commands through a system management device including wireless power management software. Then, system management device that receives the command from the user may forward the command to all wireless power transmitters within the system.

Subsequently, the present or next wireless power transmitter in communication with the target wireless power receiver may forward 6824 the command to the wireless power receiver. The wireless power receiver may then receive the feedback 6822 and take a suitable action 6826 in response to the received feedback, such as, but not limited to, rebooting or restarting the power receiver's software.

In some embodiments, user feedback 6822 may include manual commands to reset the operational metrics of any wireless power receiver, which effectively erases all past error detections.

FIG. 68B is a flowchart of a method for performing a power receiver self-test 6828, according to an embodiment. Method for performing a wireless power receiver self-test 6828 may start when wireless power transmitter app detects a suitable trigger 6830. Then, self-test software may analyze 6832 first system operational metric and determine 6834 if the analyzed metric indicates an error. If self-test software determines that the metric indicates an error, self-test software may generate a self-test failed 6836 report and the process may end. If self-test software determines that the metric does not indicate an error, self-test software may check 6838 if there are more system operational metrics to be analyzed. If there are, the self-test software may continue to analyze the next system operational metric 6840 until all system operational metrics have been analyzed or an error has been detected. If there are no more system operational metrics to be analyzed and no errors have been detected, self-test software may generate a self-test passed 6842 report and the process may end.

Examples

In example #1 a wireless power receiver performs a pre-scheduled self-test. To perform the test, the wireless power receiver self-test software analyzes receiver's operational metrics related to software, hardware and communication. In example #1 the self-test software doesn't identify any error and generates self-test report that indicates the test passed. Then, the wireless power receiver sends the report along with the receiver's operational metrics to the wireless power transmitter in communication with the receiver. The wireless power transmitter analyzes report and its included operational metrics, and may compare with its transmitter operational metrics or status, and finds no indicator of possible error. Afterwards, the wireless power transmitter sends the report to a system management server or service.

In example #2 a wireless power receiver performs an automatic self-test. To perform the test, the wireless power receiver self-test software analyzes receiver operational metrics related to software, hardware and communication. In example #2 the self-test software doesn't identify any error and generates the test report. Then, the wireless power receiver sends the report to a wireless power transmitter. The wireless power transmitter analyzes the report and finds an indicator of a possible error. Afterwards, the wireless power transmitter sends the report to a remote management system. The report is analyzed by the remote management system and the operator of the wireless power transmission system is notified of the possible error, and suggestions to prevent the error are delivered to the operator. Then, the operator, through a system management device, changes certain configuration parameters in the system to prevent the error.

FIGS. 68A and 68B illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 68A and 68B.

Presented below are example power system receivers and methods of operating a power system receiver.

A power system receiver may include: (i) a plurality of antenna elements, (ii) a rectifier, operatively coupled to the plurality of antenna elements, (iii) a power converter, operatively coupled to the rectifier, wherein the power converter and rectifier are configured to receive pocket-forming energy in 3-dimensional space for use in charging a battery, and (iv) a processing apparatus, configured to perform a self-test of the power system receiver upon the occurrence of a predetermined event.

In some embodiments, the power system receiver may include communications configured to send and receive data to the power system receiver.

In some embodiments, the predetermined event comprises one of a boot-up, restart, reset, and passage of a predetermined period of time, a self-test command received in the communications from a transmitter, and a self-test command received in the communications from a server.

In another power system receiver, the power system receiver may include: (i) a plurality of antenna elements, (ii) a rectifier, operatively coupled to the plurality of antenna elements, (iii) a power converter, operatively coupled to the rectifier, where the power converter and rectifier are configured to receive pocket-forming energy in 3-dimensional space for use in charging a battery, (iv) communications configured to send and receive data to the power system receiver, and (v) a processing apparatus, configured to perform a self-test of at least one of (i) the power system receiver and (ii) the communications upon the occurrence of a predetermined event.

A method of operating a power system receiver may include: (i) configuring a plurality of antenna elements, a rectifier, operatively coupled to the plurality of antenna elements and a power converter, operatively coupled to the rectifier, to receive pocket-forming energy in 3-dimensional space in the power system receiver for use in charging a battery and (ii) performing, via a processing apparatus in the power system receiver, a self-test of the power system upon the occurrence of a predetermined event.

In some embodiments, the method includes configuring communications to communicate with a transmitter configured to transmit the pocket-forming energy in 3-dimensional space.

Figure 69A:
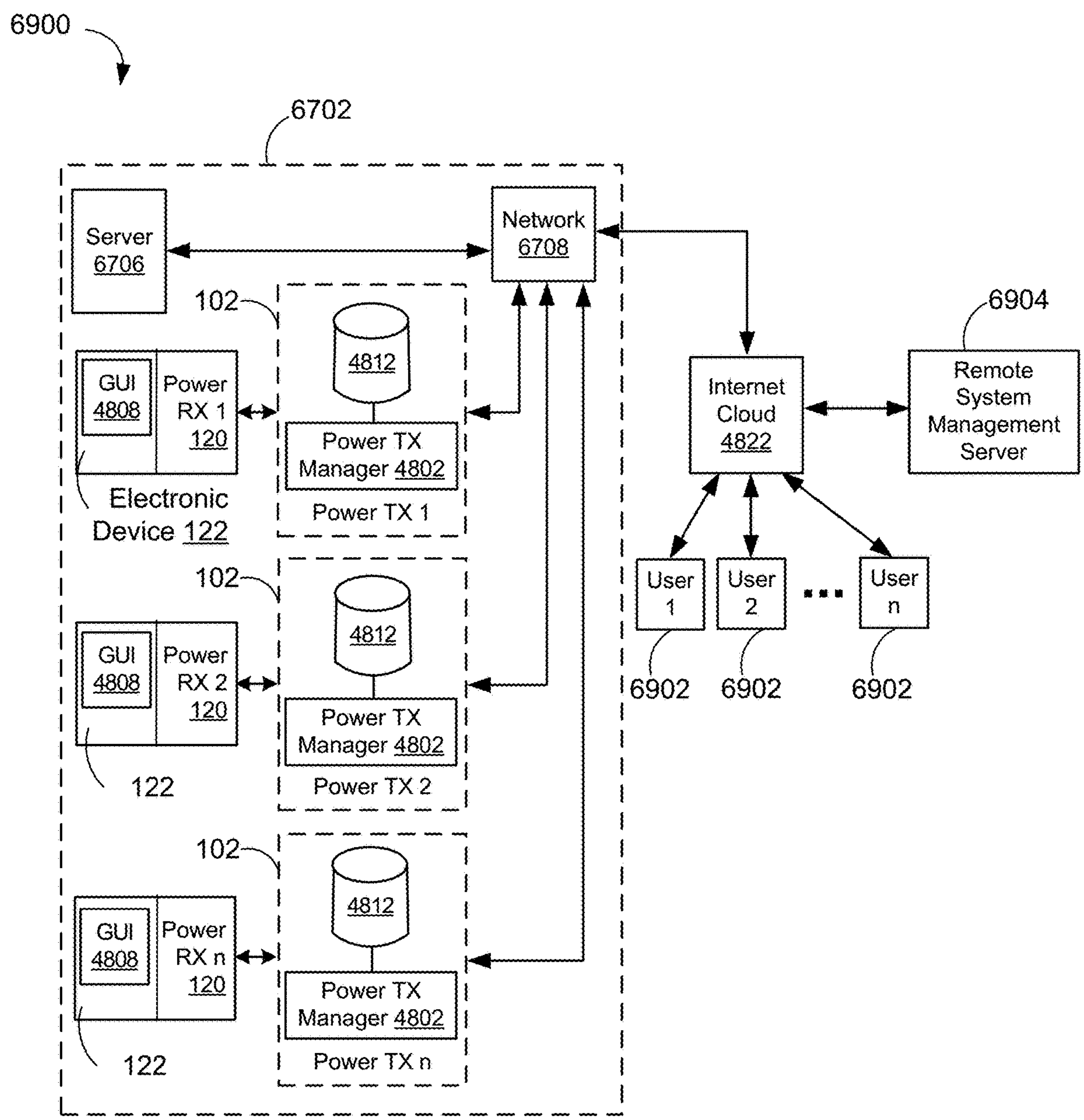
FIG. 69A illustrates a system architecture for wireless power transmission system, in accordance with some embodiments.
Figure 69B:
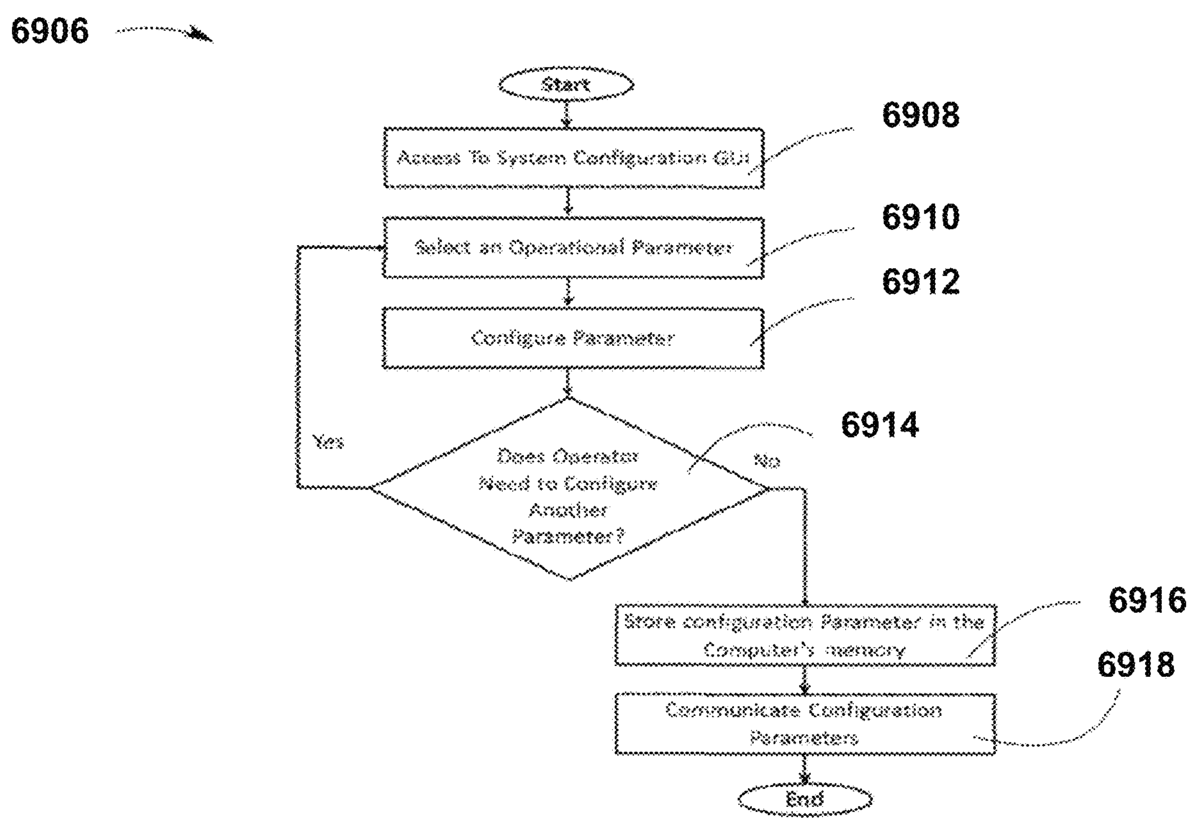
FIG. 69B is a flowchart of a method to control a wireless power transmission system by configuration of wireless power transmission control parameters, in accordance with some embodiments.

FIGS. 69A and 69B illustrate a system architecture and a flowchart to control a wireless power transmission system by configuration of wireless power transmission control parameters, in accordance with some embodiments.

FIG. 69A illustrates a system architecture 6900 for a wireless power transmission system 6702 (FIG. 67A), according to another embodiment.

A wireless power transmission system 6702 may include one or more wireless power transmitters 102 (FIG. 1), one or more wireless power receivers 120 (FIG. 1), one or more optional system management servers 6706 (FIG. 67A), and one or more optional mobile or hand-held computers or smart phones, or the like.

Wireless power transmission system 6702 may include communication between one or more wireless power transmitters 102 and one or more wireless power receivers 120. Client device 122 (FIG. 1) may be coupled to an adaptable wireless power receiver 120 that may enable wireless power transmission to client device 122. In another embodiment, a client device 122 may include a wireless power receiver 120 built in as part of the hardware of the device. Client device 122 may be any device which uses an energy power source, such as, laptop computers, stationary computers, mobile phones, tablets, mobile gaming devices, televisions, radios and/or any set of appliances that may require or benefit from an electrical power source.

In one embodiment, one or more wireless power transmitters 102 may include a microprocessor that integrates a power transmitter manager 4802 (FIG. 48A) application (PWR TX MGR APP) as embedded software. Power transmitter manager 4802 application (PWR TX MGR APP) may also include a distributed system database 4812 (FIG. 48A), which may store relevant information associated with client device 122, such as their identifiers for a client device 122, voltage ranges for wireless power receiver 120, location of a client device 122, signal strength and/or any other relevant information associated with a client device 122. Database 4812 may also store information relevant to the wireless power transmission system, including wireless power receiver ID's, wireless power transmitter ID's, end-user handheld devices, system management servers, charging schedules, charging priorities and/or any other data relevant to a wireless power network.

Communication between wireless power transmitters and wireless power receivers may be achieved using standard network communication protocols such as, Bluetooth Low Energy, WiFi, or the like.

A graphical user interface (GUI) 4808 (FIG. 48A) may be used to manage the wireless power transmission system from a client device 122. GUI 4808 may be a software module that may be downloaded from any suitable application store and may run on any suitable operating system, including iOS and Android, among others.

In some embodiments, wireless power transmitters 102 may use network 6708 (FIG. 67A) to send and receive information. Network 6708 may be a local area network, or any suitable communication system between the components of the wireless power transmission system 6702. Network 6708 may enable communication between two or more wireless power transmitters 102, the communication of wireless power transmitters 102 with system management server 6706, and may facilitate the communication between wireless power transmission system 6702 and remote (cloud) system Internet cloud 4822 (FIG. 48B), among others.

The configuration of the wireless power transmission system may be performed by a user or an operator using a standard web browser on a computing device 6902 such as mobile, desktop, laptop, or other computer device. The web browser may access to the system configuration graphical user interface (GUI). The system configuration GUI may be hosted by a remote (cloud) system management server 6904 connected to an Internet cloud 4822. The system configuration GUI (not shown in FIG. 69A) presented at the browser to the operator may be functionally identical regardless of the computing device 6902 running the browser.

In a different embodiment system configuration GUI may be hosted by any wireless power transmitter 102 of the system. In another embodiment system configuration GUI may be hosted by the system's management service that may be hosted by a system management server 6706, where system's management service may be a software application to manage wireless power transmission system 6702. System management server and remote (cloud) system management server 6904 may be cloud-based backend servers and may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

The configuration of the wireless power transmission system may also be performed using GUI software application (not shown in FIG. 69A) on a mobile computer or computing device 6902, such as smartphones, tablets, desktop, and laptop, among others.

In a different embodiment, the system configuration may be performed using Short Message Service (SMS) text message or Simple Mail Transfer Protocol (SMTP) email to access to the system or any other method to communicate with the system.

The system configuration GUI may be connected to the system through the system configuration application programming interface (API). The system configuration API may run on system management server 6706, in a remote (cloud) system management server 6904, or on a mobile system device. The web browser may access to system configuration API on the computer system hosting the system configuration GUI such as remote (cloud) system management server 6904 or system management server 6706.

The system configuration API may be used in response to each operation action performed at system configuration GUI. The system configuration API may then store configuration parameters in the computer's memory. These configuration parameters are then communicated to other system computers, so that each computer of the system, such as wireless power transmitter 102, system management server 6706 or remote (cloud) system management server 6904 always has the same system configuration. The system configuration API may also be used to read the system configuration for the system configuration GUI to present it to the user or operator.

The system configuration API at each system computer may have a built-it or hard-coded communication format version that is presented and verified during communication with other system computers to prevent configuration problems due to operation of system computers with incompatible software versions. Although system configuration may take the form of a web page, a mobile or computer device software application, text message, and email, among others method, the configuration functionality of each method is the same, and each method employs the system configuration API with the exact same compatibility with the system.

The system configuration controls the operational parameters of the entire system, the operational parameters of each system device, and controls password access to system configuration, among others.

According to some aspects of this embodiment, the operator using system configuration GUI may select a parameter that configures a specific wireless power transmitter 102 to always transmit power to any wireless power receiver 120 within range. Also the user or operator may select a parameter to configure wireless power transmitter 102 to only power wireless power receivers 120 that are specified by the operator. Then operator may enter the identification of each of these wireless power receivers 120, or if wireless power receiver 120 has been in communication with wireless power transmitter 102 operator may be able to select the identification of the wireless power receivers 120 from a list on the web page, because wireless power receiver's unique identification may be store into wireless power transmitter's database 4812.

In a different aspect of this embodiment, the operator may use system configuration GUI to specify that wireless power transmission always take place at a set of hours of the day for a specific wireless power receiver. If multiple wireless power receivers are restricted to the same hour, wireless power receiver 120 may be configured to have a priority, so the wireless power receiver 120 with the highest priority is charged and wireless power receivers with lower priority are not charged, and wireless power receivers of equal priority are charged at the same time.

In another embodiment, the operator may use system configuration GUI to select situations in which wireless power transmitter 102 may not transmit power to a wireless power receiver 120. For example, if a client device 122 receiving power from wireless power receiver 120 is not lying flat or is in movement or other situations that are detected by the system application running on the device the wireless power transmitter 102 may not transmit power to the client device 122. This system application may communicate by Wi-Fi or other means to the wireless power transmitter 102 so wireless power transmitter 102 can decide whether or not to transmit power to client device 122, based on situational settings. Wireless power transmitter 102 may also communicate present situations of devices to other system computers. These situational configurations may be used to enable or disable wireless power transmission in situations where the health of the user of the client device is believed to be at risk or any other situations where wireless power transmission may not be desired.

In a further embodiment each system computer with the system configuration API may also support automatic configuration by an external computer. The external computer would have the capability to read from one of the system computers the present configuration of the system, and then send back changes to the configuration. The external computer, local or in the Internet cloud may communicate with the system computer through its web service, or by any other method of communication such as TCP/IP socket connection, XML messages, simple mail transport protocol (SMTP), and SMS text message, among others.

In a different embodiment the operator may use system configuration GUI to assign names of the wireless system users, so that a specific user may be associated with a specific client device 122 or wireless power receiver 120. Operator may also configure other details about users, such as contact info, employee number, customer number, billing information, and password level, among others. The operator may need to use system configuration service to assign friendly device names to client devices, wireless power receivers, wireless power transmitters, or system management servers, so that a specific device may be conveniently referred to by its friendly name during system configuration.

The operator may need to use system configuration GUI to define the various physical wireless power transmission areas, locations, buildings or rooms of service, among others. The operator may also need to assign which wireless power transmitters belong to an area. The operator may assign a friendly name to the area, and then this name may be used to configure system operational parameters for that area.

Also the operator may use system configuration GUI to specify users that may be automatically contacted in the occurrence of a significant system event, such as malfunctioning of wireless power transmitter, the need to add more wireless power transmitters to an overly busy area, or the like.

The operator may use system configuration GUI to setup system account and password control for specific users, to control system usage, operation, or to perform billing for power consumption, among others.

For specific system operational requirements, certain users may be allowed access to subsets of system configuration, depending on user's password authorization level or role. For example, a clerk at a Starbucks or restaurant may be authorized to only configure the local wireless power transmission system to add a new supply of wireless power receivers to the list that may receive power.

In a different embodiment, the storage of configuration within each system computer may be encrypted. The encryption keys may be controlled by the configuration API, to prevent malicious examination of the system configuration details within a system computer's non-volatile memory.

FIG. 69B is a flowchart 6906 of a method to control a wireless power transmission system by configuration of wireless power transmission control parameters, according to an embodiment.

A wireless power transmission system may include one or more wireless power transmitters, one or more wireless power receivers, one or more optional system management servers, and one or more optional mobile, hand-held computers, smart phones, or the like.

The method may start at step 6908 when an operator accesses the system configuration GUI. The operator may use a standard web browser on a computing device such as mobile, desktop, laptop, or other computer device. The system configuration GUI may be hosted by a remote (cloud) management server connected to the Internet cloud. The system configuration GUI presented at the browser to the operator may be functionally identical regardless of the computing device running the browser.

In a different embodiment, the system configuration GUI may be hosted by any wireless power transmitter of the system. In another embodiment, system configuration GUI may be hosted by the system's management service that may be hosted by a system management server, where system's management service may be a software application to manage wireless power transmission system. System management server and remote (cloud) system management server may be cloud-based back-end servers and may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

The configuration of the wireless power transmission system may also be performed using a GUI software application on a mobile computer or computing device, such as smartphones, tablets, desktop, and laptop, among others.

In a different embodiment, the system configuration may be performed using Short Message Service (SMS) text message or Simple Mail Transfer Protocol (SMTP) email to access to the system or any other method to communicate with the system.

Once the operator accesses system configuration GUI, system configuration GUI may show various operational parameters to set up the system, such as wireless power transmission operation, automatic charging, situational configuration, configuration by external computer, user names and info, devices names, area definition, contact info for alerts, credential authentication, subset configurations, and encryption among others.

The operator may then select an operational parameter to configure the system, at step 6910.

Subsequently, the system configuration GUI may display another page with the information regarding the operational parameter previously selected, at step 6912.

Operator may be able to configure a parameter that enables a specific wireless power transmitter to always transmit power to any wireless power receiver within range. Also the operator may be able to select a parameter to configure wireless power transmitter to only power wireless power receivers that are specified by the operator.

According to some aspect of this embodiment, if operator selects to configure automatic charging, the operator may be able to set up a set of hours of the day in which the wireless power transmission takes place for a specific wireless power receiver. Also operator may be able to assign priorities to the wireless power receivers in the case multiple wireless power receivers are restricted to the same hour, so that at that hour the wireless power receiver with the highest priority is charged and wireless power receivers with lower priority are not charged, and wireless power receivers of equal priority are charged at the same time.

For situational configuration, the operator may configure situations in which wireless power transmitter may not transmit power to a wireless power receiver. For example, if a client device receiving power from wireless power receiver is not lying flat or is in movement or other situations that are detected by the system application running on the device the wireless power transmitter may not transmit power to the client device.

According to some aspects of this embodiment, operator may use system configuration GUI to assign names of the wireless system users, so that a specific user may be associated with a specific client device or wireless power receiver. Operator may also able to configure other details about users, such as contact info, employee number, customer number, billing information, and password level, among others.

The operator may be able to configure physical wireless power transmission areas of service. The operator may also be able to assign wireless power transmitters to an area.

If operator selects to configure contact info for alert, operator may be able to specify users to be automatically contacted in the occurrence of a significant system event, such as malfunctioning transmitter, the need to add more transmitter to a busy area, or the like.

In case the operator may select to configure credential authentication, the operator may have the option to set up the system account and password control for specific users, control system usage, operation, or to perform billing for power consumption, among others.

For specific system operational requirements, certain users may be allowed access to subsets of system configuration, depending on user's password authorization level or role. For example, a clerk at a Starbucks or restaurant may be authorized to only configure the local wireless power transmission system to add a new supply of wireless power receivers to the list that may receive power.

The operator may have the option to continue configuring the rest of the operational parameters after finished configuring the operational parameter previously selected, at step 6914.

If operator have finished configuring the operational parameter previously selected and does not need to configure another parameter, then a system configuration application programming interface (API) information may store configuration parameters in the computer's memory, at step 6916.

The system configuration API may run on a system management server, in a remote (cloud) system management server, or on a mobile system device. The system configuration API may connect the system with the system configuration GUI, and may be used in response to each operation action performed at system configuration GUI. The system configuration API may also be used to read the system configuration for the system configuration GUI to present to the user or operator.

According to some aspects of this embodiment, each system computer with the system configuration API may also support automatic configuration by an external computer. The external computer may have the capability to read from one of the system computers the present configuration of the system, and then send back changes to the configuration. The external computer, local or in the Internet cloud may communicate with the system computer through its web service, or by any other method of communication such as TCP/IP socket connection, XML messages, simple mail transport protocol (SMTP), and SMS text message, among others.

Configuration parameters are then communicated to other system computers, so that each computer of the system, such as wireless power transmitter or management server, always has the same system configuration, at step 6918.

The system configuration API at each system computer may have a built-it or hard-coded communication format version that is presented and verified during communication with other system computers to prevent configuration problems due to operation of system computers with incompatible software versions. Although system configuration GUI may take the form of a web page, a mobile or computer device software application, text message, and email, among others method, the configuration functionality of each method is the same, and each method employs the system configuration API with the exact same compatibility with the system.

According to some aspects of this embodiment, the storage of configuration parameters within each system computer may be encrypted. The encryption keys may be controlled by the system configuration API, to prevent malicious examination of the system configuration details within a system computer's non-volatile memory.

Examples

Example #1 is a wireless power transmission system with components similar to those described in FIG. 69A. An operator may need to set up authorization levels in the system, to assign permission to certain users to change some configurations. For example, in a wireless power transmission system that belongs to a particular house, the operator may assign permission to some members of the house to allow the charging of a game controller brought over by a visiting friend. The operator may access a system configuration GUI, where the operator may select the operational parameter he or she wants to configure, then another GUI page will allow configuration of authorizations level. Once the operator finishes with the configuring process, the configuration may be stored in the computer memory and subsequently the information may be communicated to others system computers.

Example #2 is a wireless power transmission system with components similar to those described in FIG. 69A. An operator may need to configure situational configurations in the system such as, if a client device receiving power from wireless power receiver is a smart phone and is being used for a telephone call the wireless power transmitter may not transmit power to the client device. The operator may access to the system configuration GUI, where the operator may select the operational parameter he wants to configure, then another GUI page will display to configure the situational configuration. Once the operator finishes with the configuring process, the configuration may be stored in the computer memory and subsequently the information may be communicated to others system computers. Once configured, the system software application running on the client device will communicate to the rest of the system whether or not the device is presently placing a telephone call. Then, if the wireless power transmission system decides to begin sending wireless power to the device, the wireless power transmitter that is within range of the client device will not attempt to transmit wireless power to the device if the device is presently placing a telephone call. If the device is not presently placing a telephone call, then the wireless power transmitter will start transmitting wireless power to the device. If while the device is receiving wireless power the device begins to make a telephone call, then the system software application running on the device will communicate this new situation to the system, and the wireless power transmitter will stop transmitting power to the device.

FIGS. 69A and 69B illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 69A and 69B.

Presented below are example systems and methods of wireless charging a receiver based on operational parameters.

A processor-based system for managing a power system comprising a plurality of power transmitters, configured to generate pocket-forming energy in 3-dimensional space to at least one receiver for charging may include: (i) a processor, (ii) a database operatively coupled to the processor, and (iii) communications, operatively coupled to the processor, where the communications is operable to communicate with a network, that is further communicatively coupled to the plurality of power transmitters, where the processor is configured to receive an operational parameter via the communications for the at least some of the plurality of power transmitters and utilize the operational parameter for controlling system configuration for each of the plurality of power transmitters.

In some embodiments, the operational parameter comprises at least one of (i) authorization for the at least one receiver for charging, (ii) a priority for the at least one receiver for charging, (iii) one or more times or conditions for generating pocket-forming energy in 3-dimensional space, and (iv) one or more times or conditions for stopping the generating of pocket-forming energy in 3-dimensional space.

In some embodiments, the network comprises one of a local area network (LAN), virtual private network (VPN) and a wireless area network (WAN).

In some embodiments, the processor is configured to transmit the operational parameter via the communications to a remote system computer. Furthermore, in some embodiments, the processor is configured to receive a further operational parameter via the communications from the remote system computer and utilize the further operational parameter for further system configuration.

In some embodiments, the processor is configured to receive a system event via the communications and modify the system configuration in response thereto.

In some embodiments, the processor is configured to authorize the received operational parameter.

A processor-based system for configuring a power system comprising at least one power transmitter, configured to generate pocket-forming energy in 3-dimensional space to at least one receiver for charging may include: (i) a processor, (ii) a database operatively coupled to the processor, and (iii) communications, operatively coupled to the processor, where the communications is operable to communicate with a network, where the processor is configured to receive an operational parameter via the communications for the at least one power transmitter and utilize the operational parameter for controlling system configuration.

A processor-based method for configuring a power system comprising at least one power transmitter, configured to generate pocket-forming energy in 3-dimensional space to at least one receiver for charging may include: (i) configuring communications, operatively coupled to a processor and a database to communicate with a network, (ii) receiving an operational parameter via the communications for the at least one power transmitter, and (iii) utilizing the operational parameter for controlling system configuration.

Figure 70:
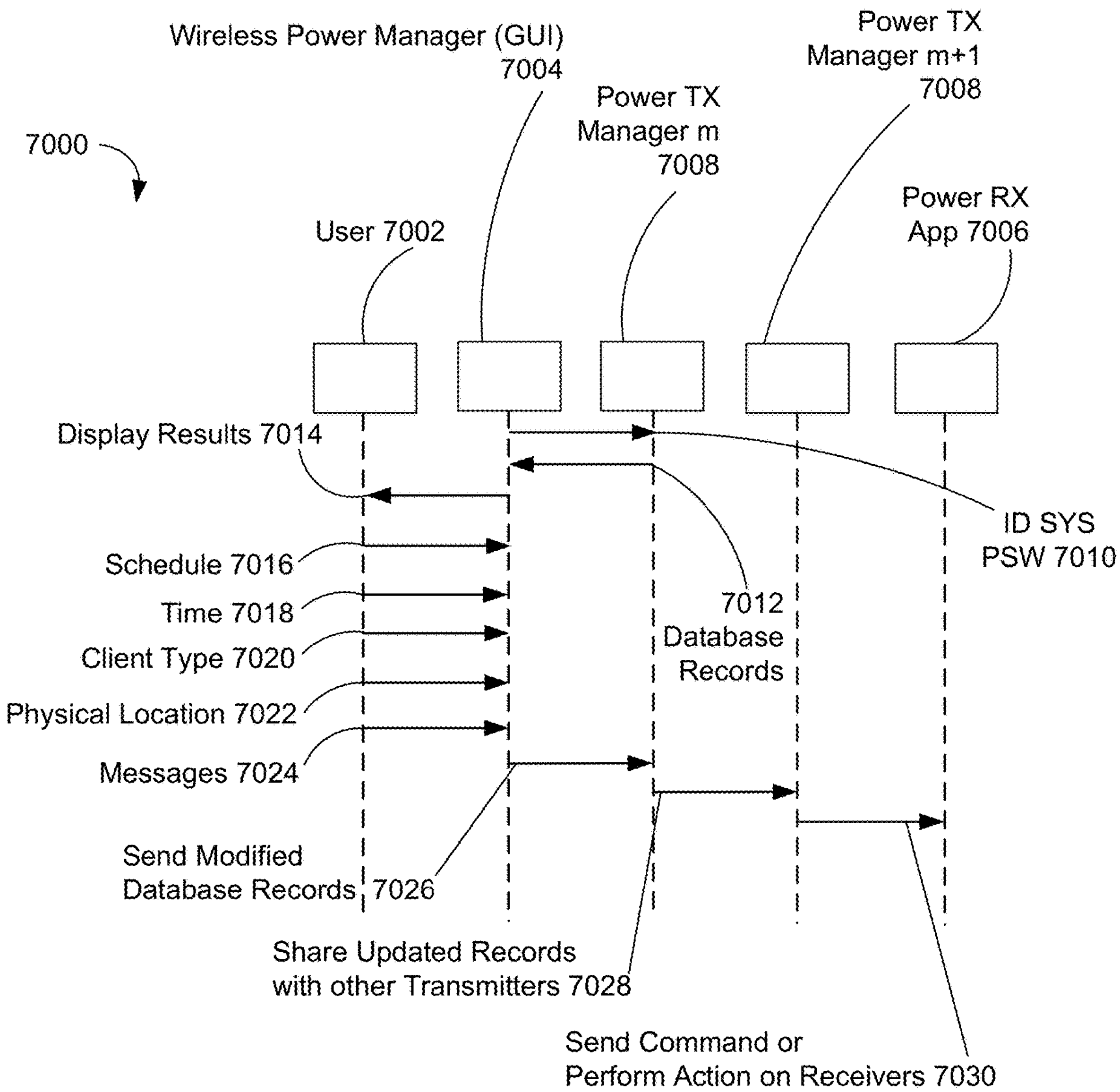
FIG. 70 illustrates a sequence diagram of real time communication between wireless power transmitters, wireless power receivers, a wireless power manager UI, and a user, in accordance with some embodiments.

FIG. 70 shows a sequence diagram 7000 for a real time communication between wireless powered transmitters and wireless powered receivers, according to an embodiment.

Sequence diagram 7000 illustrates the interactions between objects or roles in a wireless powered network. The objects or roles described here may include, but is not limited to, a user 7002 which manages the wireless power network, a wireless power manager 7004 which serves as a front end application for managing the wireless power network, power receiver devices with corresponding power receiver apps 7006 and transmitters with corresponding power transmitter manager apps 7008.

The process may begin when wireless power manager 7004 requests 7010 information from a power transmitter manager app 7008 hosted in a wireless transmitter. Request 7010 may include authentication security such as user name and password. Power transmitter manager apps 7008 may then verify the request 7010 and grant access to the wireless power manager 7004.

Wireless power manager 7004 may continuously request 7010 information for different time periods in order to continue updating itself. Power transmitter manager app 7008 may then send database records 7012 to the wireless power manager 7004. Wireless power manager 7004 may then display 7014 these records with options in a suitable GUI to a user 7002. User 7002 may then perform different actions in order to manage the wireless power network. For example and without limitation, a user 7002 may configure powering schedules 7016 for different devices, the user 7002 may also establish priorities depending on time 7018, type of client 7020, physical location 7022 or may even choose to broadcast a message 7024 to client devices. The wireless power manager 7004 may then send 7026 the updated database records back to the power transmitter manager apps 7008.

In a wireless network power grid more than one transmitter may be used. Power transmitter manager apps 7008 hosted on each transmitter may share updates 7028 to the device database. Power transmitter manager apps 7008 may then perform an action 7030 depending on the command and updates made by the user 7002 such as, charge a wireless device, send a message to the wireless devices, set a schedule to charge different devices, set power priority to specific devices, etc.

Figure 71:
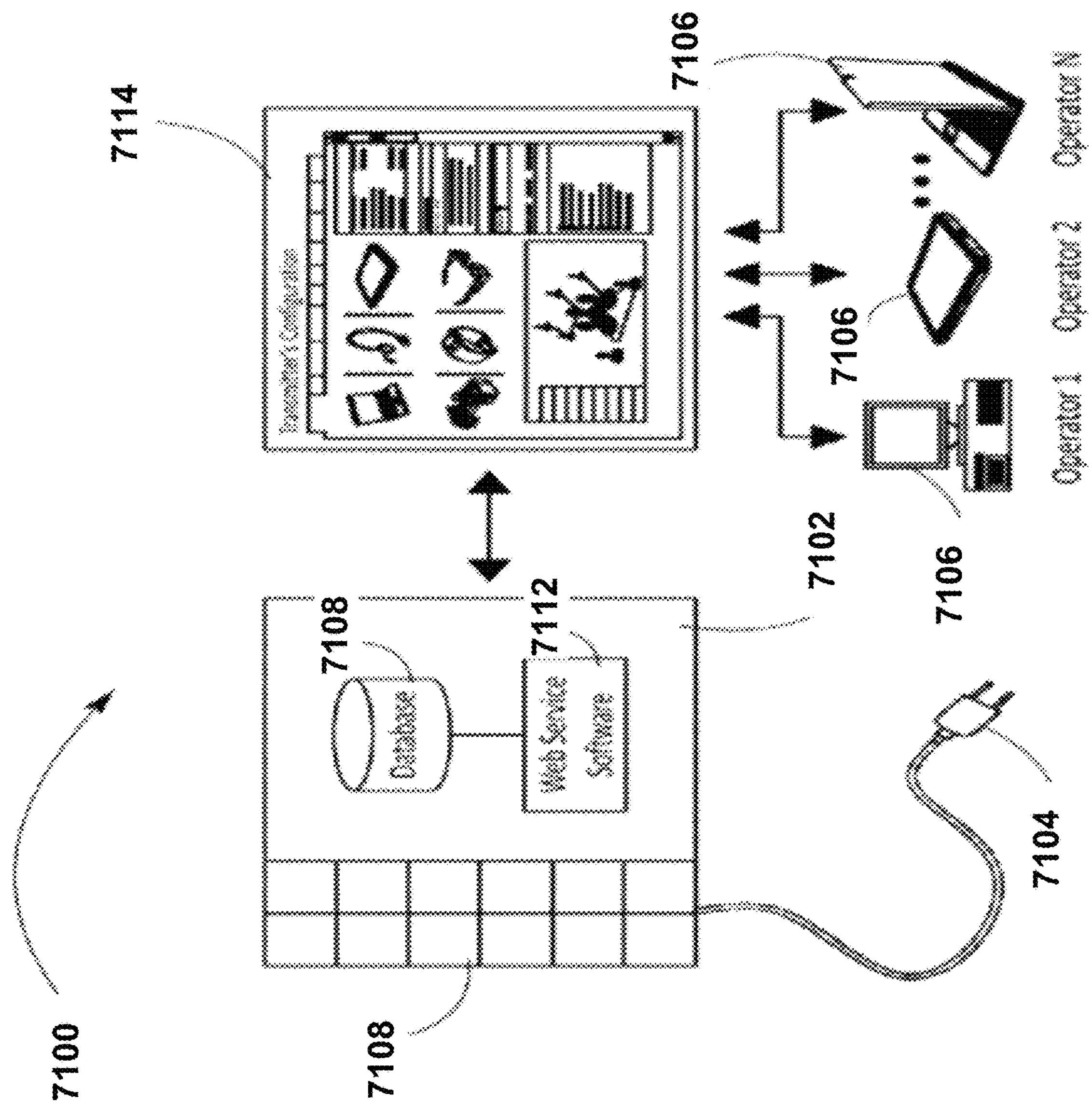
FIG. 71 illustrates a wireless power transmitter configuration network, in accordance with some embodiments.

FIG. 71 illustrates a wireless power transmitter configuration network 7100, according to another embodiment. Wireless power transmitter configuration network 7100 may include at least one wireless power transmitter 7102 connected to an energy power source 7104 and at least one computer device 7106, which may communicate with each other through an ad hoc network connection of wireless power transmitter 7102, that may be wireless or wired. Network connections may refer to Wi-Fi service, Bluetooth, LTE direct, or the like.

Each wireless power transmitter 7102 may be capable of managing and transmitting power to one or more wireless power receivers within a wireless power transmission system, where each wireless power receiver may be capable of providing power to one or more electronic devices such as laptop computers, stationary computers, mobile phones, tablets, mobile gaming devices, televisions, radios and/or any appliance which may require and/or benefit from an electrical power source. The wireless power transmission may be performed through an RF antenna array 7108 that may be used to form controlled RF waves that act as power transmission signals that may converge in 3-d space and create pockets of energy on wireless power receivers. Although the exemplary embodiment recites the use of RF waves as power transmission signals, the power transmission signals may include any number of alternative or additional techniques for transmitting energy to a wireless power receiver converting the transmitted energy to electrical power.

According to some embodiments in the present disclosure, each wireless power transmitter 7102 within the wireless power transmission system may include at least one distributed system database 7110 coupled to a web service software 7112, among others. Wireless power transmitter 7102 may contain a computer for running the wireless power transmitter's ad hoc network connection which may provide access to the wireless power transmitter's configuration GUI web pages 7114. Distributed system database 7110 may store relevant information from wireless power receivers of electronic devices and wireless power transmitters 7102 among others. This information may include, but is not limited to, voltage ranges for electronic device, location and signal strength of electronic device, ID of wireless power receiver, ID of wireless power transmitter 7102, ID of electronic device, charging schedules, charging priorities, and/or any other data which may be relevant to wireless power transmitter configuration network 7100. Distributed system database 7110 may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data. In exemplary embodiments, wireless power transmitter 7102 may distribute a replication of its distributed system database 7110 to other system devices or other wireless power transmitters if LAN becomes available, or to remote or cloud based system management service if internet access becomes available.

The configuration of wireless power transmitter 7102 may be performed by an operator/user accessing a standard web browser on a computer device 7106, such as a smartphone, a desktop computer, a laptop computer, a tablet, a PDA, and/or another type of processor-controlled device that may receive, process, and/or transmit digital data. The operator/user may browse the specific URL or IP address associated to configuration GUI web pages 7114 provided by web service software 7112 operating within wireless power transmitter 7102, and may then access configuration GUI web pages 7114 in order to specify the wireless power transmitter's configuration information. Web service software 7112 may use JavaScript or other suitable method for serving web pages, through embedded web, Apache, Internet Information Services (IIS), or any other suitable web server application.

The operator/user may get the specific URL or IP address associated to wireless power transmitter 7102, which may be printed on a "quickstart" instruction card that may come within the box of a newly purchased wireless power transmitter 7102, may be printed on the unit itself, and/or may be acquired from some other suitable source. The operator/user may use computer device 7106 with a suitable operating system such as Microsoft Windows, Apple iOS, Android or Linux, among others, to browse configuration GUI web pages 7114 using a standard web browser such as Chrome, Firefox, Internet Explorer, or Safari, among others, via an input device such as a touch screen, a mouse, a keyboard, a keypad, and others.

Web service software 7112 within wireless power transmitter 7102 may be capable of detecting and analyzing pending configuration settings of wireless power transmission system, and may also be capable of generating a recommendation or an alert which may be reported to the operator/user of the wireless power transmission system via configuration GUI web pages 7114 of wireless power transmitter 7102. Pending configuration settings of wireless power transmission system which may be reported to the operator/user, may include the detection of devices which may have not been configured, the need to add more wireless power transmitters 7102 to an overly busy area, and others. Web service software 7112 within wireless power transmitter 7102 may be configured to authorize received operational parameters.

In exemplary embodiments, wireless power transmitter 7102 may also support automatic configuration by an external or remote computer device 7106 running automated software through any suitable method of communication with wireless power transmitter 7102 such as TCP/IP socket connection, and others. In addition, the configuration of wireless power transmitter 7102 may also be performed through an XML message, or Simple Mail Transfer Protocol (SMTP), among others.

Figure 72:
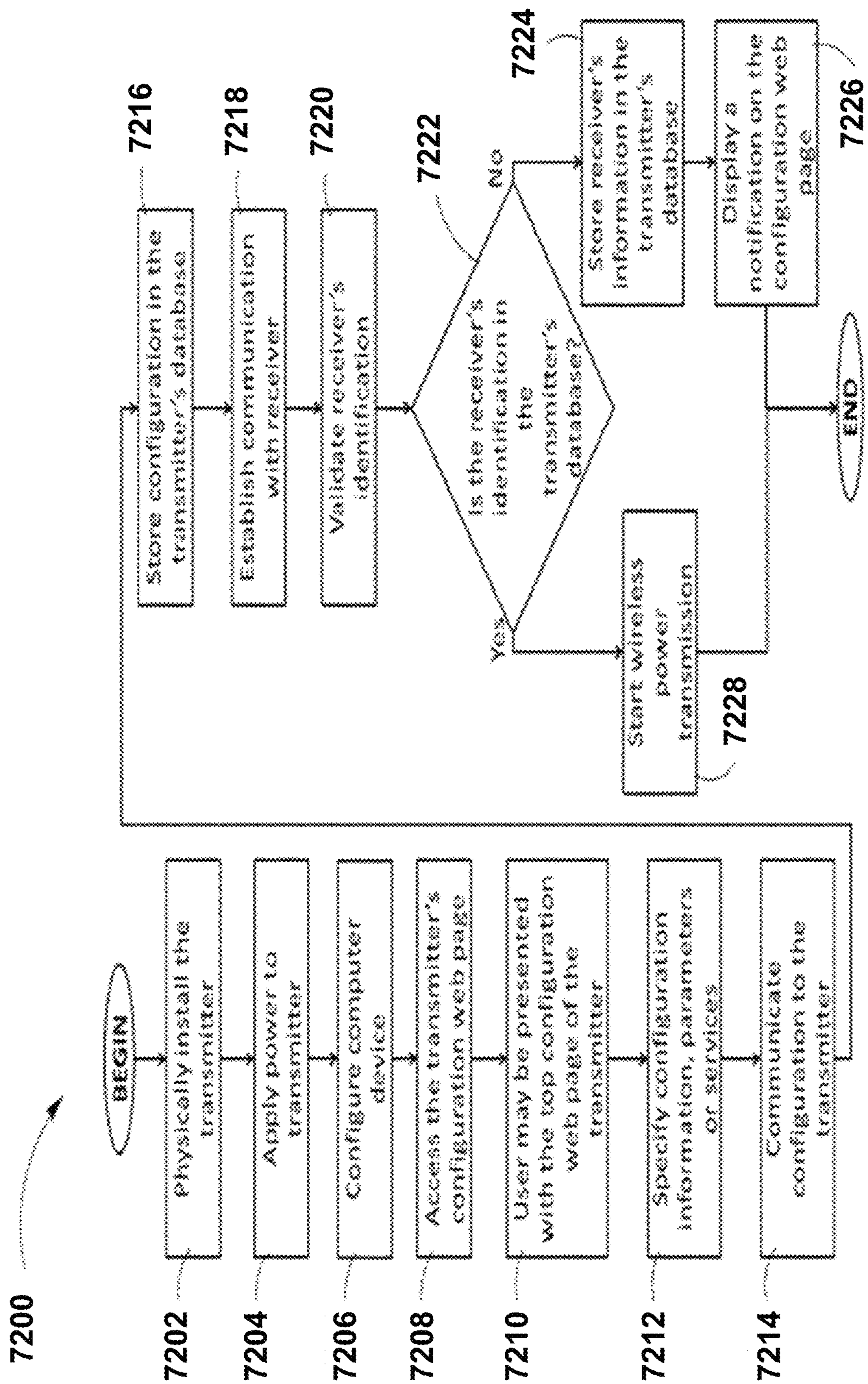
FIG. 72 is a flowchart of a process for installation and configuration of a wireless power transmitter through a configuration web service, in accordance with some embodiments.

FIG. 72 is a flowchart of a process 7200 for installation and configuration of a wireless power transmitter through a configuration web service, according to a further embodiment.

Process 7200 may begin when an operator/user removes a newly purchased wireless power transmitter from its box, and physically installs (block 7202) the wireless power transmitter at a location where it may be in power transmission range of each wireless power receiver that the wireless power transmitter may power. The operator/user may then apply power (Block 7204) to the wireless power transmitter, which may start the wireless power transmitter's web service software and may initiate the hardware within the wireless power transmitter that may support Wi-Fi service, or wireless or wired network, among other suitable network connections. Web service software may then start an ad hoc or other network which may provide access to the configuration GUI web pages hosted by the wireless power transmitter. This ad hoc network may be wireless or wired.

Subsequently, the operator/user may perform the configuration (block 7206) at a computer device with Wi-Fi capabilities, such as a smartphone, a desktop computer, a laptop computer, a tablet, a PDA, and/or another type of processor-controlled device that may receive, process, and/or transmit digital data, and which may be within Wi-Fi communication range of the wireless power transmitter, in order to connect to the wireless power transmitter's Wi-Fi service. Then, the operator/user may browse (block 7208) on the computer device, the specific URL or IP address of the configuration web page provided by or hosted by the web service software operating within the wireless power transmitter, and may then access the configuration GUI web pages of the wireless power transmitter. The web service software may be programmed to respond to the specific URL or IP address by sending configuration web pages back to the browser. The wireless power transmitter's specific URL or IP address may be printed on a "quickstart" instruction card which may come within the box of a newly purchased wireless power transmitter, may be printed on the wireless power transmitter's unit itself, and/or may be acquired from some other suitable source. The operator/user may use a computer device with a suitable operating system such as Microsoft Windows, Apple iOS, Android or Linux among others, to browse the configuration GUI web pages using a standard web browser such as Chrome, Firefox, Internet Explorer, Safari and others, via an input device such as a touch screen, a mouse, a keyboard, a keypad, and others. Wireless power transmitter may use JavaScript or other suitable method for serving web pages, through embedded web, Apache, Internet Information Services (IIS), or any other suitable web service application.

The operator/user may be presented (block 7210) with the top configuration GUI web pages which the wireless power transmitter may host and render. The operator/user may then specify via an input device (block 7212), the desired configuration information, parameters, and/or services, among others, presented by one or more configuration GUI web pages hosted by the wireless power transmitter. Configuration information that the operator/user may specify through the configuration web pages GUI may include, but is not limited to, a list of the wireless power receivers which may receive power from one or more wireless power transmitters within the wireless power transmission system, charging schedules, charging priorities, the selection of situations in which one or more wireless power transmitters may not transmit power to one or more wireless power receivers, user names, user contact information, or any other user information, employee number, customer number, billing information, password level, physical wireless power transmission areas of service, contact information of users which may be automatically contacted when a significant system event may occur, account setups, password control, and friendly device names for electronic devices, wireless power receivers, and wireless power transmitters, among other types of configuration information. In addition, the operator/user may also use the configuration GUI web pages to manually override the automatic power control of the wireless power transmission and immediately start or stop charging or powering one or more electronic devices; or end manual power control of the wireless power transmission and restore the automatic power control.

The specified configuration information collected through the configuration GUI web pages may be communicated (block 7214) by the web browser to the wireless power transmitter's web service software through suitable network connections. Web service software may then store (block 7216) the configuration information specified by the operator/user, into the wireless power transmitter's memory or local memory copy of a distributed system database. This configuration information may be stored in the wireless power transmitter's memory or distributed system database until the operator/user modifies the configuration features and parameters. In exemplary embodiments, wireless power transmitter may distribute a replication of its distributed system database to other system devices if LAN becomes available, or to remote or cloud based system management service if internet access becomes available.

The wireless power transmitter may automatically establish communication (block 7218) with one or more wireless power receivers and may read and validate (block 7220) the wireless power receiver's identification. If the wireless power receiver's identification is not stored in the wireless power transmitter's memory or distributed system database (decision 7222), then the wireless power transmitter may store (block 7224) the wireless power receiver's information in the wireless power transmitter's memory or distributed system database, and may display a notification (block 7226) to the operator/user, the next time the operator/user accesses the configuration GUI web pages. This may indicate to the operator/user that a new receiver needs to be configured. However, if the wireless power receiver's identification is already stored in the wireless power transmitter's memory or distributed system database, then the wireless power transmitter may immediately start the normal operation (block 7228) of the wireless power transmission based on the configuration parameters and features specified by the operator/user through the wireless power transmitter's configuration web pages.

In exemplary embodiments, wireless power transmitter may also support automatic configuration by an external computer device through any suitable method of communication with wireless power transmitter such as TCP/IP socket connection, and others. In addition, the configuration of wireless power transmitter may also be performed through an XML message, or Simple Mail Transfer Protocol (SMTP), among others.

Figure 73:
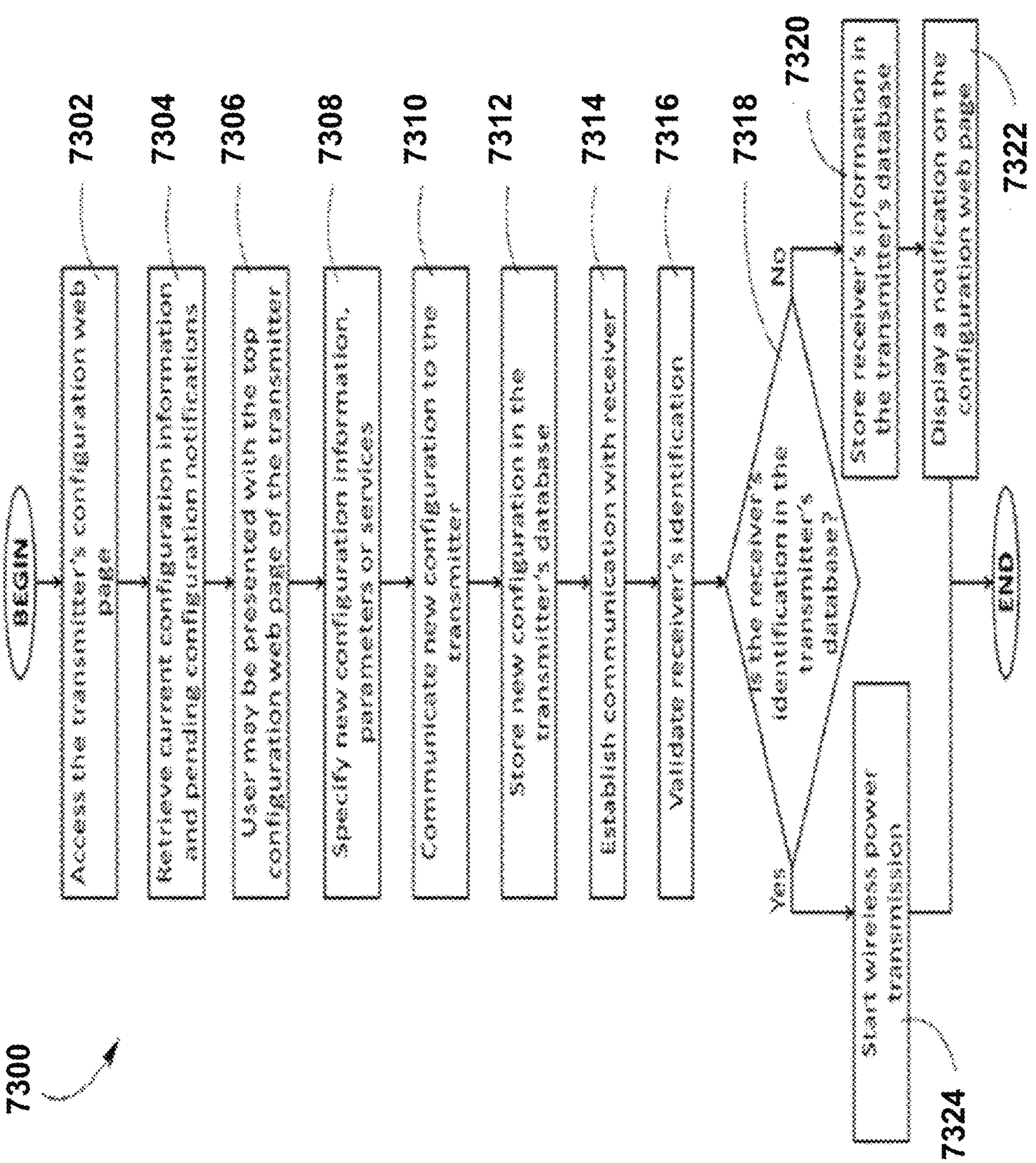
FIG. 73 is a flowchart of a process for re-configuring a wireless power transmitter through a configuration web service, in accordance with some embodiments.

FIG. 73 is a flowchart of a process 7300 for re-configuring a wireless power transmitter through a configuration web service, according to yet a further embodiment.

Process 7300 may begin when an operator/user accesses (block 7302) the wireless power transmitter's top configuration GUI web pages by browsing on a computer device, which may be within Wi-Fi communication range of the wireless power transmitter, the specific URL or IP address of the configuration web page provided by the web service software operating within the wireless power transmitter. Examples of computer devices may include a smartphone, a desktop computer, a laptop computer, a tablet, a PDA, and/or another type of processor-controlled device that may receive, process, and/or transmit digital data. The wireless power transmitter's specific URL or IP address may be printed on a "quickstart" instruction card which may come within the box of a newly purchased wireless power transmitter, may be printed on the wireless power transmitter's unit itself, and/or may be acquired from some other suitable source. The operator/user may use a computer device with a suitable operating system such as Microsoft Windows, Apple iOS, Android or Linux among others, to browse the configuration GUI web pages using a standard web browser such as Chrome, Firefox, Internet Explorer, Safari and others, via an input device such as a touch screen, a mouse, a keyboard, a keypad, and others. Wireless power transmitter may use JavaScript or other suitable method for serving web page through embedded web, Apache, Internet Information Services (IIS), or any other suitable web server application.

The web service software may be programmed to respond to the specific URL or IP address by sending configuration web pages back to the browser. The web service software may then retrieve the current configuration information (block 7304) of the wireless power transmission system from its local memory copy of a distributed system database. The web service software may also retrieve any information concerning pending configuration settings which may need to be notified to the operator/user of the wireless power transmission system such as pending configurations for newly discovered wireless power receivers or wireless power transmitters among others. The operator/user may be presented (block 7306) with the top configuration GUI web pages which the wireless power transmitter may host and render. These top configuration GUI web pages may display one or more configuration options, the current configuration features and parameters for the devices within the wireless power transmission system, and any notification of new devices detected within the wireless power transmission system, among others.

The operator/user may specify (block 7308) the new configuration features, parameters, and/or services through one or more configuration GUI web pages hosted by the wireless power transmitter, via an input device such as a touch screen, a mouse, a keyboard, a keypad, and others. New configuration information that the operator/user may specify through the configuration GUI web pages may include, but is not limited to, the wireless power receivers which may receive power from one or more wireless power transmitters within the wireless power transmission system, charging schedules, charging priorities, situations in which one or more wireless power transmitters may not transmit power to one or more wireless power receivers, user names, user contact info, employee number, customer number, billing information, password level, physical wireless power transmission areas of service, users which may be automatically contacted when a significant system event may occur, account setups, password control, and friendly device names for electronic devices, wireless power receivers, and wireless power transmitters, among other types of configuration information. In addition, the operator/user may also use the configuration GUI web pages to manually override the automatic power control of the wireless power transmission and immediately start or stop charging or powering one or more electronic devices; or end manual power control of the wireless power transmission and restore the automatic power control.

The new configuration information collected through the configuration GUI web pages may be communicated (block 7310) by the web browser to the wireless power transmitter's web service software through suitable network connections. Web service software may then store (block 7312) the new configuration information specified by the operator/user, into the wireless power transmitter's memory or local memory copy of a distributed system database. This new configuration information may be stored in the wireless power transmitter's memory or distributed system database until the operator/user performs additional modifications to the new configuration features and parameters. In exemplary embodiments, wireless power transmitter may distribute a replication of its distributed system database to other system devices if LAN becomes available, or to remote or cloud based system management service if internet access becomes available.

The wireless power transmitter may automatically establish communication (block 7314) with one or more wireless power receivers and may read and validate (block 7316) the wireless power receiver's identification. If the wireless power transmitter has no record of the wireless power receiver, or the wireless power receiver's identification is not stored in the wireless power transmitter's memory or distributed system database (decision 7318), then the wireless power transmitter may store (block 7320) the wireless power receiver's information in the wireless power transmitter's memory or distributed system database and may display a notification (block 7322) to the operator/user, the next time the operator/user accesses the configuration GUI web pages. However, if the wireless power receiver's identification is stored in the wireless power transmitter's memory or distributed system database, then the wireless power transmitter may immediately start the normal operation (block 7324) of wireless power transmission, based on the configuration parameters and features specified by the operator/user through the wireless power transmitter's configuration web pages.

In exemplary embodiments, wireless power transmitter may also support automatic configuration by an external or remote computer device through any suitable method of communication with wireless power transmitter such as TCP/IP socket connection, and others. In addition, the configuration of wireless power transmitter may also be performed through an XML message, or Simple Mail Transfer Protocol (SMTP), among others.

Examples

Example #1 refers to a user configuring a wireless power transmitter through a configuration web service, employing the method described in FIG. 14. An individual may buy a new wireless power transmitter and may begin the installation process. The individual may remove the newly purchased transmitter from the box, may physically install the unit mounted on the living room wall, and may apply power to the unit which may start the wireless network in the wireless power transmitter. The individual may configure a laptop which may be within Wi-Fi communication range of the wireless power transmitter in order to connect to the wireless power transmitter's Wi-Fi service. The individual may then, browse the wireless power transmitter's specific IP address provided by the wireless power transmitter's web service software, where this specific IP address may be found printed on the wireless power transmitter's quickstart instruction card. Then, the individual may select the desired configuration parameter, feature, and services for wireless power transmission. This configuration information may be communicated to the wireless power transmitter's web service software through the browser, and may then be stored in the wireless power transmitter's memory or distributed system database. The wireless power transmitter may then start the wireless power transmission according to the individual's configured parameters, features, and services.

Example #2 refers to a user re-configuring a wireless power transmitter through a configuration web service, employing the method described in FIG. 73. If during the wireless power transmitter's normal operation, a new receiver is within power and communication range of the wireless power transmitter, and the individual, who may be the operator/user of the wireless power transmission system, is browsing the wireless power transmitter's configuration web page, then the wireless power transmitter may automatically establish communication with the new receiver, may read its identification, may store this information in the wireless power transmitter's memory or distributed system database, and may display a notification to the individual on the configuration GUI web pages that a new receiver is available for configuration. The individual may then use the wireless power transmitter's configuration web service to provide configuration for the new wireless power receiver, including the wireless power receiver's power schedule, among others. This new configuration information may be communicated to the wireless power transmitter's web service software through the browser, and may then be stored in the wireless power transmitter's memory or distributed system database. The wireless power transmitter may then start the wireless power transmission according to the new configured parameters, features, and services provided by the individual.

FIGS. 70-73 illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 70-73.

Presented below are example systems and methods of a configuration web service to provide configuration of a wireless power transmitter in accordance with some embodiments.

A processor-based system for configuring a wireless power transmission system comprising at least one power transmitter, configured to generate pocket-forming energy in three dimensional space to at least one receiver for charging, the processor-based system comprising; (i) a processor, (ii) a database operatively coupled to the processor, and (iii) communications, operatively coupled to the processor, wherein the communications is operable to communicate with a network. The processor is configured to receive an operational parameter via the communications for the at least one power transmitter and to utilize the operational parameter for controlling system configuration.

In some embodiments, the operational parameter comprises at least one of (i) authorization for the at least one receiver for charging, (ii) a priority for the at least one receiver for charging, (iii) one or more times or conditions for generating pocket-forming energy in three dimensional space, and (iv) one or more times or conditions for stopping the generating of pocket-forming energy in three dimensional space.

In some embodiments, the network comprises one of a local area network (LAN), virtual private network (VPN) and a wireless area network (WAN).

In some embodiments, the processor is configured to transmit the operational parameter via the communications to a remote system computer.

In some embodiments, the processor is configured to receive a further operational parameter via the communications from the remote system computer and utilize the further operational parameter for further system configuration.

In some embodiments, the processor is configured to receive a system event via the communications and modify the system configuration in response thereto.

In some embodiments, the processor is configured to authorize the received operational parameter.

An exemplary method of configuring a wireless power transmission system comprising at least one power transmitter, configured to generate pocket-forming energy in three dimensional space to at least one receiver for charging, the method includes (i) configuring, by a processor, communications operatively coupled to the processor and to a database to communicate with a network, (ii) receiving, by the processor, an operational parameter via the communications for the at least one power transmitter, and (iii) utilizing, by the processor, the operational parameter for controlling system configuration.

Another exemplary method of configuring a wireless power transmission system includes: (i) receiving, by a wireless power transmitter that is hosting a web service for configuring the wireless power transmitter, a user-configured operational parameter that includes information identifying a plurality of electronic devices authorized to receive power transmission signals from the wireless power transmitter, wherein the user-configured operational parameter is received via a configuration webpage provided by the web service, (ii) detecting, by a short-range communication radio of the wireless power transmitter, an electronic device within wireless power transmission range of the wireless power transmitter, (iii) in response to detecting the electronic device within the wireless power transmission range of the wireless power transmitter, determining whether the electronic device is one of the plurality of electronic devices authorized to receive power transmission signals from the wireless power transmitter, and (iv) in accordance with a determination that the electronic device is one of the plurality of electronic devices authorized to receive power transmission signals from the wireless power transmitter, transmitting, by two or more antennas of the wireless power transmitter, power transmission signals comprising radio frequency (RF) signals that constructively interfere proximate to the electronic device.

In some embodiments, the user-configured operational parameter is a first user-configured operational parameter, and the method further comprises receiving, by the wireless power transmitter, a second user-configured operational parameter defining a charging schedule for transmitting power transmission signals to one or more of the plurality of electronic devices, where the second user-configured operational parameter is received via the configuration webpage provided by the web service. In addition, transmitting the power transmission signals comprises transmitting the power transmission signals to the electronic device in accordance with the charging schedule.

In some embodiments, the user-configured operational parameter is a first user-configured operational parameter, and the method further comprises receiving, by the wireless power transmitter, a second user-configured operational parameter a prioritized order used by the wireless power transmitter to provide power to the plurality of electronic devices, where the second user-configured operational parameter is received via the configuration webpage provided by the web service. In addition, transmitting the power transmission signals comprises transmitting the power transmission signals to the electronic device in accordance with the prioritized order.

Figure 74A:
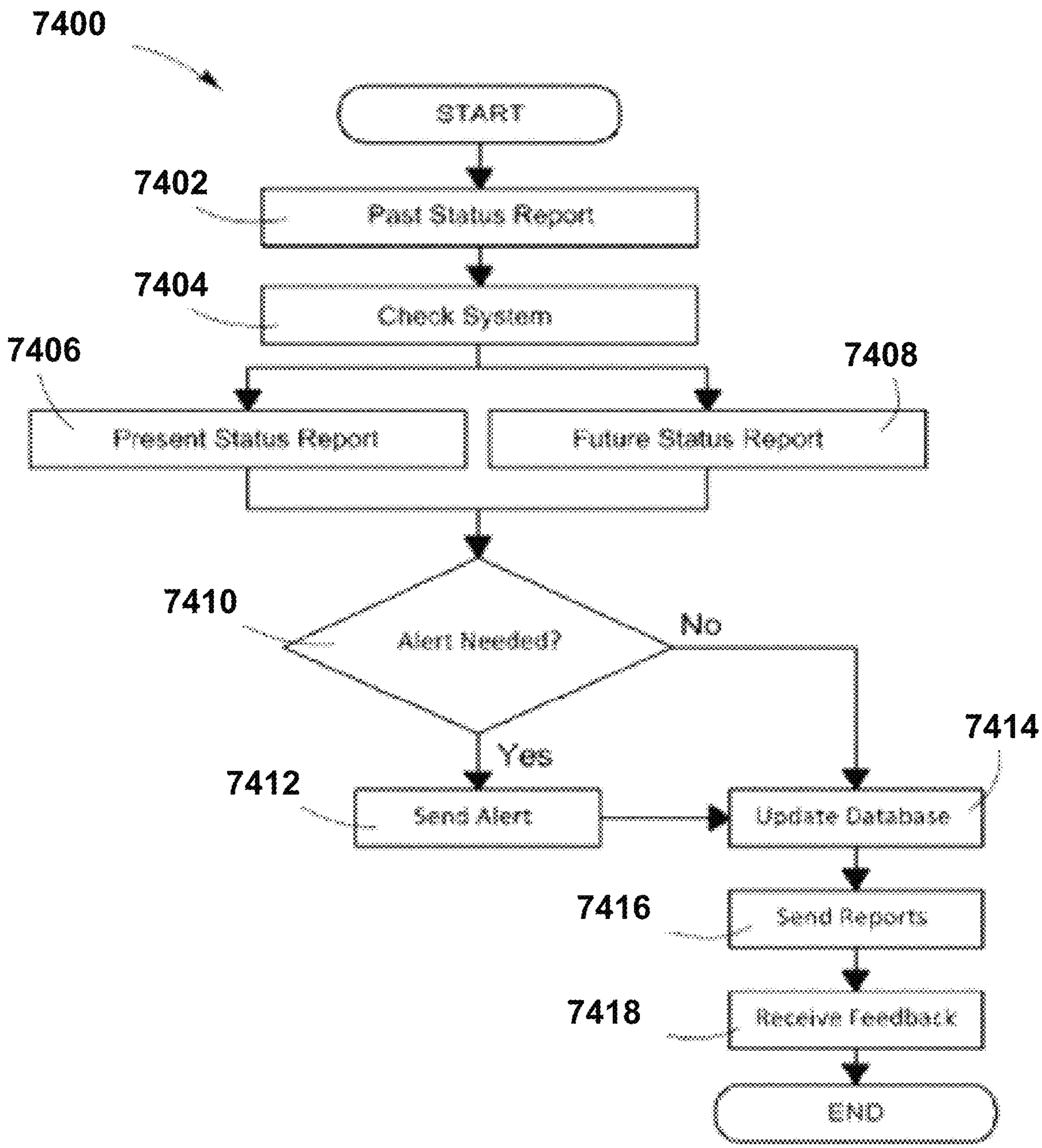
FIG. 74A is a flowchart of a general status report generation, in accordance with some embodiments.
Figure 74B:
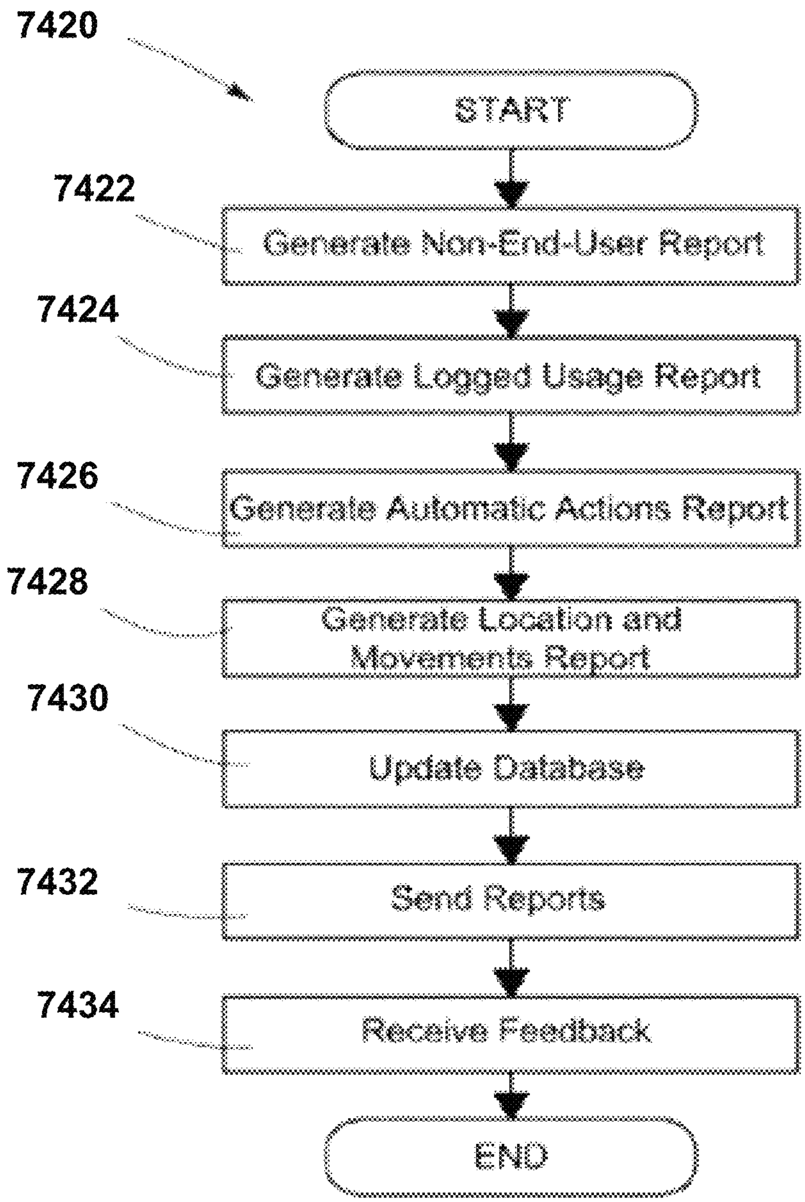
FIG. 74B is a flowchart of a past status report generation, in accordance with some embodiments.

FIGS. 74A-74B illustrate a system architecture and a flowchart to control a wireless power transmission system by configuration of wireless power transmission control parameters, in accordance with some embodiments.

FIG. 74A shows a flowchart of a general system status 7400 report generation process, according to an exemplary embodiment. Wireless power transmission systems may periodically send status reports to a remote management system, similar to the management systems previously described. General system status 7400 report generation process may start with past status report generation 7402, in this step any server within a wireless power transmission system may gather information that may include details such as the amount of power delivered to each of the electronic devices in the system during a certain time period, the amount of energy that was transferred to a group of electronic devices associated with a user, the amount of time an electronic device has been associated to a wireless power transmitter, pairing records, activities within the system, any action or event of any wireless power device in the system, errors, faults, and configuration problems, among others. Past system status data may also include power schedules, names, customer sign-in names, authorization and authentication credentials, encrypted information, areas, details for running the system, and any other suitable system or user-related information.

Then, the server within the wireless power transmission system may run a system check-up 7404. In this step, the server within the wireless power transmission system may check for any present failure, error or abnormal function of any system or subsystem components. Additionally, the server within the wireless power transmission system may check and perform an evaluation of the current system configuration.

Afterwards, the system may generate present status report 7406 and future status report 7408. Present status report may include any present failure, error or abnormal function of any system or subsystem components; a list of presently online end-users and devices, current system configuration and power schedules, amongst others.

Future status report 7408 may include forecasts based on the extrapolation or evaluation of past and present system status reports. For example, the system may be able to extrapolate possible impending sub-system component failure based on logged past behavior of sub-system components. The system may also be able to evaluate the power schedules and determine is any device will be out of energy according to historical power consumption and current power schedule.

In some embodiments, the system may further evaluate the system configuration to check if any configuration set by an operator or end-user may cause an unwanted system behavior. Such will be reported using the same techniques described above.

Then, the wireless power transmitters may evaluate 7410 if an alert is needed. If an alert is needed, the alert may be immediately generated and sent 7412. Depending of the type of problem detected, the alerts may be sent to the end-users, the system's owner, the service provider or any suitable combination, or to a remote system manager which can distribute a description of this urgent situation to customer service or other personnel via email, text message, or synthesized voice telephone call, according to alert configuration records stored within general database.

After the alert has been sent or if there is no alert needed, the server within the wireless power transmission system executing the report generation algorithm described in FIG. 74 may update 7414 its database with the reports and optionally back them up in a suitable server. If there are multiple servers, then only one at a time will be active for the generation of reports, while the others remain in stand-by mode, to take over if the active server goes offline. A hierarchy of priority will determine which online server is the present active (master) server.

Then, using a suitable TCP/IP connection the reports may be sent 7416 to a remote system manager for further evaluation. In some embodiments, the system may receive 7418 feedback from the remote system manager to indicate verification and storage of any received information.

FIG. 74B is a flowchart of a past status report 7420 generation process, according to an exemplary embodiment. The process for generation of a past status report 7420 may start with the generation 7422 of a non-end-user report, where no-end-user report may include logged activity, commands and configuration inputs of any non-end-user system operator.

Then, the system may generate 7424 a logged usage report which may include logged usage details and wireless energy consumption details. The wireless energy consumption details may include the amount of power delivered to each device and total amount of power delivered to the devices associated with each end user.

In some embodiments, the logged usage report may be used to compute power bills to charge end-users for the amount of wireless power received during a given time period.

Then, the system may generate 7426 an automatic actions report which may include automatic actions performed by or over any of the system components, including all power transmitters, power receivers, and any system management GUI.

Subsequently, the system may generate 7428 a location and movement report, which may include the location and movement tracking details of power receivers relative to power transmitters in the system.

After the reports have been generated the system may assemble past status report 7420 and update 7430 the database.

Then, using a suitable TCP/IP connection the reports may be sent 7432 to a remote system manager for further evaluation. In some embodiments, the system may receive 7434 feedback from the remote system manager to indicate verification and storage of any received information.

Figure 74C:
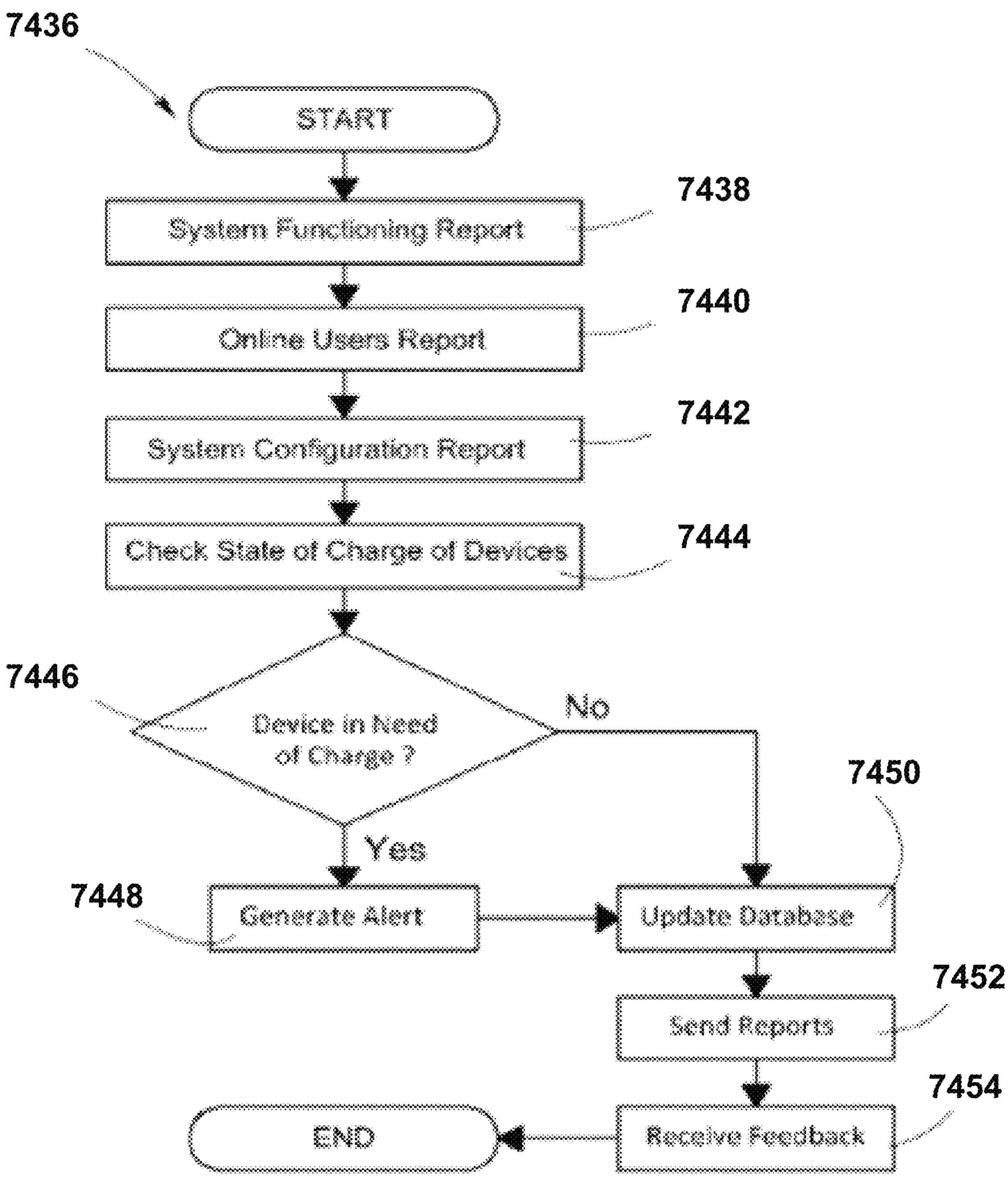
FIG. 74C is a flowchart of a present status report generation, in accordance with some embodiments.

FIG. 74C is a flowchart of a present status report 7436 generation process, according to an exemplary embodiment. The process of generation of present status reports 7436 may start with the generation 7438 of a system functioning report, in which the system may evaluate the performance of each of the systems components to detect any failure, error or abnormal function of any system or subsystem component. Then the system may generate 7440 a list of all online users and devices. Afterwards, the system may generate 7442 a report of the current system configuration.

Additionally, the system may check 7444 the state of charge all the electronic devices within the system. If any electronic device within the system is in urgent need 7446 of charge the system may generate and send 7448 an alert. The alert may be sent to the users in form of text messages, emails, voice synthesis telephone communication or any other suitable means.

In some embodiments, whenever an electronic device has a minimum amount of energy left the system may be capable of contacting the end-user to make the end user aware of the current state of charge of the electronic device.

After the reports have been generated the system may assemble present status report 7436 and update 7450 the database.

Then, using a suitable TCP/IP connection the reports may be sent 7452 to a remote system manager for further evaluation. In some embodiments, the system may receive 7454 feedback from the remote system manager to indicate verification and storage of any received information.

Figure 74D:
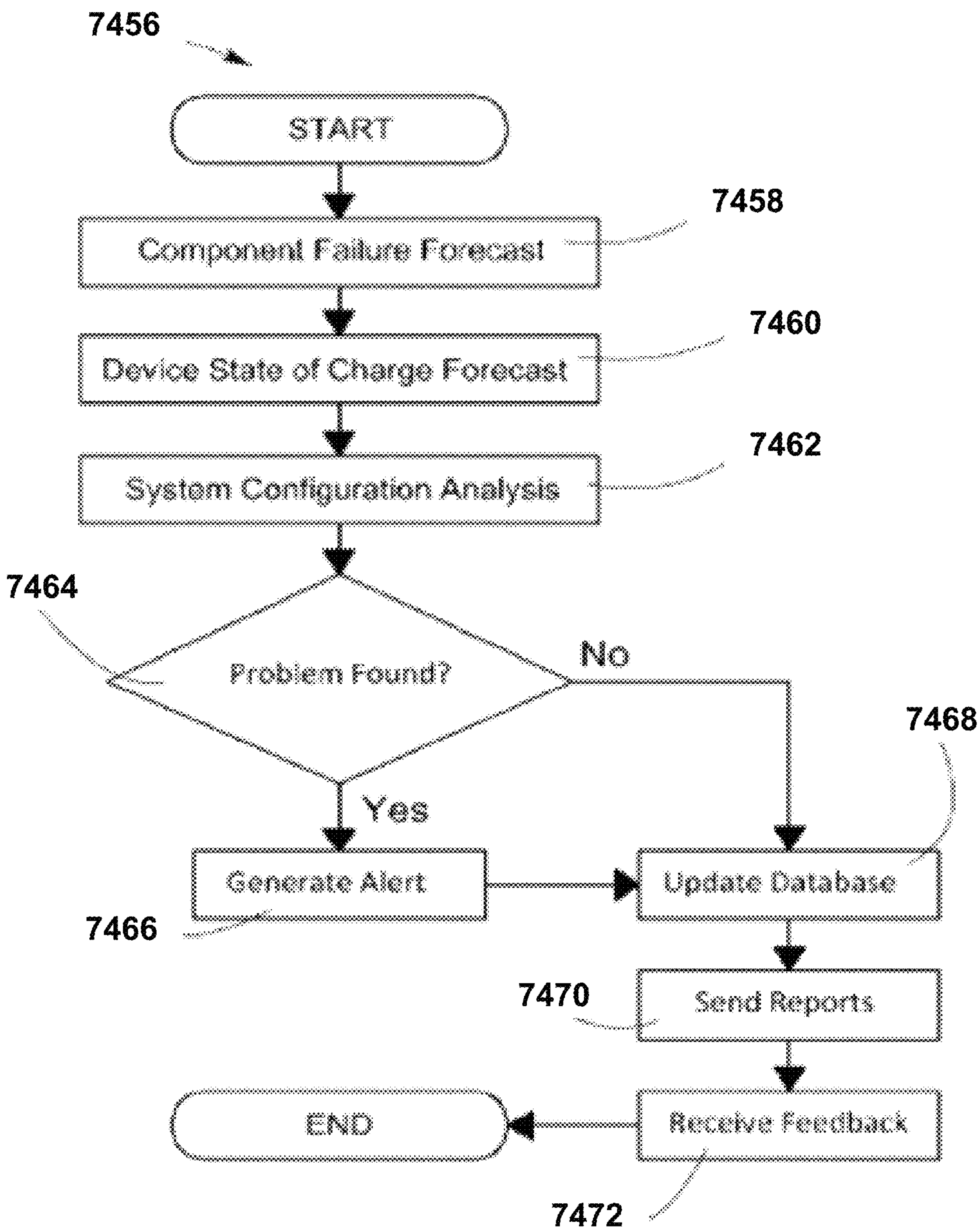
FIG. 74D is a flowchart of a future status report generation, in accordance with some embodiments.

FIG. 74D is a flowchart of a future status report 7456 generation process, according to an exemplary embodiment. The process of generation of future status report 7456 may start with the generation 7458 of a component failure forecast in which impending sub-system component failure may be extrapolated from logged past behavior of sub-system components. Then the system may generate 7460 a device state of charge forecast, based on present rate of energy consumption of the devices, configured charging schedule, logged usage and any other suitable parameter. In this step the system may determine if any device will reach an unexpected critically low level of charge at some point in the future.

Afterwards, the system may perform 7462 a system configuration analysis, in which the system may evaluate any configuration set by the system operator or end-user to determine if it may cause any unwanted system behavior.

Then, if a problem was found 7464 in any of the first 3 steps, the system may generate a suitable alert 7466. If an alert is sent to an end-user or system operator it may be in the form of text messages, emails, voice synthesis telephone communication or any other suitable means. In some embodiments, the system provider may be contacted by similar means.

Afterwards, the system may assemble future status report 7456 and update 7468 the database.

Subsequently, using a suitable TCP/IP connection the reports may be sent 7470 to a remote system manager for further evaluation. In some embodiments, the system may receive 7472 feedback from the remote system manager to indicate verification and storage of any received information.

Examples

In example #1 a wireless power transmission system generates a general status report as described in FIG. 74A. When checking the state of charge of the electronic devices within the system, an electronic device with critically low level of charge and no scheduled charge time is identified. In this example, the wireless power system is able to contact the owner of the electronic device via SMS message. The user schedules a charging period for the device and the device is charged before it runs out of energy.

In example #2 a wireless power transmission system generates a general status report as described in FIG. 74A.

When checking the system configuration, a possible unwanted behavior is identified. A device is scheduled to charge for too long without usage, which may cause overheating of some components. In this example, the power transmitter send a report to the remote management system and the remote management system sends an alert via email to the user.

In example #3 a wireless power service provider utilizes the past status reports generated by wireless power delivery system over the past 30 days to compute bills and charge end-users for their wireless power consumption.

In example #4 an end-user's electronic device requests wireless power. The wireless power transmitter utilizes a suitable TCP/IP connection to communicate with a remote system manager and authenticate the end-user's credentials. The credentials of the end-user are authenticated and the electronic device is charged.

FIGS. 74A-74D illustrate examples of or relate to the wireless power transmission environment 100 described above with reference to FIG. 1. For the sake of brevity, certain details related to techniques for wirelessly delivering power described above in reference to FIG. 1 are not repeated here, as one of skill in the art will appreciate that these techniques apply to the embodiments of FIGS. 74A-74D.

Presented below are example systems and methods for monitoring wireless power charging.

A system for monitoring the distribution of pocket-forming energy in three-dimensional space may include: at least one transmitter and a remote system manager. In some embodiments, the at least one transmitter each comprises: (i) an antenna array, the transmitter configured to provide the pocket-forming energy in three-dimensional space via the antenna array to at least one of a plurality of devices, (ii) an antenna manager configured to control power and a direction angle of the antenna array, (iii) a storage configured to receive and store data comprising at least one of transmitter data and device data, and (iv) communications configured to communicate the data to a network. Furthermore, in some embodiments, the remote system manager is operatively coupled to the network and is configured to receive and process communicated data to determine a status of the system and perform an action in response to the determined status.

In some embodiments, the status comprises at least one of a past system status, a present system status, a future system status, a device failure status, and a transmitter failure status. Furthermore, in some embodiments: (i) the past system status comprises at least one of a non-end-user report, a logged usage report, an automatic actions report and a location and movement report, (ii) the present system status comprises at least one of a system functioning report, an online users report, a system configuration report and a state of charge report, and (iii) the future system status comprises at least one of component failure forecast data, device state of change forecast data and system configuration analysis data.

In some embodiments, the device data comprises at least one of device identification data, device voltage range data, device location data, and device signal strength data.

In some embodiments, the transmitter data comprises at least one of transmitter identification data, receiver identification data, end-user device name data, system management server identification data, charging schedule data and charging priority data.

In some embodiments, the action comprises generating one or more alerts in response to a determined status of the system.

In another system, the system may include: (i) at least one transmitter comprising an antenna array, the transmitter being configured to provide pocket-forming energy in three-dimensional space via the antenna array to at least one of a plurality of devices, where the transmitter is further configured to communicate data to a network, and where the data comprises at least one of transmitter data and device data and (ii) a remote system manager, operatively coupled to the network, where the remote system manager is configured to process communicated data to determine a status of the system.

A method may include: (i) providing pocket-forming energy in three-dimensional space to at least one of a plurality of devices via at least one transmitter coupled to a respective antenna array, (ii) communicating data from the transmitter to a network, the data comprising at least one of transmitter data and device data, and (iii) processing the communicated data in a remote system manager, operatively coupled to the network, to determine a status of the wireless power system.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 106) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 106 optionally includes one or more storage devices remotely located from the CPU(s) 104. Memory 106, or alternatively the non-volatile memory device(s) within memory 106, includes a non-transitory computer readable storage medium.

Stored on any one of the machine readable medium (media), features of the present invention can be incorporated in software and/or firmware for controlling the hardware of a processing system (such as the components associated with the transmitters 102 and/or receivers 120), and for enabling a processing system to interact with other mechanisms utilizing the results of the present invention. Such software or firmware may include, but is not limited to, application code, device drivers, operating systems, and execution environments/containers.

Communication systems as referred to herein (e.g., communications component 112, FIG. 1) optionally communicate via wired and/or wireless communication connections. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to radio-frequency (RF), radio-frequency identification (RFID), infrared, radar, sound, Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), ZIGBEE, wideband code division multiple access (W-CDMA), code division multiple access (CDMA), time division multiple access (TDMA), BLUETOOTH, Wireless Fidelity (WI-FI) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of selectively charging one or more electronic devices in a wireless power network, the method comprising:

at a controlling electronic device that includes a display:

receiving data comprising a charge status for each of a plurality of receiver devices;

displaying, in a first region of the display, representations of one or more receiver devices of the plurality of receiver devices, each of the one or more receiver devices represented in the first region of the display is currently not receiving electromagnetic (EM) power transmission waves;

displaying, in a second region of the display that is distinct from the first region of the display, representations of one or more additional receiver devices of the plurality of receiver devices, wherein each of the one or more additional receiver devices represented in the second region of the display is currently receiving EM power transmission waves from one or more wireless power transmitters included in a wireless power network;

detecting a user selection from the first region of the display of one of the representations of the one or more receiver devices corresponding to a receiver device selected to be charged; and in response to detecting the user selection, sending a command to a wireless power transmitter to transmit EM power transmission waves to a location of the receiver device selected to be charged, wherein the receiver device selected to be charged uses energy from at least some of the EM power transmission waves to power or charge the receiver device.

2. The method of claim 1, wherein the representation corresponding to the receiver device selected to be charged is a user selected representation and detecting the user selection comprises:

ceasing to display the user selected representation corresponding to the receiver device selected to be charged in the first region of the display; and displaying the user selected representation in the second region of the display.

3. The method of claim 2, wherein ceasing to display the user selected representation in the first region of the display and displaying the user selected representation in the second region of the display comprises animating movement of the user selected representation from the first region of the display to the second region of the display in accordance with a detected movement of the user selected representation.

4. The method of claim 2, further comprising, at the controlling electronic device:

detecting, in the second region of the display, an additional user selection of the user selected representation corresponding to the receiver device selected to be charged; and in response to detecting the additional user selection, sending another command to the wireless power transmitter to cease transmitting the EM power transmission waves.

5. The method of claim 4, wherein detecting the additional user selection comprises:

ceasing to display the user selected representation corresponding to the receiver device selected to be charged in the second region of the display; and displaying the user selected representation in the first region of the display.

6. The method of claim 1, wherein:

the wireless power transmitter is one of a plurality of wireless power transmitters;

the plurality of wireless power transmitters is assigned to a designated area; and the receiver device selected to be charged is located within the designated area.

7. The method of claim 6, wherein the receiver device selected to be charged is within a predefined transmission range of the wireless power transmitter.

8. The method of claim 6, wherein receiving the data comprises receiving the data from one or more of the plurality of wireless power transmitters.

9. The method of claim 1, wherein each of the representations of the one or more receiver devices includes a charge status associated with the one or more receiver devices.

10. The method of claim 1, further comprising, at the controlling electronic device:

after sending the command to the wireless power transmitter, adding an indicator to the representation corresponding to the receiver device selected to be charged to indicate reception of the EM power transmission waves by the receiver device selected to be charged.

11. The method of claim 1, wherein each of the plurality of receiver devices comprises:

an electronic device; and a wireless power receiver coupled to electronic device.

12. The method of claim 1, wherein the controlling electronic device is distinct and separate from the wireless power transmitter.

13. An electronic device, comprising:

at least one processor;

a display; and memory storing executable instructions that, when executed by the at least one processor, cause the electronic device to:

receive data comprising a charge status for each of a plurality of receiver devices;

display, in a first region of the display, representations of one or more receiver devices of the plurality of receiver devices, each of the one or more receiver devices represented in the first region of the display is currently not receiving electromagnetic (EM) power transmission waves;

display, in a second region of the display that is distinct from the first region of the display, representations of one or more additional receiver devices of the plurality of receiver devices, wherein each of the one or more additional receiver devices represented in the second region of the display is currently receiving EM power transmission waves from one or more wireless power transmitters included in a wireless power network;

detect a user selection from the first region of the display of one of the representations of the one or more receiver devices corresponding to a receiver device selected to be charged; and in response to detecting the user selection, send a command to a wireless power transmitter to transmit EM power transmission waves to a location of the receiver device selected to be charged, wherein the receiver device selected to be charged uses energy from at least some of the EM power transmission waves to power or charge the receiver device.

14. The electronic device of claim 13, wherein the representation corresponding to the receiver device selected to be charged is a user selected representation and detecting the user selection comprises:

ceasing to display the user selected representation corresponding to the receiver device selected to be charged in the first region of the display; and displaying the user selected representation in the second region of the display.

15. The electronic device of claim 14, wherein ceasing to display the user selected representation in the first region of the display and displaying the user selected representation in the second region of the display comprises animating movement of the user selected representation from the first region of the display to the second region of the display in accordance with a detected movement of the user selected representation.

16. The electronic device of claim 14, wherein the memory storing executable instructions that, when executed by the at least one processor, cause the electronic device to detecting, in the second region of the display, an additional user selection of the user selected representation corresponding to the receiver device selected to be charged; and in response to detecting the additional user selection, sending another command to the wireless power transmitter to cease transmitting the EM power transmission waves.

17. The electronic device of claim 16, wherein detecting the additional user selection comprises:

ceasing to display the user selected representation corresponding to the receiver device selected to be charged in the second region of the display; and displaying the user selected representation in the first region of the display.

18. The electronic device of claim 13, wherein:

the wireless power transmitter is one of a plurality of wireless power transmitters;

the plurality of wireless power transmitters is assigned to a designated area; and the receiver device selected to be charged is located within the designated area.

19. The electronic device of claim 18, wherein the receiver device selected to be charged is within a predefined transmission range of the wireless power transmitter.

20. The electronic device of claim 18, wherein receiving the data comprises receiving the data from one or more of the plurality of wireless power transmitters.

21. The electronic device of claim 13, wherein each of the representations of the one or more receiver devices includes a charge status associated with the one or more receiver devices.

22. The electronic device of claim 13, wherein the memory storing executable instructions that, when executed by the at least one processor, cause the electronic device to:

after sending the command to the wireless power transmitter, add an indicator to the representation corresponding to the receiver device selected to be charged to indicate reception of the EM power transmission waves by the receiver device selected to be charged.

23. The electronic device of claim 13, wherein each of the plurality of receiver devices comprises:

an electronic device; and a wireless power receiver coupled to electronic device.

24. The electronic device of claim 13, wherein the electronic device is distinct and separate from the wireless power transmitter.

25. A non-transitory computer-readable storage medium storing executable instructions that, when executed by an electronic device with at least one processor and a display, cause the electronic device to:

receive data comprising a charge status for each of a plurality of receiver devices;

display, in a first region of the display, representations of one or more receiver devices of the plurality of receiver devices, each of the one or more receiver devices represented in the first region of the display is currently not receiving electromagnetic (EM) power transmission waves;

display, in a second region of the display that is distinct from the first region of the display, representations of one or more additional receiver devices of the plurality of receiver devices, wherein each of the one or more additional receiver devices represented in the second region of the display is currently receiving EM power transmission waves from one or more wireless power transmitters included in a wireless power network;

detect a user selection from the first region of the display of one of the representations of the one or more receiver devices corresponding to a receiver device selected to be charged; and in response to detecting the user selection, send a command to a wireless power transmitter to transmit EM power transmission waves to a location of the receiver device selected to be charged, wherein the receiver device selected to be charged uses energy from at least some of the EM power transmission waves to power or charge the receiver device.

26. The non-transitory computer-readable storage medium of claim 25, wherein the representation corresponding to the receiver device selected to be charged is a user selected representation and detecting the user selection comprises:

ceasing to display the user selected representation corresponding to the receiver device selected to be charged in the first region of the display; and displaying the user selected representation in the second region of the display.

27. The non-transitory computer-readable storage medium of claim 26, wherein ceasing to display the user selected representation in the first region of the display and displaying the user selected representation in the second region of the display comprises animating movement of the user selected representation from the first region of the display to the second region of the display in accordance with a detected movement of the user selected representation.

28. The non-transitory computer-readable storage medium of claim 26, wherein the executable instructions that, when executed by an electronic device, cause the electronic device to:

detect, in the second region of the display, an additional user selection of the user selected representation corresponding to the receiver device selected to be charged; and in response to detecting the additional user selection, send another command to the wireless power transmitter to cease transmitting the EM power transmission waves.

29. The non-transitory computer-readable storage medium of claim 28, wherein detecting the additional user selection comprises:

ceasing to display the user selected representation corresponding to the receiver device selected to be charged in the second region of the display; and displaying the user selected representation in the first region of the display.

30. The non-transitory computer-readable storage medium of claim 25, wherein:

the wireless power transmitter is one of a plurality of wireless power transmitters;

the plurality of wireless power transmitters is assigned to a designated area; and the receiver device selected to be charged is located within the designated area.

31. The non-transitory computer-readable storage medium of claim 30, wherein the receiver device selected to be charged is within a predefined transmission range of the wireless power transmitter.

32. The non-transitory computer-readable storage medium of claim 30, wherein receiving the data comprises receiving the data from one or more of the plurality of wireless power transmitters.

33. The non-transitory computer-readable storage medium of claim 25, wherein each of the representations of the one or more receiver devices includes a charge status associated with the one or more receiver devices.

34. The non-transitory computer-readable storage medium of claim 25, wherein the executable instructions that, when executed by an electronic device, cause the electronic device to:

after sending the command to the wireless power transmitter, add an indicator to the representation corresponding to the receiver device selected to be charged to indicate reception of the EM power transmission waves by the receiver device selected to be charged.

35. The non-transitory computer-readable storage medium of claim 25, wherein each of the plurality of receiver devices comprises:

an electronic device; and a wireless power receiver coupled to electronic device.

36. The non-transitory computer-readable storage medium of claim 25, wherein the electronic device is distinct and separate from the wireless power transmitter.

* * * * *